US011666825B2

(12) United States Patent
Delamont

(10) Patent No.: US 11,666,825 B2
(45) Date of Patent: Jun. 6, 2023

(54) MIXED REALITY GAMING SYSTEM

(71) Applicant: Dean Lindsay Delamont, Southampton (GB)

(72) Inventor: Dean Lindsay Delamont, Southampton (GB)

(\*) Notice: Subject to any disclaimer, the term of this patent is extended or adjusted under 35 U.S.C. 154(b) by 34 days.

(21) Appl. No.: 16/620,500

(22) PCT Filed: Jun. 8, 2018

(86) PCT No.: PCT/GB2018/051578
§ 371 (c)(1),
(2) Date: Dec. 7, 2019

(87) PCT Pub. No.: WO2018/224847
PCT Pub. Date: Dec. 13, 2018

(65) Prior Publication Data
US 2020/0368616 A1    Nov. 26, 2020

(30) Foreign Application Priority Data
Jun. 9, 2017  (GB) .............................. GB1709199.2

(51) Int. Cl.
*A63F 13/52*    (2014.01)
*A63F 13/213*    (2014.01)
(Continued)

(52) U.S. Cl.
CPC ............ *A63F 13/52* (2014.09); *A63F 13/213* (2014.09); *A63F 13/26* (2014.09); *A63F 13/65* (2014.09);
(Continued)

(58) Field of Classification Search
None
See application file for complete search history.

(56) References Cited

U.S. PATENT DOCUMENTS 7,864,524 B2\* 1/2011 Ladouceur ............ G06F 1/1616
361/679.55
10,254,546 B2\* 4/2019 Poulos ............... G02B 27/0172
(Continued)

FOREIGN PATENT DOCUMENTS

GB    2578695 A    5/2020
WO   2004055776 A1   7/2004
WO   2018224847 A2   12/2018

OTHER PUBLICATIONS

"International Search Report" and "Written Opinion" of the International Search Authority (ISA/EP) in Dean Lindsay Delamont, International Patent Application Serial No. PCT/GB2018/051578, dated Dec. 10, 2018 (28 pages).
(Continued)

*Primary Examiner* — Jason A Pringle-Parker
(74) *Attorney, Agent, or Firm* — Tillman Wright, PLLC; James D. Wright; David R. Higgins

(57) ABSTRACT

An interactive mixed reality system for one or more users, in which both real-world entities and virtual world entities are capable of being interacted with by one or more users, or by objects (47, 91) for use by users, and the system arranged to computationally maintain game state and the evolution of events in the real-world and the virtual world, and the system arranged to generate a response (such as visual or tactile/haptic, or by way of cause and effect) which is experienced or perceived by the one or more users.

10 Claims, 13 Drawing Sheets

(51) Int. Cl.

| | | |
|---|---|---|
| *A63F 13/26* | (2014.01) | |
| *A63F 13/65* | (2014.01) | |
| *H04N 13/383* | (2018.01) | |
| *H04N 13/239* | (2018.01) | |
| *H04N 13/111* | (2018.01) | |
| *G06F 3/01* | (2006.01) | |
| *G06T 11/00* | (2006.01) | |
| *G06T 13/20* | (2011.01) | |
| *G06T 15/04* | (2011.01) | |
| *G06T 15/08* | (2011.01) | |
| *G06T 15/10* | (2011.01) | |
| *G06T 15/50* | (2011.01) | |
| *G06T 17/20* | (2006.01) | |
| *G06T 19/00* | (2011.01) | |
| *H04R 5/02* | (2006.01) | |
| *H04R 5/04* | (2006.01) | |
| *H04S 7/00* | (2006.01) | |

(52) U.S. Cl.
CPC .............. *G06F 3/013* (2013.01); *G06F 3/016* (2013.01); *G06T 11/001* (2013.01); *G06T 13/20* (2013.01); *G06T 15/04* (2013.01); *G06T 15/08* (2013.01); *G06T 15/10* (2013.01); *G06T 15/50* (2013.01); *G06T 17/20* (2013.01); *G06T 19/006* (2013.01); *H04N 13/111* (2018.05); *H04N 13/239* (2018.05); *H04N 13/383* (2018.05); *H04R 5/02* (2013.01); *H04R 5/04* (2013.01); *H04S 7/303* (2013.01); *A63F 2300/8082* (2013.01); *G06F 2203/013* (2013.01); *H04R 2420/07* (2013.01); *H04S 2400/11* (2013.01)

(56) References Cited

U.S. PATENT DOCUMENTS

| | | | | |
|---|---|---|---|---|
| 2002/0158873 | A1* | 10/2002 | Williamson | G06T 17/00 345/427 |
| 2006/0139862 | A1* | 6/2006 | Wang | G06F 1/1641 361/679.3 |
| 2008/0113793 | A1* | 5/2008 | Miyamoto | G06F 3/04886 463/31 |
| 2010/0103075 | A1* | 4/2010 | Kalaboukis | A63F 13/53 345/8 |
| 2010/0201645 | A1* | 8/2010 | Asami | G06F 3/1438 715/810 |
| 2011/0143769 | A1* | 6/2011 | Jones | H04M 1/7246 455/566 |
| 2012/0142415 | A1* | 6/2012 | Lindsay | G06T 19/006 463/33 |
| 2013/0069940 | A1* | 3/2013 | Sun | G09B 19/003 345/419 |
| 2013/0286004 | A1 | 10/2013 | McCulloch et al. | |
| 2014/0002351 | A1* | 1/2014 | Nakayama | A63F 13/655 345/156 |
| 2014/0035736 | A1* | 2/2014 | Weddle | G06F 3/016 340/407.2 |
| 2014/0287806 | A1* | 9/2014 | Balachandreswaran | A63F 13/212 463/7 |
| 2016/0313912 | A1* | 10/2016 | Keam | G06F 3/04845 |
| 2018/0104574 | A1* | 4/2018 | Tager | A63F 13/20 |
| 2019/0005733 | A1* | 1/2019 | Wehner | G06F 3/017 |

OTHER PUBLICATIONS

"UKIPO Examination Report", Application No. GB2000300.0, dated Aug. 26, 2021 (4 pages).

* cited by examiner

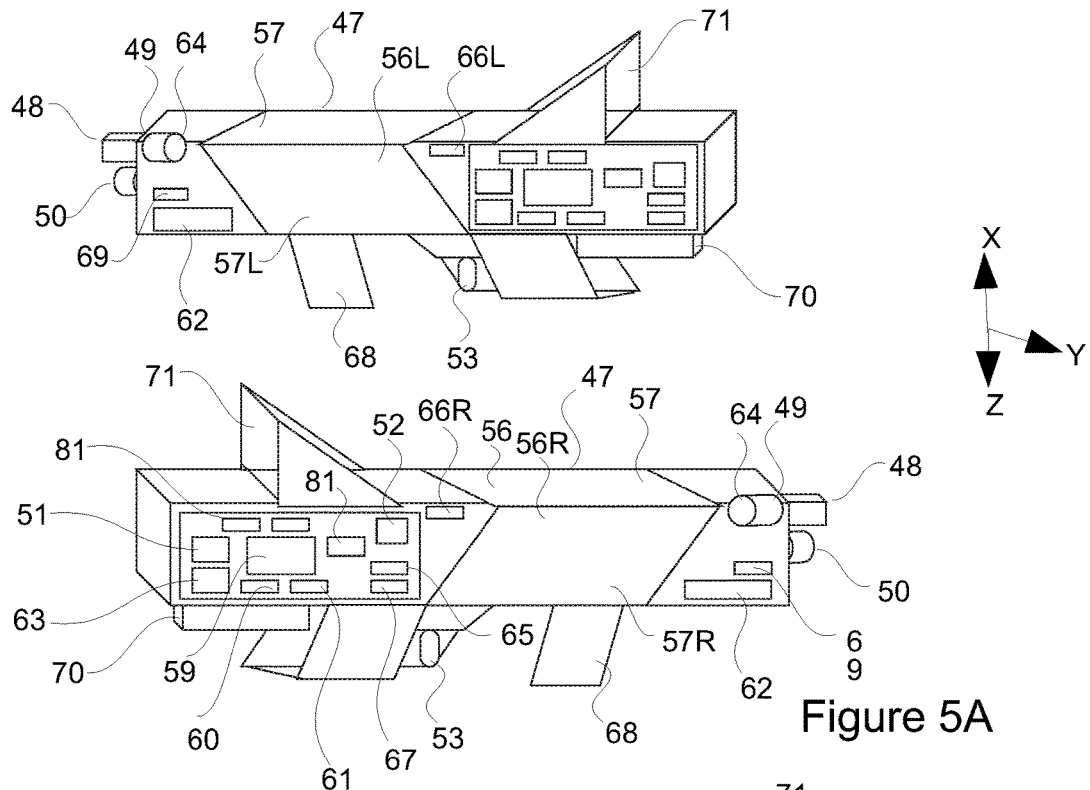
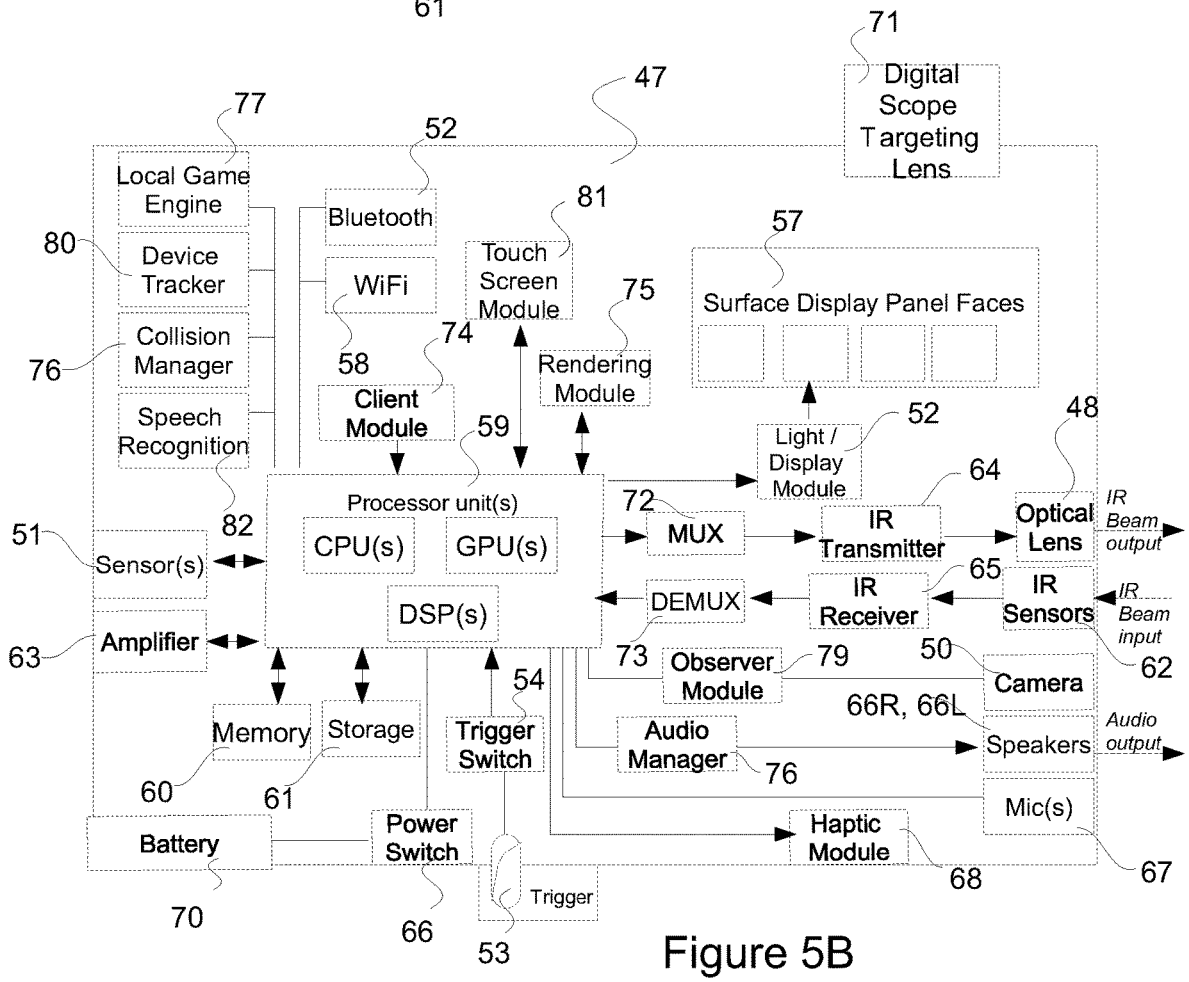
Figure 5A
Figure 5B

MIXED REALITY GAMING SYSTEM

BACKGROUND

In present 3D gaming systems including new virtual reality and augmented reality systems that consist of head wearable display systems, these systems are constrained to the presence of the game only being on a digital display screen.

Augmented reality ("AR") allows visually for game images and 3D holographic images to appear overlaid on real-world objects and environments through the user of miniature display screens and the use of spatial mapping techniques together with the display of two differing stereoscopic images or holographic images where the user perceives the image as having 3D form and being present in the real-world, however this is still an optical illusion as the game doesn't really exist in the real-world but exists only in a computational sense where the real-world surfaces are mapped to create virtual 3D models or a mesh from which virtual 3D holographic images are superimposed and displayed over real-world objects as a augmented reality experience. One major drawback therefore still with these systems is that nothing is tangible leaving the sense of sight and sound as the only means to interact in a game.

The present invention seeks to overcome these limitations in present gaming systems by providing a tangible and novel gaming experience in which game objects such as weapons, scenery, AI characters can be physical in their presence in the real-world and where users can physically interact with these gaming objects in which rendered images and textures that are displayed on the surfaces of these physical real world objects can be seen with or without the aid of a wearable head mounted augmented reality ("AR") display apparatus 1 or other forms of head mounted 3D display systems.

In addition, the invention embodies the use of laser tag systems with augmented reality ("AR") head mounted display (HMD) devices or 3D wearable head mounted display equivalent apparatus capable of displaying stereoscopic, holographic or hologram images in 3D as augmented virtual images over the users real-world view to enhance the real-world laser tag gaming experience to provide an immersive gaming experience.

The system makes use for example of different forms of IR apparatus as real-world game objects for projecting IR beams and IR signals such as an IR Laser Gun Apparatus 47 in which in the use of an Infrared beam from an LED 49/IR Transmitter 64 and the receiving of the IR light beam or detection of IR emissions/radiation on a corresponding IR sensor, may invoke during this process the rendering and display of augmented 3D virtual images, visually representing the projectile fire of the moving IR beams/Laser beams and the beam reaching its target for enhanced in game visual effect which can be seen by the user via the users wearable augmented reality ("AR") head mounted display apparatus 1 or via other supported display methodologies by the system. Here the system shall make use of stereoscopic techniques in generating slightly different versions of a 2D stereoscopic images of the laser fire that can be projected onto either eye such that the visual represented laser fire is perceived as having 3D structure by the user.

With the use of 3D models and mesh data of the real-world environment generated through spatial mapping and 3D mapping techniques, projected images maybe seamlessly overlaid with accuracy over real-world objects and surfaces in the user's field of view of a real-world environment in which the user is situated. This maybe used to display a visual effect of an IR beam or Laser beam projected from a user's handheld IR Laser Gun Apparatus 47 reaching a target or IR Sensor.

Using sensory inputs and location data from the handheld IR Laser Gun Apparatus 47 sensors 51 such as (x, y, z, P, R, Y), where (x, y, z) are the IR Laser Gun Apparatus 47 three dimensional Cartesian coordinates or vector positions and (P, R, Y) are the pitch, roll and yaw of the device in the real-world, the system can compute the projectile of the IR beam or Laser beam fire with a high degree of accuracy.

Other inputs from sensors such an accelerometer maybe used to formulate velocity in a computation of the weapons projectile which maybe variable with the degree in which the user pulls the trigger mechanism 53 of the IR Laser Gun Apparatus 47 or could be assumed where an IR Beam/Laser beam is assumed unaffected by gravity and travels at a velocity of 20 ms. Tilt and gyroscope sensors provide here the (P, R, Y). The GPS data may be used to formulate the (x, y, z) coordinates relative to the real-world and the virtual game environment.

It should be noted that the embodiments of the invention of the mixed reality and augmented game system presented herein is not limited to the use of IR apparatus in the form of an IR Laser Gun Apparatus 47 in which the embodiment of the presented invention covers many IR forms of IR apparatus as well as non-IR apparatus that maybe physical game objects which can be used as weapons in the real-world during game play, in which like the described IR Laser Gun Apparatus 47 the use of these apparatus provides direct inputs into the game play, game state in terms of hit scores and rendering of augmented virtual images.

It should be noted also that the rendered game images maybe seen as augmented on the real-world environment in use of wearable augmented reality ("AR") display apparatus 1 as well as physical present on real-world game objects in the laser tag gaming arena 98 that have rendering and display capabilities on their surfaces where rendered textures maybe seen by users without the aid of augmented reality ("AR") display apparatus 1 where the users may physically touch the rendered surfaces that can invoke changes on specific game objects in the textural images rendered similar to how touching the texture of real-world object can change its surface appearance when pressure is applied. Alternatively, inputs may be used in the game rendering over real-world objects using external 3D mapping and projection techniques through the use of an external projector 96 which can be seen also without the aid of any AR head-mounted display apparatus.

This provides a truly immersive and tangible gaming experience in which a substantial part of the game is not dependent on visual wearable aids to see the game renderings in the real-world but where the use of head mounted augmented reality ("AR") display apparatus 1 supplements the gaming experience in the real-world.

This also provides novel gaming experience in which the game environment, scenery, objects and AI characters exist in real life tangible forms in the laser tag gaming arena 98 that can be touched, interacted with and moved.

SUMMARY

According to the invention there is provided a game system, and related methods, according to the appended claims. Various different aspects of the invention are set out in the claims.

The invention, at least in some aspects, may be viewed as computationally maintaining the real-world and the virtual world in synchronisation.

Preferably, all real-world entities are represented by virtual world entities, in relation to maintaining the real and virtual worlds in synchronisation.

At least some aspects of the invention may be viewed as providing at least one display mechanism visible to a user, in which at least one real-world entity which is visible to a user with the naked eye, and which either has light projected onto it, or emits light, or the perception by the user of the real-world entity is augmented by way of virtual imagery provided in the user's field of view, where its visual state may change via either display mechanism according to changes in events of state of the real-world (space).

Real-world entities referred to in claim 1 may include one or more of the following which may be two-dimensional or three-dimensional in their physical and displayed visual form supported by the display mechanisms or virtual world (space) in which the game co-exists computationally in synchronization between both worlds:

User wearable clothing, such as user wearable suit or user wearable vest, for example.

Real-world objects which have a real and tangible presence, and are located within a real-world space, such as game combat weapon devices, (Game) scenery, or real-world user (as a real-world entity).

The invention may include one or more sensors which determine(s) at least one of positional, speed and acceleration characteristics of at least one real-world entity in the real-world space. This may form an input which allows the game state to be maintained.

Within this application reference is made to Infra Red emitters (such as may be incorporated into a game weapon) for use by users participating in the use of the invention. For the avoidance of doubt, more generally, a light beam emitter device, such as a low-light device, the emission from which is detectable by way of a detector, is also included within this disclosure.

Data may be conveyed between real-world entities by way of an encoded beam of light, such as an IR beam which incorporates binary data, which may be used to convey state and/or events (in response to detection of the beam), which may bring about a visual or haptic/tactile response. This may enable 'networkless' gaming, solely or principally relying on data (state/event) encoded within a light beam.

Also for the avoidance of doubt, reference to 'game' or 'mixed reality gaming' in this application includes role-play, combat training (for example for military purposes) and (immersive) scenarios, for example, or as (enhanced) laser lag.

Where in this document (in the description, claims and drawings), different ways of achieving substantially the same or similar end result or functionality, are listed, we include the interpretation of one, some or all of those. For example, where we say that a generic feature or a collective term comprises A, B, C and D, we include the meaning of at least one of those, and not necessarily all of them. Therefore, the different species may be viewed as providing a number of options.

In addition to the invention being described in broad terms, it may include any feature or step, or group of features or steps, which is/are shown in description and/or as shown in the drawings.

BRIEF DESCRIPTION OF FIGURES

The following figures serve to help better understand the subject matter, and how the embodiments of the invention may be carried out into effect in which the various methods, systems in which the invention is embodied shall now be described by way of example with reference to the following figures, in which:

FIG. 5A shows a physical handheld IR Laser Gun Apparatus 47, used in Laser tagging in which the device consists of a trigger mechanism 53, IR Transmitter 64, IR LED 49, IR Receiver 65, IR Sensor 62, display screens 57, sensors 51 and a form of computer among other parts;

FIG. 5B shows a block diagram of the core components of a handheld IR Laser Gun Apparatus 47;

DETAILED DESCRIPTION

Figure 1A:
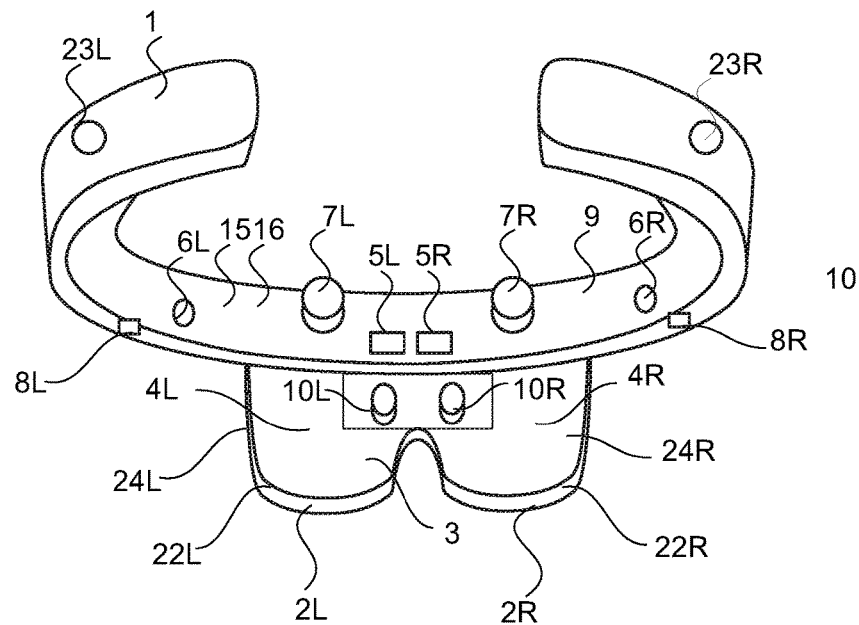
FIG. 1A shows a wearable augmented reality ("AR") head-mounted display apparatus 1.

An enhanced IR mixed reality and laser tag game system in accordance with one or more preferred embodiments of the present invention may include at least one of: real-world space which comprises physical real-world game objects, users, surfaces and artificial intelligence characters; virtual-world space which comprises virtual game objects, scenery, artificial intelligence and remote users; real-world game objects and users in which game scenes and 3D renderings of real-world game objects and user avatars are visible to the naked eye and touchable as physical objects that can be interacted with; and one or more displays of rendered virtual images of virtual game objects, game scenes, texture-maps, decal, lighting effects and remote users augmented over the real-word space of the game and objects or users in the real-world, which are capable of being made visible to naked eye by least one of displayed via the use of externally projected light and a real-world game object's surface display faces or are visible as augmented reality virtual images displayed via a user's head-mounted augmented-reality, display apparatus as a form of at least one of two 2D stereoscopic images, a holographic image and a hologram image. In such a system, a physical action by at least one of a user and a real-world artificial intelligence character in the real world, including the pulling of a real-world game object's trigger mechanism, is arranged to affect the state of the game in at least one of the real-world and virtual world; states of the users, game objects and game, and geometry in the real-world, is maintained computationally in which changes in real-world game objects, users, surfaces are tracked via at least one sensor or via generated mesh data through observations using at least one of an external camera and other type of tracking device; real-world game objects are physical objects in the user's real-world space for which their 3D renderings can be seen by the naked eye and these objects can be used, in which a real-world user or artificial intelligence physical actions using these objects serves as an input that can affect at least one of the state of game, other real game objects, virtual game objects, users, artificial intelligence characters and game scenes in at least one of the real-world and virtual world; real-world game objects, users and real-world artificial intelligence characters have paired virtual game objects, 3D models and mesh data which is maintained computationally used in rendering and mathematical operations of the game including collision detections, lighting effects and transformations; real-world game objects comprise a visible mesh, 3D model and texture-maps that are visible to the naked eye, where said objects are at least one of wearable, handled and part of the game scenery, where in the case of a wearable object a 3D rendered avatar is capable of being displayed over a user's body visible to the naked eye; virtual images, texture-maps, lighting effects and game renderings are capable of being displayed by at least one of: directly via a real-world game object surface display faces seen by the naked eye, via the use of external projectors using 3D projection mapping which also is capable of being seen by the naked eye and displayed via a user's augmented-reality display apparatus; the system provides for real-world fired IR beam or IR laser beams which have at least one of respective generated and rendered virtual game objects and line renderings or rays together with lighting effects in which the beam normally invisible to the human eye is made visible via at least one of a real-world game object surface display face seen by the naked eye, via the use of external projectors using 3D projection mapping which is capable of being seen by the naked eye and displayed via a user's augmented-reality display apparatus, in which a user is able to see a beam travelling in the users real-world space as a virtual image; rendering operations of real-world game objects, users, surfaces and real-world objects are supported by generation of virtual game objects, 3D models, mesh data and the use of a rendering module; the state of real-world game objects, artificial intelligence characters and users in the game real-world space is tracked via at least one of sensors, the use of spatial mapping and structural light scanning techniques; in parallel, the state of the virtual world and virtual game objects, including paired virtual game objects, is maintained computationally; transformations are arranged to be applied to paired virtual game objects of real-world users, and real-world game objects based on detected changes in state based on retrieved sensor data or mesh data; collisions between at least one of users and objects including the collision of at least one of an IR beam and an IR laser beam with at least one of a user and real world game object are capable of being pre-determinable based on retrieved sensor data and state information in which hits are capable of occurring on at least one of a real-world game object, user, surface and artificial intelligence character from a physical use of a real-world game object resulting in the emitting of at least one of an IR beam and an IR laser beam via at least one of an IR LED and an IR laser diode, where a hit is capable of being computed-based on at least one of the relative projectile and positions of the beam with another object derived from sensor data of the real-world game object that fired the beam and on the detection of the light or radiation emissions via an IR sensor which is capable of invoking a physical response in at least one of the real-world and the display of decal and diffuse lighting effects which are capable of being seen via the naked eye or other means; hits from at least one of an IR beam, IR laser beam and a virtual weapon is capable of affecting the state of real-world objects and users; hits from at least one of an IR beam, IR laser beam and a virtual weapon are capable of being seen by at least one of: on a real-world game object surface display panel faces, via the use of external projectors and 3D projection mapping techniques on at least one of a user, real-world game object, and object or surfaces that are capable of being seen by the naked eye; hits from an IR beam or IR Laser beam or a virtual weapon are capable of being seen via a user's augmented-reality display apparatus as at least one of a stereoscopic, hologram and holographic image; and/or decal and diffuse lighting effects are capable of being displayed at the determined point of collision.

Such a system may further include at least one of: at least one of a game server and a host, which maintains state between that of the real-world game objects and the virtual game objects as well as the state of user physical interactions with real-world game objects and that of the game's real-world space used in computational and rendering operations of the game and real world game objects; at least one client in the form of at least one real-world game object which is a physical tangible game object comprising a computer, which comprises a number of processing units, at least one sensor, at least one IR receiver, at least one IR sensor, a network interface and at least one of multiple surface display faces in the form of at least one of OLED, LCoS, LCD and a Graphene or Graphite flexible display, and in the form of at least one of triangles, polygons or quads that form a mesh and a solid 3D object in the user's real-world environment in which each real-world game object is configured to generate rendered texture-maps and overlay the generated texture-maps on the surface display panel face which form a fully rendered 3D game object which can be seen by the naked eye and physically interacted with in the users real-world environment; at least one client in the form of a wearable augmented reality head-mounted display apparatus configured to generate mesh data of a user's real-world space using external facing cameras and spatial mapping and to display augmented virtual images of rendered game scenes and virtual games objects including the virtual game objects and line renderings or rays of at least one moving IR beams and IR laser beam together with decal and diffuse lighting effects resulting from a hit detected by at least one of computationally, and via an IR sensor, over a user's real-world space and field of vision via a micro-display panel in the form of at least one of TOLED, LCoS or LCD, using generated mesh data where the displayed virtual image appears present in the user's real-world space and is a form of at least one of: two differing offset 2D stereoscopic images, a hologram and a holographic image; a network in which each client in the form of at least one of a head-mounted augmented reality display and a real-world game object is capable via their CPU, network interface and sensors of periodically every frame generating and transmitting state information and sensor data to the game server or host on their position, orientation, rotation and directional vector in the three dimensional space of the grid provided in the form of at least one of 3D cartesian coordinates values, pitch, roll and yaw values and a matrix together with other state information including at least one of I/O inputs resulting from a user actions invoking the emitting of an IR beam or IR laser beam in which the system is configured to use this state information in the computational and rendering operations of the game and the determination of a hit or collision of at least one an IR beam and IR laser beam; a grid that represents the physical 3D space and geometric structure of the game's real-world space and all objects and users within the three-dimensional space of the game, wherein the system is configured to generate surface data, mesh data, wireframes and 3D models of the users' real-world space containing geometric, volumetric, depth data together with the world coordinates and model coordinates of the real-world space and its objects through the use of at least one of spatial mapping techniques and structural light scanning techniques used to support the game computational and rendering operations; at least two human users equipped with at least one real-world game object in the form of at least one of a handheld IR laser gun apparatus, IR shield apparatus and a IR laser proximity mine apparatus configured: to emit light in the form of at least one of an IR beam and IR laser beam via a least one of an IR LED diode and an IR laser diode and lens tube onto at least one of an IR Receiver and fibre optic sensors of another real-world game object to score hits or tags, to generate and transmit state information via the network to at least one of the game server and host or other clients on their three dimensional coordinates, elevation, heading, rotation and orientation in the real-world among other state and sensor data retrieved from the at least one apparatus sensors, together with I/O input events and the use of boolean flags indicating the emitting of light from at least one of an IR beam and an IR laser beam used retrieved at the time of the trigger mechanism being activated, from the real-world game objects sensors in the computation of collisions, and rendering operations of the at least one IR beam and IR laser beams, and to display rendered texture-maps in the form of 2D images together with decal and lighting effects resulting from a detection of a hit of at least one of an IR beam the IR laser beam either computationally based on at least one of state information and via the detection of light emissions via the apparatus IR sensors, where texture maps are displayed over the objects surface display panel faces to form an at least partially rendered 3D image of the real world game object visible by the naked eye to users in the real-world environment and space; and/or two or more human users each equipped with at least one of a wearable IR mixed reality vest and an IR mixed reality suit in the form of a real-world game object that has: multiple surface display panel faces in the form of at least one of OLED, LCoS, LCD and graphene/graphite and in the form of at least one of triangles, polygons or quads which form a 3D mesh in which through a process of overlaying texture maps and illuminating the individual pixels this forms a fully rendered 3D image of an avatar over at least part of the users' bodies together with at least one of the users name, codename, ammo, health, visual decal and lighting effects of detected hits/collisions from at least one of an IR beam and IR laser beam on their body through the illuminating of pixels on the surface display panel faces of the users' at least one of IR Mixed Reality Vest and IR mixed reality suit, a number of IR receivers and sensors for hit detection, a number of sensors used for generating state information on the user's body position, directional vector and orientation in the 3D space of the real-world environment and that of the grid, and a number of haptic modules in which each haptic module is configured to provide physical directionally feedback to a human user of a hit from an at least one of an IR and laser beam according to its relative to the computationally formulated projectile and point of intersection of at least one of a collision and a hit from at least one of an IR beam and an IR laser beam projectile by the system.

Such a system may further include a number of clients in the form of real-world game object apparatus that exist in both physical form in the users' and the game's real world space, including at least one of: a computer that comprises a number of processing unit(s) in the form of at least one CPU, GPU, memory in the form of non-persistent RAM/DDRAM, SDRAM and persistent storage memory configured to support the local rendering and computational operations of the game and system together with the storing and processing of data such as sensor data, and handling of inputs and events used by the objects local software modules to perform their functions; a number of surface display faces in the form of at least one of LCoS, OLED, LCDs and a flexible form of graphene/graphite display each representative of at least one triangle, polygon and quad, defined by a set of points in 3D space represented as cartesian coordinates in the form of x,y,z values which form a tangible and visible 3D mesh in the real-world over the object consisting of at least some of triangles, polygons, quads, edges, surfaces and faces; one or more light display modules configured to illuminate pixels on the surface display faces to display texture maps and form a 3D image of the real-world game object over its surfaces based on the supplied pixel coordinates and colour values in the form of at least one of an RGB array and in-memory bitmap loaded into the frame buffer where the system is configurable to display texture-maps in the form of 2D images over each physical surface display faces, based on their respective generated RGB array or in-memory bitmap pixel coordinates and colour values which invokes at least one of the illuminating, exciting and activating of the display to form a 3D image of the real-world game object which is visible by the naked eye in the users real-world environment; a number of sensors comprising at least one of multi-axis accelerometer, gyroscope, tilt sensor, motion sensor, a GPS Tracker, a solid state compass, an electromagnetic compass/digital compass and a magnetic compass, magnetometer, inclinometer, pedometer, speedometer, altimeter, a MEMS barometer and a dead reckoning module configured to: determine the real world game object apparatus world coordinates/position, rotation, directional vector, elevation and orientation in the real-world space, determine the velocity and acceleration of the real world game object apparatus, and generate sensor data and state information on changes in movements of the real-world game object, including state information in the form of three-dimensional world coordinates and/or a vector position expressed as values together with the elevation, rotation, directional vector and orientation expressed as a pitch, roll and yaw value of the apparatus, where these values are provided in the form of matrixes via the network to the game server and/or host and stored locally on the apparatus used by the system in the computational and rendering operation of the game including but not limited to rendering, transformations and lighting operations as well as collision detections; an optional trigger mechanism and IR transmitter, optical lens tube, optical lens piece and LED that is the form of at least one of an IR LED or IR laser diode configurable to emit light in the form of an IR beam or IR laser beam onto another user and/or real-world game objects IR sensor to score a hit or tag upon the trigger mechanism being pulled or the apparatus being activated by other means by a real-world user and/or artificial intelligence character; one or more IR receivers, sensors in the form of photodiodes or phototransistors configured to detect hits and tags resulting from detection of light emitted in the form of at least one of an IR beam and an IR Laser beam from another real-world game object; a number of speakers configured to output 3D positional audio effects capable of outputting 3D perceptual sound effects representative of an IR beam or IR laser beam passing or hitting the apparatus; a microphone for activating the firing of an IR beam or IR laser beam via voice commands based on speech recognition; a number of ASIC sensor(s) that maybe attached to surface of each surface display panel/screen face via a second screen portion as a thin overlay overlaid over each surface display panel/screen face, where multi-touch capability is supported through capacitive, resistive, optical or wave technologies where touch inputs maybe used to fire an IR beam or IR laser beam or change the rendering state of a real-world game object; a battery to power the device and its physical surface display screen/panel faces; a Bluetooth and/or Wifi module for receiving and transmitting data including state information, sensor data, images, video and other forms of data including mesh data on the grid and other objects used for example in the rendering of lighting effects over a real-world game objects surfaces and in the determination computationally of collisions resulting in the display of decal and diffuse lighting effects over the real-word game objects surfaces; a number of software modules that includes at least one of a rendering module, games engine, collision manager, client module, touchscreen module, speech recognition module, observer module and audio manager that support the game rendering and computational operations as well as the handling, processing, transmitting and receiving of data which includes sensor data and mesh data used in the operation's and methods detailed in the embodiments of this invention; and/or a paired virtual game object which is maintained computationally by the rendering module and/or games engine in sync with a real-world game objects state and movements in which transformations are applied to the paired virtual game object resulting from physical changes to its paired real-world game objects position, orientation, rotation, elevation and directional vector in the three-dimensional space of the real-world detected via the apparatus sensor(s), where paired virtual game objects are used to support the rendering of texture-maps, decal and lighting effects over a real-world game objects surface display panel/screen faces as well in the computation of collisions of another object real or virtual with a real-world game object such as an IR beam or IR laser beams virtual-game object and/or line rendering, among other operations where the paired virtual game object itself is not displayed but is used to support these operations.

Such a system may further include two or more human users equipped with a client in the form of a wearable head-mounted augmented reality display apparatus and a wearable computer on a user's head comprising at least one of: a number of processing units including CPU(s), GPU(s) and DSP(s); storage; memory configured to support the rendering and game computational operation's together with the storing and processing of data including sensor data, mesh data together with video, voice and the handling of inputs; a display apparatus in the form of a transparent micro-display panel coupled with two optical lenses that maybe magnifying or collimating or a curved mirror lenses which supports the users left and right eye view into the real-world environment in which the display forms the users field of view where the display is at least one of a TOLED, LCD or LCOS display that provides a high level of transparency enabling the user to see-through the display to see the real-world simultaneously with that of the display of virtual images of the virtual game objects and scenery that are augmented over the users real-world view including the display rendered virtual images, animations or video of a moving IR beam or IR laser beam associated line renderings, ray and/or virtual game objects and/or game scenes that are superimposed or augmented on to the users real-world view of the three-dimensional space of the game, in which the virtual images capable of being in the form of holographic images, holograms or two 2D stereoscopic images; two light display modules that control via the display circuitry and drivers the display, and configured to emit light onto the left and right portions of the said micro-display panel in accordance with the rendered augmented virtual imagery provided pixel coordinates and colour values by illuminating, activating, exciting or projecting light via an array of LEDs dependent on the display being a form of at least one of TOLED, LCD and LCOS; one or more waveguides configured to direct the emitted light via the apparatus lens and micro-display panels and outward onto the users left and right eye, where in the case of a holographic image the waveguides are configurable to direct initially the light via a diffraction grating or holographic grating plate where the image is diffracted before exiting towards the user's eyes at a determinable angle of incidence; a number of sensor(s) comprising at least one of: a brightness sensor, 3MP CMOS image sensor and depth sensor, and an electromagnetic compass, solid state compass, magnetic compass, GPS tracker, accelerometers, gyroscopes, magnetometer, tilt sensors, inclinometer, pedometer, speedometer, altimeter, MEMS barometer, motion sensor sensor(s) configured to track the users head position, orientation and directional vector used by the system in the computational and rendering operations including the applying of transformations to virtual game objects and line renderings that represent a moving IR beam or IR laser beam in order to maintain the correct visual perspective of size, scale and orientation of augmented images overlaid over the users FOV of real-world environment via the micro-display panel; at least one IR receivers/sensors for detecting hits from another real-world game object in the form of light emissions or radiation from at least one of an IR beam or IR laser beam; two inward facing cameras used to track the focal point and directional gaze of a user's eyes using recorded images and video of the users eyes and spatial mapping techniques to reconstruct the human eye position, focal point/directional gaze and orientation, used in the computational and rendering operations including the applying of transformations to virtual game objects and line renderings that represent a moving IR beam or IR laser beam as well as other forms of virtual game objects and general game scenes in order to maintain the correct visual perspective, among other purposes by the system; two externally facing cameras which are in the form of at least one of CCD, computer vision, time-of-flight, depth aware, or stereo camera(s) used to capture imagery and video of the user's real-world space to support the generating of 3D models, wireframes, virtual game objects and mesh data of the user's real-world space, surfaces, objects through spatial mapping techniques by an observer module together with depth information using at least one of computer vision, time-of-flight and computer stereo vision techniques; two external speaker(s) configured to directionally output 3D generated perceptual sound effects; a microphone, configured to support voice communication between users over a network and to detect voice commands as a form of input for the game; a Wifi and Bluetooth module configured to support the transmitting and receiving of state information and other forms of data via the network which includes at least one of sensor data, mesh data, audio, images and video; an encoder and decoder configurable to support the receiving of data, images, audio and video over the network; and a number of software modules that support the game computation, mathematical and local rendering operations including a rendering module, games engine, game application, collision manager, location tracking module, head and motion tracking module, eye tracking module, gesture recognition module, speech recognition module, audio manager, observer module and a client module in which the client module supports the transmitting, receiving and processing of state information, inputs, events, and sensor data used in the game's operations.

Such a system may further include one or more digital external projectors used to display augmented reality game scenes, sequences/animations, virtual game objects, line renderings, rays, lighting effects and decal effects seen by the naked eye without the visual aid of a wearable augmented reality head-mounted display apparatus. Such projectors include at least one of: an external projector in the form of a digital projector capable of supporting 2200 lumens or greater; a display projection module used by the game server or host to support the projection of virtual images onto real-world objects, surfaces and users through the use of at least one of 3D projection mapping, video mapping and spatial mapping techniques which is configurable to 1) emit light for the projected rendered game scenes, and virtual game objects including the virtual game objects and line renderings or rays and lighting effects of a moving IR beam or IR laser beam together decal and diffuse lighting effects resulting from the hit or collision of an IR beam or IR laser beam with a real-world object or user or surface, in which the light from the rendered virtual images or video is projected onto real world objects, users, and surfaces during the game using 3D mapping techniques based on the generated mesh and wireframe data of the real-world environment; and through the use of at least one of projection mapping techniques, video mapping and spatial augmented reality: map the corners of the image or video to the designated surfaces of a real-world object, user or surface, and project rendered virtual images back onto an original real-world object, surface, space or user based on the object's original Cartesian coordinates in three dimensional spaces and its orientation through the illuminating or activating of the external projector. The determination of the position and display of the rendered image or video is capable of being determinable by the use of three dimensional coordinates and other volumetric and vector variables provided by an observer module as part of the spatial mapping data that is provided in the form of by at least one of a mesh, a 3D model and through the translation of cloud of points and/or mesh data into vertices/model coordinates, generated through structural light scanning techniques via the use of a laser planner and/or spatial light modulators that are used in conjunction with the digital external projectors, and one or more of the external cameras.

FIG. 1A shows an example of a wearable head-mounted augmented reality ("AR") display apparatus 1 capable of displaying holographic images, holograms and stereoscopic images in the form of virtual images that are superimposed or augmented on to real-world objects and surfaces as seen by the user through the transparent micro display 3 and optical lens pieces 4R, 4L. These virtual images maybe 2D, 3D or 4D in which the 4D element provides the viewer perspective into the virtual world of the laser tag game.

The wearable head-mounted augmented reality ("AR") display apparatus 1 consists of two display screen portions 2R, 2L, a micro display 3, two optical lens pieces for the right and left eye view 4R, 4L, two light display modules 5L, 5R, two waveguides 22L, 22R, two speaker(s) 6L, 6R, two camera(s) 7R, 7L that are forward facing in line with the user's line of sight, two inward facing camera(s) 10R, 10L, two microphones 8L, 8R and a series of sensors 9.

The users augmented reality ("AR") display apparatus 1, micro display 3 is formed of two optical display portions 2R, 2L, two optical waveguides 22L, 22R, two light display modules 5L, 5R, two collimating lens types 4L, 4R, two or more diffraction gratings or suitable holographic gratings 24R, 24L and an array of light emitting diodes (LEDs) that may be in the form of a transparent organic display such as an TOLED display type.

A variety of display types may be used for the micro display 3 such as liquid crystal displays (LCD) which are transmissive or an array of LED's in a matrix form in which these may be an organic form of display such as the use of Transparent Organic Light-Emitting Diode (TOLED) displays. Alternatively, other suitable organic or non-organic transparent display such as liquid crystal on silicon (LCOS) displays maybe used as a micro display.

The user's perspective field of view (FOV) into the real-world and that of the games virtual world is provided through their augmented reality ("AR") display apparatus 1, in which the micro display 3 and optical lenses 4R, 4L provide a high level of transparency enabling the user to see-through the display to see the real-world simultaneously with that of the display of virtual images of the laser tag game objects that are augmented over the user's real-world view.

The micro display 3 supports the displaying of the game augmented reality virtual images through the left and right display screen portions 2R, 2L and the respective optical lens pieces 4R, 4 L of the wearable augmented reality ("AR") display apparatus 1, allowing differing stereoscopic images or holographic images or holograms to be displayed in front of the users left and right eye respectively.

Virtual game objects there corresponding virtual images maybe rendered and displayed on the optical display lens 4R, 4L as 2D stereoscopic images, holographic images or holograms or as 3D images within a few centimeters of the user's eyes and overlaid onto real world objects, surroundings and surfaces using spatial mapping generated mesh data and 3D models to create an augmented reality ("AR") or mixed reality experience.

Virtual game objects may also be rendered and displayed as virtual image in a 4D perspective in which the virtual camera provides the users view into the virtual world of the game which represents the fourth dimension element of the image construction.

The optical lens pieces 4R, 4L of the wearable augmented reality ("AR") display apparatus 1 may be a form of a collimating lens type or a curved mirror lens type. This allows the controlling of the field of view and for a process of collimating light to be used in the projection of 3D holographic images, holograms or 2D stereoscopic images as virtual images over the user's real-world view.

The light display modules 5R, 5L control via the display circuitry and drivers the display of pixels which form virtual images of the game objects in which using pixel coordinates of the source image the light display modules 5R, 5L activates the illumination of individual pixels on micro display 3 display portions 2R, 2L.

In the case of the micro display 3 being a form of organic display and the virtual image being a holographic image or hologram form, an LED array shall then project the light from the original source image onto the collimating lenses 4R, 4L from which the image light is collimated and passed to the respective left and right side waveguides 22L, 22R. The image light in the case of a holographic image is then guided through a process of applying diffraction and TIR onto a diffraction grating.

The image light then exits back via the optical waveguides as plurality of beams onto the users left and right eye lens and pupil from which the users eye lens then projects the light beams of the diffracted 3D holographic image or virtual image on to the retina through process of light reflected onto the human eye. The light is then passed down the optical nerve of the users to their brain which then converts the light into an image that has 3D form, where through the transparent display of the user's micro display 3, the 3D holographic image or hologram appears overlaid on real world environment view as an augmented virtual image in which the formed image is a substantially the same as the original input source image.

Furthermore, the 3D holographic image appears to have depth and volume in the real-world where up to six depth cues may be applied in which for example perspective projection may be simulated where closer objects appear larger or further away objects appear smaller. The image may also be occlusive in which the 3D holographic image or hologram appears visible in the user's real-world view as augmented, but in which it may be hidden in parts from view by real-world objects that are positionally in three dimensional space in front of the virtual game object or vice versa providing yet another depth cue.

The augmented reality ("AR") display apparatus 1 micro display 3 also comprises of a stereoscopic compatible display which maybe in the form of two small transparent liquid crystal displays ("LCD's"), transparent organic light emitting displays ("TOLED") displays or Liquid Crystal on Silicon ("LCOS") 2R, 2L for viewing the real-world and augmented virtual images. The displays 2R, 2L may feature magnifying lenses or collimating lens 4R, 4L, as two separate display surfaces or a single display surface in which tiled areas are arranged into two display portions, one for each eye representing the users left and right view into the real-world and that of the virtual world. This allows separate data stream sources of differing 2D stereoscopic images or video to be displayed in front of each of the user's eye's respectively to achieve the display of a virtual image which appears to the user as a 3D formed image that is overlaid on their real-world view thus creating an augmented reality ("AR") or a mixed reality experience.

In the same process as described previously the collimating lens 4R, 4L and waveguides 22L, 22R are used to collimate and direct the light resulting from the differing virtual images into a plurality of light beams, which form a virtual version of each of the differing 2D stereoscopic images. The virtual images are collimated as a beam of light through a process of making the light bands parallel to each other with the use of the collimating lens types prior to exiting via the waveguides 22L, 22R onto the user's eye lens and pupils. The user's eyes then takes in light and translates the light into to images that the brain can understand, in which a 3D image is formed from the two differing 2D stereoscopic images via the process of Stereoscopy also referred to as stereoscopics.

In this process two differing and slightly offset 2D stereoscopic images of the virtual image are presented to the left and right eye of the user via the micro display 3 which are combined in the brain by the user giving the perception of the virtual image having 3D form and depth.

A separate video source of data stream of images may be used for the display and the projection of the differing offset 2D stereoscopic virtual images of the game objects in either portion of the display 2R, 2L, in front of either eye to achieve a stereoscopic effect.

The augmented reality ("AR") display apparatus 1 micro display 3 also comprises of a holographic and hologram compatible display which maybe in the form of two small transparent liquid crystal displays ("LCD's"), transparent organic light emitting displays ("TOLED") displays or Liquid Crystal on Silicon ("LCOS") 2R, 2L for viewing the real-world and augmented virtual images.

The display portions 2R, 2L and/or optical lens components may also be a form of a diffraction grating or holographic grating, in which the diffracted waves are determined by the grating spacing and the wavelength of the light in which the ray of light behaves according to laws of reflection and refraction as with a mirror or curved lens.

Here the groove period may be ordered on a wavelength, such that the spectral range is covered by a grating and the groove spacing is aligned as required to provide holographic gratings where the light modules 5L, 5R shall guide the beam or beams of lights onto the grating via the collimating lens 4R, 4L and waveguides 22L, 22R which then directs the beams according to the spacing of grating and wavelength of the light before exiting towards the user's eye lens. The holographic grating may have a sinusoidal groove profile.

The optical components of the users augmented reality ("AR") display apparatus 1 may also be provided in the form of a hologram plate where the surfaces of plate in the form of the optical display lens 4R, 4L are illuminated identically in position to that of the referenced original 3D holographic rendered image in which the light beam is guided by the light modules 5L, 5R according to the reflection levels and the exact same position of light relative to originally generated holographic image.

As depicted in FIG. 1A the augmented reality ("AR") display apparatus 1 may comprise of one or more light display modules 5R, 5L.

These modules control the display of light resulting from the rendered images or video in which the resulting pixels of the separate two 2D stereoscopic, holographic or hologram images or video frames are then illuminated respectively on each of the two display screen portions 2R, 2L of the micro display 3 to form a virtual image that has 3D form to the user's brain, which in the case of the use of 2D Stereoscopic images is achieved through process of stereoscopy and the stereoscopic effect.

These virtual images are augmented over the user's real-world view through the use of spatial mapping generated mesh data and 3D models of real-world objects and surfaces captured from the users real-world view using users augmented reality ("AR") display apparatus 1 camera(s) 7L, 7R and the sensor (s) 9 which provide volumetric, depth and geometric data on the real-world surfaces and objects from the users FOV.

The micro display 3 is driven by circuitry where the display may be connected directly to the users augmented reality ("AR") display apparatus 1 PCB through an internal display port ("iDP") where the display maybe soldered directly to the PCB or may be connected via another form of standard based DisplayPort and digital display interfaces such as an embedded display port ("eDP"), Slim port, HDMI, USB, MIPI DSI or a DVI link.

Alternatively, the micro display 3 may be connected via a DisplayID with support for tiled display topologies that enable the support and control of multiple display locations that may be used for example in the control and display of 2D stereoscopic images or video frames in either left or right side display screen portions 2R, 2L of the micro display 3 to form a virtual image that has 3D form and which is augmented over the users real-world view.

Figure 3:
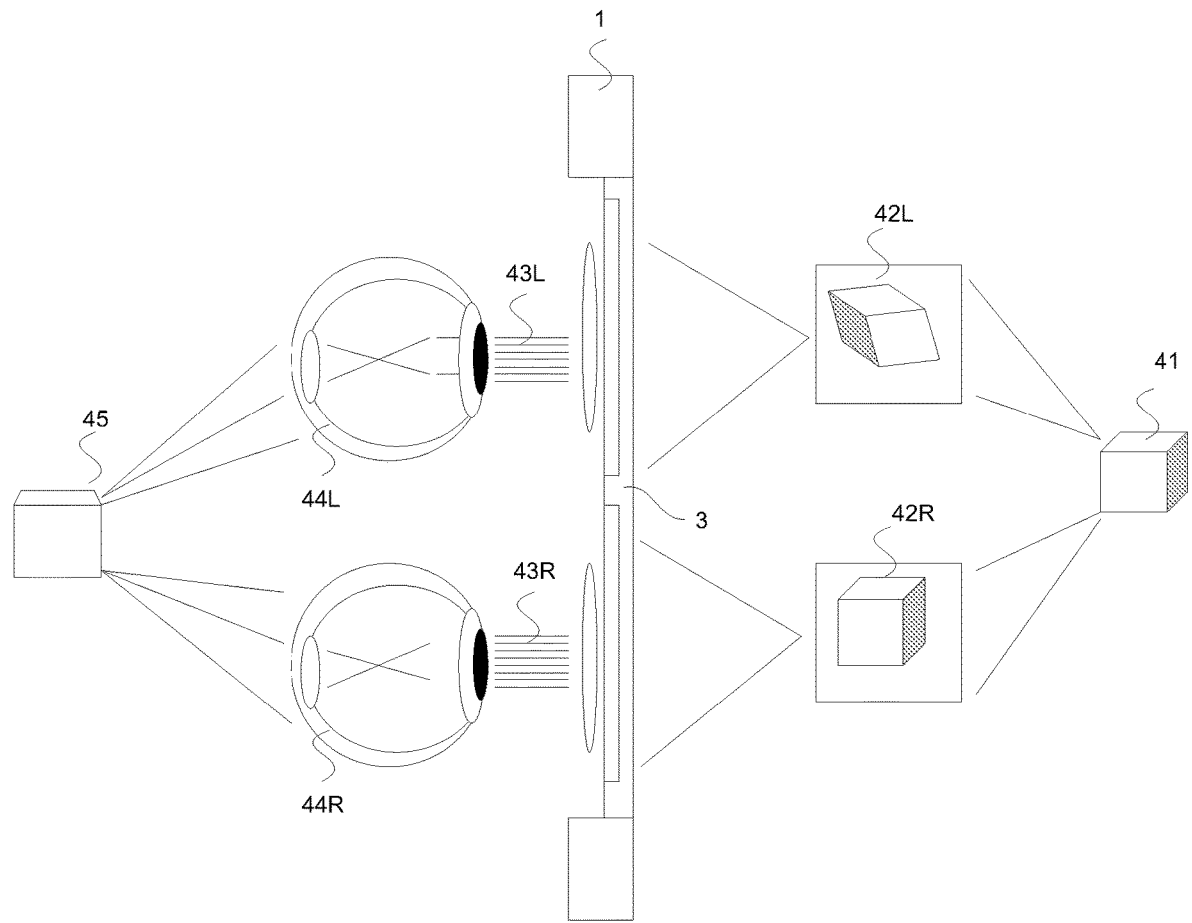
FIG. 3 shows a method of rendering and displaying virtual images on a wearable head-mounted augmented reality ("AR") display apparatus 1, in which two differing stereoscopic images providing the left and right eye view are presented to either eye.

In this example the rendering module 27 shall invoke the rendering of each pixel via the display drivers 27 and the light display modules 5R, 5L which activates the illumination of individual pixels of the display on the respective screen portions 2R, 2L to generate a virtual image using two differing 2D stereoscopic images in which the users brain perceives as having 3D form as depicted by way of example in FIG. 3. This may use tiled display topologies to control the display of individual pixels for the two differing 2D stereoscopic images on the respective portion of the users display screen portions 2R, 2L and micro display 3.

Each pixel of a respective rendered image relating to a virtual game object is mapped to a particular location on the interior surface of a corresponding display screen components 2L, 2R and optical lens 4L, 4R, such that light emitted from each pixel will be reflected toward the eye of the user from that particular location on the interior surface of the corresponding lenses 4L, 4R via the waveguides 22L, 22R.

Here each pixel in the right eye optical components 2R of the users augmented reality ("AR") head-mounted display apparatus 1 is mapped to a particular location on the interior surface of the right eye optical lens 4R using pixel addressable coordinates.

The two light display modules 5R, 5L are housed in the central portion of augmented reality ("AR") display apparatus 1 as depicted in FIG. 1A, where light is guided through is exited through optical components 2L, 2R, lenses 4L, 4R and waveguides 22L, 22R onto the corresponding left and right eye retina of the user in which light formed for each pixel is passed to the retina of the user's eyes. The users left and right eye then takes in light and translates this to images that the brain can understand which in the case of the images being 2D stereoscopic, through the described process of stereoscopy the users brain then perceives the virtual image as having 3D form and depth.

The optical components 2L, 2R of the micro display 3, together with the collimating or magnifying lenses 4R, 4L and two light display modules 5R, 5L and waveguides 22L, 22R form the core optical component parts of the display apparatus of the users wearable augmented reality ("AR") head-mounted display apparatus 1.

The optical components 2L, 2R support the control and display mechanism of the differing 2D stereoscopic images and 3D holographic images in the correct portion of the display using the waveguides controllers 22L, 22R together with the light display modules 5R and 5L in the display of virtual images during a game.

The system may convert 3D rendered game objects generated by the rendering module 27 into two separate 2D stereoscopic video frames or images sources to provide two separate differing and slightly offset 2D stereoscopic images as an output of the rendering pipeline process before the resulting pixels are illuminated on the respective left or right side portion 2R, 2L of the micro display 3.

In this way the system shall provide two slightly different versions of 2D images which can be projected on to either eye through the use of one or two Light display modules 5R, 5L to provide the video frames or 2D images in a stereoscopic image form in which the user's brain perceives this in having a 3D form.

During this process the differing video frames or images maybe supplied in the form of 2D stereoscopic images or video frames by the rendering model 24 where the original generated 3D image is converted into a 2D stereoscopic image using rendering techniques such as rasterisation, ray casting or ray tracing in which the system may use a form of graphics card, graphics processor units ("GPU's") or specialist hardware processors in the use of these rendering methods. The use of rasterization algorithms or the other described rendering techniques essentially converts the 3D image into a suitable 2D image for display on the users micro display 3, by converting 3D models into 2D planes.

The 2D stereoscopic images may be provided as a video form in which two video sources are provided one for the left portion of the display 2L and one for the right portion of the display 2R showing images that have slightly different perspectives of the view of a moving image from which the playback of successive video frames when the images are combined by the user's brain creates a moving image that has 3D form.

Similarly, 2D stereoscopic may be provided as raw images in which two images providing slightly different perspectives are provided one for the left portion of the display 2L and one for the right portion of the display 2R which if provided at a suitable frame rate of 60 frames this shall create the same stereoscopic effect as two separate video feeds, where the images are combined by the user's brain creates a moving image that has 3D form. Both techniques maybe used in the display of the game rendered sequences and in the realtime renderings of augmented virtual game objects as the user moves around. This may be applied also to the display virtual images that are in the form of holographic or hologram images in which moving images may be provided successfully during the display of a rendered game sequence.

The users augmented reality ("AR") head-mounted display apparatus 1 illustrated in FIG. 1A is capable of displaying 3D virtual images and models which are flattened or converted to 2D stereoscopic images, 3D and 2D holographic images and video, 3D and 2D hologram images and video, 3D stereoscopic video that maybe CGI quality, 3D stereoscopic images and virtual 2D virtual displays such as a personal computer operating system, application, menus etc. that the user can interact with through hand gestures and/or voice commands using the device tracking sensors 9, one or more camera(s) 7L,7R, and one or more microphones 8L, 8R for voice control inputs.

The camera(s) 7R, 7L as shown in FIG. 1A, are mounted on the front of the users augmented reality ("AR") display apparatus 1, above the user's right eye and left eye respectively, where through a combination of the left and right side cameras the system is operable of capturing an approximate field of view of the users real-world view from their left and right eye.

The camera(s) 7R, 7L are able in this way to capture slightly differing images from differing perspectives of the approximate view from the users left and right eye, which may be used capture two differing stereoscopic moving video or images of real-world objects and the surroundings environmental as the user moves around their real-world environment. These differing images may be used in the rendering pipeline process and the generating 3D models and two differing 2D stereographic images of virtual game objects that are augmented over the users view of the real-world, where through combining the two video or image sources the system is able to generate a mesh and 3D model data of the real-world environment as the user moves around from the two differing stereoscopic images or video frames. Using the generated mesh and 3D model data, virtual game objects may be rendered over real-world objects and surrounding surfaces to provide a augmented reality and mixed reality gaming experience during a laser tag game.

This may also be used to form Cloud of Points (CoP) Holograms which from which a 3D model of a real-world object is formed out of triangles or polygons and a number of cloud points which are similar to vertices or model coordinates expressed as points on the three dimensional planes.

The system maybe based on calculations of the assumed distance of the user's eyes relative to the left and right front mounted camera(s) 7R, 7L make adjustments in the formed mesh and 3D model data to more accurately compute 3D models and mesh data representatively of the user's real field of view from their left and right eye.

Here the video and images captured by the user camera(s) 7L, 7R, shall be used by the observe component 25 to generate surface data, mesh data, 3D models and wireframes containing depth and volumetric information on real-world objects and surrounding surfaces as seen in the user's field of view from their augmented reality ("AR") display apparatus 1. The observer component 25 shall use techniques such as spatial mapping in this process for generating surface data, mesh data, mesh filter, 3D models and wireframes of the real-world objects and surrounding surfaces used by the rendering module 27, in the rendering of augmented virtual images.

Mounted within the users augmented reality ("AR") display apparatus 1 are also sensors 9 that shall be used in this process in conjunction with the camera(s) 7L, 7R as well as other purposes such as tracking the head movements of the user relative to real-world objects in which changes to the user's real-world view are recorded and updates are made to the real-world surface data, mesh data, wireframes and 3D models of the real-world by the observer component 25 as new surfaces and objects are identified as the user moves around the real-world.

Changes in the user's position and orientation maybe tracked simultaneously with that of the user's eye position and orientation which use the inward facing camera(s) 10R, 10L in this process, in which update to game objects through a process of transformation may be applied to ensure the virtual image is always displayed relative to the user's gaze, head position and orientation etc.

The camera(s) 7L, 7R and sensor(s) 9 may include a 3MP CMOS image sensor, electromagnetic sensor 17, solid state compass 13, GPS tracker 12 and a brightness sensor.

The sensor(s) 9 also include a gyroscope, accelerometer, magnetometer, tilt sensors and depth sensors which are used by the system to track the user's directional movements, focal point, head orientation and head movements so as the system can make adjustments accordingly to the rendering of the augmented displayed surface renderings and virtual game objects through a process of transformation and matrix multiplication as part of the games mathematical operations.

This process uses the combined data values from the user's head position three dimensional cartesian coordinates expressed as x, y, z together with data values of the user's head orientation expressed as pitch, roll and yaw (p, r, y) on second axes, in which the system shall perform mathematical and computation operations during the rendering process of the game virtual objects to rotate or scale a virtual game object relative to the user's head position and orientation.

Here the rendering module 27 uses the users head positional and orientation data together with the 3D volumetric data of the surface data, 3D models and mesh data of the real-world provided by the observer component 25 in addition to a mesh filter to re-render and display the 3D holographic images of the virtual game objects accordingly via the users augmented reality ("AR") display apparatus 1 based on the user's movements.

This allows the user to move freely in six degrees of freedom in the real-world and in the virtual world of the game. During this process transformations are applied to the augmented displayed surface renderings and virtual game objects, using matrix multiplication or quaternion math's.

Figure 2:
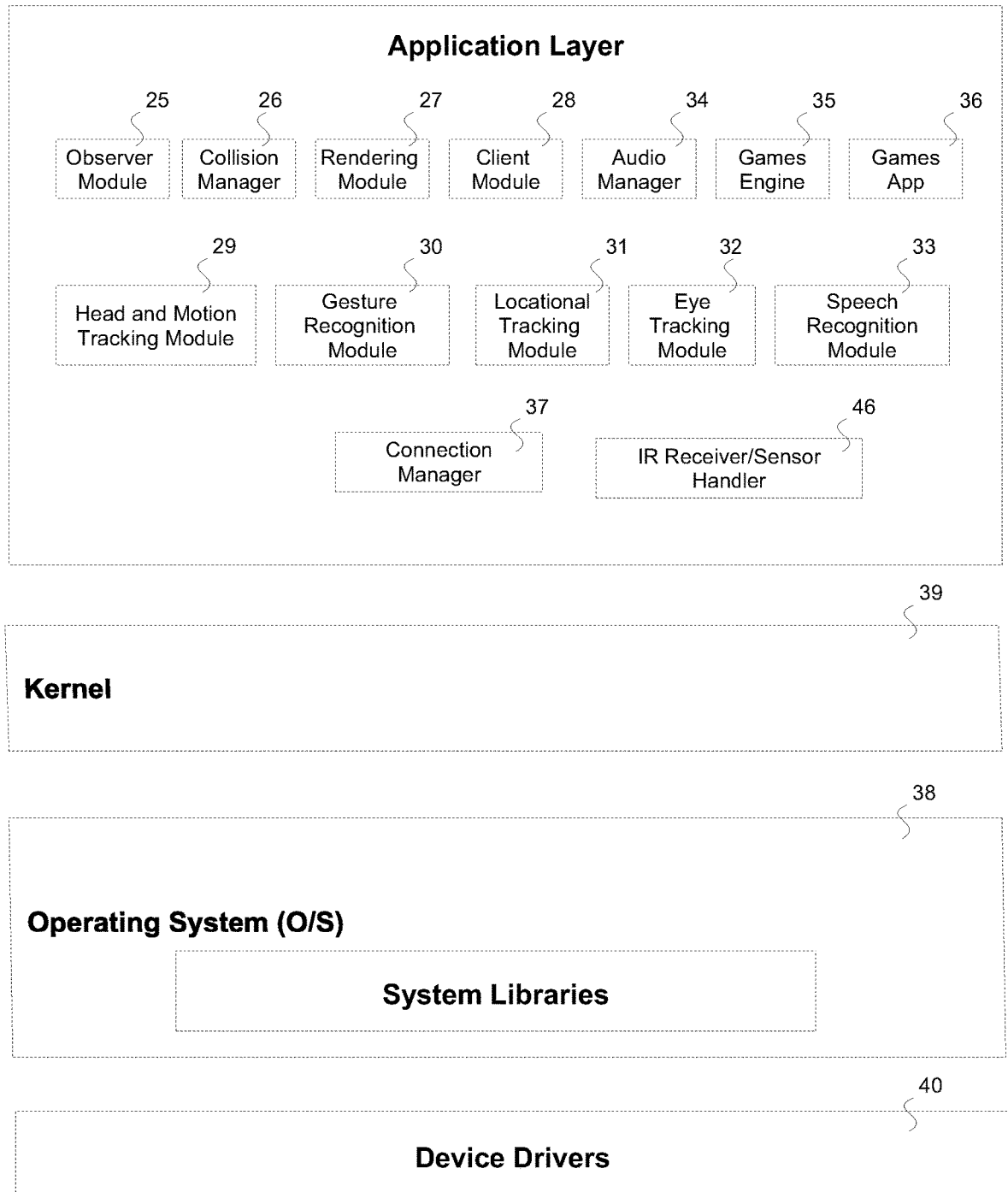
FIG. 2 shows the common functional modules of a wearable augmented reality ("AR") head-mounted display apparatus 1.

It should be noted that in the programming of the game, matrixes shall be used to perform translations, scaling and rotations which represent forms of transformations that may be applied to a virtual game object to perform the operation as described above in which transformations may be applied to virtual game objects based updated mesh and 3D models resulting from observations of changes in real-world surfaces, objects, surroundings provided by the observer component 25 together with changes in the user's head position and orientation based on inputs from user's head and motion tracking module 29 as depicted in FIG. 2. This uses volumetric and geometric data gathered from the observations of the real-world surfaces and objects by the observer component 25.

The sensors 9 form part of the head tracking functionality of the system that allows the user to "look around" the augmented reality and mixed reality world by moving their head without the aid of a separate controller, where the rendering module 27 shall adjust the 3D image through rotating or scaling the image through the process of transformation as described. Here ray casting may be performed according to the user's current focal point, their three dimensional cartesian coordinates and head orientation relative to that of the three dimensional Cartesian coordinates of the rendered 3D holographic image of the virtual game object and that of the real-world surfaces and objects in three dimensional space.

Here a virtual game object may be anchored at a specific point or plane within the three dimensional space of the real-world. For example, based on the mesh data and 3D model of the real-world environment a virtual game object could be anchored on an identified surface or object in the real-world environment in which the virtual game object is projected on a plane relational to say the angle and position of a table that is physical in the real-world. When the user then walks around the table in the real-world the virtual game object is rotated accordingly to the user's movements through the process of transformation, in which the object is always maintained in a correct perspective relative to the user's head position and orientation in which the user perceives the object as the user moves through three-dimensional space, thus the user perceives the object having physical presence in the real-world.

The sensor(s) 9 may also include a tachometer and speedometer used to track the users position, walking or running speed measured as a distance per second or millisecond i.e. 2 meters per m/s used in the computation and mathematical operations of the game rendering process. The sensor(s) 9 including the accelerometer and gyroscope sensor(s) are used as both head-tracking and motion sensors in conjunction with other spatial mapping generated mesh data generated from the real-world images and video captured from the user's camera(s) 7L, 7R and location tracking inputs from the GPS tracker 12 and electromagnetic compass 23 to track the users three dimensional cartesian coordinate position, head orientation and focal point relative to the virtual three-dimensional world of the game and that of the real-world environment.

The system may use matrixes in the form of six dimensional matrixes to represent the users head position and orientation in 3D space relative to other virtual game objects. This allows the user to move around freely in either direction or to change their orientation, where the three-dimensional Cartesian coordinates X, Y and Z represent the head position of the user in three dimensional space and (P, R, Y) represent the users head orientation in terms of their pitch, roll and yaw on a three-dimensional axes.

The six dimensional matrixes representing the users head position and orientation are generated from data outputs provided by the sensor(s) 9. Together with the related mesh data and 3D models generated by the observer component 25 from recorded images or video from the camera's 7L, 7R, the six dimensional matrixes representing the users position and orientation are used to the render the virtual game objects and scenery accurately over current real-world objects and surrounding surfaces relative to the users current position, head orientation and focal point or line of sight in the three-dimensional space of the game.

This allows computationally for the system to formulate the users relative position in three dimensional space to that of other users, game objects and the virtual world of the game, which may be used combined with the mesh data and 3D models of the real-world to accurately render virtual images over real-world objects and surfaces relative to the user's position.

Using sensory data and the captured images and video from the user's camera(s) 7L, 7R and sensors 9, a three-dimensional world of the real-world laser tag arena 98 and game space is mapped in precise scale, volume, depth, geometric form and physical form to that of the real-world environment in which the system using the generated 3D models and mesh data is able to accurately render 3D holographic images and textures over the real-world visible from the users augmented reality ("AR") display apparatus 1.

The camera(s) 7R, 7L and sensors 9 maybe also be used for tracking of the user's hand gestures and joint movements used as inputs into the game play to interact with game objects that maybe physical in presence in the real-world or maybe virtual in which they may be displayed as augmented 3D holographic images over the real world. Additional data may be added through extended matrixes that represent the direction the user is facing based on inputs from the location sensors which may be a form of gyroscope, GPS receiver, solid state compass, electromagnetic or magnetometer. In addition, other data such as velocity, momentum or rate of acceleration may be provided from the accelerometer in which this data is provided in the form of matrixes.

The speaker(s) 6L and 6R provide 3D audio to aid the games realism in which sound attributed to a game objects may be perceived to be directionally coming from direction of the visual rendered and displayed 3D holographic image on the visible imager through the micro display 3, through the usage of 3D audio techniques. These game objects may be virtual or real-world game objects that exist in physical presence in the real-world as a tangible form. 3D audio that appears directional is achieved through manipulating the sound output from the speaker(s) 6L and 6R, where the audio may be positional placed together with the augmented virtual images of the game at the same three-dimensional Cartesian coordinates as that of a virtual game object or that real-world game object relative to the users own vector and six dimensional matrixes.

This enables the system like in the example given of the visual projected 3D holographic images of the IR Beam/IR Laser beam fire to also manipulate the audio where the sound effect is perceived moving in sequencing with the moving displayed 3D holographic projection of the laser fire from the user handheld IR Laser Gun Apparatus 47, relative to the user's position and head orientation in three dimensional space. Accuracy is achieved though 3D positional audio using head-related transfer functions (HRTF's) and reverberation in which the system manipulates the sound waves along the same relative three dimensional projectile plane as the visual holographic 3D image representation of the IR laser beam, relationally to that of the users position and head orientation in three dimensional space.

Furthermore, as the holographic 3D image representation of the laser beam passes real-world walls and other real-objects or virtual game objects the system shall using 3D positional audio simulate reflections of sound as projected the laser beam 3D holographic image passes these objects.

Here physics properties of similar to how real-world objects react to sound waves maybe applied in the computation of the 3D positional audio of the travelling IR laser beam, in which the system shall simulate for example the passing of sound waves through a computation of the laser beam travelling along a perpendicular axis in three dimensional space in which echo's shall be simulated as reflections of sound as the laser beam passes identified surfaces that are suitable for reflecting sound waves such as hard or smooth surfaces.

Other real-world physics maybe simulated such as the cause of sound waves hitting a real-world object causing an object to vibrate as a result of IR laser beam hitting the object in which normally no sound would be produced, but in which based on a computation of the hit position of the IR laser relative to a real-world object or virtual game object the system is capable of producing 3D audio to enhance the audio effects of the laser tag game.

In addition, the user's listener's ear can be simulated to simulate the effect of the audio source being behind, above, below, in front or either side of the user as the IR Laser beam passes for which the system shall compute the relative position and distance of the laser beam to the user's head position and orientation. This computation is based a six dimensional matrixes which represent the originating Cartesian coordinates (i.e. x, y, z) of the projected laser beam together with the orientation of the handheld IR Laser Gun that fired the laser beam in terms its pitch, roll and yaw (P, R, Y) relational to that of the users own three dimension Cartesian coordinates and (P, R, Y) using from the head tracking sensors 9 of the users wearable augmented reality ("AR") head-mounted display apparatus 1, together with physics variables for echo and vibrations of sound as the projected holographic laser beam passes other real-world objects or virtual objects in the three dimensional space of the game.

Two microphones 8L, 8R, are used to record and capture audio data from the user which may be used as input in the game play to interact with game objects that maybe physical in presence in the real-world or maybe virtual in which they may be displayed as augmented 3D holographic images over the real world. These inputs may include voice commands.

Figure 1B:
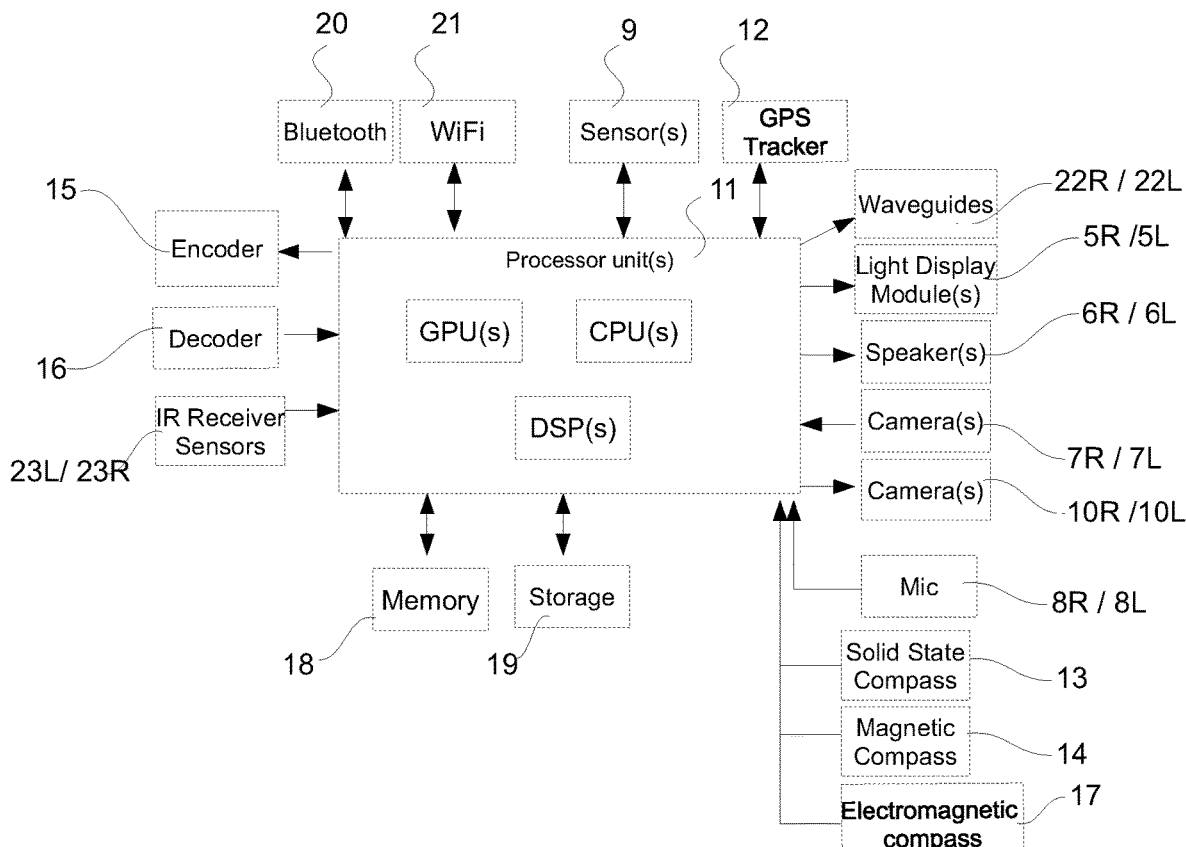
FIG. 1B shows a block diagram of the core components of a wearable head-mounted augmented reality ("AR") display apparatus 1, in which the device consists of a computer in a wearable form together with other parts.

FIG. 1B shows a block diagram of the core hardware components of the users augmented reality ("AR") display apparatus 1 used in the laser tag game in which the device consists of a computer in a wearable form that features a number of processing unit(s) 11, Memory 18, Storage 19 Camera(s) 7L, 7R, Sensor(s) 9, GPS Tracker 12, a solid state compass 13, a magnetic compass 14, two Light Display Module(s) 5R, 5L, two Microphone(s) 8R, 8L, two Speakers 6L, 6R, two or more IR Receiver/IR Sensors 23R, 23L, an Encoder 15, a Decoder 16, a Bluetooth interface module 20, a WiFi network interface module 21 and two Waveguides 22L, 22R.

The processing unit(s) 11 consists of one or more Central Processing Unit(s) (CPUs), and Graphics Processing Unit(s) (GPUs) where the CPU or CPUs shall be responsible for executing and handling of the pre-programmed code as well as the processing of all program instructions, system events, inputs and outputs provided by the core components and modules of the system as depicted in FIG. 1B and FIG. 2. This includes for example the processing of six dimensional matrixes data and sensor inputs from the sensor(s) 9 and the passing of this data to the games engine 32 and rendering module 27 used in the rendering and ray casting of augmented scenes and game objects.

Example outputs include the providing of new images or video captured from the output of the user's cameras 7L,7R to the observer component 25 for performing spatial mapping and generating mesh data of the real-world physical surfaces and 3D models used to render textured surfaces and game objects for example over the user's real-world view.

The CPU or CPUs shall be responsible for executing all the programmed instructions and logic of the game and the corresponding software programs of the system such as the games engine, observer, collider and rendering program where the game and program code is stored in read writable memory on device storage 19 and executed in memory 18, by the processing unit(s) 11.

The processing unit(s) shall handle all logic, control, arithmetic, and I/O Input or output operations, which will be handled in accordance to the instructions of the game and corresponding software programs coded instructions. The CPU(s) will also execute all sequences of the instructions provided by the game and corresponding software program.

The Graphics Processing Unit(s) (GPU's) or visual processor unit shall be used for acceleration of the execution of game using hardware accelerated 3D graphics processing and calculation handling for vector operations, matrix multiplication, floating point operations and intensive work such as texture mapping, rendering of polygons and the calculation of transformations such as rotation, scaling etc. or moving of game objects along a plane. This maybe relative to changes to the user's cartesian coordinates in three dimensional space, their head orientation and focal point or changes observed in real-world objects or surfaces in changes in either one of these items may invoke the re-rendering and ray casting of changes in the virtual objects according.

The GPU's may be used in many mathematical operations for 3D graphics including the calculation of complex matrixes, the computation of transformations to 3D vectors, the apply or shadowing effects in which the system may calculate the light projection backwards towards the three-dimensional space of the game objects origin for example and other mathematical operations.

With detailed game scenes the GPU's shall perform many multiplications of matrixes and vector operations for the sequencing of a rendering of scene of a gaming object as instructed by the coded game instructions and the handling of multiple objects in the rendering pipeline as instructed by the code of the game as part of the game scene sequencing.

In addition, the GPU's shall support the use of shading techniques in the game rendering though providing memory for shaders, input data (vertices, textures, etc.) and an I/O channel to the rest of the system over which it receives and sends data and command streams.

The GPUs would work in conjunction with the CPU, rendering module 27 and the local games engine 32, the game program 33, the observer component 25 and the collider component 26 in the processing, transmitting and receiving of data as well the generating of mesh data and 3D models of the real-world objects and surroundings as well as the virtual game objects and scenes that are augmented over the users real-world view.

The mesh data, 3D models and wireframes containing volumetric data on the real-world generated by the observer module 25 together with sensory data from the sensors 9 would be sent to the GPU, in which the GPU shall use the mesh and volumetric data for example in its calculations and the generating of rendered 3D images such in the performing of transformation operations such as the scale or rotation of a game object, relative to the user's head orientation provided by the sensors. The resulting 3D images may then be converted into two different stereoscopic images and go through a process of rasterisation before the resulting images are displayed through the illumination of pixels on the user's micro display 3, in which the based on the two differing stereoscopic images the user's brain perceives the image as having 3D form.

Alternatively, the GPU of the game server 88 or another host 89 may output its resulting calculations and instructions as list of game objects to the local rendering module of users augmented reality ("AR") display apparatus 1, for the rendering of 3D images and subsequent display as 2D stereoscopic images that are then rasterised and displayed as pixels on the user's micro display 3.

In essence the system may operate in a distributed model for where the operation of the GPU in its mathematical operations may be performed locally on the users augmented reality ("AR") display apparatus 1 or remotely by the game server 88 or another host 89.

The resulting 3D images generated through either approach shall then go through a process as described of rasterisation resulting in the display and illumination of pixels on the users augmented reality ("AR") display apparatus 1, micro display 3. in which the 3D images may be converted into two separate stereoscopic 2D images where left and right 2D images form the perspective of a 3D holographic augmented over the real world view of the user through the micro display 3 and lenses of the users augmented reality ("AR") display apparatus 1.

The memory 18 shall be used to for storing and executing the programmed instructions and code by the CPU(s) and GPU(s) in the processing unit(s) 11 in which different parts of the systems code programmed for specific functions may be processed in parallel by different processors in the executing of the game and performing the differing functions of the corresponding programs and modules such as the rendering module 27, observer module 25, head and motion tracking module 29, and the light display module drivers 27 etc. which all server separate functions in the system as shown in FIG. 2. The memory 16 is also used in the executing of code by the operating system (O/S) 31, the kernel 30 and the device drivers as well as the programs as detailed previously such as the observer module 25 and that run on top of the O/S.

Data and files may be held in memory as part of the execution of the code. The memory 16 may be a form volatile memory or random access memory (RAM) for performing high speed instructions by the CPU such as DRAM, fast CPU cache memory and SRAM or other forms of volatile memory or example used as the main memory of the system. Additional memory may be provided via the GPU as dedicated graphics memory or may be commonly used between the CPU and GPU.

The memory 18 may also consist of non-volatile memory also for performing BIOs and firmware operations such as flash memory, ROM, EPROM, or EEPROM memory, where flash memory may be used as a secondary form of memory for example. The flash memory may be a type of NOR Flash. Files and data may be stored also the storage memory 18 of the device together with the binaries, executable files of the programs and all corresponding files. This shall include the Operation System (O/S) software and all device drivers for the device hardware appliances as depicted in FIG. 1B. The storage may be in the form of a SSD flash based drive or a conventional hard disk such that is HDD based, due to the high performance of SSDs over HDD the preference would be to use though SSDs. Other forms of nonvolatile memory such as flash storage may be used also as storage.

Stored files and data may include generated mesh data, wireframes and 3D models or captured stereoscopic images and video from the users Camera(s) 7L, 7R. Storage maybe local on the users augmented reality ("AR") display apparatus 1 or be provided remotely via Cloud or via a secondary companion device such as PC, tablet or mobile phone that is accessible via the network 97. Alternatively, files and data may be stored on game server 88 or host 89 as shown in the latter FIG. 7.

Alternatively, the files and data may be distributed where remotely the system may store the global mesh data, wireframes, 3D models on the media servers or on a cloud storage cluster for example, but locally each client on the users augmented reality ("AR") display apparatus 1 may store their own local mesh data, wireframes and 3D model files locally within its SSD. Similarly, the captured images and video from the user's camera(s) 7L, 7R may be stored remotely or locally for processing in the generating of mesh data, 3D models and wireframes that maybe generated by the observer component 25 locally on the user's augmented reality ("AR") display apparatus 1 or remotely by the game server 88 or host 89 global observer components.

In the case the mesh data, 3D models and wireframes are generated remotely, the system may function in a distributed client and server model in which client 28 will transmit the recorded video or 2D stereoscopic images captured of the user's real-world view from the Camera(s) 7L, 7R which shall then be processed remotely by combining the two video feeds or images from the camera(s) to generate mesh data, 3D models and a wireframe of the real-world environment remotely by the game server 88 or host 89 observer module 118 components.

The game server 88 or host 89 using its game engine 124 and rendering module 117 shall then invoke the rendering over the mesh, 3D models surfaces using its texture mappings and materials for example following which the resulting renderings shall be provided by the game server 88 over the network 97 to the clients 28 in the form stereoscopic video or 2D stereoscopic images in which the client 28 shall display the pre-rendered stereoscopic video or 2D stereoscopic images.

The camera(s) 7L, 7R, shall be used by the observer component 25 as part of the spatial mapping function, in which the observer module 25 using the images from the camera(s) shall generate surface data, mesh data, geometric, depth and volumetric data as well as wireframes and, 3D models also referred to as a mesh and wireframe of the real-world objects and surrounding surfaces within the field of view and focal point of the user from their augmented reality ("AR") display apparatus 1.

In addition, the camera(s) 7L,7R may be used as part of the depth sensory gathering process in which a wireframe and depth map shall be generated based on the captured left and right images of the real-world visible. Depth information on the real-world objects and surfaced maybe gathered using techniques such as Computer Vision, Time-of-flight, stereo cameras, computer stereo vision etc. or a combination of these techniques using the images captured in the left and right camera(s) 7L,7R. Captured depth information may be designated through the use of different colours on the wireframe to indicate the relative distance of the users augmented reality ("AR") display apparatus 1, relationally to the real-world surfaces and objects in front of the user.

This depth information may be used by the games engine 29 and rendering module 27 in the process of generating accurately scaled three dimensional scenes and objects in the game for superimposing and augmenting over the user's real-world view in which the system shall convert the generated game three dimensional scenes and game objects into corresponding Left and right eye two-dimensional stereoscopic images. The converted 2D images are then projected on to either eye as collimating light beams emanating from the illumination of pixels through the use of one or more of the Light display modules 5R, 5L, the micro display 3 and the optical lens 2R, 2L to provide the 2D images in a stereoscopic image form in which the user's brain perceives this in having a 3D form.

This process involves a process of 3D projection where the 3D images are flattened into 2D image stereoscopic images before being displayed on the users augmented reality ("AR") display apparatus 1, micro display 3, in which the virtual image appears superimposed or augmented over real-world objects, surfaces or spaces providing an augmented reality experience. This uses a process of spatial mapping in which the 3D original images are mapped to the generated mesh so as to appear relative to real-world objects or surfaces in which the game objects created also in this process shall have a determinable location and/or orientation on the generated mesh defined as part of its three-dimensional Cartesian coordinates expressed as x, y, z and pitch, roll, yaw (P, Y, R) on a suitable axes.

This allows virtual images of objects that do not exist to be augmented or superimposed over a real-world object, surface or space. Here the mesh data of real-world objects contains the vertices, surfaces and faces of real-world observed geometric structures, objects, surfaces and spaces generated by the devices observer module 25 using spatial mapping techniques and the devices forward facing cameras 7L, 7R to capture images of the real-world from the users FOV. Here virtual images and materials may also be applied or mapped to the mesh, in the sense that its desired location and/or orientation is defined relative to the real-world geometric structures of the location, surface or object which the mesh represents. This allows augmented scenes to be constructed replacing the users real-world view of the surrounding surfaces, walls, ceilings etc. that may be in front of them, by superimposing virtual images over these objects.

The camera(s) 7L,7R may be a form of CCD Camera(s) or stereo camera(s) capable of recording two video recordings, one from either camera simultaneous in which the may be used to track changes in real-world objects and surfaces using processes such as video tracking to locate moving objects and to detect changes in surfaces over time. Object recognition techniques may be combined with this to identify objects in which the observer module may generate an object ID and assign an object classification to the identified object such classifying the object as being identified as a "Chair".

The system would target real-world objects using a motion model to define the objects position in terms of its three dimensional Cartesian coordinates and orientation etc. The captured images and identified objects maybe covered with a mesh, where updates to the mesh are provided to the games engine as part of the rendering and ray casting process for overlaying game scenes and 3D holographic images over the real world objects and surfaces. The motion of a real-world object maybe defined by the position of the nodes of the mesh or through a moving matrix.

The use of the camera(s) 7L,7R to perform video tracking for observing in real-time real-world changes in the movement of objects and surfaces may be used in conjunction by the observe module 25 in the processing of the video frames of the user's real-world view using known techniques and algorithms such as Kernel based tracking, Contour tracking, Condensation algorithm, Kalman filter and particle filter etc. through the iterative processing and analysis of consecutive video frames from the users left and right side view of the real-world objects and surrounding surfaces from their augmented reality ("AR") display apparatus 1.

The encoder 16 may transmit the two video streams via the network 97 to the remote observer module 25 on the game server 88 or host 89 for processing or for the process of generating global mesh data, wireframes and 3D models of the real-world, accessible via the network to all clients. This may be used to pre-render augmented scenes in which full CGI or raytracing may be possible since the rendering process on the remote game server 88 or host 89 can be performed in performed in parallel to the local renderings on the users augmented reality ("AR") display apparatus 1, in which user's clients 28 may use the rendered augmented scene or virtual game object by the game server 88 or host 89 for areas that this relates to.

The users augmented reality ("AR") display apparatus 1 also features an Encoder 15 and Decoder 16 that shall be used for the transmitting and receiving of data, images, audio and video over the network 97. Data may include two differing stereoscopic video or image sources used in the display of differing images on either eye to create a stereoscopic effect, sensory data or locational data generated by the users augmented reality ("AR") display apparatus 1. Data may also include other forms of images or video such as holographic images, holograms, stereoscopic images, of CGI based animations, etc. It may also include mesh data.

Alternatively compute instructions or mathematical outputs from transformations could be sent in the form of data strings over the network 97 by the game server 88 or host 89 which could be received via the encoder 15 used in the local rendering and display of game objects by the users augmented reality ("AR") display apparatus 1 in which the mathematical operations in the game computations may be performed remotely by the game server 88 or host 89 for example and provided as output list of game objects with their vertices, faces and floats with a game object ID provided via the users augmented reality ("AR") display apparatus 1 decoder 15 to local rendering module 27 to be used in the rendering and display of the game object.

The encoder 15 and decoder 16 as shown in FIG. 1A and FIG. 1B, shall be responsible for receiving and transmitting image, video and audio data over the network 97 as data streams between the game server 88 or host 89 and the users augmented reality ("AR") display apparatus 1 during game play.

The encoder shall also be responsible for transmitting all captured mesh data, wireframes, sensory, audio and video data from the users augmented reality ("AR") display apparatus 1 cameras 7L,7R, inward facing cameras 10L,10R, microphones 8L, 8R, local observer module 25 and sensors 9. This shall include video tracking data including the two video tracking streams of the used in in the tracking of real-world changes in the movements of objects or changes to surrounding surfaces which shall be transmitted over the network for processing by the global observer module used in the generating of global mesh data.

It should be noted that data, audio and video maybe exchanged also directly via the client module and other modules locally and externally via the network in which a connection maybe established over IP with another users augmented reality ("AR") display apparatus 1, or the game server 88, or host 89 or another real-world game object such as IR Laser Gun Apparatus 47 or a real world AI Character 94, in the exchanging for example of other forms of data such as state and event information used by other clients to invoke renderings and in the general operation of the networked gaming play. These connections externally may be established via the WiFi of bluetooth modules 20, 21.

Generally, though all forms of video data shall be exchanged via the network with the use of the user's decoder 16 and encoders 15, for the encoding and decoding of video. 3D spatial audio and perceptual locational based 3D audio effects may also be provided in this way.

The sensor(s) 9 as depicted in FIG. 1B, consists of a multi-axis accelerometer, gyroscope, tilt sensor, motion sensor. The sensor(s) may also consist of a inclinometer, pedometer, speedometer, altimeter and a MEMS Barometer. These sensors are used to formulate the users head position and orientation, where the tilt sensors are used to formulate the pitch and roll (p and r) on a 2-axis. The tilt sensor and/or accelerometer combined with inclinometer may be used to also formulate the pitch, roll and yaw on a 3-axis. The accelerometer/motion sensors may be used to determine also the heading, direction and speed of a moving users head position in the three dimensional space of the real-world and that of the virtual world of the laser tag game space. This maybe a form of inertial navigation system in which the sensor is capable by using dead reckoning to the position, orientation and velocity of a moving user which may be used in the computation of collisions and hits for example during a game by the collision manager 26.

The accelerometer may be used in conjunction with the gyroscope sensor to calculated the rate in a change in the tilt or velocity of change in angle direction in which the users head is tilting, which may be used for example in the applying of transformations to virtual game objects that are augmented, in which virtual game objects may be rotated relative to the users changes in their head orientation in real-time in which the transformation operations are performed by the rendering module 27 with the GPU in corresponding to the changing angle of tilt.

The accelerometer may also be used with the client's pedometer to accurately measure the movement of a client and the distance travelled across the laser tag game space and game arena. The accelerometer may be a three-axis accelerometer for measuring motion on a x, y, z axis or other suitable axis such as p, r, y. It may also be a multiple axis used to determine magnitude and direction of the acceleration of a client as a quantifiable vector and form of free-fall accelerometer. Drawn separately are the locational sensors which include a GPS Tracker 12, a solid state Compass 13, an electromagnetic compass/digital compass 17 and a magnetic Compass or magnetometer 14. These sensors are responsible for the tracking and maintaining of the user's head position world coordinates in the three-dimensional space of the real-world and that of the virtual world of the laser tag game, determined as three dimensional cartesian coordinate (x, y, z).

Here a 3-axis electromagnetic compass/digital compass or magnetometer may be used to measure also the users directional heading on a suitable x, y, z axis. This may be combined with the devices world coordinates and directional vector used for maintaining state information and dead reckoning purposes. The users augmented reality ("AR") display apparatus 1, sensors 9, may also have a dead reckoning module. It should be noted that the magnetic compass or magnetometer works on the basis of the strength direction of the magnetic field, to determine a direction on the three x,y,z axis, whereas the electromagnetic compass or digital compass work on the principle of a heading but also is capable of providing values for pitch and roll on a three axis.

These sensor devices take reading measurements, which are passed up to the client via the CPU and bus as interrupt or output, from which the client module 28 and other software modules of the users augmented reality ("AR") display apparatus 1, as depicted later in FIG. 2, use these measurements and readings for the purpose of tracking the users head orientation in terms of their pitch, roll and yaw (p,r,y) together with the users world coordinates (x,y,z) and other physics variables such as the users rate of acceleration, momentum and velocity to perform their programmed functions.

Six degrees of freedom (6DoF) are provided through the user augmented reality ("AR") display apparatus 1 sensors 9, in which as the user moves around the real-world and that of the virtual-world of the game, transformations are applied to existing virtual game objects and new game objects are created as new mesh data and 3D models of the real-world surfaces and objects are identified by the observer module 25 of the users augmented reality ("AR") display apparatus 1, allowing complete freedom of movement along x,y,z as well p,r,y axis's. In addition to the detailed sensors 9, the users augmented reality ("AR") display apparatus 1 may include a MEMS Barometers combined with piezo resistive pressure sensing technologies to determine the users head and body elevation from ground.

The formulation of the level of elevation may be based on detected changes in atmospheric pressure above ground level or below ground level, represented as two varying values for torr (the unit of pressure) and Pa in Hg across three points, where ground level is point A, above ground is point B and below is point C. These values for each point maybe translated by means of formulation and calculation to representational points in three dimensional space in which the ground level point A may be defined by specific values along the x,y,z axis and any values greater than these value expressed as x,y,z value with a "+" represents above ground and any x,y,z values with a "−" represent below ground. Note these are not the positional world coordinates of the user in three-dimensional space but their relational position in three-dimensional space relative to the ground.

Alternatively, the users other augmented reality ("AR") display apparatus 1 may include other forms of sensors such as an Altimeters may be used or the users GPS tracker in which their measurements maybe converted computationally by way of formulation to relational three dimensional coordinates indicating the elevation of user's head and body above ground.

Note on initial calibration the distance and height from the ground of the user's augmented reality ("AR") display apparatus 1 upon placing the device on a user's head maybe calculated using these sensors to take elevation readings, where upon taking measurements, the system is capable of determining by calculation the height of the user's body from ground, which can be used later in some of the tracking and visual targeting capabilities of the disclosed invention herein during a laser tag game.

In addition to the mentioned sensors(s) 9 the users augmented reality ("AR") display apparatus 1 also features two or more IR Receiver/IR Sensors 23R, 23L for use in Laser Tag gaming and the detection of a successful hit by another users IR Laser Gun Apparatus 47 or other forms of IR weapons/real-world game objects, where upon the resulting from IR Laser Beam reaching the IR Sensors 23R, 23L a hit is registered. These are additional IR Receiver sensors for detecting hit shots to the head during a laser tag game, in which the IR Receiver/IR Sensors 23R, 23L are mounted on the users augmented reality ("AR") display apparatus 1 outer structure.

These IR Sensors maybe a form of optical light sensor, which are designed to detect the IR light emissions from a IR Laser Beam when projected at the sensors surface. The IR Laser Beam may be produced by a users IR Laser Gun Apparatus 47, IR LEDs 49 as a result of a user pulling the trigger mechanism 53 and the line of sight of the lens tube aligning with that of the other users IR Receiver/IR Sensors 23R, 23L mounted on the users augmented reality ("AR") display apparatus 1, where the light emission from the other users IR Beam/IR Laser Beam is detected.

All detected IR Laser beam hits shall be transmitted by the client module 28 over the network 97 to the game server 88 or host 89 for the registering of a hit triggered by the IR beam being projected onto an IR receiver or IR Sensor 23R, 23L, where the IR emissions in the form of a light beam from the IR laser gun is sensed by the IR receiver or IR Sensor resulting in triggering the system to register a hit.

It should be noted that the detecting hits may occur as a result of the IR Sensor(s)/IR Receivers 23R, 23L detecting Infrared ("IR") light emissions and IR radiation from an IR Beam/IR Laser Beam projected by an IR LED or infrared laser diode of another user's real-world game object such as an IR Laser Gun Apparatus 47 or IR Shield Apparatus 90 or IR Proximity Mine 91 onto the IR Sensor(s)/IR Receivers 23R, 23L.

These IR Sensor(s)/IR Receivers 23R, 23L maybe a form of an active IR Sensor or passive IR Sensor in the form of fiber optic sensor, photo optic sensor, infrared detectors and/or photo-detector. In addition, the IR Sensor(s)/IR Receivers 23R, 23L may be a form of photodiodes or phototransistors. They may also be a form of active or passive infrared sensor in this case.

As shown in FIG. 1A and FIG. 1B, and as detailed previously two or more speakers 6R, 6L provide the audio output of the game audio effects during the game play. These audio effects may include 3D audio effects in which perceptual based 3D sound localisation, 3D positional or 3D spatial audio sound effects are provided in which the user's brain perceives the sound direction to be coming from a specifiable point in the three-dimensional space of the real-world and that of the virtual world of the game. Two microphones 8L, 8R shown in FIG. 1A and FIG. 1B are used as detailed to provide voice command inputs during the game or in the opening of a video or audio communication between two or more users in which the audio and/or video can be heard or seen from their augmented reality ("AR") display apparatus 1, speakers 6R, 6L and micro-display 3 respectively. This may also be used to support voice command input types, supported by the speech recognition module 33.

The users augmented reality ("AR") display apparatus 1 also features two light display modules 5R, 5L as shown also in FIG. 1A and FIG. 1B, where as detailed these light display modules 5R, 5L are responsible for activating the illumination of individual pixels of the display on the respective screen portions 2R, 2L for the display of virtual image.

This may use tiled display topologies to control the display of individual pixels for the purpose of displaying for example, two differing 2D stereoscopic images on the respective portion of the users display screen portions 2R, 2L and micro display 3, as previously detailed.

Each pixel of a respective rendered image relating to a virtual game object is mapped to a particular location on the interior surface of a corresponding of each of display screen portions 2R, 2L. Here individual pixel coordinates maybe provided by the rendering module 27 as an output of the rendering pipeline of the virtual images in the form of an array of RGB values or an in memory bitmap loaded into the micro-display 3, display screen portions 2R, 2L frame buffer following the rasterisation and fragmentation of the images at the end of the rendering pipeline process.

The users augmented reality ("AR") display apparatus 1 also features a Wifi Module 21 and Bluetooth module 20, used for network connectivity over IP between the users augmented reality ("AR") display apparatus 1 client module 28 and other real-world game objects/devices clients, or the game server 88 or host 89 among other devices such as connecting with a real world AI Character 94, users Mixed reality IR Mixed Reality Suit 93 or mixed reality IR Mixed Reality Vest 92.

FIG. 2 shows the core software functional modules and the software stack of a wearable head mounted augmented reality ("AR") display apparatus 1, which include an observer module 25, a collision manager 26, a rendering module 27, a network gaming client module 28, a head and motion tracking module 29, a gesture recognition module 30, a locational tracking module 31, an eye tracking module 32 an speech recognition module 33, an audio manager 34, a games engine 35 and a game application 36.

In addition, as depicted in FIG. 2, the users wearable ("AR") head-mounted display apparatus 1 also features a connection manager 37, an operating system ("O/S") 38, a kernel 39 and device drivers 40. The device may also feature a holographic or hologram image processing module referred to as the holo conversion module not depicted on FIG. 2, which may be responsible for the handling and conversion of holographic or hologram images for display purposes.

In addition, the device may feature an IR Receiver/Sensor Handler module 46 responsible for the processing of IR transmitted signals and the detections of Hits corresponding from the light emitted from an IR Laser beam hitting the users IR Receivers/IR Sensors 23R, 23L.

The observer module 25, is a key module of the users augmented reality ("AR") display apparatus 1, which as described is responsible for the performing of spatial mapping in which mesh data, wireframes and 3D models containing volumetric, geometric structural, and depth is created for real-world objects and surfaces observed by the observer module 25.

The observer module 25 uses the user's augmented reality ("AR") display apparatus 1, front facing cameras 7L, 7R to generate mesh data, mesh filters and wireframes from which 3D models can be generated of real-world objects and surfaces. Using the generated mesh data, mesh filters and wireframes the rendering module may create a virtual game object and 3D model of the real-world objects and surfaces observed from the user's front facing cameras 7L, 7R and respective field of view. The rendering module 27 may then apply surface rendering materials to the real-world objects and surfaces which may be displayed via the user's Micro-display 3, as an augmented virtual image over the user's real world view.

The observer module 25, tracks any changes in the state of the real-world resulting from user movements or resulting from the change in the state of a real-world object or surface changing, in which it notifies any changes to the client module 28 and/or rendering module 27. Changes may include the observation of a new space, surface or object in the real-world in which new mesh data together with a mesh filter, wireframe and a subsequent 3D model may be generated for the purpose of rendering and augmenting virtual-game images overlaid over these new identified spaces, surfaces or objects. In addition, changes may include the change in orientation of an observed real-world space, object or surface.

The rending module 27 is responsible for the rending of the game virtual images based on the generated mesh data, mesh filters, wireframes and 3D models created from real-world observations of spaces, surfaces and objects observed from the user's field of view using inputs from the Cameras 7L, 7 R using spatial mapping techniques by the observer module 25.

The rendering module 24 may make use of the user's wearable ("AR") head-mounted display apparatus 1 CPUs and GPUs in the rendering pipeline process. For example, it may make use of the devices GPU in transformation operations in which virtual game objects may be rotated or scaled for example based on changes observed users field of view, as well as their head position and orientation.

The head tracking and motion module 29 is responsible for maintaining state information on the user's head position and orientation in the form of six dimensional matrixes, using inputs from the users ("AR") head mounted display apparatus 1, sensors 9 including the accelerometer, gyroscope, tilt sensor to formulate the users pitch, roll and yaw together with the GPS data on the user's position used to formulate the users Cartesian coordinates in the three dimensional space of the game.

The head tracking and motion module 29 may work in conjunction with the locational tracking module 31 in the formulating of the users vector position and 3D world coordinates (x,y,z), in which the locational tracking module 31 shall periodically poll the tracking devices including the GPS tracker 12, solid state compass 13, digital compass/magnetic compass 14 and the electromagnetic compass 17 on the users ("AR") head mounted display apparatus 1, to generate state information and a vector position or world coordinate representing the three-dimensional coordinate or positional vector of the user along the x, y and z plane in the three dimensional space of the game which is provided to the client 28 and the other modules of the system in performing their functions.

In this process the locational tracker module 31 may translate and convert real-world positional readings from the GPS tracker 12, solid state compass 13 and the electromagnetic compass 14, into representative points on the x, y, z axes and planes in the form of three-dimensional Cartesian coordinates.

The gesture recognition module 30 shall interface with the forward facing camera(s) 7L, 7R of the users ("AR") head-mounted display apparatus to capture users specific physical hand gestures and finger movements through processing and analysing the captured video and images of the user's hand and finger movements.

These hand gestures physical gestures such as hand signals maybe used to signal actions during a laser tag game, which may be tracked in real-time. Gesture hand movements are sensed by the use of gesture recognition algorithms by the gesture recognition module 30 in the process of detecting hand location and movement. The gesture recognition module 30 may use many different forms of spatial gesture modelling such as 3D model based skeletal or volumetric algorithm based approaches, or appearance based deformable 2D templates or image sequences to capture simple to complex hand gestures.

These gestures maybe passed to the games engine 32 and Collision Manager 35 in the processing of user inputs as recognised hand gestures. Gestures may be used as inputs to control virtual game objects and real-world game objects, where a hand gesture may be used to change the rendered surface and calibration of the laser pulse of the users IR Laser Gun Apparatus 47 for example in which the rendered surface change may be seen without the aid of the users ("AR") head-mounted display apparatus 1 on the user's surface display panel faces 57L, 57R, 57 of their IR Laser Apparatus 47.

Alternatively, gesture inputs could be used to control virtual game objects which are augmented virtual images over the user's real-world view, in which based on a recognised gesture input this could result in a transformation on the virtual object in which the object is rotated. This could also invoke the rendering and display of virtual game object that is relational to real-world game objects where for example the use of a hand gesture could invoke the rendering and display of a shield around the user as a virtual image in which should another users IR Laser beam hit the users IR sensor the system not register this as a hit since the shield has been activated by the user's hand gesture which works in the reverse of a hit box where any hits from IR or other forms of fire during the game are not counted if they fall within the coordinates of the shield.

Returning briefly to FIG. 1A and FIG. 1B, the camera(s) 7L, 7R on the users ("AR") head-mounted display apparatus 1 may be a form of depth aware camera(s) or stereo camera(s) used in the detection of hand gestures. In addition, a positioning reference such as infrared emitters or a lexian-stripe or form of reference in three dimensional space maybe used in together with a direct motion measurement to directly detect hand gestures. Alternative the user may be wearing wearable gloves or gesture based controllers as part of their IR Mixed Reality suit 93 depicted later in FIG. 11 in which direct inputs maybe provided during game play to high degree of accuracy.

Returning to FIG. 2, the users augmented reality ("AR") display apparatus 1, also features a speech recognition module 33 which is responsible for the processing and handling of voice commands which are spoken via the user's microphones 6L,6R.

The speech recognition module is responsible for handling of all spoken speech commands. This may use different forms of models, methods and techniques such as language modelling or Hidden Markov models or other forms of widely available models, methods and techniques. The key responsibility of the speech recognition module 33 though shall be in the translation of spoken voice command inputs in to text formed inputs that are used by the client module 28 and/or games engine 35 to invoke an action such as the examples given with the embodiments of this invention.

In addition, the users augmented reality ("AR") display apparatus 1, also features audio manager 34 which is responsible for the playback of perceptual based 3D sound localisation effects and spatial 3D audio effects output from the speakers 6L and 6R, where the audio may be positional placed together with both virtual game objects and real-world game objects using the same three-dimensional Cartesian coordinates of the virtual and real-world game objects.

Perceptual based 3D sound locational effects and 3D audio generated by the games engine 35 and/or audio manager module 34 and game application 36, may be output on the user's speakers 6 L and 6R through controllable via the audio manager module 34 during game play as a result of the detection for example of the projection of the users or other users Laser IR Beam from their IR Laser Gun Apparatus 47, or in the detection of a hit of an IR Laser beam on a user's detectable by the users augmented reality ("AR") display apparatus 47 IR Sensor 23 or by the devices Collision Manager 26, where the audio maybe positionally placed in 3D space in the same projectile direction of the moving IR Laser beam or the three-dimensional cartesian coordinates of the detected hit of the IR Laser beam.

Here similar to how virtual images appear three dimensional to the user with six degrees of freedom, 3D audio may be positionally placed on a three dimensional coordinate of the planes of the Cartesian coordinates x, y, z axes, or relational to the user's head orientation based on the user's pitch, roll and yaw. This allows the audio module to manipulate the sound outputs of the speakers so as the audio sound effect of the projected IR Laser beam appears moving in 3D space, relational to the moving 3D holographic image visual effect of the IR laser beam and that of the users own positional vector and orientation provided as six dimensional matrixes by the head and motion tracking module 29.

The projectile direction of the IR Laser fire is based on a six dimensional matrixes of the IR Laser Gun Apparatus 47 at the point of origin for when the IR Laser trigger mechanism was pulled used in the placement of the 3D audio effect of the Laser beam and in the calculation of its moving projection along the planes of the Cartesian coordinates in 3D dimensional space. Physics date from the IR Laser Gun Apparatus 47, may also be used in the computation and formulation of placement of the 3D audio effects of the IR Laser beam together with the 3D holographic virtual image visual effects using an assumed velocity of IR Laser beam and an assumed effect of gravity on the IR Laser Beam, which maybe assumed for example to travel 1 meter distance at a rate of 20 ms, and unaffected by gravity since it is a form of light.

The positioning of 3D audio sound effects may be supported by the audio manager 34 module through emulating the biological mechanisms of binaural hearing, where through the use of digital signal processing ("DSP") algorithms and sound localisation technologies it is possible to emulate the direction and sound location, to create perceptual based 3D sound localisation, in which during a virtual game scene the user perceives the location of the sound to be in a specific location in the three dimensional space of their real world.

This is achieved by the DSP algorithms applying several sound localisation techniques which include the manipulating of the user's perception of the interaural time difference ("ITD"), which is the difference in the arrival time of sound between two locations (through changing adjusting the time the sound arrives at either of the user's ears); the use of interaural intensity difference ("IID") in which the sound intensity between two locations is varied, the filtering of sound by users ear's pinnae part of the ear; the use of interaural level differences ("ILD") which provide salient cues for localizing high-frequency sounds in space based on differences in the sound pressure level reaching the two ears, the precedence effect and head-related transfer functions ("HRTF").

In which through the manipulating of the sound directional output from the user's speakers 6L, 6R on their augmented reality ("AR") display apparatus 1, and through stimulating the user's ears in different ways through the use of techniques such as ITDs, ILD and HRTFs it is possible, to recreate artificially 3D sound effects.

Where through sound location based technologies software and DSP algorithms, the perceptual based 3D sound effects maybe located with location of virtual game objects as sound component representing a user action such as the use of an IR Laser Gun Apparatus 47 by another user, in which the upon pulling the trigger mechanism 53 a 3D sound effect may be generated at a specified three dimensional coordinate (x, y, z) and in which a second sound effect may be heard moving directionally and at the same velocity and three dimensional coordinates on the x, y, z axis as the visual projected moving IR Beam/IR Laser Beam created virtual game object 3D holographic, Hologram or 3D image resulting from two differing 2D Stereoscopic images via the users augmented reality ("AR") display apparatus 1.

Techniques such as ITDs maybe combined with ILDs to achieve sound location at both lower frequency sounds and higher frequency sounds. These techniques may be applied in the reconstruction of perceptual based 3D sounds, through the reconstruction of spatialised signals, in which the spectrotemporal components are identified and isolated through Short-Time Fourier transform (STFT), in which the incoming audio signals and waves from two or more sources may be computed, in which the ITD of each of the spectrotemporal components maybe estimated through a comparison of the phases of the STFT. The use of techniques such as ITD's and ILDs can applied to achieve perceptual based 3D sound location without the need for biometric equipment such as artificial pinnae's, dummies or instruments such as head and torso simulators (HATs).

HRTFs provide further dynamic cues to reinforce the perception of the location of audio to users brain in which the body of the human obstructs the sound waves, causing linear filtering to occur from interference of the users body, head and ears. These arise naturally from movements and can cause confusion on the perceived direction of a sound. Every HRTF contain descriptions of locational cues that includes IID, ITD and monaural cue, which effect the users perceived position of the source of a sound.

Through filtering and manipulating the HRTF audio source signals prior to being output on the user's speakers 6L, 6R on their augmented reality ("AR") display apparatus 1, using techniques such as convolutive blind source separation which may be applied in real-time, it is possible to manipulate the users perceived relative position of an audio source in 3D space. Where this is suited to a real-time environment in which the game playback frame rate is 60 fps of more, such approaches of HRTF's can be optimised for example for the use in the manipulating of the sound sources for the positioning in realtime of a projected IR Beam/IR Laser beam shown as a moving augmented virtual image via the users Augmented reality display apparatus 1, or externally via the use of the external projectors by the game server 88 or host 89.

The pinnae also referred to as the auricle or auricula which is the visible outer part of the human ear provides a key purpose of filtering the sound in a way that allows humans to determine if the direction of a sound is coming from above, below, behind of in front of a person. The human ear pinnae filtering of sound waves works through a process of collecting the sound and transforming it into directional information and other cues. This provides both a funnel effect and an amplification to the sound in the directing of sound to the auditory canal.

Through manipulating the direction of the sound waves enter the pinnae ear it is possible to manipulate the filtering process of the pinnae, so as the user perceives the sound location to be at a determined location by controlling the direction of sound waves fed by two integral speakers 6L,6R of the user augmented reality ("AR") display apparatus 1, or the external speakers 101 of the laser tag arena 98. This technique may be applied to provide directional perception of the travelling IR Laser Beam sound effect for example as coming from behind, above, below or in front etc. of the user, in which the user may physically move out of the way based on the incoming sound thus potentially avoiding a hit on their IR Sensor or computationally by their collision manager 26 which provides a novel way to engage in laser tag.

In addition, through the application of ITDs, and ILD by manipulation of the lower frequency and upper frequencies though simply adjusting the relative level of the sound it is possible to create this audio illusion of the sound direction emanating from one side of the user's head with the use two integral speakers 6L, 6R of the user augmented reality ("AR") display apparatus 1, or the external speakers 101 of the laser tag arena 98.

The users brain during this process shall analyse the ITDs, ILDs and IPDs to determine the direction of the source of the sound for which it is possible to emulate with relative accuracy through manipulating the sound waves as described herein and the user of sound location technologies such as HRTFs to place an object on a precise location in three dimensional space which the user can then locate accurately.

It should be noted with the application of such perceptual based 3D sound localisation technologies, the virtual game objects maybe placed in specific fixed locations in which as the user's head moves the sound remains directional to that of its coordinates or the sound could be a moving virtual game object such as moving IR Laser Beam show as an augmented 3D holographic image, hologram or 3D image formed from two 2D stereoscopic images in which the 3D positional sound effects moves in accordance to the direction of the IR Laser Beams virtual game object projectile, direction vector, velocity and coordinates.

It is important to note here that the position of the virtual camera and users field of view in to the virtual world of the game augmented over the real-worlds moves in accordance with the user's head movements, position and orientation based on the previous described head tracking and rendering/transformation processes. In addition, so too does the user's perspective of the 3D positional sound effects which are relational to the augmented virtual game objects scenes in terms of their position in the three dimensional space of the game. Here just the same as transformations may be applied to the 3D models of virtual game objects to scale and rotate images according to changes in the user's head position and orientation so to can transformations be applied to the 3D positional sound effects to maintain the position of the 3D positional audio effect relational to the user.

Here based on movements detected by the user's head tracking module 29 using users augmented reality ("AR") display apparatus 1, sensor(s) 9 or using the external camera(s) 95 In the arena detected by the game server 88 or host 89 own Observer Module 118 transformations in audio may be applied through the use of matrixes in response changes in the user's head movements in terms of changes in their head orientation, rotation as well as their head position expressed as (x, y, z, p, r, y) in the three dimensional space of the game.

These transformations may change the directional position of the audio in three dimensional space also in the case the associated virtual game object is moving and its position changes relative to the user's position, where the 3D positional audio effects can be made by manipulating sound waves that enter the user's ears through manipulating the sound source and speakers, so as to appear to the user's ear as passing in a specified direction and at a specified rate of velocity where for example the virtual game object may be an IR Laser beam where based on the devices world coordinates, orientation, directional vector at the point of a user pulling the trigger mechanism 53 of their IR Laser Gun Apparatus 47.

Here both a virtual game object for the visual 3D projection of the IR Laser Beam and a 3D audio localisation component maybe created using the world coordinates, orientation of the users IR Laser Gun Apparatus 47, at the time the trigger event was created. Here the position of the 3D audio location and that of the visual 3D image of the virtual game object of the IR Laser Beam shall maintain the same moving direction, orientation and velocity along the three dimensional space along the x, y, z axis of the real-world and virtual world game space.

Similar to the described method of hit detection resulting in the visual effects of diffuse lighting, perceptual based 3D sound audio effects maybe used to simulate sound waves hitting both virtual and real-world objects from the users IR Laser Gun Apparatus 47 device trigger usage 53, in which perceptual based 3D sound audio effects may emulate sound waves hitting and bouncing off of the surface of a object. This may be invoked by an IR Sensor detecting a hit, or a computation of the IR Laser Beam intersecting with another real-world user, game object, AI Character 94 or virtual world game object 106, AI Character 105 or remote user 107 by the collision manger 26 of the users augmented reality ("AR") display apparatus 1, game server 88 or host 89.

In addition, similar to specular lighting effects, perceptual based 3D sound audio effects may be generated by the audio manager 34 based on the surface material type and the geometric structure of a nearby real-world object, game object/device, user, AI character 94, surface or that of a virtual world game object 106, AI character 105 or remote user 107 may be reflected.

Like in the real-world where sound waves projected from single point in three dimensional space can bounce off or be reflected, here too sound waves can be simulated through process of manipulating the perceptual based 3D sound audio effects using the described sound localisation technologies and techniques such as ILD, IID, ITD, IPDs and HRTFs etc. together with specialist digital signal processing algorithms.

The audio manager 34 together with the collision manager 26 on the users augmented reality display apparatus 1 or the game server 88 or host 89 shall use the generated 3D model, mesh or wireframe data of real-world objects by the observer module 25 and that of the virtual game objects created by the rendering module 27 for example here to formulate based on each object's model coordinates, world coordinates, surface material type (i.e. absorbent, reflective), if the sound wave has intersected with these objects from which upon detecting a collision. In which it shall use this to generate diffuse like perceptual based 3D sound audio effects or upon detecting a sound wave passing another object shall generate specular like perceptual based 3D sound audio effects.

Based on the material surface type the perceptual based 3D sound audio effects may be altered also in which sound effects may be simulated to pass through objects that have sound absorbing materials or to reflect amplifying the sound for example based on the object having a highly reflective and amplifying qualities in its classification type.

In addition, based on observations from the user augmented reality ("AR") display apparatus 1 by the observe module 25 through the use of the front facing camera(s) 7R, 7L or conversely through that of the game server 88 or host 89 via its observer component 118 and external camera(s) 95, 3D mesh data, wireframes and 3D model data of the real-world can be created in which the audio manager 34 may use this to create room perceptual based 3D sound effects.

This could be used for example to create a series of in game 3D sound effects in which these are formulated based on the room space, features to bounce off of different surfaces to recreate similar cues as a user would experience in a real-world room listening to sound. This could be uses to simulate the sound effect of an IR Laser Beam bouncing off of a reflective surface or to create a sound effect similar to diffuse lighting or SSH lighting effects where multiple 3D sound effects each coming from different angles of the hit position (x, y, z) are created. This may be supported with the use of the visual lighting effects image coordinates and directional vectors being input into the audio managers 34 HRIR database in which perceptual based 3D sound effects are then generated.

Alternatively, audio effects maybe added to game scene that is augmented over the surface of a room or augmented over the laser tag arena physical walls, ceilings and geometric structure where it is possible for the game server 88 or host 89 to add environment perceptual based 3D sound effect as a 3D audio element or component to a room or the physical surrounding surfaces of the laser tag arena.

Here a game object may be created or may already exist for a feature in the room or laser tag arena, in which the 3D audio element can be added. For example, next to a light scene that is augmented or an augmented virtual game object such as the previously described drop box it is possible to add a 3D audio element or component which shall affect the augmented scene according to the physical properties of the audio component associated game object and the other objects within the surrounding three dimensional space.

Furthermore, moving real-world objects can change the sound of scene in a room or area of the laser tag environment in which based on their world coordinates, model coordinates relative to that of the 3D sound effect.

Users may create moving 3D perceptual sound effects, through the use of the trigger mechanisms of real world devices such as IR Laser Gun Apparatus 47, IR Shield Apparatus 90 and/or IR Mine Apparatus 91 resulting from the firing of an IR Laser beam in which the audio effect coordinates moves relative to that of the moving augmented virtual image of the IR Laser beam.

Alternatively, this may be invoked by the use of voice commands to activate the firing of an IR Laser Beam via these real-world game objects/device types. As yet a further alternative where a weapon maybe, virtual users can create special 3D perceptional sound effects for weapons such as sonic wave blaster using solely hand gestures in which a virtual game object representing the sound wave is used to track the moving projectile of the weapon fire relative to other objects which maybe real-world game objects and in which the detection of a collision or hit by the collision manager of this virtual weapon fire could invoke the game server 88 or host 89 To disable the users IR Laser Gun Apparatus 47, IR Shield Apparatus 90 and/or IR Mine Apparatus 9 91 via their clients or to invoke their IR Sensors to go off for example.

In this example the users hand actions in air captured by their users augmented reality display apparatus 1 gesture recognition module 30 using the cameras 7L, 7R, or by the game server 88 or host 89 external camera(s) 95 in the laser tag arena has not only generated a virtual game object and 3D perceptional sound effects, but has resulted in a change in the tangible sense in the real-world in which the boundaries of virtual and real-world game objects coexist in the game. Here as described previously the determination of a hit is based on the position of an object in terms of its world coordinates relative to another object, in which it is determinable if the two have intersected or hit by the collision manager of the users augmented reality display apparatus 1 or game server 88 or host 89.

The users augmented reality ("AR") display apparatus 1, audio manager 34 shall handle and perform the functions described herein in the generating of perceptual based 3D sound effects, in which this will utilize techniques such as ITDs, ILDs, IPDs and HRTF. This will work in conjunction with the game server 88 Or host 89 To gather trigger events, state information on other real-world users, AI characters, objects and virtual world objects, AI Characters and users in this process. In addition, the audio manager 34 shall interface with the user's head and motion tracking module 29 to perform transformations to perceptual based 3D sound effects in relation to the user's head movements. Furthermore, the audio manager 34 shall connect with local clients that are paired devices with the user such as the IR Laser Gun Apparatus 47, IR Shield and/or IR Proximity mine in generating and playback of perceptual based 3D sound effects based on the devices state and event triggers etc.

As yet a further embodiment of the invention disclosed herein the audio manager may be on the game server or host 89, in which the handling of perceptual based 3D sound effect may be handled entirely by the game server 88 or host based on the state information maintained on all objects and the passing of event information provided by each of the real-world game objects clients.

Figure 7:
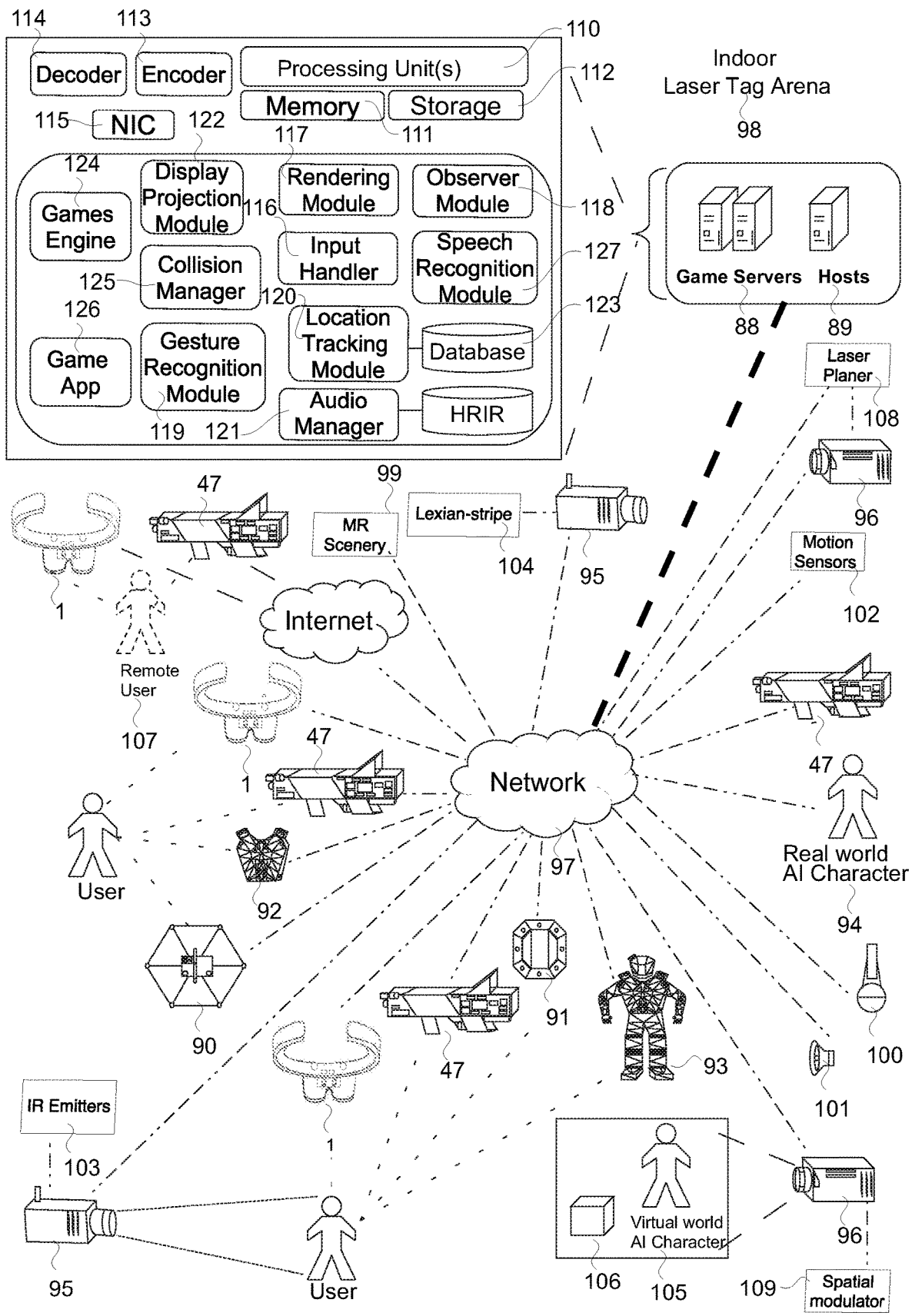
FIG. 7 shows a real-world laser tag gaming arena 98 consisting of a Game Server 88 or Host 89, Mixed Reality Scenery 99, humanoid or robotic real-world AI Characters 94, two or more users equipped with real world game objects including IR apparatus weapons such as IR Laser Gun Apparatus 47, wearable augmented reality ("AR") head-mounted display apparatus 1, and a wearable IR Mixed Reality Suit 93 or IR Mixed Reality Vest 92 which features IR Receivers/IR Sensors and/or fibre optic sensors for detecting hits; together with an external projector's 96, cameras 95 and motion sensors 102 among other equipment that support the game play.

Hear audio maybe manipulated and controlled in the use of external speakers 101 In the laser tag arena as depicted in the latter FIG. 7, or maybe managed on a session basis with each user where perceptual based 3D sound effects are maintained relational to that of the user's head position and orientation in the three dimensional space of the game, supplied by the users augmented reality ("AR") display apparatus 1, head and motion tracking module 29 through the client module 28 over the network 97 to the game server 88 Or host 89.

In game virtual world data together with real-world mesh, 3D model and wireframe data as well as state information from the game server 88 and host 89 on real-world game objects/devices such as users IR Laser Gun Apparatus 47, IR Shield Apparatus 90, IR Proximity Mine Apparatus 91 or real-world AI Characters 94 together with users coordinates and other data may be used to accurately model in real-time the directional perceptual based 3D sound effects as well as the 3D audio effects of reflection, diffuse, specular, absorbent materials etc. as detailed herein up to a rate of 60 fps or greater in real-time.

A HRIR database may be used in the processing and management of 3D audio sound effects in which the sound effect is place within the horizontal plane with recorded head related implies responses, in which based on the imported image coordinates of for example the IR Laser Beam generated virtual game object may be input into the HRIR database, by the audio manager 34. Through 3D audio spatial convolution techniques using HRTF functions or filters with cross talk cancellation techniques in the processing of the associated audio components/sources of the IR Laser Beam, 3D audio sound effects and sound waves may be recreated to emanate from a specific point in three dimensional space in which the real-world IR Laser Beam originated in terms of its origin as well as along its directional heading/directional vector as the IR Laser beam is projected across three-dimensional space. In this process binaural recordings maybe converted to stereo recordings before playback via the users augmented reality ("AR") display apparatus 1, speakers 6L, 6R or via the external speakers 101 of the laser tag arena 98, where generated by the game server 88 or host 89 audio manager 121 in which audio maybe provided as a 3D audio sound effect in real-time with that of the moving real-world IR Laser Beam or other real-world events.

Here the audio manager 34 may convert the binaural recordings into stereo recordings or may convert binaural recordings, stereo, 5.1 and other audio formats used in the game to 8.1 in order to provide a realtime 3D sound experience. The audio manager 34 may use HRTF's to create 3D audio, or other techniques based on ambisonics and wave field synthesis principle to create 3D audio via the users augmented reality ("AR") display apparatus 1.

In this process the audio manager 34 shall process and convert the 3D coordinates of users Augmented Reality HMD, real-world and virtual game objects together with events such as the pulling of the trigger mechanism on the IR Laser Gun Apparatus 47, to generate image inputs into the HRIR database to generate 3D sound, where the sound shall be placed correctly on the three-dimensional plane relative to the IR Laser Gun projectile, the users position, the position of other real-world objects and virtual objects.

The audio manager 34 shall factor in the computation of the 3D audio other variables such as the world coordinates (x,y,y) and the Pitch, Roll and Yaw expressed as P, R, Y of the users augmented reality ("AR") display apparatus 1 and that of the users IR Laser Gun Apparatus 47 at the point of the trigger mechanism 53 being pulled in the computation of the placement in three dimensional space of the 3D audio effect. In addition afterwards when a virtual game object for the moving IR Laser Beam is generated based on its projectile and directional vector along the x,y,z axis and planes of the 3D Cartesian coordinates a second 3D sound effect may be projected in which the audio can be heard moving in the same relative coordinates of that of the projected moving augmented 3D holographic image of the laser fire, as well as the user's moving head position and orientation.

Here like when as described a user pulls the IR Laser Gun Apparatus Trigger and can see the projected IR Laser beam as augmented virtual-image from different perspectives by moving their head position so can the user hear the 3D audio relative to their head position in which as the user moves to away to the left the sound appears more prominent in their left ear and vice versa. Here like the virtual-image projected image of the IR Laser beam seen through the users augmented reality display apparatus 1, micro-display 3, the position of the 3D audio effect like the moving virtual-image always remains relative to the original point the trigger mechanism 53 of the IR Laser Gun Apparatus 47 was pulled in terms of its moving projectile direction in three dimensional space. Note the 3D audio effects during a game sequence or during the display of augmented game virtual images, may not be generated as audio effect in real-time but could be a pre-recorded binaural recording.

Note other forms of similar perceptual based 3D sound effects and 3D audio effects methods may be employed by the system or similar 3D positional sound techniques which maybe based on HRTFs or other forms. For example, spatial audio techniques similar to those described herein together with spatializer SDKs that provide forms of HRTF filtering among other 3D positional audio techniques maybe used.

Here similar to the method described previously, 3D spatial sound based techniques may be used to manipulate the sound waves so as the user perceives the audio effects 3D position relative to that of the direction of the hologram or holographic image for example of the virtual image IR Laser Beam displayed by as augmented within the users field of view on their micro display 3, Alternatively it could be applied similar to the methodology of perceptual based 3D sound effects detailed herein, to generate 3D sound effects that a positional to that of the 3D coordinates of tangible real-world game objects and devices such the position of a user's real-world IR Shield Apparatus 90 or a real-world AI Character. In this way 3D spatial sound effects could be provided so that appears to come from the direction of the hologram or holographic image of a virtual image that is augmented or from the direction of a tangible real world object in which during a virtual game object creation a 3D spatial Audio component is added to the created virtual game object.

Again, here the Audio manager 34 may respond to the user's head movements in terms of changes in their head orientation, rotation and position in the three dimensional space of the game, in which it shall apply transformations accordingly to the audio component of the virtual game object to maintain perspective with that of the users head position and orientation in the three dimensional space of the game. Conversely should a game object move, in either case of perceptual based 3D sound effects, 3D audio effects, 3D spatial audio or ambisonics the Audio Manager 34 may invoke transformations to the 3D audio component to change the position of the audio sound in three dimensional space relative to that of the change in the 3D world coordinates (x,y,z), and orientation (p,r,y) of the real-world game object/device where for example a user may physically move with their hand an IR Laser Gun Apparatus 47, IR Shield Apparatus 90 and/or IR Laser Mine Apparatus 91.

In addition, moving sound components may be generated where their directional heading or directional vector changes in accordance with the change in the directional fire of the projected IR Laser Beams and their virtual game object based on changes in the 3D world coordinates (x,y,z), and orientation (p,r,y) of the real-world game object/device in which a user may pull the trigger repeatedly in different directions as they move around the Laser tag arena.

Similar to other VR technologies full sound techniques such as ambisonics may be applied also by the audio manager 34, to the described usage of perceptual based 3D sound effect for both virtual and real-world game objects such as in the example of the IR Laser Beam perceptual based 3D sound effect as a moving sound effect which could be directionally placed within a 360 degrees sphere using ambisonics by the audio manager 34. This may employ the use of a panning source, virtual microphones, a ambisonics decoder as well as the use of higher order ambisonics.

In addition to the audio manager 34, as depicted in FIG. 2 the users augmented reality ("AR") display apparatus 1 also features a games application 36 where the games application 36 provides the logic and structure of the game play in which the laser tag enhanced augmented reality and mixed reality world of real world gaming and virtual gaming coexist.

The game application 36 defines the rules of play, the resulting outcomes from the interactions between physical tangible real-world game objects, weapons, surrounding surfaces, users and that of the virtual world game objects, weapons, surfaces and surroundings within the structure of the laser tag arena.

The game application 36 provides the construct of the game play for a new form of mixed reality gaming that provides both a mental, visual, touch, and physical heightened experience in which real-world game objects, users and that for the virtual world can interact with each other with the three dimensional space and time of the real-world played out laser tag game.

The programmed logic of the game is designed to push the physical boundaries of the user's body, involving the need for rapid physical movement in the game play in which users battle out against real-world users, real-world AI characters that are physical in presence and virtual AI characters which are augmented over the real-world. Users engage in both real-world physical conflict and virtual conflict simultaneously, where the games application 36 defines the rules of the game that results in a quantifiable outcome of winners and losers.

True to the original origins of laser Tag gaming the core central objective of the game is to score the most number of hits, however additional challenges and experiences are provided that challenge both the users mental and physical capabilities where the user shall be required to think tactically and shall be face new challenges for which they will need to strategies to win in the battle of laser tag as the game play extends far beyond the simple firing of an IR Laser beam, in which the users face new forms of IR and none IR weapons, together with new enemies which may be non-human and AI in which the AI character may have physical presence in the real-world.

These real-world AI characters 94 as well as virtual augmented AI characters 105 shall apply reinforcement learnings via the use of re-enforcement learning algorithms to predict the users behavior in laser tag the game and to learn new ways to achieve their operative primary goal which is to win in the laser tag game, where much like how other AI systems based on reinforcement models learns to survive and play traditional 2D games these AI Characters 94 shall learn and gain capabilities through the playing of the game except here the AI is present in the real-world gaming environment and is able to move in the three dimensional space of the laser tag arena the same as other real-world users.

The games application 36 is programmed also to reward behaviour and achievements during the laser tag game to human real-world users and that of AI Characters, through the providing of virtual 3D holographic drop boxes in which these boxes appear augmented over the real-world users and AI Characters 94 view of the real-world, in which upon detecting contact via hand gesture recognition or based on the three dimensional position of the human user or AI character on the cartesian planes being at equal points to that of the virtual boxes model and world coordinates, the system will reward the human user or AI character by way of boosting their shield, boosting the IR Laser Gun Apparatus 47 computational fire power penetration and changing the pulse rate or classification of their IR Laser Gun Apparatus 47. This may be based on state information on the user's hand gestures, world coordinates provided by the users locational tracking module 31 and gesture recognition module 30.

Rewards may be time based in which the users weapon or shield is boosted for a period of time allowing the user to rapidly increase their hit score as IR Laser beam hits may account for dual hit scores or may in the computation of the game play rules penetrate at a greater rate another user's shield for example. In addition, the games application 36 may provide enhanced virtual weapons which are augmented-reality 3D holographic virtual images in form rather than physical real-world objects as a reward for the number of IR Laser beam hits a user has achieved in during the game.

These virtual weapons may be operated via hand gestures or voice control in which inputs are detectable via the users augmented reality ("AR") display apparatus 1 camera(s) 7L, 7R and microphone(s) 8L, 8R, in which the gesture recognition module 30 shall detect hand signals passing these inputs to the game application 36 which will invoke the corresponding rending of the augmented-reality 3D holographic virtual image of the weapon and its resulting projected fire output. Alternatively, the speech recognition module 33 shall detect speech commands passing these inputs to the game application 36 which will invoke the corresponding rending of the augmented-reality 3D holographic virtual image of the weapon and its resulting projected fire output. Based on a computation of the virtual weapons projectile the games application 36 may also invoke an IR Sensor to be triggered even though the weapon used was not an IR Laser Gun, thus allowing virtual objects and real-world objects to cross the boundaries of the virtual and real-world in which virtual objects and real-world objects can effect each other during the playing of the game.

Here the games application 36 and collision manager 26 shall use the users hand position in terms its three dimensional cartesian coordinates expressed as x, y, z and orientation expressed as pitch, roll and yaw on second axes in which together with physics data together with the relative moving position and direction of the users based on the users own three-dimensional coordinates and there defined hit box to determine if IR Sensor should be triggered registering a hit.

Conversely the games application 36 and collision manager 26 are programmed to detect an IR Laser beam from the real-world hitting a virtual game object or virtual AI character based on the formulated projectile of the IR Laser Beam from its originating three-dimensional coordinates and directional vector captured from the users IR Laser Gun Apparatus 47 sensor(s) 51.

Here the games application 36 and collision manager 26 shall retrieve the from devices client module 74 the IR Laser Gun Apparatus 47 devices three dimensional cartesian coordinates expressed as x, y, z together with its orientation expressed as pitch, roll and yaw on second axes in which together with physics data such as velocity, gravity, distance etc. the system shall perform mathematical and computation operations to formulate whether the projectile of the real-world laser IR beam hit the hit box coordinates of the virtual game object. This may use hit scan, ray casting and many other forms of collision detection to determine if a hit occurred.

Other rewards include forward sight, the ability to be give the view of the real-world from another user or real world AI character 94 whether friend or enemy allowing the use to see the other parts of the three dimensional space of the laser tag arena 98 real-world environment and that of the virtual game in places they have not physically been. Here video is transmitted from the other users augmented reality ("AR") display apparatus 1 device from its forward facing cameras 7L,7R or from the real-world AI Character's 94 forward facing cameras 134 or from the external cameras 95 in the laser tag arena 98 over the network 97 to the users augmented reality ("AR") display apparatus 1 device where the video is decoded and played back via their micro display 3.

Using the state information from the game server 88 or host 89 of other objects, users, AI Characters which includes their world coordinates (x, y, z) and model coordinates together with mesh data for these other areas of the laser tag arena, the user may be gifted the ability to see through walls and structures to other three dimensional spaces in the laser tag arena where augmented images of the 3D structures are displayed via their micro-display 3, together with augmented images of other moving real-world game objects, users and real-world AI Characters 94 in real-time. This provides a tactical element to the game in which the user can use to their advantage. Using dead reckoning combined with this mesh data and state information the game server 88 or host 89 may also award the user the ability to see the future by predication, in which it can predict another real-world user, game object or real-world AI Characters moves allowing the use to place their line of sight in precise location to the predicted future position of one or more of these targets.

This could be displayed as augmented images via the user's micro display 3, in which the user can pan around to see through different parts of the laser tag arena by rotating their head and selectively choose via voice command or hand gestures to see the predicted future events and moves of a real-world user, game object or AI Character 94.

The user shall be able to view these spaces with six degrees or more of freedom of movement of their head. Users may navigate into three-dimensional spaces in the non physical sense to see different parts of the laser tag arena by using voice command or hand gestures. This provides a significant advantage to the user. During navigation around the other parts of the laser tag arena through the visualisation of other areas and the use of hand gestures or voice command to move around in the non physical sense into other three dimensional spaces, current displayed augmented scenes and images seen by other users in these three dimensional spaces may be presented to the user. Also, the game application 36 could if the user selects to see the predicative future events opt to show a future animated game scene or change in the game storylines allowing the user to know what events in the game are about to occur which could be used tactically.

In addition, a user could be rewarded the remote control of a real-world or virtual world AI character in which their physical movements such as hand gestures or voice control could control the movement and play of the AI character whether real or virtual within the three dimensional space of the game in which the games application 36 shall invoke transformations accordingly on the virtual AI character or shall send command strings to invoke a corresponding physical action by the real-world AI character 94 to that of the users detected hand gesture or voice command.

It should be noted real-world AI characters 94 as shown later in FIG. 8, have mobility through the use of actuators, manipulators and joints etc. that allows them to move their hands, legs, body and head in which a real-world AI character 94 can walk around the user's physical real-world environment and that of the laser tag arena. This may be controlled by programmable software in which AI controls the real-world AI Characters physical movements or a human user can remotely via the network 97 during game play by means of their voice command or hand gestures being translated into three dimensional coordinates or vector headings for example in which the real-world AI Character 94 movement module 154 shall then invoke a physical movement using its actuators 129 to move based on input converted 3D coordinates (x, y, z) into joint movements etc.

Complex movements such as the rotation of the real-world AI Characters 94 hand can be remotely controlled by a user through hand gesture movements captured by the user's cameras 7L, 7R and their gesture tracking module in which the users hand positions, orientation and movements in three-dimensional space shall be mapped to that of the real-world AI Characters 94 hand movements where the users detected hand position, orientation and movements are mapped to model coordinates and joint positions which the real-world AI Characters 94 hand follows.

Inputs from the gesture recognition module 30 on the user's relative hand position, orientation and movements as 3D coordinates are passed via the network 97 to the client module 156 of the real world AI Character 94 which then maps these to the physical joint coordinates of the AI Characters hand in this example, where the client module 156 of the real world AI Character 94 then invokes via its movement module 154, programmable software and circuitry of the real-world AI Characters 94, its joints via the controllable manipulators and actuators 129 to change the position, orientation and movement of the AI Characters 94 hand accordingly.

When remotely controlling a real world AI Character 94 via the network 97, video may be transmitted back from the real-world AI Characters 94 cameras 134 showing its relative field of view, which may be displayed on the users augmented reality ("AR") display apparatus 1, micro-display 3 providing a real-time video feed, in which as the user physically performs hand gestures or invokes a voice command for the real-world AI Character 94 to move, the user will see in real-time the corresponding physical move of a real-world AI Character 94, from their micro-display 3. Here the user could for example control using this functionality of the system, the real-world AI Characters 94 handling of IR Laser Gun Apparatus 47, or other real-world objects in which based on the user's hand gesture inputs or voice command this can invoke the real-world AI Characters 94 hands to pull the trigger mechanism 53 of the IR Laser Gun Apparatus 47, which provides another form of gaming during a laser tag game in which a user can score hits.

Alternatively, a physical AI Character 94 or virtual AI Character 105 may be paired with other users to aid in a team game the user in the scoring of hits during a laser tag game or other forms of games such as capture the flag etc. in which in the case of real world AI Character 94 this shall act independently based on its own re-enforcement algorithms, generative models and logic based AI.

The games application 36 is programmed to allow the game, users and all objects to play out freely in the constraints of three-dimensional world of the laser tag arena, and within the defined constraints bound by that of the game rules, in which the game application engages directly the user of real-world game objects and virtual game objects during the laser tag game to bring about a specific state in the game play. This differs significantly from traditional computer video games system in which the game is played out in the realm of the virtual world of the game and to that of traditional laser tag systems in which the game is driven only by the user's actions through the simple pulling of a trigger mechanism to project an IR beam on to another users IR sensor or all other forms of present gaming systems.

As shown in FIG. 2, the users augmented reality ("AR") display apparatus also features a Collision manager 26 which consists of two main modules the Collision detection module, and the collision response module. The Collision detection module is responsible for detecting collisions or intersections of two or more objects. These objects may be real-world game objects, objects and surroundings or virtual world game objects and surroundings that exist within the three-dimensional space of the game. The Collision detection module is responsible for detecting collisions or intersections between real-world objects, users and AI Characters 94 and virtual game objects 106, AI characters 105 and remote users 107.

Here state information is captured on real-world game objects, objects surrounding surface data as well as state information on virtual game objects 106, remote users 107 and AI Characters 105 includes their three dimensional position in terms of their Cartesian coordinates among other state information used in the computation of a hit by the Collision detection module which may be gathered by the objects sensor(s) or through the observer component 25 observations into the real-world in which spatial, depth, geometric and volumetric data is constructed using the users camera(s) 7L, 7R, or computationally where an object is a virtual game object or has a virtual game object associated with it.

The Collision detection module may also compute the time of impact (TOI) and report this to the Collision Response module in the predetermining of an outcome from the projected collision, providing a set of intersection points to be used in the computations by the collision response module in the simulation of the outcome resulting from the collision.

The Collision response module is responsible for the simulating of the resulting changes in two or more objects following a detected collision and other forms of contact of two or more objects, in which the collision module shall apply physics models and algorithms in its computation of the resulting outcome from the detected collision. These computations are based on physics data, linear algebra, computational geometry together with volumetric and surface data. Geometry, volumetric and surface data may be provided from the observer component 25 on real-world objects and surface which may be used together with state information from the game server 88 and host 89 together with the associated virtual game objects model data and physics attributes in the resolving of the outcome of collision detections.

The physics data used in the modelling and algorithms may consist of variables such as force, time, the assumed constant mass of an object, momentum and velocity, in which the opposing values of each of these variables for each object shall be used in the determination of the outcome. For example, where one object may have a greater mass than another it may be determined by the Collision Response module using its models and algorithms that the resulting outcome shall be that the object with less mass shall be pushed further away with a greater force in the opposing direction along the Cartesian planes of the three dimensional space as a result of a collision since the other objects mass is greater.

The laws of physics may be applied in this process through physics simulations to make the visual effects whether augmented virtual images or visual in the real-world to appear more realistic to the users and players during the game play, in which the code of the Collision Manager 26 and its modules may use for example Newtonian physics in its simulation, modelling and algorithms used in determining of an outcome resulting from a collision or intersection of two or more objects within the three dimensional space of the game. The use of rigid body or soft body simulations may be used in this process by the Collision Manager 26 and its Collision Response module.

The modules of the Collision manager 26 form the physics engine of the system in which the game physics are applied within three dimensional real-world and virtual world of the augmented-reality and mixed reality game environment of the laser tag game, where the contact of real-world game objects with virtual game objects can effect the motion of virtual game objects and conversely a virtual game objects can effect the state of real-world world game objects as a result of detected collision.

Here the Collision manager 26 and its modules are responsible for example for the collision detection of virtual game objects with other virtual game objects, the collision of users with other virtual game objects and real-world objects, the collision of virtual game objects with real-world game objects or vice versa and the collision of real-world game weapon fire such as an IR Laser beam from the IR Laser Gun Apparatus 47 with other users or other game objects which may be real or virtual game objects. It also responsible for the collision response and resulting from the detected hit, in which a corresponding game scene maybe played out in the real-world or virtual world where resulting hits may be seen visible for example on the surfaces of real-world game objects without the aid of the users augmented reality ("AR") display apparatus device 1, where these real-world game objects such as an AI Character which is physical in presence in the real-world has the means to display texture maps and rendered images on its surfaces.

Here the real world AI Character 94 as depicted later in FIG. 8 may be applied in a computational sense with a rigid body or a rag doll which has a collection of rigid bodies or a soft body in which the Collision Manager 26 may simulate real-time physics simulations in sequence with that of the real-world physical movements of the AI Character where the physical movements of the AI Character in the real-world are controlled by the simulation. For example, when a real-world AI Character dies in the game as a result of an IR Laser beam hit or virtual weapon hit, their body shall fall to the ground as physical act invoked by the Collision Manager 26 through a series of commands sent to the client module of the real world AI Character 94 over the network 97 which maybe seen with or without the users augmented reality ("AR") display apparatus 1.

The movements of their body as the real world AI Character 94 falls may be pre-simulated by the Collision Manager 36 using a rag doll body technique or a soft body technique in which the three dimensional coordinates (x,y,z) of each of the vertices on the 3D model of the body of the Real world AI Character 94 representing their head, body and arms etc. are then transmitted via the network 97 to the physical Real world AI Character 94 client module 156 and movement module 154 to carry out in the precise same sequence of physical movements as a result of the IR Laser beam or virtual weapon hit being detected on the AI character. Sequences of movements from the rag-doll simulation maybe provided in the form of matrixes which contain the individual 3D coordinates (x,y,z) in a sequence of each of the vertices of the real world AI Character's 94 body surfaces and moving parts to the movement module 154 to invoke this process. These 3D coordinates may be converted in this process to joint positions.

Conversely the Collision Manager 26 could in its response define the real world AI Character 94 as a fixed entity or body in which its physical position in the real-world three dimensional space doesn't change but visual graphics representing a kill shot as a result of hit could be rendered over the surface display panel faces 143 of the Real world AI Character 94 in which the Collision Manager 26 shall invoke the local rendering module 157 of the AI Character 94 upon detecting a hit to render a virtual image or texture map representing a kill shot over its display surfaces that may be seen without the user of the users augmented reality ("AR") display apparatus 1.

Alternatively, visual effects of the kill shot upon detecting a hit could be augmented in which the user sees the resulting kill shot overlaid over the AI Characters 94 body. The same could apply to the detection of hits on real-world users in which as a result of the IR Sensor of another user being hit, the system may render over the other users a virtual image of the visual effect as 3D holographic image or 2D stereoscopic images of the detected hit or kill shot which may be triggered by the other users IR Sensor or could be formulated based on a computation of the projectile. Furthermore, it could be projected externally using external projector 96 by game server 88 or host 89, in which the image light is directed based on the model coordinates and world coordinates using external 3D mapping projection techniques.

The Collision manager 26 uses the three-dimensional Cartesian coordinates together with physics data such as mass, velocity and momentum to detect collisions between objects, users and objects as well as the weapon fire from real-world game weapon fire such as an IR Laser beam with other objects and users.

The physics data is used to compute the resulting transformation of virtual game objects where a collision is detected or in the generation of new virtual game objects resulting from the detection of a real-world object, user or a real-world game weapon fire being detected as hitting another virtual or real world object or another user.

The Collision manager 26 interfaces with rendering module 27 both locally and that of other users augmented reality ("AR") display apparatus 1 via the games application 36 and games engine 35 or directly during the game play in the invoking of renderings that are augmented virtual images intended to provide visual effects resulting from the detection of a collision. Here where the resulting collision is detected on another user this user's own Collision manager 26 shall also determine the hit by means of calculating the projectile of the weapon fired whether virtual or real such as the IR Laser Gun Apparatus 47, in which in tandem both instances of the users Collision manager 26 modules will determine based on both instances formation whether a hit should be registered.

The Collision manager 26 shall check with the game server 88 or host 89 on the state of other objects during this process as the governing source of all truth if the hit shall be registered and whether the other user may have a shield activated based on their state information retrieved via the network 97 from the game server 88 in which the collision manager 26 shall not invoke if this is the case the rendering of a hit upon detecting a collision.

It should be noted in here that the augmented-reality virtual image of the visual effect of the hit shall be rendered and displayed on both users augmented reality ("AR") display apparatus 1 in which both users shall see the same rendered virtual image of the hit, just at different perspectives relational to their differing field of view into the real-world and that of the virtual world according to their personal head position and orientation.

Any other user also within the same vicinity and three dimensional space of the user which has been hit shall also see the hit as an augmented reality virtual image overlaid on the users body since a new game object based on the generated mesh and 3D model of the users body by the other users observer component 25, shall be made visible to all users in the same three dimensional space of the user that was hit.

This new game object representing the visualised hit shall be anchored to the user's body that was hit, where should that user move the system will perform transformations to the game object representing the visualised hit so that it remains positional in relative three dimensional space to that of the user that was hit. Like other virtual game objects when walking around the object the system will perform translations relative to the other user's head positions and orientation thus maintaining the correct perspective of scale and rotation to each user that views the user which received the hit.

Should that user have a shield which is a virtual game object a hit may not be rendered on the user's body but a transformation may be performed against the virtual game object of the shield to visually illustrate to other users that their shield has been weakened or hit. Here the Collision Manager 26 shall be based on the cartesian coordinates along with the model coordinates of the shield that may be represented by a positional points along the Cartesian planes of XZ, XY, YZ axes or the a spherical or voxel Sphere represented by its model coordinates and vertices.

It should be noted that every game object whether real or virtual has both a world coordinates and a model coordinates where; model coordinates define the shape of an object and world coordinates define its location relative to the virtual game world and real-world which is maintained on the game server 88 or host 89 as part of its state information. This may be used by the collision manager 26 in its computations of hits.

The Collision manager 26 may also use simple mechanisms such as hit boxes to compute a hit, where the 3D model and its coordinates maybe computationally intensive on the CPU to formulate if a hit was detected due to the complexity of the 3D model of the object and its shape. Here hit boxes may be applied to virtual game objects and real-world game objects that are physical in presence.

Conversely a virtual game object may have a shield in which should the Collision manager 26 may detect a hit of a real-world IR Laser Beam or a virtual weapon fire with that of the virtual game object, where if shield is confirmed activated with the game server 88 and its model coordinates cover that of the users coordinates or the point of intersection of the hit, the Collision Manager 26 may not register the hit. The collision manager 26 shall also interface with the Observer Component 25 in gathering of real-world volumetric and surface data used in the computation of hits in which a hit may not be counted if a real-world surface or object if its shape and coordinates are detected within front of the target object in which like in the scenario where the user has a shield the hit may not be counted.

This applies to hits on real-world users, real-world AI characters, real-world game objects and virtual game objects, AI Character's and remote users in which a hit or the projectile fire of the IR Laser beam may be blocked by a real-world object.

Alternatively, a virtual game object that is not a shield but an AI Character or a simulated wall could if its model and world coordinates cover the target, cause the Collision manager 26 not to register a hit even if the IR Laser Beam for example did hit the other users IR Sensor, in which the registering of the hit on the other users IR Sensor may be disabled also in this process.

The collision manager may also be used to detect the user picking up a virtual object based on the use of touch point on a vector of the virtual object, formulated based on the model and world coordinates of the user hand detected by the gesture recognition module 30 with that of the virtual object and the point of it vectors.

Upon detecting a hit, as part of the resulting action invoked by the Collision Manager 26 Collision Response module from its formulated outcome, this may invoke a transformation on a virtual object. Here matrixes are multiplied to transform the models coordinates in the virtual world, where changes in the values in the matrixes can be used to formulate the move of a game object or translation, the scaling of game object or the rotation of a game object resulting from the detected hit and the formulated outcome by the Collision Response module.

Techniques such as hitscan of raycasting may be used where based on the originating real-world game object and devices coordinates (x,y,z), orientation (p,r,y) and directional vector, the projectile and trajectory of an IR Laser Beam may be formulated, in which based on this data from the sensors of the device a starting positional vector can be plotted in three-dimensional space together with a directional vector in which a line or ray can be formulated where using the distance of the IR Laser Beam range and velocity together with the varying positions (x,y,z) plotted along the line or ray together with the coordinates, directional vector/heading and velocity/acceleration of other objects the collision manager 26 can determine if the IR Laser Beam will hit or intersect with another real-world user, game object, AI character or with that of a virtual game object, AI character or a remote user which is virtual in form in the physical space of the game.

It should be noted the Collision Manager 26 in determining of a hit or a collision or in intersecting of two objects can use coordinate inputs and state information directly from real-world game object, or coordinate inputs from the paired virtual-game object in which transformations are applied to synchronise the coordinates of the paired virtual game object with the real-world game object each time the real-world object is moved. Alternatively, the Collision Manager 26 can use state information from the game server 88 or host 89 in the determining of a hit or a collision or in intersecting of two objects.

As shown in FIG. 2, the users augmented reality ("AR") display apparatus 1, also features a games engine 35 which provides the software framework of the game in which the game application 36 can invoke for example transformations on virtual game objects through use of the games engine API calls, among many other rendering functions such as shading and effects in which the games engine 35 shall work in conjunction with the rendering module 27 and the devices GPU in the handling of such operations. This may form part of the middleware that resides on the user's head-mounted augmented reality ("AR") display apparatus 1 in conjunction with the Game application 36, rendering module 27 and Collision manager 26 as depicted in FIG. 2, or could be in replacement of parts of the modules such as the collision manager 26 in which the games engine 35 could provide a physics engine as an alternative embodiment of this invention.

The games engine 35 could also provide the rendering engine where instead of a separate rendering module that acts as the rendering engine, the 3D rendering of the game could be handled by the games engine as another alternative embodiment of this invention.

Alternatively, the rendering engine may be provided via an API interface to the lower level system library components such as the user of frameworks such as OpenGL or Direct 3D which provide an abstraction layer as a further alternative embodiment of this invention.

Here the games engine is used in conjunction to the rendering module 27 and collision manager 26 in the performing of the computation or mathematical operation functions of the game or assisting the rendering module in the performing of complex renderings in which the games engine may interface with the GPU and the rendering module during the generating of 3D models and in game rendered scenes as described herein.

Here the games engine here has been uniquely programmed to handle the transition between real-world game objects and virtual game objects in which translation operations may pass between that of the virtual world in the transformation of virtual game objects to that of real-world game objects such as AI characters which operate on a six degrees of freedom or greater with the three dimensional space of the laser tag game. There are current games engines that are fully capable of performing most general computations in the performing of game computations or mathematical operations, however these engines do not cover the extent of the described relational handling of the interactions of that of the virtual game objects and real world objects as described in the embodiments of this invention herein as such the games engine shall be uniquely programmed to handle the complex computations needed in the translation between real-world and virtual world game objects.

On simpler operations like the rendering of virtual game objects that are augmented over the real-world view of the user in some cases the rendering and mathematical operations may be interchangeable between the games engine 35 and the rendering module 27 in which operations may be shared or handled exclusively by the games engine 35 to perform operations faster. Typically, matrixes operations would be handled by the games engine 35 with the use of GPU to perform these types of operations and the rendering module would be responsible for applying surface texture updates for example to the updated 3D model of the virtual game object.

It should be noted that transformations may be used for means of formulation rather than in the rendering process of real-world objects in which the transformation is performed against other virtual game objects resulting from a change in orientation for example of a real-world object.

Alternatively, transformations be used in the renderings of real-world objects in which those game objects have the means to display on their surfaces renderings. In the case real-world object has the means to display texture maps on its surfaces via suitable flexible screens such as those made from organic materials such as OLED to provide a real-world mesh or 3D model surface made out of multiple triangle display screens, the full rendered 3D image may appear visible to the user in the real-world without the aid of the users augmented reality ("AR") display apparatus 1.

This could be used to render a real world AI Character 94 that has presence in the physical sense in the real-world in which the renderings appear to the user in the real-world and can be touched and interacted with much like how a human user interacts and touches real-world objects in which the rendered surfaces may change as a result of the detection of the user's touch. This may use a form of touch-sensitive screen sensors or may use hand gesture tracking to detect a collision between the user's hand and that of the real world AI character or game object using the users augmented reality ("AR") display apparatus 1, gesture recognition module 30 to detect a user's hand touching the vector point of another real-world object such as an AI Character.

Commonly the process to formulate and render a 3D shape of a virtual-world game object uses 3D modelling where a 3D model is formed as mentioned from lots of small triangles and a mesh. The points of the triangles are called vertices (or vertexes) for which each vertices has coordinates X, Y, Z that define a shape of the game object in terms of its length, width and height sometimes referred to as 3D coordinates or model coordinates. Polygons are formed from three points or vertexes, where multiple polygons are used form to form complex models and shapes in 3D graphics rendering. A real-world game object may be represented the same as a virtual object as a model comprising of many triangles, where V=vertices followed by their X, Y, Z coordinates point of vertex that defines the objects shape.

Here matrix operations may be performed where as opposed to the output being used to transform a 3D rendered holographic virtual image, here the matrix operations are performed to track changes in the position, shape and movement in real-time of real-world objects in the relative three-dimensional space of the game as a means to formulate collision detections in which a change in the real-world object model coordinates or world coordinates could invoke a separate transformation on a virtual game object or could invoke the games application 36 to change the game scene to introduce for example new virtual game objects.

Here model coordinates and world coordinates of the real-world object could be supplied via the users augmented reality ("AR") display apparatus 1 detected by the observer component 25 through detecting changes in real-world objects and surfaces using spatial mapping techniques or could be directly provided by the real-world game object such as a IR Laser Gun Apparatus 47 or a Real world AI Character 94, where these devices have their own tracking capabilities in which they are operable to provide their model coordinates and world coordinates directly to the user's game engine and game application via the network or via the game server 88 or host 89.

World coordinates may be provided in the form of points on the 3D Cartesian axis x, y, z in which the 3D coordinates of the object are formed by a set of three numbers (x, y, z), where the game object position is expressed as X=2.0 Y=5.0 and Z=−15 or (x2, y5, z15) for example which defines the game objects model position three dimensional space. Alternatively, dimensional matrixes may be provided which includes the value of the points along x, y, z axes of the Cartesian coordinates, plus values for the pitch, roll, and yaw (p,y,r) of an object on a second suitable axes. The model coordinates are used to make up the 3D model structure of the objects, in which the coordinates of multiple shapes or triangles known as vertices form the overall shape of a complex 3D model.

Specifically, each shape or triangle has a vertices, which has a coordinate of X, Y, Z referred to as the point or vertex which represent the height, length and width of the shape in three dimensional space. These vertices are referenced by the faces of the object which define the overall shape of the 3D model of an object. Like in traditional video game systems and 3D graphics systems each object is made up of multiple triangles, vertices and faces that are built together to make complex 3D models. This represents the model coordinates and shape of the 3D model of an object.

The connection manager 37 as depicted in FIG. 2 is part of the sub-system components of the system and is responsible for handling the communication with the game server and host in the establishing and closing of closing of communication and connections over IP between the Game Server 88 or Host 89 and the client module 28 for the proposes of transmitting and receiving data, images, video and audio over the network 97.

The connection manager 37 is also responsible for establishing and handling of IP connections for the receiving and transmitting data, images, video and audio over the network 97 from real-world game objects such as the handheld IR Laser Gun Apparatus 47 as depicted in FIG. 5A and FIG. 5B, where this may be used as part of the processing of events such as trigger events from the handheld IR Laser Gun apparatus 47 usage which may be used in the rending of augmented in game visual effects of the laser gun fire and in the computation of hits.

Data may include the six dimensional matrixes of position and orientation of the IR Laser Gun Apparatus 47, used in the computation of the a hit by the IR Laser Beam on a real-world object or virtual world object, used by the collision manager 26, games application 36 and rendering module 27, in the rendering and display of 3D holographic images or 2D Stereoscopic images visual effects of the IR Laser beam seen through the users augmented reality ("AR") display apparatus 1 resulting from a hit being detected for example.

As shown in FIG. 2, the users augmented reality ("AR") display apparatus 1, also features a Wifi module 21 and bluetooth module 20 that provide network connectivity over TCP/IP protocols to the game server 88, host 89, other users augmented reality ("AR") display apparatus 1, and real-world game objects. The Bluetooth network connection maybe used for short-range networking. Wifi may be used for long range. Other forms of network connections may be supported such LoFi, 5G and 4G with the use of additional networking modules. These modules maybe both hardware and software based hence why this appears in both FIG. 2 and FIG. 1B.

Connections may be established via the Wifi module 21 or bluetooth 20 module shown in FIG. 1B, dependent upon the range of the modules and components of the system relative to each other. In some cases where the local rendering modules, games application and collision manager of the users augmented reality ("AR") display apparatus 1 are in the same local vicinity as IR Laser Gun Apparatus 47 or that of the object upon which a hit is being detected then the use of the bluetooth connection between the users IR Laser Gun Apparatus 47 and their Augmented-reality display apparatus 1 or the other users augmented reality ("AR") display apparatus 1 to determine the other users position relative to the projectile of the Laser IR beam may suffice as determinable by the games application 36 and observer component 25 using volumetric data from the real-world.

In other cases where the target is greater distance the local games application 36 and client 28 may connect via the network over WiFi to the central game server 88 or host 89 to gain state information on the target in terms of their three dimensional Cartesian coordinates and whether the user has a shield, in the process of determining and registering a hit from a real-world weapon such as IR Laser Gun Apparatus 47, or a virtual weapon.

The local client 28 as depicted in FIG. 2, is responsible for maintaining the local game state of the game and to process user inputs as well as retrieving global state information on other clients and to aid the games application 36, collision manager 26 and rendering module 27 in the process of the determining of hits and the rendering locally of virtual game objects that are visually representational of the game state.

User inputs include the processing of hand gestures, voice commands, inputs from real-world game objects such as IR Laser Gun Apparatus 47 and head-tracking movements for example among other input forms such as the processing of changes in the state of real-world objects or surfaces provided by the observer module or changes in the state of other real-world usable game objects or AI characters 94 or virtual game objects 106, virtual AI Characters 105 etc.

The local client module 28 shall handle all user inputs including physical h and gestures such as hand signals used to signal actions, voice or spoken vocal commands, touch where the user may physical interact with use of touch screen, buttons, physical trigger mechanisms with a real-world game objects such as the display surface of a handheld IR Laser Gun Apparatus 47 or the display surface of real-world physical AI character display surfaces or scenery both detectable by means of touch-sensitive screens on the real-world game object and/or the use of the users cameras 7R, 7L.

Inputs may be provided to the local client 28 via users augmented reality ("AR") display apparatus 1, gesture recognition module 30 and/or speech recognition module 33, dependent on the input type. Alternatively, inputs may be provided by the collision manager 26 upon detecting from the hand tracking data provided by the gesture recognition module 30, that the users hands or fingers have intersected or collided with a real world object.

Furthermore, inputs may be provided by real-world objects which have touch-sensitive display screens on their surfaces which includes handheld IR Laser Gun Apparatus 47, handheld IR Shield Apparatus 90, real world AI Characters 94 and all other real-world game objects that posses touch-sensitive display screens on their surface and which are physical and tangible in form in the real-world, where inputs are passed via the network 97 by the devices local client to the games client 28 of the users wearable augmented reality ("AR") display apparatus 1 and game server 88 or host 89 for processing and the invoking of the rendering of virtual images for visual effects.

An input may be a trigger event, generated by a user physically pulling the trigger mechanism 53 of their handheld IR Laser Gun Apparatus 47 or activating their handheld IR Shield Apparatus 90 or IR Proximity Mine Apparatus 91 for example in which IR Beams/IR Laser Beams are projected from the IR Transmitters and IR LEDs of these devices.

Based on these trigger events the local client 28, shall invoke the rendering via the rendering module 27 of augmented virtual images of the moving IR laser projection from these devices based on the devices direction, orientation and world coordinates provided in the form of a directional vector and six dimensional matrixes which includes the world coordinates expressed as points on x, y, z and pitch, roll and yaw (p, r, y) values for each trigger event representing each fired IR Beam/IR Laser Beam. The augmented virtual images are then displayed visible to the users via their augmented reality ("AR") display apparatus 1, micro display 3.

These virtual images may in the form of two 2D Stereoscopic images or a Holographic or Hologram image among other forms for presenting moving 3D objects of the IR Laser beam fire from the use by the user or other users of a handheld IR Laser Gun Apparatus 47, handheld IR Shield Apparatus 90 or IR Proximity Mine Apparatus 91 resulting in a trigger event occurring.

Inputs passed to the users Augmented Reality Display Apparatus 1 client module 28 may be used for processing for the purpose of invoking the rendering augmented imagery via the rendering module 27 as a result of the user's physical interaction with a real-world game object see through the user's micro display 3, or the direct rendering and display of images on the display surfaces of real-world objects.

Many forms of hand gestures, voice commands our touch-sensitive sensor inputs such as swipe or pinch may be used in this way, including complex hand movements and gestures for which different hand gestures may invoke the rendering and display of augmented imagery via the rendering module 27 and light display module 5L, 5R as a result of the user's physical interaction with a real-world game object see through the users micro display 3, or the direct rendering and display of images on the display surfaces of real-world objects.

It should be noted that the system and client module 28 together with the game application 36 and engine 35 is capable of supporting also many forms of inputs not just limited to hand gestures, voice commands or touch-sensitive sensor inputs from touch-sensitive display screens, but the many other forms of inputs detailed within the disclosed embodiments herein.

In addition, the physical use of IR Laser Gun Apparatus 47 may serve as an input in which the physical laser projections registered as IR outputs and inputs in which hits may be tracked by the use of optical sensors and where the IR Laser Beam fire projectile of the IR Laser Gun Apparatus 1 is tracked as an output on the device used to track also the amount of failed hits and ammo remaining etc.

Other inputs may include physical movements of the user's body or real-world objects which can invoke the rendering of a game scene, in which the collision manager 26 may detect an intersection between real-world users, AI Characters 94, objects or virtual remote users 107, virtual AI Characters 105 and virtual game objects 106 based on their directional vector, model and world coordinates.

This may allow additional types of game play in which physical contact may also be performed as part of the game play by real-world users, AI Characters 94, objects which can affect the state of virtual remote users 107, AI Characters 105 and game objects 106. For example, a user could invoke a physical action of their body detectable via their camera(s) 7R, 7L which is a motion of their legs in which based on proximity in three dimensional space to other real-world users, game objects, AI Characters 94 or virtual remote users 107, AI Characters 105 and game objects 106, this could invoke a change in the state of other real-world users, AI Characters 94, objects or virtual remote users 107, AI Characters 105 and objects 106. Where as a result this may invoke the rendering and display of augmented imagery via the rendering module 27 seen through the user's micro display 3, or the direct rendering and display of images on the surfaces display panel faces of other real-world users, AI Character 94 or Objects where they posses a display screen on their surface and which are physical and tangible in form in the real-world.

Note the detecting of such motion as hand or leg movement may be captured by the gesture recognition module 30 which may produce a Vector touch point (x,y,z) which may be used in the determination of a response.

Alternatively collisions or hits can be determined by the retrieval of state information where every client module including the users augmented reality ("AR") display apparatus 1 client module 28, shall connect to the game server 88 or host 89 via the network 97 for the passing and retrieving of state and event information in which the game server 88 or host 89 maintains state information on all real-world users, game objects and real-world AI Characters 94 or virtual remote users 107, AI Characters 105 and game objects 106. This includes the exchanging of directional vector information, model and world coordinates/positional vectors, six dimensional matrixes together with any relevant data on hit boxes or other state information which may be used in conjunction by for example the users augmented reality ("AR") display apparatus 1 collision manager 26, in the determination of outcomes resulting from hit detections or independently by the local client 26 in the handling of inputs that are non-collisional. Here the game server 88 and host 89 shall be the main source of authority on all state information pertaining to all real-world users, game objects, real world AI Characters 94 or virtual remote users 107, AI Characters 105 and remote users 106.

Each corresponding local client applications on the real-world users augmented reality ("AR") display apparatus 1, real-world AI Characters 94 and real-world objects such as the IR Laser Gun Apparatus 47, IR Shield Apparatus 90 and IR Proximity Mine Apparatus 91 shall connect to the game server 88 and/or host 89 via the network 97 to retrieve state and event information on all other real-world users, AI Characters 94, objects or virtual users 107, AI Characters 105 and objects 106 which may be used to invoke an action.

Example actions include the action of invoking the described rendering and display of augmented imagery via the rendering module 27 seen through the user's micro display 3, or the direct rendering and display of images on the display surfaces of other real-world users, AI Character or Objects where they posses display screens on their surface and which are physical and tangible in form in the real-world. These invokable actions shall be dependent on the authority given to the local clients of each real-world users, AI Characters 94, objects where clients may be given the authority to invoke a rendering and display of images on another dependent on their level of given authority.

It should be noted here that in the previous example a user's physical action or motion such as kicking motion or push, this may be detected by either their gesture recognition module 30 or by the touch screen display panels of the surface display panel faces of a user's IR Mixed Reality Suit 93 or a real-world AI Characters 94 surfaces could invoke a direct rendering and display of images on the surfaces display panel faces of real-world users or AI Character 94. Also, that real-world AI Characters 94 comprise of multiple triangle display screen surfaces forming a real world mesh and 3D model that is visible to the naked eye without visual aid. Similarly, user wearable devices such an IR mixed reality suits 93 which are a form of 3D clothing consists of wearable display surfaces formed from graphite material or an organic material such as OLED when multiple display panels arranged as triangles or quads form a 3D structure over the user's body allowing the direct rendering onto a user which may be seen without any visual aid in the real-world by the user and other users.

In addition, the game server 88 or host 89 is capable of tracking multiple real-world users, AI Characters 94, objects where in real-time data inputs from the different real-world users, game objects and real-world AI characters 94 captured from their GPS tracker and sensor(s) such as the accelerometer and gyroscope, which maybe used for tracking game physical clients such as handheld devices and moving objects like an IR Laser Gun Apparatus 47, IR Shield Apparatus 90, IR Proximity Mine Apparatus 91, or other moving objects such as real-world AI Characters 94 that are physical and tangible in form in the real-world and which are operable to move around the three-dimensional space of the laser tag game location in the real-world.

Returning to FIG. 2, the observer module 25, rendering module 27 and all other software modules run as programmable software modules all run on top of the O/S layer 38 as executable programs programmed to perform part of the functions described in the embodiment of the augmented reality and mixed reality game system described herein.

The modules are programmed to access the lower level hardware of the system, such as the hardware sensors 9, Central Processing Unit, Graphics Processor Unit (GPU) and Cameras 7L, 7R among the other hardware as depicted in FIG. 1A and FIG. 1B, of the users ("AR") head-mounted display apparatus 1 as required to perform their function. These software modules are programmed to access the lower level hardware of the system via well defined APIs and the device drivers for the hardware components of the system depicted in FIG. 1A and FIG. 1B. The device drivers shall convert the input/output instructions of the physical devices such as the sensors 9 and camera(s) 7L, 7R, into a format that the operating system ("O/S") and upper layer modules such as the head and motion tracking modules 29, and observer module 25 can understand. The device drivers may also be used to control the hardware with suitable system libraries.

The device drivers may be supplied built in with the O/S of the users augmented reality ("AR") head-mounted display apparatus 1 or maybe installed separately. In addition to the software modules and device drivers the software stack of a wearable ("AR") head mounted display apparatus 1, also consists of an operating system ("O/S") 38, a set of system libraries, and a kernel 39.

Device drivers run at the kernel level and allow the software functional modules as shown in FIG. 2, to be able to communicate with the hardware in order to control the hardware devices of the users augmented reality ("AR") head-mounted display apparatus 1 as shown in FIG. 1A and FIG. 1B. Access to the lower level hardware and control of the hardware of the users augmented reality ("AR") head-mounted display apparatus 1 is provided via the system kernel and or the device drivers directly.

Here the kernel module 39 of the system may be used improve performance in which the device drivers may be provided as depicted in FIG. 2 in the kernel 39 as built in or modular or may made accessible in the user space in which the software modules and applications reside.

Alternatively, a device driver may be made available both in the kernel space and the user space where for example the GPU drivers may be made available in both and in which for performance the rendering module 27 may use the kernel to access and control the use of the GPU in the rendering of the game scenes during a laser tag game.

System libraries provide configuration data, pre-coded programmable instructions, system calls, subroutines, and classifications provided in the form of non-volatile memory resources used by the software modules of users as shared libraries in order to perform their functions as described in the embodiments of the disclosed invention.

For example, some of the system libraries may assist in the rendering process such as the use of 3D libraries such as Open Graphics Library (OpenGL) or Direct 3D may be used to invoke the use of the GPU in the game real-time rendering mathematical operations and in the rendering pipeline process, in which the rendering module 27 may invoke the use of these libraries to perform a system call to use the GPU in the rendering process to render 2D or 3D vector graphics via the library API, instead of directly making the system call in its code to the GPU.

Here the user of system function calls by the system libraries may be invoked making a function call from the software modules such as the rendering module 27 to the OpenGL® library, to invoke a system call to perform a rendering function by the GPU. The use of system graphics libraries such as the OpenGL® library may be used in the entire rendering process, in the game computations and mathematical operations in the use of shaders, geometry, texture-maps, sound, transformations, effects in the real-time rendering of game scenes by the rendering module 27, with the GPU.

These system graphics libraries maybe used also in the performing of subroutines, system calls via the Kernel and device drivers. In addition, the system libraries maybe used in the control of the display of pixels on the user's micro display 3 of their ("AR") head-mounted display apparatus 1, in which a sub-routine call or system call may be made by the graphics system libraries via a higher level API call from rendering module 27 as described in the embodiments of the disclosed invention. Furthermore, similarly this could be used to support a higher level API call from rendering module 27 in which graphics libraries such as OpenGL shall handle the subsequent sub-routine and lower level system calls to the GPU, as part of the rendering process of game objects and scenes in which the rendering module 27 shall provide the vector values for the 3D rendering of an object or surface to be rendered and displayed augmented over the users view of the real-world.

The system libraries are a shared resource which may be used by multiple modules or instances of the rendering module 27 for example in the performing of complex renderings of game scenes. Many forms of graphics libraries maybe used, OpenGL has been provided as one example usage of a graphics library for which other types may be used.

In addition to the mentioned software modules and the system components of the user's wearable augmented reality ("AR") head-mounted display apparatus 1, the system may include a holo conversion module used to convert 3D and 2D images into holograms or holographic images.

Furthermore, the users users wearable ("AR") head-mounted display apparatus 1, may feature an IR Receiver/Sensor Handler Module 46 as depicted in FIG. 2 which works with the IR Sensor in the registering of hits detectable by light from IR Sensor or this could be handled by the client module 28 directly.

It should be noted that the described functional modules in FIG. 2 are all software based modules programmed and coded to perform their functions in embedded programming languages such as C or C++ for example used to make system function calls or to invoke say a draw call for the rendering and display of a virtual image. Equally though some or all of the modules could be hardware based and or a combination of programmable software and hardware as the functional modules of the users wearable augmented reality ("AR") display apparatus 1.

FIG. 3 shows a method of rendering and displaying a 3D virtual images on a wearable ("AR") head mounted display apparatus 1 and micro display 3, using a stereoscopy or stereoscopics technique and a collimating lens 4L, 4R together with waveguides 22L, 22R which direct the image light into the user's eyes.

The micro-display 3 is placed within centimeters of the user's eyes in which the augmented display apparatus sits on the users nose and head as a wearable device which provides the users field of view into the real world and virtual world of the game.

As depicted by FIG. 3, the 3D image 41 is first converted through a process of rasterization into a 2D image, as part of the rendering pipeline, where in the example this shows a 3D cube which has points along the x, y, z axes which form its shape, in which two slightly differing offset and 2D stereoscopic images are generated 42L and 42R. As a result, the cube is now formed of 2D lines, around x or y axis where the two differing and slightly offset 2D images now have two vectors resulting from one vector being dropped from the 3D form of the cube during this process.

It's important to note every 3D or 2D object as previously described has a set or points that denotes its location and world coordinates in three-dimensional or two dimensional space i.e. x=1, y=2 respectively. The three dimensional space in which an 3D object exists therefore is denoted by three points along the x, y, z axis and its origin in which typically the point along the z axis is dropped during the process of converting a 3D image into a 2D image. In addition, the objects shape must be converted from a 3D image to a 2D Stereoscopic form where first the 3D image must be converted into 2D.

In the example cube shown in FIG. 3 there are 8 points that define the vertices of the 3D cube. Each point or vertices has a 3D Cartesian coordinate denoted by a value for x, y and z. Lines can be drawn between these points to form a shape in which in the example herein this would be a 3D cube. When converted to 2D the objects points are converted onto a 2D plane in which the z axis is dropped. Here the cube may still have 8 points however it is no longer 3D. More complex shapes when converted from 3D to 2D may result in less points.

During this process of conversion, the 3D image is also converted into differing and slightly offset 2D stereoscopic images in which through a process of rasterization, a rasterization algorithm takes the 3D image and converts it into a 2D image in which this process uses the previously generated triangles from the prior rendered 3D image and transforms them in pixel sized fragments.

Here the rasterization algorithm takes the game object string of vertices and faces then converts as described the three dimensional points x, y, z in two dimensional points for display on the users micro display 3. In addition, the image may also be clipped based on the user's perspective projection and the size of the micro display 3. The fragments are then processed by the games engine 35 fragment shader to generate pixels which are assigned final colour values. The pixel values that includes their coordinates and colour are then written to a frame buffer from which the 2D stereoscopic images are then drawn on the micro display 3.

Each display portion 2L, 2R depending on the display type being LCD, LCOS or TOLED, is then illuminated/activated/excited or the LEDs are activated by the light display modules 5R, 5L according to the pixel coordinates and colour of the two differing 2D stereoscopic images, where the left 2D stereoscopic image is illuminated in the left portion of the display 2L, and the right 2D stereoscopic image is illuminated in the right portion of the display 2L. The resulting image lights is then directed onto the collimating lens 4R, 4L of micro display 3 which then collimate the images into a plurality of beams where the light exits 43 these beams corresponding to the individual input beams from either portion of the display screens 2R and 2L via the waveguides 22L, 22R onto the users corresponding left and right eye 44L, 44R. The light corresponding to the right image 42R, is then received by the right eye 44R and the left image 42L of same object but at a slightly different angle is received by the left eye 44L.

The left and right eye 44L, 44R lens on the user's eyes then projects the light beams of differing 2D Stereoscopic or Stereogram images onto each retina through process of light reflected onto the human eye, where the light is then passed down the optical nerve of the users to their brain.

The user brain then converts the light from the differing 2D stereoscopic images which are then combined or reconstructed to a form of the original 3D image 45 through a process of stereoscopy in which the image gives the perception of 3D depth and in which the 3D image appears overlaid on real world environment view, visible through the through the transparent display of the user's micro display 3 as depicted in FIG. 3. The stereoscopy technique in which the brain reconstructs a single 3D object from two slightly different stereoscopic or stereogram images each showing a different angle of the object which in the example given in FIG. 3 is a cube is achieved via binocular disparity.

It should be noted that during this process in the augmenting of the 2D Stereoscopic images over the users real-world view the system uses a process of spatial mapping, mesh creation and rendering techniques such as ray casting to generate and render the virtual game object in a specific locations on real-world object surfaces at a defined point in three dimensional space that intersects with a plane from the formulated values for (x,y,z) relative to the real-world.

Surface data, Mesh data and 3D models provided by the observer component 25 provide the volumetric and geometric data needed to visually render a virtual game object in a specific location in the real-world at a specified coordinate in 3D space. This 3D coordinate is translated to a 2D coordinate and screen pixel coordinate as described through the process of rasterization and fragmentation which forms part of the rendering pipeline process.

The rendering module 27 during this process may make a direct draw call using array of RGB values or the use of in-memory bitmap as an alternative method to using the described fragment shader and frame buffer. In addition, the rendering module 27 based on the generated pixel coordinates and colour may instruct the display device drivers and light display modules 27A, 27B on the pixel position expressed as a coordinate i.e. (x1, y1) on the micro display 3 surface, the colour of each pixel and any line positions or shape boarders for which pixels should be displayed on together with any fill properties as required to display of each of the 2D stereoscopic images in either display portions 2R, 2L of the user's micro-display 3.

During this process the system may also employ perspective projection techniques which visually show distant objects as smaller to that of closer objects, which provides a greater realism to the projected game scene and virtual game objects on the user's micro display 3. This may use a virtual camera not shown in FIG. 3, where the camera's position, orientation and field of view provides the users field of view into the virtual world. In addition, a matrix for the camera view maybe applied in the mathematical operations of the rendering pipeline which results in the conversion of the images to the users correct field of view.

This camera position also controls the transformation and projection process of the 2D stereographic images over the users real-world view where point A has a value for x, y, z representing the 3D position that is to be projected, point C has an x, y, z value representing the 3D position of the camera, point O represents the orientation of the camera (also the users head orientation) that is represented by Tait-Bryan angles and finally point E is the viewers position (head position) relative to the surface of micro-display 3 which goes through point C representing the camera view.

Here the 3D vectors as are converted to a 2D vectors in the described process of rasterisation in which the x, y coordinate is carried over and the z coordinate in dropped. In which x/y is used as the projection plane in which the 2D stereoscopic image is projected onto the 2D plane which is then mapped to the corresponding screen coordinates corresponding to the positional points or converted model coordinates of the original 3D image. In addition, though during this process a camera transformation may be applied using matrices or other forms of formulation without using matrices.

Alternatively, the system may use homogeneous coordinates, in conjunction with other argument variables that factor in the distance of the user's eyes to the surface and size of the display surface of the micro-display 3. Subsequent clipping and scaling operations may be performed to map the converted left and right eye 2D images to the micro-display 3, display screen portions 2L, 2R which maybe arranged and configured as tiled display. It should be noted the virtual camera transformation maybe varied according to the position of lens and the uses actual field of view into the real-world. In addition, a view matrix may be used to represent the virtual camera field of view and a projection matrix may be used projection of the 2D stereoscopic images on to the user's micro display 3.

Specific to the described use of stereoscopy or stereoscopics techniques, the projection of the perspective projection maybe orthogonal to one of the main axis along the three-dimensional cartesian planes which may be along the z axis, where the users eye vector may be set up as default this way on initialisation of the game.

The optical lenses 4R, 4L which control the users field of view and may be adjustable by changing the position of the lens, allowing adjustments to be made to the collection efficiency, the spatial resolution setup, the configuration of the illumination and in collection angles. This maybe used for optimising the users field of view into the real-world and for making adjustments to suit the user's eyesight in which the position of the lens could be changed for example.

The projection and illumination of pixels of the virtual images may be offset accordingly as a result of the changes to the configuration of lens position and changes to the user's degree of field of view ("FOV") as part of the system setup, in which the users wearable augmented reality ("AR") display apparatus 1 device settings maybe stored as part of the user set up on the system and used in the display of pixels of augmented virtual images over users view of the real-world. Also, the coordinate position of the virtual camera may be offset to accommodate change in the position of the lens as part of the user custom set up of the users wearable augmented reality ("AR") display apparatus 1 device setting.

In addition, the display of stereoscopic images is assumed here to be used with Micro-display 3, in a time parallel stereoscopic display configuration where each eye sees a different screen as depicted in FIG. 1A and FIG. 3, and image in sequence during the display of a virtual game object or scene where the waveguides 22L, 22R act as optical guides directing to each eye the correct view. This technique is sometimes also referred to as HMD Stereo.

Like with other forms of augmented reality, virtual reality and HMD displays separate video sources as an alternative to the described method of displaying two differing 2D stereoscopic images may be displayed in front of each eye to achieve a stereoscopic effect. These video sources may be a sequence of a game animation generated as an output from the rendering pipeline in which two separate video sources are guided by the waveguides 22L, 22R to each correct eye.

Furthermore, the users augmented reality ("AR") display apparatus 1 device is equally capable of supporting other forms of stereoscopy using as autostereoscopic in which only one image is supplied to both the left and right eye portions of the micro display 3, screen portions 2R, 2L.

Returning briefly to FIGS. 1A and 1B, in reference to the micro display 3, depicted in FIG. 1A and FIG. 1B, as stated the user augmented reality ("AR") display apparatus 1, is capable of displaying 2D stereoscopic images as well as true 3D holographic images and holograms in which the optical lens components 4R, 4L may have a form of diffraction grating or holographic grating 24L, 24L layered over the respective left eye and right eye lens which form a holographic lens. The resulting diffracted waves from the holographic lens maybe determined by the grating spacing and the wavelength of the light in which the ray of light behaves according to laws of reflection and refraction as with a mirror or curved lens.

Figure 4:
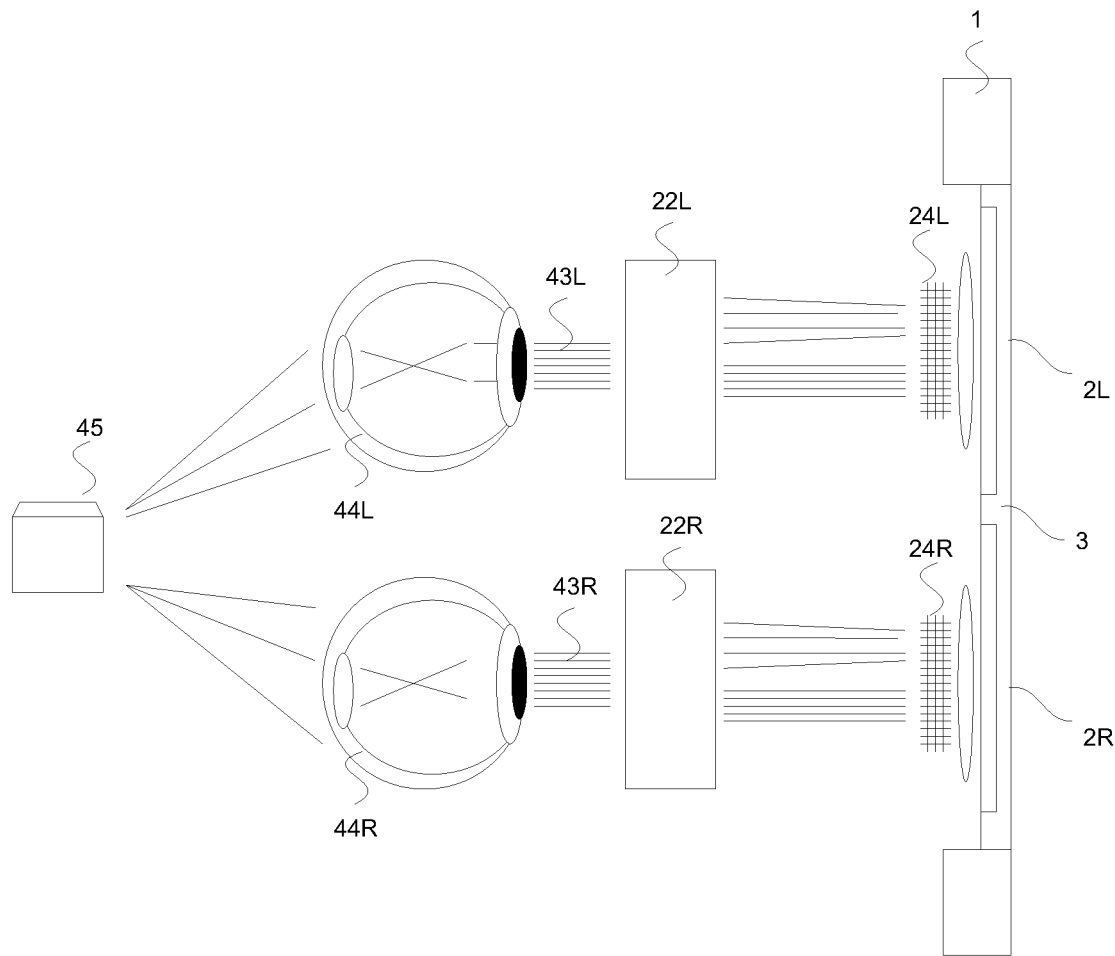
FIG. 4 shows a method of passing light onto the right and light human eye for the display of 3D holographic and hologram images using a head-mounted augmented reality ("AR") display apparatus 1.

FIG. 4 shows an example method of displaying 3D holographic images and holograms via the micro display 3 of the users wearable augmented reality ("AR") display apparatus 1, in which the micro display 3, comprises of two Light Display Modules 5R, 5L, two collimating lens 4R, 4L, two waveguides 22L, 22R and two display screen portions 2L, 2R providing the users left and right eye view in to the real-world.

Similar to FIG. 3. the micro-display 3 is placed within centimeters of the user's eyes in which the users augmented reality ("AR") display apparatus 1 sits on the users nose and head as a wearable device which provides the users field of view into the real-world and virtual world of the game.

The waveguides 22R, 22L as depicted in FIG. 4 are used to guide the image light onto a diffraction grating or holographic grating plate 24L, 24R which form a transparent layer on top of optical lens components 4R, 4L and display screen portions 2R, 2L of the transparent micro display 3. In this way the light wavelengths resulting from the original holographic image or hologram maybe guided by the optical couplings and waveguides 22L, 22R of the micro display 3 and projected on to optical lens pieces 4R, 4L from which the light is collimated and projected onto the diffraction grating plates 24L, 24R. The light beams are then directed according to the spacing of the grating and wavelength of the light where the image is diffracted before exiting towards the user's eyes 44L, 44R via the display screen portions 2R, 2L and respective waveguides 22R, 22L in which the diffracted image light then intersects at determined position of the user eye lens and pupil.

During this process the optical display lens 4R, 4L on the transparent plate and surface of the micro display 3 are illuminated identically in position to that of the referenced original 3D holographic image in which the beam is guided by the light modules 5L, 5R according to the reflection levels and the exact same position of light relative to originally generated holographic image or hologram, on to the diffraction grating plates 24L, 24R so as to enable the reconstructed hologram or holographic image to be formed substantially the same as the original source image. In the example image for simplicity this shows the same 3D cube 45. In addition, the optical waveguides 22L, 22R guide the propagation of the light of the holographic or hologram image source to the user's eyes using a process of diffraction and total internal reflections (TIR) in which the light exits the corresponding display portions 2R, 2L of the micro display 3 towards the user's eyes at a determined angle of intersection or incidence.

The lens on the user's eyes then projects the light beams the diffracted 3D holographic image on to the retina through process of light reflected onto the human eye. The light is then passed down the optical nerve of the users to their brain which then converts the light into a 3D virtual image, where through the transparent display of the user's micro display 3, the 3D holographic image or hologram then appears overlaid on real world environment view of the user as an augmented virtual image. Dependent on the display type individual pixel coordinates may be used in directing of the illuminating of LEDs and directing of the light in the display of holograms and holographic images.

Alternatively, laser diodes maybe used to direct the image light as a coherent image light to the diffraction grating plates, in which the light display modules 5L, 5R shall guide the light to the diffraction grating plates via the optical waveguides 22R and 22L at a predetermined angle of incidence which may be based on the user's eye tracking data provided by the eye tracking module 32. This is required to ensure that the light beams enter correctly the users eye lens so as the image is correctly formed. Light emitting diodes (LEDs) of the transparent display may be used to illuminate and project the image light which is projected and carried by the waveguides 22L, 22R along to the display screen portions 2R, 2L via the optical lens components 4R, 4L where it is collimated onto the diffraction grating plates 24L, 24R, before exiting towards the user's eyes via the waveguides 22L, 22R, where the micro display 3 maybe a form of transparent organic light emitting diode display (TOLED).

Alternatively, the display may be a form of Liquid-Crystal on Silicon LCoS or a liquid crystal display (LCD) in which maybe a transparent and transmissive display type in which the display is illuminated by activating the display where the image light is then projected and carried by the waveguides 22R, 22L along to the display screen portions 2R, 2L via the optical lens components 4R, 4L in which the image light is collimated and directed onto the diffraction grating plats 24L, 24R before exiting towards the user's eyes via the waveguides 22L, 22R.

In both described display configurations and types of micro display screens, the waveguides 22L, 22R maybe used to direct the projected image light towards the user's eyes at a determinable angle of incidence for the display of holographic images or holograms. The light modules 5L, 5R maybe configured to control the projection of the image light via the described use of waveguides and a diffraction grating or may be configured to provide the image light to the user's eyes originating from the hologram image source via other means that include the use of slanted diffraction gratings or other forms of optical gratings such as Fiber Bragg grating. Input sources to the waveguides 22R, 22L which output the light to the user's eyes, therefore may include a Fiber Bragg grating, or other forms of grating suitable of supporting a hologram which has a three dimensional structure where the incident of light can be diffracted by the grating at a specified angle, referred to as the Bragg angle.

This may be used to support a volume or thick hologram type which is has a three dimensional structure, where the hologram is illuminated with a light source incident at the original reference beam angle and is reconstructed at the same wavelength or if the illuminated angle of incident is varied wavelength then the colour maybe varied.

The Micro display 3 as described may be a form of LCOS, LCD or Organic Display for the support of displaying holographic images and holograms. In addition, the Microdisplay 3, could be a form of photorefractive crystal which may be used to support dynamic holography where the illuminating the grating using two coherent laser beams by means of beam splitter or separate sources, and redirecting the beam using mirrors or collimating lenses together with waveguides 22L, 22R results in light passing through the photorefractive crystal could be used.

In such a configuration upon the light passing through the photorefractive crystal the resulting refractive index grating then would diffract the beam resulting in the pattern of the image being stored on the crystal, where upon activating/exciting/illuminating the display, the image light would then exit the Micro display 3 back via the waveguides 22L, 22R to the user's eye lens in which the users brain then forms a 3D image of the holographic image presented as augmented reality virtual image over the users real-world view seen via the users micro-display 3.

During this process of the use of a refractive index grating in the diffracting of the light beams, causes one beam to gain more energy than another, in which this becomes greater with intensity of light, whilst simultaneously reducing of the intensity of light in the other beam which is referred to as phenomenon called two-wave mixing.

In the described display apparatus configuration of the micro display 3, of the users augmented reality ("AR") display apparatus 1 this would satisfy the Bragg diffraction condition. A key point here is the pattern of the holographic image can be overwritten which allows the support of a form of dynamic holography in which through flooding the crystal with uniform light this will excite the electrons causing them to be re-distributed uniformly and shall erase the pattern allowing new holographic patterns to be stored and holographic images to be displayed dynamically.

Similar to as described previously in the projection and display of holographic images, the lens may collimate also the image light into a plurality of beams as shown in FIG. 3, where the light is directed by the Light Modules 5L, 5R via the waveguides 22L, 22R onto the respective display screen portions 2R, 2L which feature a collimating lens type in which the light is collimated into a plurality of beams on to the grating 24L, 24R, that exit via the wave guides 22L, 22R onto the users corresponding left and right eye. The light is then projected onto the lenses of user's eye's where light is passed through to the retina's of the users eye and the users brain then forms a 3D image.

The projected image in either display portion may be combined, diffracted and layered during this process to produce a 3D holographic image for which the process of diffraction and the uniform illuminating of the display crystal maybe is controlled by the Light Display Modules 5L, 5R in the display of dynamic holographic images. Total internal reflections ("TIR") may also be applied to direct the resulting light at the user's eyes using a refractive index in which the Light Display Modules 5L, 5R, in conjunction with the waveguides 22L, 22R may direct the light to user's eyes using diffraction and TIR based an index of reflection.

As described previously the groove period may also be ordered on a wavelength, such that the spectral range is covered by a grating and the groove spacing is aligned as required to provide holographic gratings where the light display modules 5L, 5R shall guide the beam or beams of lights of the image onto the grating which shall direct the beams according to the spacing of grating and wavelength of the image light before exiting towards the user's eye. The holographic grating may have a sinusoidal groove profile.

Furthermore, different types of gratings may be used to make RGB colour holograms, through the layering of plates on the optical lenses of the users augmented reality display apparatus 1 to form holographic lenses capable of displaying fully coloured 3D holographic images. Adjustments may be made based on the brightness sensors to factor in the level of outside light that is passing through the transparent micro display 3, where this may be a transmissive type of display screen.

The generated virtual images of the game objects and game scenes produced by the rendering module 27 may be converted using various hologram producing methods such as the use of conversion techniques in which the hologram or holographic images are converted into a suitable displayable holographic or hologram form and displayed by illuminating the light at a reference angle according to the reflection levels and the exact same position of light relative to the original image which is handled by the light display modules 5R, 5L.

During the display process of holograms, beams of light are guided by the light display modules 5R, 5L on to the respective display screen portions 2R, 2L, optical display lenses 4R, 4L and grating in which the image light may also be diffracted at a particular outbound angle and corresponding angle to that of the users current gaze direction where the image light then intersects at the respective angle with the user's eye pupil enabling the light beams to be passed through the users eye's cornea, pupil and lens.

As light passes through the cornea it is bent and refracted on to the lens, where as the light then passes through the user's eye lens for either eye, during which each eye lens further refracts the light on to the eye retina, following which the virtual image is reversed and turned upside down. Light emanating from the formed virtual image images then travel down the optic nerve to the Occipital lobe from which a virtual image is then reformed by the user's brain of the 3D holographic image, where the virtual image then regains its original perspective and the user sees the virtual image of the game object or scene as a three dimensional hologram augmented over the users real world view.

During this process of the Light Display Modules 5R, 5L are capable of guiding the light waves to the user's pupil via the waveguides 22L, 22R such that the light beams intersect at the correct outbound angle with the user's eye pupil, lens and cornea, so as the user is able to view the virtual image of the game object or scene using eye tracking data produced by inward facing cameras (s).

The inward facing camera(s) 10R, 10L as depicted in FIG. 4 may be configured to capture images of the user's left and right eye lens shape and gaze direction, from which a six dimensional matrixes may be generated by the system for each of the user's eyes to capture the pupil position and directional orientation of each of the user's eyes. The captured pupil position lens and eye position may be used to compute the users current field of view ("FOV") in three dimensional space, expressed as a three dimensional cartesian coordinate x, y, z and together with pitch, roll and yaw (p, r, y) on a suitable second axis or other forms of coordinate systems.

These values may be combined with additional physical attributes and shape of the user's lens and pupil maybe used to determine the users point of focus and current gaze based on a measurement of the shape and diameter of the lens together with the pupil direction using multiple matrixes in the formulation of the determining of the user's current eye orientation and gaze. Here the system may model the human eye in which a second matrix maybe used to calculate the size and shape of the eye in which model coordinates together with world coordinates may be maintained by the system of the users left and right eye.

This may be used to adjust the source image together with projection configuration and display of holographic images on the users augmented reality ("AR") display apparatus 1 in real-time according to the user's eye position, orientation and the current focus of the user's pupil.

The system maybe based on analysis of the user's eye shape and movements make adjustments to the display of the holographic images and video through adjusting the Total internal reflections ("TIR"), refractive index and diffraction configuration, used to direct the resulting light at the users eyes. Additionally, transformations may be applied to the holographic image or hologram where the original source image is a virtual 3D object generated by the rendering module 27 during the graphics rendering pipeline of the game in which a virtual game object may be scaled or rotated for example using matrixes according to the user's eye tracking data in which the system is capable of approximating the user's direction view and gaze from analysing the size of the human lens and direction of the pupil.

This may be used in combination with head tracking data where both the inward facing camera(s) 10L, 10R and sensors 9 of the users augmented reality ("AR") display apparatus 1, are used to track the users eye position, orientation and shape together with the user's head position and orientation in which transformations are then applied to the virtual game objects 3D models accordingly. Tracking inputs from the head tracking module 29 and eye tracking module 32 are supplied to the rendering module 27 which shall invoke a transformation on the virtual game objects.

These adjustments may be made also in real-time by the system through observing via the inward facing camera(s) 10L, 10R changes in the user physical eye attributes such as the direction of the pupil and the shape of the lens in which the human eye lens shall alter its shape for example to allow the eye to focus on objects at varying distances.

Based on the processing and analysis tracking data captured from imagery which defines the user's eye's current uses focus and gaze in the three dimensional space of the game, adjustments maybe made also to the projection and display of holographic images and holograms, in which the angle in which the image light of the hologram that intersects with the user's eye may be varied by altering also the source of the hologram or altering the state or arrangement of the users augmented-reality display apparatus optical components.

Here several different sources of holograms and holographic images or video frames may be pre-generated at differing angles of incident by the holo conversion module on the game server or users augmented display apparatus, which the system may select and display based on a determination of the user's eyes current focus and gaze using the six dimensional matrixes and the matrixes capturing the physical attributes such as the shape of the lens the system.

The users current focus and gaze into the real-world and the virtual world may be determinable also with the use of depth maps of the users real-world FOV generated by the observer component 25 together with analysis data gathered on the user's physical eye attributes from the inward facing camera(s) 10L, 10R captured images to determine the users current gaze in which based on a determination of changes in angle and direction of the user's gaze from the analysis of the captured images of the user's eye's, different source images or video of the generated holographic images at varying angles of intersection may be selected and displayed or transformations may be applied where the source of the holographic or hologram image is a 3D model generated by the rendering module 27.

Additionally, adjustments to the users augmented-reality ("AR") display apparatus 1, optical components may be made in which the adjustments may be made to the configuration of the optical lens and holographic plate to direct the holographic image light according to preserve the correct angle of incidence at which the light was provided relative to the user's current angle of their eye's and gaze.

Holographic film representing varying sequences of pixels in RGB form may also be used as an alternative methodology to reconstruct holograms in which multiple layered holographic films are used with different sequences of pixels to form holograms in which the hologram may be recreated using a combination of layered holographic film that provide the ability to reconstruct each colour channel of a hologram (R, G & B) and in which different angles of diffraction of the different holograms may be reproduced by using a reference beam of light to diffract the light differently on each of the holographic films to produce the original holographic image as a combined reconstructed hologram that is RGB.

In addition, the angle of incidence maybe reproduced through guiding the light to a waveguide at varying specified points on each of the holographic film layers. These points may be defined as a pixel coordinate in which the holographic film layers are used as a construct of varying pixel pallets and on a defined display resolution allowing the reconstruction of a hologram to a photorealistic level of detail and to high number of triangles and vertices.

Different data sources may be used to generate a hologram from real-world objects including the use of a real world object generated mesh and 3D models in which the hologram may consists of a high number of points referred to as a cloud of points or vertices from which a number of triangles form the shape of the 3D model for which the number of points or triangles is dependent on the detail of the real world objects shape.

Spatial mapping techniques may be used to generate volumetric and geometric data, mesh data and 3D models that have a number of cloud points and triangles that for a 3D represented object of a real-world object which may be used to generate a 3D hologram image of the real-world object using the users augmented reality ("AR") display apparatus 1, outward facing camera(s) 7L, 7R and sensors 9 to capture and then process images of real-world objects into 3D models which are then converted into hologram images using the 3D captured data.

Alternatively, structural light scanning techniques may be used to generate a cloud of points (CoP) hologram, in which a cloud of points (CoP) hologram may be constructed using the captured cloud points and 3D model data, through the use of algorithms such as Compensated Phase Added Stereogram (CPAS), Accurate Compensated Phase Added Stereogram (ACPAS) or Fast Phase Added Stereogram (FPAS). The generated CoP hologram using ACPAS algorithm may be converted into a synthetic hologram before being reconstructed using light modulators to generate an optoelectronic reconstructed hologram or using numerical Fresnel algorithm to produce to a numerical reconstructed hologram.

Here the beam may be guided by the light display modules 5R, 5L, to reproduce the CoP Hologram and the captured points of the original object in which the micro display 3 is illuminated at specific points on its surface representation of the points on the relative to the 3D model points on x, z and y.

The display of the hologram may be dependent on the selection of the viewing direction and reconstructed 3D model of the object, where relative to the user's eye position the displayed hologram image and 3D model may vary in which the system uses the inward facing camera(s) as previously described to track the users eye's and gaze where the 3D model is transformed through a process of transformation and the hologram is displayed accordingly by directing the light beams and illuminating the image at its respective cloud points and model coordinates to reconstruct a Cloud Of Points (CoP) hologram.

It should be noted as well as the producing of CoP holograms from real-world objects the same process described herein may be used in the construction of CoP holograms from virtual game objects where as an output of the graphic rendering 3D pipeline a cloud of points (CoP) hologram may be constructed using the captured cloud points and 3D model data, through the use of algorithms such as Compensated Phase Added Stereogram (CPAS), Accurate Compensated Phase Added Stereogram (ACPAS) or Fast Phase Added Stereogram (FPAS) where the vertices of the 3D model of the virtual game object and its triangles are used to produce the 3D model data for a CoP hologram.

Furthermore, CoP generated holograms of real world objects and virtual game objects may be augmented together during this process in which a combined image and synthetic hologram is produced. Hybrid content holograms (HCH) may also be produced in which through a process of optical field propagation the real-world image of the background is merged with the mask of a virtual game object to produce a reconstructed synthetic hybrid hologram.

Representational 3D points or world coordinates based on the geometrics and volumetric data of the real-world background and virtual game object is used to place correctly the virtual game object in front of the background image.

The system described herein is capable of supporting multiple sources for capturing, processing and displaying various forms of holograms and holographic images. Sources of data to produce and display holograms and holographic images includes multi-view point 3D or 4D captured images or 2D images, 3D or 4D generated computer virtual objects such as virtual game objects, structured light 3D or 4D images, and holography techniques for the capture of real-world images using a coherent (laser) to record images.

The system is capable of converting these data sources using holographic single (HR) path amplitude phase techniques or surface based geometry path using surface representational data, in which new elements are added dynamically in the composition and assembly of the hologram or holographic image, geometrical occlusions are applied and modifications are made to the geometry of a scene elements (X, Y, Z etc.)

The holographic displayable image is dependent on the angle of the user's view based on their head tracking data in terms of the users head position expressed as 3D Cartesian Coordinate (X, Y, Z) and their head orientation expressed as pitch, roll and yaw (P, R, Y). During this process modifications may be made to the illumination to reproduce the accurately the holographic image or hologram.

Here the of the light beams onto the user's micro display 3, may be dependent also on the user's head tracking data together with the user's eye position also in which the light modules 5R, 5L may guide the light accordingly, via the waveguides 22L, 22R to diffract the image light so as to intersect at a determined position of the user eye.

The display of the final holographic or hologram image shall be dependent on the mode of the users augmented reality display apparatus 1, where the this may be an eye tracking based holographic display as described within the varying embodiments of this disclosed invention or holographic display that is based on a horizontal perspective or full perspective.

In addition, conversions may be made to the holographic images and holograms to support other forms of augmented reality 3D displays such as stereoscopic 2D head mounted displays, autostereoscopic and other forms.

The holographic images or volume holograms or 2D stereoscopic images may be displayed on the users micro display 3 which create the illusion of six depth cues which aid the users perception of the virtual game object having a three dimensional form in the real-world three dimensional space, in which similar to the described use of two differing stereoscopic images, two differing holographic images or holograms for example may be provided one to the left eye and one to the right eye to provide a stereopsis, stereoscopy effect or a binocular parallax effect.

Perspective projection may be recreated in which the user see's objects that are further away as smaller. Occlusion can be applied to virtual game objects that are presented as holographic images or holograms.

Objects may be transformed through the described process of transformation based on the user head movements and orientation where a virtual game object may be scaled or rotated based on how far away the users head is to the objects three dimensional Cartesian coordinates and the users head orientation in terms of their pitch, roll and yaw where the source of the hologram or holographic image maybe a 3D model in which transformations can be applied. This may provide a monocular (motion) parallax perspective to the user in which the objects move in and out of the user's field vision as the user moves their head around the three dimensional scene of the game.

The collimating lenses 4L, 4R together with the waveguides 22L, 22R are used also in this process to correct the angle of light that enters into the eye, where the user then perceives the object further away than it really appears.

Based on the eye tracking capabilities as described, the system is capable of simulating through the rendering of virtual game objects and scenes which are augmented on the real-world view, the perspective of gaze and focus of a user's eyes into the three dimensional world of the game, in which the focus of object or scene displayed to the user is changed dependent on the users eye movements, position, orientation and the shape of their eye lens.

Here the system may adjust the detail of scenes through increasing of decreasing the detail of the mesh or number of triangles of the rendered images of an object or a surface which is displayed a virtual image over the user's real-world view. This creates the same visual effect as seen in the real-world when you focus your eye sight on an object such as reading words on a page of a book, in which the other surrounding objects or background view becomes out of focus.

This also has the advantage of reducing the amount processing needed in the rendering of an object or scene, where the level of the detail of the 3D models and mesh of an object or surface may be dynamically reduced in terms its number of triangles according to the user's gaze and current focus, where eye tracking data is provided by the eye tracking module 32 to the rendering module 27, which dynamically adjusts the level of detail of an object or surface during its rendering process by reducing the mesh or 3D model detail. This in turn reduces the number of mathematical operations needed in the rendering also of a game scene.

The system is capable of replicating the visual effect seen by the human eye changes in the lens shape and changes in direction in real-time using the described eye tracking capabilities together with the rendering module 27, which is capable of adapting in real-time the rendered scene based on inputs from the eye tracking module 32 which uses the inward facing camera(s) 10L, 10R to record and capture the users left and right eye movements, position, orientation and shape. Lastly as final depth cue, the system is capable of blurring portions of the image of the virtual game objects based on a detection from the eye tracking module 32 that the user's eyes have crossed as a result of focusing on objects which are very close to their face in which in the attempt to focus on the object with both eyes, the eyes become cross eyed thereby providing accommodation as six form of depth cue. Here the rendering module 27 recreates dynamically the image based on the user's eye tracking inputs from the eye tracking module 32 which uses the inward facing camera(s) 10L, 10R to record and capture if the user's eyes have crossed.

It should be noted that the effect of the transformations on a virtual game object effects the resulting projection of light from the converted image source of the 3D or 4D image of the virtual game object in which in the form of a digitally constructed holographic image or hologram from the output of the rendering pipeline, the resulting image light projected via the waveguides 22L, 22R onto the user's eye lens shall vary accordingly to achieve the described six depth cues in which the users brain then recreates a image which has a significantly same portion of the light fields as the provided holographic or hologram image.

Furthermore, it should be noted that the system described using either 2D stereoscopic images, or 3D holographic images or holograms is fully capable of providing multiple depth cues including physiological depth cues such as accommodation, convergence; motion depth cues in which parallax is created by transformations to objects relational to a user's head position and objects can be scaled to provide the effect of objects moving faster the nearer they are to the eye together with many other depth cues.

The system uses techniques as described such as head tracking and eye tracking to support this. In addition, using the eye tracking data may measure the user's interocular distance used in the optimisation for projection of virtual game objects on a plane relative to the users modelled eye position and real eye positions into the three-dimensional space of the real-world and the virtual world of the laser tag game.

It should be noted that the wearable ("AR") head-mounted display 1 as shown in FIG. 1A and FIG. 1B and the illustrated example methods in FIG. 3 and FIG. 4 respectively for displaying virtual images are provided by way of example of a configuration of such a display apparatus that could be used by the detail embodiments of this invention, for which there could be many variations in design, in use of hardware and the modules used etc. For example, some wearable augmented reality ("AR") head-mounted display device may contain specific custom digital signal processors (DSPs) as part of their on-board SoC design and other forms of sensors for tracking of hand gestures, others may include custom processor units such as a HPU or may have one single light engine and single display area.

The display and light engine configuration may vary where as an alternative configuration to the example wearable head-mounted augmented reality ("AR") display apparatus 1 as shown in FIG. 1A, techniques such as scanning known in the field of AR displays maybe used to replicate the same effect as input beams used to display a virtual holographic 3D image, in which these scanning systems are capable of replicating the same effect using a single beam in which simultaneous modulating of the colour and intensity of the image may be used. Other additional methods and techniques such as the use of embedding transparent pixels on a polymer plate of transparent glass placed similarly in front of the users can be used to achieve a similar AR experience.

Furthermore, alternative lower cost devices such as the use of a user's mobile phone with low cost solutions such as Google Cardboard® may be used where today most modern mobile cell phones feature many of the same hardware features such as a camera, accelerometer, gyroscopes where through adapting the screen to support stereoscopic images covering parts of the phone display such that the right eye sees only one portion of the display and the left see's the other portion using a single display and light engine one can create a stereoscopic type of experience through rapidly modulating and displaying alternate 2D images for the right eye and left eye. This could be used in this case as a lower cost implementation for use in the described embodiments herein.

Furthermore, the wearable head-mounted augmented reality ("AR") display apparatus 1 system described in the disclosed embodiment herein uses primarily the method of stereoscopy, holography or dynamic holograms, however the system may support other forms of 3D viewer and display technologies such as active and passive viewers, including active systems such as Shutter system, Polarization systems, Interference filter systems.

Alternatively, virtual retinal display (VRD) may be used. For example, low cost alternative liquid crystal display (LCD) shutter 3D glasses or wearable display could be used to display augmented scenes in which the system shall open and present the left eye image whilst blocking the uses right eye view and vice versa in a rapid succession of displaying alternative left and right eye images so that the user perceives the two images as a single 3D image.

Other methods for presenting images that create the illusion of an image having three dimensional form such as autostereoscopic, autostereogram, stereoscope or stereographic may be used in a wearable form similar to the described wearable head-mounted augmented reality ("AR") display apparatus 1 and to support the augmentation of images over the real-world view of the user's field of view as part of the game play during a laser tag mixed reality game.

FIGS. 1 to 4 provide an example augmented reality ("AR") display apparatus 1, however the described invention herein are intended to work with all forms of head mounted display, augmented display apparatus and 3D display apparatus which have a transparent display in which the user can see through to the real world.

The presented invention herein and subsequent embodiments, together with the accompanying claims should therefore be assumed in the broadest sense in which this applies to all forms of head-mounted displays, augmented reality head wearable displays and 3D head mounted display devices such as the alternative examples given. As detailed the invention described herein and its embodiments is intended to work with all variations of wearable ("AR") head-mounted display devices for which the descriptions of various configurations together with the illustrations in FIG. 1A, FIG. 1B and FIG. 2 should be treated as an example of some of the configurations of a possible one of many forms of displayable head mounted augmented reality and 3D displays supported by the embodiments of this disclosed invention.

Equally other examples of such alternative wearable head mounted augmented reality display devices such as the Microsoft Hololens®, MagicLeap® and Meta2® could be used by the disclosed embodiments and invention detailed herein to provide some of the features described such as the display of augmented reality virtual images over the user's real-world view and the other unique of some of features of the embodiments with modifications such the support for IR Sensors which are head mounted. The modules also as described and illustrated in FIG. 2, could be programmed to run on any one of these devices or other suitable head mounted wearable 3D display devices that satisfied the detailed hardware specified in the embodiments of this invention.

The specific parts of the embodiments of the disclosed invention described herein and in the respective claims is intended to work with many forms of augmented reality display devices such as that of Microsoft Hololens® or the MagicLeap AR® head mounted wearable display device.

FIG. 5A shows a physical real-world game object which is a handheld IR Laser Gun Apparatus 47, used during the game in laser tagging, in which this device is used by users to project infrared light at another users corresponding IR Sensor, where the referred to "IR Laser Beam" in the embodiments in the disclosures of this invention is an infrared beam, which when projected onto a user's IR Sensor/IR Receiver upon the IR light emission being detected by the IR Sensor/IR receiver the system shall register a score as a 'hit' or a 'tag'.

During this the projection of the IR Laser Beam, virtual images may be displayed via the users augmented reality ("AR") Micro-display 3 as augmented over the user's real-world view showing the projectile of the IR Laser beam within the three-dimensional space of the game, in which together with the moving projected IR Laser beam augmented imagery as 3D moving holographic image, hologram or stereoscopic images, 3D positional audio effects and/or perceptual based 3D sound audio effects or 3D spatial audio effects maybe played back to the user's ears in which the user can hear directional the moving IR Laser Beam as it is projected across the three dimensional space of the game space or laser tag arena.

A 'tag' or 'hit' is made when the beam of infrared light referred to as "IR Laser Beam" is projected by a user's handheld IR Laser Gun Apparatus 47 as a result of the user pulling the trigger mechanism 53, onto another users IR Sensors, or is alternatively computationally formulated through triangulation based on inputs the devices sensor(s) 51 readings in terms of its world coordinates, orientation and directional heading which are used in collision detection and projectile simulation to calculate if based on weapon projectile and the coordinates of another real-world user, game object or AI Character a 'hit' or 'tag' was achieved.

In the event of registering a successful hit or tag, the IR sensors may emit a small field covering the body of the person wearing a body IR Mixed Reality vest 92, to ensure that a hit is registered in the event that any part of the body is touched by the project of the IR Laser beam whether detected via an IR Sensor or computationally based on a formulation of triangulation and projectile formulation in the mathematical operations of the game by its collision detection software and algorithms. The game server 88 or host 89 then registers a 'hit' or 'tag', which may invoke the re-rendering of augmented imagery over the user to show visually a hit.

The IR Laser Gun Apparatus 47, as illustrated in FIG. 5A consists of a trigger mechanism 53 that can be physical pulled to invoke the projection of an IR Laser beam which is coupled with a trigger switch 54, a set of processor unit(s) 59 that consists of one or more central processor unit(s) (CPU) and graphics processor unit(s) (GPU), memory 60, Storage 61, a camera 50, one or more speakers 66, one or more microphones 67, a lithium style battery 70, Power switch 69.

The IR Laser Gun Apparatus 47 also features an IR Transmitter 64 for transmitting data in the IR Beam/IR Laser Beam, an IR receiver 65 for receiving data from an IR Beam/IR Laser Beam, a multiplexer 72 for multiplexing the IR signal for transmitting data in the IR Beam/IR Laser Beam and a demultiplexer 73 for demultiplexing the received IR Signal from the IR Beam/IR Laser Beam from another device. Note an IR Beam is referred herein to as an IR Laser Beam.

In addition, the IR Laser Gun Apparatus 47 consists of IR Sensor(s) 62 mounted on the devices faces for detecting hits on the weapon itself, an amplifier 63, a Wifi wireless network interface 58 and bluetooth 52 module and a haptic module 68 which features a vibration motor mechanism that provides feedback resulting from inputs from the real-world and virtual world of the game in the detection of a hit or collision as well as in the usage of the IR Laser Gun apparatus trigger mechanism 53.

Furthermore, the device consists of multiple surface display panel faces 57L, 57R, 57, used in the display of rendered texture-maps, visual lighting effects and other visually rendering effects over the surfaces of the users IR Laser Gun Apparatus 47.

The device also features one or more light display modules 55, for controlling and management of the display of illuminating pixels corresponding to rendered texture-maps, visual lighting effects and other visually rendering effects over the surface display panel faces 57L, 57R, 57, of the users IR Laser Gun Apparatus 47.

In addition, a number of touch screens panels 56L, 56R and 56, are provided for interacting and configuring the device.

As shown in FIG. 5A the handheld IR Laser Gun apparatus 47 consists also of an optical lens 48 of varying diameter that can support an effective range of 50 to over 200 meters or more. A double-convex or "Magnifier" optical lens may be used to ensure the maximum effective range. The optical lens is housed at the end of a lens tub facing externally from the Laser Gun in the directional aim of the gun, which is held in position with the use of a coupler, where the length between the optical lens 48 and the IR Light Emitting Diode (LED) 49 which defines the focal length. To gain optimal performance the angle of the beam may be adjusted to achieve a beam width of 20 degrees for example in which the projection of the beam should correspond with the diameter of the Lens.

This angle is often referred to as the angle of intensity where position of the lens may be adjusted during manufacturing to achieve the optional beam intensity. The size of the coupler, lens, and lens tube may vary between different handheld IR Laser Gun Apparatus 47 based on the tactile usage of the weapon in a Laser Tag game where short-range Laser gun weapons may be used for close combat and long-range Lase guns may be used for strategic long-range combat.

The focal length, may be varied based on the length of the lens tube, a relative distance between the lens and IR LEDs 49, in which the longer Focal length and/or larger diameter lens the longer also the range of the IR Laser Beam in which it is possible to achieve ranges of up to 200 meters or more which is more than adequate.

The Optical Lenses 48 may be made of Quartz, Germanium and/or Silicon to transmit the infrared radiation in a focused IR beam/IR Laser Beam.

The use of an Infrared Light Emitting Diode ("IR LED") 49 makes the device safe to use. Other forms of laser beams and the use of infrared laser diode maybe used as per the alternative embodiments of this invention however it is generally acknowledged that the use of IR LEDs are regarded as a safer option and as such are more widely used.

The handheld IR Laser Gun apparatus 47 also consists electrical elements on its circuit board not shown in FIG. 5A that includes a transistor, one or more capacitors and a series of electrical relays used in the process of discharging the IR Beam/IR laser beam via the IR LED 49. It should be noted here that the IR LED 49 may be part of the IR Transmitter 64 as shown in FIG. 5A and FIG. 5B.

The physical trigger mechanism 106 as depicted in FIG. 5A, maybe used by users by physically pulling the trigger mechanism 106 with one or two fingers whilst holding the devices handle to invoke the projecting of the IR Laser Beam from an IR LED 49, along the lens tube on to the optical lens 48 and outwards towards any targets that maybe in range.

This maybe controlled in multiple ways including for example the processing of the initial I/O inputs resulting from the users use of the trigger mechanism 53, in which the trigger switch 54 generates an system Input/output or interrupt that may be handled by subsystem or bus of the system which is not depicted in FIG. 5A. Where in this example configuration, the resulting interrupt or I/O inputs/output may be passed via a input/output subsystem responsible for the handling of all inputs and outputs via a bus to the CPU microprocessor which based coded instructions of embedded software the CPU microprocessor shall process the I/O inputs from the bus resulting from the users use of the trigger mechanism 53, for example and then invoke the projecting of the IR Beam/IR Laser Beam from the IR LED 49, through the activating or illuminating of the IR LED 49.

This may be supported by passing an API or system function call to the IR LED display driver which as instructed which shall turn on the IR LED 49 resulting in an electrical charge being dispersed by a capacitor through the circuitry of the device via series of switches and electrical relays to the IR LED 49 which shall be illuminated, where the IR beam then passes through the optical lens 48 and outward.

In the case of using a manual trigger mechanism 53 no Input/output subsystem or bus may be needed since this may all be handled purely with hardware in which the through a series of electrical switch relays, transistors and capacitors, it is possible to invoke as a result of the user pulling the trigger the release of an electrical charge which may be dispersed by the capacitor thorough the circuitry of the devices main board in which this may invoke the IR LED 49 to be illuminated and for the IR Beam/IR Laser Beam light to pass through the lens onto another users IR Sensor if in range. Where upon the receiving users IR Receiver/IR Sensor sensing IR emissions in the form of an invisible infrared light beam and IR radiation from the other users IR beam/IR laser beam, the IR signal shall result in the registering of a hit.

It should be noted that the receiving IR Receiver/IR Sensors may be a wearable form of a IR Receiver/IR Sensor such as an IR Mixed Reality Vest 92 or IR Mixed Reality Suit 93, or maybe part of the users augmented reality ("AR") display Apparatus 1, as shown in previous FIG. 1A and FIG. 1B. Alternatively they may be worn separately by a user on their body. The IR Receiver/IR Sensors may be a form of fiber optic sensor or a form of an IR detector or a form of photodiodes or phototransistors. It may also be a form of active or passive infrared sensor.

In addition, the receiving IR Receiver/IR Sensor or could be a real-world game object such as user's handheld IR Laser Gun 47, IR Shield Apparatus 90, IR Proximity Mine Apparatus 91 or a Real world AI Character 94.

Furthermore, a receiving IR Receiver/IR Sensor could be part of the laser tag arena surrounding walls, ceilings, floors, objects and structure.

Upon an IR Sensor being hit, this may invoke the rendering and display of augmented game scenes displayed via the users augmented reality ("AR") head mounted display 1, micro-display 3 in the form of a holographic image, hologram or two stereoscopic 2D images among other forms of images or video that are augmented over the user's real-world view of the space of the laser tag game or that of laser tag arena surrounding walls, ceilings, floors, objects and structure.

Alternately upon an IR Sensor being hit, this may invoke via the game server 88 or host 89 via its external projectors 96 the external projection of augmented virtual 3D images or video over the real-world space of the laser tag game or that of laser tag arena surrounding walls, ceilings, floors, objects and structure which may be seen by the users naked eyes with no visual aids.

As yet a further embodiment of the disclosed invention herein, the upon an IR Sensor being hit on a real world game object or AI Character 94, this may invoke via the devices local client module and its local rendering module the re-rendering and display of a change to is displayed surface renderings on its display screen surfaces and model mesh which may be seen by the users naked eyes with no visual aids.

As well as changing the visual state of real-world game objects and virtual game objects, the detection of a hit on a IR Sensor 144 and IR Receiver 145 on a real-world AI Character 94 can also invoke a physical action such as rag doll simulation by a real-world AI Character 94, in which physically the real-world AI Character 94 moves according to the formulated rag doll simulation its arms, legs, body and head in which its actuators provide physical mobility and the 3D coordinates (x, y, z) and orientation (p, r, y) of the rag doll are converted to joint movements used to invoke complex body movements simulating the physical effect of being hit by an IR Laser beam or Laser for which this may be invoked by its local client module 156 or the game server 88 or host 89 upon a hit being detected.

In addition, hits detected on an IR Sensor could invoke a change in the game storylines, or a new game sequence to be played in which the game application 126 of the game server 88 or host 89 attempts to bring the game to its conclusion and end objective of only one winner or survivor for example in the game of laser tag.

Other physical changes in real-world game objects may be caused as the result of an IR Sensor hit, in addition changes may be applied to the visual rendered and displayed images over the users IR Mixed Reality Vest 92 or IR Mixed Reality Suit 93 upon a hit being detected to visually show a human user as being hit by another user or real-world AI Character's IR Laser Beam or laser.

Other examples are provided in the embodiments of the disclosed invention herein.

An amplifier may be used to amplify the IR signal upon a hit being detected and the IR Laser beam passing through the optical lens of the IR Sensor which could activate or set off a series of IR Sensors on the users IR Mixed Reality Vest 92 or IR Mixed Reality Suit 93 or real-world game object such as an IR Laser Gun Apparatus 47, IR Shield Apparatus 90, IR Proximity Mine Apparatus 91 in which a small electric charge is discharged through the users body onto these other wearable or handheld objects. This may be invoked also by the IR Laser Gun Apparatus 47 itself where this features an amplifier 63 for this purpose.

As described a hit on an IR Sensor/IR Receiver of a real-world users IR Mixed Reality Vest 92, IR Mixed Reality Suit 93, a real-world game object such as handheld IR Laser Gun Apparatus 47, IR Shield Apparatus 90, IR Proximity Mine Apparatus 91 or another object or Real world AI Character 94 may invoke the rendering of augmented reality scene in which the hit is seen visually through the users augmented reality ("AR") display apparatus 1, where the image is augmented using the spatial mapping data, volumetric, geometric, mesh data, 3D models of users real-world view.

Alternatively, it could be seen augmented with the naked eye where game server 88 or host 89 may externally projector using projection mapping/video mapping/spatial augmented reality and/or 3D projection mapping techniques with the use of the external projectors 96 in the laser tag arena 98. As further alternative this may invoke a direct rendering and display of a virtual image animation or video on the surface of the users IR Mixed reality Vest 92, IR Mixed Reality Suit 93, real-world handheld IR Laser Gun Apparatus 47, IR Shield Apparatus 90 or another object or real-world AI Character 94 or Mixed Reality Scenery 99 where these objects or device feature capable display screen apparatuses like the surface display screen faces 57L, 57R and 57 of the IR Laser Gun Apparatus 47 as shown in FIG. 5A and FIG. 5B.

In the primary method and example given previously of the trigger mechanism 53 and trigger switch 54 handling of the IR Laser Gun Apparatus 1, the processing unit(s) 59 shall handle all logic, control, arithmetic, and I/O Input or output operations, which will be handled in accordance to the instructions of the game code and corresponding device's module's coded instructions.

It should be noted there are many ways in which computers today support the passing and processing of I/O Inputs using methodologies such as polling, interrupt or DMA for which the same methodologies may be used here with the described handheld IR Laser Gun Apparatus 47, in the invoking of the IR Laser Beam resulting from the user pulling the physical trigger mechanism 53.

For example alternatively the processing of inputs maybe handled in hardware solely where the through a series of electrical relays, switches, and capacitors it may be possible to manually trigger the projecting of the IR Laser beam without the need for a full operating system and the process as described previously of making an API call or system function call which is similar to what is more commonly used in the processing of I/O inputs on traditional desktop computers from devices such as optical IR mouse or a keyboard than that of IR Laser Guns in laser tag.

As yet a further alternative implementation the IR Laser Gun Apparatus 47, electrical elements and circuitry board may consists of a Transistor, Potentiometer, LDR, IR LED in which these elements are connected via a PCB Board circuitry. A laser diode may be used as a laser pointer.

As another example implementation of the users IR Laser Gun Apparatus 47, this may feature a supercaps, electrolyte capacitor, a relay where when the trigger mechanism is pulled, the relay is activated and the charge from the electrolyte capacitor is discharged to the laser. The laser beam is then projected outwards via the optical lens piece.

Here it is possible to change the length of the laser pulse by changing the capacitor, in which the IR Laser Gun Apparatus 47 may feature multiple capacitors controllable via the trigger mechanism and in which the device may be configurable via its touch screen surfaces 56L, 56R and 56 or voice command via the use of the devices microphones 67 and speech recognition module 82 for example to switch the relay mechanism to either capacitor. This allows the device pulse to varied dynamically for shorter pulse or longer pulse ranges. It should be noted in this described implementation upon the user releasing the trigger mechanism 53, the relay will be deactivated and the capacitor, shall be electrically recharged. This may be instantly recharged when connected to a supercaps, through the closed pin of the relay in which the electrical charge is diverted instantly to the capacitor following the user releasing the trigger where the supercaps are electrically charged.

Note the purpose of using hardware only mode for the projection of the IR Laser Beam although may seem unusual in present times, however this serves useful purpose as a failsafe in the event of a system failure at a software level with the systems kernel, operating system, device drivers and/or the embedded software applications.

In the event of a software widespread failure the game could continue with or without the display of augmented virtual images via the user's head-mounted display and other features that are reliant on the software layer of the users IR Laser Gun Apparatus 47 or other parts of the system in which a large part of the game may be played and seen rendered in the real-world on the display screen panel surfaces of other real-world game objects as 3D objects with or without out any visual aid such as a head mounted augmented reality ("AR") display apparatus 1.

The presented embodiment of the handheld IR Laser Gun Apparatus 47 is capable of supporting either mechanism or a combination in which the I/O inputs are processed by the CPU solely for the purpose of maintaining state information on the game and in the corresponding rendering of game objects but not if chosen the mechanism of invoking the IR LED 49 and IR Transmitter 64 to project the IR laser beam along the lens tube on to the optical lens and outwards towards as this could be invoked via the described use of electrical relays, switches and capacitors.

The system has been intentionally designed to be flexible in this respect for performance reasons since if all inputs and outputs were processed by the CPU this could affect performance therefore some features may intentionally may be configured to operate independently in a hardware mode.

As shown on FIG. 5A the IR Laser Gun Apparatus 47 features an amplifier 63 which may be used to amplify the IR signal upon a hit being detected and the IR Laser beam passing through the IR Sensor 62 in which a small electrical current may be discharge outward from the device through the user's body which could activate or set off a series of IR Sensors as well as any haptic modules upon the client module of each of the other users paired real-world game objects/devices detecting the series of IR Sensors being activated, in which this may invoke the corresponding haptic modules of each device to provide physical feedback.

It should be noted that the detecting hits may occur as a result of the IR Sensor(s) 62 detecting Infrared ("IR") light emissions and IR radiation from an IR Beam/IR Laser Beam projected by an IR LED or infrared laser diode of another user's real-world game object such as an IR Laser Gun Apparatus 47 or IR Shield Apparatus 90 or IR Proximity Mine 91 onto the IR Sensor(s) 62.

These IR Sensors 62 maybe a form of an active IR Sensor or passive IR Sensor in the form of fiber optic sensor, photo optic sensor, infrared detectors and/or photo-detector. In addition, the IR Sensor 62 may be part of the IR Receiver 65 which may be a form of photodiodes or phototransistors. The IR Sensor 62 maybe a form of active or passive infrared sensor in this case.

In addition, as shown on FIG. 5A the IR Laser Gun Apparatus 47 may feature as detailed also an IR receiver 65, and IR transmitter 64 in which infrared light may be used for the transmission of data and voice for communication, where voice audio files maybe played back via the devices speakers 66L, 66R. For example, as a means to communicate voice may be captured via the device micro phone 67 and multiplexed and transmitted into the IR Signal via the multiplexer 72 and IR Transmitter 64 via the IR Beam/IR Laser Beam where upon the IR receiver 65 of the receiving IR Laser Gun Apparatus 47, receiving the IR Beam/IR Laser Beam via the IR Sensor 52 the signal is demultiplexed by its demultiplexer 73 and then played back by the audio manager 76 via the devices speakers 66R, 66L.

As well as the detailed capabilities of the users IR Laser Gun Apparatus 47, supporting the projection of IR Beams/IR Laser Beams, the device is also capable of transmitting and receiving data in this way in the form of raw data, binary, video and images as well as the detailed voice via the IR beam using its IR Transmitter 64, multiplexer 72, IR Sensor 62 and IR receiver 65, and demultiplexer 73.

One such example use and implementation of this could be the physical trigger mechanism 53 and trigger switch 54 is connected via electrical circuitry to a relay switch to the not shown in FIG. 5A or FIG. 5B as well as a low level device specific driver acting for the trigger switch 54 in which I/O inputs may be passed by the I/O input/output subsystem to the bus and then passed to the CPU microprocessor in the main processor units 59 for the purpose of registering a trigger and invoking the CPU to invoke a call to send IR data via the IR Transmitter 64 and the connected IR LED 49. Where prior to the IR Data reaching the IR transmitter 64 the IR signal multiplexer 72 shall multiplex the IR TX Data into the IR transmission and upon the IR Laser Beam being transmitted the data will be carried in the IR laser beam.

In this example the CPU Microprocessor is not invoking the activation of the IR LED 49, this is handled through the use of the hardware relay switch. Here the CPU Microprocessor is processing the I/O inputs for the purpose of encoding binary raw data information into the IR transmission where like the original MILES systems the system may use the embedding of raw binary strings into the IR signal to through multiplexing the signal which may be used to identify the user that fired the IR Laser beam, what type of weapon they used in terms of its classification in the use of registering a type of hit or determining a kill shot. This is given by way of example to illustrate the flexibility of the IR Laser Gun Apparatus 47 hardware and software design presented in the handling of I/O inputs.

The system may not use the MILES type of implementation, since in the embodiment of the invention described herein the passing of binary data in the IR Laser beam is not needed to detect which user fired the shot, or what weapon classification they used or the degree of the hit or whether it was a successful kit shot since the presented invention supports other methodologies to achieve.

One such method is in the passing and storing of state information via the network 97 on the game server 88 or host 89 which may be retrieved from all real-world game objects and devices, in which based on the device coordinates the system is capable through triangulation of determining who fired the kill shot which may be handled by the collision manager 26 component of the users augmented reality ("AR") display apparatus 1, the device's collision manager 78, or that of the game server 88 or host 89 collision manager 125 based on the maintained state information on all clients.

Further to the prior given examples use cases, the IR Transmitter 64 is operable to transmit data and voice signals captured from the devices microphones 120 in the IR Laser Beam signal and the IR receiver 65 is operable conversely to receive the transmitted data and voice signals which is demultiplexed from the IR Laser Beam using a demultiplexer and played back via the speakers of a user's IR Laser Gun Apparatus 47 or augmented reality ("AR") display apparatus 1, speakers 66, in which both feature an IR Receiver and demultiplexer.

In addition, data transmitted in the IR beam/IR Laser Beam could be type of class of weapon provided as raw data in binary form, from which this could result in different outcomes such as the rendering and display of augmented scenes via the users augmented reality ("AR") display apparatus 1 or the display of new texture maps or lighting effects on the surface display panel faces 57L, 57R, 57 of the users IR Laser Gun Apparatus 47, or the projection externally of new augmented scene by the game server 88 or host 89 using 3D mapping projection technique.

Alternatively, this could result in the registering of a different type of score/hit or kill based on the data in the IR beam by the client module 74 of the users IR Laser Gun Apparatus 47 via the network 97 and its resulting handling of the data according to its programmable code. Not the context here is the IR Beam/IR Laser Beam is received by the users IR Laser Gun Apparatus 47 as a result of a hit on its IR Sensors 62 and IR Receivers 65. These same capabilities though could be supported by any real-world game object or users augmented reality ("AR") display apparatus 1, or wearable device such as IR Mixed Reality Suit 93 where this features an IR Receiver 241 and demultiplexer 242.

During this process the demuxer/demultiplex 73 of the IR Laser Gun Apparatus 47 is capable of demultiplexing the IR signal and passing this to the processing units 59 for determination of a hit score level and level of damage, by the client module 74 in the determination of the score and appropriate response in the rendering of augmented images for example or in the informing of the game application/client module 74 which may invoke a change in the game scene/sequence or storyline as a result.

In the event the client module 74 embedded software identifies a specific weapon class relating to the detected hit based on the data passed in the IR signal, the client module 74 may invoke the users IR sensors to go off and for this be amplified via the devices amplifier 63 so as to cause multiple IR Sensors to go off in which correspondingly the client module 74 may communicate with other device client modules via the network 97 to invoke multiple physical feedbacks via the haptic module 68 of the users IR Laser Gun Apparatus 47 as well as on the users other paired IR Mixed Reality Suit 93 or IR Mixed Reality Vest 92 and any other real-world game object or wearable device that the user has on them.

Here in the IR Beam for example this may contain binary raw data indicating the IR Laser Gun Apparatus 47 has a class type of a "missile" in the virtual sense of the game in which upon an IR Sensor 62 detecting the IR Beam/IR Laser Beam and the IR Receiver passing the signal to the demultiplex/demuxer 74 which demultiplexes the signal into readable binary form, the client module 74 may process the raw binary and invoke all IR Sensors and Haptic modules that are paired to the user's real-world game object devices and wearables to go off simultaneously.

This allows users to physically feel difference in the force of a IR Weapon being used and that of the IR Beam/IR Laser Beam hitting the user giving a greater sense of realism. In addition, the client module 74 together with collision manager 78 based on the determined three-dimensional coordinates of where the IR Laser Beam/IR beam hit could invoke different feedback patterns of vibrations via the haptic modules to allow the user to feel with precision where the IR Laser beam hit.

For example, in the use case of the user wearing a IR Mixed Reality Suit 93 this could trigger the IR Sensors 240 and Haptic Modules 243 on the users left leg to go off relationally to exact computation of where the IR Laser Beam hit in terms of the point of intersection (x,y,z) or model coordinates or specific hit box in hierarchy of hit boxes of the user that generated virtual game object of the IR Laser Beam was formulated to have hit based on the calculation of the projectile of the IR Laser Beam, the world coordinates of the IR weapon, its orientation, heading and assumed velocity. Alternately this could simply be based on an identification of which IR Sensor was activated.

Furthermore, embedded in the IR Signal could be a sequence of instructions/code in binary form that upon receiving and processing this could invoke the Client module 74 of the device which received the IR Beam via its IR Sensors/IR receivers, to invoke varying and multiple actions.

These actions depending on the receiving device whether a real-world game object or wearable or real-world AI Character could include in the display of augmented virtual images via the users augmented reality ("AR") display apparatus 1; the display of augmented virtual images via external 3D projection by the game server 88 or host 89 using projection mapping/video mapping/spatial AR or 3D projection mapping techniques and its external projectors 96; the display of new texture mapping images on the surface display panel faces of a real-world game object such as an IR Laser Gun Apparatus 47 as well as different physical responses in terms of haptic feedback.

For example, the weapon could be classified as a chain gun in which computationally in the simulation of the game hits are detectable in circular fashion, where the haptic modules on a user's IR Mixed Reality Suit 93 upon its client module 249 identifying the weapon class from the binary data contained in the IR beam/IR Laser Beam signal could invoke a specific sequence of physical feedback via the haptic module 243 and pads of the users IR Mixed Reality Suit 93.

In yet a further example this could invoke a different form of rag doll simulation on a real-world AI Character 94, where the client module 156 of the real-world AI Character 94 has detected data containing a rag doll sequence or simulations in the form of physical moves of the AI Characters body in which different model coordinates and points are provided in the form of matrixes in the IR data in the IR beam/IR Laser Beam where the client shall invoke the physical movements via the actuators 129, manipulators 130 and joints 131 etc. of the AI Characters 94 body, arms, legs and head.

It should be noted that via the microphones 67 using voice command or via the touch screen panels of the IR Laser Gun Apparatus 47, users may change their weapon classifications which may have a visible and physical effect upon using the weapon when firing and IR Laser Beam as well as visible and physical effect on the receiving real-world game object/device, AI Character and/or user wearable device of IR Beam/IR Laser Beam upon a hit being detected.

It should be noted that to invoke these described responses from an IR hit or tag being detected this could work with or without the need of transmitting raw binary data in the IR Beam/IR Laser Beam, where instead based on the known state of the device by the game server 88 or host 89 the receiving client module that has detected a hit or tag from an IR Laser Beam via its IR Sensors or computationally as collision detection by its collision manager module, upon retrieving the state information from the game server 88 or host 89 containing the weapon classification of the device that fired the IR Beam/Laser Beam can invoke these same previously detail visual and/or physical responses together with the collision manager in the handling of collision responses.

As described the users IR Laser Gun Apparatus 47 comprises of a trigger mechanism 53 that coupled via circuitry to the processor units 59, electrolyte capacitors and electrical relays to initiate the projecting of the laser beam via the IR transmitter 64 capable of transmitting the IR laser beams via an optical lens through the use of the IR LED 49. Electrolyte Capacitors on the circuitry maintain charge where the capacitor is connected via a relay switch to the battery. When the trigger mechanism 53 is pulled this activates a relay switch that resulting in the charge from the capacitor being released where this then results in the IR laser beam being discharged by the optical IR Light Emitting Diode (LED) 49 along the lens tube onto typically a convex lens that acts as magnifier.

The resulting IR laser beam is then projected to its target where upon reaching an optical IR Receiver sensor the system shall register a 'hit' or 'tag'. Here IR data contained in the IR beam may indicate the type of shot in binary raw data form where "0001" could be used to single a kill shot and the following four bits could indicate a user ID "0011" similar to MILES code system. It should be noted that this methodology is not necessary by the invention disclosed herein since based on locational world coordinates and device projectile data provided by the IR Laser Gun Apparatus 47 over the network 97 to the game server 88 or host 88, the system can determine using methods such as polygon based triangulation, or hitscan or raycast among other methods detailed herein, who fired the shot.

It should be noted each IR Laser Gun Apparatus 47 is paired with a user in which this is part of the maintained state information on the game server which allows the system to determine based on associated trigger event information, the formulation of each IR Laser Beam projectile and its associated virtual game object in terms of its directional heading, that is paired to an IR Laser Gun Apparatus 47, who fired the shot that achieved a hit. In addition, the system can determine a kill shot with equal accuracy to the laser based on sensory data from the device and can apply classifications to weapons to determine whether a hit resulted in a kill shot or the level of damage caused.

It is possible by changing the capacitor for shorter of longer pulses to vary the length of the laser pulse. The CPU can invoke this or this can be pre-configured for the weapon type. The varying of the laser pulse maybe used in game play for the identification of different weapon types used by the Game Server 88 or host 89 and local clients to invoke different rendered visual lighting effects and virtual images representing the different weapon types in the visual representation of the projection of the IR Laser Beam or a hit resulting from an IR laser beam intersecting with another user, object or AI Character. This may also invoke a different physical response based on the detection of the varying laser pulse by the receiving targets IR Sensor/IR Receiver and client module.

These visual lighting effects and virtual images maybe displayed as augmented images over the user's real world view via the users wearable augmented reality ("AR") display apparatus 1, micro-display 3, or directly on the surface of a real-world game object that has been hit using 3D mapping projection and an external projector 96 as an augmented image or by directly as a render images displayed on the surface of the object where the real-world game object has display and rendering capabilities. Real-world game objects maybe a user's IR Laser Gun Apparatus 47, an IR Proximity Mine Apparatus 91, an IR Shield Apparatus 90 or a wearable IR Mixed Reality Vest 92, or an IR Mixed Reality Suit 93 or could be a Real world AI Character 94 where these have surface display panel faces capable of displaying images.

In addition, data, could be transmitted over the IR laser beam to signal the type of class of weapon, where upon the IR laser beam reaching an IR Sensor/IR Receiver this may result in different score or hit damage and/or the rendering and display of a different virtual image either directly displayed on a real-world game objects surface display panel faces or 3D projected using an external projector and 3D mapping projection techniques; or displayed as an augmented image via the users augmented reality ("AR") display apparatus 1, micro-display 3. Here the displayed images shall be based on the decoded output signal from data and codes transmitted in the IR Laser beam. These codes maybe similar to systems such as the MILES system where the weapon type can be encoded in the data transmitted in the IR Laser Beam in a binary form of raw data.

Alternatively, the system can determine this by applying classifications to specific real-world game object that is an IR laser weapon type where each IR laser weapon such as an IR Laser Gun Apparatus 47, an IR Proximity Mine Apparatus 91, an IR Shield Apparatus 90 is paired to a user where upon initiating the game the device type could be registered via the WiFi network on the system in which the system can predetermine the class of weapon and resulting score, hit damage or rendering that the system should apply through the three available methods of displaying virtual images described.

Here the game server 88 or host 89 may be programmed to adjust the users IR laser weapon setting increasing the damage ratio of a shot or decreasing based on the user's progression in the game. This may be used to determine the rendered virtual image for the weapon fire. It should be noted that the previously detailed the IR Receiver(s) 65 are a form of infrared receivers that may also be referred to an IR Sensor as they detect radiation from the form of an IR Transmitter. Here it has been intentionally shown as a separate component of the devices circuit board in FIG. 5A or FIG. 5B although they could be part of the same component. This has been shown separately simply to distinguish between the IR Sensor 62 simply being responsible for detecting IR emissions and IR radiation from the IR Light or IR Beam in the determination of a hit as an on/off determination, whereas the IR Receiver 65 is able to detect difference in the radiation and particular frequencies from an IR Transmitter.

In addition, an IR Receiver 65 can be used for receiving transmitted data over an IR signal/IR Beam where as an IR LED in its self doesn't not necessarily have this capability if it is a basic on/off type of IR Sensor that works with a basic IR LED hence why the IR Receiver 65 shown as separate to the IR Sensor 62. Again, though this could be combined if desired.

The IR Receiver 65 may be a form of photodiodes or phototransistors. The IR Receiver(s) 65 may also be modulated or configured to operate based on a specific wavelength and voltage where when used with a matching wavelength and voltage configuration of an IR Transmitter hits maybe detected. Signal processing maybe done by amplifiers where the signal is very small. The setup of the IR Receivers 65 and IR Sensors 62 maybe configured as a direct Incidence.

Furthermore, it should be noted that in FIG. 5B the light emitting diode (LED) 49 is part Infrared ("IR") Transmitter 64 component of the IR Laser Gun Apparatus 47 which emits infrared radiations which are invisible to the human eye or it may be separate in which the IR Transmitter 64 consumes the electrical current that is dispersed to power the IR LED 49 in which the IR Beam/IR Laser Beam and IR signal containing IR data is then transmitted via the IR LED 49 along the IR Laser Gun Apparatus 47 lens tube and outward from the optical lens piece 48 onto a target IR Sensor and/or IR Receiver. This is hence why in FIG. 5A the same component is depicted as the IR LED 49 and IR Transmitter 64.

In addition, the IR transmitters 64 maybe modulated to produce a particular frequency of infrared light output via the IR LED 49. It should be noted also that an IR Transmitter 64 maybe used as detailed for transmitting of IR data over an IR signal/IR Beam where as an Infrared Light Emitting Diode ("IR LED") 49 in its self doesn't not necessarily have this capability if it is a basic on/off type, hence why alternatively to as shown in FIG. 5B this could be shown separately. In FIG. 5A and FIG. 5B they are intentionally shown though as part of a single IR Transmitter/IR LED component hardware module on the device's hardware circuit design.

The camera(s) 50 of the users IR Laser Gun Apparatus 47 as shown in FIG. 5A serve multiple purposes. One usage is in the capturing of video from the users IR Laser Gun Apparatus 47 line of sight, used in assisted targeting where the video is provided to the users Augmented Reality ("AR") display apparatus 1, in which virtual images based on the known world coordinates of other real-world users, game objects, AI Characters and virtual game objects, AI Characters and remote users are overlaid, superimposed or augmented over the user's real-world view to highlight a targets position. As detailed in the embodiments of this invention, here directional arrows may be displayed via the user's micro-display 3, and coloured images showing if a target is on the opposing team or a friendly, in which the users rendering module 27 shall render and invoke the display of these images via the light display modules 5L, 5R of the users Augmented Reality ("AR") display apparatus 1.

Furthermore, world coordinates of targets may be shown to assist in the targeting in which as detailed values or points for example (x1,y1,z2) on the x,y,z three-dimensional axis may be shown via the users Micro display 3 together with the pitch, roll and yaw (p,r,y) values representing the targets orientation and elevation on a second axis, as a 2D or 3D image depicting relational the position of the users IR Laser Gun Apparatus 47 relative to that of the other target using each's world coordinates, elevation and orientation.

Here the devices world coordinates and orientation of the IR Laser Gun Apparatus 47 may be provided locally by the client module 74 via the bluetooth connection from its device tracking module 80 to the users augmented reality ("AR") display apparatus client module 28 and rendering module 27 for the triangulation of targets and the display of targeting information or could be provided via the game server 88 or host 89 in which all state information is maintained on all real-world users, game objects, AI Characters and virtual game objects, AI Characters and remote users.

The visual indicator shown as 2D augmented image or 3D augmented image depicting relational the position of the users IR Laser Gun Apparatus 47 relative to that of the other target using each's world coordinates, elevation and orientation, may be shown as positional arrows or values as +/− on the x,y,z axis and on a second p,r,y axis. Elevation may be expressed as third value on dual axis, expressed by values "+" or "−" value from ground level on the x,y,z axis etc that represents the distance above the ground and/or below ground.

In the described visual targeting functionality all state information on the world coordinates, orientation, heading and rate of acceleration and velocity of targets which includes real-world users, game objects, real world AI Characters 94 as well as virtual game objects 106, virtual AI Characters 105 and remote users 107 may be retrieved by the client module 28 of the users augmented reality ("AR") display apparatus 1, via the network 97 from the game server 88 and host 89.

In addition, though weapon information such as the weapon which a real-world user, AI Character or virtual AI Character or remote user maybe holding could be displayed based on the pairing information retrieved from the game server 88 or host 89 as part of the stored state information.

Other state information such as the state of their shield, state of the health of the target, name of the user or AI character together with the targets own individual directional heading, speed, velocity and precise world coordinates could be placed over an avatar or virtual image representing the target that maybe displayed over the user's real-world view via their micro-display 3, together with the video from the IR Laser Gun Apparatus 47, camera 50 and other state information as detailed herein.

The system may augment virtual images over the video capture of the real-world from IR Laser Gun Apparatus 47, camera to highlight targets in the line of sight based on a computation of the other real-world game objects, users, AI Characters or virtual-world game objects 106, virtual AI Characters 105 and the target objects positions relative to the users IR Laser Gun Apparatus 47 position in 3D space using three dimensional cartesian coordinates and the pitch, roll, and yaw of the IR Laser Gun apparatus to formulate based on the weapon projectile if another user, character or object moves into the kill zone or hit zone area within the line of sight of the weapon. This may use hit boxes or model coordinates for the other real-world users, AI characters 94 and objects as well as virtual remote users 107, AI characters 105 and virtual game objects 106 to determine this.

This enables greater accuracy in the user obtaining kill shots or hits during a laser tag game as well as the ability for users to tactically plan their movements during the game based on the known state information and displayed targeting information. This may be combined with the previous disclosed ability that can be gifted to a user using dead reckoning to predict a targets movement, where visual indicators represented as (x,y,z) on one axis, (p,r,y) on another and elevation +/− values from ground may show predictive positions together with a predictive image of the user for where they will be in which the virtual image of the user or Real world AI Character 94 based on their model coordinates and virtual 3D model representation maintained on the game server 88 or host 89.

Here users are scanned by the game server 88 or host 89 using external cameras 95 as disclosed in the embodiments herein, in which using spatial mapping mesh data, 3D models and hit boxes are generated with aid from its Observer Module 118 for which this may be used to support this functionality.

Other usages of the devices cameras 50 include the generating of 3D mesh data, wireframes and 3D models containing geometric, depth and volumetric data of the real-world objects, surfaces and surrounds using spatial mapping techniques, which is used in the display of augmented images via the users Augmented Reality ("AR") display apparatus 1, or by the game server 88 or host 89 via external projectors using 3D mapping projection techniques. This is also used to apply the augmented images over the video captured from the devices cameras 50, which is supported by the devices own observer module 79.

As illustrated in FIG. 5A the users IR Laser Gun Apparatus 47, also features one or two microphones 67L, 67R which are used for voice control of the device. For example as an alternative to the use of the trigger mechanism 53 the user can use these microphones 67L, 67R for the use of spoken commands that can invoke the firing of the IR Laser Beam, in which the client module 74 shall invoke the IR Transmitter 64 and IR LEDs 49 to be activated resulting in the IR beam being projected outward along the lens tube piece via the optical lens 48.

Spoken voice commands may be used also to recalibrate the weapon to change its pulse rate in which a larger capacitor for example maybe dynamically selected. Furthermore, spoken voice commands may used to activate the devices shield, in which all 'hits' or 'tag's shall be nulled during the activation of the shield on the users IR Laser Gun Apparatus 1.

In a further embodiment of the disclosed invention herein, a user may use voice commands to activate the assisted targeting in which video from the front facing camera 50 of the device is displayed via the users augmented reality ("AR") display apparatus 1, to assist in the lining of sight of the weapons IR LED and pointer with targets.

In addition, voice commands could invoke a change in the displayed renderings on the surface display panel faces 57L, 57R, 57 in which the client 74 shall invoke the rendering module 75 to re-render the displayed texture-maps and lighting effects on the users IR Laser Gun Apparatus 47, to show the change in the state of the weapon such as change in the pulse rate or weapon calibration for example. Alternatively, the display visual effects such as those described where lighting effects and virtual images are displayed on the surface display panel faces 57L, 57R, 57 of the IR Laser Beam travelling along towards the weapons lens tube and exiting towards the optical lens 48, could be displayed as a result of the user voice commend invoking the firing of the IR Laser beam.

As yet a further example, voice commands could be used in the creation of virtual game objects that are augmented virtual images of weapon fire which maybe representational of the IR Laser Beam as described previously or maybe a form of virtual weapon fire in which as well as the use of the IR Laser Beam, the weapon may serve also as physical handheld weapon which can generate virtual weapon fire such as sonic wave blast in which an animated virtual image is displayed over the users view of the real-world from their augmented reality ("AR") display apparatus 1, micro-display 3, together with 3D positional audio and perceptual based 3D sound locational effects. Here the virtual weapon fire can upon a collision being detected by the game server 88, host 89 or a clients collision manager module result in other real-world users, game objects or real-world AI Characters 94 IR Sensors being invoked which may result in the register of a hit even if the IR Sensors detect no IR light.

This is supported by means of a computational formulating of the weapon fire projectile through triangulating the users IR Laser Gun Apparatus 47, world coordinates, orientation, direction at the time of the voice command was invoked to fire the weapon, to that of the world coordinates, orientation and direction of other real-world users, game objects and real-world AI Characters 94 to determine if a collision or hit has occurred. Here techniques like hitscan, raycasting may be used where the determination of the virtual weapon fires projectile is derived from the origin (x,y,z) of the users IR Laser Gun Apparatus 47 and its orientation (p,r,y) which provides both a positional vector for where the IR Laser Beam and its virtual game object/virtual weapon fire and a directional vector which can be used to determine a collision or hit.

Alternately hits may be determinable by this same method on that of virtual game objects 106, AI Characters 105 and remote users 107 where there is no IR Sensor/IR Receiver.

As illustrated in FIG. 5A the IR Laser Gun Apparatus 47 also features a pair external mounted audio speakers 66L, 66R used to provide 3D perspective audio for the projectile fire of IR Laser Beams, or other forms of virtual weapon fire, as well as incoming IR Laser Beams and virtual weapon fire from other real world users or AI Characters 94 devices and game objects as well as virtual AI characters 105 in the case of virtual weapon fire and remote users 107 which may be based on an IR Laser Beam and/or a virtual weapon usage. This maybe supported through emulating the biological mechanisms of binaural hearing, using DSP algorithms and sound locational technologies, and techniques such as ITD, IID, ILD and HRTF functions.

In which through the manipulating of the sound directional output from the user's speakers 66L, 66R on their IR Laser Gun Apparatus 47, and through stimulating the user's ears in different ways through the use of techniques such as ITDs, ILD and HRTFs it is possible to recreate artificially through sound location based technologies software and DSP algorithms, perceptual based sound location effects of users IR Laser Beam firing outward onto a target.

The users IR Laser Gun Apparatus 1, speakers 66L, 66 shall support also 3D positional audio in which the system may convert binaural recordings to stereo records or may convert binaural recordings, stereo, 5.1 and other audio formats used in the game to 8.1 in order to provide a real-time 3D sound experience.

In this process HRTF's may be to create 3D audio, or other techniques based on ambisonics and wave field synthesis principle to create 3D audio that is played back via the users IR Laser Gun Apparatus 47, speakers 66L, 66R.

In this process the 3D coordinates of users IR Laser Gun Apparatus 47, as well as the coordinates of other real-world and virtual game objects together with events such as the pulling of the trigger mechanism 53 on the IR Laser Gun Apparatus 47 may be used to generate image inputs into the HRIR database to generate 3D sound, where the sound shall be placed correctly on the three-dimensional plane relative to the IR Laser Beam projectile, the users position, the position of other real-world objects and virtual objects.

The system shall factor in the computation of the 3D audio other variables such as the pitch, roll and yaw expressed as (p,r,y) of the users handheld IR Laser Gun Apparatus 47 as well as the devices world coordinates/positional vector (x,y,z) at the point of the trigger being pulled or voice command was invoked and afterwards in which the 3D sound will be always be relation to the original origin of the IR Laser beam and it's the moving projected 3D holographic image generated from the creation of a virtual game object representing IR Laser Beam, together with the positional coordinates and orientation of other real-world objects and environment, other virtual game objects.

Sound effects and 3D audio may be generated by the games engine 77 and/or game application/client module 74, may be invoked on the devices speakers 66L, 66R through the audio module 76 during game play as a result of the detection for example of the projection IR Laser beams from the users IR Laser Gun Apparatus 47, or in the detection of a hit on the device from an IR Laser beam detectable by the IR Sensor 62 or by the Collision Manager 78, where the audio maybe positionally placed in 3D space in the same projectile direction of the moving IR Laser beam or the three-dimensional cartesian coordinates of the detected hit of the IR Laser beam.

3D audio may be positionally placed on a three dimensional coordinate of the planes of the Cartesian coordinates x, y, z axes, or relational to the devices orientation based on its pitch, roll and yaw. This allows the audio module to manipulate the sound outputs of the speakers so as the audio sound effect of the projected IR Laser beam appears moving in 3D space, relational to that of the user's devices own positional vector and orientation provided as six dimensional matrixes by the devices device tracking module 80.

The projectile direction of the IR Laser fire is based on a six dimensional matrixes at the point of origin for when the IR Laser trigger mechanism was pulled or a voice command to fire was given in the placement of the 3D audio effect of the IR Laser beam and in the calculation of its moving projection along the planes of the Cartesian coordinates in 3D dimensional space.

In addition to the previously described visual assisted targeting of a user's IR Laser Gun Apparatus 47 in which augmented images are displayed over the video captured from the users IR Laser Gun Apparatus 47, camera 50, and then presented to the user via their augmented reality ("AR") display apparatus 1, micro display 3.

A 3D perceptual sound effect or 3D sound effect may be signalled to the user based on the system detecting another user is within the range and line of sight of the users IR Laser Gun Apparatus 47, allowing the user to instinctively pull the trigger mechanism at greater velocity and accuracy whilst moving at speed which may increase the game play experience of the laser tag game.

Should a target be near to being in the line of sight, 3D audio effect sound increase as small three dimensional sound pulses represented as points on x, y and z may be output via the users augmented reality ("AR") display apparatus 1 speakers 6L, 6R and/or their IR Laser Gun Apparatus 47 speakers 66L, 66R, to aid the users hand movement of the IR Laser Gun Apparatus 47, to lock onto targets more quickly.

This is similar to how echo or sonar sound systems work but this is based on the three dimensional Cartesian coordinates of other real-world users, AI characters and objects as well as virtual users, AI characters and objects to determine this, which is retrieved via the network 97 from the game server 88 or host 89 by the devices client module 74 and provided to the audio manager 76 to support this detailed functionality. In addition, the Audio Manager 76 uses the previously mentioned techniques such as ITD, IID, IPD, ILD, together with HRTF functions among others to support this functionality together with its HRIR database. Using this capability of the system without visuals using 3D audible sound alone it is possible to target and successful hit another user.

Conversely using 3D audible sound and based on the detection of another user's proximity the system could sound an alarm via the users augmented reality ("AR") display apparatus 1 speakers 6L, 6R or their real-world game object devices speakers to direct a user away to safety away from a potential hit.

Here the IR Laser Gun Apparatus 47 speakers 66L, 66R may be used to output the 3D audio sound for both targeting and in the alerting of users to navigate away from targeting range in which the similar to before the three-dimensional coordinates (x,y,z) of the user and their IR Laser Gun Apparatus 47 together with the pitch, roll, and yawl (p,r,y) of their IR Laser Gun Apparatus 47 could be used by the game server 88, host 89 or the devices client module 74 to detect users coming into range of a kill shot or hit, in which this may invoke the audio manager 76 to generate a 3D audio sound effect is played via the devices speakers 66L, 66R in which the sound can be heard from the direction in three-dimensional space of the threat or the sound could be a directional sound to a safe location.

This is supported through the input of three dimensional coordinates and other variables into a HRIR database, where generated 3D sound effects and perceptual based 3D locational sound effects are played back as varying pulses along a relative plane to the line of sight of the IR Laser Gun Apparatus 47, allowing the user to aid users brain in identifying the target location of the other users or their position relative to the line of sight of another users IR Laser Gun Apparatus 47.

The volume of the sound maybe increased or decreased in volume as a user or target comes into or goes out of range of their IR Laser Gun Apparatus 47 line of sight in terms of its relative position in three dimensional space. Alternatively, the frequency of which the pulses of the sound are played back may be increased or decreased as a user comes into or goes out of range of their IR Laser Gun apparatus line of sight.

The sound direction shall always be relational to the calculated projectile of the IR laser beam fire as moving rendered object. These same capabilities may be provided on other forms of IR handheld devices and real world game objects which feature IR Transmitters and IR LEDs such as the use of an IR Shield Apparatus 90 where the user can physically move the IR Shield Apparatus 90 to target other users or AI Characters in which different pulses of sound are increased or decreased in frequency from the left or right side speaker to help guide the user in targeting where visibility may be obscured by the physical IR Shield Apparatus 90.

In a further embodiment, 3D audio sound may be used to help the user synthesis in their brain the visual shape of a hidden object or an object which is not in view, where 3D audio sound pulses are passed to the user's ear which via a manipulation of the speakers the sound is positionally projected as a three dimensional coordinate representing a the points or vertices of an object or its model coordinates. Based on the sequence of the positional audio sounds in three dimensional space it is possible for the user's brain for simple objects to form a shape and to determine an object type.

This provides a unique capability that today humans users do not pertain, in which through the embodiments of the disclosed invention this enhances the physical capabilities of the user's body during the game play adding yet a further dimension to the game play and mental challenge which goes far beyond the traditional game play of laser tag or that of traditional video game systems. This works similar to echo and sonar systems employed by dolphins, except the returning of the pulsing sound is based on computation of the position of a real-world or virtual world objects using prior generated mesh data, 3D model data/coordinates together with their real-time world coordinates provided by every client to the game server 88 or host 89.

Furthermore, there is no projection of sound to receive returning sound waves based on reflection of sound as in an echo based system, here the sound pulses are artificially generated computationally based on the known world and model coordinates of real-world objects, game objects, users, AI characters and virtual game objects, AI characters and remote users in which these inputs are provided to the HRIR database in the process of generating positional 3D sound effects by the audio manager 76.

Furthermore, techniques such as those mentioned previously such as ITD, IID, IPD, ILD, together with HRTF functions are used to emulate the direction and sound location, to create perceptual based 3D sound localisation, in which the user perceives the location of the sound to be in a specific location in the three dimensional space of their real-world and by the varying placement of the intermittent sound pulses in three dimensional space a shape can be formed in the user's brain of the object.

This is useful during the laser tag game when some real-world game objects as per the embodiments of this invention can be made to appear invisible to a user such as the detailed methodologies used with the IR Shield Apparatus 90.

These detailed features of using 3D audio effects to target targets or to identify the position and shape of an object or target using the detailed perceptual based 3D sound locational technologies and techniques could be supported in a variety of ways. In one way model coordinates and world coordinates of other target users, game objects and AI characters could be used to support these functions in which the 3D positional sound effects or 3D spatial sound effects may be mapped to these coordinates.

In another way this may make use of the Observer module capabilities of the IR Laser Gun Apparatus 1 and/or the users augmented reality ("AR") display apparatus 1, in which based on the captured surface and object geometric and volumetric data, together with the generated mesh data, mesh filter and wireframes a 3D model of a target can be generated. Based on this 3D model, 3D audio sounds can for example be mapped to the points or vertices on the model, which can be used to support the functions as described in terms of the identification of a shape of a target and its position in three-dimensional space.

Furthermore, using the observer component generated mesh data and wireframe data containing geometric, volume and depth on the three-dimensional space in front of the user it is possible to map the position of an object and potential target in terms of their relative position on the x,y,z axis which maybe used to support this functionality.

When played back via the users augmented reality ("AR") display apparatus 1 speakers 6L, 6R and/or their IR Laser Gun Apparatus 47 speakers 66L, 66R, the user's brain maybe be able to make out 3D shapes with their eyes closed which could be used to aid targeting of their IR Laser Gun Apparatus 1 for example on other users, giving them a gifted ability that humans don't posses.

The devices memory 60 and Storage 61, are used in the execution of the softwares programmable code; the storing and processing of video captured from the IR Laser Gun Apparatus 47, cameras 50; the storing and processing of voice recognition audio files captured from the device microphones 67L, 67R; the storing and processing of virtual images and/or video for display on the devices surface display panels faces. Stored files and data may include in addition raw binary data, images, video or audio data transmitted in the IR beam/IR Laser Beam that may be stored also for processing by a client.

Specifically, the memory 60 shall be used to for storing and executing the programmed instructions and code by the CPU(s) and GPU(s) in the processing unit(s) 11 in which different parts of the systems code programmed for specific functions may be processed in parallel by different processors in the executing of the game and performing the differing functions of the corresponding programs and modules such as the rendering module 75, observer module 79, device tracking module 80, and the light display module/device drivers 50 etc. which all server separate functions in the system as shown in FIG. 5B.

The memory 60 is also used in the executing of code by the operating system (O/S), the kernel and the device drivers as well as the programs as detailed previously such as the observer module 79 and that run on top of the O/S. Data and files may be held in memory as part of the execution of the code. The memory 60 may be a form volatile memory or random access memory (RAM) for performing high speed instructions by the CPU such as DRAM, fast CPU cache memory and SRAM/SDRAM or other forms of volatile memory or example used as the main memory of the system. Additional memory may be provided via the GPU as dedicated graphics memory or may be commonly used between the CPU and GPU.

The memory 60 may also consist of non-volatile memory also for performing BIOs and firmware operations such as flash memory, ROM, EPROM, or EEPROM memory, where flash memory may be used as a secondary form of memory for example. The flash memory may be a type of NOR Flash. Files and data may be stored also the storage memory 61 of the device together with the binaries, executable files of the software module programs and all corresponding files. This shall include the Operation System (O/S) software, software modules and all device drivers for the device hardware appliances as depicted in FIG. 5B.

The storage may be in the form of a SSD flash based drive or a conventional hard disk such that is HDD based, due to the high performance of SSDs over HDD the preference would be to use though SSDs. Other forms of non-volatile memory such as flash storage may be used also as storage. As depicted in FIG. 5A, the users IR Laser Gun Apparatus 47 is powered by a lithium style battery 70 or another form of suitable battery, in which the turning on or off of the device is operated via a power switch 69, in which when on an electrical charge powers the devices electrical elements on its circuitry board including the capacitor for discharging electrical to project the IR Beam/IR Laser Beam through the activating of the IR LEDs 49 and IR Transmitter 64 upon the trigger mechanism 53 being pulled; as well as powering the devices surface display panel faces 57L, 57R and 57; speakers 66; microphones 67 and other electronic and mechanical parts.

In addition a Wifi wireless network interface 58 and bluetooth 52 module provide the communication and networking connectivity for the users handheld IR Laser Gun Apparatus 47 to communicate with the game server 88 or host 89 and the users augmented reality ("AR") display apparatus 1 in the exchanging of sensory data, positional three dimensional cartesian coordinates and other state/event information such as the invoking of the trigger mechanism 53 by a user where the via the Wifi or bluetooth interface the IR Laser Gun Apparatus 47 embedded software client module 74 shall send a notification of the change in state to the game server 88 or host 89 and the users local augmented reality ("AR") display apparatus 1, rendering module 27 and collision manager 26.

This is used in the previous detailed functions of the users augmented reality ("AR") display apparatus 1, for generating of virtual game objects and displaying augmented images of the moving IR Laser beam for example over the user's real-world view as well as the generating of perceptual based 3D sound localization or 3D spatial sound effects of the moving IR Beam/IR Laser beam.

For example upon the user pulling the trigger mechanism 53 the users augmented reality ("AR") display apparatus 1, client 28, game server 88 or host 89 receives via the network 97 a notification of the change in the user IR Laser Gun Apparatus 47 state, together with the three dimensional cartesian coordinates and the P,R,Y of the users held IR Laser Gun Apparatus 47.

The users wearable augmented reality ("AR") display apparatus 1, client module 28 or the game server 88 or host 89 depending on the authority of the client module, may invoke via its games engine the creation of a new virtual game object for the purpose of displaying a virtual image of the IR Laser Beam, in which the games engine 35 and/or client module 28 if it has authority shall then invoke the rendering module 27 to render and display the augmented projectile fire of the weapon via the users augmented reality ("AR") display apparatus 1, over the user's real-world view as a 3D holographic image, hologram or stereoscopic images among other forms.

Here the resulting moving projected augmented image of the virtual-game object created may be accurately representational of that of the real-world IR Laser beam projection in three-dimensional space, where using the state information on the users IR Laser Gun Apparatus 47 at the time of the user pulling trigger, including its world coordinates (x,y,z), heading, and orientation (p,r,y) the projection of the IR Laser Beam can accurately be formulated in terms of its directional heading in the three dimensional space of the game.

In addition, the velocity of the IR Laser Beam where this travels at a known velocity can be formulated. The result being that the moving displayed projectile IR Laser Beam shown as augmented image via the users micro display 3, may be precisely shown as travelling in three dimensional space of the real-world to that of the invisible IR Laser Beam resulting from the users pulling of the IR Laser Gun Apparatus 47, trigger mechanism 53.

Alternatively, the game server 88 or host 89 may user external 3D projection mapping techniques together with its external projectors 96, to project lighting effects and augmented images of the IR Laser Beam, in which using same state information captured from the users IR Laser Gun Apparatus 47 these virtual images and lighting effects may be accurately augmented over real-world objects or surfaces.

It should be noted that in both cases spatial mapping techniques may be used in the placement of the virtual game object of the IR Laser Beam and its augmented image over the real-world space, surfaces or objects of the laser tag game environment and/or laser tag arena 98.

It should be noted that state information may not be sent over the network 97 to the game server 88, host 89 or other clients solely in the case of the user pulling the trigger but would be expected to be sent frequently by the embedded software client module 74 of the users IR Laser Gun Apparatus 47 in which state information also consists of any changes in three dimensional Cartesian coordinates of the devices in addition to changes in its orientation in the form P, R and Y, where P equals the pitch, R equals the roll and Y equals the yaw as a six dimensional matrixes for many other functions disclosed in the embodiments of this invention.

One example is the use of this state information in the formulation and triangulation of collision detections together with other variables as previously described such as mass and velocity in the determining a of a response following a hit determination.

The Light Display Module 55 controls the illumination of pixels and the display of the resulting light from virtual images on the surface display screen faces 57L, 57R, 57 that cover the faces and the corresponding surfaces of the IR Laser Gun Apparatus 47 device. This module reads the pixel colours from the frame buffer for example together with their pixel coordinates for each of the objects surface display screen faces 57L, 57R, 57 that make up its 3D mesh and invokes the illuminating of the each of the display panel the LEDs in the case the display panels are form of organic surface display.

The surface renderings are projected by the light display module 55 on the surface display panel faces 57L, 57R, 57 of the IR Laser Gun Apparatus 47 using Light Emitting Diodes (LEDs) where the display panels are a form of organic light emitting displays (OLED). The display maybe back-light also with further LEDs. The display could alternatively be a form LCOS or LCD that is made of a glass or polymer material in which the light display module may activate the display.

As depicted in FIG. 5A on top of the physical faces and the surfaces of the structure of IR Laser Gun Apparatus 47 device, are a series of surface display screen faces 57L, 57R, 57 that cover the device providing a semi or full 3D mesh display around the device in which the surface display screen faces 57L, 57R, 57 are arranged in a tiled configuration.

The surface display panel faces 57L, 57R, 57 may be a form of organic display such as an organic light emitting display (OLED), a Liquid Crystal on Silicon (LCOS) or another form of Liquid Crystal Display LCD. Multiple panels may be arranged in a tiled or 3D mesh configuration that form the real-world faces and 3D model of the real-world device and game object. The surface display screen faces 57L, 57R, 57 are powered by the main board circuitry via connectors. Each of the surface display panel faces 57L, 57R, 57 are driven by circuitry and the display drivers.

The surface display panel faces 57L, 57R, 57 may be connected directly to the devices PCB through an internal display port ("iDP") where the display maybe soldered directly to the PCB or may be connected via another form of standard based DisplayPort and digital display interfaces such as an embedded display port ("eDP"), Slim port, HDMI, USB, MIPI DSI or a DVI link etc.

Here multiple surface display panel faces 57L, 57R, 57 are arranged to form a partial or full 3D mesh over the users IR Laser Gun Apparatus 47 device and real-world game object which via these multiple tiled arrange surface display screen faces 57L, 57R, 57 the device may be visually represented as a 3D rendered game object in the real-world. The 3D rendering of the IR Laser Gun Apparatus 47 is formed from multiple triangular or quad shaped surface display screens faces 57L, 57R, 57 may cover the entire surfaces and faces of its three dimensional shape and geometric structure which form a 3D mesh visible to users during a laser tag game in the real world with no visual aid.

The 3D mesh maybe a form of polygon-based mesh that is physically present in the real-world, in which the real-world 3D mesh is formed of multiple surface display panel faces 57L, 57R, 57 overlaid on the physical IR Laser Gun Apparatus 47 device and real-world game object in which the object/device is formed of real world vertices/points, edges, faces, polygons and surfaces in three-dimensional space of the real-world for which the virtual-game objects polygon-based mesh maps directly to in terms of its three-dimensional space, edges, faces, polygons and surfaces of the IR Laser Gun Apparatus 47 in the real-world.

Alternatively, the real-world 3D mesh constructed of multiple surface display screens panels 57L, 57R, 57 maybe a form of 3D wireframe model which is represented by a virtual 3D wireframe. 3D rendered images may be formed through the display of 2D images and applying of texture maps to each of the multiple surface display screens faces 57L, 57R, 57 and their faces, in which the multiple 2D images and rendered texture-maps displayed on the devices faces via their respective surface display screen faces 57L, 57R, 57 to form a 3D rendered image that is physical in presence in the real world.

Here each of the surface display screen faces 57L, 57R, 57 covering different faces of the object maybe in arranged in tiled configuration covering the object fully or partially. Where the object is fully covered in display screens this creates a real-world 3D mesh upon which images can be rendered and displayed. Here each surface display screen face 57L, 57R, 57 may represent a triangle or polygon or quad which forms also the paired virtual game object 3D model of the real-world device and real-world game object. As with normal virtual game objects, complex 3D models can be made up of many triangles or polygons, where during the rendering process these map to faces of the virtual game objects 3D model, which in the embodiment of the invention described herein these may map to actual real-world object surface display screen faces 57L, 57R, 57 thus recreating a 3D model which is physical in presence in the real-world in which users can see the moving tangible IR Laser Gun Apparatus 47 device and its 3D structure together with its rendered surface texture mapping and other visual effects without any visual aid.

This is achieved through a process of mapping the paired virtual game objects 3D model points or vertices, polygons/triangles, faces and their corresponding texture maps to individual surface display screen faces 57L, 57R, 57 of the IR Laser Gun Apparatus 47 device and real-world game object, where based on pixel coordinates and a face ID attributed to each display panel, this allows complex 3D shapes to be recreated in physical form in the real-world which can be interacted with, touched, moved and which provide inputs into the state of the game in which both the usage of real-world game objects and virtual game objects can affect the game play, outcome and state where to two states of the real-world game and that or virtual-game world coexist and are maintained computationally.

Here the IR Laser Gun Apparatus 47 device and real-world game objects faces, physical model coordinates map and vertices map to that of its paired virtual-game object which is identical geometrically in form to that of the real-world device and game object. In addition, just like a virtual game object 3D model which is formed of triangles represented by points along the x,y,z coordinates and vertices, each display screen has points along the x, y, z represented as vertices in the real-world.

In addition the processing of individual surface display panel faces 57L, 57R, 57 may be determinable by the order in which the faces references each of the vertices is provided as a list of faces by the rendering module 75 to the GPU, in which the sum of all of the faces make up the total 3D model of the real-world game object and in where each of the listed faces maps to an individual surface display panel face 57L, 57R or 57. Here output 3D model may broken back down to individual rendered faces mapped back to each of the surface display panels faces 57L, 57R, 57 for which each image be rasterised, fragmented for which the outputted individual pixel RGB array or in-memory bitmaps get written to the frame buffer for each of the individual mapped surface display screen faces 57L, 57R, 57 to that of the faces of the corresponding previously rendered model in the matrix and rendering operations of the device.

Alternatively, like a 3D model, the IR Laser Gun Apparatus 47 device and real-world game object display panels may also be arranged as quads where quads are used to form its paired virtual game object structure. In this configuration it is the cumulation of all of the triangular or quad surface display screen faces 57L, 57R, 57 and each of their x,y, z points that forms the 3D model coordinates and points of the IR Laser Gun Apparatus 47 device in the real-world.

Here the rendering pipeline performs the same functions as described previously such a ray tracing or ray casting as well as rasterisation, fragmentation etc. except the resulting output maybe individual 2D texture map images for each face of the device's surface display screen faces 57L, 57R, 57 that are derived from its 3D model in the form of individual pixel RGB array or in-memory bitmaps which get written to the frame buffer for each of the individual mapped surface display screen faces 57L, 57R, 57 to that of the 3D model faces in the matrix and rendering operations of the device. Techniques such vertex shading, and other rendering techniques may be applied during this process.

As described complex 3D model renderings of paired virtual game objects are broken down into individual faces, triangles and texture maps images that form the 3D structure of the virtual-game object associated with the real-world object in which the individual triangles or polygons each have a coordinate reference to an actual surface display screen faces 57L, 57R, 57 on the IR Laser Gun Apparatus 47 device and real world game object.

In addition, each individual triangle or quad maps of the 3D virtual game object maps directly to that of the IR Laser Gun Apparatus 47 device and real-world game object's display mesh which is a physical form of triangle or quad surface display screen faces 57L, 57R, 57 wrapped partially or fully around the devices structure to form its 3D mesh and faces. This same capability is supported on all real-world game objects, wearables such as users IR Mixed Reality Suits 93, IR Mixed Reality Vests 92 and real-world AI Characters 94.

This allows complex 3D shapes to be recreated and displayed in physical form in the real-world seen by the naked eye and for their surfaces to be dynamically updated with changes in the state of the game or the real-world device/game object or changes in the state of other real-world devices/objects or virtual-game objects.

Here transformations are handled differently to traditional video game systems, in which rather than the game logic invoking a transformation as part a sequence in a game or a user moving their head position or the use hand gesture's to move say a character, this is invoked by physical actions in the real-world, whereas IR Laser Gun Apparatus 47 device is rotated or moved by a user's physical hand and arm movements this shall invoke the re-rendering of its surfaces to apply lighting and shading visual effects in real-time according to other real-game objects or virtual game objects world coordinates, directional vectors and relative directional lighting to that of the real world devices/game object world coordinates, directional vector and directional lighting.

Changes in the real-world device model coordinates, world coordinates and state are then applied to the paired virtual-game object associated with the real-world device and the corresponding updated 3D model surface renderings are then broken down into individual 2D images or pixels RGB arrays or in-memory bitmaps for each face of the 3D object which are then mapped and displayed on the corresponding real world surface display screen faces of the users IR Laser Gun Apparatus 47 device.

Reflections may also be rendered on the surfaces of the real-world device, based on computation of the relative coordinates of other real-world game objects, users, AI Characters 94 or virtual-game objects 106, AI Characters 105, where for example these visual effects may be generated as a result of the user physically changing the directional position of the IR Laser Gun Apparatus 47 or changing its coordinates in the real world by moving it physically. Other lighting effects like specular and diffuse lighting among other lighting effects may be applied all of which the result visible changes can be seen by the naked eye of the user without any form of visual aid such their wearable augmented reality ("AR") display apparatus 1.

The same capabilities are supported on all real-world game objects, wearables such as users IR Mixed Reality Suits 93, IR Mixed Reality Vests 92 and real-world AI Characters 94.

As yet a further optional embodiment each surface display screen faces 57L, 57R, 57 may be represented by an individual virtual game object or cumulatively all of the surface display screen faces 57L, 57R, 57 may be represented by a single virtual game object in which each physical screen represents a face of the virtual game objects 3D model.

In the case of a single virtual game object in the final stage of the rendering pipeline the 3D image is broken down into individual addressable 2D virtual images that represent each of the real world game objects addressable polygons or quads which each map to individual surface display screen faces 57L, 57R, 57 which are triangular or quad in physical form.

Individual pixel RGB array's or in-memory bitmap's then get written to the frame buffer for each of the individually mapped surface display screen faces 57L, 57R, 57 to that of the 3D model faces in the final matrix and rendering operations of the device, resulting in display of each 2D image on each of its respective surface display screen faces for which the sum of all of the surface display screen faces 57L, 57R, 57 forms a 3D image visible in the real-world. Here each physical display panel may have an addressable rasterized image as an output of the rendering pipeline which represents the corresponding polygons or set of triangles/quads which form the real-world shape of the device as well as the virtual-game object model shape.

In the case of each surface display screen faces 57L, 57R, 57 having its own virtual game object a 2D image shall be generated by the rendering module 75 for each of its respective surface display screen faces, where individual pixel RGB array's or in-memory bitmap's then get written to the frame buffer for each of the individually mapped surface display screen faces 57L, 57R, 57 in the final matrix and rendering operations of the device, resulting in display of each 2D image on each of its respective surface display screen faces for which the sum of all of the surface display screen faces 57L, 57R, 57 forms a 3D image visible in the real world. During this process a 3D model may be constructed by the rendering module 75 made up of multiple game objects representing the model faces in the real-world.

Alternative raycasting or ray tracing may be used where the tracing of a path from an imaginary eye is processed through to each pixel coordinate and corresponding surface display screen faces 57L, 57R, 57. In addition, many other forms of 3D models and rendering techniques may be used in this process for the mapping of the resulting pixels and image light from the paired virtual-game object to that of the paired IR Laser Gun Apparatus 47 device and real-world game object.

This includes suitable methods such as wireframe rending methods may be used which use polygon-based rendering, to techniques such as radiosity and scanline rendering in which the complex 3D generated images and models maybe be broken down into individual surface faces and 2D images or pixel arrays that are addressable through the pixel mapping coordinates, and model addressable coordinates or other means such as polygon or quad addressing to the individual surface display panels and faces of the real-world device or game object.

In fact, any form of 3D model which is representational by points in three dimensional space and which texture maps maybe applied to their surfaces may be mapped corresponding to a real-world device or game objects surfaces in which the real-world device or game object also consists of the same representational by points but in the three dimensional space of the real-world. These points are referred to as vertices in which each triangle has a set of vertices and is referenced as face of a 3D object that may be mapped to the physical surface display screen faces 57L, 57R, 57 of the real-world device or game object by a variety methods such as those described previously or by the use of the face ID.

In addition, multiple forms of rendering techniques such as Radiosity, Raytracing, Ray Casting, Volume rendering may be used. Furthermore, other form of 3D Models such as Wireframe which maps to polygons as described maybe used to. Texture mapping or diffuse mapping techniques maybe used also described display of virtual images on the physical surface display screen faces 57L, 57R, 57 of the users IR Laser Gun Apparatus 47, device as with any other real-world game object, user wearable device such as IR mixed reality suit 93, IR Mixed Reality Vest 92 as well as real-world AI Characters 94 where these maybe wrapped and mapped pixels from a texture on to the physical surface display screen faces 57L, 57R, 57 of the device to form a 3D image in physical form that has texture maps on each of its surface display screen faces 57L, 57R, 57.

Similar to traditional texture mapping/diffuse mapping methods here pixels are mapped to the IR Laser Gun Apparatus 47 device real-world surface display screen faces 57L, 57R, 57 which represent the devices paired virtual game objects 3D surfaces and faces in the real-world. Texture maps maybe stored in tiled order according to the faces to the IR Laser Gun Apparatus 47 device and real-world object surfaces.

Post the processing of the texture maps an RGB array or in-memory bitmap may be generated and stored in the frame buffer for each of the devices physical surface display screen faces 57L, 57R, 57 in which these RGB array's (red, green, blue) arrays or in-memory bitmaps maps denote each pixel colour which is projected on corresponding pixel of the frame buffer. Where upon the final addressable pixel and pixel colour values getting written into a frame buffer for each of the surface display screen faces 57L, 57R, 57 the texture map images are then drawn on the surface display screen faces 57L, 57R, 57 of the IR Laser Gun Apparatus 47 device and real-world game object from which the projection of corresponding multiple texture maps on each of the corresponding addressable surface display screen faces 57L, 57R, 57 forms a 3D rendered image over the faces and surfaces of the device which is visible to the user by the naked eye and touchable.

This allows in the case for example of the real-world AI Character is full 3D rendered image, 3D model and virtual game object of itself constructed in the virtual sense to walk around the real-world in which real-world human users can interact and touch the 3D rendered AI character. Similarly, the 3D rendered image of the IR Laser Gun Apparatus 47, can be moved freely around the three dimensional space of the real-world in which the users exists, allowing human users to touch and interact with real-world game objects, where their physical actions can cause physical changes in appearance to the device in the real-world and that of other real-world game objects, user wearable devices and real-world AI Characters 94 as a result of aiming the IR Laser Gun Apparatus 47, and pulling the trigger mechanism 53 in which a hit is registered.

It should be noted here also that each surface display panel face 57L, 57R, 57, is independently addressable and controllable in the display of virtual images where individual images or portions of images (triangles/polygons/quads) may be mapped to individual surface display panel faces 57L, 57R, 57 in the reconstructing of 3D images.

Alternatively, images may be mapped based on 2D coordinates, or vertices, or faces Ids, Surface Ids, Edges etc. from the outputted rendered images by the rendering engine to individual surface display panel faces, where each surface display panel face 57L, 57R, 57 has an addressable frame buffer.

Alternatively, a single frame buffer could be used in a tiled configuration in which the pixel coordinates span all of the different surface display panel faces 57L, 57R, 57, where every surface display panel faces 57L, 57R, 57 has a unique addressable pixel set of coordinates or RGB positions.

The Light Display Module 55 therefore may be used in this mapping process or the mapping process maybe abstract to the Light Display Module 55 where the output rendered images of rendering module 75 are rasterised and fragmented and then written for example to individual addressable frame buffers that each map one to one with a surface display panel face 57L, 57R, 57.

As depicted in FIG. 5A, the IR Laser Gun Apparatus 47 consists of surface display panels faces 57L, 57R, 57 that maybe in the form of LCOS, OLED, TOLED or LCD display, in which these display panels maybe a form of touch-display screens 56L, 56R, 56 feature touch-sensitive sensors for detecting user's physical interactions via the action of pressing or swiping the screen to invoke an game action.

Multi-touch support is provided through the firmware that supports each of the display panels, together with sensors which maybe an ASIC sensor that is attached to the touch surface of each surface display panel face 57L, 57R, 57 or may be attached to second screen portion as a thin over lay 56L, 56R, 56 overlaid over each surface display panel face 57L, 57R, 57, which provides the touch-screen display portion of the displays. The multi-touch capability may be supported through many forms such as capacitive technologies, resistive, optical or wave.

In the depicted example given in FIG. 5A this is shown as the touch screen sensor portion being overlaid over each surface display panel face 57L, 57R, 57, however touch-screen input support could be implemented in either way. Inputs from the touch screen sensor portion of the displays maybe used to control the real-world device and game object or to change its state, in which the physical usage by pressing the screen by a user's hand can invoke a action, change in the rendering or state of a device which may be seen in the real-world through the surface display panel faces 57L, 57R, 57 on the surfaces of the real-world device and game object or other the real-world device and game objects where the resulting action causes directional light to appear on other objects which may be seen by the naked eye.

The use of the touch sensitive sensors and a user's physical interactions may invoke in game actions that are relational where for example as a result of the user pressing a rendered area of the IR Laser Gun Apparatus 47, surfaces display panel face 57L, 57R, 57 this could invoke a renderings of a different augmented reality 3D holographic image by the rendering module 27 of the users paired augmented reality ("AR") display apparatus 1, where a different colour could be used in the projection of the visualised moving 3D holographic image of the laser fire resulting from the user subsequently pulling the trigger mechanism 53 for example.

Here the IR Laser Gun Apparatus 47, client module 74 which handles the state of the IR Laser Gun apparatus game object would upon detecting a input resulting from the user touching the touch screens sensor display portion 56L, 56R, 56 of the surface display panel faces 57L, 57R, 57 transmit over the network 97 the inputs to the game server 88 or host 89 or the users local augmented reality ("AR") display apparatus 1 signaling a change in the state of the IR Laser Gun Apparatus 47 IR Beam/IR Laser Beam fire.

The result of the user touching the screen may change in this use case the game the level of damage that the laser gun fire power is deemed capable of generating for which this may trigger in subsequent rendering of the augmented 3D holographic images of the IR laser beam fire the use of a different colour and scale to indicate the change. This may also be used in the determination of hits counting as greater damage or kills.

This provides the means for supporting physical user inputs both in the use of the IR Laser Gun apparatus trigger mechanism 53 and the touch screen portion 56L, 56R, 56 of the surface display panel faces 57L, 57R, 57 to change both the game state and the resulting augmented-reality rendered images as mixed reality gaming experience that is both tangible and augmented.

The touch screen portions 56L, 56R, 56 may be used to toggle off and on also the display of the IR Laser Gun Apparatus 47, camera 50 captured video in real-time where the user sees via their augmented reality ("AR") display apparatus 1 the line of sight of the IR Laser Gun Apparatus 47 which is used for assisted accurate targeting where augmented images are overlaid on the video to assist the user aligning of the IR weapon to achieve a hit. The video may be provided via the network 97 over a WiFi or bluetooth to the users augmented reality ("AR") display apparatus 1, to support this capability.

In addition, the use of the touch-screen display panels 56,56R, 56L, to provide touch screen inputs by a user could invoke a change in the rendered and displayed texture-mapping or lighting effects displayed on the surface display panel faces 57, 57R, 57L of the users IR Laser Gun Apparatus 47. This is supported through a process in which the user's inputs are processed by the CPU and passed according to the coding of the client 74, to the rendering module 75 as a call to modify the surface texture map renderings. This shall then invoke a new texture-map for the corresponding surface display panel faces to that of the touch-screen surface 56L, 56R, 56 which was touched, to be generated from which the image may then be rasterised and fragmented.

The corresponding RGB pixel array or in memory bitmap may then be written to the frame buffers of the related display panel, where according to pixel colour and coordinates, the corresponding display panel/face/surface ID of the surface display panel face 56L, 56R, 56 that the user touched, the Light display module 55 will then illuminate the pixels on the corresponding surface display panel faces 57L, 57R, 57 that the user has touched, which may be seen by the user without any visual aid.

Alternatively based on the detection of a user touching the touch display portion of a single surface display panel face 57, this could invoke a change in the displayed texture-map and visual lighting effects on all of the surface display panel faces surface display panel faces 57L, 57R, 57.

As yet a further embodiment of the presented invention, the user may by touching the touch display portion of the surface display panel faces 56L, 56R, 56 in which their inputs are detected by the touch-screen sensor portion of the display, may bring up specific displayed video or images onto specific surface display panel faces 57L, 57R, 57 that serve a specific function in the game play and use of the IR Laser Gun Apparatus 47.

For example for the purpose of targeting simple 2D or 3D images of the three dimensional space in front of the user may be displayed as a result of a user's touch screen inputs in which these images the positions of other real-world users, game objects and AI Characters or virtual world game objects, AI Characters and remote users may be visually shown within a range of three dimensional coordinates on a triple axis (x,y,z) based on state information retrievable from the Game Server or host 89 which may be displayed on the user digital scope targeting lens 71.

Similar to the previously described function of visual assisted targeting via the users augmented reality ("AR") display apparatus 1, visual targeting aids may be displayed together with positional values for x,y,z as well as for the orientation of targets expressed p,r,y and elevation to assist a user in targeting. In addition, users may be colour coded to indicate friend or enemy based on their team classification stored on the game server 88 or host 89. In addition, the weapon which a real-world user, AI Character or virtual AI Character or user maybe holding could be displayed based on the pairing information retrieved from the game server 88 or host 89. Other state information such as the state of their Shield, state of the health of the target, name of the user or AI character together with the targets own directional heading, speed, velocity and precise world coordinate maybe displayed.

The display of this targeting display may be invoked by the devices Client module 74 based on the detected user touch screen inputs in which the client module shall retrieve the state information from game server 88 or host 89 and pass this information to the rendering module 75 for display on the user digital scope targeting lens 71.

Users may using the touch screen select targets in which the 3D audio targeting system shall track those users and the targeting display will prioritise its directional indicators based on the selected target until a hit is achieved.

Here all state information on all targets and clients is retrieved by the users IR Laser Gun Apparatus 47, client module from the game server 88 or host 89 via the network 97 which maintains all state information for all real-world users, game objects and AI Characters 94 and all virtual game objects 106, AI Characters 105 and remote users 107.

This same assisted targeting display, may be invoked via the detection of a voice command detectable via the speech recognition module and actionable via the client module 74 processing of the voice command. It should be noted although the touch screen display portion is depicted and detailed as separate portion of the screen surfaces this may be part of the surface display panel faces 57L, 57R, 57.

As depicted by FIG. 5A the handheld IR Laser Gun Apparatus 47 device, features a number of sensors 51 including a multi-axis accelerometer, gyroscope, tilt sensor and motion sensor, a GPS Tracker, a solid state compass, an electromagnetic compass/digital compass and a magnetic compass or magnetometer. Furthermore, the device sensors 51 may features an inclinometer, pedometer, speedometer, altimeter, a MEMS Barometer and a dead reckoning module.

These sensors are used to formulate the IR Laser Gun Apparatus 47 world coordinates/position expressed as three dimensional Cartesian coordinates or points on the x,y,z; the orientation of the device expressed as pitch, roll and yaw (p,r,y); directional heading which may be expressed as directional vector and elevation from ground level. Here similar to the users augmented reality ("AR") display apparatus 1, the tilt sensor is used to formulate the devices pitch and roll (p and r) on a 2-axis. The tilt sensor and/or accelerometer combined with inclinometer may be used to also formulate the pitch, roll and yaw of the device on a 3-axis.

Alternatively, the accelerometer may be a three-axis accelerometer for measuring motion on a x,y,z axis or other suitable axis such as p,r,y. It may also be a multiple axis used to determine magnitude and direction of the acceleration of a client as a quantifiable vector and form of free-fall accelerometer.

The accelerometer/motion sensors may be used to determine also the heading, direction and speed of a moving client. This maybe a form of inertial navigation system in which the sensor is capable by using dead reckoning to the position, orientation and velocity of a moving client.

As further configurable option the accelerometer maybe used in conjunction with the gyroscope to calculate the tilt or velocity of change in angle direction in which the client is tilting.

In addition to these sensors as stated the IR Laser Gun Apparatus 47, features a GPS Tracker, a Solid state compass, an Electromagnetic compass/digital compass and a Magnetic compass or magnetometer which are responsible for the tracking and maintaining of the devices position world coordinates in the three dimensional space of the real-world and that of the virtual world of the laser tag game, determined as three dimensional cartesian coordinate (x,y,z).

Here a 3-axis electro magnetic compass/digital compass or magnetometer may be used to measure also the users directional heading on a suitable x,y,z axis. This may be combined with the devices world coordinates and directional vector used for maintaining state information and dead reckoning purposes. Alternatively, the device may use a dedicated dead reckoning module/sensor for the purpose of performing dead reckoning.

The electromagnetic compass or digital compass work on the principle of a heading but also provide values for pitch and roll on a three axis, as such these sensors may be used in the measuring of the devices orientation.

These sensor devices take reading measurements, which are passed up to the client via the CPU and bus as interrupt or output, from which the client module 74 shall then disseminate the data as different forms of state information on the device to both the game server 88, host 89, its local modules such as the collision Manage 78 and rendering modules 75 as well as provide the data to other clients for performing the functions as described within the embodiments of this invention.

The sensor readings form the IR Laser Gun Apparatus 47 device and real-world game objects world coordinates, orientation, velocity and direction etc. represent the clients state at any one time.

This state information is used in the many functions of the embodiments of the invention disclosed herein including but not limited to collision detection, hit determination, the invoking of transformations in response to a hit detection or two clients intersecting, the invoking of the re-rendering of real-world objects display surfaces where a user's hand is detected to have intersected with the object and the invoking of game sequences and augmented reality displayed imagery via the users augmented reality ("AR") display apparatus 1, among many of the other functions disclosed in the embodiments of the invention disclosed herein.

The IR Laser Gun Apparatus 47, also features a haptic module 68 that provides physical motion and vibrational feedback invoked by the vary states of the IR Laser Gun Apparatus 47, such as pulling of the trigger mechanism 53 mechanism when an IR Laser Beam is projected or if a hit is detected on the devices IR Sensor 62 and IR Receiver 65 by another users IR Beam/IR Laser Beam, or collision detection of a virtual game object weapon fire with the users IR Laser Gun Apparatus 47.

The haptic module, recreates the physical sense of the IR Laser Beam hits and firing IR Laser Beams from the pulling the trigger mechanism of the IR Laser Gun Apparatus 47 by applying vibrations, forces and motions, where a vibramotor or vibration motor provides physical feedback through the user's hands on the handle section of the IR Laser Gun Apparatus 47. Which maybe invoked by an IR Sensor reading or based on a collision detection computed by the collision manager 78.

In the case of the hit being a computation, this maybe from a real IR Laser beam formulated through the projectile, directional heading and coordinates of its corresponding generated virtual game object or a virtual game object weapon fire generated via a virtual weapon that is controllable via hand gestures through the users augmented reality ("AR") display apparatus 1 in which the collision manager 78 based on the projectile of the weapon fire along with other variables shall determine if there was a hit for example.

Here the collision manager 78 may invoke the users IR Laser Gun Apparatus 47 to vibrate by activating the haptic module 68 upon determining a hit. The extent of the vibration could be varied based on a computation of the mass, velocity among other physics variable of the object that has intersected with IR Laser Gun Apparatus 47, in which the rate at which the vibration motor vibrates could be increased or decreased accordingly allowing the user to physically experience different levels of physical feedback based on the varying mass of the object that has intersected with the IR Laser Gun Apparatus 47.

The activation of the haptic module 68 and its vibrational motor maybe triggered in many ways including by the explosion of Virtual game object proximity mine that is detonated or a detected hit from a physical IR Proximity Mine Apparatus 91 based on its projectile IR Laser Beams hitting an IR Sensor of the users IR Laser Gun Apparatus 47, or based on a computation of a hit detection by the collision manager 78 of users IR Laser Gun Apparatus 47.

Furthermore, a virtual AI Character 105 can invoke the haptic module where their model coordinates collide with that of the IR Laser Gun Apparatus 47 model and world coordinates. For example, the Game Application 126 on the game server 88 or host 89 may invoke a virtual AI to physically grab and shake the users IR Laser Gun Apparatus 47, for extra physical and visual effect during a game scene which upon detecting the virtual AI character has intersected with the model and world coordinates of the IR Laser Gun Apparatus 47.

Here the collision manager 78 and its response module depicted in FIG. 5B shall be responsible for invoking the haptic module and its vibration motor to be activated or go off in the case of detecting collisions or intersections of the users IR Laser Gun Apparatus 47 with another object, user or AI Character whether real or virtual based on state information of the other objects, users or AI Characters.

In which the client module 74 shall retrieve from the game server 88 or host 89 via the network 97 state information on all nearby objects, user or AI Character which it shall provide to the Collision Manager 78 together the IR Laser Gun Apparatus 47 state information captured from the devices local sensors 51 which shall be used by the Collision Manager in the determination of a hit or another object or AI character intersecting with the users IR Laser Gun Apparatus 47.

This includes the coordinates (x,y,z) of each object, its directional vector, model coordinates, hit box coordinates, velocity, mass etc. used in the determination of a collision and the response. It should be noted that objects may be real-world game objects, objects and surroundings or virtual world game objects and surroundings that exist within the same three-dimensional space of the game that exists both in the real-world and virtual world of the game.

In addition, the Collision manager 78 may detect via the sensor readings a real-world game object, user or AI Character that has physical collided with the device in which it may activate the haptic module 68, in most cases because the user may drop the device or could fall for example causing the same rapid changes in motion potentially detected by the sensors 51, the collision manager shall always use the state information provided by the client module 74 to determine whether a collision has occurred and if it shall invoke as part of its response the haptic module 68.

The user of the IR Laser Gun Apparatus 47, may be used to target and hit a plurality of different configurations and usages of IR Receivers/IR Sensors which may be mounted on real-world game objects and devices such as the described IR Laser Gun Apparatus 47 or user wearable IR Receivers/IR Sensors which may be worn in a variety of ways on a number of wearable devices described with the embodiments of this invention as well as real-world AI Characters 94. For example, one or more IR Receivers and IR Sensors may be mounted on the user IR Shield Apparatus 90 or maybe wearable on the user on their body, head, arms or legs. Alternatively, one or more IR Receivers and IR Sensor maybe part of the user's wearable head mounted augmented reality ("AR") display apparatus 1 or could be a wearable IR Mixed Reality Suit 93 or IR Mixed Reality Vest 92 device.

In addition, one or more IR Receivers and IR Sensors maybe located on different body parts and the physical structure a real-world AI Character 94 or game object that is physical in the real world. In which the IR Laser beam maybe projected by a user's IR Laser Gun Apparatus 47 onto any one of these real-world game object devices, wearables or AI Character 94 IR Receivers or IR Sensors in which upon the optical IR Sensor/IR Receiver detecting IR emissions in the form of an IR light beam and infrared radiation a 'hit' or 'tag' maybe registered.

In addition, as previously detailed this may invoke the display of augmented game scenes or a physical change in real-world game object, wearable device or AI Character 94 such as change in the visible displayed texture mappings on their surface display panel faces, or the triggering of their haptic modules or change in their physical state such the disabling of the IR LED on a device or the invoking a rag doll simulation by a real-world AI character in which upon their IR Sensor registering a hit this could invoke a physical simulation of a rag doll simulation as detailed with the embodiments of this invention.

FIG. 5B shows an accompanying block diagram of the core components and software module of the users handheld IR Laser Gun Apparatus which includes in addition to the already specified components in FIG. 5A; a client module 74, a rendering module 75, an audio manager 76 which may feature a local HRIR Database, a local games engine 77 a collision manager 78, an observer module 79 for use with the devices front facing camera 50 shown previously in FIG. 5A, a device tracking module 80 for tracking the devices location and motion, a touch screen module 81 that maybe both software and hardware based and a speech recognition module 82.

In addition, the device features an operating system (O/S), a kernel, device drivers and a subsystem not depicted on FIG. 5A or FIG. 5B to support the functionalities of the IR Laser Gun Apparatus 47 together with its hardware and software modules as detailed herein. The device may also feature a browser not depicted in FIG. 5B, which may be used for the display of menus and GUI's over the surface display panel faces 57 of the device which may be coded in HTML/Javascript as opposed to be a native embedded application coded in C/C++ for example.

The client module 74 represents the game application on the local device, it is responsible for maintaining of the local game state, the handling of all local inputs that may be I/O inputs, events, interrupts and the determination of a resulting action as per its programmable code as a result of the users use of the IR Laser Gun Apparatus 47, in which the client module 74 supports the many functions detailed in the embodiments of this disclosed features herein, that relate to the users use of the IR Laser Gun Apparatus 47.

Inputs may include touch-screen inputs, voice command inputs, or physical inputs such as the pulling of the trigger mechanism 53. In addition, the client module 74 is responsible for retrieving in real-time data on its world coordinates, orientation, together with other state information from its sensor(s) and locator devices that includes an accelerometer, gyroscopes, tilt sensors, motion sensors, GPS tracker, electromagnetic compass etc. via its the other modules such as the device tracking module 80, where the generated state information from the sensory data is passed to the game server 88 or host 89 via the network 97 by each client for maintaining state information on all clients.

Furthermore, the client module is responsible for maintaining the synchronisation of local game state on that of the users IR Laser Gun Apparatus 47, in synchronisation with the users other handheld real-world gameobjects and wearables such as the users augmented reality ("AR") display apparatus in performing of the functions described herein that are relational to the user of the IR Laser Gun Apparatus 47, in which it shall interface with other clients and/or the game server 88 or host 89 via the network 97.

As yet further function of the client module 74, it is responsible also for the checking periodically of the state of other real-world game objects, users, AI Characters and virtual game objects, AI Characters and remote users for supporting functions of the Collision manager 78 for example in the determination of collisions; the rendering module 75 in the display of new displayed texture mapping on the IR Laser Gun Apparatus 47 surface display panel faces 57, 57L, 57R resulting from a collision/hit, specular and diffuse lighting effects resulting from hits or near hits from IR Laser Beams; the supporting of visual targeting displays and perceptual sound location effects among many other features.

The rendering module 75 of the IR Laser Gun Apparatus is responsible for the rendering operations and performing of the rendering pipeline routines using the devices GPU, CPU and memory 60 to perform these operations.

All renderings in this context relate to the display of 2D or 3D virtual images and video on the surface display panel faces 57 of the IR Laser Gun Apparatus 47. This includes the rendering of texture maps for display on each of the individual surface display panel faces 57 of the IR Laser Gun Apparatus 47, as well as the display of lighting effects such as diffuse and specular lighting effects resulting from the hit of IR Laser Beams on the IR Laser Gun Apparatus 47 physical surfaces detectable by the IR Sensor 62 and IR Receiver 65 or computationally via the collision manager 78. Here the collision manager 78 may use a number techniques such those previously detailed including posteriori collision detection methods, spatial partitioning methods, bounding boxes, n-body pruning, pairwise checks using bounding rectangles or circles hit boxes, in which after pruning exact pairwise collision detection is performed, or Triangle Centroid Segments, hitscan or raycasting using vector and parametric equations of a line, or frame by frame analysis or time of impact (TOI) or on polygon based triangulation analysis etc.

In addition, the rendering module 75 is responsible for rendering of all images used in the display of 2D or 3D menus over the surface display panel faces 57, 57L, 57R for the purpose of supporting touch screen inputs. Here Touchscreen panel surfaces 56, 56R, 56L are overlaid over these surface display panel faces to support the detecting of touchscreen inputs.

It is also responsible for the rendering of augmented images over the video captured from the IR Laser Gun Apparatus 47, camera 50 which may also be displayed on front user facing display surface display panel face 57, 57L, 57R.

As yet a further embodiment of the presented invention, the rendering module 75 of the IR Laser Gun Apparatus 47, is also responsible for the rendering of 2D and 3D images or video for display as augmented images or video over the devices Digital Scope Targeting Lens 71, which is a form of digital telescopic sight in which augmented images overlaid or superimposed on targets together with coordinate information and other state information is displayed to assist users the targeting of IR Laser Beams from their IR Laser Gun Apparatus 47 at real-world users, real-world game objects, real-world AI Characters or virtual game objects, virtual AI characters or remote users.

Furthermore, it is responsible for the rendering of changes to displayed texture maps and lighting effects on the IR Laser Gun Apparatus 47 resulting from user inputs. These inputs include touch-screen inputs and voice command inputs.

The rendering module 75 is responsible also for the display of reflection, lighting and shadowing visual effects emanating from other users, objects or AI characters both real and virtual, according to their directional orientation to that of the IR Laser Gun Apparatus 47, based a computation of the coordinates of their respective virtual game objects to that of the paired virtual game object of the IR Laser Guns Apparatus 47.

It should be noted here that real-world game objects such as IR Laser Gun Apparatus 47, a user wearable device such as IR Mixed Reality ("MR") Suit 93 or a Real world AI Character 94 each have a virtual game object paired to them, in which this virtual game object is not used in the normal game engines programming to render and display a virtual image in its normal sense but is used for the purpose of computations of lighting effects and rendering of texture maps for display via a real-world surface display panel face 57 which represents a real-world triangle or quad in a 3D mesh form. Here the use of a mesh or 3D model is a tangible form in in the display of 3D images in which the mesh and 3D model of a game object is comprised of physical and tangible multiple surface display panel faces 57, 57L, 57R in the form of individual triangles or quads that make up a 3D mesh and 3D model which both present and visible in the real-world. Here the 3D mesh and 3D model may be physically touched by a user.

The use of pairing a virtual game object to that of a real-world game object is to assist in the gaming computations and mathematical operations as well as in the rendering and display of texture-maps and lighting effects on surface display panel faces of the real-world game object which may be relational to relative position of other real-world objects using their paired virtual game objects or that a virtual game object which is used for an augmented virtual image.

Here for example specular lighting effects, reflections and shadow effects can be applied back on to the real world IR Laser Gun Apparatus 47 based on a computation of the direction of the emanating light or shadow or proximity of another paired virtual game object that represents a real-world game object or a virtual game object used for say a virtual AI Character 105, in which the rendering module 75 uses the coordinates of these other objects together with the material and lighting attributes among other variables to determine how lighting effects, reflections and shadow effects shall be applied on the paired virtual game object of the IR Laser Gun Apparatus 47, which is consequently mapped to the surface display panel faces 57, 57R, 57L of the device seen in the real-world.

Here users can move for example their IR Laser Gun Apparatus 47 or any other form of real-world game objects that feature surface display panel faces in different directions in which as a result the rendering module 75 shall perform transformations against the paired virtual-game object in which the direction of the lighting, shadow or reflections emanating for another real-world game objects paired virtual game object or a ordinary virtual game object to show the change in the relative direction of the lighting, shadow or reflections on the IR Laser Gun Apparatus 47, surface display panel faces 57, 57R, 57L as a result of the change in the world coordinates and orientation of the device. Conversely if a real-world game object and its paired virtual-game object or an ordinary virtual game object changes its world coordinates or orientation in the three dimensional space of the game, then the rendering module 75 shall again perform transformations against the paired virtual-game object to reflect the change the direction of the lighting, shadow or reflections emanating for another real-world game objects paired virtual game object or an ordinary virtual game object.

In this process of transformations multiple matrixes may be used. These transformations may be invoked by changes in the physical real-world such as change in the world coordinates, orientation or heading of a real world game object by the user say turning to face a different direction or may be invoked by change in the world coordinates, orientation or direction of another real-world game object and its paired virtual-game object or an ordinary virtual game object.

Similarly lighting effects in an augmented scene such as the positioning of virtual game objects which have light elements representing environmental elements of the game such as lighting from a virtual image of the Sun, Moon or a Star or shadow effects may be seen on surface display panel faces 57, 57R, 57L of the IR Laser Gun Apparatus 47 without any visual aid by a user's eye.

Here these environmental light elements may be positionally placed in the three dimensional space of the Laser Tag Arena 98 or game space in which as the user changes say the coordinates of their IR Laser Gun Apparatus 47, this shall result in a change in the direction of the lighting from these types of virtual game objects.

In yet a further example as previously detailed virtual-game objects may be created upon a user pulling the trigger mechanism of the of their IR Laser Gun Apparatus 47, IR Shield Apparatus 90 or IR Proximity Mine Apparatus 91 or activating the IR Laser Beam via voice command. Here a virtual game object can be paired with an individual real-world IR Laser Beam for the displaying of augmented virtual images and lighting effects together with 3D sound effects of that move in correspondence to direction heading, velocity and angle in which the real-world IR Laser Beam is travelling in the three-dimensional space of the real world.

This is achieved through a computation of the IR Laser Beams directional heading, velocity and angle based on real sensor readings from the IR Laser Gun Apparatus 47 at the time of the trigger being pulled or voice command in which the client module 74 provides to both the local rendering module 75 and the users augmented reality ("AR") display apparatus 1 rendering module 27, the world coordinates expressed as a three dimensional Cartesian coordinates (x,y,z) and orientation expressed as (p,r,y) of the device together with other variables such as velocity, elevation (expressed as "+" or "−" value from ground level on the x,y,z axis etc.

From this both rendering modules using their respective GPU or CPU translates this into a projectile and directional heading of the IR Laser Beam as points along the three-dimensional Cartesian Planes on a triple axis together with the angle of the IR Laser beam on a second axis (p,r,y) together the velocity of the IR Laser Beam which are applied to the created virtual-game object. Here as light is unaffected by gravity the projectile is assumed unaffected by gravity in which the IR Laser beam is assumed to travel in a straight direction. This data is input into the projectile and trajectory formulation of the IR Laser Beam in which velocity and distance are also added to the angle and other physics data such as gravity in the formulation that is then applied to the virtual game object of the IR Laser Beam as transformation operation and mathematical operation of this.

The distance of the IR Laser Beam is assumed according to the real-world configured range of the IR Laser Gun Apparatus 1, where "t" equals the distance. Velocity is assumed based on the known rate of velocity in the projection of the IR Laser Beam over a given distance where "v" equals velocity in the formulation of the projectile.

Note in the case of the display of the augmented image of the IR Laser Beam projection over the user's real world view via their Augmented Reality ("AR") display apparatus 1, by its rendering module 27, further transformations are applied based on the user's head position and orientation to the virtual game object of the IR Laser Beam in which the users field of view and head position/orientation is represented by a virtual camera. Here the point at which the raycast or rendering is applied is relative to the user's head position and orientation in which the rendering module 27 augmented reality ("AR") display apparatus 1, retrieves the users head position and orientation from its devices head and motion tracking module 29 which is used to perform the detailed further transform into the virtual camera position used to raycast.

This same formulations may be used by the collision manager 78 of the device and or the users augmented reality ("AR") display apparatus 1, in which the collision manager 26 in the determination of hits or collisions in which the module shall formulate upon identifying the trajectory or projectile of the IR Laser Beam may hit another user, game object or AI character (real or virtual), based on their respective world coordinates, direction heading etc, the relative distance to the target, time the IR Laser Beam will reach the target using other variables such as the distance and the velocity of the moving target in its formulation of a response from a collision or hit with the targets hit boxes or model coordinates.

In addition, this same formulation and detailed collision detection technique may be used by the game server 88 or host 89 in the described projection of virtual augmented images over real-world users, game objects, AI Characters, objects, spaces, walls, ceilings and floors of the laser tag arena 98 and game space in which visual augmented virtual images and specular or diffuse lighting effects from the IR Laser Beam based on the formulation of its projectile/trajectory and the determination of hit may be projected using 3D mapping projection techniques with the use of an external projector 96.

In the case of the target being a real-world user, AI Character 94 or virtual AI Character 105 or remote user 107 a rigid body may be applied in which the velocity of the target shall be determinable by the velocity of the rigid body.

In the determination of a hit upon the IR Laser Gun Apparatus 47 the rendering module 75 of the IR Laser Gun Apparatus 47 may invoke the display of a change in the displayed texture maps on the devices display surface display panel face 57L, 57R, 57 together with diffuse lighting effects. In the case of the determination the IR Laser Beam passing in close proximity to that of the IR Laser Gun Apparatus 47 specular lighting effects may be applied based on the relative position and orientation of the R Laser Gun Apparatus 47 to that of the IR Laser Beams created virtual game objects directional lighting.

Using the world coordinates (x,y,z) and devices orientation (p,r,y) together with its directional heading/directional vector, level of elevation and velocity from the IR Laser Gun Apparatus 47, device tracking module 80, and that of the passing IR Laser Beams virtual game objects world coordinates, orientation, directional vector/heading, elevation, velocity, the rendering module 75 can render accurately the IR Laser Beam performing transformations to show the changing position of the lighting, shadows and reflections emanating from the moving IR Laser Beam in which specular lighting effects may be shown over the devices surface display panel faces 57L, 57R, 57 as the IR Laser beam passes by.

Here the resulting lighting effects, reflections and shadows from the moving IR Laser Beam virtual-game object as it passes by in three-dimensional space of the game and laser tag arena in which the device occupies can be seen in the real-world on the surface display panel faces 57L, 57R, 57 of the physical IR Laser Gun Apparatus 47, without any visual aid by the users naked eye.

The rendering module 75 and the client module 74 of the IR Laser Gun Apparatus 47 may be given authority by the game server 88 or host 89 to render and display virtual images over its surface display panel faces 57L, 57R, 57 as changes to the displayed texture mappings of the device.

As detailed a change may be invoked by the client module 74 and rendering module 75 in the state of the displayed virtual images on the surface display panels faces 57L, 57R, 57 of the users IR Laser Gun Apparatus 47 based on the state of the state of the devices trigger mechanism 53 which maybe determinable by means of a boolean flag being toggled as on/off for example, in which the CPU based on the code programmable instructions upon detecting a I/O output or interrupt resulting from a user pulling the trigger mechanism 53 and corresponding trigger switch from which the CPU shall set value of this flag according to the client module 74 code. Alternately a change may be invoked by the client module 74 and rendering module 75 in the state of the displayed virtual images on the surface display panels faces 57L, 57R, 57 of the users IR Laser Gun Apparatus 47, based the devices proximity and three dimensional coordinates to that of other real-world or virtual game objects, in which specular lighting effects from other objects may be displayed on the surfaces of the surface display panel faces 57L, 57R, 57.

Furthermore, user direct inputs via the touch-sensitive screen portion of the surface the surface display panel faces 57L, 57R, 57, or a registering of a hit via the IR Sensor 62 directly on the users IR Laser Gun Apparatus 47 or via a detection of a hit from a virtual game object via the collision manger 78 could invoke a change may be invoked by the client module 74 and rendering module 75 in the state of the displayed virtual images on the surface display panel faces 57L, 57R, 57 of the users IR Laser Gun Apparatus 47.

This serves many purposes in the game play, where for example when a user pulls the trigger mechanism of their IR Laser Gun Apparatus 47, the client module 74 may invoke via the rendering module 75 the rendering and displaying on its display panel surface faces 57L, 57R, 57 of a virtual images showing the projectional fire of the IR Laser Beam as an animated moving image.

Here the virtual displayed image of the animated IR Laser Beam may be displayed on the surface display panel faces 57L,57R, 57 of the users IR Laser Gun Apparatus 47, moving in the same direction with that of the projection of the IR Laser beam along the lens tube and outward towards the optical lens piece 48 providing a heightened visual effect seen without the aid of visuals. In addition, at the same time the when a user pulls the trigger the users IR Laser Gun Apparatus 47, this could invoke a physical feedback via the haptic module 68 in which both physical feedback and the animated projected IR Laser Beam seen on the surface display panel faces 57L, 57R, 57 of the users IR Laser Gun Apparatus 47 could be provided in accordance with the speed, direction and velocity in which the IR Laser Beam is projected.

In conjunction perceptual 3D sound locational audio effects may be played out of the output of the users IR Laser Gun Apparatus 47, speakers 66, in which the direction sound of the IR Laser Beam travelling along the lens tube may be heard also at the same rate of velocity as the traveling IR Laser Beam.

Further examples include the invoking of the local rendering module 75, to render and display a hit upon on the surface display panels faces 57L,57R, 57 of the users IR Laser Gun Apparatus 47 which may be invoked from the detection of a hit from an IR Sensor 62 on the device or from a detection of a hit from a virtual-game object based on the objects projectile and coordinates relational to each other where the collision manager 78 of the users IR Laser Gun Apparatus 47, will determine based on the state information of game server 88 or host 89 if a hit has occurred and the appropriate response in the change of the surface renderings displayed on the surface display panel faces 57L, 57R, 57 of the device.

Either form of detected hit by IR Sensor 62 or computationally by the collision manager 78 could invoke via the rendering module 75 the display of a new virtual image on the surface display panel faces 57L, 57R, 57 of the IR Laser Gun Apparatus 47 showing diffuse lighting effects together with texture map changes to the displayed virtual images on the surface display panels face 57L, 57R, 57 of the IR Laser Gun Apparatus 47 showing scorch marks of hits.

This display capability to show virtual images as real-world visible texture maps over the surface display panels 57L, 57R, 57 of IR Laser Gun Apparatus device 47 and/or animated images may be seen by the users naked eyes on the surface display panel faces 57L, 57R, 57 of the device with no visual aid serve multiple purposes during the game play. For example, as previously described the pulse rate of the IR Laser Gun Apparatus 47 may be dynamically changed where the client module 74 of the device may invoke the rendering module 75, to change the colour of the surface displayed texture maps in which the new colour seen by the users naked eye on the surface display panel faces 57L, 57R, 57 of the device indicates a boost to the weapons power.

Alternatively, without changing the physical pulse rate, the users IR Laser Gun Apparatus 47 could be awarded a boost in weapon power in the virtual computational sense, in which when the users IR Laser Beam hits another user this could count as double hits in which two hits are registered by the collision manager of either device. During this awarding of a boost the client module 74 of the device may invoke the rendering module 75, to change the colour of the surface displayed texture maps in which the new colour indicates a boost to the weapons power as double hits capable, in which the new displayed colour of the texture maps is seen by the user's naked eye on the surface display panel faces 57L, 57R, 57 of the device.

As yet a further example the users IR Laser Gun Apparatus 47 could be awarded a virtual shield by the game server 88 or host 89 based on the user's number of hits, in which the client module 74 shall invoke the rendering module 75, to change the colour of the surface displayed texture maps in which the new colour indicates the device has a shield which may be seen on the surface display panel faces 57L, 57R, 57 of the device.

In addition, the client module 74 may disable the IR Sensors 62 on the users IR Laser Gun Apparatus 47, in which hits are no longer possible on the device. In further examples the Displays Ammo, line of sight, can be rendered and displayed as augmented reality virtual image on the surface display panel faces 57L, 57R, 57, of the IR Laser Gun Apparatus 47 without the aid of visual aids or the users augmented reality ("AR") display apparatus 1.

Remote rendering may be supported via the use of the network 97 in which using the detailed state and event information from the users IR Laser Gun Apparatus 47, the rendering functionality may be performed either locally on the users augmented reality ("AR") display apparatus 1, rendering module 27 or remotely by the rendering module 117 on the game server or host 89 in which the subsequent provide images or video sources for the users left and right display portions 2R, 2L may be provided locally or via the network 97 respectively, in which the corresponding image pixels are then illuminated by the light display module 5R, 5L on the users micro-display 3 display screens 2R, 2L, and then guided via the waveguides 22R, 22R to the users eyes.

Here the IR Laser Gun Apparatus 47, provides merely the inputs to invoke a rendering of a augmented reality virtual image, where the game server 88 or host 89 that determines based on its global policy whether the local client module 28 and rendering module 27 of the user augmented reality display apparatus 1 shall invoke locally the rendering and display of the augmented virtual game object of the users IR Laser Beam for example or whether this should be handled remotely by the game server 88 or host 89 rendering module 117.

As yet a further alternative embodiment, the rendering of the texture-maps, lighting, reflection and shadowing effects displayed on the surface display panel faces 57L, 57R, 57 of the IR Laser Gun Apparatus 47 in terms of the mathematical operations could be performed remotely by the game server 88 or host 89 in the exchange of data and state information over the network 97 by the devices client module 74 to the game server 88 or host 89 in which rendered images shall be provided back to the IR Laser Gun Apparatus 47, client module 74 and/or rendering module 75 for loading into the frame buffer of the IR Laser Gun Apparatus 47 surface display panel faces 57L, 57R, 57.

The Collision Manager 78 is responsible for detecting collisions or intersections may be detected between the users IR Laser Gun Apparatus 47 and other real-world users, game objects and real-world AI Characters or virtual game objects, AI characters and remote users. The Collision Manager 78 consists of two modules a Collision Detection Module and a Collision Response Module. This uses real-time state information from the game server 88 or host 89 held centrally that has been captured on real-world game objects, objects surrounding surface data as well as state information on game objects, users and AI Characters that may be virtual or physical in presence which includes their three dimensional position in terms of their Cartesian coordinates among other state information used in the computation of a hit by the Collision detection module.

The Collision Manager 78 may also compute the time of impact (TOI) and report this to the Collision Response module in the predetermining of an outcome from the projected collision, providing a set of intersection points to be used in the computations by the collision response module in the simulation of the outcome resulting from the collision.

Alternately the Collision detection module may use a number techniques such as posteriori collision detection methods, spatial partitioning methods, bounding boxes, n-body pruning, pairwise checks using bounding rectangles or circles hit boxes, in which after pruning exact pairwise collision detection is performed, or Triangle Centroid Segments, hitscan or raycasting using vector and parametric equations of a line, or frame by frame analysis or time of impact (TOI) or on polygon based triangulation analysis etc.

The Collision response module is responsible for the simulating of the resulting changes in two or more objects following a detected collision and other forms of contact of two or more objects, in which the collision module shall apply physics models and algorithms in its computation of the resulting outcome from the detected collision.

These computations are based on physics data, linear algebra, computational geometry together with volumetric and surface data. Geometry, volumetric and surface data on real-world objects and surfaces which may be provided from the observer component 25 of the users augmented reality ("AR") display apparatus 1, to the client module 74 of the users IR Laser Gun Apparatus 47. This data may be used together with state information from the game server 88 and host 89 and the associated virtual game objects model data and physics attributes in the resolving of the outcome of collision detections for example.

The physics data used in the modelling and algorithms may consist of variables such as force, time, the assumed constant mass of an object, momentum and velocity, in which the opposing values of each of these variables for each object shall be used in the determination of the outcome.

The Client Module 74 and/or Collision manager 78 module is operable to invoke a re-rending of the displayed texture maps and lighting effects on the surface display panel faces 57L, 57R, 57 of the users IR Laser Gun Apparatus 47, as a result of pulling the trigger mechanism 53 or a voice command to fire the IR Laser Beam. In addition, this could be invoked by hit detection from another users weapon such as an the IR Laser Gun Apparatus 47 registered by the IR Sensors 62 and IR Receivers 65 or computational formulated by the Collision Manager 78 in the calculation of whether the virtual game object resulting from the other users IR Laser Gun Apparatus 47 IR Laser Beam fire has intersected with the hit box or model coordinates of the users IR Laser Gun Apparatus 47.

Alternately a hit may be detected from a virtual weapon in which there is IR Laser Beam but a hit detection shall still be determinable based on the world coordinates and model coordinates or hit box of the users IR Laser Gun Apparatus 47, relative to the projectile direction of the virtual weapon fire in the three dimensional space of the game. The Collision manager 78 and/or client may invoke haptic feedback, as a result of the detection of a hit via any of the methods detailed previously or respectively by a user pulling the trigger mechanism 53, or in the via the user initiating a voice command to invoke the firing of the IR Laser Beam or a virtual weapon fire.

The Collision manager 78 may also invoke perceptual based 3D sound location effects, 3D positional sound effects or 3D spatial sound effects to be heard via the IR Laser Gun Apparatus 47, speakers 66L, 66R or users Augmented reality ("AR") display apparatus 1, speakers 6L, 6R. Here the Collision Manager 78 shall interface with either the audio manager 76 of the IR Laser Gun Apparatus 47 locally or shall connect via Wifi or Bluetooth to the users augmented reality ("AR") display apparatus 1, Audio Manager 34 to invoke the positioning and playback of perceptual based 3D sound effects, 3D positional sound effects or 3D spatial sound effects via each devices respective speakers.

It should be noted that Collision detection in determining of a hit or a collision or in intersecting of two objects can use coordinate inputs and state information directly from real-world game object, or coordinate inputs from the paired virtual-game object in which transformations are applied to synchronise the coordinates of the paired virtual game object with the real-world game object each time the real-world object is moved.

Alternatively, the Collision Manager 78 can use state information from the game server 88 or host 89 in the determining of a hit or a collision or in intersecting of two objects.

The device tracking module 80 is responsible for maintaining state information on the IR Laser Gun Apparatus 47, world coordinates/position in three dimensional space expressed as three dimensional Cartesian Coordinates and orientation expressed as pitch, roll and yaw (p,r,y) and the devices directional heading expressed as a direction vector together with other state information such as acceleration, velocity and elevation.

The devices world coordinates and orientation are provided in the form of six dimensional matrixes, using the sensor inputs from the users IR Laser Gun Apparatus 47, sensors 51 including the accelerometer, gyroscope, tilt sensor to formulate the users pitch, roll and yaw together with the GPS data on the user's position used to formulate the users Cartesian coordinates in the three dimensional space of the game.

The device tracking module 80 is responsible for formulating of the users position, in which the device tracking module 80 shall periodically poll the IR Laser Gun Apparatus 47 tracking devices including the GPS tracker, solid state compass and the electromagnetic compass, to generate state information used to generate a positional vector and a directional vector representing the three-dimensional coordinate (x,y,z) of the device and its directional heading along the x, y and z respective planes in the three dimensional space of the game which is provided to the client module 74 and the other modules of the IR Laser Gun Apparatus 47 in performing their functions.

In this process the device tracking module 80 may translate and convert real-world positional readings from the GPS tracker, solid state compass and the electromagnetic compass, into representative points on the x,y, z axes and planes of the Cartesian coordinates representing the IR Laser Gun Apparatus 47, position and world coordinates in the three dimensional space of the game space and that of the laser tag arena.

The device tracking module 80 is also responsible for retrieving elevation data from the IR Laser Gun Apparatus 47, MEMS Barometer, Altimeter and/or GPS Tracker in which readings are converted into x,y,z values representing the elevation of the device above ground or below which may be expressed as a "+" or "−" value.

This state information generated from the processed sensory data by the device tracking module 80 is provided to the client module 74 and other modules of the users IR Laser Gun Apparatus 47 to perform their detailed functions as disclosed within the embodiments of this invention.

In addition, this state is provided to the game server 88 or host 89 via the network by the devices Client Module 74 in which the game server 88 or host 89 maintains state information on all real-world users, game objects and AI Characters together with state information on all virtual game objects, AI Characters and remote users to support the detailed functions as disclosed within the embodiments of this invention.

The audio manager 76 module is responsible for the playback of perceptual based 3D sound localisation, 3D spatial audio and 3D positional audio effects placed in three dimensional space, which are output from the IR Laser Gun Apparatus 47 speakers 66L, 66R.

Specifically, the audio manager 76 module is responsible for positional placement of audio effects of the IR Laser Beams, hits and other audio effects from the usage of the IR Laser Gun Apparatus 47, together audio effects emanating from other real-world game objects, AI Characters, users or virtual game objects, AI characters and remote user using the three-dimensional Cartesian coordinates of the virtual and real-world game objects and their respective virtual images.

3D audio sound effects generated by the games engine 78 and client module/game application 74, may be converted by the audio manager 76 into perceptual based 3D sound locational effects/3D spatial audio and 3D positional audio effects which are output on the users IR Laser Gun Apparatus 47, speakers 66L and 66R during game play as a result for example of the detection of another users Laser IR Beam from their IR Laser Gun Apparatus 47, being in close proximity or in the detection of a hit of an IR Laser beam on a user's IR Laser Gun Apparatus 47 or the user themselves.

Hits maybe detectable by the IR Sensors or by the collision manager 78, where the audio maybe positionally placed in 3D space in the same projectile direction of the moving IR Laser beam or the three-dimensional cartesian coordinates of the detected hit of the IR Laser beam.

The audio manager shall support the generating or converting of existing in game audio effects to perceptual based 3D sound locational effects/3D spatial audio and 3D positional audio effects through the emulating the biological mechanisms of binaural hearing, using DSP algorithms and sound locational technologies, and techniques such as ITD, IID, ILD and HRTF functions.

A HRIR database maybe used to support the inputs of image coordinate information used in the emulating of 3D positional sound effects and the manipulation of the 3D audio source files using the previously described perceptual based 3D sound location technologies, together with the above mechanisms and techniques, where using the images input three dimensional Cartesian coordinates (x,y,z), a sound effect may be placed in the same specified three dimensional coordinate as the input coordinates. The result of which being that the user perceives the sound location to be at the same pre-defined location as the augmented displayed virtual image.

3D sound locational effects/3D spatial audio and 3D positional audio effects may be provided by the local audio manager of the users IR Laser Gun Apparatus 47 and output via the devices speakers 66L, 66R which may represent the projectile fire of the moving IR Laser beam or hits on the IR Laser Gun Apparatus 47 or user by other users IR Laser Beams or hits on other users or objects from the projectile fire of the users IR Laser Gun Apparatus 47.

Here based on the generated virtual game objects and their respective virtual images for the IR Laser Beams and the determined collision position, coordinate information maybe input into the HRIR database from which 3D sound locational, 3D spatial sound effects and 3D positional sound effects may be provided and output via the speakers 66L, 66R of the IR Laser Gun Apparatus 47.

In the case of moving IR Laser Beam, every time there is a transformation or a change in the coordinate position of the moving IR Laser Beam virtual game image and resulting rendered output virtual image along the x,y,z axis, new coordinates maybe input into the HRIR database.

Using the described perceptual based 3D sound location technologies, mechanisms and techniques such as ITD, IID, ILD and HRTF, the 3D sound locational and positional sound effects of the IR Laser Beam may be positioned in three-dimensional space in accordance with the displayed moving projected image of the IR Laser Beam at specific points along the directional vector or the formulated line or ray of the real-world IR Laser beam.

The result being is that user perceives the location of the sound effect to be moving at the same rate, directional heading and projectile of the display augmented virtual image if the IR Laser Beam. Here for example the virtual image of the IR Laser beam may be seen from the users Augmented Reality Display Apparatus 1, micro-display 3 as moving 3D holographic image over their real-world view and the audio maybe head via the speakers of the IR Laser Gun Apparatus 47, speakers 66L, 66R in which the user perceives the location of the sound effect to be moving in accordance with the change in position three dimensional space of the virtual image of the IR Laser beam and that of the real-world IR Laser Beam which is normally invisible to the human eye.

This achieved by providing in sequence the same points or three dimensional coordinates (x,y,z) along the projected projectile of the IR Laser Beam using the previously detailed line technique to the HRIR database as to the rending module 27 of the users Augmented Reality Display Apparatus 1, in sequence such that the sound and visual effects appear to emanate from the same changing positions along each of the points of the IR Laser Beam formulated projectile. Here the user sees and hears the augmented reality visual and sound effects of the IR Beam/IR laser beam travelling across three-dimensional space at the same line of projection.

Here the input three dimensional coordinates in to the HRIR, are updated in accordance with the updating of the position (vector position) of the IR Beam/IR Laser Beam along the formulated line of projection or when a new virtual game object is created as a result of say a second IR Laser Beam being fired when a user pulls the trigger mechanism.

Here the audio manager 76 may maintain states for several of more IR Laser beams which each have a different projectile as a result of the user changing the physical position of the IR Laser Gun Apparatus 47, whilst pulling repeatedly the trigger mechanism 53. This is the same for all instances of the audio manager whether on a user's augmented reality ("AR") display apparatus 1 or on another real-world game object/device.

Here like the rendering module 27 maintains state information for the display of augmented virtual images of the IR Laser Beam along its original projectile, the audio manager 76 shall always maintain the subsequent audio sound effects positionally to that of their line of projectile which is based on the original orientation, position and directional vector of the IR Laser Gun Apparatus 47 at the point the trigger mechanism was pulled and its virtual game object was created.

Here each IR Laser Beam fired has a virtual game object associated with it which has a unique ID, and its own line of projectile in terms the positional vector for where the IR Laser Beam originated (x,y,z) and its directional heading/directional vector along the x,y,z axis based on the based on the original orientation, position and directional vector of the IR Laser Gun Apparatus 47 at the point the trigger was pulled 53.

The Client Module 74 may assist in this process in maintaining state information for every IR Laser Beam fired and in the synchronisation of the rendering module 27 of the users augmented reality ("AR") display apparatus 1 and audio manager 76 of the device in the display of the virtual images of the IR Laser Beam and the placement of 3D audio effects in the same three-dimensional coordinates in which the Client Module 74 may supply the coordinates to both the rendering module 27 and audio manager 76. Note here the rendering is performed via the users augmented reality ("AR") display apparatus 1 and the 3D audio is played back via the users IR Laser Gun Apparatus 47, speakers 66L,66R handled by the devices local audio manager 76. This may all be handled by the uses augmented reality ("AR") display apparatus 1 modules, or the modules of IR Laser Gun Apparatus 47.

Alternatively, the rending module 27 may provide coordinates in the form of an image or matrixes to the HRIR database and audio manager 76 in synchronisation to performing transformations to change the position of the virtual game object and 3D model of the IR Laser Beam, in which it may interface directly with the audio manager to ensure the placement of 3D audio effects in terms of the three-dimensional position is the same as changes to the rendered and displayed augmented virtual image of the IR Laser beam.

In another example a decal visual effects showing scorch marks, or blood resulting from an IR Laser Beam hit may be shown as an augmented image over a user via the use of projection mapping techniques by the game server 88 or host 89 using the external projectors 96, in which the image is projected onto specific place in three dimensional space based on the hit or collision position (x,y,z coordinate).

Using the same coordinates from the virtual image of the decal visual effect these maybe input by the audio manager 76 of the IR Laser Gun Apparatus 47, into the HRIR database, following which a 3D sound effect may be placed at the same location and three-dimensional coordinate using the previously described perceptual based 3D sound location technologies, mechanisms and techniques such as ITD, IID, ILD and HRTF etc., in which the audio is output via the users IR Laser Gun Apparatus 47, speakers 66L, 66R.

Here the hit may be displayed as an augmented image over another real-world user, object or AI Character for example, as 3D mapped projection via the external projectors 96 using projection mapping/video mapping or spatial augmented reality techniques, in which the user can see the augmented image of the hit and can hear the 3D positional sound effect via their IR Laser Gun Apparatus 47 speakers 66L, 66R that appear to be in the same position or location. It should be noted in this case that the users not only sees the augmented reality image overlaid on a real world object of the hit with no visual aid or wearable augmented reality ("AR") display apparatus 1 needed, but in addition they can also hear the 3D sound effect as appearing to emanate from the location of the hit with no wearable augmented reality ("AR") display apparatus 1 needed.

Alternately a hit may be detected on the IR Laser Gun Apparatus 47, itself in which the collision manager 78 response module may invoke both a 3D locational/positional sound effect and the display of new material or texture on the surface display panel faces 57L, 57R, 57 of the device as a decal visual effect of scorch marks. Here using the collision position and three dimensional coordinates of the hit, the augmented image of the decal visual effect of scorch marks may be rendered by the local rending module 75 and displayed at the exact same coordinate on the IR Laser Gun Apparatus 47 surface display panel faces 57L, 57R, 57. This may use model coordinates also in this process.

Based on the coordinates of the collision position and that of the decal visual effect of scorch marks, the local audio manager 76 may generate a 3D position audio effect using the previously described perceptual based 3D sound location technologies, mechanisms and techniques such as ITD, IID, ILD and HRTF. Here the 3D positional, 3D spatial or 3D locational sound effect may be heard via the speakers 66L, 66R of the users IR Laser Gun Apparatus 47, in conjunction to the display of the virtual augmented image directly on the surface display panel faces 57L, 57R, 57 of the device.

As before the user not only sees the augmented reality image overlaid on a real world object of the hit with no visual aid or wearable augmented reality ("AR") display apparatus 1 needed, but in addition they can also hear the 3D sound effect as appearing to emanate from the location of the hit with no wearable augmented reality ("AR") display apparatus 1 needed. Similarly the same locational and positional 3D audio sound effect functionality is supported by the users audio manager 34 of their Augmented Reality ("AR") head mounted display apparatus 1.

Here 3D sound locational and positional capability may be used for example in the playback of audio effects of hits from an IR Laser Beam on another user body or the surface of a target object. For example when a hit is detected by the collision manager 26 of the users Augmented Reality ("AR") head mounted display apparatus 1, as part of the determined response, its collision response module may invoke the audio manager 34 on the users Augmented Reality ("AR") head mounted display apparatus 1, to provide a 3D audio sound effect.

This may be provided in conjunction to an augmented visual indication as to the targets condition by invoking the rendering module 27 to render for example a 3D holographic images as decal visual effect over the real world target which was hit, in which user sees an augmented image displayed over the object or user that was hit and hears a 3D sound effect or spatial 3D audio effect at the same pre-defined three dimensional coordinate and location as the augmented displayed virtual image via their Augmented Reality ("AR") head mounted display apparatus 1.

In this way both the augmented 3D virtual image and 3D sound effects may appear to the user's perception and brain to be coming from the direction and position of the target that was hit. Here perceptual based 3D sound localisation techniques maybe used combined with the world coordinates of the target hit retrieved from the game server 88 or host 89 to position both the virtual image and the 3D sound effect at the coordinates in three dimensional space of that of real-world game object or user that was hit. It should be noted that this same process may be invoked through the detection of a hit by an IR Sensor.

In addition, prior to the hit a 3D holographic image, hologram or a form of two differing 2D stereoscopic images may be generated together with a virtual game object representing the moving IR laser beam which may be invoked by pulling the trigger mechanism 53 of the IR laser weapon, in which the image may appear overlaid over the user's real-world view as a moving 3D image in correct position as the travelling light of the real IR Laser beam.

This is achieved through the capturing of state information on the IR laser weapon at the time the trigger was pulled in which using the world coordinates (x,y,z), orientation/angle (p,r,y) and directional heading of the IR Laser beam trajectory/projection which may be expressed as directional vector together with other physics variables such as velocity, distance, gravity and elevation it is possible for the system to determine the projectile and direction of the real-world IR laser beam together with its moving positions in three dimensional space.

The determined position, velocity, direction and other variables of the real-world IR Laser beam may then be applied to the created virtual game object in terms of its world coordinates, orientation and direction etc. in which the resulting visual augmented IR laser beam is seen by the user to be travelling in exact same location in three dimensional space of that the real IR Laser beam.

Using the same values for the projectile/trajectory of the IR laser beams world coordinates (x,y,z), orientation (p,r,y)/angle of projection and directional heading together with other previous detailed variables such as its rate of velocity, distance, and elevation, 3D sound effects or spatial 3D audio effects may be placed also in exact location to that of the moving projected real-world IR Laser beam.

This may use techniques such as the detailed technique of perceptual based 3D sound localisation using DSP algorithms, ITD, IID, IID, ILD and HRTF functions or the other described techniques and methods in the embodiments of this invention. The result of which is the user as detailed also hears the moving IR Beam/IR laser beam travelling along the three-dimensional space of the game and laser tag arena relative to their position.

In the case the audio is head via the speakers 66L,66R of the IR Laser Gun Apparatus 47 in this example transformations may be applied to the 3D audio source, where as the user moves or changes the position or orientation of the device, the Audio Manager 76 may use inputs from device tracking module 80 on the devices orientation and position to apply according transformations using matrixes and perceptual based 3D sound localisation techniques using DSP algorithms, ITD, IID, IID, ILD and HRTF functions to the audio source files. This is so that the position of the 3D sound effect remains relative to where the IR Beam/IR Laser beams original point of origin (x,y,z) is located and its directional heading/directional vector in terms of its projectile across the three dimensional space of the laser tag arena 98 and game space.

Similarly, in the case the audio is heard via the speakers 6L, 6R of the users Augmented Reality ("AR") display apparatus 1, transformations may be applied to the 3D audio source where as the user moves or changes their head position or orientation the Audio Manager 34 using inputs from the devices head and motion tracking module 29 may use matrixes and perceptual based 3D sound localisation techniques using DSP algorithms, ITD, IID, IID, ILD and HRTF functions to apply accordingly transformations so that the position of the 3D sound effect remains relative to where IR Laser beams original point of origin and directional heading.

During game play the system may use sensor data captured from the sensors from the IR laser weapons such as the IR Laser Gun Apparatus 47 sensors 51, to produce these visual effects and 3D sound effects, where users with an augmented reality ("AR") display apparatus 1, can hear the sound of the real projected laser in precise location to the travelling IR laser beam in three dimensional space for enhanced audio effects.

Sensor data may include x, y, z world coordinates, pitch, roll and yaw (p,r,y)/orientation/angle of projection and trajectory together with other variables such a velocity, distance and elevation based on data outputs from the devices accelerometer, gyroscopes, and tilt sensors together with the system GPS locator for example among other sensors which may be used in the positioning of virtual images and 3D sound effects of the IR Laser Beam in three dimensional space.

As depicted in FIG. 5B in addition to the Audio Manager 76 the IR Laser Gun Apparatus 47, features a speech recognition module 82 and an touch input module 81. The speech recognition module is responsible for handling of all spoken speech commands. This may use different forms of models, methods and techniques such as language modelling or Hidden Markov models or other forms of widely available models, methods and techniques. The key responsibility of the speech recognition module 82 though shall be in the translation of spoken voice command inputs in to text formed inputs that are used by the client module 74 and/or games engine 77 to invoke an action such as the examples given with the embodiments of this invention.

In addition, a touch screen module as detailed previously is responsible for detecting user touch-screen inputs in the invoking of actions resulting from the detection of a user touching the screen with their fingers.

The touch-screen software and algorithms that make up the touch-screen module software parts are capable of recognising many forms of touch-screen inputs and finger gestures such as the user double tapping on the screen or swipe functions or pincer functions by the use'rs hands and fingers among many other forms of gestures in the performing of the functions described herein.

The client module 74 also the local game application shall track with the Game Engine 77 all inputs that occurs on the screen, from the users physical touching of the screen passed up by the touch screen module, in which it shall disseminate these outwards to the other components modules according to its programmable code in the handling of the detected input.

The Client module 74 shall also inform all other clients of the change in the state change via the game server 88 or host 89.

As detailed the rendering module 75 of real-world game objects such an IR Laser Gun Apparatus 47 is capable of displaying shadows and lighting effects of passing other virtual game objects as specular lighting effects of the surface display panel faces 57L, 57R, 57 of the device which may be for a virtual game object of another users IR Laser Beam fires as described, which improves the realism of the appearance of the real-world game object in the real-world. In addition, the rendering module 75 may be used to change the displayed surface texture mapping based on users touch-sensitive inputs.

For example, upon the detection of a user touch-input, client model 74 may invoke the rendering module 75 to perform a raycast in which a raycast hit is applied at detected coordinates in which the user has physically touched the screen, showing a change in the state of the texture-map resulting from a user physically touching the surface. Here different touch inputs could invoke different changes in the state of the displayed texture-map image on the surface display panel faces 57L, 57R, 57 of the users IR Laser Gun Apparatus 47. In another example a user may be able to change the pulse rate or force of their weapon fire in the exchanging of ammo or greater fire power or in the changing of the settings of their laser gun weapon type to say fusion fire or photon fire in the virtual sense of the game, by the user performing a touch-input on where these physical inputs can have an effect on the state of the IR Laser Gun Apparatus 47, as well as the game state in the real-world and that of the virtual world.

For example, as a result of touch input, the client module 74 may increase hit registering rate of the users IR Laser Gun Apparatus 47, where single hits may trigger multiple IR Sensor readings on other users in which the signal is amplified by an amplifier upon a detection by the receiving users IR receiver of a different code signalled in the IR beam binary indicating the change in state or based on the identified change in state from the game server 88 host 89 where the client module 74 sent a notification of the change in the state as a result of a touch-input.

In this example a single touch screen input resulting in changing the state of the IR Laser Gun Apparatus 47, may invoke the receiving IR Sensor to register multiple hits, where a physically invoked change on one users device settings via the use of the touch screen inputs or voice command can affects another real-world game objects IR Sensor/IR Receiver or user wearable IR Sensor/IR Receiver or real-world AI Character's 94 IR Sensor 144/IR Receiver 145 and corresponding amplifier behavior in the recording of hits and in the amplification of an electrical charge resulting from the detected change in state of the device that fired the IR Laser Beam.

In another example embodiment of the presented invention a physical action in the real-world using the touch-sensitive screen to recalibrate the users IR Laser Gun could change the renderings and display of virtual game objects of the IR Laser Beam showing the increase in fire power as an augmented image, which may be seen via the users augmented reality ("AR") display apparatus 1, Micro-display 3 as a moving virtual image overlaid over the user's real-world view as an augmented 3D holographic image for example.

Alternatively, the colour that appears on real-world game objects of the rendering and display of hits from the IR Laser Beam, or the specular lighting effects displayed on real-world game objects that maybe scenery could be shown with a different scale or colour to indicate the scale of the weapon fire has increased which may be seen by users with their naked eye as the IR Laser Beam passes the real-world object.

Similarly diffuse lighting effects displayed on a real-world game object could be changed in terms of their scale and colour by the rendering module 27 of the users augmented reality ("AR") display apparatus 1, based on the user touch input showing a change in the state of the users IR Laser Gun apparatus 1.

Alternatively, imagery or lighting effects shown on the surface display panel faces 57L, 57R, 57 of the users IR Laser Gun Apparatus 47, of the IR Laser Beam being projected outwards along the lens tube to the IR Optical lens, could be shown as a different colour or scale indicating the change in state handled by the local rendering module 75, based on the user touch input changing the state of the users IR Laser Gun apparatus 1.

As detailed previously the touch screen may be a for of ASIC sensor. The multi-touch capability may be supported through many forms such as capacitive technologies, resistive, optical or wave.

Firmware and device drivers may pass inputs to the Touch screen module 81 for processing. The touchscreen module 81 shall interface with the client module 74 for the handling of all touch screen inputs and invoking of an action following a detected touch screen input such as the example given herein by the rendering module 75.

In addition to the stated modules as shown on FIG. 5B, the IR Laser Gun Apparatus 47, also features an observer module 79, responsible for generating mesh data, mesh filters, wireframes and 3D models of the real-world view from the devices Cameras 50 field of view ("FOV"), where video captured from the FOV is used to augment 2D and 3D images over the weapons line of sight used in the previously detailed visual targeting capabilities of the device, in which visual indicates are provided augmented over targets seen in the video capture.

This uses spatial mapping techniques to generate mesh data, mesh filters, wireframes that contain volumetric and geometric data on real-world objects, users, AI Character's and spaces used in display of augmented images over these as superimposed providing directional indicators and highlighting of geometric structure outlines to assist in the targeting of the IR Laser Gun Apparatus 47, IR laser beam fire at targets.

Here the external forward facing camera 50 is aligned with the IR Laser Beam line of sight in which using offsets this allows for adjustments in the display of augmented imagery for minimal difference between the height of the camera 50 lens and that of IR Laser Gun Apparatus 47 IR Optical lens for accurate targeting.

This may be used together with state information on all users, game objects and AI characters for making further adjustments to support precise visual targeting of the IR Laser Gun Apparatus 1, in which the presented invention provides also a digital form of telescopic sight scope 71 mounted on the IR Laser Gun Apparatus 1 as depicted on FIG. 5B in which augmented images are overlaid on the IR Laser Guns Apparatus 47 digital scope targeting lens 71 to aid targeting.

Like a conventional telescopic sight or scope this may feature an optical refracting telescope, however the graphic image pattern or reticle that is normally mounted on the optic portion is instead a transparent display screen in the form of a transparent organic display such as TOLED, LCOS, or LCD, in which the graphics are rendered images augmented over the optical lens or optical portion of the telescopic sight or scope which forms a digital scope targeting lens.

Furthermore, augmented images based on state information of real-world game objects, users, AI Characters and virtual-game objects, AI characters and remote users retrieved from the game server 88 or host 89 is displayed in which visual aids are given to assist the user in adjusting their IR Laser Gun Apparatus 47 with precise accuracy to target moving real-world game objects, users, AI Characters and virtual-game objects, AI characters and remote users.

This state information includes world coordinates, and elevation among other information. It may also indicate a friend or enemy based on the known team classification relative to the user using the IR Laser Gun Apparatus 47 for real-world game objects, users, AI Characters and virtual-game objects, AI characters and remote users targets.

Also unlike conventional telescopic sights and scopes this provides a view into the virtual world of the game to see virtual-game objects, AI characters and remote users as well as other augmented imagery over the real-world view of the scope. This provides yet a further novel element to the game play in laser tag and that of the presented invention disclosed herein, where hidden virtual targets could be revealed through the use of the digital scope targeting lens 71.

It should be noted here that the rendering module 75 is responsible here for providing the virtual imagery for augmenting over the user's real-world view from the digital scope targeting lens 71 for which the display of pixels are controlled by the devices Light display module 55 where upon images being rasterised, fragmented and written in to the displays frame buffer as RGB array or in memory bitmap the light display module 55 shall then illuminate the corresponding pixels according to their depicted colour and coordinate, upon which the virtual augmented image shall be displayed via the digital scope targeting lens 71.

Here virtual images are augmented using the generated mesh data, mesh filter, wireframes, supported by the observer module from which 3D models of the real-world view from the IR Laser Gun Apparatus 47, camera 50, are generated in which the rendering module may then generate virtual images and apply imagery over these real-world objects, users, surroundings and AI Characters to assist in targeting.

During this process transformations may be applied to the generated virtual game objects and 3D models for the augmented images overlaid over the user's real-world view through the digital scope targeting lens 71 based on the movements of the device or that of other real-world objects, users, surroundings and AI Characters in which virtual game objects maybe scaled or rotated for example as a user moves the IR Laser Gun Apparatus 47 closer to a target or moves around a target. In the process of applying transformations as detailed the rendering module 75 shall use state information from the game server 88 or host 89 on surrounding real-world objects, users, surroundings and AI Characters together with updates on surface information from the observer module 79 on observed changes in the real-world from the analysis of the video from the cameras 50 for which updated surface data or new surface data may be provided.

In addition, the rendering module 75 shall retrieve state information from its local device tracking module 80 to perform transformations based on identified changes in the position, orientation and direction of the IR Laser Gun Apparatus 47, according to readings from its sensors 51 World coordinates and other forms of state information may be displayed also on the position of the target in the digital scope targeting lens 71 based on the state information retrieved on other real-world objects, users, surroundings and AI Characters in which virtual game objects similar to that of the other supported assisted visual targeting mechanisms described within the embodiments of the presented invention.

This may show a "+" or "−" signal on the x,y,z axis to assist with the targeting in which when the value of x,y,z each=0 the target is locked on, or it could show the real-world coordinate x,y,z where the image is shown colour coded on the indicators with a "+" or "−" sign to indicate the relative position of the target to that of the IR Laser beam line of sight of the users IR Laser Gun Apparatus 47.

Note targeting may also be based on object recognition using the spatial mapping capabilities of the observer component without the use of state information as detailed retrieved from the game server 88 or host 89 by the devices client module 74. Identification of friendly of enemy may be visually recognised by the colour of another users IR Mixed Reality Vest 92 or IR Mixed Reality Suit 93 for example in which the observer module 79 may flag this to the rendering module 75 upon identification of the object.

In addition to the detailed usage of the Observer Module 79 for the targeting of targets via the digital scope targeting lens 71, in the providing of mesh data, mesh filters, wireframes and volumetric and geometric data on real-world objects, users, surroundings and AI Characters from observations of the real-world from the video or images captured from the devices camera using the described spatial mapping techniques herein, the Observer module 79 may be used for the previously detailed other supported visual targeting mechanisms.

This includes the previously detailed visual targeting mechanism via the users augmented reality ("AR") display apparatus 1, in which video from the cameras 50 of the IR Laser Gun is displayed via the user's Micro-display 3, and virtual images are overlaid by the rendering module 27 of the users augmented reality ("AR") display apparatus 1 to assist in targeting.

In addition, it may be used in the detailed targeting assistance displayed on the display surface of the IR Laser Gun Apparatus 1, in which a visual aid is shown with augmented imagery via the user facing display panel.

In the same as previously stated the display of augmented virtual images to assist in the distinction between targeting of friendly or enemy targets, could be based on image recognition using spatial mapping techniques and surface/object recognition techniques by the observer in which based on colour or shape of an object it could be identified as friend or enemy.

Spatial mapping techniques supported by the Observer module 79 of the IR Laser Gun Apparatus 47 and the generated mesh data, mesh filters, wireframes and volumetric and geometric data on real-world may also be used in the previously described assisted audio targeting using perceptual 3D based sound locational techniques in the targeting of objects in which sound pulses are played back via the speakers of the users IR Laser Gun Apparatus 47 or augmented reality ("AR") display apparatus 1, speakers 6L, 6R at precise locations in three dimensional space relative to a target.

This may be supported without the need to retrieve state information from the game server 88 or host 89 using the surface data, object identification, geometric and volumetric data of real-world identified objects and surfaces to target real-world users, game objects and AI Characters 94.

Lastly using the combined capabilities of the Observer Module 79 in the together with the Audio Manager 76 in previously detailed emulated echo/sonar capabilities for the identification of object shapes by the use of positional 3D sound in which sound pulse at different points are played back to user via the speakers in which the user brain is then able to construct a shape without vision, could be based on the generated mesh data, mesh filters, wireframes containing volumetric and geometric data. This may be used together with subsequent 3D models in which the vertices or points of the 3D models are used to construct positional sound effects where each sound pulse/audio played back to the user appears from the three-dimensional point or vertices of the constructed 3D model in which from a series of positional sounds being played back the user is able to construct an image in their brain of the objects position in three dimensional space and its shape with no need for vision or use of their eyes.

Note as detailed the positional sound effects may be constructed here using perceptual based 3D sound locational technologies and techniques such as using DSP algorithms, ITD, IID, IID, ILD and HRTF functions, to emulate the biological mechanisms of binaural hearing, such that the sound appears to come from a specific location and direction in three-dimensional space.

FIG. 5A and FIG. 5B are provided by way of example of one of many device configurations for the IR Laser Gun Apparatus supported and used in the embodiments of the disclosed invention herein. Interpretation should be made in the broadest of sense therefore in the respect of the subsequent claims.

Figure 6:
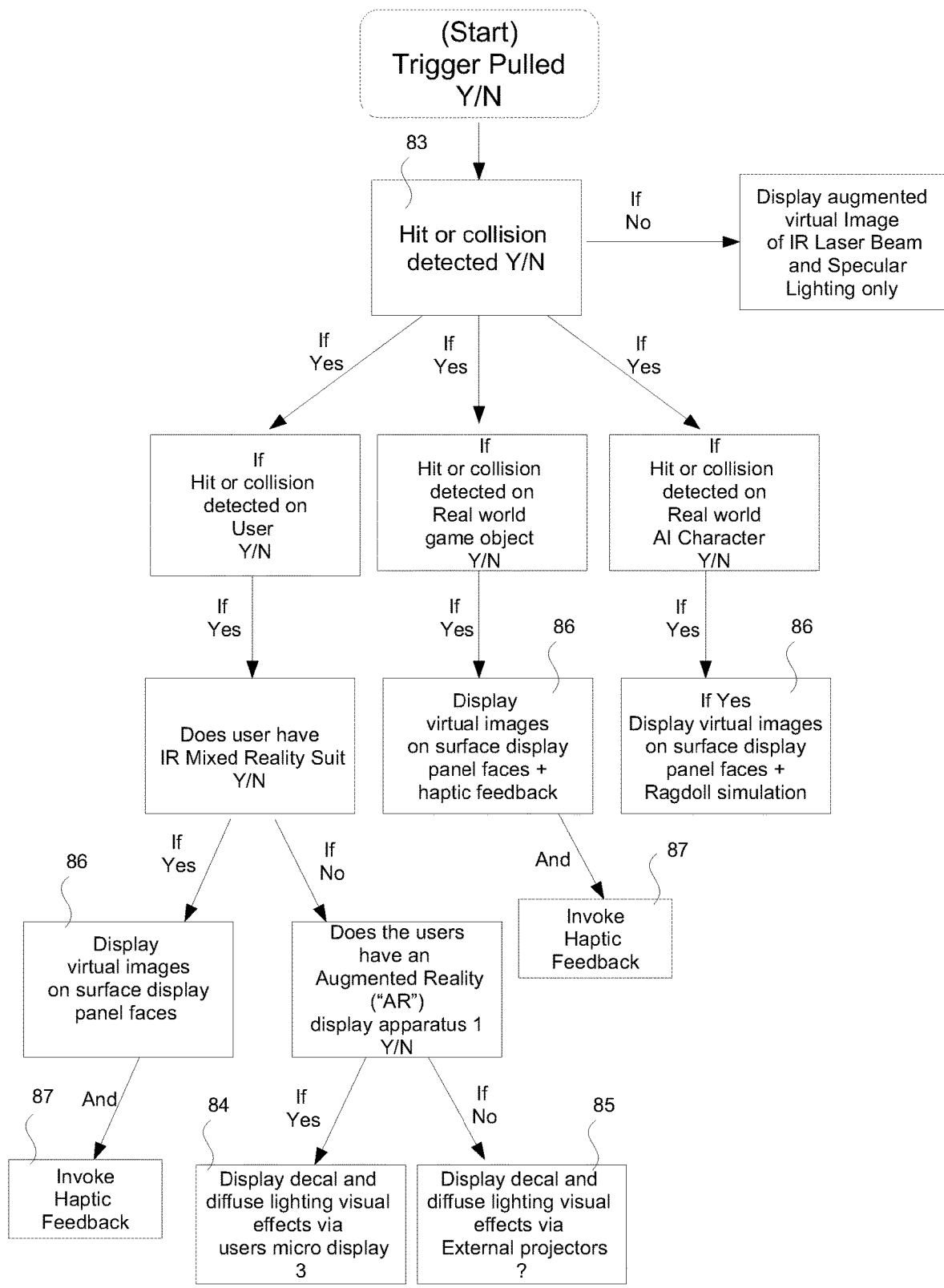
FIG. 6 shows a flow diagram for the handling of events between real-world game objects and virtual game objects.

FIG. 6 Illustrates in a simple flow diagram some of the detailed the variable actions and events resulting from the invoking the IR Laser Beam which may be invoked physically through by pulling the trigger or voice command via the microphone 8L, 8R of the users augmented reality ("AR") display apparatus 1 or via the microphones 67L, 67R of the IR Laser Gun Apparatus 47.

This is provided by way of example to aid the understanding of the relational usage of real-world game objects and their corresponding effects in the virtual world of the game as well as the real-world which can be seen in multiple ways, as augmented through the users micro-display 3, or directly displayed on display surfaces or projected externally via the use of projectors 96 in which the resulting changes in the game scenes, visual effects and changes in state can be seen from the usage of the users IR Laser Gun Apparatus 47, can also be seen by the naked eye.

This shows the effecting result in changes in the state of other real-world game objects, users, real-world AI Characters 94 as well as virtual-game objects 106, AI characters 106 and remote users 107.

Similar to previously detailed for the IR Laser Gun usage, the resulting events and actions invoked in the rendering and display of visual virtual-game images of the IR Laser Beam is based on the relational proximity of the world coordinates of other real-world users, objects, AI Characters or virtual-game objects, AI characters and remote users to that of the projectile IR Laser Beam fire based on the devices directional vector, world coordinates and orientation.

The physical use of IR Laser Gun Apparatus 47 trigger mechanism 53 mechanisms essentially may result in a sequence of events, rendered visual effects and resulting animations of the IR Laser Beam fire resulting in new virtual game objects of the projected IR Laser beam to be created and their visual effects to be displayed in relation to the direction of the weapon fire based on the directional vector, world coordinates, and orientation of the device at the time the IR Laser beam was invoked using the methods as previously detailed.

In addition, where a hit 83 is detected this can change the state of the rendering of real-world game object, user or real-world AI character where as shown in FIG. 6, a new game object visually showing the hit may be displayed via multiple methods including as via the user's micro display 3 as an augmented virtual-game image 84; or projected 85 via the external projectors 96 in the laser tag arena by the game server 88 or host 89; or displayed directly where the real-world game object, user, AI character has suitable display screen capabilities 86. Hits may result in a sequence of animations showing diffuse lighting effect followed by a change in the rendered texture of real-world game object, user, AI character 94.

Similarly, where a hit is detected 83 this can change the state of the rendering of real world game objects, users and real-world AI characters as shown in FIG. 6. It may also change the state of virtual game objects, remote users and AI Character's not depicted in FIG. 6.

FIG. 6 illustrates some of the example physical effects that a detected hit via an IR Laser beam or virtual weapon fire can have on real-world in which where a collision is detected by a collision manager on any paired real-world game object/device or wearable device this may invoke haptic feedback 87 on the users IR Mixed Reality Suit 93, IR Mixed Reality Vest 92, IR Laser Gun Laser Apparatus 47, and/or handheld IR Shield in which the haptic modules of these objects is activated providing physical feedback to a user of an IR Laser beam or virtual weapon fire hitting the user or their handheld physical game objects and devices.

A vibration motor may provide physical sensations and feedback which is controllable by the haptic module 68 or the IR Laser Gun Apparatus 47, as a result of detecting a hit via IR Sensor or computationally or as a result of a user pulling the trigger mechanism 53.

Note not illustrated on FIG. 6, but in addition 3D positional sound effects are generated by the system in the projection and detection of a hit using the world coordinates of the moving IR Laser beam virtual-game object and the world coordinates/model coordinates or hit box for where the IR Laser beam has intersected with another real-world user or object such as another users IR Shield Apparatus 90, a real-world AI character 94 or a virtual game object 106, AI Character 105 or remote user 107 etc. This uses the previous detailed 3D perceptual sound effects techniques such as ITD, IID, IPD, ILD, together with HRTF functions, where based on the input image coordinates in three-dimensional space of a real-world objects and its paired virtual game object in to a HRIR database, the sound waves may be processed and manipulated to achieve perceptual 3D audio localisation of objects in which a user perceives the audio coming from a specifiable location in three-dimensional space. This can be applied to both real world game objects and virtual objects.

In addition, the same visual and 3D audio positional effects of the IR Laser Beam passing or hitting a real world object or surface using the spatial mapping geometric, volumetric data, mesh data and depth maps of real-world may be invoked where based on the determinable coordinates of the real-world objects and surfaces the game server 88, host 89 or user's local client module 28 on the users augmented reality ("AR") display apparatus 1 may invoke these in game effects. Any client module may invoke such an action.

The same visual and 3D audio effects and detailed invoking of the effects applies to the use of all IR physical weapons such as IR Shield Apparatus 90 or IR Proximity Mine Apparatus 91 as well as virtual weapons that are controllable via hand gestures or voice commands captured by the users augmented reality ("AR") display apparatus 1, gesture recognition 30 or speech recognition module 33 modules.

As shown in FIG. 6, virtual game objects can be created by the rendering module of game server 88, host 89 or local clients of users Augmented Reality ("AR") Display Apparatus 1 or real-world objects such IR Laser Gun Apparatus 47, IR Shield Apparatus 90, IR Proximity Mine Apparatus 91 or real-world AI Characters where authority is given for the creation of virtual game objects, rendering and the display of visual effects using the generated virtual game objects. Similarly, authority may be given to the audio manager of the game server 88, host 89 or local clients of users Augmented Reality ("AR") Display Apparatus 1 or real-world objects such IR Laser Gun Apparatus 47, IR Shield Apparatus 90, IR Proximity Mine Apparatus 91 or real world AI Characters to add 3D audio components and effects to virtual game objects in which the 3D audio component may inherent the world coordinates and directional heading of the virtual game object.

It should be noted for every real-world game object has its own paired virtual game object that represents the real-world device in the computational sense of the game in terms of the mathematical operations and rendering of surfaces on the devices surfaced display panel faces as well as in the creation of virtual game objects resulting from its use such as in the case of the firing an IR Laser Beam in which a virtual animated image displayed as augmented of the real-world IR beam/IR Laser Beam over the user's real-world view as a result. Here the paired virtual game object and its 3D model may never be displayed in the normal sense of a game, but may be used just for the mathematical operations of the game, and in the usage of generating 2D surface displayed images/texture maps that are displayed via the physical surface display panels faces.

The significance of this distinction is important to note since like in the previous detailed example of how images are displayed on physical surface display panels of a real-world game object such as an IR Laser Gun Apparatus 47, where upon the user moving the position or direction and orientation of the IR Laser Gun Apparatus 47, based on the devices new coordinates, orientation and directional vector, where transformations are applied to the rendered displayed virtual images on its surface display panels faces 57L, 57R, 57 as well as to its associated 3D audio component.

In these transformation operations, as the real-world game object is moved its coordinates, orientation, and directional heading are applied to its paired virtual game object in which this allows then for transformations to be applied to the audio source file in which input into the HRIR database in which audio sound samples files are manipulated using 3D perceptual sound effects techniques such as ITD, IID, IPD, ILD, together with HRTF functions, based on the input image coordinates in three-dimensional space.

Similar with Laser Beam 3D sound effects these sound effects maybe based on the varying trajectory/projectile different generated virtual-game objects resulting from a user or users pulling a trigger mechanism repeatedly while moving where different vector positions/world coordinates and direction vectors are generated together with a line of the angle/direction of the IR Beam/IR Laser beam, where for each point (x,y,z) along the line of projectile of the virtual game object representing the real-world moving projectile direction and angle of the IR Beam/IR Laser beam in terms of every point coordinate are input into the HRIR database to generate different positional 3D sound effect at different coordinates (x,y,z).

Here the audio sound samples files are manipulated using 3D perceptual sound effects techniques such as ITD, IID, IPD, ILD, together with HRTF functions, based on the input image coordinates in three dimensional space for every point (x,y,z) along the line or ray of the projected IR Beam/IR Laser Beam.

The result is the user hears a 3D audio sound effect of the IR Beam/IR Laser Beam travelling along the exact precise projectile, trajectory and direction of that of the real-world IR Beam/IR Laser Beam, in which at every point along the line or ray the sound moves position in three-dimensional space, based on the sequence of points along the line or ray also the directional vector of the IR Laser Beam.

For every different IR Beam/IR Laser Beam fired resulting from the user pulling the trigger mechanism of a real-world game object a new virtual-game object and a new line is drawn based on the formulated trajectory/projectiles of the IR Beam/IR Laser Beam using the devices coordinates, orientation and directional heading at the point the trigger was pulled, where for every point along the line transforms are applied to the virtual-game object to move its position in 3D space where as a result both the display augmented virtual image of the moving IR Beam/IR Laser Beam and the 3D audio sound moves to the same position also based on the new image coordinate inputs (x,y,z) into the HRIR database. The rate at which the transformations are applied as the virtual image of the IR Beam/IR Laser beam changes positions or points along the formulated line or ray of projectile/trajectory of the IR Beam/IR Laser Beam, is based on the velocity of the IR Laser Beam based on real-world velocity.

The length of the line or ray is based on the projectile distance of the IR Laser Gun Apparatus 47, which is converted into a number of points along the line or ray. Here the IR Laser Gun Apparatus 47, range of its IR beam/IR Laser Beam may be 200 meters for example where the device as detailed features a magnified lens, which is used in the formulation of the line and subsequent line equations used.

Should an object fall on a point (x,y,z) along the line, then based on that objects virtual game objects vector position or three-dimensional coordinates (x,y,z) both the augmented virtual image of the IR Laser beam will cease to be displayed and the 3D audio shall change where a hit is detected. A new virtual game object representing the hit will be generated and displayed as an augmented image at the point of the hit (x,y,z) or collision position. In conjunction the three dimensional coordinates of the new virtual game object representing the hit/collision position will be inputted into the HRIR data base following which the user will both see an augmented image and hear a 3D audio sound effect at the exact position in three-dimensional space of where the real-world IR Laser Beam intersected or hit another object. This object may be a real world user, game object or a real-world AI Character 94 or a virtual game object, AI character or remote user.

In the case of the object being a virtual kind this may be a virtual game object, a virtual AI Character or a remote user which is playing the game via an external network connection from another location outside of the three-dimensional space of the laser tag game but in which the space they are playing is a replica geometrically to that of the laser tag arena 98 or game space in which the main state of the game is played, where as a result a remote user is treated as virtual user.

Audio Manager 34 in the generating of 3D positional audio effects can use coordinate inputs directly from real-world game objects, users and real-world AI Characters 94 based on its respective sensor readings supplied by its respective client module provided over a bluetooth network connection for example, or it can use the coordinates their paired virtual game object supplied via the rendering module of the real-world game object or Real world AI Character 94 via a bluetooth network connection or via game server 88 or host 89 over the WiFi network in which the state of all clients is maintained.

This may be dependent on the range of each object as to whether bluetooth or WiFi is used. The methodologies for retrieving coordinates may be driven by this or may be a dependent on the game setup whether peer to peer or client to server etc. WiFi could be used to local clients in a peer to peer setup where greater range is needed.

Alternatively, as detailed the Audio Manager 34 can use state information from the game server 88 or host 89 in the generating of 3D positional audio effects which includes real-world users, game objects and real-world AI Characters coordinates as well as state information on their relative paired virtual game object objects for which coordinates can be taken also.

It should be noted the detailed methodologies, features and functions detailed herein of the Audio Manager 34 applies to all instances of the Audio Manager component, which applies in the use of external speakers 101 in this example where the Audio Manager 121 resides on the game server 88 or host 89 as well as in the use cases where the Audio Manager 34 is run from a user's Augmented Reality ("AR") display apparatus 1 in which 3D positional audio is played back via the wearable devices speakers. Other examples include where the Audio Manager 76 resides on a real-world game object such as an IR Laser Gun Apparatus 47, in which the 3D positional audio effects are output via the speakers of the device.

FIG. 7 shows the mixed reality and augmented reality gaming system laser tag gaming arena 98 consisting of a Game Server 88 or host 89, physical real-world game objects including two or more IR apparatus weapons such as an IR Laser Gun Apparatus 47, IR Shield Apparatus 90 and IR Laser Proximity Mine Apparatus 91 that may be used by two or more users to project IR Beams/IR Laser beams at other users or objects IR Sensors/IR Receivers or Fibre Optic Sensors to score hits or tags; two or more wearable head-mounted augmented reality ("AR") display apparatus 1; two or more wearable IR Mixed Reality Vests 92 or IR Mixed Reality Suits 93 which users may wear featuring a number of IR Receivers/IR Sensors for hit detection; one or more real-world AI Characters 94 which are physical in presence.

The laser tag arena 98 also consists of external camera(s) 95, external microphones 100, external speakers 101 for projecting perceptual based 3D sound localisation sound effects, spatial 3D audio and external projectors 96 for 3D projection mapping, video mapping and spatial mapping of augmented reality game scenes and sequences seen without the visual aid of a wearable augmented reality ("AR") head-mounted display apparatus 1.

In addition, the laser tag arena 98 features also, a Laser Planner 107 for the support of structural light scanning techniques such as Laser interference. As an alternative the laser tag arena 98, also features spatial light modulators 109 that are used also with the digital external projectors 96, and one or more of the external camera(s) 95, for the support of the support of structural light scanning techniques.

Furthermore, Motion Sensors 102 may be placed around the laser tag arena 98, for use of detecting user movement in specific locations of the arena by the Game Server 88 or host 89 used to invoke the display of augmented scenes via the external projectors 96. Here motion sensors 102 maybe a form of combined IR LED together with IR Sensors that act as IR Detectors, where the IR light reflected back from an object invokes the activating of the sensor to alert the Game Server 88 or host 89 of physical movement.

The external cameras 95 may be used together with infrared emitters 103 or a lexian-stripe 104 as a positioning frame of reference to support the detecting of physical hand gestures among other forms of user inputs.

In addition, the laser tag arena 98 consists of Mixed Reality Scenery 99 that has display capabilities together with IR Sensors and form of a computer which a form of a static real-world game object which is an environmental element.

True to the original objective of the laser tag, the core objective of the game shall be for users using IR apparatus weapons such as IR Laser Gun Apparatus 47, IR Shield Apparatus 90 apparatus and IR Laser proximity mine 91, to score as many hits as possible either via the detection of their IR beam light emissions reaching another real-world game object or users or AI characters 94 IR Sensors and IR Receivers or computationally based on the determination of a collision or hit by one or more the instances of the collision manager modules on the receiving device or the device which projected the IR beam. Here IR Beams are referred to as IR Laser Beams in the embodiments of the disclosed invention herein.

IR Sensors and IR Receivers for detecting hits may be on a user's IR Mixed Reality Vests 92, IR Mixed Reality Suits 93, Augmented Reality ("AR") Display Apparatus 1, or could be on a user's handheld real-world game object and device such as an IR Laser Gun Apparatus 47, IR Shield Apparatus 90 apparatus and IR Laser Proximity Mine Apparatus 91.

The game exists in two worlds, the virtual world of the game and the real-world in both a computational sense and in the interactions between real-world game objects, users, AI characters and virtual game objects 106, virtual AI characters 105 and remote users 107 in which either can effect the state of another.

The game server or hosts acts as the principle source of all truth in the management of the state of all real world game objects, users, AI characters and virtual game objects, AI characters and remote users which are all forms of clients. Here the game server 88 or host 89 shall be responsible for maintaining state information as the single source of authority to all clients on the game state in which each client shall connect with the gaming server via the network 97 to provide state information. This includes among other data state information on user and/or devices such as whether a hit has been detected, inputs and outputs, movement and sensory tracking data, location information such as coordinates (x,y,z) for example, mesh data of real-world objects/scenes together with the data of any virtual world objects created locally and event trigger information, which is provided with a time stamp to the game server 88 or host 89.

The game server 88 or host 89 shall consist of a number of processor units 110 including CPU(s), GPU(s); memory 111; storage 112; an encoder 113 and decoder 114; a network interface card ("NIC") 115 that supports WiFi connectivity together with an operating O/S, Kernel, System Libraries and a number of software modules used by the system in performing the functions of the games sever as described herein.

These modules include an input handler module 116; rendering module 117; observer module 118 gesture recognition module 119, location tracking module 120; display projection module 122 used for the control and use of external projectors 96 in projection mapping/video mapping and spatial augmented reality of 3D augmented scenes over real-world surfaces and objects; a locational tracking module 120 for retrieving, processing and stores state information on all remote clients modules in the non-SQL based database 123 or data store used for maintaining state and classification data in memory for all clients; a games engine 124; Collision Manager 125 and the game application 126 software for running the mixed reality and augmented reality laser tag games.

The game server 88 or host 89 shall also feature an audio manager 121 module and HRIR database for the handling of 3D perceptual sound effects and 3D sound effects. The audio manager 121 is used by the game server 88 or host 89 to support the playback of 3D spatial audio effects and perceptual based 3D locational sound effects via external speakers 101 and user devices speakers.

The modules also include a speech recognition module 127 for the handling of spoken voice commands. The host 89 maybe a user's augmented reality ("AR") display apparatus 1 or could be a companion device such as a mobile phone, tablet, PC, which is capable of running the system software and processing the game events, inputs as well as performing computational calculations for triangulation, in game computer graphics processing such as performing mathematical operations such vector operations, matrix multiplication etc., using the CPU and GPU or set of GPUs and CPUs. The game host shall handle also the programmable software executions, programs.

In the case of a peer to peer game, the game server 88 may be replaced by a host 89, which could be another user's augmented reality ("AR") head mounted display apparatus 1. Here the game server 88 or host 89 may keep track of the different game objects coordinates in the virtual world relative to real-world objects, surrounding surfaces and users position based on the tracking and sensor data retrieved from the other users augmented reality (AR) head mounted display apparatuses 1, real-world game objects and AI characters, in which state information on each object is stored in memory.

In both cases these coordinates are supplied via the network 97 by each of the clients of the real-world game objects, users augmented reality ("AR") head mounted display apparatus 1 and AI Characters to the game server 88 or host 89.

All state information passed by the remote client's software client modules via the network for all clients is stored in the Non-SQL database 123 or data store of the game server 88 or host 89 by its locational tracking module 120.

Clients include users augmented-reality ("AR") head mounted displays 1; real-world game objects and devices such as an IR Laser Gun Apparatus 47; IR Shield Apparatus 90; IR Proximity Mine Apparatus 91; real-world AI Characters 94 and user wearable devices such as a mixed reality IR Mixed Reality Suit 93 or a IR mixed reality vest 92 in which a client module resides on these real-world game objects and devices. These clients are referred to as a remote client of the system or local client of a device.

Each client features a client module which is responsible for providing state information on their current world coordinates in the form of three-dimensional Cartesian coordinates with values representing points on the x,y,z axis, orientation represented by p,r,y for pitch, roll and yawl, together with a directional vector and other forms of state information such as their velocity, rate of acceleration, etc. to the game server 88 and host 89 which maintain a state of all users, objects and AI Characters.

It should be noted that as per the described embodiments of the presented invention herein, real-world game objects are not an illusion through computed generated virtual game objects that are augmented over the user's real-world view but are actually present in tangible and physical form in the user's real-world environment in which a connection between the virtual world of the game is maintained through the physical tangible media of these real-world game objects.

The physical use of real-world objects provides a physical means for human users during a laser tag game to affect the state of the games virtual world and the real world. Conversely this provides a two-way directional link between the real-world and that of the virtual world, where virtual game objects and AI characters can physically change the state of the real-world and provide via the haptic modules of the real-world game objects physical feedback to users resulting from a collision in which the objects intersect in three-dimensional space or a hit for example. Real-world AI Characters 94 also take physical form in the real-world where they can directly touch and interact.

Here the use of virtual or real-world game objects can transverse across the boundaries of the three dimensional space of the real-world and virtual world in which both can affect the state of each other in the computation of the game and in the real-world visible and physical sense. Here the game is not bound to the boundaries of the virtual images, projection or the use of augmented head mounted displays or other forms of display in which real-game objects are physical in the real-world which can be touched, handled, and interacted with, in which the physical use of these objects effects the state of the game in the real-world and that of the virtual world.

Ergonomics provide a true sense palpability which is not limited to being simulated through haptic feedback, in which real-world game objects can be touched and interacted with just the same as real-world objects thus enabling a heightened mixed reality gaming experience of one that pushes the physical as well as mental capabilities of the human user in the game of laser tag.

As detailed in the gathering of state information the game server 88 or host 89 is programmed to receive data from each of the users real-world devices/game objects, the users wearable items such as their augmented reality ("AR") display apparatus 1, IR Mixed Reality Suits 93, R Mixed Reality Vests 92 and real world AI Character 94 clients detailing their three dimension coordinates, orientation, acceleration, velocity, state and direction, which is provided via their respective client modules via the network 97.

This state information is captured from the various devices sensors including the tilt sensors, motion sensors, accelerometers, magnetometers, compass and/or the gyroscopes, IR Sensors, GPS tracker etc. in which the game server 88 or host 89 maintains a complete state of all real-world game objects, users and AI characters, together with the computational state of all virtual game objects, AI characters and remote users during the game.

This enables a precise relative positioning at all times of all real-world users, devices/game objects and AI Characters 94 during the game play and for the game server 88 or host 89 together with the clients that retrieve this state information to be able to perform the many functions as described in the embodiments of this invention.

The system game server 88 or host 89 or remote clients together with their respective game application/client module software are operable to supports and process multiple forms of user inputs, in the rendering of augmented reality game scenes, objects and in the computational operations of the game such as the detection of hits or maintaining of hit scores as well as the many other functions disclosed in the embodiments of the disclosed invention herein.

Input types differ in the disclosed invention described herein to traditional conventional gaming systems where the following embodiments detailed, outline the various means of interactions that are supported by the system, used in the computation and rendering of the game. Some of these inputs are similar to that of virtual reality or augmented reality systems, however others such as the use of physical inputs in the use of real-world game objects which are tangible and physical in the users real-world as opposed to being a virtual object that the user interacts with through non physical contact is where the presented embodiments and supported inputs differ. For example, real-game objects and real world AI Character's 94 are physical 3D objects that exist in the real-world environment of the user, where these can be physically touched and interacted where these forms of inputs can change their physical appearance and state in the real-world seen by the user without any visual aid.

This provides for an unconventional and novel new form of gaming and computational paradigm in which within the disclosed embodiments of the invention provided herein, the conventional sense of how games are programmed and operate is changed in which the game exists in real-world and the virtual world not by simple illusion of augmented reality scenes but in real tangible form in which real-world game objects are physical in form and can be used to affect the state of the real-world and virtual world.

These real-world game objects and real-world AI Character's 94 move around the real-world not by a process of transformation in the rendering sense of virtual game objects moving around the virtual world but through physical interaction in which their movements in the three-dimensional space of the real-world invoke transformations on other virtual game objects as well as their paired virtual game object which can change their appearance visually and that of other objects.

Furthermore, real-world AI characters that are physical in form and tangible walk among human users in their real-world environment during the game as well as playing alongside during the game of laser tag, in which they provide direct inputs into the game by their own actions.

The Game Server 88 or host 89 together with the real-world game objects themselves and the users augmented reality ("AR") display apparatus 1, have been coded to support the following physical input types; touch inputs, these are physical interactions with use of touch screen, buttons; trigger events, these are physical trigger mechanisms resulting from the physical use of a real-world game object/device's trigger mechanism; voice commands, this are spoken commands; hand gesture recognitions; physical movement actions detectable via sensors of the users real-world game objects or remotely with motion sensors 102 in the laser tag arena 98.

In addition, the Game Server 88 or host 89 are programmed to support inputs such as those generated indirectly such as 1R Beams/IR Laser Beams or Laser beams, which are a physical laser and/or IR beam of light projected into the three dimensional space of the game resulting from a user or real-world AI Characters physical use of IR Laser Gun Apparatus 47, IR Shield Apparatus 90 or IR Proximity Mine Apparatus 91 resulting from voice command input or touch screen input on the device itself; IR Sensor readings, these are inputs in which hits are tracked by the use of IR optical sensors and can affect the physical state as well as visual state of objects in the real-world. Data may be included in the IR beam/IR Laser Beam that may serve as an input also.

It is important to note here that in all these forms of physical inputs and other forms of inputs this can have a resulting visual and physical effect on other real-world game objects, user wearable devices such as IR Mixed Reality Vest 92 or a real-world AI Character 94 in which this can be seen and heard without the need of any visual aid such as a wearable augmented reality ("AR") display apparatus 1 or external projector 96 using projection mapping/video mapping/spatial reality or 3D projection mapping in which users can see and hear the change with their own eyes and ears where these game objects exist in their world.

Note in the projection of an IR Beam/IR Laser beam resulting from the use of a physical use of IR Laser Gun Apparatus 47, IR Shield Apparatus 90 or IR Proximity Mine Apparatus 91 trigger mechanisms, the system is capable of determining based on the devices world coordinates, orientation and directional vector at the time the trigger was pulled, the projectile and trajectory of the IR Beam/IR Laser Beam from a point or origin in three dimensional space.

This may invoke the creation of a virtual-game object as a visual representation of the moving IR Beam/IR Laser beam moving along the same directional heading/direction vector from the same point of origin as the real-world IR Beam/IR Laser Beam.

This can be shown in a variety of ways via the users augmented reality ("AR") display apparatus 1, micro display 3, or via the external projectors 96 using projection mapping/video mapping/spatial augmented reality or 3D projection techniques. Alternatively, lighting and visual effects of the animated IR Beam/IR Laser Beam could be displayed on the surface display panels faces of real-world game objects effecting their visual state in the real world.

In addition, this may result in a physical change, regardless of whether the IR Beam/IR Laser Beam hits an IR Sensor in which based on the detection of a hit computationally using the positional vector of the origin (x,y,z) and directional heading together of that of a virtual game object together with other attributes such as velocity, mass, distance, time to determine if the IR Beam/IR Laser has intersected with say a user's IR Mixed Reality Vest 92 this could invoke a physical feed via their haptic module.

Alternatively if the hit and collision position (x,y,z) is determined to hit a real world AI Character 94 this could invoke a rag doll simulation in the real-world where the real world AI Character 94 falls to the ground in a dramatic display of moving body parts as a result of the hit.

This example is given to highlight how the use of a real-world game object and the resulting projection of an IR beam/IR Laser Beam in the real-world can affect the state of virtual world as well as other real-world users, game objects, objects and AI Characters, hence the resulting IR Beam/IR Laser beam from the user use of a real-world game objects/ physical device is in itself an input to the game state of both the virtual world and the real world.

These resulting IR Laser or Laser Beams are tracked also as an output of real-world devices to track the amount of failed hits and ammo remaining etc. as well as the described function of collision of a real world laser beam or IR Laser Beam with a virtual-game object by the collision management part of the system, from the use of physical real-world devices by a human user or real-world AI character.

The game server 88 or host 89 is also capable of supporting other forms of more traditional AR and VR inputs such as Hand Gestures which are physical gestures such as hand signals used to signal actions, in which the game server 88 or host 89 is capable via the external cameras 95 in the game arena of tracking the hand gestures and complex finger movements using its gesture recognition module 119 and middleware.

The game server 88 or host 89, like the users augmented reality ("AR") display apparatus 1, is capable of supporting both offline and online gestures where offline gestures can be used to display augmented display menus during the laser tag game as augmented images projected over real-world surfaces using the external projectors 96 and external projection mapping/video mapping/spatial augmented reality techniques.

Online gestures maybe used to track a user's interactions with a real-world object or virtual world object such as the rotating or scaling of an object in which augmented scenes may be projected over the user's real world view or a real-world object/surface using an external projector 96 and the detailed projection mapping techniques.

The external cameras 95 used in this process may be depth-aware cameras which are a form of structured light or time-of-flight cameras, which may be used by the game server 88 or host 89 for detecting hand gestures at short range by the game server 88 or host 89.

Alternatively, the external camera(s) 95 maybe a form of stereo cameras which may be used in together with positioning reference such as infrared emitters 103 or a lexian-stripe 104 as depicted in FIG. 7, where in conjunction with six dimensional vision (6D-vision) direct measurements, hand gestures can be detected by the game server 88 or host 89.

Here the gesture recognition module 119 of the game sever 88 or host 89 as depicted in FIG. 7, supports handling of detecting hand gesture inputs and functionality through same methodologies and techniques as detailed for the user augmented reality ("AR") display apparatus 1, gesture recognition module 30.

Alternatively, wired gloves or gesture based controllers on the users IR mixed reality suit 93 or on the real world AI characters 94 hands, maybe used to provide direct hand gesture inputs to the game server 88 or host 89.

In each example hand gesture inputs, the game server 88 or host 89 may invoke a change in the game sequences and virtual game images projected over real-world surfaces using the external projectors 96 and the previously described projection mapping techniques including projection mapping/video mapping/spatial augmented reality and 3D project mapping. This can also invoke a physical change in a real-world game object or real-world AI Character 94, such as a change in the texture displayed surface mapping on the surface display panel faces of a real-world game object or AI character 94 seen without visual or that is projected externally via an external projector 96 using projection mapping or video mapping/spatial augmented reality projection technologies.

Like the described methods supported by the users augmented reality ("AR") display apparatus 1, the game server 88 or host 89 is capable through differing algorithms of supporting different types of gesture inputs and other forms of inputs in different ways. Here the game server 88 or host 89 shall support differing spatial gesture models such as 3D model based skeletal and volumetric or appearance based template models or image sequences methods.

In addition to the described hand gesture tracking methods, the physical use of real-world game objects/devices such as the IR Laser Gun Apparatus 47, IR Shield Apparatus 90 or IR Proximity Mine Apparatus 91 can provide an input in which their MEMs sensors which include accelerometers, gyroscopes, tilt sensors together other sensors may be used to translate gestures into user inputs resulting in for example the game server 88 or host 89 to perform a transformation on virtual-game objects.

Here the physical gesture is signal is detected from the movement and orientation of the user's physical movements of the real world game object/device which may be used in conjunction with the detection of a physical movement resulting in a collision based on sensor inputs captured by the client module of the device. For example, a user could use their real-world game object to physically ram, hit or run at a virtual game object or virtual AI character where this form of physical input maybe detectable based on the users hand orientation (p,r,y), and the resulting orientation of the hand held real-world game object together with other physics data such as the rate of acceleration in which the user is moving or has made their hand movements.

Here the result of detecting this type of physical input could result in a different response by the game server 88 or host 89 for example as well as different change in the state of the virtual game object or AI character that was hit with this form of physical action/input. These sensors of these real-world game objects can also serve directly as an input where for example upon a user throwing an IR Proximity Mine Apparatus 91, the game server 88 or host 89 or the devices local client 221 is able to detect if the thrown object has intersected with another real-world object, game object, user and/or real-world AI character 94 or a virtual game object or virtual AI character which may serve in itself as an input upon the detection of a collision, where the input is then triggered as a result of the IR Laser beams projecting from the IR Proximity Mine Apparatus 91 resulting from the sensors detecting motions. Here as before the result of detecting this type sensor input resulting from the user physical action of throwing the object could result in a different response by the game server 88 or host 89 or that of the local client.

Equally as described the multi-axis accelerometer sensor(s) 207 on the IR Proximity Mine Apparatus 91 real world game object/device can detect motion and vibrations where upon a user coming into physical contact say from a foot or hand physically touching the device or vibrations to the ground from a user walking nearby, the sensor(s) 207 may detect vibrations or small changes in motion/orientation in which upon detecting inputs from the sensor(s) 207 the client module 221 shall then activate the IR LEDs 211 and IR Transmitters 212 whereas a result IR Beams/IR Laser beams shall project from the IR Proximity Mine Apparatus 91 outward via each of the devices optical lens pieces in differing directions according to the orientation of each of the lens pieces. Here as before the result of detecting this type of sensor input resulting from the user physical event in the detection of motion or vibrations could result in a different response by the game server 88 or host 89 or that of the local client. For example, this may result in the change of augmented scene.

The game server 88 or host 89 via external microphones 100 placed around the laser tag arena is capable of supporting voice commands in the form of spoken vocal commands as inputs, which may be used in the projection mapping/video mapping/spatial augmented reality mapping and projection of virtual images or videos for game scenes via the external projectors 96 on real-world objects and surfaces seen without the need of visual aids in response to detected vocal inputs.

Alternatively, the game server 88 or host 89 is capable of supporting voice commands provided via network from the user's wearable head mounted augmented reality ("AR") display apparatus 1, microphones 8L, 8R by its client module 28, in which the resulting input may also as before be used in the external projection of game scenes via the external projectors 96 on real-world objects and surfaces of the laser tag arena seen with or without the need of visual aids.

The speech recognition module 127 of the Game Server 88 or Host 89 as depicted in FIG. 7 shall support this functionality through the use of different forms of models, methods and techniques such as language modelling or Hidden Markov models, speech to text based systems or other forms of widely available speech recognition models, methods and techniques by converting spoken voice command inputs in to text formed inputs that are used by the Game Server 88 or Host 89 software modules such as its game application 126 to invoke an action such as the examples given with the embodiments of this invention.

In addition, users may interact with virtual game objects 106 or virtual AI characters 105 directly via the use of the external cameras 95, external projectors 96, external speakers 101 and external microphones 100, in which users may interact via hand gestures supported through the game server 88 or host 89 hand gesture tracking module, or via voice input supported by the speech recognition module 127.

All inputs including voice inputs captured in audio form from the external microphones 100 or hand gestures or facing recognised inputs captured on video from the external cameras 95 are passed back via the network 97 to the Game Server 88 or host 89, in which for voice inputs the speech recognition module 127 shall translate the audio to text and corresponding recognised input which is processed by the Game Server 88 or host 89 and input into the virtual AI software invoking a response. For hand gestures or facial recognition identification of facing expressions, this shall be handled by the gesture recognition module 113 through the use of facial and gesture recognition algorithms in which upon processing and identification of an input type in a text form the Game Server 88 or host 89 shall input the corresponding inputs into the virtual AI software invoking a response.

The virtual AI characters response may then be rendered via the rendering module 117 of the game server 88 or host 89 in which corresponding imagery, video and audio of the virtual AI Character's 105 response is then transmitted over the network 97 to the corresponding external projector 96 and speakers 101 based on the users world coordinates (x,y,z) according to their wearable IR Mixed Reality Suit 93 or IR Mixed Reality Vest 92 sensors or based on the physical known location of the user according to their inputs via the external microphones 100 and/or external cameras 95.

The imagery or video of the virtual AI Characters response is then projected using the external projectors 96 using 3D projection mapping techniques, projection mapping/video mapping and spatial augmented reality techniques.

Sound in the form of emulated human speech of the virtual AI Character maybe generated by the Audio Manager 121 module using text to speech (TTS) audio techniques where together with the previously detailed 3D perceptual sound effects techniques such as ITD, IID, IPD, ILD, together with HRTF functions the audio of the virtual AI Characters response maybe played back via the external speakers 101 in the form of 3D spatial audio, perceptual based locational 3D audio sound effects.

This maybe based on the virtual AI Characters world coordinates (x,y,z) and projected coordinated via the external projectors 96, relative to the users own world coordinates, and recognised head-orientation captured from the Game Server 88 or host 89 gesture recognition module 113 facial and body recognition programmed software, the 3D audio sound may be placed at a determined x,y,z coordinate.

This may be an iterative process in the interaction of a user with an virtual AI character, in which users may walk between the 3D cells and three dimension space of the laser tag arena where the virtual AI character may be projected onto the corresponding real-world surrounding surfaces where the user is able to interact with the virtual AI character in a sequence of the game storylines or game play designed to aid the user or to help bring the game to a conclusion.

Other inputs include state information on real-world users (via their wearable augmented reality ('AR') display apparatus 1), game objects and AI characters which includes their world coordinates (x,y,z), orientation (p,r,y), directional heading/vector, velocity, rate of acceleration and other physical inputs provided via their device sensor(s) including the use of their GPS tracker, Accelerometer, Gyroscope, used for tracking of users, real-world AI characters, and game objects that are physical clients such as handheld devices and moving objects.

In addition, other inputs such as video and images from the use of the camera(s) of real-world game objects and AI characters is used by the game server 88 and host 89 to observe the state of the real-world in which spatial mapping techniques are employed to track changes in the real-world and apply changes to the display of projected augmented scenes projected via external projectors 96 or to change for example the physical state of an AI Character based on identification or face recognition of user which serve as inputs.

Facial pattern recognition software and algorithms of gesture recognition module 113 or virtual AI software shall support this functionality together with the observer module 118 of the game server 88 or host 89 and user of the external camera(s) 95 as depicted in FIG. 7. The gesture recognition module 113 may use many different forms of spatial gesture modelling such as 3D model based skeletal or volumetric algorithm based approaches, or appearance based deformable 2D templates or image sequences to capture simple to complex hand gestures.

In yet a further example of an input, inputs can comprise of processed user inputs obtained by the touchscreen sensors of a real-world game object such as IR Laser Gun Apparatus 47, in the form of touch inputs.

These touch screen inputs may be processed by a remote client and/or game server 88 or host 89, where inputs maybe used for example to determine the changes to be applied to a rendered surface images of a real-world game object, displayed via its surface display panels faces. Here the detection of a touch screen input is detected by the touch screen sensors, and passed up to the remote client module of the device, which together with the local game application is programmed to process and handle I/O inputs in which this may invoke the rendering module of the real-world game object or real world AI Character 94, to render a new surface texture map for the corresponding face/surface that the users hand or fingers intersected with and an input was detected.

The resulting re-rendered virtual image is then rasterised, fragmented and using a array of RGB value or form of in-memory bit map uploaded into the frame buffer of touched display panel where the resulting pixels are then illuminated by the display drivers and displayed on the screen corresponding to their pixel coordinate and colour value.

Where real-world game objects have the means to display rendered images and textures over their physical display covered surfaces, this provides a novel way in which 3D rendered objects can be seen without the aid of AR head-mounted displays as well as touched and interacted with, where their surface renderings changes according to the users touch and interaction similar to real-world objects.

As well as changing the directly displayed rendered surface texture-maps of a real-world game object or AI character as a result of a user touching the screen, the detection of a touch screen input on the display panel touch screens may also invoke the displaying of change in an in game rendered augmented scenery of the surrounding space, which may be seen via the use of external projectors 96 by the users naked eye, or through the user's augmented reality ("AR") display apparatus 1 via their micro display 3 screen, as augmented over their real-world view.

In the case of external projected augmented scenes, the touchscreen inputs are passed by the client module of the real-world game object or real world AI Character 94, via the network 97, to the game server 88 or host 89 that shall invoke the rendering module 117 to re-render using the mesh data and 3D model data of the real-world scene and objects the augmented scene. This may be in conjunction with the processing of the inputs by the game's application 126 on the Game Server 88 or Host 89 in which the user input via the touchscreen of a real-world game object could trigger a new game scene or change in the game sequence storylines. The resulting re-rendered virtual image is then rasterised, fragmented and using an array of RGB value or form of in-memory bit map uploaded into the frame buffer of the external projector 96 where the resulting pixels are then illuminated by the display drivers and projected onto the real-world space, scenery and objects corresponding to their pixel coordinate and colour value.

In the example of the change in the game scene or sequence of the storylines being seen through the users augmented reality ("AR") display apparatus 1 via their micro display 3, the touch screen inputs are passed via the network 97 from the client module of local real-world game object/device or real-world AI character 94, to the client module 28 of the users augmented reality ("AR") display apparatus 1.

The client module 28 of the users augmented reality ("AR") display apparatus 1, shall invoke the rendering module 27, to re-render the augmented scene using its local mesh and 3D model data of the real-world surrounding space, objects or surfaces.

The resulting re-rendered virtual image is then rasterised, fragmented and using an array of RGB value or form of in-memory bit map uploaded into the frame buffer of the micro-display 3, where the resulting pixels are then illuminated by the light display modules corresponding to their pixel coordinate and colour value, and projected onto the users left and right eye via the optical lens pieces 5L,5R and waveguides 22L, 22R. Here the virtual image maybe a holographic image, hologram or a form of stereoscopic or stereogram image in which two differing 2D stereoscopic images may be provided.

Note a real-world game object may be a user's IR Mixed Reality suit 93, IR Mixed Reality vest 92, an IR Laser Gun Apparatus 47, and IR Shield Apparatus 90 or an IR Laser Proximity mine Apparatus 91 where these real-world game objects/devices may feature touchscreen capabilities on their display surface panel faces such as real-world AI Characters 94 feature as detailed in the later FIG. 8 and corresponding embodiments of the disclosed invention herein of the mixed reality and augmented reality gaming system presented.

Sensors also provide another form of input. Each remote client's device's client module retrieves in real-time data on its world coordinates, orientation, together with other state information from its sensor(s) and locator devices that includes an accelerometer, gyroscopes, tilt sensors, motion sensors, GPS tracker, electromagnetic compass etc. via its the other modules such as the tracking and motion module, where the generated state information from the sensory data is passed to the game server 88 or host 89 via the network 97 by each client for maintaining state information on all clients.

Here the tilt sensor is used to formulate the pitch and roll (p and r) on a 2-axis. The tilt sensor and/or accelerometer combined with inclinometer may be used to also formulate the pitch, roll and yaw on a 3-axis.

A 3-axis electro magnetic compass/digital compass or magnetometer may be used to measure the heading on a suitable x,y,z axis representing the clients world coordinates and directional vector used for maintaining state information and dead reckoning. A remote/local client may also have a dead reckoning module.

Dead reckoning may be used by the game server 88 or host 89 to predict where a client's coordinates maybe at any one time in three-dimensional space, similar to how this is used in traditional network gaming where the game server 88 or host 89 uses its last known state information including the clients last known world coordinates, orientation, velocity, rate of acceleration, angular velocity and directional heading etc. among other state information, to project or predict a client's next state using linear physics and formulas. This may be used in the prediction or determination of collisions or in the handling of loss of state information in which the game server 88 for example based on a prediction invokes a change in the state of the game.

The magnetometer works on the basis of the strength direction of the magnetic field, to determine a direction on the three x,y,z axis. The electromagnetic compass or digital compass work on the principle of a heading but also provide values for pitch and roll on a three axis. The accelerometer/motion sensors may be used to determine also the heading, direction and speed of a moving client. This maybe a form of inertial navigation system in which the sensor is capable by using dead reckoning to the position, orientation and velocity of a moving client. The accelerometer can be used in conjunction with the gyroscope to calculated the tilt or velocity of change in angle direction in which the client is tilting. The accelerometer may also be used with the client's pedometer to accurately measure the movement of a client and the distance travelled.

The accelerometer may be a three-axis accelerometer for measuring motion on a x,y,z axis or other suitable axis such as p,r,y. It may also be a multiple axis used to determine magnitude and direction of the acceleration of a client as a quantifiable vector and form of free-fall accelerometer.

These sensor devices take reading measurements, which are passed up to the client via the CPU and bus as interrupt or output, from which the client module shall then disseminate the data to both the game server 88, host 89, its local modules such as the Collision Manager 125 and Rendering module 117 as well as provide the data to other clients for performing the functions as described within the embodiments of this invention.

The sensor readings then form the client's world coordinates, orientation, velocity and direction etc. represent the clients state at any one time which is used in the many functions of the embodiments of the invention disclosed herein including but not limited to collision detection, hit determination, the invoking of transformations in response to a hit detection or two clients intersecting, the invoking of the re-rendering of real-world objects display surfaces where a user's hand is detected to have intersected with the object and the invoking of game sequences and augmented reality displayed imagery via the users augmented reality ("AR") display apparatus 1.

The sensor readings may also be used directly by clients to invoke a physical change in the real-world, for example the client being an IR Proximity Mine Apparatus 91 may be thrown physically by a user where upon the sensors of its multi-axis accelerometer readings detecting impact with the ground, from shock or vibrations or changes in rate acceleration and the data readings being passed to its client module 221, the client module 221 as programmed may activate each of its IR LEDs 211 and/or IR Transmitters 212 resulting in the projection of multiple IR Laser beams or it could be activated upon detecting real-world vibrations from the movement of other users, objects or AI characters nearby detectable via its multi-axis accelerometer.

Alternatively based on the measurements of changes in gravity and the compass directional heading from the electro magnetic compass/digital compass or magnetometer the IR Proximity Mine Apparatus 91 could be triggered in which based on the data readings its client module 221 may activate each of its IR LEDs 211 from which IR Laser beams are projected outward as a result of the illuminating the devices IR LEDs 211.

Furthermore, upon spin, based on the detection of the client device rotating at high velocity and rapid changes in the orientation or changes in velocity resulting from being thrown by a user, the IR Laser Beams on the IR Proximity Mine Apparatus 91 could be activated in mid flight.

In each example give of the IR Proximity Mine Apparatus 91, the client module 221 is programmed to activate the IR LEDs 211 and IR Transmitters 212 of the device upon different determinable states from the reading measurements from its sensors 207 which may invoke different patterns in the illuminating of the IR LEDs 211 and consequent firing of the IR Beams/IR Laser Beams. Also, sensor reading from one client can effect a physical change in another client wherein example of the IR Shield Apparatus 90 with its tilting and rotational rear facing camera(s) 185 its client shall invoke an adjustment of the angle of its reverse camera(s) according to the sensor(s) readings provided by the eye tracking module 32 and head and motion tracking module 29 by another users augmented reality head mounted display apparatus 1, via the network 97 in terms of the user's head orientation, position as well as the users gaze direction, position of their eyes and focus. Alternately these sensor readings may be retrieved from the Game Server 88 or host 89 via the network 97 by the client module 193 of the IR Shield Apparatus 90 to support this functionality.

Alternatively, the IR Shield Apparatus 90, client module 193 may track in real-time the other users head and eye movements using its forward facing camera(s) 183 and observer module 198 to track the users eyes and head in which in real-time adjusts the angled direction of its rear camera(s) to match the users head and eyes position, direction and orientation as well as the users current directional gaze and focus which it then projects the video of the behind scene onto its surface display panel faces 166 so as to appear invisible to the other user which may be seen without any visual aid or the use of an augmented reality ("AR") display apparatus 1.

Alternatively, as detailed this may use the data on the users state information maintained on the game server 88 or host 89 in which the other users gaze and eye is captured via their augmented reality ("AR") display apparatus 1, inward facing cameras 10L, 10R by the eye tracking module 32 and their head position and orientation is captured via the sensors 9 by the head and motion tracking Module 29 for which both sets of state information is the sent over the network 97 by the client module 28 to the game server 88 or host 89.

This may then be retrieved by the client module 193 of the IR Shield Apparatus 90 to support the adjusting of its rear cameras 185 for this function.

Here the state information includes the data from the head and motion tracking module 29, and eye tracking module 32 which includes the users eye orientation (p,r,y), gaze direction as a directional vector, head orientation (p,r,y) and head position (x,y,z) which is provided by the users augmented reality head mounted display apparatus 1 client module 28 via the network 97 to the Game Server 88 and Host 89, which is then retrieved by the other users IR Shield Apparatus 90 client module 193 via the network 97 to the Game Server 88 and Host 89 for tracking of the user's eyes and head where adjustments are made accordingly to the angle of the rear facing camera(s) to match the users gaze, eye and head positions and orientation in the display of the behind recorded video/images on the devices surface display panel faces 166.

It should be noted in this example that the IR Shield Apparatus 90, features a series of movable rear facing cameras 185 mounted around the device on individual plates on 2-Axis FPV camera cradled head with a dual servo which support the pan, tilt and rotation of the cameras, in which based on the users coordinates (x,y,z), gaze direction/directional vector and head orientation (p,r,y) the camera(s) via the motorised dual servo, steering gear and micro-controller rear facing cameras 185 the may be rotated and tilted to maintain the correct perspective view of the behind scene and semi-invisibility appearance.

The input of the other users coordinates (x,y,z), gaze direction/directional vector and head orientation (p,r,y) may be converted into different pan/tilt and rotational camera positions of differing orientation (p,r,y) to reconstruct the users view of behind scenes on its surface display panel faces 166 at the same directional gaze, position (x,y,z) and orientation (p,r,y) of the users eyes and head as if the IR Shield Apparatus 90 was not there.

As yet a further alternative this state information in a peer to peer style game, may be retrieved from the other users augmented reality ("AR") display apparatus 1, via the local bluetooth network or via WiFi from its client module 28 which may be used to support this same functionality.

Note in the example of the IR Proximity Mine Apparatus 91, as yet a further alternative mechanism of triggering the device, the client module 221 based on retrieved state information from the game server 88 or host 89 on the world coordinates of other real-world users, AI characters and objects or virtual world objects, AI characters could activate each of the IR LEDs and IR Transmitters from which IR Beams/IR Laser beams are projected outward without a sensor reading.

In addition, a hit detected on the IR Sensors 208 and/or IR Receivers 209 of the IR Proximity Mine Apparatus 91 could cause the client module 221 of the device as per its programming to invoke the activation of each of the IR LEDs 211 and its IR Transmitters 212 from which IR Beams/IR Laser beams are projected outward or it could disable the device in which a flag is set to ignore all data readings from the sensors in which the device no longer shall pose a threat in the game to other users as its IR Laser beams have effectively been disabled.

World coordinates represented as a position in three-dimensional space (x,y,z) are used to triangulate the position of real-world game objects, AI Characters 94 and users as well as virtual game objects 106, AI Characters 105 and remote users 107 relative to each other, where when combined with the model coordinates of real-world another technique of polygon based triangulation or other forms of collision determination may be used by one of the collision manager instances of the system to determine one or more objects have intersected.

In addition, outputted state information on the user's head position and orientation in the form of six dimensional matrixes supplied by the user's head and motion tracking module 29 and client module 28 of the user's augmented reality ("AR") display apparatus 1, is used to formulate the relative vector position(x,y,z) and orientation (p,r,y) of the user relative to other real-world game objects, AI Characters 94 and users as well as virtual game objects 106, AI character's 105 and remote users 107 to determine collisions. This maybe done through a process of polygon based triangulation by the games engine 124 and collision manager 125 of the game server 88 or host 89.

This may be used by the games application 126 the invoking of new game scenes or could be used by the collision detection module of the collision manager 125 in the detecting of collision. Here the client module of a real-world game object or users augmented reality ("AR") display apparatus 1 may interface with the game server 88 or host 89 via the network 97 to retrieve the world coordinates/vector positions of other users and real-world game objects or it may using spatial mapping techniques and depth mapping techniques applied to the video or images captured from the users camera(s) 7R, 7L or external camera(s) 95 to formulate the coordinates of other objects and users in the three-dimensional space of the users field of view.

From which either source of data may be used by the respective local collision manager instance of the users augmented reality ("AR") display apparatus 1 and/or the game server 88 or host 89 in the determining of a collision. This uses depth information together with geometrical data of real-world surfaces and objects from the generated mesh data and wireframes from the Game Server 88 or Host 89 observer module 118 which uses the external camera(s) 95 together with the previously detailed spatial mapping techniques to generate this mesh data and depth maps.

Using either method detailed here the collision manager 125 of the game sever 88 or Host 89, or the local instance on the users augmented reality ("AR") display apparatus 1 may keep track of the movement, position, orientation, rotation and other attributes such as velocity of other moving real-world objects or users which it may use in the determination of collision detection through predictive methods such as TOI or through analysing from by frame if an object or user intersected or collided with one another object or user.

Note both of the described methods herein may be used to determine also if a real-world object or user has intersected or collided with a virtual game object or vice versa where in the reverse the collision manager instance is checking if the coordinates and position (x,y,z) of the real-world user or object that intersected or collided with that of the known coordinates (x,y,z) of the virtual game object which may a virtual AI Character 105 for example.

Alternately this could be a virtual game object that is used for the visualised IR Laser Beam projected as 3D holographic or 2D Stereoscopic image or video frames where based on the originating origin according to, the position, direction and orientation of the Laser Gun Apparatus 47, at the point the trigger was pulled and the projectile formulation of the IR Laser Beam in terms of the velocity and distance travelled the collision manager instance of the Game Server 88 or Host 89 or the users augmented reality ("AR") display apparatus 1 can determine if a collision shall occur. This may be supported by way of prediction the through mathematical calculation using triangulation or whether a collision has occurred by analysing frame by frame if the virtual game object of the IR Laser Beam has intersected or collided with a real-world object or user. IR Sensors may be used in this determination of a collision, however this would have a latency comparatively to the methods detailed above.

To support this functionality state information is also gathered from real-world objects such the users IR Laser Gun Apparatus 47, in the same form of six dimensional matrixes providing the three-dimensional Cartesian coordinates of the device and it's pitch, roll and yaw. The system keeps track of this information for triangulating the relative position of a user's IR Laser Gun Apparatus 47, to that of other users or objects positions used in the computation of collisions and hits.

All system maintained state information on the game and object information such model coordinates or hit boxes is stored on the central game server 88 and host 89 in memory as the source of truth during a game in which the users remote client devices client modules and other modules such as the collision manager shall poll the game server 88 or host 89 via a defined API over the network 97 to gain state and model information on all surrounding objects used in the detection of collisions, hits or other functions such as assisted targeting via the users augmented reality ("AR") display apparatus 1, where the system may augment an image to highlight the position of an enemy during the laser tag game, in which each real-world user or AI character 94 has tag value stored by the system as part of the state information identifying which team they are on. This is also used in the 3D audio positioning targeting system described in the embodiments of this invention.

An objects model coordinates may also be used combined with their world coordinates in the computation of hits and collisions. The model coordinates may be used in the calculation of an objects mass used as physics attribute in the computations of collisions by the real-world game objects/devices collision manager instances, collision response module and its physics engine. Alternatively hit boxes or hit box hierarchies may be used to reduce the processing overhead.

Network prediction and collision prediction in the determining of the game state and collisions may be used by the client modules and collision manager module instances of real-world game objects/devices including wearable devices such as an IR Mixed Reality Suit 93 and real-world AI Characters 94 during a networked game. This may use dead reckoning. Data structures are used to store data on all clients, users and objects in which each client, user and object has a unique identifier mapping the corresponding state information to the correct client, user or object. The system may group clients, users and objects based on their three dimensional coordinates where an users augmented reality ("AR") display apparatus 1, device client may request state information on all surrounding clients, users or objects based on its world coordinates and coordinates of the 3D cell it occupies, thus reducing the number of API requests and the response to that of only relevant items that are relational to the users current position in the three dimensional space of the game and the real-world.

Algorithms may be used in the mapping of users, clients and objects to a range of three dimensional coordinates and in the assigning of a territory ID or 3D cell ID. Here a territory could span more than two or more 3D cells or it may be unique to a single 3D cell.

As described the true state of the game for all clients is maintained on the game server 88 or host 89 which can be accessed remotely via the network by remote clients. As well as maintaining state information, the game server 88 or host 89 shall be responsible for the handling of inputs from other clients according to its programmed logic of its it's software modules and that of the game itself. Inputs may include event triggers and I/O inputs as well as state information which may be provided via the network 97 from a remote client. Event triggers may result from an I/O input.

As stated clients may be a physical tangible real-world game object and device such as IR Laser Gun Apparatus 47, IR Shield Apparatus 90 or IR Proximity Mine Apparatus 91 where I/O inputs into the game may be provided directly via an input handler to the devices client module, where these inputs resulting from the user pulling physically the trigger mechanisms could result in the creation of a trigger event for the firing of an IR Laser beam. These are classified as remote clients.

Alternately an Input could be captured via the camera(s) 7R, 7L and sensor(s) 9 from the users augmented reality head mounted display apparatus 1 where real-world game objects and devices such as the IR Laser Gun Apparatus 47, IR Shield Apparatus 90 or IR Proximity Mine Apparatus 91 may be controlled through voice or hand gesture inputs where inputs are captured by their speech recognition modules or gesture tracking modules respectively and passed by their client modules to the other devices remote client as an event trigger in which this shall invoke a physical action on the device such as the firing of an IR Laser Beam, or a change in its rendered state viewable on its display panels.

These types of clients types are also player client types, where only paired users augmented reality head mounted display apparatus 1, with that of the real-world game objects and devices can invoke a change and no other remote client or users augmented reality head mounted display apparatus 1 clients. Other forms of player clients which provide inputs into the game are the user IR Mixed Reality Suit 93 and IR Mixed Reality Vest 92 which provide IR Sensor reading inputs together with world coordinates for collision detection.

A remote client may also be a real-world AI Characters 94 which is physical and tangible in the real-world, where the character's visual texture maps that define is features are rendered over its surface display panel faces as depicted and it's the movements are controlled by the game server 88 or host 89 in which it head, arms and legs operate on rotational joints according to the transformations performed against the virtual 3D model or rag doll of the AI Character/robot during the game play using actuators to control movement. Here the real-world AI Characters 94 is a physically present robot or humanoid robot in the real-world game in which its hands, arms, legs, body and head each operates on up to 30 degrees of movement or greater through rotational joints and a mechanical skeletal operated on pins and actuators to control movement, which controllable via software.

Movement is controllable through many rotational actuators which may be in the form or hydraulic, piezoelectric, ultrasonic, electric or pneumatic for example.

The real-world AI Characters 94 may respond to inputs from other devices and modules such as the collision response module 161 to formulate its movement according to its programming and that of the determined response by the game server 88 or host 89. Alternatively, it may act independently using its own modules and AI software/algorithms to determine a response to an input or event such the detection of a hit from an IR Beam/IR Laser Beam.

For every client type that is tangible and physical in form in the real-world there is a game client application installed on these devices as part of their sub system components. This may be part of the client module software or as a separate application. These devices also have a form or computer that is used to perform the handling of inputs, rendering and display of images on their surfaces display panel faces. Each physical device is treated as a real-world game object where like virtual game objects they can affect the game state.

These devices and real-world game object in addition to the game application client shall have a series of modules like those depicted in FIG. 2 for the user augmented reality ("AR") wearable display apparatus 1.

Some of these real-world game objects and devices have forward facing camera(s) that provides the devices field of view into the real-world and can be used to perform spatial mapping in the generating of mesh data, 3D models and wireframes to capture and interpret the geometry and volume of the real-world in which these objects can move within.

Some objects such as the IR Laser Gun Apparatus 47, or the wearable IR Mixed Reality Suit 93 or the physical IR Shield Apparatus 90 or IR proximity mine Apparatus 91 can only be moved by physical actions by the user, where there movement and use provides direct input to the game in which changes in their world coordinates, orientation and physical model coordinates can affect the game play and game sequence of a scene in which these physical real-world objects provide inputs into the game which is handled by the game server 88 or host 89.

For example, the use of the physical IR Shield Apparatus 90 shall directly invoke an input into the game in which any corresponding hits from virtual game object weapons or real-world game objects such the IR Laser Gun Apparatus 47 shall not be registered upon the collision manager instance of either device detecting a collision if the shield was activated by the user through physically turning on the shield, based on state information retrieved from game server 88 or host 89 or maintained locally on the users IR Shield Apparatus 90 by its client module 193 retrieved via the network 97.

The position of the shield and its orientation as a result of the physical movements by the user's hand holding the IR Shield Apparatus 90 can also affect the game in which based on the 3D cartesian coordinate and the pitch, roll, and yaw of the shield together with the shields known model coordinates the system can compute if the weapon fire of a virtual weapon or the IR Laser Beam of a real-world weapon such as IR Laser Gun Apparatus 47, hit the shield or passed the shield's model coordinates based on the projectile formulation of the weapon fire for example.

Upon the game initialising in the real-world laser tag arena, clients shall first connect and register with the game server 88 or host 89 over network via an TCP/IP connection through a series of messaging needed to start up the connection between client and server and establish the number of clients, client types, users etc. This includes the passing of sensory data used to formulate the height of a user and their masses based on the height elevation of their augmented reality ("AR") display apparatus 1, which is used to approximate the dimensions of a user's hit box or model coordinates used later in the determination of hits or collisions.

The game server 88 or host 89 may scan users using its external camera(s) 95 and observer module 118 to generate mesh data to create precise 3D models of the users used later in the determination of hits or collisions. This may be used to generate hit-boxes and model coordinates for users as well as a user Avatar.

Alternatively, users may be scanned using the supported technique of Laser interference or projection using incoherent light by the game server 88 or host 89 with the use of its Laser Planer 108 and or spatial light modulators 109 in which a hit box or hit-box hierarchies and model coordinates of a real-world user may be generated based on a cloud of points ("CoP") which may be used later in the determination of hits or collisions as well as in the generating of user Avatars.

In either method of scanning a user, this shall also create a virtual game object and Avatar representing the users in the game that can be seen via the surface display panel faces 235 of the users IR Mixed Reality Suit 93, or via the external projectors 96 or via a user's augmented reality ("AR") display apparatus 1. Upon the scan being completed and the game server 88 or hosts 89 rendering module 117 generating the rendered 3D model and Avatar of the user, a user may be presented their Avatar via the users IR Mixed Reality Suit 93, or via the external projectors 96 or via a user's augmented reality ("AR") display apparatus 1, micro-display 3 from which the user may be provided the means via voice command or hand gesture inputs to selectively change their Avatar, in which the rendering module 117 shall generate different 3D model renderings of the users available Avatars which maybe customisable.

Upon selecting an Avatar this then becomes visible to the users and all other users via the users IR Mixed Reality Suit 93, or via the external projectors 96 or via a user's augmented reality ("AR") display apparatus 1.

A single user may be associated with one or more clients where the user may have a head-mounted augmented reality ("AR") display apparatus 1; one or more hand held real-world game objects that may be a tangible physical weapon such as an IR Laser Gun Apparatus 47, IR Shield Apparatus 90 and/or a number of IR Proximity Mines 91 as well as wearable devices such as a IR Mixed Reality Suit 93, or IR Mixed Reality Vest 92 etc.

Each client used by a user shall be registered and paired to that user where state information shall be maintained specific to each user's clients for tracking game play and the usage of the clients during game play by the user.

Clients shall listen on a specified port and IP address for inputs and packets sent by the game server 88 or host 89 where the game server 88 or host 89 shall process the provided inputs from the clients and pass back state and rendering information used by the clients to render scenes, surfaces, surroundings or invoke an action such as haptic feedback or 3D positional audio effects.

The game server 88 or host 89 shall also provide global mesh data and 3D model data of the real-world scenery and background of the laser tag environment to the clients that display augmented-reality imagery over the user's real-world view such as the user augmented reality ("AR") wearable display apparatus 1. This maybe generated by past users augmented reality ("AR") wearable display apparatus 1, observer modules 25 or could be generated by the game server 88 or host 89 using its external camera(s) 95 and its observer module 118.

Here this global mesh data passed by the game server 88 or host 89 could be used by user's augmented reality ("AR") wearable display apparatus 1 to render a 3D holographic image over real-world objects, surroundings, surfaces, devices and or users.

Alternatively, a client maybe a device such as an IR Laser Gun Apparatus 47 or IR Shield Apparatus 90, could use the global mesh data provided together with state information on other clients provided by the game server 88 or host 89 to say render directly on its display surface panels rendered images showing for example showing reflections of real-world surrounding objects and surfaces together with lighting effects of the directional light. Directional lighting could be the passing of light over the device as a result of a IR Laser beam being fired by another user based on the coordinates, orientation and direction of the IR Laser Gun Apparatus 47 or IR Shield Apparatus 90 relational to the other clients and the virtual game object of the projected IR Laser beam together with other physics variables such as velocity, mass etc.

In addition, based on the proximity of the projectile IR Laser Beam to that of the device the IR Laser Gun Apparatus 47 or IR Shield Apparatus 90 may be triggered to shake by the game server 88 or host 89 in which the client of the device invokes its haptic module to vibrate.

Alternately, in the case the IR Laser Gun Apparatus 47 or IR Shield Apparatus 90 weapon has received a hit detected by its IR Sensor(s) 62 or computationally by the game server 88 or host 89 collision manager by another users IR Laser Beam or virtual weapon fire, the local client may activate the devices haptic module to vibrate for a period of time specified by the Game Server 88 or host 89 collision response manager, in which the display surfaces of the IR Laser Gun Apparatus 47 or IR Shield Apparatus 90 may also be rendered as showing it has received a hit.

Furthermore, a client maybe a non paired remote client such as a structure, surface of the environment including but not limited to buildings, walls, ceilings, floors which have mixed reality 3D mesh display wrap around their surface which has display capabilities using TOLED triangular or quad formed tiled displays or equivalent transparent displays to cover their surfaces where the passing of data from the game server 88 or host 89 could trigger its surfaces displaying light passing over or the rendering of an object taking fire from a handheld device such as a weapon.

It should be noted here that the use of real-world objects as described can affect game state and that of the state of the virtual game objects. For example when a user pulls the trigger mechanism 53 on their IR Lase Gun Apparatus 47, this generates an I/O input together with a six dimensional matrixes and a directional vector which are provided to the client module 28 of the users augmented reality ("AR") display apparatus 1 or game server 88 via the network 97 from the user IR Laser Gun Apparatus 47 client module 74.

Here a six dimensional matrixes or greater maybe provided in which this contains the origin of the IR beam/laser beam expressed as up to three sets of x,y,z values one for the origin position, another its rotation and a third optional entry for the level of elevation from normal ground level as +/− value. Note rotation is derived from the devices orientation (p,r,y) captured from its sensors 51, the origin (x,y,z) values are derived from the devices world coordinate and positional vector at the time of the trigger mechanism 53 being pulled for which this is provided by the devices device tracking module 80 to the client module 74 which then provides to its pair augmented reality ("AR") display apparatus 1, client module and/or the Game Server 88 or Host 89. From this the projectile of the IR Beam/IR Laser beam maybe accurately formulated.

Upon receiving this I/O Input, six dimensional matrixes and directional vector this then invokes two operations. First the generating of new virtual game object, mesh and 3D model visually representing the IR Laser Beam, in which the moving augmented image of the IR Laser beam is rendered and displayed on the users augmented reality ("AR") Display apparatus 1, via the rendering module 27 and light display modules 5L, 5R.

Here the moving image is based on the described formulation its projectile in three-dimensional space factoring its velocity and the distance of the IR Beam i.e. 20 m/s at a distance of 200 meters and other variables like scaling for perspective projection where the further away an object the smaller it should appear.

Second the game application 36 or client module 28 on behalf of the collision manager 28 then pulls the state information on all objects or users within the radius of the IR Laser Beam projectile and originating coordinates from the game server 88 for which client then passes the data for state information to the collision manager 28.

This data includes the six dimension matrixes of the originating origin of the IR Laser Beam and its moving direction/directional vector along the three dimensional cartesian planes together with other projectile information such as velocity, gravity etc. together with the six dimension matrixes of other users and objects. The collision manager 28 through a formulation of triangulation using this data then determines by prediction or frame analysis if the virtual game object of the IR Laser beam shall or has intersected with another object or user in either the real-world or virtual world in which a hit shall be registered.

Alternatively, this may use a hitscan or ray casting technique, using a line or ray method based on the formulated trajectory/projectile of when the trigger mechanism was pulled using the coordinates (x,y,z), orientation (p,r,y) and direction vector to formulate the starting positional vector of where the IR Laser Beam originated, followed by a line or ray which represents the directional vector of the IR Laser Beam. Points or positions (x,y,z) along the line can be checked against the coordinates and positions (x,y,z) of other objects to determine if a hit.

Vector and parametric equations of a line may be used in the process of determining the line or rays position and heading along the x,y,z axis in three-dimensional space.

If a hit is determined on a virtual game object or AI Character then this shall invoke a response in which the collision manager 28 response module may invoke the generating by the rending module 27 of a second virtual game object which represents the hit of the IR Laser Beam on the virtual game object or AI Character.

This will then invoke the display of the second augmented virtual image in which the user shall see through their micro-display 3, a visual representation of the hit on the exact coordinate (x,y,z) and collision position of where the virtual game object or AI Character was hit.

In this example a physical action by a user has resulted in a change in the state of the virtual augmented scene of the game. In additional a physical IR Laser Beam has affected the state of virtual game object or AI Character where its coordinates have intersected with that of the coordinates of virtual game object or AI Character. In another example also how the user configures their real-world game objects can change the affect of how the use of real-world objects as described can affect game state and that of the state of the virtual game objects.

For example, user interactions with real-world physical objects through touch-sensitive screens of the IR Laser Gun Apparatus 47 may be used to provide inputs to the system in which the client module 74 of the IR Laser Gun Apparatus 47 may change the pulse rate or weapon classification, where upon a hit being detected on a virtual game object or AI Character this could invoke a different change in the state of the virtual game object or AI Character where far more damage is caused than would normally be formulated.

Other virtual game objects may be generated such as the display of a 2D virtual augmented image on the users Augmented Reality ("AR") Display Apparatus 1, microdisplay 3, as a heads up display indicating the hit and showing a counter progressing for the number of hits supported by its rendering module 27. Based on state information on the user hit, the users Augmented Reality ("AR") Display Apparatus 1, rendering module 27 may also render and display a further virtual game object as 2D displayed virtual image showing the ID or name of the other user that was hit in which the devices client module 28 shall retrieve this information from the game server 88 or host 89 via the network 97 to support this functionality.

It should be noted that real-world game objects such as IR Laser Gun Apparatus 47, maybe determined relational with a user in which during the game the IR Laser Gun Apparatus 47 shall be paired to a user in which every IR Laser Gun Apparatus 47 may have a unique identifier which is relational to that of the user's identifier.

When a user pulls the trigger mechanism 53 of their IR Laser Gun Apparatus 47, therefore this will register not only the coordinates, orientation and directional heading of the device upon the user pulling the trigger used in the computation of the projectile of the IR Laser beam and in collision detection determination but will also register the users unique ID associated with it, thus in the process of determining the origin of an IR Laser Beam that resulted in a hit, the user who fired the shot can also be determined and displayed as 2D virtual image on the augmented reality ("AR") Display Apparatus 1 of the user who was hit. This can also be displayed on all other users of their team.

Here based on the time of the hit, its coordinate and the known directional vector of other IR Laser Beams at the time it can be determined by identify the IR Laser Beam relating to the hit, which user fired the shot based on their associated user ID in the registered event and projectile information of the IR Laser Beam stored on the game server 88 or host 89.

In addition, the coordinate of the user who fired the shot may be displayed together with directional arrows assisting other team members to locate and take out the enemy user. This may be based on the known point of origin of the IR Laser Beam which is derived from the users IR Laser Gun Apparatus 47 world coordinate or positional vector at the time the IR Laser Beam was fired which is stored on the game server 88 and host 89 upon the trigger mechanism being pulled by the devices client module.

Users may lock onto a target also, where as the other selected target user moves the game server 88 or host 89 will inform the pursuing users via their client module 28 of the other users changing position in which state information on the target is provided over the network 97, to the pursuing users client modules 28

This state information and data maybe expressed as a 3D Cartesian x, y, z coordinate with a + or − on either axes which may be displayed as virtual image on the pursuing users augmented reality ("AR") display apparatus 1, Microdisplay 3 in which this operation is supported by the devices rendering module 27.

This may be provided together with 3D audio speech or 3D audio sound effects provided by the Game Server 88 or host 89 like a car GPS navigational system to aid navigation, in which this 3D audio may be played back via the users augmented reality ("AR") display apparatus 1, speakers 6L,6R indicating the direction of the target relative to the pursuing users current position and world coordinates except this is being used in the tracking of a target in the game of laser tag.

This audio maybe a perceptual based 3D sound locational audio effect or a 3D spatial audio effect, where a direction given as left can be heard by the user's ear towards the left of their head for example.

Note here every client including the users augmented reality ("AR") display apparatus 1, that fired the original IR Laser Beam which is being pursued in this case, provides in real-time state information to the game server 88 or host 89 including their current vector position/world coordinate and directional vector/heading based on their sensor readings that enables the detailed functionality to be supported.

In this example sound localisation technologies and techniques such as ILD, IID, ITD, IPDs and HRTFs etc. maybe used in this process. In addition, 3D spatial audio and Ambisonics techniques may be used in the providing of 3D sound effects. Furthermore, binaural recordings maybe converted to stereo records or may convert binaural recordings, stereo, 5.1 and other audio formats used in the game to 8.1 in order to provide a real-time 3D sound experience.

The system may use HRTF's to create 3D audio, or other techniques based on ambisonics and wave field synthesis principle to create 3D audio that is played back via the users augmented reality ("AR") Display Apparatus 1, speakers 6L, 6R.

In this process the Audio Manager 121 of the Game Server 88 or Host 89 shall process and convert the 3D coordinates of users augmented reality ("AR") Display Apparatus 1 and/that of other real-world game objects, users and real-world AI Characters 94, as well as virtual game objects, AI Characters and remote users to generate image inputs into the HRIR database to generate 3D sound effects, where the generated 3D sound effects shall be placed correctly on the three-dimensional plane relative to the target position of other real-world users, game objects, real-world AI Characters 94 and virtual game objects, AI characters and remote users.

This shall be relational to the user's head position where as the user changes their head position and orientation, transformation are applied to the 3D audio effects to maintain correct perspective of their position in three dimension space.

In this way as well as visual tracking and targeting using 3D audio effects and perceptual based 3D sound locational effects as described this may be used to indicate the direction of an target enemy, in which through a manipulation of the audio sound such that this is co-located to that of the target users position, users can identify a targets location in three-dimensional space by audio alone. Here the frequency of the number of sound effects played back as pulses of sound or volume may increases as the user gets nearer to their target in which the sound is amplified similar to real-world experience of sound emitting from a location.

This allows the use of 3D audio effects to be used also as a weapon guidance system for assisting users in locking onto target with their IR Laser Gun Apparatus 47 to target other users based on their world coordinates and that of their IR Sensors for which the game server 88 or host 89 via the network 97 provides the perceptual based 3D sound locational audio effects to the local client 28 of the users augmented reality ("AR") Display Apparatus 1 to support this feature.

Here the Audio Manager 121 of the game server 88 or host 89 uses the maintained state information including the world coordinates (x,y,z) and directional vector of all real-world users, game objects, real-world AI Characters 94 and virtual world game objects, AI characters and remote users to generate the perceptual based 3D sound locational audio effects to facilitate this function described herein.

Alternatively, the same functionality may be supported locally by the users augmented reality ("AR") Display Apparatus 1, Audio Manager 34, based on the same state information pulled from the game server 88 or host 89 in which this may apply the same 3D spatial audio and perceptual based 3D locational sound techniques as the game server 88 or host 89 to support the same functionality. This provides a strategic element to the game in which users may form formations to bring down users in a game scenario such as capture the flag.

Also using just perceptual based 3D sound locational audio effects and 3D sound effects users can perform rapid physical movements not possible normally in which based on sound alone they can orientate and move the position of their IR Laser Gun Apparatus 47 to target a user in which using such functionality a user could run or jump into an area of the laser tag arena and be able to lock onto an hit successfully other users IR Sensors with their fired IR Beam without looking potentially with their eyes.

This pushes the physical limits of a user in which they have full freedom of movement in the game and can perform feats not otherwise humanly possible in which by sound alone they can accurately target and hit other users, AI characters or objects that provides for a heightened mixed reality gaming experience in which the users capabilities are enhanced beyond their physical capabilities. The 3D audio positioning here works similar to that of sonar and echo location.

It should be noted that within the various supported embodiments of the disclosed invention herein the same functionality may be supported with or without the need of the users augmented reality ("AR") display apparatus 1, in which the 3D spatial sound effects or perceptual based 3D sound locational audio effects maybe output directly via the speakers 66L, 66R of the users IR Laser Gun Apparatus 47, or the external speakers 101 in the laser tag arena 98.

In the case of the 3D sound effects being played directly by the speakers 66L, 66R of the users IR Laser Gun Apparatus 47, the detailed functionality of providing the audio inputs into the speakers 66L, 66R may be supported by the local audio manager 76 of the device using state information retrievable from the game server 88 or host 89 via the network or maybe supported by the Audio Manager 121 of the Gamer Server 88 or host 89 in which 3D audio effects are transmitted to the device via the network 97 and played back locally via the devices speakers.

The game server 88 or host 89 based on inputs from remote clients may also invoke the usage of 3D mapping projection via the use of a external projector 96 capable of supporting 2200 lumens or more, where augmented images of visual effects of say an IR Beam/IR Laser Beam hitting a real-world building, walls, ceilings, floors are projected over real-world objects as part of the rendering of an in game scene. This may be used to augment decal visual effects such as scorch marks or to display various lighting effects such diffuse lighting, specular lighting or SSH lighting effects.

This is based on similar 3D mapping techniques as the previously detailed spatial mapping technique, in which wire frame and or 3D models of the real-world objects are created and projected against using 3D mapping software. In addition, the projectile of the IR Beam/IR Laser Beam here is formulated based on the users IR Laser Gun Apparatus 47 orientation, world coordinates and directional vector at the time of the user pulling the trigger mechanism 53 mechanism supplied by its client module 28 to the game server 88 or host 89 that would support this functionality of the display of augmented images of visual effects of an IR Laser Beam hitting the surface of a real-world object. Here the game server 88 or host 89 may use projection mapping/video mapping or spatial augmented reality projection techniques to support this functionality also.

In addition, clients maybe controlled via the game server 88 or host 89 such as a real-world AI Characters 94 which are a form of robotics and animatronics where these real-world AI Characters 94 have physical real world presence and can move freely around the arena the same as human users. Here real-world AI Characters, feature a series of actuators on a skeletal frame and have a form of computer in which their software programming and algorithms reside. Here the actuators provide freedom of move in the body parts of the real world AI Character, which allow movement of their hands for example with up to 30 degrees of freedom of movement allowing them to pick up and operate physical objects such as an IR Laser Gun Apparatus 47.

These real-world AI Characters may have similar to human user's other clients paired with them that could consist of handheld devices such as a IR Laser Gun Apparatus 47, IR Proximity Mine Apparatus 91 and IR Shield Apparatus 90 where the real-world AI Characters can physically interact with these devices the same as human users can during game play.

The use of animatronics and robotics has existed for many years, where this differs in the use of this existing technology with AI is in a simulated real-world gaming experience as described in the embodiments of this invention in which game renderings and game animation sequences such as rag doll simulation can be applied to the real-world AI Characters 94 and seen in the real-world during a game session, where for example the game server 88 or host 89 can invoke as programmed a rag doll simulation following the detection of a hit via the IR Sensors 144 and IR Receivers 145 on the real-world AI Character 94.

Alternatively, this may be invoked via a computational determination of a collision by the collision manager 125 of the game server 88 or host 89 where based on a formulation of triangulation in terms of the directional heading, velocity and world coordinates (x,y,z) of the projected IR Laser Beam virtual game object relative to the directional heading, velocity and world coordinates (x,y,z) of the real-world AI Character's 94 body.

The game state is maintained by both the local clients and the game server 88 or host 89 which represent both the individual users local representation in the game state on the local users augmented reality ("AR") head mounted display 1, and that of all of the real-world users, game objects and real-world AI Characters 94 as well as the virtual world game objects 106, virtual AI Characters 105 and remote users 107 on the game server 88 or host 89.

The client and game server 88 or host 89 software modules are programmed to control the other modules of the users augmented reality ("AR") display apparatus 1, to perform serviceable functions including the rendering of game objects, the projection of the visual display of 3D holographic and 2D stereographic images or videos in the visual representation of the game state, the communication handling of connection between the client and the server over the network 97, the handling of user inputs.

Inputs include hand gestures, voice commands, I/O inputs such as the use of the IR Laser Gun Apparatus 47, Trigger mechanism 53 for example among other forms of inputs.

The game server 88 or host 89 controls the modules on its physical server or servers. These sets of modules can control the game play, perform collision detections, perform the rendering operations or network prediction etc.

The purpose of the game server 88 is primary as the source of all truth, in which the user's clients synchronise with the game server 88 or host 89 for the handling of events and for other functions such as the computation of collisions in which the game server 88 or host 89 stores the 3D coordinates of all objects in the game.

The client also shall interface with the game server 88 or host 89 for the purpose of providing its local mesh, 3D models generated by observing the real-world by the observer component 25 and for retrieving global mesh and 3D model data based on the user's head position three dimensional Cartesian coordinates and orientation.

The client may also retrieve from the game server 88 or host 89 via the network based on its user's head position and orientation, pre-rendered game scenes and virtual game objects which may be in the form of 3D holographic or 2D stereoscopic images or video or other forms for example.

These maybe pre-rendered images or video which could be full CGI quality in which advanced and highly detailed rendering techniques such as raytracing maybe used which may be augmented on the users view of the real-world through the use of volumetric and geometric mesh data, 3D models and wireframes of the real-world captured previously through another users augmented reality ("AR") display apparatus 1, camera(s) 7L, 7R and sensor(s) 9, in which detailed renderings may be performed over hours or days to produce highly detailed augmented game scenes and 3D holographic images for example.

Alternately the volumetric and geometric mesh data, 3D models and wireframes of the real-world could be captured by the game server 88 or host 89 using its external cameras 103 with its spatial mapping capabilities of its observer module 118 or using its Laser interference or projection using incoherent light capabilities to generate CoP 3D models and mesh data in which further specialist equipment maybe used in conjunction to the external cameras 95 for the purpose of supporting 3D projection mapping over real-world objects and spaces using external projectors 96 detailed within the embodiments disclosed of this invention.

Specialist equipment may include wide planar lasers 108 are used in the case of laser interference and in the case of incoherent light this uses specialist spatial light modulators 109.

This also allows for more detailed meshes and 3D models with a far greater number of triangles and vertices to be used to generate such a detailed augmented reality game scene or 3D image of a virtual game object, for which the local client may simply retrieve the generated images or video based on the user's six dimensional matrixes representing their head position and head orientation. This allows for true CGI experiences to be provided in real-time as an augmented reality experience during the laser tag game.

As illustrated in FIG. 7 a series of external projectors 96 are mounted around the laser tag arena 98 used for performing projection mapping, also referred to as video mapping and spatial augmented reality, in which using 3D mapping techniques such as spatial mapping and 3D projection techniques, game visual lighting effects, rendered virtual game objects, game scenes, sequences and video is augmented over real-world surfaces and objects in the laser tag arena.

Using these techniques and he use of external projects which have 2200 lumens or greater virtual 3D in game imagery, lighting and video may be overlaid, superimposed or argument on any real-world surfaces, objects, users, AI characteristics and game objects in the physical space of the laser tag arena, where the resulting imagery can be seen without any visual aid.

Here the use of the users wearable augmented reality ("AR") head-mounted display apparatus 1, is not required to see augmented reality in game visual effects, virtual images and game sequences which can be seen by the users naked eye.

In one example embodiment of the use of projection mapping, video mapping or spatial augmented reality, the game server 88 or host 89 using spatial mapping techniques and the usage of the external camera(s) 95 to capture surface data via its observer component 118 is able to spatially map three-dimensional and two dimensional objects where rendered texture-maps for example may then be mapped to the constructed 3D mesh or wireframes of a real-world object or surface located in the laser tag arena.

Here similar to how the observer module 25 of the users augmented reality ("AR") head-mounted display apparatus 1 operates, the observer module 118 of the game server 88 or host 89 adds new identified real world surfaces to the system from which a mesh is generated containing volumetric, depth and geometric structural data on the identified new real-world new object or surface together with other physics data which can be used in determination of collisions.

When a new surface is created this shall create a new vector entry and a set of model coordinates containing the x,y,z values for the objects or surface vertices depicting the objects or surface shape used to generate a 3D model. Using the Mesh data which mimics the real-world environment, the game server 88 or host 89 shall then initiate the baking and rendering against the surface of the generated game object and 3D model which is representational in exact geometry, shape, scale and volume to the real-world object via its rendering module 117.

The display is then invoked via the external projector 96 in which the corresponding projected image light intersects with the surfaces of the object where the projected image is projected in precise placement in three dimensional space to that of the objects position, shape, faces and orientation.

The projected image appears then augmented to the user over the real-world object where the user then perceives the object form to have changed visually as result of the projection in which a moving animated sequence of images for example could be displayed in which the user further perceives the object to be moving. The system is capable in this way to project any form of virtual game objects or virtual images onto the surface of a real-world object in the laser tag arena which may be seen by the user without any visual aid.

The points at which the projected images intersects with the surface of the real-world object may be controlled via the game server 88 or host 89 display projection module 122 software to project accurately any virtual image or video of a real-world object in which the images or video align with the dimensions, geometric structure, faces/surfaces and vertices or points of the real-world object.

It should be noted also here that the observer module 118 of the game server 88 or host 89 shall upon changes to the real-world surfaces of the laser tag arena 98, provide updated mesh data or will delete mesh data where an object is removed for example from the space, in which this may trigger this process take place again in which new 3D models and virtual images may generated by the Rendering Module 117 and augmented over newly identified objects or surfaces.

Here an object may be a real-world game object such as IR Laser Gun Apparatus 47 or could be a user or real-world AI Character 94 in which changes to their position may invoke the identification of new objects by the observer module 118 if the use moves into the space of an augmented scene for example.

Alternatively, if the object is already known by the observer module 118, this may invoke a transformation as the object moves where the projection of the 3D mapped image changes with the movements or changes in orientation of the real-world user, game object or AI Character which is detected via the external camera(s) 95 and the observe module 118 in the providing of updates surface data and mesh data. For example, should a user move his IR Laser Gun Apparatus 47, in which a 3D projected image is being projected upon, this shall be detected by the Observer module 118 using the external camera(s) 95, in which new surface data updated information and mesh data shall be provided to the rendering module 117 which based on the observed changes may scale or rotate the virtual game object and 3D model of the IR Laser Gun Apparatus 47, in order to make adjustments to the projected 3D mapped image.

The result is as the user moves the IR Laser Gun Apparatus 47, in real-time or at frame rate 60 fps or more, new augmented images are generated in which transformations applied according in which the projected image onto the surface of the IR Laser Gun Apparatus 47, remains exact position to that of the real-world IR Laser Gun Apparatus 47 position. Here the observer module 118 provides constant surface and mesh data updates or may be polled or queried for changes in the real-world view in which changes in the orientation or position of a real-world object can be identified and transformation may be applied accordingly.

As a secondary method where the game server 88 or host 89 maintains also the state information on all clients including real-world users, game objects and AI Character 94, real-time sensor readings on changes in coordinates (x,y,z), orientation (p,r,y) and heading/directional vectors of a real-world users, game objects and AI Character 94 this may be used in this process, in which the updates to the 3D projected imagery can occur either from the updated state information of a client or from the Observer Module 118 provided updated surface and mesh data, in which either of these sets of data may be used by the rendering module 117 to apply transformations to the projected virtual image.

This provides two methods in which 3D projected images may be transformed in realtime according to movements. With human users that have a IR Mixed Reality Suit 93 and real world AI Characters 94 any change to their model coordinates may be captured and stored on the game server 88 or host 89 used for projecting 3D images accurately based on their body movements as well as changes in position and orientation.

Without this for example in the case of a human user where they don't have a IR Mixed Reality Suit that features sensors on their upper and lower arms, legs and body parts to be able to determine their model coordinate changes in position, the observer module 118 together with the gesture recognition module 119 may be used in which any change in the user's body, hands, arm, legs and head can be detected in which updates can be applied to their 3D model based on the new x,y,z coordinates identified for the objects vertices, which allows accurate 3D projection onto a moving object that may a real-world user, AI character 94 or game object.

Here a simple waving of arms can be tracked in which updates can be made to the 3D model based on observed changes and new mesh data from the observer module 118, where the rendering module 117 can apply transformations and the resulting updated 3D image can be projected back on to the user in real-time or at a rate of 60 fps.

Here also with a suitable projector of 2200 lumen or more and video mapping software the game server 88 and host 89 is capable of perform projection mappings of 3D or 2D augmented virtual-images of in game scenes, visual and lighting effects, virtual game objects, virtual AI characters and projectile fire of IR Laser Beams among other features in which the virtual rendered images, visual and lighting effects may be projected onto real-world objects, game objects, surfaces, users and AI Characters 94.

For example this could include the reflecting of lighting from other real-world objects as specular lighting type of effects or it could be used to show diffuse lighting effects where a collision is detected at the determined collision position or hit position expressed as an x,y,z coordinate or positional vector.

In relation to the previously detailed projection mapping, video mapping and spatial augmented reality, projection technologies used by the game server 88 or host 89, many of the same detailed augmented visual virtual images and lighting effects of an IR Laser beam and other visual effects shown during an laser tag game as previously detailed within the embodiments of the presented disclosed invention may be seen through these supported techniques via the external projectors 96 which may be seen by the users naked eye without the need for any visual aids such as the users augmented reality ("AR") display apparatus 1.

In addition, virtual images and lighting effects may be augmented on real-world AI Characters 94, other real world objects or other users IR Mixed Reality Vests 92 or IR mixed reality suits 93 which have surface displays screen panel faces 235 in which rendered and displayed hits as decal visual effects or near lighting visuals of passing other real-world game objects or virtual world game objects light sources seen by the users naked eye without the need for any visual aids such as the users augmented reality ("AR") display apparatus 1.

For example, the system may employ 3D mapping projection techniques using the external projectors 96 to show the moving projectile of an IR Laser Beam, in which based on the user pulling the trigger of an IR weapon, the coordinates of the device (x,y,z) and its orientation (p,r,y) in the form of six dimensional matrixes together with a directional vector of the device at the time of the trigger being pulled may be captured from its sensors and provided by the tracking module of the device to its client module.

The Client module shall then pass via the network 97 this data to the game server 88 or host 89 from which the rendering module 117 shall create a new virtual game object representing the IR Laser beam.

Using the world coordinates, orientation and directional vector of the IR weapon it is then possible for the game server 88 or host 89 to determine by way of formulation where the angle of the trajectory or projection may be determined by the orientation (p,r,y) of the device (which may be used to determine the directional vector), and the world coordinates (x,y,z) of the device can be used to determine the positional vector from which the IR Laser beam originates.

Using both the formulated positional vector value on the x,y,z together with the directional vector this allows a representational line to be drawn in three-dimensional space representing the IR Laser Beam precisely in alignment with the direction of the IR Laser Beam in which the created virtual game object can be placed.

Here the rending module 117 based on the known velocity and distance projectile of the IR Laser Beam may then perform a series of mathematical operations using matrixes and transformations to render a 3D image in a sequenced animation form of the moving IR Laser which may be the projected onto real-world objects, users, surfaces and AI Characters 94 using 3D mapping projection techniques and the external projectors 96.

Here both a virtual image of the moving IR Laser beam together with other forms of lighting effects such as specular lighting effects may be projected onto real-world objects, users, surfaces and AI Characters 94 in accordance with the precise projectile, trajectory, direction and velocity of the real IR Laser Beam.

Here the user sees as a result without any visual aid, both an augmented visual effect of the moving IR Laser Beam as well as specular lighting effects in which lighting is cast onto objects and surfaces, in its correct directional heading and points in three-dimensional space. Where both are augmented visual effects are projected in exact same positions relational to that of the travelling real-world IR Laser beam in terms of its directional heading, velocity and physical range of the beam in terms of the distance.

This allows for an enhanced gaming experience in which normally IR Laser beams are invisible to the human eye and have no lighting effect on physical objects or surfaces. This may use also other techniques such as hitscan or ray casting to determine the directional line or ray of the IR Laser Beam in the determining of hits, where based on the points (x,y,z) along the line or ray of the IR Laser Beam and the world coordinates (x,y,z) of other objects the collision manager 125 of the game server 88 or host 89 can determine if a hit or collision has occurred where the one object has intersected with another.

The resulting output from a hit detection shall provide yet a further positional vector or point or a collision position (x,y,z), which may invoke a second virtual game object to be created and a further virtual image to be rendered by the rendering module representing a visualisation of the hit, in which the rendering module 117 shall render new decal visual effects that are provided as a new rendered virtual image.

This rendered virtual image may then be projected using the external projectors 96 and 3D projection mapping techniques at precise location to that of the coordinates (x,y,z) of the hit, in which the user may then see again with no visual aid a second augmented image visually showing the hit. Here the rendering module 117 may also generate diffuse lighting effects which may be projected together with the visual augmented image and decal visual effect representing the hit at the same coordinates (x,y,z) as the hit.

This provides yet a further novel way where without any visual aid or the user of wearable head-mounted display apparatus for a user to see visual effects of physically firing an IR Laser beam using an IR weapon at an object in the real-world where ordinarily there is no visual effect of an IR Laser beam hitting an object or IR Sensor for example.

It should be noted an IR weapons maybe an IR Laser Gun Apparatus 47, IR Shield Apparatus 90 or IR Proximity Mine Apparatus 91 or any other form of physical tangible real-world game object that features and IR LED or Infrared Laser diode with the capabilities of projecting an IR Beam referred to as an IR Laser Beam or a real Laser.

Here the visual effects of an IR Laser Beam may be projected over any real-world objects and scenery of the Laser Tag Arena 98 for visual effect which may be seen without the aid of the users augmented reality ("AR") display apparatus 1.

In addition, this may be used to display rendered augmented scenes over real-world objects, ceiling, walls, floors and backgrounds of the Laser Tag arena as detailed or a user's home or within any indoor or outdoor space in which the game may be played where these projected augmented reality scenes and visual effects as detailed maybe seen without the aid of users augmented reality ("AR") display apparatus 1. This is just the same as the game could be played in a user's home or in a different outdoor space or indoor space using if desired the use of the detailed augmented reality ("AR") display apparatus 1, to support the additional capabilities detailed in the embodiments of the disclosed invention herein.

Furthermore, virtual game objects may be generated for an IR Laser Beam which may be rendered over an existing texture mapping for example of an augmented scene that can be seen by the naked eye on a real world surface or object using the techniques described of 3D mapping projection and the rendering of an IR Beam/IR Laser Beam.

As another example usage of the detailed projection mapping techniques, sensors 102 placed around the laser tag arena 98, in the form of motion sensors, or combined IR LED together with IR Sensors that act as IR Detectors could be used to invoke the projecting of a 3D augmented reality game scene over the space in which movement was detected. Here the motion sensor may operate on bases of IR light being reflected off of objects that moves under the IR LED of the sensor where motion is detected upon the IR Light being reflected back onto the IR Sensors/IR Detectors, in which based on motion being detected the game server 88 or host 89 may then invoke an augmented game scene.

Similarly, in the case of the motion sensor 102 being an IR Detector this maybe form of IR LED for transmitting infrared light couple with an IR Sensor next to IR LED on single PCB board in which when the IR Light reflects back from an object that moves under the IR LED infrared light the IR Sensor detects the light that invokes the detector, in which the game server 88 or host 89 may then invoke an augmented game scene. This object may be that of a real-world user or game object or a real-world AI Character has moved under the sensor. Here the sensor acts as a proximity or collision sensor, similar to that of the IR Proximity Mine Apparatus 91.

In addition, external microphones 100 placed in arena may also be used to track movement by sound in which this can like the detection of motion by the sensors as detailed, could trigger the 3D projection of a game scene.

The external projectors 96 may be mounted on a motorised plate and adjustable arm which is supported by two or more servo on 2-Axis allowing the system to make adjustments in the projection direction of the external projector by changing the rotation and tilt or angle of the external projector 96. Actuators may also be used on a wheel and rod system to move the projector along a rail system or the projector may be sat on a motorised wheel based frame in which it can be moved forward and backward above the users head. This supports the adjustment to the projection where for example the external projector 96 could be tilted based on the position of a person, object or AI Character based their coordinates known to the game server 88 or host 89 as part of the maintained state information or based on observed movement or changes via the external camera(s) 95 and on observed updates by the game server 88 or Host's 89 Observer Module 118.

It should be noted that the use of projection mapping or spatial augmented reality and video mapping, projection technologies for the use of projecting 2D or 3D game images as detailed via an external projector allows larger scenes to be rendered and displayed over larger areas without the need of any display apparatus whether on the surface of an object, building, user or other forms of surfaces.

Here the scale therefore of the three dimensional space of the game could be significant in size where projectors with a higher lumens of 20,000 or more may project game imagery and the visual effects on to buildings or larger outdoor spaces in which large scale mixed reality and augmented reality IR Laser tag games may be played outdoors with the use of the same equipment as detailed in FIG. 7, such as the external projectors 96, external cameras 95, external speakers 101, Game servers 88 or host 89 etc. and the spatial mapping/3D mapping techniques together with the disclosed real world game objects as detailed in the embodiments of this invention.

Conversely this could be scaled down to a persons house in which using just one or more of the laser tag arena external cameras 95, one or more external projectors 96, external speakers 101, a game server 88 or host 89, one or more users equipped with one or more IR Laser Gun Apparatus 47 and a wearable IR Mixed Reality Vest 92 a mixed reality and augmented reality laser tag game could be played out.

Here the game space could be confined to one or more rooms in using spatial mapping or projection mapping or video mapping techniques using the external cameras 95 mesh data and 3D model data maybe created for these rooms from which using the external projectors 96 3D or 2D game images, videos may be projected as augmented scenes over these real-world surfaces.

Here the external cameras 95 may be used by the game server 88 or host 89 with the disclosed tracking capabilities, to detect hand gestures. In the same way detailed using the IR Laser Gun Apparatus 47 sensors to track the coordinates, orientation and directional heading of the device, the projectile of the IR Laser Beam can be formulated, where augmented imagers and videos of the animated IR Laser Beam may be projected onto the room. The external microphones 100 mounted in the rooms of the user's home together with the speech recognition module 127 located on the game server 88 or host 89 could support voice commands as game input.

External speakers 101 together with an audio manager 121 using the same perceptual based 3D sound localisation techniques would provide the ability to create 3D audio sound effects that can be placed in specified points in there dimensional space. A real world AI Character 94 may also be used of smaller scale to support the game play.

In addition, users could not only play laser tag with other users or real world AI Characters 94 and users but could play against virtual game AI Characters 105, where using their IR Laser Gun Apparatus 47, they can fire real-world IR Laser Beams at the augmented images of the virtual AI Characters 105 that as detailed the system is capable based on the projectile formulation of the IR Laser Beam to detect a collision between a real-world IR Laser Beam and that of virtual AI Character 105, virtual game object 106, or a remote user 107.

Furthermore, as detailed previously with the user IR Mixed Reality Vest 92 and its haptic module 266, physical feedback could be given in the reverse use case where the real-world user is hit computationally by a virtual AI character 105 or a remote user 107, determinable based on their respective world coordinates/origin and the projectile/trajectory of their virtual fire relationally to that of the real-world users coordinates x,y,z).

Here the gaming experience compared to current VR systems could be significantly greater offering complete freedom of movement with no visual aid such as a wearable augmented reality ("AR") head mounted device, which could provide for a compelling gaming experience. Users could run, jump, throw objects such as the IR Proximity Mine at great speed and agility without any attached device restricting their visibility or movement.

It should be noted that the detailed invention and all of its embodiments as detailed are intended to work in all these user cases and set ups where in fact games can be played across multiple locations at set ups at the same time in which a replica of the three-dimensional space of the laser tag arena and game may be created in any space or location allow massive on-line multiplayer gaming to be supported.

This uses the remote user capabilities as previously detailed, where realities and spaces are converged in the computational sense in which the game three dimensional space and time exists in multiple physical locations which could include users playing from home, users playing outdoors, user playing from other laser tag arenas that are all connected via a network connection which maybe other the internet. Here technologies such 4G or 4.5G or 5G may be used to support the transfer of data, video, images between each location from each of the real-world game objects, clients, wearable device, real-world AI scaled to significant number of players.

In addition, the game server 88 or host 89 here maybe a form of a PC, Laptop, Tablet or mobile phone, in which the modules as detailed on FIG. 7 of the game server 88 or host 89 may be installed on these device types.

Alternatively, these modules of the game server 88 and/or host 89 could be hosted on a public or private cloud on the compute node resources, where its database and data stores are stored in cloud storage technologies such block storage or object based storage. The software modules here such as the observer module 118 may be located in VM images or on bare metal accessible via a public facing URL. Alternatively, the game server 88 or host 89 may be hosted on bare metal where its modules are run in containers/pods in which they reside on native container O/S or could be hosted on dedicated servers co-located with the location of the game like in the case of the laser tag arena setup as depicted in FIG. 7 which may use a form of a Linux/UNIX O/S.

As depicted in FIG. 7 external camera(s) 95 are positioned around the laser tag arena are used to perform spatial mapping, in which mesh data and wireframes containing the geometric, depth and volumetric data of the laser tag arena 98 environment may be gathered for the generating of 3D models of the real-world objects, game objects, surfaces, users and AI Characters 94 in which the system is capable of projecting 3D rendered images resulting from the 3D models back onto real-world objects, game objects, surfaces, users and AI Characters 94 via the external projector(s) 96 as augmented in game imagery and lighting effects seen by users without any visual aid.

Each external camera 95 is mapped to its own spatial mapping observer module 118 to monitor physical changes in the real-world, where the game server 88 or host 89 software will periodically query each of the observer module 118 instances to invoke baking process where a physical change is identified in the real world objects or surfaces, in which a new mesh shall be generated or an existing one shall be updated.

In addition, when a new mesh is generated and new virtual game object is generated, where using the mesh filter, mesh and virtual game object together with its 3D model corresponding to the identified real-world object or surface the rendering module 117 of the game server 88 or host 89 shall render new surfaces materials and texture maps over the real-world object, which are then projected onto the real-world object or surface using the external projector(s) 96 with the support of the display projection module 122 which is then visible to the user without any visual aid.

During this process the projected virtual image of video of the new objects surfaces and texture-maps are projected onto the real-world object where the light of the projection of the images pixels is placed relationally to that of the world coordinates (x,y,z), model coordinates and orientation (p, r, y) of the real world object in which the light corresponding to the pixels intersects with object precisely. This process is referred to as 3D projection mapping in which the display projection module 122 software supports this process.

The position of the external projector(s) 96 may be fixed or may adjustable on a tilting mechanical motorised mechanism in which an actuator on a multiple rod mechanism may be used to adjust the position of the external projector 96 in terms of its orientation p, r, y and it's directional facing of its lens into the three dimensional space of the game in terms of the cameras directional heading on the x, y, z axis of the three dimensional cartesian planes.

In addition, the external projector(s) 96 may be mounted on individual plates which support the pan, tilt and rotation of the external projectors 96, in which the external projectors 96 may be rotated from side to side and tilted up or down by the use of two or more motorised servos controllable via a micro-controller or driver. This provides a 2-Axis FPV cradle head with a dual servo and steering gear in which based on the target objects orientation, position that 3D images are being projected onto, the external projectors 96 rotation, orientation, pan and tilt may be adjusted. Here adjustments maybe made in real-time to the external projectors 96 through either of these mechanisms based on observations and updates by the game server 88 or host 89 observer module 118 on changes to the position (x,y,z) and orientation (p,r,y) of the real-world objects, users, game objects, AI character's 96 in the form of updated mesh data/surface data or based upon updated state information in which changes in the position (x,y,z) and orientation (p,r,y) are provided by the client modules of all real-world game objects, user wearables and AI Characters 94 etc. Wearables include users augmented reality ("AR") display apparatus 1, IR Mixed Reality Suits 93, IR Mixed reality Vests 92 and AI Characters 94 etc.

In this process of adjustments transformations may be applied to the virtual game objects/3D models of these objects and/or the external projector 96 itself in order to maintain the correct projection of the augmented virtual images pixels on existing objects.

Where the external projector 96 may be mounted on a motorised rail system mounted to the ceilings and walls of the laser tag arena 96 in which it sits on a plate that has motorised wheels allowing movements along the rails as basic forward and backward movements, limited adjustments may be made to the coordinates (x,y,z) of the external projector 96 also in the tracking and projecting of 3D projected augmented virtual images pixels on moving objects.

These capabilities allows the projection of 3D augmented images in real-time to be applied to moving objects which may be a real-world game objects, users and AI Characters 94.

It should be noted as previously detailed that 3D coordinates (x,y,z) and orientation (p,r,y) for all real-world game objects, users and AI Character's 94 is passed via network 97 by the client module of all devices to game server 88 and host 89 in real-time with the movements of these objects which allows the adjustment in real-time to of the external projectors 96 using the methodology as detailed based on updates to state information held on the game server 88 or host 89 for all real-world game objects, users and AI Characters 94.

Also, it should be noted that the 3D projection of augmented reality game scenes in a specific location or 3D cell of the laser tag arena 98 may be adjustable also based on the identification of new objects by the observer module 118 through use of the external cameras 95 or the removal of an object where for example a user has walked out of the three-dimensional coordinates of the space of the 3D cell and area in which the in game scenes are being projected on to by the external projectors 96.

In addition it should be noted that in this process the position (x,y,z) and orientation (p,r,y) of a user may be retrieved from the client module 28 from the sensor 9 readings of the users augmented reality ("AR") display apparatus 1, or from the client module of their IR Mixed Reality Suit 93 or IR Mixed Reality Vest 92 based on these wearable devices sensor readings.

In the case of the user having an IR Mixed Reality Suit 93 detailed body movements can be detected using the multiple sensor clusters placed around the users body, that supports the detecting of hand movements, arm movements, leg movements where precise coordinates and orientations are determinable allowing adjustments to be made in real-time to the external projectors 96 rotation, orientation, tilt, pan as well the external projectors 96 coordinates (x,y,z) where limited movement along fixed rails is supported.

This allows for real-time adjustments in the 3D projection of augmented images based on user detailed physical body movements in which transformations may be applied to the user's virtual game object, mesh and 3D model and/or the external projector 96 to maintain the correct projection of augmented virtual images over the user as they move within the three dimensional space of the laser tag arena 98.

Handover may occur also between external projectors 96 in this process, where the projection of augmented images over a moving real-world game object, user or AI Character 94 is passed from one external projector 96 to another as the game server 88 or host 89 detects via updated mesh data from its observer module 118 or from the state information on the position (x,y,z) and orientation of an object has crossed over from one physical location/space and 3D cell of the laser tag arena 98 to another.

It should be noted when a transformation is applied to the external projector 96 resulting from a change in an objects position or orientation, similar to the principle of a virtual camera in traditional games engines and screen based video gaming systems the position and orientation of the external projector 96 is changed with the strong difference being that in this case this results in physical change in adjustment of the external projectors 96 rotation, orientation, pan and tilt as well as their coordinates in the real-world which can be seen by a user moving as adjustments are made.

In addition to the use of sensor data from a user's wearable device or updated mesh data, the wired gloves of the users IR Mixed Reality Suit 93 may be used also for the precise mapping of the position of the users fingers and hands which may be used in the process detailed of applying transformations and the adjustment of the external projectors 96 rotation, orientation, pan and tilt as well as their coordinates based on detected hand gesture movements and changes in the user's hands as well as finger coordinates.

Alternately detailed mapping is possible via the use of the observer module 117 and the external camera(s) 95 in which through spatial mapping techniques the movement of user's hand, legs, arms, body and head are fully determinable in terms of changes in their position or orientation in which again adjustments can be made in real-time based on the updated mesh data to the projection of 3D augmented images via the external projectors 96 where transformations can be applied to the virtual game object, mesh and/or 3D model of a user in which updates can be made to the rendered augmented virtual imagery to ensure that the 3D projection of the augmented virtual images pixels aligns precisely with changes in the user's body parts position and orientation.

Alternatively, the game server 88 or host 89 may use its gesture recognition module 119 and the external camera(s) 95 in the process of tracking detailed user body movements and the applying of transformations and adjustments according to the user's movements to the external projectors 96 rotation, orientation, pan and tilt as well as their coordinates.

In the case of a real-world AI Character 94 detailed 3D coordinates (x,y,z) and orientation (p,r,y) stemming from joint movements for every part of the a real-world AI Character body from the ends of their fingers, to their arms, legs, and head etc. may be provided by the devices client module 156 to the game server 88 or host 89 that allows adjustments to be made in real-time in the 3D projection mapping of augmented images over the real-world AI Character 94. Here the game server 88 or host 89 may know in advance of the move and be provided with timestamps for the coordinates, where movements are a result of a rag doll simulation for example, in which in precise time sequence with the movements of the AI Characters 94 body adjustments may be made to the external projectors 96 rotation, orientation, pan and tilt as well as their coordinates, by the game server 88 or host 89 display projection module 122.

Note in all cases it is the display projection module 122 that shall invoke based on identified changes in the state of real-world objects, users and AI Character's 94, the adjustment to external projectors 96 rotation, orientation (p,r,y), pan and tilt as well as their coordinates (x,y,z), where this shall interface with the device drivers for example of the actuators, motor servo's and motorised wheels to invoke these physical adjustments in the external projectors 96. This module may interface with the game server 88 and host 89 in the retrieval of state information of other objects to invoke these adjustments or may interface with the observer module 118 where based on updated mesh and surface data it shall invoke these adjustments in the external projectors 96 rotation, orientation (p,r,y), pan and tilt as well as their coordinates.

As an alternative method to the described spatial mapping technique, in the projection mapping and display of augmented reality virtual game images and video over real-world objects, the game server 88 or Host 89 may use a masking technique in which suitable software may be used to map the corners of the video or virtual images to the surfaces of the real-world object or space in the laser tag arena 98.

Here the game server 88 or host 89 may select a pre-rendered image or video generated by the rendering module 117 for the identified real-world object which has been created based on the spatial mapping described previous method or other means, which is then placed onto the surfaces of the object where the game server 88 or host 89 display projection module 122 software maps the corners of the image or video to the designated surfaces of the object.

In the next stage in the using of opacity templates the display projection module 122 software then masks the precise shapes and positions of the different objects or space surfaces, points and faces or elements. The image or video is then projected onto the real-world object or space using the external projector 96 which is capable of supporting 2200 lumens or greater. The projected image is projected relationally to that of the objects Cartesian coordinates in three dimensional spaces (x,y,z) and its orientation (p,r,y) among other variables, where the display projection module 122 software accounts for the where the object is placed in relation to the distance, orientation and world coordinates of the external projector 96 along with its lens specification and set up.

Alternatively, the game server 88 or host 89 may use a hybrid form of a projection augmented model, such as a spatial AR projected display, in which real world game objects, users, AI characters 94 and wearable items such as IR Mixed Reality Suit 93 are treated as advanced tangible media in which similar to described in the embodiments of this invention these real-world game objects can be physically interacted with causing a change in the state of the game which can be seen without the aid of the users wearable augmented reality ("AR") display apparatus 1 or visual aids through the use of AR projected displays.

The use of spatial AR in this case would comprise of the game server 88 or host 89 connecting with the external projector 96 via the network 97 where based on the captured three-dimensional model or mesh data by the observer module 118 or the display projection module 122 using the external camera(s) 95 or forward facing camera(s) of the real-world object, a virtual image image rendered by the rendering module 117 is then projected back by the display projection module 122 via the external projectors 96 over a real-world object or surface to create a realistic appearance of the real-world object but in a different form.

Here the games engine 124 and rendering module 117 would use the geometric, volumetric and three dimensional data in the form of a mesh and/or 3D model captured of the real-world object to construct a virtual 3D model which is geometrically and volumetrically the same as the real-world object. The rendered virtual-image or video of the objects different rendered texture-maps and surfaces generated by the Game Server 88 or host 89 rendering module 117 could then be augmented over the real-world object.

In yet a further embodiment of the presented invention herein, the game server 88 or host 89 may use structural light scanning techniques such as Laser interference or projection using incoherent light in which mounted specialist laser apparatus 108 that feature two wide planar lasers are used in the case of laser interference and in the case of incoherent light this uses specialist spatial light modulators 109 with the digital external projectors 96 and one or more external camera(s) 95 are used in the case incoherent light.

As depicted by FIG. 7, these specialist laser apparatus/laser planers 108 and specialist spatial light modulators 109 together with the external projectors 96 and camera(s) 95 may be located around the Laser Tag Arena 98 at specific different locations used to scan the three-dimensional real-world surrounding surfaces and objects to generate cloud points similar to how holograms may be constructed using cloud of points 3D models.

Using the captured mass of cloud points the game server 88 or host 89 games engine 124 is able to create virtual game objects representing objects in the real-world through the translation of cloud points to vertices, faces, polygons and surfaces etc. where the game server 88 or host 89 is able to invoke its rendering module 117 to generate virtual images which may be three-dimensional based models derived from the cloud points where the resulting virtual image or video from the constructed 3D model of an object is superimposed or augmented on a real-world object, by way of performing projection mapping, also referred to as video mapping and spatial augmented reality, via the external projectors 96 where similar to before the display projection module 122 software maps the corners of the image or video to the designated surfaces of the object, where the rendered 3D virtual image is projected back onto the original real-world object based on the objects original Cartesian coordinates in three dimensional spaces (x,y,z) and its orientation (p, r, y).

This may also be used to form Cloud of Points (CoP) similar to the described method of generating CoP Holograms from which a 3D model of a real-world object is formed out of triangles or polygons and a number of cloud points which are similar to vertices or model coordinates expresses as points on the three dimensional planes.

Here structural light scanning techniques may be used to generate the CoP in which through projecting a narrow band of light on the three-dimensional shape of an objects surfaces or space, this shall generate a line of illumination which is distorted in appearance from the other prospectives to that of the projector in which this can be used to determine the geometric structure of the shape of an object or surface based on the light section. Where the 3D coordinates of a real-world object or space is extracted based on the displacement of the stripes, in which for every point, face or surface of a real-world object or space a set of three dimensional coordinates may be captured which can be converted into vertices and model coordinates (x,y,z)

Using the captured geometric structure data of a real-world object or space in the form of three-dimensional coordinates the game server 88 or host 89 rendering module 117 is capable of reconstructing a wireframe or mesh and 3D model of the exact geometric structure, volume and shape of a real-world object or space in which each face or surface is represented as points of exact position as the real points of the object or space.

Using the reconstructed wireframe, mesh or 3D model of the objects or spaces, structure and volume, the rendering module 117 is also operable to then apply texture mapping and other surface materials, shading and lighting effects during the rendering process prior to the projection of the virtual image or video via the external projector 96 and supported by the display projection module 122 as a superimposed or augmented on a real-world object or space.

Furthermore, during the rendering process ray casting or other forms of rendering techniques such radiosity, ray tracing, volume rendering may be used as part of the rendering pipeline process in which the virtual images are then rasterised through a process of rasterisation and fragmented before being projected by the external projector 96 as an augmented and superimposed on the real-world object or space. Baking maybe used to optimise the rendering process.

The game server 88 or host 89 may also use its GPUs in this process in the hardware acceleration of the performing of the game and rendering operations. Here the determination of the position and display of the rendered image or video maybe also determinable by the use of three dimensional coordinates and other volumetric and vector variables provided by the observer module 118 as part of the spatial mapping data that may be provided in the form of a mesh or a 3D model or through the translation of cloud points into vertices/model coordinates.

During movements or changes in the state of real-world objects and surfaces, users, game objects or AI Characters an input handler 116 will notify the games engine 124 and rendering model 117 of the game server 88 or host 89 any changes observed in the real-world environment by the observer component 118 in which new or updated mesh, 3D model data or updated cloud points shall be provided to the games engine 124 and rendering module 117 for performing the rendering and mathematical operations of the game depending on the method used in the performing of performing projection mapping/video mapping and spatial augmented reality.

In each of the example methodologies given for performing projection mapping, also referred to as video mapping and spatial augmented reality using an external projector 96, this may be applied to any real-world surface such as wall at a specific maker point and depth.

It should be noted that each of the example methods detailed in the embodiments of this invention for performing projection mapping/video mapping and spatial mapping may be applied in the superimposing and augmenting of the game virtual images, sequences, animations, visual effects and lighting effects onto any real-world structure, space, surface, object, user, game object or AI Character in the Laser tag arena which may be seen without any wearable form of visual aid. In addition, users may interact via hand gestures, physical actions and other forms of input without any wearable form of visual aid.

It should be noted also that the previous detailed external camera(s) in conjunction with the use of two wide planar laser apparatus 108 in the form of a Laser interference system or use of the external camera(s) 95 independently through spatial mapping techniques maybe used to track changes in the real-world, which may serve as input in which changes in the state of the real-world could invoke a change in the projection of augmented scenes via the external projectors or a physical change invoked on via the clients of real-world game objects or AI characters which may be invoked by the game server 88 or host 89.

Furthermore, the use structural light scanning techniques such as the described projection using incoherent light in which mounted specialist spatial light modulators 109 with a suitable digital external projectors 96 and one or more camera(s) 95 are used around the laser tag arena 98, may be used to track changes in the real world which may serve as an input to the game server 88 or host 89 where this could invoke a change in the projection of augmented scenes via the external projectors 96 or a physical change in a real-world game object, or AI character invoked by the game server 88 or host 89. These methods of inputs may be used to detect user hand movements, facial recognition and may serve as other inputs such as physical body inputs through the use of say the users legs to kick a virtual-game object augmented scene, where forms of safe physical combat maybe supported by the system during game play between real-world users, real-world AI characters and virtual world AI characters in the scoring of virtual hits or kills.

For example, in addition to the mentioned usage the external camera(s) 95 located in the laser tag arena maybe used for facial recognition, gesture recognition of users and the tracking of the world coordinates as well as their model coordinates of objects, game objects, surfaces, users and AI Characters during the game play. This supports for example user's ability to interact directly with a real-world spaces, object, game object or device based on a detectable hand gesture from the external camera(s) 95, in which inputs are processed by the game server 88 or host 89 gesture recognition module 119, where these inputs this may invoke a action such as a change in the game sequence, the display of an augmented virtual image projected over the real-world space, object, game object or device that the user was detected to have touched.

The game server 88 or host 89 using the external camera(s) 95 could detect for example that a user has touched another object, and invoke a re-rendering of the virtual image of the object using its previously captured mesh and generated 3D model, where as a result of the user intersecting with the object the projected displayed image by the external projectors 96 may change.

Alternately via voice command users through use of the users augmented reality ("AR") display apparatus 1 microphones 8L, 8R or from the microphones 108 placed externally round the laser tag arena 98, the users can interact with a real-world object, game object or device, resulting in changes to the external projection of 3D augmented virtual images or video over a real-world object, game object, or device via the external projectors 96.

Here the game server 88 or host 89 shall process the voice input from the user and invoke corresponding action by the rendering module 117 to create a new game object or perform a transformation to an existing game object from which the image is then projected via the external projector as an augmented image superimposed over a real-world structure, space, surface, object, user, game object or AI Character 94 in the Laser tag arena 98. The user in this case maybe the user that provided the input or could be another user.

Furthermore, through the physical usage of real-world game objects and device such as the use of an IR Laser Gun Apparatus 47, where the user pulls the trigger mechanism 53, this can invoke the change in the rendered state and external projection of augmented virtual-images or video on a real-world object, game object, device, AI Character 94, user or their wearable IR Mixed Reality Suit 93, IR Mixed Reality Vest 92 etc. In which based on the detection of an IR Sensor being hit or an IR Laser Beam virtual game object intersecting with either of these, the game server 88 or host 89 may invoke via the rendering module 117 and external projector 96 the projection an augmented virtual-image or video scene to visualise the hit through applying diffuse lighting effects for example.

In this way augmented video and images over real-world objects, game objects, surfaces, spaces, users and AI Character's 94 can be triggered by the physical use of a real-world game object by a real-world user or AI Character 94 such as the pulling of the trigger mechanism 53 of an IR Laser Gun Apparatus 47, where physical actions by users or real-world AI characters 94 during a game can cause a change in the rendered and projected visual state of virtual world and the real-world of the game, which may be seen with or without the use of a wearable augmented reality ("AR") head-mounted display apparatus 1.

As a result of the cumulation of the various methods and usage of projection mapping, also referred to as video mapping and spatial augmented reality, combined with the described usage of the laser tag arena external camera(s) 95, external microphones 100 and the physical usage real-world game objects and devices as inputs into the game supported by the embodiments of this invention, this allows for a large proportion of the game play and visuals can be supported without the need for a wearable augmented reality ("AR") head-mounted display apparatus 1, to see the augmented visual effects or to provide inputs in the game which provides a novel and tangible form of mixed reality gaming.

It is intended however to combine these capabilities with the use of wearable augmented reality ("AR") head mounted display apparatus 1, since this provides additional capabilities beyond the capabilities of the user of external projection based technologies today. In addition, external projection doesn't necessarily provide every view point angle for viewing augmented reality imagery superimposed over the real-world view of the user from their field of view as such the use of wearable augmented reality ("AR") head-mounted display apparatus 1, provides for enhanced visual experience as per the disclosed in the embodiments of this invention herein.

One such example of the combined user of these capabilities of the game server 88 or host 89 using projection mapping and the previously described capabilities of the users wearable augmented reality ("AR") head-mounted display apparatus 1 is that the system shall supports the ability for users may interact with real-world objects for example via their wearable augmented reality ("AR") head-mounted display apparatus 1, using their front facing cameras 7R, 7L together with the gesture recognition module 30 to detect hand gestures which the devices client module 28 shall pass to the game server 88 or host 89 via the network 97. In which the game server 88 or host 89 may then invoke via their rendering module 117 and light display module 55 to change of the rendering of the augmented virtual image over the real-world object or surface which can be seen by the user without any visual aid via the use of the external projector(s) 96.

Conversely the system may operate in the other direction where based on hand gestures detected by the game server 88 or host 89 by the user using the external camera(s) 95 and its hand gesture recognition module 119 he game server 88 or host 89 may invoke a change in the state of augmented reality image displayed via the user's Micro-display 3, where hand gesture inputs are passed via the network to the client module 28 of the users augmented reality ("AR") head-mounted display apparatus 1.

It should be noted that here based on state information of the user's world coordinates maintained by the game server 88 or host 89 or through facial recognition via its external camera(s) 95, the game server 88 or host 89 is operable to identify the user and to establish via the network 97 a connection with its client for the passing of hand gesture inputs in the example given.

This intentional combined capabilities and flexibility is intended to provide an enhanced gaming experience in which multiple game states can coexist one on the local client of the users augmented reality ("AR") head mounted display apparatus 1 and another by the game server 88 or host 89 in which multiple game storylines and sequences can be played out sequentially causing changes in the game state of another.

In addition to the described methodologies used to generate three-dimensional geometric data of the real world objects, surfaces, spaces, users, game objects and AI Characters and their usage in performing projection mapping, also referred to as video mapping and spatial augmented reality this may also be used to generate global mesh data of the laser tag arena which can be shared with other clients.

These clients may include users augmented reality ("AR") display apparatus 1 in which the generated global mesh data may be used for example by the users augmented reality ("AR") display apparatus 1, in the rendering and display of augmented reality virtual images and video superimposed or augmented over the user's real-world view visible through their micro-display 3. Virtual images may be holographic, holograms or autostereoscopic among other forms.

As illustrated by FIG. 7 the laser tag arena also consist of pairs of external speakers placed one place on either left side of right of a walkway or space in the laser tag arena 98 which are used to provide in game perceptual based 3D sound effects and 3D sound effects in conjunction to the previous described use of external projectors 96 for augmenting virtual images over laser tag arena space, objects and building structures.

Here the game server 88 or host 89 shall support 3D positional audio/spatial audio, perceptual based 3D sound effects and 3D sound effects which can be heard with or without the need for a wearable augmented reality ("AR") head-mounted display apparatus 1, via the speakers of real-world objects and devices as described within the embodiments of this invention as well as via external speakers 101 in the laser tag arena 98 as shown in FIG. 7.

Here as described previously sound localisation technologies and techniques such as ILD, IID, ITD, IPDs and HRTFs etc. maybe used by the audio manager 121 of the game server 88 or host 89 in this process. In addition 3D spatial audio and Ambisonics techniques may be used by the game server 88 or host 89 in the providing of 3D sound effects.

Furthermore, the system may convert binaural recordings to stereo records or may convert binaural recordings, stereo, 5.1 and other audio formats used in the game to 8.1 in order to provide a real-time 3D sound experience. The system may use HRTF's to create 3D audio, or other techniques based on ambisonics and wave field synthesis principle to create 3D audio that is played back via the users handheld IR Shield Apparatus 90 and/or IR Proximity Mine Apparatus 91 speakers 214 or the external speakers 101 in the laser tag arena 98.

In this process the system shall process and convert the 3D coordinates (x,y,z) of the users handheld IR Shield Apparatus 90 and/or IR Proximity Mine 91 speakers or external speakers 101 in the laser tag arena 98 as well as the world coordinates of other real-world and virtual game objects together with events such as the pulling of the trigger mechanism on the IR Shield Apparatus 90 or an IR Proximity Mine Apparatus 91 to generate image inputs into the HRIR database to generate 3D sound effects, where the generated 3D sound effects shall be placed correctly on the three-dimensional plane relative to the IR Laser Beam projectile, the users position, the position of other real-world objects and virtual objects.

It should be noted here every real-world game object has an associated virtual game object in which one or more 3D audio component may be associated by the audio manager 34 of the device or users augmented reality ("AR") display apparatus 1, or by the audio manager 121 game server 88 or host 89. As the world coordinates (x,y,z) of the real-world object changes so too does its virtual game object. Here the virtual game object is hidden and not displayed to the user, but used in the computational operations for renderings, lighting effects as well as in the generating and assigning of 3D audio sound effects.

In addition, every real-world game object and other forms of remote clients have their state information passed via the network 97 to the game server 88 or host 89 that may be used as inputs into the HRIR database of the game server 88 or host 89 by its audio manager 121 from which 3D spatial audio or perceptual based locational 3D audio effects are generated and passed back via the network 97 to remote clients such as a user's augmented reality ("AR") display apparatus 1 and/or real-world game object such as an IR Shield Apparatus 90 for playback locally via their respective speakers.

Alternatively these 3D spatial audio or perceptual based locational 3D audio effects upon being generated may be transmitted via the network 97 to the respective external speakers 101, that are near to the locational coordinates (x,y,z) of the 3D spatial audio or perceptual based locational 3D audio effects and the relevant augmented projected 3D imagery or video via an external projector 96 within a 3D cell of the laser tag arena 98.

Within the various embodiments of the disclosed invention herein, it should be noted that the system is designed to supported a distributed computing model in which for example the observer module, collision module and rendering module together with the games engine could be run locally on the users augmented reality ("AR") display apparatus 1 or could be remotely on the game server 88 or host 89 dependent on where the processing for game graphics is performed.

Within another form of distributed model, the observer module and collision module may be run locally on the users augmented reality ("AR") display apparatus 1, but the games engine and rendering module may be run on a remote Game Server 88 or a Host 89 in which all the rendering is performed remotely based on user inputs passed back via the network by the devices client module 28 and video is provided back of the rendered game scenes.

Multiple instances could be run for local and global operations such as in the handling of local mesh, global mesh on the game server 88 or host 89 in which for every users augmented reality ("AR") display apparatus 1 a session may be initiated with the remote game server 88 or host 89 where mesh data is stored and processed centrally and subsequent rendered scenes based on updated mesh data from the local observer module 118 are provided as video over the network to the users augmented reality ("AR") display apparatus 1 for display via their micro display 3.

In this way processor, memory and storage needed on the users augmented reality ("AR") display apparatus 1 could be minimised to a thin client HW architecture reducing the amount of hardware processors, memory and storage required by the device to perform its functions.

Here the remote game server 88 or host 89 shall perform during the game the majority of the computational calculations in the processing of all inputs and outputs, as well as the rendering mathematical operations using their processing units 110, GPU, CPU and memory 111.

Alternatively, the augmented reality ("AR") display apparatus 1 could fully manage its game state and render the augmented images based on its own sensory data, locational coordinates and the relative data from other users augmented reality ("AR") display apparatus 1 in a peer to peer form of network gaming.

In the various supported configurations clients in a peer to peer network game may all receive inputs from each other or in a client to server configuration they may interface via the game server 88 or host 89 which shall maintain state information. In the case of peer to peer networked game the game state information and state information on each client is maintain locally, whereas in a client to server configuration the state of other clients is maintained always on the game server 88 and/or host 89.

The game server 88 or host 89 maybe a virtual private server hosted offsite in a cloud hosting service or may be dedicated hosting offsite, co-located with the gaming arena. The game server may also be a dedicated server that maybe paired with specific clients or could be a cluster of servers that serve multiple users.

Generally speaking there would be though a single authoritative server that would act as the source of truth for all event and state information that shall be responsible for running the main game simulation and performing computations for relational renderings over clients which interact with each other.

Clients may be simplified thin client like implementation in which the user inputs generated locally on the device are processed and forwarded by the client module to the game server 88 or host 89 for handling, where the game server 88 or host 89 would then execute the input commands.

The resulting output or data would then be transmitted back to the client invoking the display of augmented virtual images via the users Micro-display 3, our via a user's real-world game object devices surface display panel faces. Here the game server 88 or host 89 may perform the mathematical game operations in the handling of the input in which the resulting output could be list of vertices and faces for example to render a 3D image locally by the client, or maybe a pre-rendered image or video in which the client then simply displays the image or video.

Alternatively, no data may be passed back at all too the client in the case the resulting output is the display by the game server 88 or host 89 of augmented images or video through the use of the external projectors 96 and projection mapping/video mapping/spatial augmented reality techniques and or 3D mapping projection in which the images and video are projected onto the display surfaces of real-world objects seen without any visual aid.

Clients that are a physical object or device such as handheld IR weapon shall be registered by the game server as a real-world game object on the devices rendering module and/or games engine as well as on the game server 88 or host 89 rendering module 117 and/or games engine 124 in which for each real-world game object a virtual game object and 3D model of the object is maintained as an exact replica geometrically, with same physical attributes faces, vertices and services etc.

This will be marked or tagged as a physical tangible media type in which the handling of the rendering of the images over the surface display panel faces is handled in a different way to the normal display of 2D or 3D images on the user's micro-display 3 for example.

The Laser Tag Arena 98 is broken down into grid of triangles that represent the 3D structure, of its real-world surfaces, which is created through spatial techniques using the observer modules where using generated mesh data generated from captured images of the real-world from users augmented reality ("AR") display apparatus 1, cameras 7L, 7R, external cameras 95 and/or a real-world game object/device cameras or the cameras 134 on a real-world AI Character 94.

Each area of the grid may be represented by a 3D cell which a physical space of the laser tag arena 98 that has been recreated and mapped in 3D using spatial mapping where a virtual state of this physical space is maintained by the Game Server 88 or Host 89, in which individual augmented game scenes maybe applied using projection mapping/video mapping/spatial augmented reality and 3D projection techniques via the use of external projectors 96 located in each 3D cell around the laser tag arena.

In the projection of 3D scenes via the external projectors 96, bounding boxes may be applied to clip a scene so as the external 3D projection only falls on the physical area of the mapped real-world space to a 3D cell in the management and playback of 3D augmented scenes. This may use culling techniques for optimizing CPU efficiency and the number of draw calls.

The rendering of augmented scenes may also be rendered from different points of view for lighting, reflection, radar and shadow effects etc. in which transformations may be applied by the Game Server 88 or Host 89 according to movement of real-world game objects, users and real-world AI Character's 94 as well as virtual game objects, virtual AI Character's and remote users.

Decals may be used by the Game Server 88 or Host 89 to visualise scorch marks, hits on the surfaces of the walls, ceilings and floor of the 3D cell which may be seen by users without any visual aid where the Game Server 88 or Host 89 shall project decal visual effects via the external projectors 96 on to the real-world space of each 3D cell together with other lighting effects such as specular and diffuse lighting. Here decals may be rendered by generating an image of polygons and applying texture or texture map also referred to as a decal texture in which using real-world generated mesh data and 3D models these textures may be applied and augmented over the real-world surfaces and objects within a 3D cell.

Each 3D cell of the grid also has external cameras 95 used for spatial mapping and the producing of mesh data, 3D models etc. of the real-world space of the 3D cell by the Game Server 88 or Host 89 observer module 118 used to project augmented images, lighting effects, video and animated scenes or effects over the real-world space and its objects of each of the 3D cells using the previously detailed projection mapping/video mapping/spatial augmented reality and 3D projection techniques.

Each 3D cell also has external microphones 100, external cameras 95 for supporting hand gesture inputs, voice command inputs supported by the Game Server 88 or Host 89 gesture recognition module 119 and speech recognition module 127. Other forms of IR Sensors and detectors in the form of motion sensors 102 may be placed in each 3D cell of the Laser Tag Arena 98 grid, which may be used to detect physical motion or movements by real-world users, game objects and/or real-world AI character's 94 in which the detection of movement may invoke an action by the Game Server 88 or Host 89. Such actions may a change in the displayed augmented reality projected scene via the external projectors 96 or could be the creation of virtual game objects or AI Character's to bring the game to its conclusion in which the users IR Sensors can be activated causing the registering of hits, upon a collision detection of a virtual game object such as virtual plasma fire from a virtual AI Character or the firing of virtual weapon forms directly by the Game Server 88 or Host 89.

The Game Server 88 or Host 89 cam also invoke physical changes such as the activation of an IR Proximity Mine Apparatus 91. The Game Server 88 or Host 89 may also try to distort the user's senses by reversing the view of their world by superimposes and augmenting an upside down view of the world via the external projector 96 or via the users augmented reality ("AR") display apparatus 1. The Game Server 88 or Host 89 could also reward the user providing a visual of a virtual-game drop box in the form of a cube which through hand gestures detected via the external cameras 95 of the laser tag arena 98 and the Game Server 88 or Host 89 gesture recognition module 119 a user may interact and open the virtual box to receive a gifted ability such as those detailed with the embodiments the disclosed invention herein.

The game state maybe played out across the 3D cells or multiple games could be played in parallel in different 3D cells of the laser tag arena in which different augmented scenes may be displayed representing different worlds in the game.

Users may move around the Laser Tag Arena 98 and each 3D cell in which they have four dimensional perspective into the three dimensional world of the game where they can see parts of themselves such as their hands, body and legs, together with the real-world space and that of the virtual world space of the game in which game objects exists in both worlds.

Users have complete freedom of movement the same as in life where they can navigate along the Cartesian planes and axis of the three-dimensional space of each of the 3D cells of the laser tag arena 98 game during a laser tag game with a complete field of view or via the field of view from their augmented reality ("AR") display apparatus 1 where a user has one of these apparatuses.

Each 3D cell may have physical real-world elements in it such as real-world game objects, scenery, motion sensors 102, as well as real-world users and real-world AI Character's 94.

The Game Server 88 or Host 89 maintains the overall state information of each 3D cell together with the state of all real-world game objects, users and real-world AI Character's 94 as well as virtual game objects, virtual AI Character's and remote users in each of these 3D cells. Real-world game objects, users and real world AI Character 94 can move between the different real-world spaces and 3D cells of the grid of the Laser Tag Arena 98.

In the case of the user having an augmented reality ("AR") display apparatus 1, each user has a unique field of view (FOV), into the real-world and virtual world of the game, in which they have complete freedom of movement in six degrees of freedom or greater where they can navigate along the Cartesian planes and axis of the three-dimensional space of the game during a laser tag game.

The virtual camera provides the users perspective and FOV into the virtual world and augmented reality view of the game. The users augmented reality ("AR") display apparatus 1, camera(s) 7R, 7 L may be used representational in the game computation of virtual camera.

The game virtual camera(s) may be based on the user's height, the position of the user's field of view or line of sight from either left and right eye to provide a true first person camera perspective, in which as the user rotates their body the perspective and view into the virtual world and that of augmented-reality scenery of the game changes accordingly the same as naturally the users view into the real-world changes when a user moves around a three-dimensional space. This is supported by applying transformations to the virtual game objects as required to change the virtual game objects scale and rotation relative to the users real-world location, rotation and field of view into the virtual world.

The position of the virtual camera(s) may be adjusted automatically through transformations in the game computations based on the head tracking data on the users head position in term of the head height from the ground, the users head orientation expressed as (P,R,Y) pitch, roll and yaw and their three dimension Cartesian coordinates etc. as six dimensional or greater matrixes representing the users vector or head position and orientation.

This may also be based on the eye tracking data, in which the head and motion tracking module 29, eye tracking module 32 provide to the rendering module 27 the tracking data of the user in the form of six dimensional matrixes representing the users head position (x,y,z) and orientation (p,r,y) in the relative three dimensional space of the game based on real-world sensor inputs from the users augmented reality ("AR") display apparatus 1, sensor(s) 9. Other variables such as the users walking or running speed maybe combined with these other stated variables used in the mathematical operations and real-time transformation process against virtual game objects using the sensory inputs from the sensor(s) 9 of the users ("AR") display apparatus 1, in which the user and head tracking data is supplied a plurality of sensors including tachometers, speedometers, gyroscopes and accelerometers.

The system using variables such the rate of acceleration, head position and orientation may predetermine a user's moves in which the system may assume the user shall move by default at a rate of say 2 m/s and that the users head height and the position of the virtual camera(s) shall remain at 180 cm off of the ground for example which may be stored as part of the user default settings for each user during a laser tag game. This may be used as a method of optimising the rendering pipeline and reducing latency.

The rendering module 27 is capable of using this tracking data to perform the mathematical operations of the game such as transformations using matrix multiplications to make adjustments in the scale and rotation for example of virtual game objects as the users moves freely within the three dimensional space of the game, in which these virtual game objects appear augmented over the users real-world view seen through their micro display 3 and that of their field of view in to the virtual world of the game provided by the virtual camera.

In addition the tracking data is also provided via the network to the game server 88 or host 89 which may invoke a change in a real-world object by invoking its local rendering module to change its rendered surface texture mapping for example based on a detection of a real-world users head coordinates being in proximity to that of the real-world object. This real-world object may be for example, a handheld IR shield Apparatus, IR Laser Gun Apparatus, AI Character which is tangible and physical in presence in the real-world and in which has capable image display rendering surface screens displays or meshes covering part or all of the objects visible surfaces.

Here via the network 97 the game server 88 or host 89 may invoke the local rendering client of the real-world game object to render and display via its display surfaces a new texture map to highlight an objects position which may be seen by the naked of eye of the user with or without their augmented display apparatus.

In addition, the game server 88 or host 89 could invoke as part of the game application logic the initiating of a live real-world game sequence in which the AI Character may perform a sequence in the game where they physically move towards or engage in combat using their IR Laser Gun Apparatus 47 in order to bring the laser tag game to its primary conclusion or objective where there is only one remaining player or winner.

Conversely dependent on whether the user local client interfacing with the real-world object locally via the WiFi connection or bluetooth, this could invoke the same outcome where the game is a peer to peer style network game or simply that the game server 88 or host 89 has given authority to the local client or in face the local client of the users augmented reality ("AR") display apparatus 1, for example is the designated host 89 for the game so has inherent authority to invoke such an event or action.

Note the rendering pipeline is the sequence in which for example the system generates 3D models based on a list of vertices and their vectors which are represented by points or vertices on the three dimensional Cartesian axes and planes, defining the height, length and width of a shape in which the faces of an object references the vertices and shapes that make up a complex 3D model. The rendering pipeline also refers to the steps which translate the represented 3D model of an object into a 2D image which can be displayed on a 2D screen such as that of the users Augmented Reality Display 1.

In this process several steps may be performed in which the 3D model is assembled based on the vertices and triangle shapes of an objects, this then goes through a process of rasterization in which the 3D generated model and image is converted into a 2D pixel image. During this process texture maps may also be applied either to the 3D generated model before rasterization or afterwards as 2D textures on the converted 2D image. Other processes such as vertex shading, geometry shading, and fragment shading maybe applied.

During this process a vertex buffer maybe also be used as a data structure to maintain all the vertices that shall be rendered using a vertex array to be processed by the games engine 77 that may use the devices GPU in this task. This data may also be provided to the vertex shaders in the calculation of the projected position of each vertex on to the screen and other operations such involving colour. The vertices may also be transformed into triangle forms by the vertex shader to form the geometric shape of a 3D object or 3D scene in which the vertices are grouped. These generated 3D models and 3D scenes are then transformed into pixels during the rasterization process in which the generated 3D image maybe clipped to represent the view of the user from their micro display screen 3 for example.

A fragment shader may also be used in the final stage following rasterization in which the pixel fragments are processed by the fragment shader to provider final pixel colour values which gets written into a frame buffer as the final output of the rendering pipeline before the result 2D stereoscopic image is displayed. It should be noted that this process two differing 2D stereoscopic images are generated in which these images are slightly offset from differing angles to provide differing images for the left eye and right eye in which the users brain then perceives the image as having 3D form through the previous process of stereoscopy described herein.

The system may perform for example multiple mathematical operations in the performing of the rendering pipeline in which this may use several transformation matrices in the process. Furthermore, during the computational operations of a game and the resulting projected display of the 2D stereoscopic images for example, several matrixes may be used.

For example, matrices may be used in the transformation of game objects from one point in three dimensional to another point or the transformations of the game object such as the rotation or scaling of a 3D model resulting from a user's hand gestures or change in their head position or orientation.

Matrixes may be used also in the translation of the game's real-world coordinates and virtual world coordinates in the computation of changes of real-world game objects and virtual game objects which could be used in the computation of collisions by collision manager 78 where real-world game objects can intersect on the coordinates of virtual game objects that can result in a computation of a collision response which may change the state of the virtual game object and vice versa.

Matrixes may also be used in the translation of a game object from world coordinates in the virtual world, to that of the screen space and in the projection of 3D images as described in the example of perspective projection.

These matrixes used by the system can thus be categorised as model matrix, world matrix, view matrix and project matrixes in which these form the process of moving an object in three dimensional space, performing transformation functions such as scaling an object, the transformation of a game objects 3D model world coordinates to that of to view space representing the virtual camera's point of view and the users field of view, and finally the translation of an 3D model to a 2D image in which the pixels and fragments end up displayed on the user's screen in which subsequent clipping and scaling operations may be performed to map the converted 2D image to the display screen.

In addition, real-world game objects can have 3D coordinates, world coordinates and model coordinates the same as virtual game objects except these coordinates may be based on actual real physical dimensions of the object and position in the real-world, relative to that of the virtual world in which changes in the coordinates maybe invoked by a physical action by a user in the real world resulting in transformation for the purpose of computational maintaining state information on the real-world game object where its mesh, 3D model and world coordinates of the real-world relative to the virtual world may be updated.

A key difference here is that transformations to changes in the real-world objects shape, model coordinates or world coordinates maybe invoked by a physical action by a user in the real-world not like a typical transformation of virtual game objects in the virtual world.

The exception to this is AI Characters that are physical present in the real world in which transformations can be performed to their virtual game object and to the AI Character to invoke a physical change in a real-world AI Character 94 in the real world such as change in movement of the AI characters body, arms, head, legs, hands or position in the three dimensional space of the game may be invoked by the games application or games engine through the use of transformations. In the process 3D coordinates are generated through transformations, that may be invoked by the AI itself, the Game Server 88 or Host 89 as part of the games programming in which the movement of the virtual game object and model are applied to the real-world AI Character 94, or by a user remotely controlling the real-world AI Character 94 through their own hand gesture movements or voice commands, are converted to joint coordinates/movements.

Another example of the user of transformations is in the case where a real-world game object/device has a displayable surface in which transformations may be applied by its own games application/client module or games engine and rendering module to invoke a change in the rendered textured images that is then displayed on the real-world object surface display panel faces.

This applies to changes in the renderings over the user's real-world game objects such as the IR Laser Gun Apparatus 47 or IR Shield Apparatus 90 as well as other physical objects such as real-world AI Characters 94 which are physical in presence in the real-world, where their respective games application/clients modules and collision managers or games engines may invoke a change in the rendered display images on the surfaces of these objects.

This may as a result of a change in the state of the real-world object, a hit or collision being detected with another object, or an event in the game logic and scene in which game scenes or visual effects of other virtual game objects such as or shading could be rendered over the surface display panel faces of the real world objects. Depending on the source the change as per these use cases the actual invoking of the change may come from the objects own modules such as their game application/client module, rendering module, collision manager or games engine instance or it could come from the Game Server 88 or Host 89

Conversely the projection of IR Laser beam from a user's IR Laser Gun Apparatus 47 as a result of a user pulling the trigger mechanism 53 could invoke transformations on both real-world and virtual world game objects in which virtual imagery, visual lighting effects and shading may be projected as augmented images over these objects in sequence with the moving projection of the IR Laser beam fire based on the IR Lasers Beams virtual game object projectile or line rendering vector position and directional vector.

In the case the object is a virtual object or a real-object that is not a real-world game object but inanimate object such a chair, wall or table etc, these moving animated augmented imagery and lighting effects over these objects may be seen via the users augmented reality ("AR") display apparatus 1, micro display 3, in which transformations and lighting effects are applied to the generated mesh data and 3D models of these objects in this process to generate this imagery and visual effects.

Here the game engine 34 may apply transformations and lighting models in this process to simulate on specific surface materials the reflection of light using models such as the Lambertian reflectance model used to simulate the reflection of light with specific material properties; or Gouraud shading model to simulate diffuse and specular lighting effects on each 3D model using lighting methods such as per-vertex lighting and Phong shading also referred to as per-pixel lighting.

Alternatively, the Blinn-Phong lighting model may be used in which ambient lighting, emissive, diffuse and specular may be applied. Here lighting effects may be light that is reflected based on both the angle to the light and the angle to the viewer, in which users headtracking information and eye tracking from their eye tracking module 32 and head and motion tracking module 29 in terms of the user's head and eye orientation and positions may be used to apply transformations.

In the case of the object being a real-world game object that is moving object such as real-world AI Character 94 or an IR Shield Apparatus 90 or a user wearable IR Mixed Reality Suit 93, that features surfaces display panel faces around its structural or body surfaces, the moving animated augmented imagery and lighting effects may be seen via surface display panel faces of these objects using the same detailed transformation and lighting model examples. For example, reflection of light, diffuse and specular lighting effects as well as the others listed previously could be used together with the virtual imagery of the animated moving IR Laser beam in which these rendered effects can be seen over the surface display panel faces 57L, 57R and 57 of the real-world game object for added visual effect.

This is supported by the previously detailed by the use of a virtual game object and virtual 3D model of real world game objects, wearables and real-world AI Character's 94 in which transformations and lighting are applied first to these objects paired virtual game objects, meshes and 3D models where the resulting output images are mapped to each of the corresponding surface display panel faces of these objects that forms a real-world polygon based mesh and 3D model as detailed in the embodiments of each of these objects.

This applies to all real-world game objects such as an IR Shield Apparatus 90, as well as real-world AI Character's 94 and user wearables such as IR Mixed Reality Suits 93 or IR Mixed Reality Vests 92 that feature a rendering module, game application/client module, games engine and surface display panel faces. In addition, the projected moving IR Laser Beam maybe seen via the users augmented display apparatus 1 with that of real-world objects which come in near proximity to the moving IR Laser Beam, in which the based on using a calculation of triangulation the system shall render effects over the passing surfaces of real-world objects as the IR Laser Beam passes the object.

In the same manner as detailed in all these use cases the display of the IR Laser Beam and relational lighting effects are based the IR Beam projectile in terms of its origin and directional vector together with its model coordinates or line width (in the case of a line rendering technique being used) relative to that of the model coordinates, world coordinates and orientation of the faces of virtual objects and real-world game objects in which transformations and lighting effects are modelled according to accurately show the visual effects of the moving IR Laser Beam projecting over the textured surfaces of these objects and their 3D models using the methods detailed herein.

In addition, it should be noted in this modelling process that for real-world game objects such as an IR Laser Gun Apparatus 47 or IR Shield Apparatus 90, as well as real-world AI characters 94 and user wearables such as an IR Mixed Reality suit 93 that this process is done in real-time where transformations are applied every time the world coordinates (x,y,z) of these objects, or their orientation, their directional heading/direction vector, or their state changes.

These changes are captured by the sensors and client modules of these devices and passed to their respective rendering modules and game engines to support this capability. In this way unlike conventional traditional computer games, the user's physical interactions and uses of these real-world objects in the real world invoke this process of transformations and lighting modelling processes to occur, rather than say the move of a mouse or pressing of key pad to move a user avatar on screen. Here if the user runs to another room, turns, jumps, kicks or throws a real-world game object this can invoke this process in which this provides a very different form of gaming where the game exists in the real-world and the virtual world as an enhanced mixed reality experience where the significant part of the game and its objects have tangible form in the users real-world in which they can physically interacted with.

In this way the use of real-world game objects such as IR Laser Gun Apparatus 47 may affect the display of both augmented virtual game objects and that of the display surfaces of real-world game objects in which the user can see moving projectile fire of the IR Laser Beam and can see visually the effect of this on other objects whether real or virtual based on a formulation of the laser projectile and 3D coordinates at the point of the user pulling the trigger, its velocity and the relative world coordinates of other objects as well as their model coordinates and other variables.

This is an example of the many ways in which the presented embodiments of the invention herein enables physical actions in the real-world to effect the virtual world and vice versa in which a heightened mixed reality gaming experience is provided greater than that of the present virtual reality or augmented reality systems provide in which the game is played out both in the real-world and virtual world where transformations across both worlds in which the game seamlessly exists between both worlds.

This extends far beyond the basic moving of a real-world object in which augmented scenery may be updated, but in which the use of a real-world game object directly provides inputs into the game in which this affects the virtual-world and its objects the same as if the real-world and virtual worlds existed in time and space as one in the game thus providing a unique mixed reality gaming experience in which actions in both worlds affect one another.

It should be noted that the system detailed herein and all forms of displaying augmented imagery, lighting effects is capable of supporting all forms of lighting effects in which a light source maybe any form of detailed real-world game objects, users, AI Character's 94 as well as virtual game objects 106, virtual AI character 105 or remote user 107 supported by the respective devices local rendering modules and games engine as well as the Game Server 88 or host 89 rendering module 117 and games engine 124.

Light sources from either of these real-world objects or virtual objects may be applied to each other in the lighting computational operations, rendering and display of game imagery and scenes seen via the device surface display panel faces directly or via the users augmented reality ("AR") display apparatus 1, micro display 3 or via the external projectors 96.

This process uses the real-world coordinates (x,y,z), orientation (p,r,y) and model coordinates of real-world game objects, users, AI Character's 94 as well as the world coordinates (x,y,z), orientation (p,r,y) model coordinates corresponding virtual virtual game objects 106, virtual AI character 105 or remote user 107 to apply the described lighting models during these detailed rendering and display operations of augmented virtual images and lighting effects. Similar to ray tracing, the reflections of light sources of these types of real-world or virtual objects can be seen on each other effecting their colour, brightness and shading etc.

It should be noted that light sources may also be scenery that maybe real Mixed Reality Scenery 99 or maybe virtual augmented game scenery displayed via the device surface display panel faces directly or via the users augmented reality ("AR") display apparatus 1, micro-display 3 or via the external projectors 96.

These maybe defined as coordinate (x,y,z) form of ambient light, colour and an projection orientation into the three-dimensional space alike to a directional vector in which the light is cast in a determinable direction.

Moving virtual scenery game objects such as a virtual-image and virtual game object depicting for example a Sun, Planet, Moon or Star maybe time bound in which their coordinate (x,y,z) and orientation (p,r,y) together with the direction of the light changes over time that maybe seen dynamically over real-world objects and virtual objects. In which as well as the lighting effects dynamically changing with the movement or change imposition (x,y,z) or orientation (p,r,y) of real-world game objects, users, AI character's 94 and virtual game objects 106, AI character's 105 or remote users 107 relational each others light sources and that of other fixed scenery light sources, light effects may be dynamically displayed relational to the moving position (x,y,z), changing orientation (p,r,y) and directional lighting of moving scenery game objects over time which are another dynamic source of lighting.

Like all other forms of lighting effects these moving dynamic light sources maybe dynamic which can be seen over the display surface panel faces of real-world game objects/devices such as an IR Shield Apparatus 90 or real-world AI Characters and user's wearable devices such as an IR Mixed Reality Suit 93 or IR Mixed Reality Vest 92. Alternately they may be seen via a user's augmented reality ("AR") display apparatus 1 micro display 3 as augmented over the user's real-world view on objects and surfaces or projected via the use of the external projectors 96 onto real-world objects or surfaces by the game server 88 or host 89 which may be seen without any visual aid.

Where virtual objects are projected externally via the external projectors 96, these dynamic as well as static light sources maybe displayed over their virtual imagery. This detailed functionality and use of the described previous lighting models is supported also by real-world game objects/devices, wearable devices, real-world AI character's, users augmented reality ("AR") display apparatus 1 and the game server 88 or host 89 via their respective GPUs, rendering modules and games engines.

One example of a rapid moving light source in an IR Laser Beam in which its light-emitting source moves at the velocity and projectile of the IR Beam which can be seen rapidly moving over display surface panel faces of real-world game objects/devices, wearables such a user's IR Mixed Reality Suit 93, or through the micro display 3 of a user's augmented reality ("AR") display apparatus 1 or projected as a moving 3D image and lighting effect via the external projectors 96 in the laser tag arena upon a user pulling the trigger of their IR Laser Gun Apparatus 47 for example.

Where here the light source is the subsequent generated virtual game object or line rendering of the IR Laser beam for which the direction of the light source and its moving coordinates (x,y,z) is based on the formulated origin (x,y,z) and projectile (directional vector) based on the IR Laser Gun Apparatus 47 orientation (p,r,y), world coordinates (x,y,z) and directional vector at the time of the trigger mechanism 53 being pulled. This is also based on a formulated velocity, distance and other factors such as the relational position (x,y,z) and orientation (p,r,y) of the faces of other real-world objects and virtual objects at the time of the IR Laser beam passing those objects. The colour of the IR Laser Beam lighting components attributed to the virtual game object or line rendering also effects the modelled and formulated lighting and the subsequent displayed lighting effect on other real-world objects or virtual objects as detailed.

This is also dependent on the lighting model used by the system whether models such as the Lambertian reflectance model or Gouraud shading model or Blinn-Phong lighting model are used.

It's important to note that these lighting effects are based on the actual model coordinates also of real-world objects and virtual objects, in which every real-world object including real-world game objects such as an IR Laser Gun Apparatus 47 or a wearable IR Mixed Reality Suit 93, or a real-world AI Character 94 has a paired virtual game object and 3D model used in the computational rending and lighting operations detailed herein where as these real-world objects move, transformations are applied to their paired virtual game object and 3D model in which the they are rotated or scaled for example, during this process lighting is also re-modelled using the lighting models detailed herein were the resulting changes are then visible to the user through the three main display methodologies supported by the system.

These supported display methodologies include the use of display surface panel faces of real-world game objects/devices, wearables such a user's IR Mixed Reality Suit 93 and/or real-world AI Characters 94, or through the micro display 3 of a user's augmented reality ("AR") display apparatus 1 or projected as 3D image and lighting effect via the external projectors 96 using the previously detailed projection mapping/video mapping/spatial augmented reality and 3D projection mapping techniques.

Returning to FIG. 2 in reference to block diagram shown, the following embodiments describe the method in which real-world observations of new surfaces and objects are made during a laser tag game using the users ("AR") head-mounted display apparatus 1 camera(s) 7L, 7R and the method in which renderings are applied to real-world surfaces and objects as augmented images displayed over user's field of view into the real-world during a game.

The following core components the Observer module 25, rendering module 27, Collision Manager 26, games engine 35, game application 36, head and motion tracking modules 29, hand gesture recognition module 30 and the locational tracking module 31 are central to the described method in the spatial mapping and rendering of augmented reality scenes over the users view of the real-world real-time as users moves around. The following embodiments describe the method in which these functional components are used in this process.

The method in which real-world observations of new surfaces and objects are made makes use of the user's augmented reality display device 1, camera(s) 7R, 7L, sensor(s) 9, the observer module 25, the rendering module 27 and other components of the system as shown in the block diagram of FIG. 2. The following embodiments in addition describe the method in which updates to real-world surfaces and objects captured within the user's field of view from the camera(s) 7R, 7L, and handled resulting from changes to existing identified surfaces and objects as the users moves around the three dimensional physical space of the laser tag arena or game environment in the real-world.

In the handling and identification of new real-world surfaces and objects the game application 36 shall request mesh data on the real world via the observer component from the users augmented reality display device 1 using the camera(s) 7L, 7R to capture images or video frames of the real world environment and surfaces from the users respective left and right approximate field of view.

Upon receiving an API request on its listening port the observer component 25 shall invoke a callback with the users augmented reality ("AR") head-mounted display apparatus 1, to check the state of the real-world surfaces and objects in which using spatial mapping techniques mesh data containing volumetric and depth information is generated for new identified real-world surfaces through processing images generated by the camera(s) 7L, 7R which represent the users approximate field of view.

New surfaces and objects of the real world environment are then identified from the images or video frames and added to the system for which a new vector entry is created together with a new game object for all new identified surfaces and objects by the observer component 25.

The observer component 25 shall also generate a detailed three dimensional wireframe and depth map of the users real-world view using the images or video frames captured by the users camera(s) 7L, 7R. This is then used by the observer component 25 to generate volumetric and depth information which is used to represent the relative three-dimensional space of the real-world in which the depth and distance of real-world surfaces and objects relative to the user position and Cartesian coordinates of their augmented reality ("AR") display apparatus 1 are formulated using sensor inputs from the users sensors 9 and depth sensors.

Distances and depth may be visually represented in the wireframe through the use of different colours in which red for example represents real-world surfaces that are up to two meters away and green is up to 1 meter away which may be used by the games engine and games application.

Volume and three-dimensional cartesian coordinates on relative axis information are also generated by the observer component 25 based on the observations of the new identified real-world surfaces and objects vertices. Volume shall be definable by the observer component 25 as different shapes such as sphere where a real-world object for example maybe circular of another shape form suited to the identified surface.

The rendering module 27 and games engine 35 shall then be informed that the mesh data and corresponding game object is ready for bake by the observer component 25 through a call back or responding JSON type message.

The games engine 35 shall then populate the game objects relating to the identified new surfaces in the real world with a unique surface ID, a mesh filter, anchor value and a specified level of detail to be used in the rendering and 3D model level of detail to be generated by the system that is expressed by the number of triangles in the mesh to be used.

The games engine 35 shall also set the appropriate properties for collision detection with other game objects or the user inputs such as hand gestures as per its programmed logic and code. Within the collision detection physics, properties shall define the attributes of the surface to be used in the collision detection computations of the game object with other game objects or user inputs such as hand gestures.

Based on the priorities for baking the new identified surfaces and the mesh level of detail defined by the application, the observer module 25 shall generate a mesh, mesh filter for generating a 3D model.

Here specific areas of the user's real-world view around say an identified object such as table could be prioritised over surfaces in this process. Once the surface has been baked and a new game object has been created with mesh filter and mesh data, the rendering module 27 may ray cast on the new surface identified and the game object at a specified layer on the axis plane.

Materials or Texture maps which maybe 2D textures are then applied to the real-world surfaces and objects using the generated 3D models and mesh data in which a texture image is mapped or applied to the surfaces of the shape or polygons of the new game object and 3D model where the resulting draw calls are made.

This process is applied to each of the prioritised surfaces and their respective 3D models and mesh, in which game objects relating to the prioritised surfaces may form a virtual element of a larger augmented scene of the game in which 2D textures are applied to each of the surfaces to form a complete scene.

The rendered 3D scenes are then converted into 2D stereoscopic images and the corresponding differing 2D stereoscopic are displayed via the users augmented reality ("AR") display apparatus 1 in the respective left and right side of the micro display 3, simultaneously within the user's field of view of the real-world objects and surrounding surfaces giving the perspective to the user's brain that the displayed images are present in the real-world and have 3D form.

Returning briefly to FIG. 1A, the augmented reality ("AR") display apparatus 1 during this process the light display modules 5R, 5L control the display of rendered images or video in which the resulting pixels of the separate two 2D stereoscopic images or video frames are illuminated respectively on each of the two display screen portions 2R, 2L of the micro display 3 to form a virtual image that has 3D form and which is augmented over the user's real-world view.

During the rendering process the system uses identifies based on the head tracking and location data, the user's three dimensional cartesian coordinates and the user's orientation in terms of the pitch, roll and yaw expressed as (P,R,Y) of their augmented reality ("AR") display apparatus 1, the position and orientation of the users field of view relative to the real-world the objects and surfaces position and orientation in three dimensional space. The positioning of surface texture mappings on virtual game objects for a scene are then adjusted according during the transformation process in which the game objects may be scaled or rotated for example. This is controlled through manipulating the vectors of the game objects and through matrix multiplication, in which six dimensional matrixes or greater may be used in the computations and mathematical operations by the GPU or CPU during the rendering of game objects as augmented scenes to make adjustments in real-time relative to the user's movements.

As described the six dimensional matrixes representing the users head position and orientation are generated from data outputs provided by the sensor(s) 9. Together with the related mesh data and 3D models generated by the observer component 25 from recorded images and video from the camera's 7L, 7R, the six dimensional matrixes representing the users position and orientation are used to the render the virtual game objects and scenery accurately over current real-world objects and surrounding surfaces relative to the users current position, head orientation and focal point or line of sight in the three-dimensional space of the game.

This allows computationally for the system to formulate the users relative position in three dimensional space to that of other users, game objects and the virtual world of the game, which maybe used combined with the mesh data and 3D models of the real-world to accurately render virtual images over real-world objects and surfaces relative to the users position.

For example a user may have a Cartesian coordinate position of X=0.11, Y=0 and Z=0.16, together with a pitch, roll and yaw value of P=0.3, R=0.2 and Y=0.1 along respective axes that provides six degrees of freedom of movement to the user in the three dimensional space of the game, in which the system shall render according the virtual game object in three-dimensional space at a specified Cartesian coordinate position and orientation relative to that of the user's head position and orientation where the virtual game object could appear on a different x,y,z coordinate but the same orientation as the user in which the object is facing the user.

This allows user to freely move their head and body around the virtual game environment of the laser tag game environment and laser tag arena 98 as shown in FIG. 7, in which they can change their position by moving forward or backward, moving left or right along three perpendicular axes of the three dimensional Cartesian coordinates represented as X, Y and Z as well as having the freedom of movement to change their head orientation through rotation on a second three perpendicular axes referred to as the yaw the normal axes, pitch the lateral axes and roll as the longitudinal axes, where the system shall perform transformations to the virtual game objects of the augmented game scene according to change the virtual game objects rotation and scale for example according to the users movements in three dimensional space.

It should be noted that for every new identified real-world surface or object this may be given a physics attribute such as mass that may be used in the computational and mathematical operations for collision detection of a virtual game object such as 3D holographic AI Character or a 3D holographic laser beam projection of the IR laser beam with another object, in which the game application 36 and games engine 35 shall use these attributes to apply accordingly changes to the virtual game object upon a collision be detected.

Where it may be defined the mass of the game object of the real-world object is greater than that of the virtual object as such the virtual object shall not as result change the state or move the paired virtual game object of the real-world related rendered game object as a result of a hit. This may be determined with support from the devices collision manager 26.

In addition, baking may be used as form of optimisation in which algorithmically fewer draw calls may be made based on the level of detail defined by the games application for the mesh and 3D model in terms of the number of triangles specified, which may be beneficial in complex scenes which have may surfaces and game objects. In addition, the texture mapping detail to be applied on the 3D model.

The described method in which real-world observations of new surfaces are made and renderings are applied to real-world surfaces and objects during a game, may be performed in real-time at a rate of up to 60 frames per second for example using modern rendering techniques such as displacement mapping, multipass rendering occlusion rendering, reflection mapping, mipmaps, normal mapping, height and bump mapping along with other forms of rendering techniques.

In addition, near-photo realistic real-time 3D renderings and the corresponding display of differing 2D stereoscopic images via the users augmented reality ("AR") display apparatus 1 may be achieved through a reduction in the number of draw calls needed, the number of triangles or polygons and operations thus reducing the number of mathematical operations needed by the GPU, CPU processing units 11 and/or rendering module 27 to construct a game 3D scene.

Furthermore, texture maps and 3D models of the real-world surfaces that the observer has already processed may be pre-rendered and cached where this is held in memory by the system in which when a user moves or walks into the same area of the game in the real-world this pre-cached rendered data may be used to accelerate the process. Where the position or orientation of the user's augmented reality head mounted display may differ from previous times the system may simple process updates to the rendered scene by performing transformations to change the rotation and scale for example of an existing surface game object through a manipulation of the vectors thus the overhead in computations will be reduced comparable to that of generating a 3D model and mesh data for an entirely new number of surfaces together with new game objects. Here multi-dimensional matrixes may be used to support this type of operation.

The cached existing rendered surfaces, game objects and scenes maybe cached locally in the memory 18 of the users augmented reality ("AR") display apparatus 1, or may be stored remotely on another game server 88 or host 89 which may be accessed by the users augmented reality ("AR") display apparatus 1 or other users augmented reality ("AR") display apparatus 1 devices over the network 97, during the game in which the system is capable based on the users Cartesian coordinates of identifying the relevant cached surfaces, game objects, texture maps and 3D models.

Alternatively, in a peer to peer networked game of laser tag, each user's Augmented reality ("AR") display apparatus 1 may cache existing rendered surfaces, game objects and scenes of the real-world locally in the memory 18 for which this may be made available to other users augmented reality ("AR") display apparatus 1, during the game. Cached surfaces, game objects, texture maps and 3D models may also be stored on a user's companion device such as a mobile phone, tablet or other forms of personal computing which may be accessed via the network 97 during the game.

After rendering new identified object surfaces, the game application 36 shall periodically call via a well defined API of the Observer component 25 the users augmented reality ("AR") display apparatus 1, for updates on changes in the real-world surfaces, in which new surfaces may be added or existing surfaces updated or removed as the user moves around the real-world.

It should be noted that each game object and surface has a unique ID that allows continuity in the rendering of highly detailed and complex in game scenes over real-world surfaces during a game sequence. In addition based on priorities the games application 23 can call specific IDs for surfaces status in order to reduce the operational overhead on the observer component 25, rendering module 27, games engine 35, GPU, CPU, and the other parts of the system.

During the display of a game objects rendered as a virtual 3D image over the user's real world view, the display drivers and system libraries for the users augmented reality ("AR") display apparatus 1 micro display 3, may be used by the light display modules 5L, 5R to control the display of corresponding pixels of the virtual image on the users display portions 2R, 2L, according to the addressable positioning of the pixels as provided by rendering module 27 which may be provided in the form an in-memory bitmap or RGB array for example that is written to the frame buffer of the display and then processed by the light-display module 5L,5R.

Alternatively, the rendering module 27 may make a draw call to the games engine 35 or directly to the display where pixels may be displayed using arrays containing the RGB colours of the used to draw the pixels directly onto the user's Micro-display frame-by-frame, where the draw call invokes the light display module 5L, 5R and display drivers to illuminate the corresponding LEDs for example to that of the pixel coordinate and colour.

This may follow the process of rasterisation and fragmentation, where the 3D image generated by the rendering module 27, in the form of vector based shapes is converted into a raster image (pixels or dots) for output on to the micro display 3. The rasterised image may then be fragmented and then written to the frame buffer of the Micro-display 3, screen portions 2R, 2L in which each display screen portion has a different addressable pixel area.

Here where the image being projected may be stereoscopic, there may in fact be two differing 3D image sources or one 3D image from which two differing offset generated 2D stereoscopic images are generated visualising the 3D object a slightly differing angles in which a left image is addressable to the left screen portion 2L, and the right image is addressable to the right screen portion 2R.

Consequently, two differing 2D stereoscopic images or video frames, shall be displayed respectively on each of the two display screen portions 2R, 2L of the micro display 3, to form a virtual image that has 3D form and which appears augmented over the user's real-world view and 3D to the user.

In this process the rendering module 27 shall instruct the display device drivers and light display modules 27A, 27B on the pixel position expressed as a coordinate i.e. (x,y) on the micro display 3 surface for each image and its respective screen portion 2L,2R, the colour of each pixel and any line positions or shape boarders for which pixels should be displayed on together with any fill properties as required to display of each of the 2D stereoscopic images of the game object via a well defined pixel draw and display API set of calls or via the use of an RGB array loaded into the frame buffer directly for example.

The rendering module 27, shall also address accordingly the right or left side proportion of the display module in which the pixels for the 2D stereoscopic images are to be displayed so as the two differing 2D stereoscopic resulting from the 3D renderings appear displayed in the correct portion of the micro display 3 corresponding to the users left and right side field of view as required in order that the users brain then perceives the image as having 3D form.

The display driver shall then illuminate each pixel based on the given position and the corresponding pixel drawing API calls from the rendering module 27, following which the two 2D stereoscopic images or video frames, shall be displayed respectively on each of the two display screen portions 2R, 2L of the micro display 3, to form a virtual image that has 3D form and which appears augmented over the users real-world view accordingly.

Where a method of ray casting is used the rendering module 27 may instruct the device drivers 36 and Light Display Module 5L,5R on the display of the pixel by way providing a pixel value for the colour of a game object at a point of intersection required. Here the colour value may be determined by the texture map applied to the surface or object and may be defined by an illumination factor.

The exact positioning of the pixels and the corresponding projected light may be determined based on inputs from the game application 36 together with inputs from the head and motion tracking module 29 on the users relative orientation (p,r,y) and vector position/world coordinate (x,y,z), relationally to the game objects, in which the rendering module may apply transformations such rotations or scaling to maintain the correct perspective in accordance with the user's head movements. The rendering module 27, may use the game engine 27 and GPU in this process.

For example, this may also be determined based on a computation or mathematical operation performed by the games engine 35 using the GPU and CPU in such operations such as the performing of a transformation of a game object in which a game objects scale maybe increased during a game for example as a result of a change in the position of a user, their head position and orientation or their eye position and gaze direction using inputs from the devices head and motion tracking module 29 and eye tracking module 32.

Alternatively, the positioning maybe based on inputs from the Collision Manager 26 based on a computation of a collision detection of a user's hand gestures or another virtual game object with that of a real-world object or surfaces corresponding game object suing physics variables such as mass and velocity.

Here the positioning of the projected light and pixels on the micro display 3, is relational not just to the user's position or orientation but also to the position of other game objects. Returning briefly to FIG. 3, if we consider a three-dimensional cube made up of 6 2D squares or 8 points in which the adjacent six squares on the face of the cube all share the vertices, which would be otherwise 24 points. In 2D this cube shape can only be seen from one position at a time, in which only three faces shall be visible thus the system needs to know which faces of the cube are face which direction.

This can be determinable by the order in which the faces references each of the vertices is provided to the GPU, in which vertices are processed if using the right-hand cartesian coordinate system where the positive angular direction is counter-clockwise, then the vertices may be assumed to be counter-clockwise also, in which the first set of vertices represent and faces reading from counter-clockwise represent the front face of the cube and the back facing one is determined by its vertices being in the clockwise order.

In each described variations of the embodiments of this invention for the optional rendering and display of IR Laser Beams and other in game visual effects which may be seen augmented over the users real-world view seen by the naked eye without visual aid via Projection mapping techniques used by the game server 88 or host 89 or directly on the surface display panel faces of real world game objects as specular lighting effects for example or seen through their augmented reality ("AR") display apparatus 1, this uses vectors.

Vectors, are the main component in the mathematical calculations for lighting effects that proceed the handling of an objects vertices normally in the graphics pipeline process. These vectors can be thought of a s a point located at infinity. They can also be used to define a direction of an object referred to as a directional vector or the colour of the polygons according to the angle they face the light's direction.

Vertex are also referred to as Vectors that represent a set of values that denotes a position or a direction in three dimensional or two dimensional space, i.e. (2,1,0) would represent a vectors homogeneous coordinates.

With vectors it should be noted that you can have positional vector representing a point in three-dimensional space from the origin as three values of x,y,z, or you can have a directional vector that represents the direction of an object in three-dimensional space.

These directional vectors are used in the light calculations, where for example based on the vector position of the generated rendered line or IR Laser Beams virtual game object's triangles and polygons to that of the position of other objects, this may change the appearance or brightness of objects that are nearer to the projectile in which the IR Laser beam is traveling. For example, an objects brightness and their colour may change according to the angle they face relative to the lights direction of the moving IR Laser Beam.

Here the GPU may be used here to calculate the distance of the vectors from lights to objects and from objects. Lighting calculations maybe used add changes in brightness to virtual 3D game objects as well as real-world game objects in a manner that mimics real-world lighting conditions.

Specular lighting effects may be supported by the GPU used to highlight changes in lighting from other moving virtual game objects or real-world game objects relative to that of the users IR Laser Gun Apparatus 47, or IR Shield Apparatus 90 or the users head position and orientation for example. This could be used to highlight a passing moving object.

Here the use of specular lighting shall depend on the position of the IR Laser Gun Apparatus 47, as well as the direction of light and orientation of the object in which the light source emanates. For example, an IR Laser Beam may be shown to bounce off a material that is reflective at a determinable angle based on the geometric structure of the surface.

Objects that have mirror-like properties may cause effects such as reflection and glare to be displayed. Conversely in the case of diffuse lighting the light of IR Laser Beam hitting the users IR Laser Gun Apparatus 47 or any other type of real-world game object presented herein, may be visually show as scattering in multiple directions equally.

Here in the detailed use of diffuse and specular lighting all of the transformations and lighting calculations maybe performed by the GPU. Lighting is a key step in the 3D pipeline supported by the rendering module of each real-world game object and user wearables such as the augmented reality ("AR") display apparatus 1 as well as the game server 88 and host 89 in the use of the external projectors 96 when displaying lighting effects as augmented images mapped over real-world objects and surfaces using projection mapping/video mapping or spatial augmented reality techniques.

This provides high visual impact which enhance the realism of a scene and bringing rendered images one more step closer to our perception of the real world, particularly in the case of rendered images displayed on real-world game objects surface display panel faces 57L, 57R, 57 such as the IR Laser Gun Apparatus 47, in which a static image would draw away from realism.

The angle of the lighting can be defined by the virtual-game object being the source of the lighting in which as the virtual-game object of the IR Laser Beam moves along the three dimensional space of the world space of the game, its light may be projected or bounced off of other objects that are virtual or real world objects using 3D projection in the case where the real-world object has no display or direct draw and rendering of lighting effects on the surface of a real-world object in which that object has the means to render and display images.

In the case of virtual game objects generated as a result of pulling the IR Laser Gun Apparatus 47, Trigger mechanism 53 the rendering process takes inputs in the form world coordinates or a positional vector (x,y,z), creates one or more virtual objects (depending on whether line rendering method is used) which represent the moving IR Laser Beam in three dimensional space.

Based on moving directional heading/directional vector of the IR Laser Beam line or virtual game object based on the formulation of the projectile of the IR Laser, the rendering module shall then render a 3D model of the of the object and in which a lighting element or component is then added to the virtual game object.

As the IR Laser Beam projection moves across a line in three-dimensional space each client module and rendering module of each real-world game object shall then apply lighting effects such as diffuse and specular representing the light direction and colour of the virtual game object of the IR Laser Beam as it passes other objects a specular lighting effect may be seen in which the colour and brightness of the appearance of the renders texture maps on the surface display panel faces of these real-world game objects as the IR Laser Beam passes may appear to change in brightness and colour based on their relative three dimensional coordinates.

It should be noted that the same visual effect could be shown via the users Augmented Reality ("AR") display apparatus 1 using mesh data and 3D models to apply lighting effects as an augmented virtual image over the users real-world view via their micro display 3, via the external projectors 96 using projection mapping/video mapping or spatial augmented reality techniques.

In this example given though this is showing how based on the know state of a virtual game object or a rendered line being an IR Laser Beam, in which the positional coordinates/vector position (x,y,z) of the rendered line or virtual game object of the IR Laser Beam is retrieved via the network from the game server 88 or host 89 by the real-world game object devices client module, the local rendering module of real-world game object devices such as IR Laser Gun Apparatus 47, IR Shield Apparatus 90 etc. shall invoke the rendering and display directly of lighting and shadowing effects resulting from a passing IR Laser Beam.

This is same in the case of a hit where lighting effects may be shown as diffused lighting, directly on the surface display panel faces of the real-world gaming object, or via the users augmented reality ("AR") display apparatus 1, Micro-display 3 as an augmented over the user's real-world view or via the use of the external projectors 96 using projection mapping/video mapping and/or spatial augmented reality techniques.

In the case of the collision manager detecting a near miss specular lighting may be used. In both cases the actions of the user in the real-world has created an object in the virtual world simultaneous with the creation of the IR Laser Beam and in the same projectile, coordinates, direction as each other in relative three dimensional space.

This new virtual game objects is formulated to move in the same direction, projection and velocity as the real-world IR Laser Beam in which the lighting source of this virtual game object then can effect other virtual game objects which are in the same near vicinity in the three dimensional space of the game where effects such as diffuse and specular lighting can be seen through the users augmented reality ("AR") display apparatus 1 dependent on the position of the other virtual game objects, the users head position and that of the moving IR Laser Beam virtual game object in the relative three dimensional space of the game in which the lighting visuals appear augmented over the user's real-world view. This may be augmented over real-world objects, users, AI Characters as well as may be seen over virtual game objects, users and AI characters.

Geometry of reflection and refraction of light rays may also be used in the generation and display of visualised lighting effects directly on the surface display panel faces of a real-world gaming object, or via the users augmented reality ("AR") display apparatus 1, Micro-display 3 as an augmented over the user's real world view or via the use of the external projectors 96 using projection mapping/video mapping and/or spatial augmented reality techniques.

In addition, the use of the external projector 96, may be used to simulate light, shadows, and other visual effects, where a Projector maybe a component that projects a material and textures onto other game objects, which may be attached to IR Laser Beam virtual game object, or line rendering virtual game objects. A far clip plane maybe applied to ensure that the light only hits the surface of other game objects and doesn't go through. This may be applied in all cases where the lighting, shadowing and other visual effects are displayed directly on the surface display panel faces of a real-world gaming object, or via the users augmented reality ("AR") display apparatus 1, micro display 3 as an augmented over the user's real-world view or via the use of the external projectors 96 using projection mapping/video mapping and/or spatial augmented reality techniques.

It should be noted that the animated virtual game object of the IR Beam/IR Laser Beam or its Line Rendering can also invoke renderings and lighting effects on real-world objects, users, AI characters that may seen without the aid of users augmented reality ("AR") display apparatus 1, by the users naked eye with no visual aids as projected using 3D projection or direct rendering on display. This uses state information of the coordinates (x,y,z) and orientation (p, r, y) of real-world objects, users, AI characters relational to the moving IR Laser beam virtual-game object or Line Renderings position or three dimensional coordinates in the virtual world to formulate the lighting effects.

This maybe based on a formulation of the world coordinates of user, objects, AI characters, the user own directional vectors/FOV in terms of the virtual camera usage for prospective projection, the position of other objects that may also be light sources in the case of these lighting effects, shadowing and other visual effects being displayed alternatively via the users augmented reality ("AR") display apparatus 1, Micro Display 3.

Each of these display methods is based on the coordinates (x,y,z) and orientation of real-world objects, users and AI Characters as well as virtual game objects, AI Characters and remote users which is provided by each client module or every real-world game object, AI Character and wearable device such as the users augmented reality ("AR") display apparatus 1 or IR Mixed Reality Suit 93, via the network to the game server 88 or host 89. This is used for example in the displaying of augmented rendered virtual images of the IR Laser Beam over the user's real-world view seen through their Micro-Display 3 or directly on the surface display panel faces of a real world game objects by the local users augmented reality ("AR") display apparatus 1 rendering module 27 to simulate light, shadows, and other visual effects on to other objects and vice versa where other objects may have a lighting component for example associated with them.

It should be noted that real-world game objects, users and AI Characters have an associated virtual game object, mesh and 3D model which is used in the computational lighting operations effects detailed herein, in which lighting effects, shadows and other visual effects may be displayed as virtual images augmented over their surfaces via the users augmented reality ("AR") display apparatus 1, or displayed directly on the surface display panel faces of the real-world game object, AI Character or user (in the case of the user is wearing an IR Mixed Reality Suit 93 or IR Mixed Reality Vest 92.

Alternatively based on associated virtual game object, mesh and 3D models of real-world game objects, users and AI Characters along with the mesh data and 3D models other objects and surfaces in the real-world these lighting, shadowing and other visual effects maybe projected on to their surfaces using projection mapping/video mapping and spatial augmented reality techniques with the use of the external projector by the game server 88 or host 89 in which these visual effects may be seen without any visual aid.

For example, multiple real-world game objects, users and AI Characters may provide their real-world coordinates via the network to the game server 88 or host 89 which may be used in the display of a virtual game object of the IR Laser Fire from a user's virtual weapon or forms or real-world IR weapons such as a IR Proximity Mine Apparatus 91 real-world game object, in which the game server 88 or host 89 may invoke the rendering and display of augmented IR Laser Beam animated image or other weapon fire over real-world objects using the external projectors 96 which may be seen without any visual aid.

It should be noted here that the game server 88 or host 89 is capable of performing spatial mapping without the users augmented reality ("AR") display apparatus 1, in which using mesh, geometric and volumetric data of the identified real-world objects and surrounding surfaces, users and/or real-world AI Characters 94 generated by its observer module 118 through the user of the external cameras 95 and its rendering module 117 to render virtual images based on this provided mesh and surface data, the Game Server 88 or Host 89 is capable of projecting rendered augmented virtual images, visual lighting effects and shadows over the surfaces of real-world objects and users.

This could be used for example in the display of visual effects of the users IR Laser beam at the same projectile, velocity and direction as the IR Laser Beam was fired from a user's IR Laser Gun Apparatus 47 in which the game server 88 or Host 89 Rending Module 117 uses Line Rending techniques or the other described techniques for formulating the origin (start vector position), and the directional vector of the animated IR Laser Beam based on the users IR Laser Gun Apparatus 47 coordinates (x,y,z), orientation (p,r,y) and directional heading/directional vector at the time the user pulled the trigger mechanism 53.

The resulting projected animated image of the IR Laser Beam is visible by the naked eye without any visual aids in terms of a wearable augmented reality ("AR") display apparatus 1. The collision manager of the real world game object/device or user wearable device such as IR Mixed Reality Suit 93 or a real-world AI Character 94 that was hit may work with the rendering module 117 on the game server 88 or host 89 in performing this process in which collision responses as a result of a hit may invoke the re-rendering of the surface texture mapping of a real-world object to show diffuse lighting effects or decal effects such as scorch marks based on the hit or collision position (x,y,z). This could also be invoked by the collision manager of the Game Server 88 or host 89.

Alternatively where the IR Laser Beam is formulated based on its projectile and directional vector (x,y,z) to that of the vector position (x,y,z) of other objects or users to be passing the virtual game objects or real-world spatial mapped scenes, or a user or an AI Character, the rendering module 157 on the game server 88 or host 89 may invoke the display of specular lighting in which the light is simulated to bounces off of the surfaces of objects or users.

Specular lighting may be used here to highlight a real-world object, user or AI Character moving into the range of an IR Laser Beam prior to a potential hit on the object if user or the object, user of AI Character moves relative to the light source.

As another embodiment of the presented invention real-world objects, users and AI Characters also retrieve real-world coordinates via the network to the game server 88 or host 89 for direct surface rendering in which diffuse or specular lighting effects maybe be applied to the surface displayed rendering on their surface display panel faces which shall be visible to the naked eye of the user.

Similar to previously described this is based on the world coordinates or positional vector (x,y,z) of the real world users, objects and AI Characters relative to that of the IR Laser Beam virtual game object or Line Rendering projectile and direction in the three dimensional space of the game.

As before upon the user pulling the trigger mechanism 53 of the IR Laser Gun Apparatus 47, this shall be based on the registering of a trigger event, generate a virtual game object or Line Rendering of the IR Laser Beam, in which the system users the IR Laser Gun's coordinate position, P, R, Y to formulate the projectile direction of the IR Laser Beam accurately to that of the Real-world IR Laser Beam and of equal velocity in which the velocity is a known entity. Here the trigger event together with six dimensional matrixes of the users IR Laser Gun Apparatus 47 representing its coordinates x,y, z and pitch, roll, yaw (p,r,y) as well as the direction vector (representing the forward facing optical lens and outward direction of IR Laser Beam into the real world and that of the virtual world), together with physical data such as the assumed velocity the game server or host 89 shall generate a moving virtual game object or Line Rendering of the IR Beam/IR Laser beam.

Using the coordinates of the real-world objects the game server 88 or host 89 may notify all other registered clients that maybe real-world users, game objects, or AI characters of the coordinates (x,y,z) and directional vector of the projecting IR Laser Beam of the triggered event in which collision detection is being tracked.

Here Client Modules of users augmented reality ("AR") display apparatus 1, real-world game objects, AI Characters and other wearable devices may register or subscribe using a form MQTT or another form of messaging protocol for any updates on the coordinates (x,y,z) and directional vector of projecting IR Beams/IR Laser Beams resulting from the use of an IR Laser Gun Apparatus 47, IR Shield Apparatus 90 and/or IR Proximity Mine Apparatus 91.

These clients shall then maintain state information on the projecting IR Laser beam and shall periodically poll the game server 88 or host 89 of any changes in the virtual game object or Line Rendering state of each IR Laser Beam, in which its model and world coordinates may have intersected with another object.

In the event of a collision detection being detected the local clients shall invoke the rendering of a hit in which in the case of the hit being on a real-world user this may invoke multiple actions including the rendering of lighting effects such as diffuse lighting effects on the physically displayed surface mapped texture mapping of the users wearable IR Mixed Reality Vest 92 or IR Mixed Reality Suit 93 in which the effects can be seen by the naked eye.

Here the rendering of augmented virtual image, decal effects and visual lighting effects showing diffuse lighting effects as the IR Laser beam hits the users body is formulated in precise timing and space to hit the user based on determination of the collision position on the users hit box or model coordinates and the time in which the hit occurred based on the projectile velocity of the IR Beam/IR Laser beam formulated by the collision manager of the users wearable IR Mixed Reality Vest 92 or IR Mixed Reality Suit 93, which is shown in real-time.

Alternatively, the display of the virtual imagery, decal and visual lighting effects such as the diffuse lighting effects could be invoked as a result of the real-world IR Laser Beam triggering the users IR Sensor, in which based on the IR Sensor position the collision point (x,y,z) could be determined and the position of where the IR Beam/IR Laser Beam hit could be precisely mapped and displayed on the users wearable IR Mixed Reality Vest 92 or IR Mixed Reality Suit 93 at the time the IR Sensor first detected the IR light emission from the IR Beam/IR Laser beam for example from another user IR Laser Gun Apparatus 47.

Alternatively, the display of the visual effects of diffuse lighting effects as the IR Beam/IR Laser beam may be seen through the users augmented reality ("AR") display apparatus 1, where the visual effect is show as an augmented virtual image over the user's body without the need to display the imagery via the user's wearable IR Mixed Reality Vest 92 or IR Mixed Reality Suit 93.

As before based on the determined collision position (x,y,z) the virtual imagery, decal effects and diffuse lighting effects may be precisely placed or superimposed over the mesh of the user's body for where the hit occurred in which these visuals maybe see through the user's micro-display 3.

In addition, as the user moves their body transformations could be applied to ensure that the placement of the hit remains relative to the position on the users mesh in which the collision point occurred, where the users augmented reality ("AR") display apparatus 1, observer module 25 may update the mesh to reflect a change in the shape of the user's body and the Rendering Module 27 shall map the collision position to that of the changed position of the user's body to maintain the correct perspective for where the hit occurred from an IR Laser Beam.

When a trigger mechanism 53 is pulled an event is registered that invokes the rendering of a virtual image of the IR Laser Beam in the same projectile and direction as the user fired the real IR Laser Beam from their IR Laser Gun Apparatus 47, using real-world three dimensional coordinates expressed as points on x, y and z together with the orientation of the IR Laser Gun Apparatus 47 expressed as pitch, roll and yaw (p,r,y) captured from the devices sensors 51 at the time that the trigger mechanism 53 was pulled together with other variables such the directional heading of the device that may be expressed as a directional vector.

These coordinates together with other variables are supplied by the client module 74 of the IR Laser Gun Apparatus 47, via the network 97 to the rendering module 27 and collision manager 26 of the users augmented reality ("AR") display apparatus 1 in the form of a six dimensional matrixes or greater.

A boolean flag may be assigned upon pulling the trigger to determine if it is fired or not. In addition the system may store an array of the laser beam fire each with different world and model coordinates each containing their own unique projectile x,y,z coordinates and pitch, roll and yaw values based on the relative position and orientation of the IR Laser Gun Apparatus 47 together with is directional heading, captured from its sensors 51 for a given time when the user pulled the trigger mechanism 53.

These sensor readings are provided by the tracking module 80 and client module 74 of the IR Laser Gun Apparatus 47 via the network 97 to the users augmented reality ("AR") display apparatus 1, in which these inputs may be handled in the code of the game application and client module 28 used in the handling of repeated of repeated laser fire and the rendering and display of augmented 3D projectile fire via the Micro-display 3, based on the users movements of their IR Laser Gun Apparatus 47 and its position and orientation at the time of each fire.

Here the client module 28 shall pass this data to the rendering module 27 for the rendering of the virtual images of the IR Laser beam and any lighting effects, in which this shall create a new virtual game object for every IR Laser Beam that is fired and render its image according to its individual projectile/trajectory which is based on the supplied world coordinates (x,y,y), the orientation (p,r,y) and directional heading of the IR Laser Gun Apparatus 47 at the time of the trigger mechanism 53 being pulled, in which the direction of the IR Laser Beam and its angle may be formulated based on this data together with other variables such as distance, velocity, gravity etc.

Here transformations maybe applied to the rendering and display of augmented 3D projectile fire of each of the IR Laser Beam fires, based on the user's head tracking and eye tracking data from their augmented reality ("AR") display apparatus 1 head and motion tracking module 29 and eye tracking module 32, in which the position of each projected and displayed augmented 3D projectile fire of each of the IR Laser Beam fires in its appearance to the user in the three dimensional space of the real-world remains relative to the users head position and orientation as well as their eye movements.

Just the same as the example given in which a user can walk around a table which has an augmented virtual image of an object placed on it, in which the system maintains the correct perspective of the object viewed from different angles by the user, here the system shall do the same with that of the projected moving IR Laser Beam through performing transformations such as scaling and rotation to 3D model and game object of the projected moving IR Laser Beam.

Relationally 3D perceptional sound is also maintained in state with this, where if a user fires their IR Laser Beam then moves to the left or right the audio effects are manipulated through a process of emulating the biological mechanisms of binaural hearing, by the user's audio manager 34 using the same applied transformations or resulting changes in the image coordinates and orientation etc. of the IR Laser Beam in which the IR Laser Beam augmented image can be viewed from different angles by the user from left or right and the 3D sound effect can be heard directionally towards the right and left conversely.

Here both the 3D sound effect and the rendered augmented image of the IR Laser Beam remains relative to its original origin (x,y,z) and projectile coordinates x,y,z in which the IR Laser beam is projected along from its originating three dimensional coordinates and point of origin from where the user pulled the trigger mechanism 53 using the previously described perceptual based 3D locational audio sound location methods supported by the Audio Manager 34.

This may use the previous detailed perceptual based 3D locational and 3D spatial sound effects techniques such as ITD, IID, IPD, ILD, together with HRTF functions, where based on the input image coordinates in three-dimensional space of a real-world objects and its paired virtual game object in to a HRIR database, the sound waves may be processed and manipulated to achieve perceptual 3D audio localisation of objects in which a user perceives the audio coming from a specifiable location in three dimensional space. This can be applied to both real-world game objects and virtual game objects.

During this process the rendering pipeline is invoked by the rendering module 27 in which a virtual game object is created for each fired IR Laser Beam and the rendering module 27 shall invoke draw calls to render the 3D image of the IR Laser Beam.

The 3D image may then be rasterised and fragmented. The resulting fragments are then used during the fragment processing stage by the fragment shader to generate pixels assigning them their final colour that gets written into the frame buffer which holds the value of each pixel that is then drawn to the users augmented reality ("AR") display apparatus 1, micro-display 3.

A sequence of the images or video may be provided as output from the rendering pipeline as an animation of the moving IR Laser Beam in which transformations may be applied to scale the virtual game object as it moves further away in relative three dimensional space to of the user, in which the further away the IR Laser Beam is the smaller it appears.

Here perspective projection techniques shall be used to show that the further distance of the IR Laser Beam to the coordinates of the user and their field of view the smaller the virtual game object of the IR Laser Beam appears. This provides additional realism and depth cues where, the camera's position, orientation, and field of view are used to control the behaviour of the projection transformation during the rendering and display of the IR Laser Beam over the user's real-world view. It should be noted that the camera here being referred to is that of the virtual camera and users view into the virtual world of the game. This maps to the users real world view as previously described to provide a fourth dimensional perspective where users head and eyes look into the virtual world of the game augmented over their real-world view.

The virtual images of the IR Laser Beam may be converted in this process and displayed as two differing 2D stereoscopic images, or 3D holograms or holographic image before being displayed on the users augmented reality ("AR") display apparatus 1, micro display 3. Multiple virtual game objects of the IR Laser Beam may be generated where there are multiple users with multiple augmented reality ("AR") display apparatus 1, in which each one shall adapt the moving augmented projected image of the IR Laser Beam to different users field of view and gaze based on the individual the head and eye tracking data of each user which shall invoke each of the users local rendering modules 27 to perform transformations to maintain the correct viewing perspective of the IR Laser Beam projectile along the x,y, z axis/planes of the three dimensional cartesian coordinates and angle on the p,r,y axis/planes relational to the original coordinates in which the trigger was pulled, to that the users moving head and eye coordinates as well as orientation in terms of their view into the real-world and virtual world of the game.

As an alternative methodology to the detailed method of using a single game object per IR Laser Beam, a Line Render maybe used to animate the line of the IR Laser beam being drawn, in which the animated line is a represented as two points in three dimension space, the origin (point A) and destination (point B) in which three game objects are created.

Here the same as previously detailed use of the Line Render maybe invoked by the use of the user IR Laser Gun Apparatus 47, trigger mechanism 53, in which upon the trigger being pulled by a user the client module 28 for the paired users augmented reality ("AR") display apparatus 1, shall invoke an script or code to generate in three game objects, one representing the origin (point A), another the Liner Render and a third representing the destination (point B) for where the line ends.

The origin maybe based on the three dimensional cartesian coordinate and position or vector position of the IR Laser Gun Apparatus 47, at the point of the trigger mechanism 53 was pulled represented as values for x, y, z.

The third game object representing the destination expressed may also be represented by three dimensional cartesian coordinate and position or vector position (x,y,z) for where the line ends.

The destination may be derived based on the determination of collision point expressed as a vector position (x, y, z), or may be formulated based on the range of the IR Laser Beam projection of the IR Laser Gun Apparatus 47, which is dependent on the device set up which could be 200 meters for example. This destination end point maybe dynamically updated where a user or object for example could move into range on a position/coordinate on the line in which a collision may then occur.

Multiple coordinate inputs may be input into the point of origin of the IR Laser Beam including rotation expressed as another set of x,y,z values which are based on the orientation of the IR Laser Gun Apparatus 47, in terms of its pitch, roll and yawl (p,r,y); scale expressed as a further set of x,y,z values in which a set of starting "x,y,z" values and end "x,y,z" values maybe entered as a range of decreasing values where scaling is performed as a transformation to show a perspective projection of the IR Laser Beam, where the further away the object is the smaller the IR Laser Beam virtual image appears.

Other variables may be input into the Line render, that may be used in the drawing of the line including the Line draw speed which is the speed at which the line is rendered which maybe relative to the velocity of the IR Laser Beam as well as the distance of the line, which is relative the range of the IR Laser Beam.

When the adding the Line Render to the second game object, materials and shader types such as a particles additive shader and colour may be specified for the IR Laser Beam animated image such red or green. A drop texture file material can apply to the line also.

The devices orientation captured from the IR Laser Gun Apparatus 47, sensor(s) 51 maybe used in the values entered for rotation. The devices orientation together with its directional vector may also be used to formulate the directional heading of the IR Laser Beam and angle of projection used in the rendering of the line. Alternatively, this may be derived from the starting point (origin) and end point of the line (destination) by formulation.

The use of a Line Render may be supported by means of a script or code which may invoked in the animation process of the IR Laser Beams as augmented virtual image over the user's real-world view seen through their augmented reality ("AR") head mounted display apparatus 1, micro display 3, or in the animation of an IR Laser beam projected via the external projector 96 by the game server 88 or host 89 in which virtual images and lighting effects are projected over the surfaces of real-world objects and surfaces using projection mapping/video mapping or spatial augmented reality techniques.

The Line Render script or code may be invoked by the physical action of when a user pulls the trigger mechanism 53 of their IR Laser Gun Apparatus 47 in which a script in the form of Java or other forms of script languages or code such C#maybe used to send a create "Draw line" call via the network 97 as a result of the trigger being pulled, to the games engine 35 and rendering module 27 of the users augmented reality ("AR") head mounted display apparatus 1 or that of the game server 88 of host 89 depending on the method used to display the virtual image of the IR Laser Beam.

The script of code maybe part of the Client Module 74 implementation on the IR Laser Gun Apparatus 47. Within the "Draw line" call this may contain an origin (starting point for where the line should start), expressed as a vector position (x,y,z). This may be based on real three dimensional Cartesian Coordinate or vector position (x,y,z) of the IR Laser Gun Apparatus 47 provided by the devices sensors 51 and device tracking module 80, at the time of the trigger mechanism 53 being pulled, which may be provided via the devices client module 74 over the network 97 to the games engine 35 and rendering module 27 of users augmented reality ("AR") head mounted display apparatus 1 or to the game server 88 or host 89 Respective games engine 124 and rendering module 117.

The origin represents where the real-world IR Laser Beam originated form which forms origin (start point) of the first game object. Other x,y,z values for rotation, scale and directional vector may be applied to the first game object, in which rotation maybe based on the users IR Laser Gun Apparatus 47 orientation (p, r, y), and the direction vector may be based on the directional vector of the users IR Laser Gun Apparatus 47 provided by the devices sensors 51 and device tracking module 80.

These values maybe combined with the positional vector to formulate the angle of the projectile of the IR Laser Beam in the rendering of the Line. A new game object is then generated for the origin based on the devices three dimensional Cartesian Coordinates or vector position together with other supplied values by the Games Engine 35 and/or rendering module 27 of the users augmented reality ("AR") head mounted display apparatus 1, or the game server 88 or host 89 respective games engine 124 and rendering module 117 depending on the selected display method for the augmented image of the IR Laser Beam being externally projector via the external projectors 96 or displayed via the user's micro-display 3.

Within the "Draw Line" call a second game object is generated for the Line Render element in which in the second part of the script or code this details the Line Draw Speed, Line Distance, and Line Width etc. Here draw speed refers to the rate at which the IR Laser Beam and line should be rendered and displayed which may be derived from the velocity of the real-world IR Beam.

A third game object is then generated as the destination end in which maybe formulated based on the projectile of the IR Laser Beam, the range of the user IR Laser Gun Apparatus 47 in terms of its distance. A line is then draw by formulation based two elements the start point (the origin) and the end point the destination, together with the other provided variables.

Where the resulting animated IR Laser Beam is displayed via the users augmented reality ("AR") head mounted display apparatus 1, micro display 3 as a series of augmented 3D holographic images or holograms or differing 2D stereoscopic images or video provided to either eye via the waveguides 22L, 22R superimposed over the users real-world view in which the users then perceives the moving animated IR Laser Beam as having 3D form and as being located in the real-world where the moving animated image is displayed in the exact same coordinates and rate of velocity as that of the moving real-world IR Laser beam.

Alternatively depending on the selected method for displaying the animated images or video the IR Laser Beam may be display as projected augmented animated image over real-world objects and surfaces using via the external projector 96 by the game server 88 or host 89 using its projection mapping/video mapping or spatial augmented reality and 3D projection capabilities of its display projection module 122 which may be seen without any visual aid by the user's eyes.

It should be noted this draw line script or code for handling the draw calls using a Line Render used in the rendering of an animated IR Laser Beam may have both a create function and an update function, since during the projection of IR Laser Beam an object may intersect or collide within any of the positions along the line of the IR Laser Beam in which a hit could occur. As such the update function of the script or code may occur per frame.

Specific to the script or code detailed create Line Render function call, this may contain a GET Component call for a Line Render, in which the following private variables may be applied; a reference ID for the Line Render variable which is reference to line render and its associated real-world IR Laser beam being drawn; a Float as counter used as an incremental value to render an animated image of the moving IR Laser Beam and distance.

Other public variables such as a Transform Origin, which is the vector origin for where the rendering module should begin drawing line based on the vector position/3D coordinates (x,y,z) of the IR Laser Gun Apparatus 47 at the time of the trigger mechanism 53 being pulled; a Transform Destination which is the end point (x,y,z) for where the IR Laser Beam and rendered line shall end; a public Float that defines the Line draw speed controls how quickly line is drawn and therefore how quickly the moving or progressing augmented image of the IR Laser Beam shall be displayed. The Line Draw speed maybe set according to the velocity of the IR Laser Beam.

The script or code is then applied to the origin game object and destination game object, where the Line Render then sets the positions of both elements the start point (the origin) and the end point (destination) in which both have a vector position of x,y,z, where for example Set Position origin is equal to the users IR Laser Gun Apparatus 47 vector position or Cartesian coordinate at the time the trigger mechanism 53 was pulled, and the end point or destination is based on a formulation of the distance or range of the IR Laser Beam based on the users IR Laser Gun Apparatus 47 range.

The script or code shall then set width of the animated IR Laser Beam and line starting for example at 0.4 and ending at 0.1 which provides prospective projection, in which the further away the IR Laser beam appears the smaller it appears. The script or code may then set the colour, vertex count among other properties etc. of the IR Laser Beam which may be dependent on the devices classification type.

The script or code then sets distance as a calculation, taking the x,y,z position vectors also referred to as Vector3's from point A (origin) and point B (destination) to return float value as distance using a vector3 helper class, where for example "distance=Vector3.Distance (origin.position, destination.positon);" in which this is calculated dynamically.

Here the draw line script or code may first set up a counter, where the counter shall be used as an incremental value to render an animated image of the moving IR Laser Beam and the line rendering at points between the point A (origin) and point B (destination) as part of the update function of the script or code to the line rendering, in which in each frame the animation moves along a point closer to the destination which is dynamic. This provides the animation part of the line rendering. This can be expressed for example as counter defined as "counter+=0.2f/lineDraw speed", where "2f" is the amount it is changing each frame, which is divided by the line Draw speed which is the rate at which the image animation should be rendered which maybe expressed as public variable that can be increased or decreased to show the animation of the IR Laser beam drawn faster or slower.

The output of the counter value provides an incremental value of "0.2f", which can be used in the update function, which may be input into a Lerp to perform a linear interpretation between the origin point A, the distance of the IR Laser Beam based on the counter value, in which in this example we add "0.2" from 0 (origin) for the length of the line for every frame in the animation which forms the new vector position.

Using the example formula this can be formulated as "float X=MathFloat.Lerp(0, distance, counter);" where X=the previous returned float value for the distance between points A and B, 0 is origin, the second distance value is changing value or length of the line/IR Laser Beam per frame based on the counter value "0.2" for example and the counter value is the incremental value for the amount the line/IR Laser Beam animation shall change per frame based on the defined line draw speed.

Here Counter essentially does a Lerp between the origin (point A) and the destination (point B) which is dynamic, where for example if the distance=30 and origin=0, and the counter was 15f then the Lerp could provide a value between points A and B of 0, 15 or 30. This is based on a linear interpretation between the origin point A, the distance which as detailed is dynamically calculated and the counter value which in the example is "2f", where frame by frame the system counts the distance from the origin point A based on the distance.

This then provides a second float value which through a final algorithm or equation we can derive the next point or vector position along the line that the IR Laser Beam shall be rendered along from the original point of origin A. This can be formulated using for example "Vector3 positionAlongline=X multiplied by Vector3.Normalised (PointB-PointA)+point A;" where Point A is the origin Vector3 and Point B is the destination position.

Here the vector direction is derived by performing a vector3 normalised (Point B-A) which gives unit vector as in a desired direction or a directional vector, which is then multiplied by the desired length which is changing value of "X" and finally then the origin (point A) is added which gives the next point or vector position along the line.

To render the next point and vector position along the line the following additional argument may be used: "lineRenderer.SetPosition(30, positionAlongLine);" In which the output is provided to the rendering module 28 or the users augmented reality ("AR") display apparatus 1, in which the rendering module 28, shall then render the projecting IR Laser Beam based on the formulated new vector positions provided by the client module 74 or the users IR Laser Gun Apparatus 47, along the line.

In which upon the updated rendered images being rasterised, fragmented and written to the display frame buffer as in-memory bitmap or RGB array the pixels shall be illuminated on the user's micro-display 3, by the light display modules 5L, 5R and the user shall see the resulting in the animation of the position of the game object along the length of the line, in which the virtual image of the IR Laser Beam can then be animated and seen moving along the correct projectile and direction as well as the correct velocity as the real-world IR Laser Beam, where the position of the animated IR Laser beam moves or progresses along the line at each point over time.

Alternatively using the formulated new vector position provided an augmented virtual image of the IR Laser Beam may be projected augmented animated image over real-world objects and surfaces using via the external projector 96 by the game server 88 or host 89 using projection mapping/video mapping or spatial augmented reality supported by the display projection module 122, from which the augmented animated image may be seen without any visual aid by the user's eyes.

The example Line Rendering technique could be formulated in another way as using a Lerp without a counter using for example; Float x=MathFloat.Lerp(0,distance,counter) And Transform.position of game object=new Vector3(MathFloat.Lerp)(min, max, x),0, 1)

Where for example when x=0, this returns the point A x,y,z values (origin), when x=1 it equals the destination point b (x,y,z) values, when x=0.5 this equals a point in the middle of point A and B along the line.

Here you could have many points along the line with the overall length of the line being representational of the IR Laser beam range i.e. 200 meters.

Note the provided formulas are simply provided by way of example and may not be the actual method of Line Rendering used in the animation of the IR Laser beam since this may vary according to the syntax and formulas supported by the games engine that is used.

It is important to note though the distance of the line is variable where as detailed earlier in the example formula "X" has variable length which may be affected by collisions or other objects intersecting with the IR Laser Beam and line. Other variables such "t" for time maybe used with an incremental value where based on time variable the length of the line and IR Laser Beam increases which could be formulated based on the rate of velocity of the IR Laser Beam.

It should be noted also that the script in Java or C#code shall pull via HTTP GET the devices state information on the device's three dimensional Cartesian Coordinate/vector position (x,y,z), orientation (p,r,y) and directional vector (x,y,z) at the time the trigger was pulled from the devices tracking module 80 in which this data shall form the event trigger information and the inputs for formulating the origin coordinates (Point A). Here the script in Java or C#code that performs this function maybe part of the devices client module 28.

The script or code shall then be attached to these game objects, in which after providing the initial state information, should the client module 28 for example together with the augmented reality ("AR") display apparatus 1 devices collision manager 26 determine a hit it will then provide an update to the destination coordinate, in which the destination shall equal the collision position (x,y,z) or point in which a hit occurred or predicted to occur.

The distance of the line representing the IR Laser Beam, may be formulated using a float and an equation using the position of origin which equals the devices position at the time of pulling the trigger and the destination equals the collision point (x,y,z point of a hit) or may be formulated based range of the IR Laser beam and a counter representing the points or coordinates along the line in which an intersection or collision could occur. Here "X" could equal the distance where using the origin as point A, and the destination as point B, the line distance representing the IR Laser beam is equal to point B−point A, multiplied by the line length+point A for example.

It should be noted as detailed in the other line methodologies such as hitscan or ray casting, here along the line between points A the origin and point B the destination there may be many points in which each point represents a different vector position and set of (x,y,z) values along the line in which the values of x,y,z may increment equally across each point.

Also along any one of these points a collision or hit may occur at any time based on the movements of other real-world users, game objects, real world AI Characters 94 or Virtual game objects 106, AI Characters 105 and remote users 107, therefore the value of "X" of the distance of the line representing the IR Laser Beam shall be variable.

The detailed Line Rendering methods above of using real-world values from the sensors of the IR Laser Gun Apparatus 47, applied to a Line Render rending technique may be used to render an animation of the IR Laser Beam in exact precise velocity, position and directional heading/direction vector to that of the real world IR Laser Beam generated from the user pulling the trigger mechanism 53 of the IR Laser Gun Apparatus 47, as well as any of the other forms of IR weapons such the IR Proximity Mine Apparatus 91 or IR Shield Apparatus 90 detailed within the embodiments of this invention.

In the case of an IR Proximity Mine Apparatus 91 or IR Shield Apparatus 90 offset values are applied to the vector position (origin) of the line and its directional vector/projectile based on the varying position (x,y,z), orientation (p,r,y) and directional vector of each IR LED and IR Transmitter on these real-world game objects and devices which feature multiple IR LEDs and IR Transmitters each at varying different positions, orientation and directions on the devices surface. Here multiple Line Renderings may be generated each with varying positions in terms of the vector position (x,y,z), and projectile based on the varying position, orientation (p,r,y) and directional vector of each IR LED and IR Transmitter.

This supports the means to display an animated virtual image of the IR Laser Beam via the users augmented reality ("AR") display apparatus 1, micro display 3 as detailed as augmented 3D holographic, or hologram or form of Stereoscopic image over the user's real-world view or could be used in the display of augmented images and lighting effects via external projectors 96 by the game server 88 Or host 89 using projection mapping/video mapping/spatial augmented reality and/or 3D projection mapping techniques.

This may be used also in the display of animated video sequences of the IR Laser Beam fire in which images may be rendered using ray tracing or other high resolution rending techniques or the displayed animation of the IR Laser beam may be provided in the form of CGI.

It should be noted also that for every rendered virtual image in the animation of the IR Laser Beam its changing x,y,z values according to points along the line maybe provided to the audio manager 34 of the user's augmented reality ("AR") display apparatus 1, or the device itself or that of the game server 88 or host 89 for the playback of positional 3D audio effects using perceptual based 3D sound locational or 3D spatial sound techniques in which each of the points coordinates (x,y,z) along the line are input into the HRIR database.

In addition, during the stated Line Rendering method transformations may be applied based on the users head position and orientation in the case where the IR Laser Beam augmented virtual images or video are displayed via the users augmented reality ("AR") display apparatus 1, micro display 3.

Transformations may also be applied for the virtual camera and the users FOV, in the case here the IR Laser Beam augmented virtual images or video are displayed via the users augmented reality ("AR") display apparatus 1, micro display 3.

Lighting, shading and shadow effects such as specular lighting and other visual lighting effects may be applied in the Line Rendering process to the animated IR Laser Beam.

All the game objects whether real-world or virtual are based on geometric objects in form of vectors and vertices in which every object has a set of three dimensional Cartesian coordinates (x,y,z) that represent its world coordinates, a set of model coordinates in which each points or vertices as an x,y,z value where the sum of all of the points forms the 3D model shape, together with an optional set of hit boxes in which mathematical operations and formulations may be applied in order to determine if collision is going to occur based on the projectile and trajectory of an IR Laser Beam.

Here this may user a known process in first person shooter games, such as hitscan or raycasting where a mathematical calculation is performed by the collision manager 28 to identify points in three-dimensional space in which a given line (representing the IR Laser Beam), intersects with another game object, in which the line may be formulated based on the world coordinates (x,y,z) of the IR Laser Gun Apparatus 47, its orientation (p,r,y) and directional heading for example that may expressed as a direction vector.

This provides in the projectile/trajectory formulation a point (x,y,z) in three dimensional space in which the IR Beam/IR Laser beam originated, the angle of the IR Beam/IR Laser Beam based on the pitch, roll and yawl (p,r,y) and its directional heading from which a line can be projected in which if the ray or line is determined to hit a game object, this shall then return a value for where the IR Laser beam which may be a three dimensional Cartesian coordinate in which a point in three dimensional space is determined using values for x, y, z. Where the position of the hit or collision point maybe P2=(220,210,160) for example. This behaves like a laser beam and/or IR Beam as such it suitable for the needs of determining a hit.

Other variables such as gravity, velocity, wind can all be assumed, since gravity as detailed is assumed not to effect an IR Laser beam, velocity is at a constant assumed rate, and an IR Laser Beam since it is a form of light is unaffected by physical elements like wind.

For example, upon pulling the trigger mechanism 53, the devices client module 74 may register LaserFired=true, LaserCoordinate.x=120, LaserCoordinate.y=110, and LaserCoordinate.z=80 with the game server 88 or host 89 via the network 97, in which the position of the IR Beam/Laser beam may be expressed as P1=(120,110,80) shown as a positive set of x,y,z values from the point of origin of the three axis.

This provides the position from which trigger was pulled. Using these world coordinates (x,y,z) together with orientation of the device (p,r,y) and the directional heading, the rendering module 27 of the user augmented reality ("AR") display apparatus 1, is capable of generating a virtual game object and rendering an image of the IR Laser Beam which maybe sequence of images showing animation of the IR Beam/IR Laser Beam projecting outward from the users IR Laser Gun Apparatus 47, based on a formulation of line of direction of the IR Beam/IR Laser beam and its assumed velocity.

Alternatively, the IR Laser Beam could be rendered and displayed a simple line that may be cylindrical in form emanating from the original vector position in which the trigger of the IR Laser Gun Apparatus 47 was pulled, in which as the IR Laser beam travels the line length increases in line with the velocity and direction of the real IR Laser Beam. Here the resulting virtual image is then displayed via the user's Micro-display 3 as a detailed previously as 3D holographic or hologram or form of two differing 2D stereoscopic images or video, in which visually the user can see a 3D virtual image of the projectile of the real IR Laser Beam along its precise directional heading and angle in three-dimensional space as an augmented image over their real world view.

In addition, lighting effects such as specular lighting may be applied to other objects in the users FOV as augmented which the light is emanating from the precise location of the real IR Laser beam and in which both the virtual 3D image or video and lighting effects can be displayed moving at the same velocity as the real-world IR Laser beam.

In addition, upon a hit being detected computationally through collision detection formulation of whether IR Laser Beam intersected with another game object or as a result of an IR sensor being hit that then registers a hit, further lighting effects such as diffuse lighting effects and additional virtual images in which further virtual game objects are created by the rendering module 27 or games engine 35 upon a hit being detected by the collision manager 26 in which the projected augmented virtual image representing the hit that was rendered by the rendering module 27 may be displayed at the precise location of the position of the hit or collision point of the IR Laser Beam in the three dimensional space of the laser tag arena and game space.

This is determinable using the hitscan or raycasting methods as detailed earlier in which a line or ray is formulated representing the projectile of the real-world IR Laser Beam, in which frame by frame for example the collision manager 26 may determine if another game object has intersected with this line or ray. Here the distance of the line or ray maybe based on the real-world distance range of the IR Laser Gun Apparatus 47, which may be for example 200 meters.

Vector and parametric equations of a line may be used in the process of determining the line or rays position and heading along the x,y,z axis in three-dimensional space.

Here regardless of the user's movements, the moving directional position of the IR Laser Beam virtual game object projectile and its directional vectors the ray cast of the virtual game object since light beams in the source of an IR Laser beam are unaffected by gravity or wind or other physics variables shall remain constant on the same directional heading until a hit is detected by the collision manager 26.

The system will however perform transformations on the virtual game object to scale or rotate the virtual image of the IR Laser beam relative to the users head positional coordinates (x, y, z) and orientation (p, r and y) so as maintain the correct viewing perspective within the users FOV from their augmented reality ("AR") display apparatus 1, micro-display 3 of the moving 3D virtual image of the IR Laser beam as the user moves around the three dimensional space of the game.

This allows for freedom of movement within six degrees or more in which all users can move around the x,y,z world coordinates of the game and can change their head orientation together with their eye position and orientation, whilst the rendered and displayed moving IR Laser Beam fire is always displayed with the correct projectile and trajectory directional heading and angle as per its original coordinates.

The only exception to a change in the projectile direction of the IR Laser Beam, resulting from a user action, AI Character 94 or an action from a virtual AI Character 105 is if a hit is detected resulting from a detection that the virtual game object of the IR Laser Beam has intercepted with a user action, AI Character 94 or an action from a virtual AI Character 105 in which they have moved into a position in the three dimensional space of the game in which the virtual game object of the IR Laser beam is travelling in which a collision is detected. Alternatively, if the virtual object Laser beam of another user or real world AI Character 94 is detected by the collision manager 26 to hits the same three dimensional coordinate as the users IR Laser beam directional projection this could change the projectile of either or both IR Laser Beams.

Here more complex mathematical projectile and trajectory formulations or collision simulations may be used in the determination of a hit that support this detailed feature in which the projection of an IR Laser beam can be affected by the projection of another IR Laser beam in which this could simulate the real-world effects of variables such as and other variables that may affect the projectile of an IR Laser Beam reaching its target.

In another example embodiment of the invention the projectile direction of virtual object of an IR Laser beam could also be changed as a result of hit being detected with another users IR shield whether a virtual game object or a real-world handheld IR Shield.

In the case of the game object in which the collision is detected with a real-world object such as another users IR shield real-world three dimensional coordinates are used based on the tracking data from the sensor(s) 170 of the IR Shield Apparatus 90 device, which is converted into an x,y,z world coordinate of the virtual world used in the computation of the collision position (x,y,z).

Other physical variables such as the mass or velocity of the object, shall be used in the computation of the collision and the response in terms of the change to the project of the moving virtual game object of the users IR Laser beam. The moving velocity of user's real-world game objects such as IR Shield Apparatus 90 may formulated based on either sensor inputs from the accelerometer or a calculation of rate of change in its real-world coordinates over a period of time using the state information provided by the IR Shield Apparatus 90 devices client module 193.

This example extends to all forms of real-world objects such as the IR Laser Beam of a user intercepting with another users IR Laser Gun Apparatus 47 where based on their coordinates the collision manager 26 may detect a collision between the virtual game object of the IR Laser beam and that of the real-world game object.

In yet a further example embodiment of the invention, collisions of the IR Laser Beam virtual game object may be detected based on the geometric, volumetric and depth data with a virtual or real world surface or object.

In the case of real-world surfaces collisions may be detectable using the spatial mapping volumetric and geometric data provided by the observer component 25 of the real-world surfaces in which mesh data or a wireframe with depth information or depth map may be used to formulate if the virtual game object of the IR Laser Beam hit the real-world surface or object such as a wall, ceiling, floor, a door or other object structures in the real-world like a chair for example, in which based on the projectile coordinates, velocity and mass of the travelling or virtual game object of the IR Laser Beam with that of the world coordinates, and mass formulated of the real-world objects the collision manager can determine a response.

Responses may include the invoking of a change in the projectile of the IR laser beam or a new virtual game object to be created by the rendering module 27 to visually represent the detected hit or both in which in the example of a hit a virtual image could be displayed as augmented via the user's micro display 3, at the precise position of the hit or collision point maybe.

In other possible examples embodiments of the invention, the collisions of the IR Laser Beam virtual game object with other objects such as a real-world user, real-world AI Character 94 or virtual AI character 105 could be detected based on their world coordinates relative to that of the virtual game object of the IR Laser Beam.

Here hit boxes or model coordinates may be applied to a real-world user, AI Character 94, object or virtual AI character 105 to detect a hit, where based on projectile and trajectory formulation of the line or ray of the IR Laser Beam used methods as detailed where if it determined that the IR Laser Beam has intersected with either of these objects or users or AI characters hit boxes or model coordinates a hit could be registered and a virtual image may be displayed as an augmented image via the user's Microdisplay 3, in the relative three dimensional position of the hit or collision point visually representing the hit.

Similar to as detailed before defuse lighting effects could be displayed at the three-dimensional position of the hit or collision point in which the rendering module 27 shall generate both the diffuse lighting effects and the virtual image or animation/video visually representing the hit based on the determination of the hit by the collision manager 26 and its determined response.

In the case of hit boxes this may be a form of a basic hit box in which the hit box has a centre of origin, width, length and height around the real world user, game object or real-world AI character 94, or virtual game object 106, AI Character 105 etc. or they could be hit box hierarchies.

In general gaming terms hit box hierarchies are used for greater accuracy in the detecting of hits between virtual characters, users and objects are split into hierarchical boxes, but in which in the presented embodiments of the invention disclosed herein these are applied to real-world AI characters, users and game objects as well in which these hit boxes move relationally to the physical movements of the real-world users, AI characters and objects movements always at the same three dimensional coordinate in the real world space.

The amount to which say a virtual object of the IR Laser Beam maybe knocked back, projected in a different direction or pushed back resulting from a collision can be formulated by the system by using velocity and mass attributes where if one object is moving at a greater mass and velocity than the other this will have a greater collision impact that shall push the object of its it's course whereas if the mass of one object is significantly greater than that of the opposing force its own trajectory and position may not be effected by the collision.

In yet a further example embodiment of the invention a real-world user could be a virtual user in the sense that they are playing the laser tag game in another laser tag arena or location in the real-world, where like network games their character has presence in the game, except here the person may be seen to be physically present in the game as augmented user where their actions in their own real-world three dimensional space effects the game in the real-world and virtual world of the laser tag game in another location.

For example, the main game may be hosted in the UK played out in a laser tag arena with multiple real-world users. Another user which is a remote user 107 located in the US could connect via the network 97 in which they appear augmented in the real-world view of the other users. Where in their view from the US they can see the real-world of the laser tag arena 98 in the UK together with the virtual game augmented over their real-world in which the real-world laser tag arena and all users, objects and AI Characters whether real or virtual appear in their space and time in the US. As the remote user 107 in the US pulls their IR Laser Gun Apparatus 47 trigger 53, the game will formulate the projectile of the laser beam in the relative three dimensional space of both real-world locations in which the resulting IR Laser beam is projected as a moving virtual object in both real-worlds seen through the UK and US users augmented reality ("AR") display apparatus 1, where as a result the US user may hit another user in the UK held laser tag game which may invoke their IR Sensor 23 to go off as result of the collision manager 26 detecting a collision between relative three dimensional spaces of the both real-world locations in the UK and US and that of the virtual world of the game that exists in both spaces and time.

This allows real-world interactions from one physical location which may be countries apart to transfer across into the virtual world of the game and to that of the real-world laser tag game in another physical location entirely adding yet a further unique and novel experience to the presented gaming invention disclosed herein. Physical movements of users are tracked also in which states are maintained between both real worlds in terms of the user's positional world coordinates to that of the virtual world and their physical actions.

As an example, a user in the US could using hand gestures invoke a physical change in an object in the UK where based on their hand tracking movements captured from their augmented reality ("AR") display apparatus 1, previous described tracking capabilities the games application 36, client module 28 or game server 88 could invoke a change in a real-world object such a change in another users IR Laser Gun Apparatus 47 or a change in a physical real-world AI Characters 94 surface textures seen in the real-world where the user's hands are detected as colliding with the model coordinates or hit box of the real-world AI character 94.

Here users in the UK would be able to see this physical change without the aid of their augmented reality display apparatus, since the textures of the real-world AI Characters 94 are visible via the display panels on its surfaces which are physical and tangible in the real-world. This is provided as an example, where the invention presented here is not constrained to just the examples given but applies to the ability to interact with any real-world game object as disclosed in the presented embodiments of this invention herein.

Figure 8:
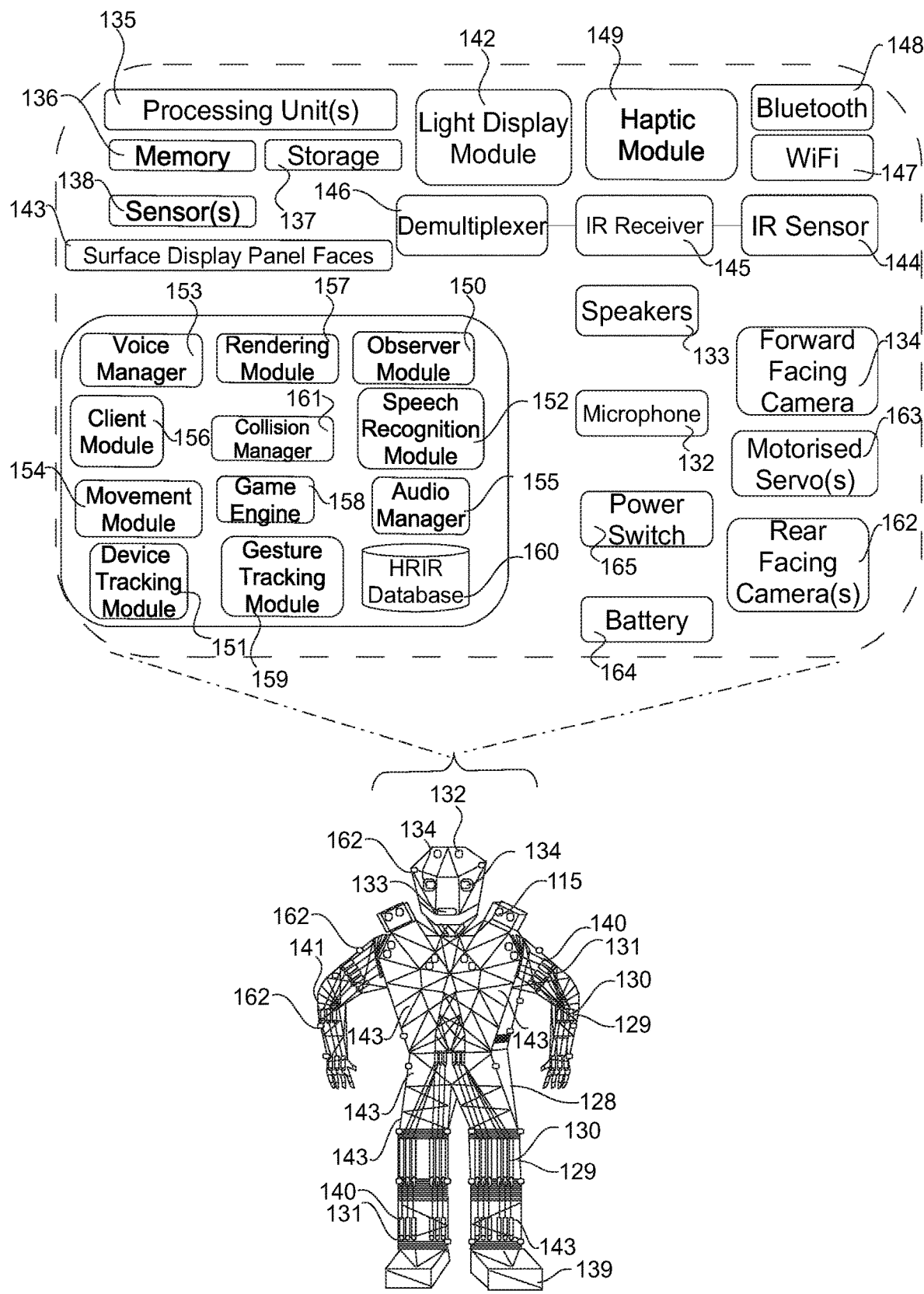
FIG. 8 shows a physical real-world AI Character 94, in the form of a humanoid or robotic AI physical robot that has movable body parts including actuators 129, joints 131 and manipulators 130 together with AI software and other programmable software modules allowing the real-world AI Character 94 to play along in the laser tag and mixed reality game sessions in the real-world environment of human users.

FIG. 8 shows a real-world AI Character 94 which exists in physical form in the real-world and the game space of the game and laser tag arena in which the real-world users exist. The real-world AI Character 94 consists of movable body parts in form of an exo skeletal frame 128, such as arms, legs, hands, head etc. where motorised actuators 129, manipulators 130 in the form of effectors, joints 131 and motor shafts allow movement to be controlled by the AI Character 94 software programmed modules; one or more microphones 132; one or more speakers 133; two or more cameras 134, providing AI field of view and spatial viewing; a number of Sensors 138, IR Sensors 144 and a computer.

The AI Character 94 maybe a form of robot or humanoid robot in the real-world game in which its hands, arms, legs, body and head each operates on up to 30 degrees of movement or greater through rotational joints and a mechanical skeletal operated on pins and actuators to control movement, which may be controllable via software. Movement is controllable through many motorised and rotational actuators 129 which may be in the form or hydraulic, piezoelectric, ultrasonic, electric or pneumatic for example.

Alternatively, the AI Character 94 maybe a form of soft robotics, made out of soft silicon, capable of rapid and agile movements, in which gas may be passed through the soft body to invoke movement.

As depicted by FIG. 8 the AI Character 94 is self-contained robot in which its power source, processing units 135, memory 136, storage 137 needed for computations, and also its actuators 129 and sensor(s) 138 are all self-contained in the structural body 139 of the AI Character 94.

The AI Character 94 maybe a form of manipulator robotics, in which through the use of algorithms and manipulator may support the movements and motion of the rigid body or soft body of the AI Character 94, in which its body may be moved to specific vector position (x,y,z) and orientation pitch, roll and yaw (p,r,y) through the use of one or more manipulators 130 and multiple actuators 129 in which this may move for example the AI Character's 94 hand, fingers and fingertips to a desired (x,y,z) position and orientation to invoke the pulling of a IR Laser Gun Apparatus 47 trigger mechanism 53, for example.

The manipulators 130 allow the AI Character's 94 to grasp an object such as an IR Laser Gun Apparatus 47. In this process the Cartesian coordinate or vector position (x,y,z) maybe converted into a set of joint angles that invoke the movement of the AI Character's 94 arm, hand, fingers and fingertips through a process of inverse kinematics. The use of manipulation to control the AI Character's 94 operating of an IR Laser Gun Apparatus 47 maybe supported through inverse kinematics; inverse dynamics; trajectory planning (based on computation of the other target users position (x,y,z) and orientation (p,r,y) retrieved from the Game Server 88 or Host 89.

It should be noted that manipulators 130 are a form of effectors and that joints 131 are used here to connect the parts of the manipulators to support the AI Character's 94 body movements. These joints 131 maybe a form of rotary in which rotation is supported around a fixed axis or maybe prismatic supporting linear movement. Here the joints provide degree of freedom (DoF) of movement of up to 30 degrees or more, in which through the converting of coordinates (x,y,z) and the desired orientation (p,r,y) into join coordinates, the software modules of the AI Character's 94 are able to invoke complex body movements through the use of the manipulators and joints. Each manipulator 130 may have one or more joints 131 to support movement, which allows the AI Character 94 to navigate the laser tag arena 98.

Furthermore, movement is supported as detailed through the use of actuators 129, which provide a single motion of up-down, left-right, forwards or backwards movements for example to the real-world AI Character's 94 body. Motor shafts 140 are also used here to support AI Character's 94 body movements in which these control the rotational degree of movement of the AI Character's arm for example within one rotational degree of freedom (DOF). A sliding part 141 in the form of a plotter may be used also to control translational movements in a single degree of freedom.

The real-world AI Character 94 also features a number software programs and modules including an observer module 143 (using spatial mapping to see and identify objects in the real-world); a device tracking module 144 (tracks sensor movements); a speech recognition module 145 which converts human spoken words to text captured via the microphones 132; a voice manager module 146 that generates artificial human like speech which is output via the speakers 133; a movement module 147 which controls the body movement of the AI Character 94.

The real-world AI Character 94 has freedom of movement, in which the AI is software in the form of algorithms together with its spatial mapping software and cameras 134 allows the AI Character to observe the real-world and to learn the game play from observing itself as well as other users during a laser tag game.

Here reinforcement learning is used together with generative models during the game where the real-world AI Character 94 self learns how to play the game to achieve better its primary objective. Primary objective may be to defend and protect another user or could be to score as many hits or could be to bring the game to conclusion where there is only one user remaining the winner among many other settable objectives.

In addition, the AI Character 94 features a light display module 142 and multiple surface display panel faces 143 in which it is capable of displaying virtual images, video, and/or other visual effects which may be a form graphene or organic display surfaces such TOLED/OLED, where the same as other real world game objects this may be used to form a 3D mesh and 3D image of the AI Character that is visible to the naked eye in the real-world.

The real world AI Character 94 as shown in FIG. 8 features a set of processing units 135, Memory 136, Storage 137, Sensors 138 (including a tilt sensor, accelerometer, gyroscope, GPS tracker etc.), one or more IR Sensors 144, an IR receiver 145, an IR Transmitter 147, a multiplex 148 a demultiplexer 146, a haptic module 149, multiple surface display panel faces 143 that may be a form of touch screen display panels in which these surface display panel faces 143 are triangular or quad in shape and form a real-world 3D mesh in which the cumulation of all of these surface display panel faces 143 when virtual images are displayed on each panel may form a 3D image that covers the entire surfaces and faces of the AI Character's body.

This supports the ability to fully render the AI Character as a 3D image in the real-world in which the 3D image can be seen and touched physically by users. The surface display panel faces 143 are mounted for example over the arm of the AI Character in which the joining between each surface display panel faces is flexible and semi-skin like allowing the freedom of movement still. These surface display panel faces may be a form of graphite, organic OLED display type. Other forms of display such as LCOS, LCD maybe used however they don't posses flexible form so may not be suited to this application usage on the AI Character 94.

Similar to the IR Laser Gun Apparatus 47, these surface display panel faces 143 maybe configured in a multi-tiled display configuration where each surface display panel face 143 has a unique face ID and display ID, which may be mapped back to specific polygons or faces on the virtual polygon-based mesh and 3D model of the AI Character used in the rendering and display operations in which based on this logical mapping of real-world surface display panel faces 143 to the faces of the virtual game object, mesh and model of the Real world AI Character 94, texture mapped images may be mapped to the same positions, surfaces and faces as that of the Real world AI Character 94. As depicted in FIG. 8, the real-world AI Character 94 features a set of processing units 135 (including a CPU, GPU), memory and storage.

The processing units support the functions of the real-world AI Character 94 and its core processing of spatial information and in the application of its reinforcement learning and generative models as well as its other AI algorithms that support the AI Characters ability to act independently during the game play and to be able to play along with other users in the laser tag game.

Here the CPU or CPUs shall also be responsible for executing all the programmed instructions and logic of the software modules of the real-world AI Character 94, together with its AI algorithms. The GPU's shall be used in the mathematical and rendering operations providing hardware acceleration in the rendering of texture maps for example for display on the surfaces of the device's surface display panel faces 143.

The memory 136 may be a form volatile memory or random access memory (RAM) for performing high speed instructions by the CPU such as DRAM, fast CPU cache memory and SRAM or other forms of volatile memory or example used as the main memory of the system.

Additional memory may be provided via the GPU as dedicated graphics memory or may be commonly used between the CPU and GPU. The memory 136 may also consist of non-volatile memory also for performing BIOs and firmware operations such as flash memory, ROM, EPROM, or EEPROM memory, where flash memory may be used as a secondary form of memory for example. The flash memory may be a type of NOR Flash.

Files and data may be stored also the storage memory 137 together with the AI algorithms, software binaries, executable files of the programs and all corresponding files that support the AI Characters functions. This may include Operation System (O/S) software and all device drivers for the device hardware appliances such as the actuators 129 for example.

The storage memory 137 may be in the form of a SSD flash based drive or a conventional hard disk such that is HDD based or another form of non-volatile memory.

As shown in FIG. 8 the Real world AI Character 94 also consists of multiple clusters of several sensor(s) 138 including a multi-axis accelerometer, gyroscope, tilt sensor, motion sensors placed in different positions on the body of the AI Character 94 for tracking body movements and for aiding the physical body movements of the AI character 94, in which positional coordinates (x,y,z) and orientation values (p,r,y) are used to invoke specific physical movements in the arms, legs and head of the AI Character 94 to precise coordinates and orientation via the use of actuators.

Here different rates of velocity or acceleration may be input into this process to invoke a physical movement at different rates. Sequences of multiple six dimensional matrixes of coordinates for each body part may be provided in which these may map to individual finger joints for example that may invoke a complex set of movements such as hand gesture by the AI Character 94, in which their fingers rotate as well as extend outward or inward, which could be used in the operating of the pulling of a trigger mechanism of a IR Laser Gun Apparatus 47 for example to fire and IR Laser Beam.

In addition, as illustrated in the Figure the real-world AI Character 94 sensors 138 include an GPS Tracker, a solid state compass, an electromagnetic compass/digital compass and a magnetic compass or magnetometer. Furthermore, the real world AI Character 94 sensors 138 may features an inclinometer, pedometer, speedometer, altimeter and a MEMS Barometer. The sensors 138 may also include a dead reckoning module.

Furthermore, the real-world AI Character 94 sensors 138 may feature proprioceptive sensors and joint sensors. In which the proprioceptive sensors together with joint sensors may be used to sense the AI Character 94 actuators 129, joints 131 movements to track the AI Character 94 joint movements in accordance with the input coordinates (x,y,z) and orientation (p,r,y) to maintain state information on the Game Server 88 or host 89 as well as locally on the AI Character 94 of its bodies movements and orientation.

State information including coordinates (x,y,z) and orientation (p,r,y), directional vectors and elevation from the ground of the real-world AI Characters 94 different body parts from the sensory data is passed to the game server 88 or host 89 via the network 97 by the AI Characters client module 156 for maintaining state information and is handled also by the client module 156 and AI software of the AI Character locally in the performing actions resulting from detected sensor inputs.

These sensors 138 placed around the body as clusters of sensors 138 are used to track the of each of the real-world AI Characters 94 body parts in terms of their world coordinates expressed as three dimensional Cartesian coordinates or points on the x,y,z; their orientation expressed as pitch, roll and yaw (p,r,y); their directional heading which may be expressed as directional vector and their elevation from ground level together with other physical attributes such as velocity, acceleration etc.

This may be used in the determination of collision responses and in the computational operations of the game as well as the invoking of physical movements by the real-world AI Character 94 such as the physical simulation of a rag doll simulation upon a hit being detected by its IR Sensor 144 and/or IR Receiver 145.

The AI Character 94 features a series of IR Sensor(s) 144 and IR Receivers 145 on their body as depicted in FIG. 8 for detecting hits. These IR Sensors 144 may be used in the determination of hits from other users IR Laser Gun Apparatus 47, for example which may invoke an action by the client module 156 or collision manager 161 module as a result of a hit where this could invoke a change in the state of the rendered texture maps or the display of decal and/or diffuse lighting effects on the AI Characters 94 surface display panel faces 143 by its rendering module 157 in response to the collision detection.

Alternatively, a detection of a hit from the IR Sensor may invoke a rag doll simulation which invokes physical movements in a sequence of movements as a physical simulation of the rag doll simulation.

It should be noted that both of these actions resulting from a hit could be invoked by a computational detected collision by the collision manager 161 alternatively to the use of the IR Sensor. It should be noted that as previously detailed the detecting hits may occur as a result of the IR Sensor(s) 144 detecting Infrared ("IR") light emissions and IR radiation from an IR Beam/IR Laser Beam projected by an IR LED or infrared laser diode of another users real-world game object such as an IR Laser Gun Apparatus 47 or IR Shield Apparatus 90 or IR Proximity Mine 91 onto the IR Sensor(s) 144.

These IR Sensors 144 like those of other detailed devices in the embodiments of the disclosed invention herein, maybe a form of an active IR Sensor or passive IR Sensor in the form of fiber optic sensor, photo optic sensor, infrared detectors and/or photo-detector.

In addition, the IR Sensor 144 may be part of the IR Receiver 145 which may be a form of photodiodes or phototransistors. The IR Sensor maybe a form of active or passive infrared sensor in this case.

The real world AI Character 94 also features IR receiver 145 and Demultiplexer 146 for receiving data via the IR Beam/IR Laser Beam, which may also serve as an input where the resulting detection of a hit via the IR Sensor based on the raw binary data in the IR signal may invoke a different action the display of different types of rendered texture maps or the display visual decal and/or diffuse lighting effects on the surface display panel faces 143 of the real-world AI Character 94 indicating a different class of weapon. Alternatively, this could invoke a different type of rag doll simulation based on the classification of the weapon detailed in the raw binary data of the IR signal.

The IR Receiver(s) 145 are a form of infrared receivers that may also be referred to an IR Sensor as they detect radiation from the form of an IR Transmitter. Here it has been intentionally shown as a separate component of the AI Characters 94 circuit board in FIG. 8 although they could be part of the same component. This has been shown separately simply to distinguish between the IR Sensor 144 simply being responsible for detecting emissions from the IR Light in the determination of a hit as an on/off determination, whereas the IR Receiver 145 is able to detect difference in the radiation and particular frequencies from an IR Transmitter.

In addition, an IR Receiver 145 can be used for receiving transmitted data over an IR signal/IR Beam where as an IR LED in its self doesn't not necessarily have this capability if it is a basic on/off type of IR Sensor that works with a basic IR LED hence why the IR Receiver 144 shown as separate to the IR Sensor 144. Again, though this could be combined if desired.

The IR Receiver 145 may be a form of photodiodes or phototransistors. The IR Receiver(s) 145 may also be modulated or configured to operate based on a specific wavelength and voltage where when used with a matching wavelength and voltage configuration of an IR Transmitter hits maybe detected. Signal processing maybe done by amplifiers where the signal is very small. The set up of the IR Receivers 145 and IR Sensors 144 may be configured as a direct incidence.

As depicted in FIG. 8, the AI Character consist of multiple surface display panel faces 143 which may be a form of organic display such as an organic light emitting display (OLED), a Liquid Crystal on Silicon (LCOS) or another form of Liquid Crystal Display LCD. Multiple panels may be arranged in a tiled or 3D mesh configuration that form the real-world faces and 3D model of the IR Shield Apparatus 90. Alternatively, the surface display panel faces 143, maybe a form of graphene-based flexible plastic display.

Each surface display panel faces 143 is driven by circuitry together with the display drivers and are powered by the main board circuitry via connectors. The Light Modules 142 control the display of imagery and pixels on each surface display panel faces 143.

The surface display panel faces 143 may be connected directly to the devices PCB through an internal display port ("iDP") where the display maybe soldered directly to the PCB or may be connected via another form of standard based DisplayPort and digital display interfaces such as an embedded display port ("eDP"), Slim port, HDMI, USB, MIPI DSI or a DVI link etc.

The surface display panel faces 143 are arranged to form a partial or full 3D mesh over the real-world device and game object which is physically represented as a 3D rendered game object in the real-world, where multiple triangular or quad shaped display screens cover the bodies surfaces and faces of the real world AI Characters 94 three dimensional shape and geometric structure.

This forms a 3D mesh visible to users during a laser tag game in the real-world with no visual aid, in which the real-world 3D mesh is formed of display panels overlaid on the physical real-world AI Characters body which is formed of real-world vertices/points, edges, faces, polygons and surfaces in three-dimensional space of the real-world. Here like the IR Laser Gun Apparatus 47 a virtual game object which has a polygon-based mesh maps directly to the real-world AI Characters body in terms of its edges, faces, polygons and surfaces of its real-world mesh and geometric shape and form of the AI Characters 94.

Here the real world AI Characters 94 real-world 3D mesh maybe a form of polygon-based mesh that derived from the multiple triangular or quad shaped surface display panel faces 143 which cover the main entire body of the real-world AI Character. Alternatively, they may be a representational wireframe polygon-based model or another suitable polygon-based mesh form.

3D rendered images may be formed through the display of 2D images and applying of texture maps to each of the multiple surface display panel faces 143 on the devices physical faces, in which the multiple 2D images and rendered texture-maps are displayed on the devices faces via their respective vertices coordinates for each of the devices faces, to form a 3D rendered image that is physical in presence in the real world.

Each of the display screens or surface display panel faces 143 covering different faces of the Real world AI Character 94 maybe in arranged like the IR Laser Gun Apparatus 47, in tiled configuration covering the object fully or partially. Where the body of the AI Character 94 is fully covered in display screens this creates a real-world 3D mesh as described upon which images can be rendered and displayed. Here each display screen 143 and face may represent an addressable triangle or polygon or quad which forms also the paired virtual game object 3D model of the real-world device and real-world game object.

In addition, as with normal virtual-game objects, complex 3D models can be made up of many triangles or polygons, where during the rendering process these map to faces of the virtual game objects 3D model, which in the embodiment of the invention described herein these may map to actual real-world AI Character and game object surface display panel faces 143 thus recreating a fully rendered 3D model which is physical in presence in the real-world in which users can see its 3D structure together with its rendered surface texture mapping and other visual effects without any visual aid.

The same as detailed for the IR Laser Gun Apparatus 47, this achieved through a process of mapping the paired virtual game objects 3D model points or vertices, polygons/triangles, faces and their corresponding texture maps to individual surface display screen faces 143 of the real-world AI Character 94, where based on pixel coordinates and a face ID/display ID attributed to each display panel, this allows complex 3D shapes to be recreated in physical form in the real-world where two states of the real-world game object and that or virtual-game world coexist and are maintained computationally.

Here like also the IR Laser Gun Apparatus 47, the output 3D model of the real-world AI Character 94 may broken back down to individual rendered faces mapped back to each of the surface display panels faces 143 for which each image be rasterised, fragmented in which the outputted individual pixel RGB array or in-memory bitmaps get written to the frame buffer for each of the individual mapped surface display screen faces 143.

Alternatively, like a 3D model, the real-world AI Character and real-world game object surface display panel faces 143 similar to previously detailed may also be arranged as quads where quads are used to form its paired virtual game object structure. In this configuration it is the cumulation of all of the triangular or quad surface display screen faces 143 and each of their x, y, z points that forms the 3D model coordinates and points of the Real world AI Character 94 in the real-world.

Same as previously detailed also, here the rendering pipeline performs the same functions as described previously such a ray tracing or ray casting as well as rasterisation, fragmentation etc. except the resulting output maybe individual 2D texture map images for each face of the device's surface display screen faces 143 that are derived from its 3D model in the form of individual pixel RGB array or in-memory bitmaps which get written to the frame buffer for each of the individual mapped surface display screen faces 143 to that of the 3D model faces in the matrix and rendering operations of the device. It should be noted that the position each surface display panel face 143 represents a vector of the centroid of a triangle, where the physical position of the screen tiles which are formed of physical triangle displays represent each of the positions of vectors and the vertices in the three-dimensional space of the game which each vertices like a 3D model has a 3D Cartesian coordinate, and the shape of the AI Character is represented by multiple vertices and faces referencing the vertices.

In this way a real-world mesh and wireframe is essentially created out of multiple triangle OLED display panels, in which the joining of each triangle display surface is fully flexible. Each triangle and surface display panel face 143 is referenced by a specific face and set of vertexes or vertices.

Like 3D models the model coordinates are used to make up 3D model of the objects, in which the coordinates of multiple surface display panel face 143 in the form of shapes or triangles known as vertices form the overall shape of a complex 3D model.

Specifically, each shape or triangle has a set of vertices, which has a coordinate of X, Y, Z referred to as the point or vertex which represent the height, length and width of the shape.

These vertices are referenced by the faces of the object which define the overall shape of the 3D model of an object. Like in traditional video game systems and 3D graphics systems each object is made up of multiple triangles, vertices and faces that are built together to make complex 3D models. This represents the model coordinates and the shape of the 3D model of an object.

Similar to all other detailed real-world game objects such as the IR Laser Gun Apparatus 47, IR Shield Apparatus 90 or wearable IR Mixed Reality Suit 93 or IR Mixed Reality Vest 92, the AI Character's 94 rendering module 157 and light display module 142 may support many methods in the mapping of rendered virtual images to the physical surface display panel faces 143 of the real-world AI Character 94. For example, this may be based on the vertices, the faces, the surfaces, the triangles or polygons or quads etc.

The real-world AI Character 94 also features a Light Display Module (s) 142, controls the illumination of pixels and the display of the resulting light from virtual images that cover the faces and surface display panel faces 143 of the AI Characters body. This module reads the pixel colours from the frame buffer for example together with their pixel coordinates for each of the surface display panel faces 143 that make up its 3D mesh and invokes the illuminating of the each of the display panel the LEDs in the case the display panels are a form of organic display panels such as OLED.

The surface renderings are projected an by the light display module 142 on the display panels using Light Emitting Diodes (LEDs) where the display panels are a form of organic light emitting displays (OLED). The display maybe back-light also with further LEDs. The display could alternatively be a form LCOS or LCD that is made of a glass or polymer material in which the light display module(s) 142 may activate the display of each of the surface display panel faces 143. Where the display panels of the mesh are a form of non-transparent organic light emitting displays (OLED), these maybe back-light with further LEDs.

The real-world AI Character as depicted in FIG. 8, features forward facing mounted Camera(S) 134 in its head part of its body that allow the AI to see the real-world through spatial mapping, in which this provides a FOV and visual perspective of the real-world and its objects, users and surfaces to the AI.

Video captured from the forward facing cameras 134 is processed by the Observer Module 150 of the real world AI Character in which spatial mapping techniques are used to identify real-world surfaces, objects and users.

Through spatial mapping and the cameras this provides depth of view and depth cues to the real-world AI Character 94 that allows it to judge the relative distance, size and directional heading of an object or user which may be used in the targeting of objects or users during the laser tag game.

Spatial mapping can provide detailed meshes and wireframes containing depth information that may be highlighted to the AI part of the AI Character 94 through colouring of the wireframes by the Observer Module 150 in which distance is distinguishable by colour i.e. blue=two meters, yellow 3 meters etc. Mesh data contains detailed points or vertices of a real-world space, object or user allows the AI software to determine the exact 3D model shape of an object or user together with its mass, volume and the 3D positional coordinates (x,y,z) of its parts that may be used for more accurate targeting during a laser tag game.

The use of spatial mapping allows the real world AI Character 94 in this way to navigate around the laser tag arena spaces and 3D cells judging distances so as to avoid collisions and also allows the AI Character 94 to physically interact with objects and users.

The Speakers 133 allow the real world AI Character 94 to speak with other users where using voice recognition software with the assistance of its speech recognition module 152 and its voice manager module 153 that creates artificial human like speech the AI Character 94 is able to interact with users through spoken voice as well as physically.

The microphones 132 essentially provide the ability to hear spoken voices and to be able to interact with users with support of the speech recognition module 152 which translates human spoken words to text and the voice manager module 153 that translates the AI response from text form to audio form.

With reference back to the surface display panel faces 143 of the real-world AI Character 94 shown in FIG. 8, multi-touch support is provided through the firmware, together with sensors which maybe an ASIC sensor that is attached to the touch surface of each display panel. The multi-touch capability may be supported through many forms such as capacitive technologies, resistive, optical or wave.

Here a new form of multi-touchscreen is supported, in which similar to dual-touchscreens there are more than one screen, however in the embodiment of this invention each screen represents a face of the surface of a real-world 3D object, in which multiple touch screen displays cover the entire real-world game object or real world AI Character 94 geometric structure as mesh of triangles or polygons that creates an entire movable and flexible mesh structure and 3D model in which texture maps can be applied to specific surface display panel faces 143

Here also each of the surface display panel faces 143 display like the IR Laser Gun Apparatus 47 are addressable through a unique display ID/face ID that map to specific face and/or polygon of the virtual game object and the rendered 3D model of the real world AI Character 94.

Each surface display panel face 143 also has where a triangle three points along the x, y, z represented as the vertices of each of the surface display panel faces 143 in the real-world and the real-world AI Characters 94 faces.

As detailed similar to the other forms of the real-world game objects such as an IR Laser Gun Apparatus 47 or IR Shield Apparatus 90, the cumulation of all of the real world AI Characters 94 triangular or quad surface display panel faces 143, together with their vertices and each of their points forms the 3D model real-world points of the real-world AI Character 94 similar to other real-world game objects detailed.

Multiple Sensor(s) 138 placed all over each of the main body parts of the real-world AI Character 94, track the relative position of each display screen according to the physical movements of the real world AI Character 94 and changes in its position (x,y,z) and orientation (p,r,y) of its body parts, maintaining state information on the model coordinates and the world coordinates of the AI character parts.

As detailed also each surface display panel face 143 is part of a tiled display system, which is multi-touch screen system comprising of fifty or more surface display panel face 143 depending on the detail of the real world mesh for the real world AI Character 94 and its number of quads or triangles.

Physical interactions with the surface of the real-world AI Character 94 can be tracked across each of the surface display panel faces 143 based on a x, y, coordinate followed by a unique display ID or face ID for each display screen, the allows for example a user to physically touch with their finger a surface display panel face 143 and to stroke with their finger the real world AI Characters 94 touch screen surfaces where transformations to the rendered texture maps on each display screen touched maybe applied in the order and direction of the user's finger movements across the body of the real world AI Character 94.

For example when touching the head of an real world AI Character 94 and maintaining physical contact with the surface of the surface display panel face 143 if the user moves their finger downwards across the real world AI Characters 94 arm based on the captured touch screen inputs this could invoke a transformation to the virtual game object and 3D model of the real world AI Character 94 from which a line could be drawn on the displayed texture map on the each of the surface display panel faces 143 touched in accordance with the movements and the respective x,y coordinates of the users fingers.

Here based on captured touch screen inputs the rendering module 157 shall apply transformations to the rendered texture mappings and lighting effects on each of the surface display panel faces 143 of the real world AI Characters surface 94, which upon the loading of the pixels coordinates and values the frame buffer for each of surface display panel faces 143 the pixels for where the user touched could be illuminated by the light display module 142 to show depth and displacement as a result of physical contact in real-time.

This is similar to when a human touches a real world object applying pressure in which the surface is altered or displaced where like other natural forms of objects the physical interaction of a user touching a real-world game object or real-world AI Character 94 can change its surface temporarily or permanently, where the users fingers touching the surface of the surface display panel face 143 is detectable via touch screen sensor(s), which may invoke a change in the rendered displayed virtual imagery on the real-world AI Characters 94 surface display panel face 143 by its rendering module 157.

Theses touch-screens sensor(s) could be a type of ASIC sensor in which recognised inputs are passed by the client module to and processed by the rendering module 157 from this shall invoke a new texture-map for the touched surface display panel face 143 to be generated or other visual effects from which the image maybe rasterised, fragmented and loaded as RGB array or in memory bitmap into the frame buffer of the surface display panel face 143 that was touched, where the resulting imagery is then displayed according to pixel colour and coordinates.

This may use the display ID or face/surface ID of the real world AI Characters 94 real-worlds surface display panel face to map the new generated texture map image of the AI Characters virtual corresponding face ID/surface ID and our polygon of the updated 3D mesh or wireframe and rendered 3D model to the correct surface display panel face 143.

Note in this process the generated and updated 3D rendered image may be broken down back into individual triangles, polygons and faces in which for every surface or face of the virtual 3D model a 2D image is generated containing the texture-map changes or other visual effect changes such as lighting, which is then mapped back to display ID or face/surface ID of the real-world AI Characters 94 surface display panel faces 143, where corresponding fragmented 2D image is then loaded into the correct frame buffer for its corresponding real-world surface display panel face using a RGB array or an in-memory bitmap for example.

Here the Light display module 142 will then illuminate the pixels on the corresponding surface display panel face 143 that the user has touched, which may be seen by the user without any visual aid.

This is to add realism to the real-world game object or real world AI Character 94 being present in the real world.

Physical interactions on the touch screen surface of the real-world game object or real world AI Character 94 can also invoke an action in the game where a user could tap on the surface of an real world AI character 94 with their hand to get its attention, and use hand gestures in the air to invoke an action, or an action may be invoked directly through touch only.

It should be noted here also that each surface display panel face 143, is independently addressable and controllable in the display of virtual images where individual images or portions of images (triangles/polygons/quads) may be mapped to individual surface display panel faces 143 in the reconstructing of 3D images.

Alternatively, images may be mapped based on 2D coordinates, or vertices, or faces Ids, Surface Ids, Edges etc. from the outputted rendered images by the rendering engine to individual surface display panel faces, where each surface display panel face 143, has an addressable frame buffer.

Alternatively, a single frame buffer could be used in a tiled configuration in which the pixel coordinates span all of the different surface display panel faces 143, where every surface display panel faces 143 has a unique addressable pixel set of coordinates or RGB positions.

The Light Display Module 142 therefore may be used in this mapping process or the mapping process maybe abstract to the Light Display Module 142 where the output rendered images of rendering module 157 are rasterised and fragmented and then written for example to individual addressable frame buffers that each map one to one with a surface display panel face 143.

The display of textures or rendered images is similar to any normal display, except each display triangle is addressable in a tiled display configuration in which the physical display screens represent the faces of the object or real world AI Characters 94 3D model in the real-world and the virtual world used in the rendering pipeline.

Here the rendering pipeline performs the same functions as described previously such a ray tracing, rasterisation, fragmentation except the resulting output maybe individual 2D images for each face of a real world game object or real world AI Character 94 that is derived from its 3D model.

Each display panel also maybe represented an individual virtual game object or they may form a single virtual game object in which each physical screen represents a face of the virtual game objects 3D model.

Here lighting and shadowing effects are applied relational to other virtual game objects and real-world objects, where for example lighting effects from another virtual object such as moving IR Beam/IR Laser Beam may be applied based on the position of each of the tiled surface display panel faces 143 in terms of their x, y, z coordinates relative to the virtual game object IR Laser beam coordinates.

This could employ two methods the use of the real-world tracking coordinates to construct an approximate 3D model and its own virtual game object model coordinates relative to that of the moving virtual game object or Line Rendering of the IR Laser Beam, where each screen forms a face of the virtual game object of the real-world AI Character 94 or real-world object.

Alternatively, more computationally expensive, real-world coordinates of each screen could be tracked using sensor(s) that may include multiple GPS trackers, electro magnetic compasses, accelerometers, tilt sensors and gyroscopes for example to track the coordinate and orientation of each of the faces individually of the real-world AI Character 94 or object. Here offsets to the x,y,z coordinate values may applied based on the known relative position of each of the surface display panel faces 143 to that of the sensors position, to calculate the position of each surface display panel face 143.

Alternatively, multiple GPS trackers, electro magnetic compasses, accelerometers, tilt sensors and gyroscopes for example could be used to track the coordinate and orientation in which these are position on each key physical part of say the real-world AI Character 94 or real-world game object in which the system tracks for example the position and movement of the AI characters 94 arm using six degrees of movement or more matrixes, where based on this the system is able to formulate the position of the individual tiled surface display panel faces 143 on its mesh and apply for example specular lighting effects from other virtual game objects such as the IR Laser Beam.

Here using the world coordinates (x,y,z), directional vector and orientation (p,r,y) of AI Character 94 together its 3D coordinates and orientation the movements of its arm, relative to the world coordinates of the light source and its direction in the three dimensional space of the game, lighting effects can be applied by the rendering module 157. This allows directional lighting effects from other real-world game objects or virtual objects with reasonable degrees of accuracy to be applied to the moving AI Characters 94 body parts in which the coordinates and orientation of each surface display panel faces 143 may be formulated based on the sensor 138 readings relative to that of the light source during the rendering and display of the lighting effects.

The real-world AI Character 94 also features a Wifi Module 147 and bluetooth module 148, used for long range network connectivity and short range bluetooth network connectivity over IP between the real-world AI Character 94 and other real-world game objects/devices client modules, and the game server 88 or host 89 via the network 97 in the exchange of state information.

In addition the real-world AI Character 94, as shown in FIG. 8 may feature multiple adjustable rear facing cameras 162 mounted on individual plates which support the pan, tilt and rotation of the cameras, in which the cameras may be rotated from side to side and tilted up or down by the use of two or more motorised servos 163 controllable via a microcontroller or driver. This provides a 2-Axis FPV camera cradle head with a dual servo and steering gear in which based on the users orientation, position these may be adjusted.

This provides same functionality as described for the IR Shield Apparatus 90 in which based on the sensor readings and data for a users head position, orientation and eye gaze direction from the head and motion tracking module 29 and eye tracking 32 of other users augmented reality ("AR") display apparatus 1 or from the forward facing camera(s) of the real-world AI Character 94 using its spatial mapping and facial recognition capabilities of its gesture tracking module 159 and observer module 150, adjustments are made to the angle, rotation, orientation, tilt and pan of the rear-facing camera(s) 162 so as to display the correct view of the background scene on the front facing surface display panel faces 143, where the real-world AI Character 94 may appear invisible or semi-invisible to other users.

As depicted in FIG. 8, the AI Character 94 is powered by a lithium style battery 164 or other form suitable battery, in which the turning on or off of the device is operated via a power switch 165.

As depicted in FIG. 8, the real world AI Character 94 also features a number of software modules including a client module 156, collision response manager 161, rendering module 157, a gesture tracking module 159, a games engine 158.

The real-world AI Character 94 also features a number software programs and modules including an observer module 150 (using spatial mapping to see and identify objects in the real-world,), a device tracking module 151 (tracks sensor movements), a speech recognition module 152 which converts human spoken words to text captured via the microphones 132, a voice manager module 153 that generates artificial human like speech which is output via the speakers 133, a movement module 154 which controls the body movement of the AI.

The client module 156 is responsible for maintaining the real-world AI Characters 94 state during the game and providing state information to game server 88 or host 89 where there is a change in the state resulting for example from a hit detected on its IR Sensors 144 or computationally. It is also responsible for assisting the AI in the handling of all user inputs including voice commands via the device itself directly using its external microphones 132 with the support of the devices speech recognition module 152 and voice manager module 153.

The client module 156 is also responsible for the handling of sensor inputs and processing of these for the AI and the Movement Module 154. Here the client module 156 essentially acts as both the local game application in the handling of the state of the real-world AI character and the local game state by retrieving state information on other objects and users from the game server 88 and host 89. It also acts as the real-world AI Characters 94 middleware in the handling, processing and conversion of inputs between the modules and the AI itself as well as the hardware interface to the devices such as the Light Display modules 142 in the performing of the operations of the real-world AI Character 94 as detailed herein.

The observer module 150 provides as detailed the real-world AI Characters 94 view into the real-world and assists in its recognition and understanding of objects, surfaces and users through spatial mapping techniques. Here the observer module 150 shall generate surface data, volumetric data, geometric data and mesh data for example through use of the forward facing cameras 134 in the head section of the real world AI Character's 94 body.

This shall provide depth information, depth cues, object identification based on its points or vertices such as the identification of a table or chair that allows the real world AI Character 94 to navigate round these objects and interact with them.

As a real-world AI Character 94 moves around the game space and laser tag arena 98, new surface data and mesh data is provided allowing the AI Character 94 to understand changes that have occurred in the real-world such as a user is now in a different position than before.

As detailed mesh data shall provide detailed information on an identified object or a user that will include their model coordinates, vertices and world coordinates/vector position which maybe used in the targeting of users or objects during the laser tag game. Similarly mesh data of real-world objects, users and surrounding surfaces of the game space and/or laser tag arena 98 allows the real world AI Character 94 to navigate around the three-dimensional space of the game and to interact physically with other objects or users.

The Collision manager 161 consists of two main modules the Collision detection module, and the collision response module.

It is responsible for detecting collisions or intersections of two or more objects, as well as the collision of other objects, users whether real or virtual with the real-world AI Character 94 itself.

This uses a variety of techniques to determine a collision the same as the other instances of the Collision Manager 161 on other real-world game objects and on the users augmented reality ("AR") display apparatus 1.

A key difference here in the usage of the Collision Manager 161 is this may not only invoke as a collision response a change in say the displayed rendered texture maps on the real-world AI Characters 94 surface display panel faces 143 but it may also invoke a real-world physical movement by the Real world AI Character 94 such as the previously detailed rag doll simulation method in which the Collision manager 161 shall work with both the rendering module 157 and the movement module 154 in the physical simulation of a rag doll simulation.

The rendering module 157 of the real-world AI Character is responsible for the rendering operations and performing of the rendering pipeline routines using its processing units 135 including GPU, CPU and memory 157 to perform these operations.

All renderings in this context relate to the display of 2D or 3D virtual images and video on the surface display panel faces 143 of the AI Characters body as previously detailed.

This includes the rendering of texture maps for display on each of the individual surface display panel faces 143, as well as the display of lighting effects such as diffuse and specular lighting effects resulting from the hit of IR Laser Beams on the real-world AI Characters physical surfaces detectable by the IR Sensor 144 or computationally via the Collision Manager 161 using a number techniques such those previously detailed such hitscan or raycasting using vector and parametric equations of a line, or frame by frame analysis or time of impact (TOI) analysis etc.

The rendering module 157 supports all forms of rendering methodologies including ray tracing, ray casting, scanline rending, radiosity etc. It also supports the display of all forms of visual and lighting effects on the surface display panel faces 143, including specular lighting, diffuse lighting, decal effects (scorch marks/blood etc.), subsurface scattering (SSS), shading, shadows etc. the same as all other instances of the rendering module support on the other real-world game objects, users augmented reality ("AR") display apparatus 1, and other wearables such as an IR Mixed Reality Suit 93 or IR Mixed Reality Vest 92.

The movement module 154 as detailed is responsible for all physical movements by the real-world AI Character 94 in the invoking of its actuators. Movement is based on providing coordinates (x,y,z) for each part of the real-world AI Characters 94 body in which motorised actuators 129, joints 131, manipulators 130 and Motor shafts 140 are used to move the body parts accordingly.

This uses 3d coordinates (x,y,z) and model coordinates that are mapped to the physical body moving parts and joints 131 of the AI Character 94, in which a virtual 3D model of the AI character 94 which is geometrically exactly the same as the real AI characters 94 body is used together with its assigned virtual game object to apply transformations that are simulated in the rendering of the AI Character's 94 texture maps on its surface display panel faces 143 and in the rendering of game scenes applied to the AI Character 94 such as rag doll simulation, which invoke a physical re-enacting of the rag doll rendered scene by the AI Character 94 through its movement module 154 in which the sequence of the body movements in terms of the sequence of 3D/model coordinates (x, y, z) for the rag doll simulation are processed by the moment module 154, which translates these to joint movements in the same ordered sequence.

As detailed multiple six dimensional matrixes or greater up to 36 degrees for example may be used in which based on a sequence of coordinates x,y,z and orientations p,r,y, for each body part such as the fingers of the real-world AI Character 94 hand may be processed by the movement module 154 and translated in physical movements with the use of the actuators 129, in which complex hand movements may be simulated.

The speech recognition module 152 is responsible for handling of all spoken speech command where the key responsibility of the speech recognition module 152 though shall be in the translation of spoken voice command inputs in to text formed inputs that are used by the real-world AI Character client module 156 and AI to invoke an action or response.

This may use different forms of models, methods and techniques such as language modelling or Hidden Markov models or other forms of widely available models, methods and techniques.

The voice manager module 153 is a form of speech synthesis, which supports the artificial production of human speech by the real-world AI Character. This is based on text-to-speech (TTS) system, where text input from the AI is analysed and converted into audible speech.

Alternatively this may use symbolic linguistic representations like phonetic transcriptions to generate audible speech. Here the voice manager module 153 like a TTS system shall first convert the text into written out worlds using the text that contains symbols as process referred to as normalisation, pre-processing or tokenisation. Phonetic transcriptions are then applied to each of the words. The words are then divided and marked in prosodic units in which this process is referred to text-to-phoneme.

This then makes up the symbolic linguistic representation which is output to the back-end part of the Voice Manager module 153 referred to as the synthesiser where the symbolic linguistic representation is then converted into audible speech sound which may be played back via the real world AI Characters 94 speakers 133.

The voice manager module 153 backend process may entail also the computation of pitch contour and phone durations also referred to as target prosody which is applied to the output audible speech sound.

Synthesized speech maybe created by the voice manager module 153 by concatenating pieces of recorded speech which may be stored in a database or datastore.

The gesture tracking module 159 interfaces with the client module 156 and observer module 150 to capture users specific physical hand gestures and movements through forward facing cameras. These physical hand gestures motions detected by the observer module 150 may be used to invoke an action by the real world AI Character 94. Gesture recognition algorithms may be used to detect specific physical hand gestures by other human users.

These identifiable gestures maybe passed to the client module 156 in the processing of user inputs as recognised hand gestures and provided to the AI software for actioning an appropriate response according to its programmed logic and reinforcement learnings.

The device tracking module 151 is responsible for maintaining state information on the AI Characters 94 body parts world coordinates/position in three dimensional space expressed as three dimensional Cartesian Coordinates (x,y,z) and orientation expressed as pitch, roll and yaw (p,r,y) and together with its directional heading expressed as a direction vector together with other state information such as acceleration, velocity and elevation. This uses the multiple sensors 138 on the body of the real world AI Character 94 to track the individual body movements.

This state information is provided to the game server 88 or host 89 via the network by the devices Client Module 156 in which the game server 88 or host 89 maintains state information on all real-world users, game objects and AI Characters together with state information on all virtual game objects, 106 virtual AI Characters 105 and remote users 107 to support the detailed functions as disclosed within the embodiments of this invention.

It is also used by the local modules such as the rendering module 157 and the collision manager 161 in the placement of lighting effects for example according to the relative vector position and orientation of other objects that may be emitting light and in the determination of collisions with other real-world game objects, users, AI character's or virtual game objects, AI character's or remote users.

In addition to the listed main software modules, the real-world AI character 94 may also feature facial recognition software used in determining responses when interacting with users.

Figure 9:
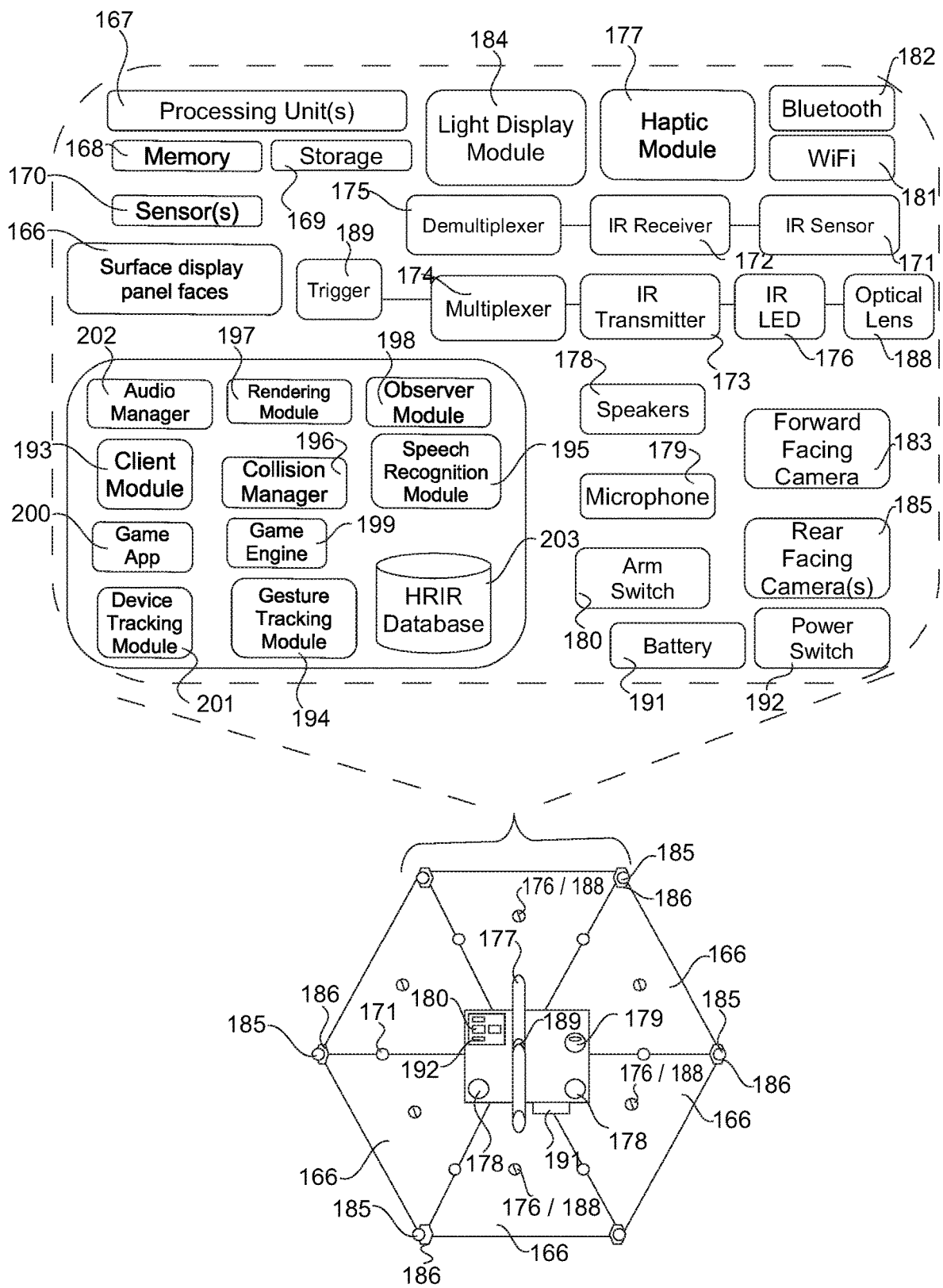
FIG. 9 shows an IR Shield Apparatus 90 that is a real-world game object that may be used in the laser tag and mixed reality video game, that consists of multiple surface display panels faces 166 that form a rendered 3D object in the real-world, multiple rear facing cameras 185, sensors 170, IR Sensors 171/IR Receivers 172 and a form of computer among other parts.

FIG. 9 shows an IR Shield Apparatus 90 which is a physical handheld real-world game object and device that features a circular shield in the form of multiple surface display panel faces 166 that may be a form of organic display such as OLED/TOLED in which the device is capable of rendering and displaying texture maps, lighting effects, virtual images, animations, video and hits on physical surface display panel faces 166 of the device which may be seen without any visual aid by the naked eye.

The IR Shield Apparatus 90 may be used to protect users from incoming IR Beams/IR Laser Beams, where upon a user activating the shield via voice command or gesture input this shall disable the reception or recognition of a hit detected by an IR Sensor 171 and IR Receiver 172 or computationally by collision detection methods.

The IR Shield Apparatus 90 may be paired with the users other real world game objects such as their IR Laser Gun Apparatus 47, IR Mixed Reality Vest 92 and/or IR Mixed Reality Suit 93. It may also be paired with the users augmented reality ("AR") display apparatus 1, for supporting the features detailed herein.

This IR Shield Apparatus 90 device as shown in FIG. 9, features a set of processing units 167, Memory 168, Storage 169, Sensors 170 (including a tilt sensor, accelerometer, gyroscope, GPS tracker etc.), one or more IR Sensors 171, an IR receiver 172, an IR Transmitter 173, a multiplex 173 a demultiplexer 175, a haptic module 177, Multiple IR LEDs 176 positioned at different orientations on the physical device all capable of projecting IR Beams/IR Laser Beams at different angles. A series of optical lens pieces 188 and lens tubes pieces 187 support the projecting of IR Beams/IR Laser Beams, where the device features one optical lens piece 188 and lens tubes for each of the devices IR LEDs 176.

The IR Shield Apparatus 90 features multiple surface display panels faces 161 which form the main outer and inner structure of the device. The device also features external speakers 178, a bluetooth 182 and wifi module 181, an arming switch/button 180, a microphone 179 for voice control, forward facing cameras 183 mounted externally on each main exterior face at differing angles and orientation, and a light display module 184.

In addition, the device features multiple adjustable rear facing cameras 185 mounted on individual plates which support the pan, tilt and rotation of the cameras, in which the cameras may be rotated from side to side and tilted up or down by the use of two or more motorised servos 186 controllable via a micro-controller or driver. This provides a 2-Axis FPV camera cradle head with a dual servo and steering gear in which based on the user's orientation, position these may be adjusted.

An inductive loop transmitter may be connected also to a plurality of IR LEDs and IR Transmitters where the IR Laser Shield Apparatus 90 features multiple IR LEDs for projecting in multiple directions IR Beams/IR Laser Beams.

As described the IR Shield Apparatus 90 device and real-world game object also features a set of processing unit(s) 167 consists of one or more Central Processing Unit(s) (CPUs), and Graphics Processing Unit(s) (GPUs) where the CPU or CPUs shall be responsible for executing and handling of the preprogrammed code as well as the processing of all program instructions, system events, inputs and outputs provided by the core components and modules of the device. In addition, the processing unit(s) 167 shall handle all logic, control, arithmetic, and I/O Input or output operations, which will be handled in accordance to the instructions of the game and corresponding device's module's coded instructions as described herein.

The CPU or CPUs shall also be responsible for executing all the programmed instructions and logic of the software modules of the device. The GPU's may be used in the mathematical and rendering operations providing hardware acceleration in the rendering of texture maps for example for display on the surfaces of the device's display screens.

The DSPs may be used to support the processing of audio files for creating 3D spatial sound and perceptual based 3D sound localisation effects. The IR Shield Apparatus 90 device memory 168 may be a form volatile memory or random access memory (RAM) for performing high speed instructions by the CPU such as DRAM, fast CPU cache memory and SRAM or other forms of volatile memory or example used as the main memory of the system.

Additional memory may be provided via the GPU as dedicated graphics memory or may be commonly used between the CPU and GPU. The memory 168 may also consist of non-volatile memory also for performing BIOS and firmware operations such as flash memory, ROM, EPROM, or EEPROM memory, where flash memory may be used as a secondary form of memory for example. The flash memory may be a type of NOR Flash.

Files and data may be stored also the storage memory 169 of the device together with the binaries, executable files of the programs and all corresponding files. This shall include the Operation System (O/S) software and all device drivers for the device hardware appliances. The storage may be in the form of a SSD flash based drive or a conventional hard disk such that is HDD based, due to the high performance of SSDs over HDD the preference would be to use though SSDs. Other forms of non-volatile memory may also be used as storage 169.

As shown in FIG. 9, the IR Shield Apparatus 90 device also consists of several sensor(s) 170 including a multi-axis accelerometer, gyroscope, tilt sensor, motion sensors. In addition, as illustrated by FIG. 9 the IR Shield Apparatus 90 device features an also an GPS Tracker, a Solid state compass, an Electromagnetic compass/digital compass and a Magnetic compass or magnetometer.

Furthermore, the device may features an inclinometer, pedometer, speedometer, altimeter and a MEMS Barometer. The IR Shield Apparatus 90, device sensors 170, may also feature a dead reckoning module. Here the generated state information from the sensory data is passed to the game server 88 or host 89 via the network 97 by the devices client module 193 for maintaining state information and is handled also by the client module 193 locally in the performing actions resulting from detected sensor inputs in which it may activate or illuminate the devices IR LEDs dependent upon the detected sensory input.

These sensors are used to track the devices world coordinates expressed as three dimensional Cartesian coordinates or points on the x,y,z; the orientation of the device expressed as pitch, roll and yaw (p,r,y); directional heading which may be expressed as directional vector and elevation from ground level together with other physical attributes such as velocity, acceleration etc. used in the determination of collision responses and in the computational operations of the game as well as the activating of the devices IR LEDs by the client module 193.

As depicted in FIG. 9, the IR Shied Apparatus 90 features multiple Infrared Light Emitting Diodes ("IR LEDs") 176 and optical lens pieces 188 at the end of each lens tube arranged around the faces of the devices in which each IR LED 176 and its optical lens piece 188 is arranged at a different position and orientation to one another. This supports the projection of IR Beam/IR Laser Beams in multiple directions.

The illuminating or activating of the IR LEDs 176 may be controlled by the client module 193. Alternatively, the IR LED 176 maybe a form of infrared laser diode as opposed to the stated infrared light emitting diode.

Similar to the IR Laser Gun Apparatus 47, the illuminating of the IR LEDs may be hardware driven or software driven, where the IR Shield Apparatus 90 also consists of a series of electrical elements on its circuit board not shown in FIG. 9 that includes a transistor, one or more capacitors and a series of electrical relays used in the process of discharging the IR Beam/IR laser beam via the devices IR LEDs 176, optical lens tubes 187 and optical lens pieces 188.

Where in presented IR Shield Apparatus 90 device configuration, the resulting interrupt or I/O inputs/output may be passed via a input/output subsystem responsible for the handling of all inputs and outputs via a bus to the CPU microprocessor which based coded instructions of the client module 193 embedded software, the CPU microprocessor shall process the I/O inputs from the bus resulting from the users use of the physical trigger 189 or button 190, and shall activate the IR LEDs 176, of the IR Shield Apparatus 90 by invoking the electrical charge of the capacitor to be dispersed for example.

This maybe supported by passing an API or system function call to the IR LED display driver which as instructed which shall turn on the IR LED 176 resulting in an electrical charge being dispersed by a capacitor through the circuitry of the device via series of switches and electrical relays to the IR LEDs 176 which shall be illuminated, where the IR Light beam then passes through the optical lens pieces 188 mounted at the end of each of the IR Lens tubes 187 of the IR Shield Apparatus 90 and outward. Here multiple capacitors may be used to support the multiple IR LEDs 176 of the device which may be activated by a single trigger event or could be activated independently.

Here the CPU may communicate with the IR Shield Apparatus 90 device through a defined I/O interface. In addition, I/O inputs may be mapped in memory in the form of a memory-mapped I/O by the device drivers for invoking the described different functions in the activating of the device IR LEDs 176 or haptic module 170 of the IR Shield Apparatus 90 based on the varying I/O inputs.

In the case of using a manual trigger 189 no Input/output subsystem or bus may be needed since this may all be handled purely with hardware in which the through a series of electrical switch relays, transistors and capacitors it is possible to invoke as a result of the user pulling the trigger the release of an electrical charge which may be dispersed by the capacitor thorough the circuitry of the devices main board in which this may invoke the IR LEDs 176 to be illuminated and for the IR Beam/IR Laser Beam light to pass through the of the IR Shield apparatus 90 onto another users IR Sensor if in range. Where upon the receiving users IR Sensor sensing IR emissions in the form of a light beam from the other users IR laser beam, the IR signal shall result in the registering of a hit.

It should be noted that the client module 193 based on identified sensory data outputs, voice command inputs and hand gestures is capable of producing I/O inputs which may be processed by the CPU and mapped to specific I/O inputs supported by the devices I/O Interface in the invoking of the activation of the devices IR LEDs 176 and other hardware such as the haptic module 177.

The IR Shield Apparatus 90 also features an IR transmitter 173 and multiplexer 174 used for the transmitting of state information or classification information multiplexed in the IR signal and transmitted via the IR Beams/IR Laser Beams by the devices IR Transmitter 173 and IR LEDs 176, where as a result this may invoke a different action by the receiving devices client module in which the IR Beam/IR Laser Beam was detected on their IR Sensor and the IR single was received and demultiplexed by their IR receiver and demultiplexer.

The same action may be invoked by the state information retrieved from the game server 88 or host 89 via the network 97 as an alternative method.

Here the detailed Infrared ("IR") Transmitter 173 maybe part of the light emitting diode (LED) 176 which emits infrared radiations which are invisible to the human eye or it may be separate as shown in which the IR Transmitter 212 consumes the electrical current that is dispersed to power the IR LED 176 in which the IR Beam/IR Laser Beam and IR signal containing IR data is then transmitted via the IR LED 176 along the devices lens tube (not shown in FIG. 9) and outward from the optical lens piece 188 onto a target IR Sensor and/or IR Receiver.

In addition, the IR transmitters 173 maybe modulated to produce a particular frequency of infrared light. It should be noted also that an IR Transmitter 173 maybe used as detailed for transmitting of data over an IR signal/IR Beam where as an IR LED in its self doesn't not necessarily have this capability if it is a basic on/off type, hence why these items have been shown separately in FIG. 9. They could though as stated be part of a single IR Transmitter/IR LED component hardware module on the device's hardware circuit design.

The device also features a series of IR Sensor(s) 171 and IR Receivers 172 for detecting hits. These IR Sensors 171 maybe used in the determination of hits from other users IR Laser Gun Apparatus 47, for example which may invoke an action by the devices client module 193 and collision manager 196 as a result of a hit invoking a change in the rendered displayed texture maps via the devices rendering module 197 and light display module 184 in which decal effects such as scorch marks and/or diffuse lighting effects maybe displayed on the devices surface display panel faces 166 based on the determined collision point (x,y,z).

Alternatively, as a result of the detection of a hit via the devices IR Sensors 171, this may invoke a change in the display of augmented virtual images over the users IR Shield Apparatus 90 via the client module 28 and rendering module 27 of the users augmented reality ("AR") display apparatus 1, seen through user's micro-displays 3 as augmented virtual images showing decal effects and/or diffuse lighting effects. This maybe based on the registering of a hit via network 97 on the game server 88 or host 89 by the users IR Shield Apparatus 90 devices local client 193 upon the hit being registered via the devices IR Sensors 171, in which the client module 28 of the users paired augmented reality ("AR") display apparatus 1, shall retrieve the hit information via the network 97 from the game server 88 or host 89 and shall display the augmented virtual images showing decal effects or defuse lighting effects over the real-world users IR Shield Apparatus 90 based on the collision point (x,y,z).

Alternatively hit information may be retrieved via the local bluetooth network directly from the users IR Shield Apparatus 90 client module 193 by the client module 28 of the users paired augmented reality ("AR") display apparatus 1, to support the same functionality of displaying augmented virtual images of decal effects and/or diffuse lighting effects over the real-world users IR Shield Apparatus 90 generated by its rendering module 27 and displayed via the user's micro display 3.

As yet a further alternative, as a result of the detection of a hit via the devices IR Sensors 171, the game server 88 or host 89 may project decal effects or defuse lighting effect virtual images over the real-world users IR Shield Apparatus 90 based on the collision point (x,y,z) via the external projectors 96 of the Laser Tag Arena 98 from the recorded hit information provided by device's client module 193 provided via the network 97 to the game server 88 or host 89 upon the hit being registered via the devices IR Sensors 171. The 3D projection of these virtual imagery effects and lighting effects over the users IR Shield Apparatus 90 may be supported by the use of the previously detailed projection mapping/video mapping/spatial augmented reality capabilities of the display projection module 122 of the game server 88 or host 89.

Note in all cases and the detailed methodologies of displaying decal and diffuse lighting effects over the real world users IR Shield Apparatus 90 based on the collision point (x,y,z) whether via a users micro display 3, external projectors 96 or directly on the devices surface display panel faces 166, transformations may be applied based on changes in the devices position (x,y,z) and orientation (p,r,y) following the hit to adjust the displayed decal and defuse lighting effects accordingly so as to maintain the correct placement of the augmented virtual imagery over the moving real-world users IR Shield Apparatus 90.

In the case of the display of decal and defuse lighting effects over users IR Shield Apparatus 90 via a user's augmented reality ("AR") display apparatus 1, micro-display 3 additional transformations maybe applied to the virtual images of the decal effects and defuse lighting effects to account for changes in the users head position (x,y,z), orientation (p,r,y) and gaze direction where the local rendering module 27 using sensory data from the users augmented reality ("AR") display apparatus 1 sensors 9, supplied by the devices head and motion tracking module 29 and eye tracking module 32.

It should be noted that the collision point is a positional vector and a 3D coordinate (x,y,z) of the IR Sensor 171 on the 3D model of the IR Shield Apparatus 90 for where the IR Beam/IR Laser beam physically was detected by an IR Sensor 171 in which each IR Sensor 171 has a unique ID and addressable 3D coordinate on the device. This allows virtual images of decal effects and diffuse lighting effects to be displayed in precise location to that of the precise collision position and location of where the real IR Beam/IR Laser beam hit the users IR Shield Apparatus 90.

Alternately based on the formulated projectile of the IR Laser beam/IR beam by the collision manager of the respective display device, the collision point as 3D coordinate (x,y,z) may be determined without the need of the IR Sensor 171 same as detailed for the IR Laser Gun Apparatus 47 in which similar to before virtual images of decal effects and diffuse lighting effects to be displayed in precise location to that of the precise collision position and location of where the real IR Beam/IR Laser beam hit the users IR Shield Apparatus 90. Again, this applies in all cases whether the decal and defuse lighting effects is displayed over users IR Shield Apparatus 90 via a user's augmented reality ("AR")

display apparatus 1, micro-display 3, or directly on the surface display panel faces 166 or via the external projectors 96.

Here the projectile of the IR Laser Beam/IR Beam of a user's IR Laser Gun Apparatus 47, IR Shield Apparatus 90 and/or IR Proximity Mine Apparatus 91, as detailed previously for the IR Laser Gun Apparatus 47, is based on the devices orientation (p,r,y), vector position/world coordinate (x,y,z) and directional vector.

In the case of the real-world game object and device that fired the IR Laser Beam/IR Beam being an IR Shield Apparatus 90 and/or IR Proximity Mine Apparatus 91 where these devices have multiple IR LEDs and optical lens at varying orientation (p,r,y) and coordinates (x,y,z) on the device structure, here multiple IR Laser beams/IR Beams each with varying orientation (p,r,y), coordinates (x,y,z) and directional vector for each IR LED are formulated in the formulation of a determination of a hit.

In this process differing offsets are applied by the collision manager of the respective display apparatus to the devices core orientation (p,r,y), world coordinates (x,y,z) and directional vector are applied in the calculation of each IR LEDs based on the known coordinates (x,y,z), orientation (p,r,y) and directional vector of each IR LEDs on the physical devices structure and its relative 3D model for its paired virtual game object.

This allows precise determination of the projectile and points of intersection/collision positions (x,y,z) of the IR Beams/IR Laser Beams from each of the IR LEDs of a user's IR Shield Apparatus 90 and/or IR Proximity Mine Apparatus 91.

These same methodologies detailed for displaying decal effects and defuse lighting effects over a real-world game object IR Shield Apparatus 90 apply to all other real-world game objects including users IR Laser Gun Apparatus 47, IR Mixed Reality Suit 93, IR Mixed Reality Vest 93 or a real-world AI Character 94 for example.

The IR Sensors 171 may also serve as an input to the device and its client module 193 where upon detecting a hit this may activate the IR LEDs of the device or could disable them.

It should be noted that as previously detailed the detecting hits may occur as a result of the IR Sensor(s) 171 detecting Infrared ("IR") light emissions and IR radiation from an IR Beam/IR Laser Beam projected by an IR LED or infrared laser diode of another users real-world game object such as an IR Laser Gun Apparatus 47 or IR Shield Apparatus 90 or IR Proximity Mine 91 onto the IR Sensor(s) 171.

These IR Sensors like those of other detailed devices in the embodiments of the disclosed invention herein, maybe a form of an active IR Sensor or passive IR Sensor in the form of fiber optic sensor, photo optic sensor, infrared detectors and/or photo-detector.

In addition, the IR Sensor 171 may be part of the IR Receiver 172 which may be a form of photodiodes or phototransistors.

The IR Sensor maybe a form of active or passive infrared sensor in this case. The device also features IR receiver 172 and demultiplexer 175 for receiving data via the IR Beam/IR Laser Beam, which may also serve as an input where the resulting detection of a hit via the IR Sensor 171 where based on the raw binary data in the IR signal this may invoke a different action in the illuminating and activating of the IR LEDs or the disabling of them.

The same action may be invoked by the state information of the device which fired the IR Laser Beam retrieved from the game server 88 or host 89 via the network as an alternative method.

As previously detailed the IR Receiver(s) 172 are a form of infrared receivers that may also be referred to an IR Sensor as they detect radiation from the form of an IR Transmitter. Here it has been intentionally shown as a separate component of the devices circuit board in FIG. 9, although they could be part of the same component.

This has been shown separately simply to distinguish between the IR Sensor 171 simply being responsible for detecting emissions from the IR Light in the determination of a hit as an on/off determination, whereas the IR Receiver 172 is able to detect difference in the radiation and particular frequencies from an IR Transmitter.

In addition, an IR Receiver 172 can be used for receiving transmitted data over an IR signal/IR Beam where as an IR LED in its self doesn't not necessarily have this capability if it is a basic on/off type of IR Sensor that works with a basic IR LED hence why the IR Receiver 172 shown as separate to the IR Sensor 171. Again, though this could be combined if desired.

The IR Receiver 172 may be a form of photodiodes or phototransistors. The IR Receiver(s) 172 may also be modulated or configured to operate based on a specific wavelength and voltage where when used with a matching wavelength and voltage configuration of an IR Transmitter hits maybe detected.

Signal processing maybe done by amplifiers where the signal is very small. The set up of the IR Receivers 172 and IR Sensors 171 maybe configured as a direct Incidence.

As depicted in FIG. 9 the IR Shield Apparatus 90 device consist of multiple surface display panel faces 166 which may be a form of organic display such as an organic light emitting display (OLED), a Liquid Crystal on Silicon (LCOS) or another form of Liquid Crystal Display LCD. Multiple panels may be arranged in a tiled or 3D mesh configuration that form the real-world faces and 3D model of the IR Shield.

Each surface display panel faces 166 is driven by circuitry together with the display drivers, and are powered by the main board circuitry via connectors. The light display module 184 controls the display of imagery and pixels on each surface display panel faces 166.

The surface display panel faces 166 may be connected directly to the devices PCB through an internal display port ("iDP") where the display maybe soldered directly to the PCB or may be connected via another form of standard based DisplayPort and digital display interfaces such as an embedded display port ("eDP"), Slim port, HDMI, USB, MIPI DSI or a DVI link etc.

The surface display panel faces 166 are arranged to form a partial or full 3D mesh over the real-world device and game object which is physically represented as a 3D rendered game object in the real-world, where multiple triangular or quad shaped display screens cover the main entire inner and outer surfaces and faces of the IR Shield Apparatus 90 three dimensional shape and geometric structure.

This forms a 3D mesh visible to users during a laser tag game in the real-world with no visual aid, in which the real-world 3D mesh is formed of display panels overlaid on the physical real-world IR Shield Apparatus 90 device/game object which is formed of real-world vertices/points, edges, faces, polygons and surfaces in three-dimensional space of the real-world. Here like the IR Laser Gun Apparatus 47 a virtual game objects which has a polygon-based mesh maps directly to in terms of its three-dimensional space, edges, faces, polygons and surfaces of the real-world mesh and geometric shape and form of the IR Shield Apparatus 90.

Here the devices real-world 3D mesh maybe a form of polygon-based mesh that derived from the multiple triangular or quad shaped surface display panel faces 166 which cover the main entire inner and outer surfaces and faces of the IR Shield Apparatus 90.

Alternatively, they may be a representational wireframe polygon-based model or another suitable polygon-based mesh form. 3D rendered images may be formed through the display of 2D images and applying of texture maps to each of the multiple surface display panel faces 166 on the devices physical faces, in which the multiple 2D images and rendered texture-maps are displayed on the devices faces via their respective vertices coordinates for each of the devices faces, to form a 3D rendered image that is physical in presence in the real world.

Each of the display screens or surface display panel faces 166 covering different faces of the IR Shield Apparatus 90 maybe in arranged like the IR Laser Gun Apparatus 47, in tiled configuration covering the object fully or partially. Where the object is fully covered in display screens this creates a real-world 3D mesh as described upon which images can be rendered and displayed. Here each surface display panel faces 166 may represent an addressable triangle or polygon or quad which forms also the paired virtual game object 3D model of the real-world device and real-world game object.

In addition, as with normal virtual-game objects, complex 3D models can be made up of many triangles or polygons, where during the rendering process these map to faces of the virtual game objects 3D model, which in the embodiment of the invention described herein these may map to actual real-world IR Shield Apparatus 90 and game object surface display panel faces 166 thus recreating a fully rendered 3D model which is physical in presence in the real-world in which users can see the moving IR Shield and its 3D structure together with its rendered surface texture mapping and other visual effects without any visual aid.

The same as detailed for the IR Laser Gun Apparatus 47, this achieved through a process of mapping the paired virtual game objects 3D model points or vertices, polygons/triangles, faces and their corresponding texture maps to individual surface display panel faces 166 of the IR Shield Apparatus 90 device and real world game object, where based on pixel coordinates and a face ID attributed to each display panel, this allows complex 3D shapes to be recreated in physical form in the real-world, where two states of the real world game object and that or virtual-game world coexist and are maintained computationally.

Here like also the IR Laser Gun Apparatus 47, the output 3D model of the IR Shield Apparatus 90 may be broken back down to individual rendered faces mapped back to each of the surface display panel faces 166 for which each image be rasterised, fragmented in which the outputted individual pixel RGB array or in-memory bitmaps get written to the frame buffer for each of the individual mapped surface display panel faces 166 to that of the faces of the corresponding previously rendered model in the matrix and rendering operations of the device.

Alternatively, like a 3D model, the IR Shield Apparatus 90 device and real-world game object display panels similar to previously detailed may also be arranged as quads where quads are used to form its paired virtual game object structure. In this configuration it is the cumulation of all of the triangular or quad surface display panel faces 166 and each of their x, y, z points that forms the 3D model coordinates and points of the IR Shield Apparatus 90 device in the real-world.

Same as previously detailed also, here the rendering pipeline performs the same functions as described previously such a ray tracing or ray casting as well as rasterisation, fragmentation etc. except the resulting output maybe individual 2D texture map images for each face of the device's surface display panel faces 166 that are derived from its 3D model in the form of individual pixel RGB array or in-memory bitmaps which get written to the frame buffer for each of the individual mapped surface display panel faces 166 to that of the 3D model faces in the matrix and rendering operations of the device.

It should be noted here also that each surface display panel faces 166, is independently addressable and controllable in the display of virtual images where individual images or portions of images (triangles/polygons/quads) may be mapped to individual surface display panel faces 166 in the reconstructing of 3D images. Alternatively, images may be mapped based on 2D coordinates, or vertices, or faces Ids, Surface Ids, Edges etc. from the outputted rendered images by the rendering engine to individual surface display panel faces, where each surface display panel faces 166, has an addressable frame buffer. Alternatively, a single frame buffer could be used in a tiled configuration in which the pixel coordinates span all of the different surface display panel faces 166, where every surface display panel faces 166 has a unique addressable pixel set of coordinates or RGB positions.

The light display module 184 therefore may be used in this mapping process or the mapping process maybe abstract to the light display module 184 where the output rendered images of rendering module 197 are rasterised and fragmented and then written for example to individual addressable frame buffers that each map one to one with a surface display panel faces 166.

The device also features one or more light display module(s) 184, which controls the illumination of pixels and the display of the resulting light from virtual images that cover the faces and surface display panel faces 166 of the IR Shield Apparatus 90.

This module reads the pixel colours from the frame buffer for example together with their pixel coordinates for each of the surface display panel faces 166 that make up its 3D mesh and invokes the illuminating of the each of the display panel the LEDs in the case the display panels are form of organic display panels.

The surface renderings are projected by the light display module 184 on the display panels using Light Emitting Diodes (LEDs) where the display panels are a form of organic light emitting displays (OLED). The display maybe back-light also with further LEDs. The display could alternatively be a form LCOS or LCD that is made of a glass or polymer material in which the light display module(s) 184 may activate the display of each of the surface display panel faces 166.

As shown in FIG. 9 the device features multiple adjustable rear facing cameras 185 mounted on individual plates which support the pan, tilt and rotation of the cameras, in which the cameras may be rotated from side to side and tilted up or down by the use of two or more motorised servos 186 controllable via a microcontroller or driver. This provides a 3-Axis FPV camera cradle head with a dual servo and steering gear in which based on the user's orientation, position these may be adjusted dynamically by the client module 193.

The rear facing camera(s) 185 are on adjustable mountable plate, that has motorised mechanism for adjusting their angle, tilt and rotation on a 3 axis according to orientation and position of other user's heads and their gaze direction, where based on the Sensor(s) 9 readings and that of other user's eye tracking data from the head and motion tracking module 28 and eye tracking module 29 from the uses augmented reality ("AR") display apparatus 1, or that of the tracking data from the game server 88 or host 89 using its facial recognition and spatial mapping capabilities, the position of the rear facing cameras may be adjusted in realtime relative to the angle of the other user's eye direction by tilting or rotating the rear camera(s) position to represent the users gaze direction (also referred to as the point of gaze), head position an orientation.

This provides means to display on the users IR Shield Apparatus 90 video of the background scene relative to the other user's gaze, eyes and head position and orientation in which the device can appear invisible and thus, users behind the IR Shield Apparatus 90 can appear invisible to other users providing yet a further tactile element to the game play.

This uses the eye tracking data from the users augmented reality ("AR") display Apparatus 1, in which the users directional gaze, head orientation and positional data may be used for nearby users which is retrievable from the Game Server or Host or the other users Augmented Display Apparatuses directly to adjust the tilt and rotation of the rear cameras 185 to match the users directional gaze and head position and orientation.

Returning briefly to FIG. 1A and FIG. 1B, here the other users gaze may be formulated as a directional vector which is determined by the eye tracking module 29 of the users augmented reality ("AR") display apparatus 1, using the inward facing cameras 10L, 10R. This may also capture the orientation of the other users eyes, shape of the pupil and if the user is cross eye'd where they are focusing on an object in close proximity which may be used also in this process. The other users head position may be expressed as a vector position, or world coordinate/three dimensional Cartesian coordinate (x,y,z) and the users head orientation may be expressed as three values representing the pitch, roll and yawl of the users head (p,r,y) on a suitable second axis.

Based on these values retrievable from the users augmented reality ("AR") display apparatus 1, directly via the network 97 or retrievable from the game server 88 or host 89 as part of the user maintained state information that is provided by the client module 28 of the each users augmented reality ("AR") display apparatus 1 over the network 97 to the game server 88 or host 89, the local client module of the IR Shield Apparatus 90 may adjust the rear facing cameras 185 tilt, orientation (p,r,y) and directional heading (x,y,y) to align with the users directional gaze or their point of gaze so that the user sees the view behind the user as if the user holding the IR Shield Apparatus 90 and the device itself didn't exist.

This provides semi-invisibility capability which adds a novel dynamic to the game play and laser tag. Here the head position and direction maybe added to eye and head direction to determine gaze direction. Eye tracking and head tracking techniques may be combined or used separately in this process. Where multiple users are in front of the IR Shield Apparatus 90, the client module 193 of the device may attempt to segregate different surface display panel faces 166 according to the different users head and eye positions and orientation as well as each users directional gaze.

Where there is an overwhelming number of users in close proximity in which each of their gaze directions cannot be satisfied the client module 193 will priorities the users nearest to the IR Shield Apparatus 90 vector position in the hope that the users behind the other users don't notice the user hiding behind the IR Shield Apparatus 90.

Glitches maybe seen as a result of their being many users in which the client module 193 may attempt to rapidly adjust the rear cameras 185 tilt and rotation but this is deemed acceptable since it adds to the element of play to the game where the goal here is not complete invisibility but semi-invisibility enough to provide a tactical and fun element to the user of the IR Shield in the game.

Alternatively using external camera(s) 95 in the laser tag arena 98 or the forward facing camera(s) 183 of the IR Shield Apparatus 90 itself could be used to detect the users gaze in which the rear facing camera(s) can be tilted and orientated to match the direction of the users gaze and eyes and head orientation to make the device appear invisible where the other user sees only the behind scene relative to their eye's directional perspective and that of their head position and orientation.

This may be supported by the devices observer module 198 spatial mapping, facial recognition and eye tracking software capabilities, in the processing of the video in real-time from the external camera(s) 95 retrieved via the network 97 or locally from the devices forward facing camera(s) 183, in which the same as previously detailed other users gaze may be formulated as a directional vector which is determined, together with their eye orientation, head position and head orientation in which adjustments maybe made in real-time to the angle of the rear facing cameras 185 to maintain the correct perspective in the display of the recorded video scene from behind to that of the others users gaze direction and perspective FOV.

The devices exterior mounted Camera(S) 183 allow the user to see the visual perspective from the device where in the case of the IR Shield Apparatus 90 this may be beneficial to support the targeting of users where the output video of the camera(s) may be provided over the network 97 to the users augmented reality ("AR") display apparatus 1, in which through their micro-display 3 the user can see the camera view of the real-world game object and IR Shield Apparatus 90.

The audio speakers 178 provide 3D perspective audio for the projectile fire of IR Beams/IR Laser Beams, or other forms of virtual weapon fire, as well as incoming IR Beams/IR Laser Beams and virtual weapon fire from other real-world users or AI Characters 94 and game objects. This supports also the output positional 3D audio effects or 3D spatial audio effects of detected hits on the IR Shield Apparatus 90 from for example another users IR Proximity Mine Apparatus 91 or IR Laser Gun Apparatus 47, using the determined collision position or three-dimensional coordinate (x,y,z) of the hit.

In the same way positional 3D audio effects or 3D spatial audio effects of hits on another real-world user, game object or AI Character 94 or virtual game object 106, AI Character 105 or remote user 107 resulting from the pulling of the trigger mechanism 189 or activation of the IR Shield Apparatus 90, IR LEDs 176 may be output via the audio speakers 178.

This is supported by the audio manager module 202 of the device, which the previous detailed 3D spatial audio and 3D perceptual sound effects techniques such as ITD, IID, IPD, ILD, together with HRTF functions, where based on the input image coordinates in three-dimensional space of a real-world objects and its paired virtual game object in to a HRIR database, the sound waves may be processed and manipulated to achieve perceptual 3D audio localisation of objects in which a user perceives the audio coming from a specifiable location in three-dimensional space.

As shown in FIG. 9, the IR Shield Apparatus 90 device also features one or more microphone(s) 179, which may be used for providing direct voice commands in the activating of the device, where the devices speech recognition module 195 shall translate the spoken voice commands into recognisable text form inputs which are passed to the Client module 193 in which based on the received input this shall activate the illuminating of the IR LEDs.

Alternatively, the IR Shield Apparatus 90 device may be activated by the use of the users augmented reality ("AR") display apparatus 1 microphones(s) 8L, 8R in which the augmented reality ("AR") display apparatus 1, speech recognition module 33 shall translate the spoken voice commands into recognisable text form inputs which are passed client module 28 of the augmented reality ("AR") display apparatus 1 that shall then invoke the IR Shield Apparatus 90 device via an API call sent over the network 97 to activate its IR LEDs via its local client module 193 using a well defined API.

The IR Shield Apparatus 90 also features a Wifi Module 181 and bluetooth module 182, used for long range network connectivity and short range bluetooth network connectivity over IP between device and the users augmented reality ("AR") display apparatus 1, client module 28 as well as other real-world game objects/devices client modules, and the game server 88 or host 89 in the exchange of state information.

The IR Shield Apparatus 90 device as depicted in FIG. 9 features a haptic module 177, which is recreates the sense of the IR Laser Beam hitting the IR Shield by applying vibrations, forces and motions, through a Vibramotor that provides physical feedback through the user's hands on the handle section of the IR Shield Apparatus 90. This maybe invoked by an IR Sensor 171 reading or based on a collision detection computed by the collision manager 196.

In the case of the hit being a computation, this maybe from a real IR Beam/IR Laser beam formulated projectile based on the devices positional vector (x,y,z), orientation (p,r,y) and directional vector using any of the previously detailed techniques such as hitscan, raycasting, frame by frame analysis, or polygon based triangulation to then determine based on the projectile, together with the assumed velocity of the IR Beam/IR Laser Beam if a hit occurred by the devices collision manager 196.

Alternatively, the hit in this case could be from a virtual game object fire, which maybe based on a computational formulation of the virtual weapon fire projectile/trajectory by the devices collision manager 196.

As depicted in FIG. 9, the IR Shield Apparatus 90 is powered by a lithium style battery 191 or other form suitable battery, in which the turning on or off of the device is operated via a power switch 192.

FIG. 9 also provides an expanded block diagram of the core modules of the IR Shield Apparatus 90 in which the device features a set of core software modules that include a Client module 193, a gesture tracking module 194, a Speech recognition module 195, a Collision detection manager 196, a rendering module 197, an observer module 198, a local copy of the games application 200, a games engine 199 a device tracking module 201, and an audio manager 202 with HRIR database 203.

In addition, the device features an operating system (O/S), kernel, bus, subsystem and a series of device drivers to support the functions of the devices hardware and software modules.

The client module 193 is responsible for maintaining the devices state during the game and providing state information to game server 88 or host 89 where there is a change in the state of the device resulting from a user input, the activation of the device, or a hit detected on the device via its IR Sensors 171 or computationally. It is also responsible for the handling of all user inputs including voice commands via the device itself directly using its external microphones 179 with the support of the devices speech recognition module.

The client module 193 is also responsible for the handling of sensor inputs which may invoke the activation of the device and its IR LEDs, such as in the detecting of specific motion, or accelerations where the devices Sensors 170 may also be used to detect specific hand gesture movements in which this may be interpreted by the gesture tracking module 194 of the device as a specific input type that could invoke for example a specific sequence in the activating and illuminating of the devices IR LEDs 176 and the changing of the devices displayed renderings on its surface display panel faces 166 or the activating of the shield itself.

In addition, the client module 193 shall handle all physical inputs such the use of the physical trigger mechanism or button in the activating and illuminating of the devices external facing IR LEDs 176.

The client module 193 shall also be responsible for the activating of the IR Transmitter 173 and the providing of binary raw data for multiplexing and signalling in the IR Beam/IR Laser Beam by the IR multiplexer 174. This may for example be used to signal the weapon classification, or a change in its classification resulting from a detected special hand gesture type. The client module is also responsible for retrieving state information via network from the game server 88 and host 89 which is provided to the Collision Detection Manager in the handling of responses.

The gesture tracking module 194 interfaces with the client module 193 to capture users specific physical hand gestures and movements through analysing the sensor readings on motion, tilting and acceleration.

These physical hand gestures motions detected by the sensors 170 may be used to invoke an action by the IR Shield Apparatuses 90. Specialist gesture recognition algorithms may be used to detect based on the sensor 170 readings of the devices accelerometer, tilt sensors, gyroscopes etc. specific physical hand gestures and movements in the moving of the IR Shield. These identifiable gestures maybe passed to the client module 193 in the processing of user inputs as recognised hand gestures.

The speech recognition module is responsible for handling of all spoken speech command where the key responsibility of the speech recognition module 195 shall be in the translation of spoken voice command inputs in to text formed inputs that are used by the Client Module 193 and/or Games Engine 199 to invoke an action on the IR Shield Apparatus 90 device.

This may use different forms of models, methods and techniques such as language modelling or Hidden Markov models or other forms of widely available models, methods and techniques.

The games engine 199 here serves to provide support for the processing of inputs, rending operations by the rendering module 197, the performing of mathematical operations of the rendering pipeline together with the use of the GPU.

The games application 200 provides the game logic and storylines, in which here the local instance of the game application based on the state of the device or the state of other objects may invoke an action to bring the game to conclusion such as the request via the client module 193 to activate the IR LEDs on the users IR Shield Apparatus 90 as the result of an external event in the game play or storylines.

The Audio Manager 202 supports the playback of 3D spatial sound and perceptual based 3D sound localisation effects. The Audio manager may use HRTF's to create 3D audio, or other techniques based on ambisonics and wave field synthesis principle to create 3D audio that is played back via the users IR Shield Apparatus 90 speakers 178.

In this process the system shall process and convert the 3D coordinates of users IR Shield Apparatus 90 as well as the coordinates of other real-world and virtual game objects together with events such as the pulling of the trigger mechanism on the IR Shield and collision hits to generate image inputs into the HRIR database to generate 3D spatial sound and perceptual based 3D locational sound effect.

Where as a result the sound effects of these items shall be placed correctly on the three-dimensional plane relative to the IR Laser Beam projectile, the users position, the position of other real-world objects and virtual objects or that of the collision position or hit coordinate as x,y,z value.

The audio manager 202 shall factor in the computation of the 3D audio other variables such as the pitch, roll and yawl expressed as p, r, y of the users IR Shield Apparatus 90 as well as the devices world coordinates x, y, z at the point of the trigger 189 being pulled and afterwards in which the 3D spatial sound and perceptual based 3D locational sound effect will be always be relational to that of the original origin of the IR Laser beams and it's moving projected 3D holographic image generated from the creation of a virtual game object representing IR Laser Beam or Line Rendering, together with the positional coordinates and orientation of other real-world objects and environment, other virtual game objects.

Similarly the audio manager 202 when playing back 3D audio via users IR Shield Apparatus 90 speakers 178, as a result from the use of other real-world game objects by other users such as the an IR Laser Gun Apparatus 47, trigger mechanism 53 the 3D coordinates and positioning of the 3D audio shall always be relational to that of the original origin of the IR Laser beams and its moving projected 3D holographic image, in which the formulated projectile for the moving IR Beam/IR Laser Beam is based on the devices orientation (p,r,y), vector position/world coordinate (x,y,z) and directional vector at the time the trigger was pulled.

It shall also be relative to the position (x,y,z), orientation (p,r,y) and directional vector of the user IR Shield Apparatus 90 where as the users moves away from the projectile IR Beam/IR Laser Beam they hear the sound effect more quietly and as they move towards the projecting IR Beam/IR Laser Beam the sound gets louder. Here the 3D positioning of the 3D sound effect is always relational to the origin of where the IR Beam/IR Laser Beam first originated in the pulling of a trigger or activating of the IR LEDs of a real-world game object and device as well as its moving projectile based on the devices directional vector and orientation at the time.

It should be noted transformations are applied here in real-time to the 3D audio source files according to changes by the user in the position (x,y,z), orientation (p,r,y) and directional vector of the users IR Shield Apparatus 90, where the direction of the sound in three-dimensional space appears always to be from the same direction regardless of the orientation of the IR Shield Apparatus 90.

For example if the position of the IR Beam/IR Laser Beam virtual game object generated from the pulling of a trigger was (x1,y2,z30) then regardless of where the IR Shield Apparatus 90 position or orientation was the 3D audio effect would always appear to be coming from the direction of the position (x1,y2,z30) and along its relative projectile/directional vector heading to that real-world of the moving IR Beam/IR Laser Beam.

This uses a process of manipulating the user's perception of interaural time difference ("ITD"), which is the difference in the arrival time of sound between two locations (through changing adjusting the time the sound arrives at either of the users ears); interaural intensity difference ("IID") in which the sound intensity between two locations is varied, the filtering of sound by users ear's pinnae part of the ear, interaural level differences ("ILD") which provide salient cues for localizing high-frequency sounds in space based on differences in the sound pressure level reaching the two ears, the precedence effect and head-related transfer functions ("HRTF").

Here the 3D spatial audio or perceptual based 3D sound localisation effects may be generated by the games engine 199 and game application 200 may be invoked on the IR Shield Apparatus 90 devices speakers 178 through the audio manager module 202 during game play.

3D spatial sound and perceptual based 3D locational sound effects may be positionally placed on a three dimensional coordinate of the planes of the Cartesian coordinates x, y, z axes, relational to the devices position and orientation based on its pitch, roll and yaw together with its vector position (x,y,z).

This allows the audio manager module 202 to manipulate the sound outputs of the speakers and audio source files using the techniques as detailed ITD, IID, ILD and HRTF so as the audio sound effect for example of a projected IR Beam/IR Laser beam appears moving in 3D space, relational to that of the devices own positional vector and orientation provided as six dimensional matrixes provided by its device tracking module 201 using the device sensors 170. Here for example the projectile direction of the IR Laser fire maybe based for example on a six dimensional matrixes which represents the point of origin of the IR Beam/IR Laser beam, for when the trigger mechanism 189 of the IR Shield Apparatus 90 was pulled which maybe used in the placement of the 3D audio effect of the Laser beam and in the calculation of its moving projection along the planes of the Cartesian coordinates in 3D dimensional space.

Alternatively, this may be based on the Line Rendering of an IR Laser Beam in terms of the start position of the line (the origin), and the formulated points along the line in terms of their x,y,z coordinates until the end of the line is reached where just as the animation of the IR Laser Beam moves along the points of the line in three dimensional space, so does the 3D spatial audio or perceptual based 3D sound localisation effect in which the user sees the animated visuals of the IR Laser Beam of the IR Shield Apparatus 90 maybe seen through their Micro-display 3, or via the external projectors 96 where the 3D sound effect output from the devices speakers 178 or the external speakers 101 or the users augmented reality ("AR") display apparatus 1 speakers 6 is positionally played back at the same coordinate (x,y,z) in which the user perceives the virtual image of the IR Laser Beam to be moving positions.

Here the user both hears and sees the IR Beam/IR Laser Beam from what they perceive to be coming from the same location in three-dimensional space, and to be moving along the same projectile/trajectory. The processor units DSPs may be used to support this functionality. A HRIR database instance may also be used to support this.

As detailed the Collision manager 196 is responsible for the determination or detection of collisions resulting from two or more objects intersecting with each other which could be an IR Laser Beams virtual game object or Line Rendering intersecting with the IR Shield Apparatus 90 for example. In this way the Collision Manager 196 may be used also to detect hits.

As described the IR Shield Apparatus 90 may be used to protect users from incoming IR Beams/IR Laser Beams, where upon a user activating the shield this shall disable the reception or recognition of a hit detected by an IR Sensor and IR Receiver or computationally by collision detection methods.

Here a hit from an IR Laser beam may either physically be blocked from hitting an IR Sensor and IR Receiver as a result of the IR Laser Beam intersecting with the IR Shield Apparatus 90 device physical display panel faces 166 in which virtual imagery and lighting effects are emitted outwardly or in the computational sense based on a collision detection formulation of the devices position and orientation in three-dimensional space relational to the user's position.

Collision detection may be accurately formulated by the collision manager 196 based on posteriori collision detection methods or may be based optimised approaches such as spatial partitioning methods, bounding boxes, n-body pruning, pairwise checks using bounding rectangles or circles hit boxes, in which after pruning exact pairwise collision detection, or triangle centroid segments may be applied for example.

Other methods such as hitscan, raycasting, time of impact (TOI) or frame by frame analysis, or polygon based triangulation may be used among many other methods previously detailed.

Approximating the users position may be sufficient for the purpose of collision detection. More precise methods of calculating collision detections may be based on the IR Shields Apparatus 90 model coordinates, current world coordinates/vector position (x,y,z) orientation (p,r,y), elevation from the ground expressed as +/− values captured from its sensor(s) 170.

Here like other real-world game objects using this method it is possible in real-time to model the IR Shield Apparatus 90 devices vector position and orientation in three dimensional space relative to the ground height to determine if a hit has occurred from another users IR Laser Beam based on its formulated projectile in terms of its origin (x,y,z) and directional vector based on the other users devices coordinates (x,y,z), orientation (p,r,y) and directional vector at the time the trigger was pulled captured from its sensors which are stored and retrievable from on the game server 88 or host 89 via the network 97 by the users IR Shield Apparatus 90 client module 193 and/or collision manager 196 upon the trigger being pulled.

In which when combined with using methods like hit scan and ray casting where the line or projectile of the IR Laser Beam based on the real-world coordinates (x,y,z) and orientation (p,r,y) etc. of the device that fired the IR Laser beam it is possible to formulate if the projectile of the IR Laser beam shall intersect with the users IR Shield Apparatus 90 at any point along the line of projectile or if the real-world user behind the IR Shield Apparatus 90 shall be hit since their hit box or boundary box or model coordinates fall outside of the IR Shields and in the line of projection of IR Laser Beam.

Here the determination of a hit shall be dependent on whether the users coordinates (x,y,z) and model coordinates or hit box falls outside the IR Shields model coordinates based or shield boundary circle radius which is dependent on the physical orientation and position of the IR Shield Apparatus 90 determined by the user's hand position of the hand which is holding the IR Shield.

Here real-world sensor data readings from both the user and the IR Shield Apparatus 90 together with the real-world game object/device that fired the IR Laser beams may be used to formulate with accuracy if a hit occurred or if the IR Shield Apparatus 90 based on its vector position, orientation and directional vector to that of the directional vector of the IR Laser Beam deflected an IR Laser Beam.

As yet a further alternative method of collision detection the detection of the collision of an IR Laser Beam virtual game object with that of a real-world IR Shield Apparatus 90 or user may be formulated based the detection of a collision of the objects polygons using triangulation, where every real-world game object has both a real-world polygon mesh and 3D model, plus a virtual polygon mesh and 3D model representing the real-world game object which can be used in this process.

Here using triangulation, the system will compute the position of the IR Shield Apparatus 90 polygons relative to the real-world users hit box or model coordinates and shall toggle on or off their infrared receivers accordingly based on its computation of the users hit box and the shield radius of protection. Triangulation is calculated based on locational coordinates x, y, z and the polygon mesh/vertices of the IR Shield representing is shape based on its real-world model coordinates or represented sphere represented by its model coordinates or a reverse hit box that acts as a determination of the shields coordinates.

Based on the devices sensor 170 readings the system is capable of determining the relative position of the IR Shield Apparatus 90 in terms of its elevation from the ground, its orientation or angle and its world coordinates, which provides an positional vector or three dimension cartesian coordinate (x,y,z) together with a p,r,y values in this case. Where based on the devices positional vector (x,y,z) directional vector, model coordinates and polygon mesh it is possible to determine the exact placement of the IR Shield Apparatus 90 and its polygons in three dimensional space.

This may be used together with the origin, direction vector, model coordinates and polygon mesh of the virtual game object of the IR Laser Beam and the users coordinates (x,y,z) and orientation (p,r,y) to determine whether a hit or collision has occurred using triangulation to determine if the polygons of the IR Shield Apparatus 90 or users hit box has intersected with the polygons of the IR Laser beam.

This process of formulating a collision detection by triangulation may use this data together with the users own x,y,z coordinates and orientation based on the sensor readings supplied by their head and motion tracking module 29 from their augmented reality ("AR") display apparatus 1 or device tracking module for a user's IR Mixed Reality Suit 93 or IR Mixed Reality vest 92, in which using this it is possible for the devices collision manager 196 and that of other real-world game objects, or the Game Server 88 or Host 89 to determine with a high degrees of accuracy if a hit occurred.

Note based on the position elevation of the users augmented reality ("AR") display apparatus 1 or IR Mixed reality suit 93 or IR Mixed Reality vest 92, captured from the sensor readings, the system may formulate a hit box hierarchy in which the body shape and height of the user is approximated based on this reading Alternatively, accurate 3D models and polygon meshes may be generated over users using the external cameras 95 in the Laser Tag Arena 98 and spatial mapping techniques in which the observer module 118 of the game server 88 or host 89 may generate a precise 3D model and polygon mesh of real-world users that may be used in the determination of collision detections.

Here transformations maybe applied to the users hit boxes and/or 3D model and polygon mesh based on sensor readings on the users position, orientation and elevation taken from the users augmented reality ("AR") display apparatus 1 or IR Mixed reality suit 93 or IR Mixed Reality Vest 92 taken from these devices sensor(s), where using this data the system can accurately identify for example if a user is crouching or ducking behind an object for example in which this shall be represented by their virtual polygon mesh and 3D model that the game server 88 or host 89 may maintain for the purpose of accurate collision detection calculations.

It should be noted that Collision detection like in the prior examples is a dynamic calculation in which in this use case this has many more dynamic variables since the user may move the position of the IR Shield Apparatus 90 frequently whilst walking around the game space or laser tag arena 98, in addition the state of the IR Shield Apparatus 90 may be used to determine if a hit is deflected or goes through the IR Shield Apparatus 90 which may be formulated in the collision detection calculations.

The IR Shield Apparatus 90 has many unique features including an invisibility feature as previously detailed as well as the ability project IR Laser Beams outward that a user may use when under attack. In addition, the device is capable of displaying Lighting effects such as specular or diffuse lighting on its display surfaces as well as virtual images in which other objects maybe display as reflections on the surface display panel faces 166 of the device to add realism to the device.

In addition, upon a IR Laser Beam being deflected the animated IR Laser Beam may be shown hitting the surface of the device as diffuse lighting effect, In addition, based on the detected hit and the surface type being reflective or refractive a second virtual game object or Line Rendering with multiple virtual game objects may be generated by the rendering module of game server 88 or host 89 or users augmented reality ("AR") display apparatus 1 to simulate the surface as reflective or refractive in which the IR Laser Beam may be animated as reflecting off of the surface of the IR Shield Apparatus 90 onto another user seen through the users augmented reality ("AR") display apparatus 1, Micro-display 3, or via external projectors 96 in which projection mapping/video mapping or spatial augmented reality techniques may be used.

Where another user has a IR Mixed Reality Suit 93 or IR Mixed Reality Vest 92 these visual effects of light and imagery of a IR Laser Beam hitting the surface of a user's body and being seen reflective or refractive on to other real-world game objects where these devices all have surface display panel faces these effects may be shown on either or all devices/real-world game objects relational to each other positions (x,y,z), orientation (p,r,y) of their faces relative to each other and that of the IR Laser Beam collision position (x,y,z).

Here collision detection may be applied to the second generated reflected IR Laser Beam in the determination of a hit. The angle or projectile of the second IR Laser Beam virtual game object or Line Rendering using multiple virtual game objects may be based on the determinable position, orientation and directional vector of the IR Shield Apparatus 90 at the time and collision position (x,y,z) that the IR Laser Beam first hit the shield.

As detailed collision detection may be based on posteriori collision detection methods or may be based on optimised approaches such as spatial partitioning methods, bounding boxes, n-body pruning, pairwise checks using bounding rectangles or circles hit boxes, in which after pruning exact pairwise collision detection, or Triangle Centroid Segments may be applied for example.

Other methods such as hitscan, raycasting, time of impact (TOI) or frame by frame analysis may be used.

The approximating the users position may be sufficient for the purpose of collision detection.

Also, as detailed previously more precise methods of calculating collision detections may be used which are based on the IR Shields Apparatus 90 model coordinates, world coordinates/vector position (x,y,z) orientation (p,r,y), elevation from the ground expressed as +/− values captured from its sensor(s) 170, in which it is possible in real-time to model the devices position and orientation in three dimensional space. In which when combined with using methods like hit scan and ray casting a collision may be determinable.

The Collision manager 196 in its response handling may invoke the rending surface texture maps or lighting effects on the surface display panel faces 166 of the IR Shield Apparatus 90, as a result of for example a hit detection of another weapons IR Laser Beam or virtual weapon on the users IR Shield Apparatus 90.

Diffuse lighting or specular lighting effects may be rendered and displayed over the surface of the IR Shield Apparatus 90 surface display panel faces 166, by the rendering module 197 of the IR Shield Apparatus 90 dependent on the determination of a hit by an IR Laser Beam via the devices IR Sensors or by a computationally in the process of formulating collision detections and hits by the collision manager or based on the computation of near miss or the passing of IR Laser Beam virtual-game object to that of the coordinates of the users IR Shield in which specular and reflection lighting effects may be displayed on the users shield.

Note this may be seen with no visual aid. Reflections of the IR Laser Beam passing the users shield and/or specular lighting and shadowing effects may be seen on the display screen surface 166 of the IR Shield Apparatus 90 again which can be seen by the naked eye. In the case of reflection, the full 3D image of the passing IR Laser Beam virtual game object could be rendered in which transformations are applied using matrix multiplications to scale or rotate the virtual game object of the moving IR Laser beam relationally to the world coordinates and orientation of the IR Shield Apparatus 90 in which prospective projection maybe applied as further transformation to provide depth cues.

Collision manager 196 may invoke haptic feedback, via the haptic module 177 of the IR Shield causing it to vibrate. on detecting a hit. Collision manager may invoke 3D sound heard via the devices speakers 178 or users augmented-reality display apparatus 1 speakers, or via the external speakers 101 of the laser tag arena 98.

Returning briefly to FIG. 6, this Illustrates in UML form diagram the flow of various variable actions and events resulting from the invoking the IR Laser Beam which may be invoked physically through by pulling the trigger 189 or voice command via the microphone(s) 8L, 8R of the users augmented reality ("AR") display apparatus 1 or via the speakers 178 of the IR Shield device Apparatus 90, in the case of the device being a handheld IR Shield Apparatus 90.

Similar to previously detailed for the IR Laser Gun Apparatus 47 usage, the resulting events and actions invoked in the rendering and display of visual virtual-game images of the IR Laser Beam is based on the relational proximity of the world coordinates of other real-world users, objects, AI Characters 94 or virtual game objects 106, AI characters 105 and remote users 107 to that of the projectile IR Laser Beam fire based on the devices directional vector, world coordinates (x,y,z) and orientation (p,r,y) in the case of the device being a handheld IR Shield Apparatus 90.

Here the same events, rendered visual effects and resulting animations of the IR Laser Beam weapon fire may be invoked, the same as the physical use of the IR Laser Gun Apparatus 47 or IR Proximity Mine Apparatus 91 resulting in new virtual game objects of the projected IR Laser beam to be created and their visual effects to be displayed in relation to the direction of the weapon fire based on the directional vector, world coordinates, and orientation of the device at the time the IR Laser beam was invoked.

Note directional vector is relational to that each of the IR optical lens piece(s) 88 position and orientation on the IR Shield Apparatus 90 device, which represents for a varying direction in three dimensional space along the x,y, z axis from which a line or ray can be plotted representing the IR Laser beam projectile, using other variables such as the devices orientation, tilt angle to formulate the angle of the line.

3D positional sound of user's shield being hit by an IR Laser Beam, based on computation of the coordinates of the virtual game object of the IR Laser Beam intersecting with the real-world shield. As shown in FIG. 9 the IR Shield Apparatus 90 also features a haptic module 177, which maybe triggered or activated by a hit from IR Laser Beam, based on computation of the coordinates of the virtual game object or Line Rendering of the IR Laser Beam intersecting with the real-world shield or the IR Shield Apparatus 90 IR Sensors 171 or IR Receiver 172 detecting Infrared light emissions or IR radiation from an IR Beam/IR Laser Beam and registering a hit.

The IR Beam/IR Laser beam may be projected from another users or AI Characters IR Laser Gun Apparatus 47, IR Proximity Mine Apparatus 91, or IR Shield Apparatus 90 in which upon a hit being detected by the IR Sensor 171 or by the collision manager 196 this will trigger the haptic module 177.

It can also be triggered by motion or tilt sensor(s) 170, resulting from a real-world user, game object or AI Character 94 physically intersecting with the IR Shield Apparatus 90 such as a real world user running into the other users shield during a laser tag game, where a significant degree of motion in which the sensor modules 170 will themselves trigger the haptic module.

Furthermore, a virtual game object can be thrown at or a virtual character 105 can run at IR Shield Apparatus 90 causing it to shake, or can fire of virtual weapon can cause the IR Shield Apparatus 90 to shake where the collision manager detects a collision based on the world coordinates and model coordinates intersecting.

A vibration motor may provide physical sensations and feedback which is controllable by the haptic module.

The observer module 198 as shown in FIG. 9, is used to tracks any changes in the state of the real-world view of the devices camera(s) 183 resulting from changes in the state of a real-world object or surfaces, in which it notifies any changes to the client module 28 and/or rendering module 27 of the users augmented reality ("AR") display apparatus 1 via the network 97.

Changes may include the observation of a new space, surface or object in the real-world in which new mesh data together with a mesh filter, wireframe and a subsequent 3D model may be generated for the purpose of rendering and augmenting virtual-game images overlaid over these new identified spaces, surfaces or objects. In addition, changes may include the change in orientation of an observed real-world space, object or surface.

This data is used by the used in the display of augmented images over the video catapulted from the front facing cameras 183 of the IR Shield Apparatus 90 which is displayed via the users augmented reality ("AR") display apparatus 1, micro-display 3, used to assist the user targeting and the remote manual triggering of the activation of the device.

The rendering module 197 of the IR Shield Apparatus 90 is responsible for the rendering operations and performing of the rendering pipeline routines using its processing units 167 including GPU, CPU and memory 168 to perform these operations.

All renderings in this context relate to the display of 2D or 3D virtual images and video on the surface display panel faces 166 of the IR Shield. This includes the rendering of texture maps for display on each of the individual surface display panel faces 166, as well as the display of lighting effects such as diffuse and specular lighting effects resulting from the hit of IR Laser Beams on the IR Shields Apparatus 90 physical surfaces detectable by the IR Sensor 171 or computationally via the Collision Manager 196 using a number of techniques such those previously detailed such hitscan or raycasting using vector and parametric equations of a line, or frame by frame analysis or time of impact (TOI) analysis etc.

The rendering module 197 supports all forms of rendering methodologies including ray tracing, ray casting, scanline rending, radiosity etc. It also supports the display of all forms of visual and lighting effects on the surface display panel faces 166, including specular lighting, diffuse lighting, decal effects (scorch marks/blood etc.), subsurface scattering (SSS), shading, shadows etc. the same as all other instances of the rendering module support on each of the other real-world game objects such as an IR Laser Gun Apparatus 47, real-world AI Character 94 and other wearables such as an IR Mixed Reality Suit 93 or IR Mixed Reality Vest 92.

This is also supported by the rendering module 27 of the users augmented reality ("AR") display apparatus 1 in the display of these visual effects and lighting effects on real-world objects, surfaces, game objects, users and surfaces etc. as augmented 3D holographic or hologram images or two 2D stereoscopic images that form a 3D image for example over the users real-world view from their micro-display 1 during game play using the devices local mesh data provided by its observer module 25 or the global mesh data from the game Server 88 or host 89.

The device tracking module 201 is responsible for maintaining state information on the IR Shield Apparatus 90 world coordinates/position in three dimensional space expressed as three dimensional Cartesian Coordinates (x,y, z) and orientation expressed as pitch, roll and yaw (p,r,y) and together with its directional heading expressed as a direction vector together with other state information such as acceleration, velocity and elevation.

This uses the multiple sensors 170 to track the position of the device, its orientation and directional heading (directional vector). It also tracks the devices velocity, acceleration and other variables used by the gesture module 194 to detect special gesture inputs from specific movements of the IR Shield Apparatus 90.

This state information is provided to the game server 88 or host 89 via the network 97 by the devices Client Module 193 in which the game server 88 or host 89 maintains state information on all real-world users, game objects and AI Characters together with state information on all virtual game objects, AI Characters and remote users to support the detailed functions as disclosed within the embodiments of this invention.

It is also used by the local modules such as the rendering module 197 and the collision manager 196 in the placement of lighting effects for example according to the relative vector position and orientation of other objects that may be emitting light and in the determination of collisions with other real-world game objects, users, AI character's or virtual game objects, AI character's or remote users.

It should be noted the described IR Shied Apparatus 90 may optionally not feature display surface panel faces 166 as an alternative embodiment of the presented invention herein where instead the IR Shield Apparatus 90 could be a handheld device which maybe thrown that upon the device sensors detecting the object has stopped moving this may activate a 360 sphere shield seen through the users augmented reality display 1, in which this is rendered by the rendering module 27 and displayed as a virtual image over the users real-world view via their micro-display 3.

Alternatively, this may be partly displayable as an augmented image over the real-world surrounding space of the laser tag arena 98, that maybe seen by the naked eye where external projection mapping/video mapping or spatial augmented reality with the external projectors 96 by the game server 88 or host 89 may be used to outline the radius of the shield.

This device would be activated similar to that of the IR Proximity Mine Apparatus 91 where based on increases in acceleration, motion, tilting, moving velocity or free falling or the detection of impact or contact with the ground from the sensor readings from the devices sensor(s) 170 the client module 193 could change the state of the device invoking the rendering of the augmented image of the devices shield sphere by other users augmented display ("AR") display apparatus 1 or via the external projectors 96 using external projection mapping/video mapping or spatial augmented reality techniques to map the projection of the augmented image of the shield over real-world objects and surfaces supported by the display projection module 122 of the game server 88 or host 89.

Figure 10:
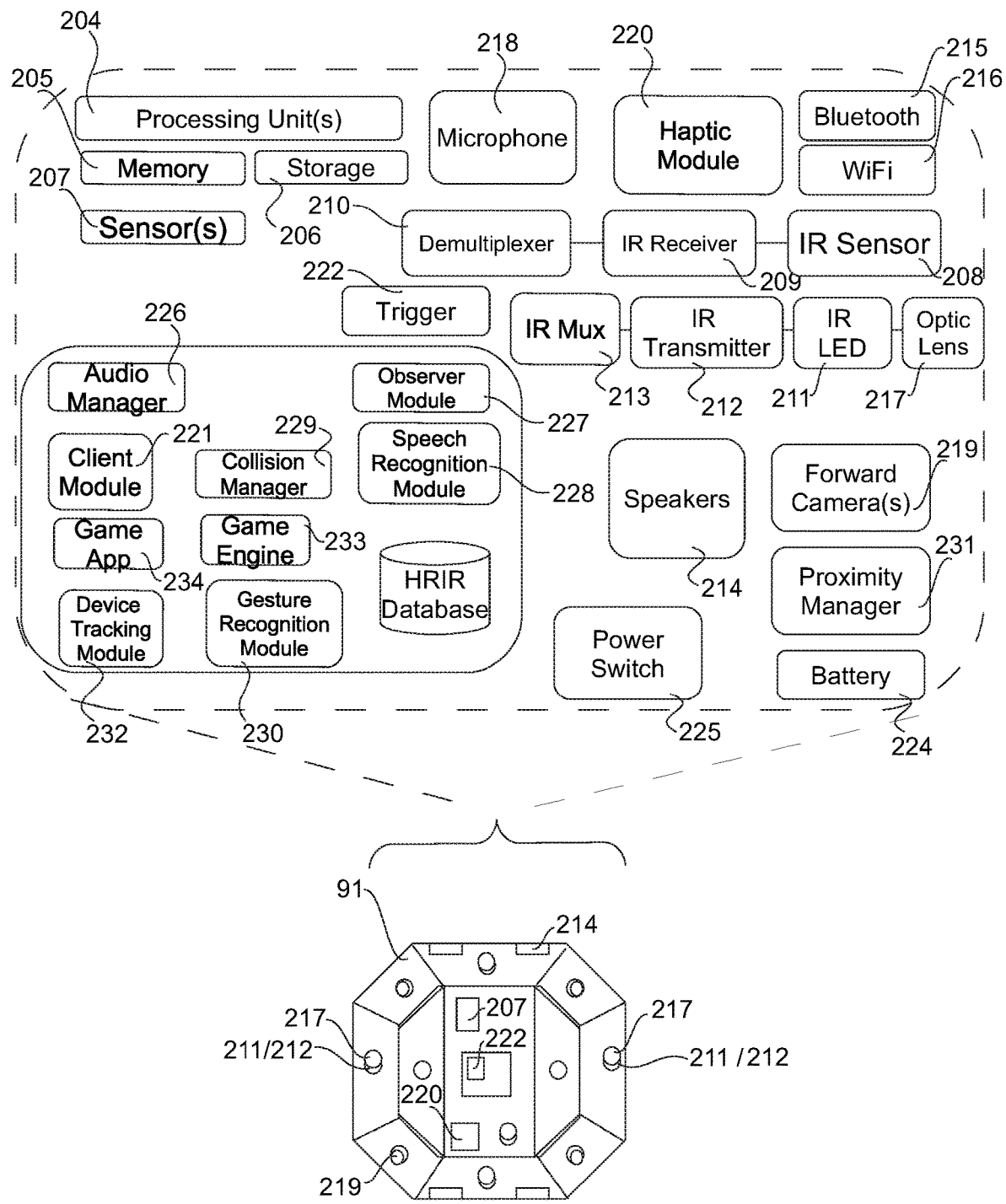
FIG. 10 shows an IR Proximity Mine Apparatus 91 that is a real-world game object which may be used in the laser tag and mixed reality video game, that consists of multiple IR Transmitters 212/IR LEDs 211, sensors 207 and a computer; among other parts.

FIG. 10 shows an IR Proximity Mine Apparatus 91 which is a physical throwable real-world game object, where upon either throwing the device or the device hitting the ground or the detection of vibrations or movements detectable by its sensor(s) 207 the device maybe activated in which multiple IR Laser beams are projected outwards onto nearby targets via an arrangement of multiple IR LEDs 211 emitters and IR transmitters 212.

The device may also be remotely activated by a user through voice commands or via hand gestures captured via the users augmented reality ("AR") display apparatus 1 gesture recognition module 30 and speech recognition module 33 using the microphones 8L, 8R and cameras 7L, 7R or via external the cameras 95 or microphones 100 in the laser tag arena 98 by the game server 88 or host 89, through its gesture recognition module 119 and speech recognition module 127.

The device its self also features a series of camera(s) 219 and one or more microphone(s) 218 in which from short range using its gesture tracking module 230 and speech recognition module 228 the device can be activated by a user using spoken commands or hand gestures.

The activating of the device may also be invoked as a result of a collision detection or pre-determination of a potential collision based on proximity of the device to other users or objects by its collision manager 229, in which based on state information maintained by the game server 88 or host 89 of all clients, the device's collision manager 229 is capable of detecting a collision or an intersection with another real-world game object, user or AI character 94 or virtual game object 106, virtual AI character 105 or remote user 107 if their vector position/proximity falls in the three dimensional coordinates of the radius of the IR Proximity Mine Apparatus 91 determinable by their world coordinates (x,y,z) and that of the coordinates of the proximity radius area as x,y,z points in three dimensional space.

Objects maybe other real-world users, real-world game objects or a real-world AI Characters 94 or maybe a virtual game objects 106, AI Characters 105 or remote user 107 where based on their relative world coordinates to that of proximity radius of the IR Proximity Mine Apparatus 91 the devices client module 221 is programmed to trigger or be activated upon detecting a collision or upon detecting a user or object has entered its proximity radius.

Upon triggering or activating multiple IR Laser beams are projected outwards onto nearby targets via an arrangement of multiple IR LEDs 211 emitters and IR transmitters 212, where hits are determinable based on IR Sensors detecting the light emissions from the resulting IR Beams/IR Laser Beams or based on a determination of a collision by formulation using techniques such a hitscan and ray casting, frame by frame analysis etc. among other collision detection techniques.

As depicted in FIG. 10 the IR Proximity Mine Apparatus 91 consists of a set of processing units 204; Memory 205; Storage 206; Sensors 207 (including a tilt sensor, accelerometer, gyroscope, GPS tracker etc.); one or more IR Sensors 208; an IR receiver 209; a demultiplexer 210; a multiplexer 213, multiple IR Transmitters 212 and IR LEDs 211 positioned at different orientations on the physical device all capable of projecting IR Beams/IR Laser Beams at different angles.

The device also features external speakers 214; a bluetooth 215 and wifi module 216; a series of optical lens pieces 217 for projecting of IR Beams/IR Laser Beams in which for each of the devices IR LEDs 211 there is a single lens tube and optical lens piece 217; one or more microphone(s) 218 for voice control; a number of forward facing camera(s) 219 mounted externally on each main exterior face at differing angles and orientation.

In addition, the device features a haptic module 220. An inductive loop transmitter may be connected also to a plurality of IR LEDs and IR Transmitters where the IR Laser Proximity mine 90 features multiple IR LEDs for projecting in multiple directions IR Beams/IR Laser Beams.

As described the IR Proximity Mine Apparatus 91 device and real-world game object also features a set of processing unit(s) 204 consists of one or more Central Processing Unit(s) (CPUs), and Graphics Processing Unit(s) (GPUs) where the CPU or CPUs shall be responsible for executing and handling of the preprogrammed code as well as the processing of all program instructions, system events, inputs and outputs provided by the core components and modules of the device. In addition, the processing unit(s) 204 shall handle all logic, control, arithmetic, and I/O Input or output operations, which will be handled in accordance to the instructions of the game and corresponding device's module's coded instructions as described herein.

The CPU or CPUs shall also be responsible for executing all the programmed instructions and logic of the software modules of the device The GPU's may be used in the mathematical operations for performing the game computations. The DSPs may be used to support the processing of audio files for creating 3D spatial sound and perceptual based 3D sound localisation effects.

The IR Proximity Mine Apparatus 91 device memory 205 may be a form volatile memory or random access memory (RAM) for performing high speed instructions by the CPU such as DRAM, fast CPU cache memory and SRAM or other forms of volatile memory or example used as the main memory of the system. Additional memory may be provided via the GPU as dedicated memory or may be commonly used between the CPU and GPU.

The memory 205 may also consist of non-volatile memory also for performing BIOS and firmware operations such as flash memory, ROM, EPROM, or EEPROM memory, where flash memory may be used as a secondary form of memory for example. The flash memory may be a type of NOR Flash.

Files and data may be stored also the storage memory 206 of the device together with the binaries, executable files of the programs and all corresponding files. This shall include the Operation System (O/S) software and all device drivers for the device hardware appliances. The storage may be in the form of a SSD flash based drive or a conventional hard disk such that is HDD based, due to the high performance of SSDs over HDD the preference would be to use though SSDs. Other forms of non-volatile memory may be used as storage memory 206.

As shown in FIG. 10 the IR Proximity Mine Apparatus 91 device also consists of several sensor(s) 207 including a multi-axis accelerometer, gyroscope, tilt sensor, motion sensors. In addition, as illustrated by FIG. 10 the IR Proximity Mine Apparatus 91 device sensor(s) 207 features also an GPS tracker, a solid state compass, an electromagnetic compass/digital compass and a magnetic compass or magnetometer.

Furthermore the IR Proximity Mine Apparatus 91 may features an inclinometer, pedometer, speedometer, altimeter, a MEMS Barometer and a dead reckoning module.

Here the generated state information from the sensory data is passed to the game server 88 or host 89 via the network 97 by the devices client module 221 for maintaining state information and is handled also by the client module 221 locally in the performing actions resulting from detected sensor inputs in which it may activate or illuminate the devices IR LEDs 211 dependent upon the detected sensory input. These sensors are used to track the devices world coordinates expressed as three dimensional Cartesian coordinates or points on the x,y,z; the orientation of the device expressed as pitch, roll and yaw (p,r,y); directional heading which may be expressed as directional vector and elevation from ground level together with other physical attributes such as velocity, acceleration etc. used in the determination of collision responses and in the computational operations of the game as well as the activating of the devices IR LEDs 211 by the client module 221.

As detailed the IR Proximity Mine Apparatus 91 maybe a throwable real-world game object in which its velocity and projectile direction is entirely variable. Where the devices sensors 207 are capable of detecting free fall or increasing velocity, or shock impact of vibrations when the device hits the ground, either of which may be used to activate the IR LEDs 211 by the client module 221.

For example, upon the sensors of its multi-axis accelerometer readings detecting impact with the ground, from shock or vibrations or changes in rate acceleration and the data readings being passed to its client module 221, the client module 221 as programmed may activate each of IR LEDs 211 resulting in the projection of multiple IR Laser beams.

Alternatively, where the multi-axis accelerometer, motion sensors and tilt sensor are capable of detecting vibrations on the ground from nearby real-world game objects, users or AI Characters 94 which may be close proximity to the device, in which the client module 221 may activate the IR LEDs upon detecting real world vibrations.

In addition the motion of a user's hand in terms of the wrist action when holding the device could be detected by the sensor(s) 207 such as the combined usage of the accelerometer, gyroscopes and tilt sensor in which the client module 221 is operable to process these special types of inputs and invoke a special action such as the activating of the IR LEDs 211 in a special formation which may differ depending on the user's wrist action before throwing the device.

For example, specific spin actions invoked by the users wrist actions, may be detected based on the detection of devices sensors sensing rotation at high velocity and rapid changes in the orientation or changes in velocity resulting from being thrown by a user, where the client module 221 may invoke the devices IR LEDs 211 in mid flight or mid air.

In each example given of the IR Proximity Mine Apparatus 91 sensor inputs serving as an input to activate the IR LEDs 211, the client module 221 is programmed to activate the IR LEDs 211 resulting in the projection of the IR Beams/IR Laser Beams which may activated differently based on varying determinable states from the reading measurements from its sensor(s) 207. The varying states may be mapped to different inputs which may invoke different patterns in the illuminating of the IR LEDs 211 and consequent firing of the IR Laser Beams.

In addition similarly to as detailed in the Laser Tag Arena 98 the IR Proximity Mine 91 may feature an IR Detector 208 sensor as a form of IR Sensor, which may be used by the client module 221 to activate the device. This maybe form of IR LED for transmitting infrared light couple with an IR Sensor 208 next to IR LED 211 on single PCB board in which when the IR Light reflects back from an object that moves under the IR LED infrared light the IR Sensor 208 detects the light that invokes the detector, in which the client module 221 may then invoke the triggering of the device. Here the sensor acts as a proximity or collision sensor.

To avoid an IR hit score as a result of this sensor, these sensors are placed in positions on the device in which their projectile is only at specific heights of elevation above ground. The device since it is thrown can upon detecting an unsafe angle of the detector by the tilt sensor usage the Client Module 221 can disable it.

Here the device may have several of these IR detectors 208 around its surfaces projecting outward there should always be enough that are running horizontal to the ground to act as proximity detectors. These IR Detectors 208 type of sensors are only invoked after the object is thrown upon detecting the device has hit the ground or when the device is activated remotely so as not to hit the user throwing the device inadvertently causing a self hit.

As depicted in FIG. 10 the IR Proximity Mine Apparatus 91 has multiple Infrared Light Emitting Diodes ("IR LEDs") 211 arranged in circular fashion around the faces of the devices in which each IR LED 211 is arranged at a different position and orientation to one another.

This supports the projection of IR Beam/IR Laser Beams in multiple directions. The illuminating or activating of the IR LEDs 211 may be controlled by the client module. Alternately, the IR LED 211 maybe a form of infrared laser diode as opposed to the stated infrared light emitting diode.

Similar to the IR Laser Gun Apparatus 47, the illuminating of the IR LEDs 211 may be hardware driven or software driven, where the IR Proximity Mine Apparatus 91 also consists of a series of electrical elements on its circuit board not shown in FIG. 10 that includes a transistor, one or more capacitors and a series of electrical relays used in the process of discharging the IR Beam/IR laser beam via the devices IR LEDs 211.

Where in presented IR Proximity Mine Apparatus 91 device configuration, the resulting interrupt or I/O inputs/output may passed via a input/output subsystem responsible for the handling of all inputs and outputs via a bus to the CPU microprocessor which based coded instructions of the client module 221 embedded software, the CPU microprocessor shall process the I/O inputs from the bus resulting from the users use of the physical trigger 222 or a button, and shall activate the IR LEDs 211, by invoking the electrical charge of the capacitor to be dispersed for example.

This may be supported by passing an API or system function call to the IR LED display driver which as instructed which shall turn on the IR LED 211 resulting in an electrical charge being dispersed by a capacitor through the circuitry of the device via series of switches and electrical relays to the IR LEDs 211 which shall be illuminated, where the IR beam/infrared light then passes through the optical lens pieces of each of the IR Lens tubes of the IR Proximity Mine Apparatus 91 and is projected outward.

Here multiple capacitors may be used to support the multiple IR LEDs 211 of the device which may be activated by a single trigger event or could be activated independently.

Here the CPU may communicate with the IR Proximity device 91 through a defined I/O interface. In addition, I/O inputs may be mapped in memory in the form of a memory-mapped I/O by the device drivers for invoking the described different functions in the activating of the device IR LEDs 211 or haptic module 220 of the IR Proximity Mine Apparatus 91 based on the varying I/O inputs.

In the case of using a manual trigger 222 no Input/output subsystem or bus may be needed since this may all be handled purely with hardware in which the through a series of electrical switch relays, transistors and capacitors it is possible to invoke as a result of the user pulling the trigger the release of an electrical charge which may be dispersed by the capacitor thorough the circuitry of the devices main board in which this may invoke an IR LED 211 to be illuminated and for the IR Beam/IR Laser Beam light to pass through the lens onto another users IR Sensor if in range. Where upon the receiving users IR Sensor sensing IR emissions in the form of a light beam from the other users IR laser beam, the IR signal shall result in the registering of a hit.

It should be noted that the client module 221 based on identified sensory data outputs, voice command inputs and hand gestures is capable of producing I/O inputs which may be processed by the CPU and mapped to specific I/O inputs supported by the devices I/O Interface in the invoking of the activation of the devices IR LEDs 211 and other hardware such as the haptic module 220.

The device also features an IR Transmitter 212 and Multiplexer 213 used for the transmitting of state information or classification information via the IR Beams/IR Laser Beams projected by the devices IR LEDs 211 where as a result this may invoke a different action by the receiving devices client module in which the IR Beam/IR Laser Beam was detected on their IR Sensor.

The same action may be invoked by the state information retrieved from the game server 88 or host 89 via the network 97 as an alternative method. Here the detailed Infrared ("IR") Transmitter 212 maybe part of the light emitting diode (LED) which emits infrared radiations which are invisible to the human eye or it may be separate as shown in which the IR Transmitter 212 consumes the electrical current that is dispersed to power the IR LED 211 in which the IR Beam/IR Laser Beam and IR signal containing IR data is then transmitted via the IR LED 211 along the devices lens tube and outward from the optical lens piece of the IR Proximity Mine Apparatus 91 onto a target IR Sensor and/or IR Receiver.

In addition, the IR transmitters 212 maybe modulated to produce a particular frequency of infrared light. It should be noted also that an IR Transmitter 212 maybe used as detailed for transmitting of data over an IR signal/IR Beam where as an IR LED in its self doesn't not necessarily have this capability if it is a basic on/off type, hence why these items have been shown separately in FIG. 10. They could though as stated be part of a single IR Transmitter/IR LED component hardware module on the device's hardware circuit design.

The device also features a series of IR Sensor(s) 208 and IR receivers 209 for detecting hits. These IR Sensors 208 maybe used in the determination of hits from other users IR Laser Gun Apparatus 47, for example which may invoke an action by the client module 221 as a result of a hit or by the client module 28 of the users augmented reality ("AR") display apparatus 1 or the game server 88 or host 89 as a result of the updated device state, which may result for example in the display of augmented virtual images via the user's micro-display 3 or as projected images via the external projectors 96 of the Laser Tag Arena 98 respectively.

The IR Sensors 208 may also serve as an input to the device and its client module 221 where upon detecting a hit this may activate the IR LEDs of the device or could disable them.

It should be noted that as previously detailed the detecting hits may occur as a result of the IR Sensor(s) 208 detecting Infrared ("IR") light emissions and IR radiation from an IR Beam/IR Laser Beam projected by an IR LED or infrared laser diode of another user's real-world game object such as an IR Laser Gun Apparatus 47 or IR Shield Apparatus 90 or IR Proximity Mine 91 onto the IR Sensor(s) 208.

These IR Sensors like those of other detailed devices in the embodiments of the disclosed invention herein, maybe a form of an active IR Sensor or passive IR Sensor in the form of fiber optic sensor, photo optic sensor, infrared detectors and/or photo-detector.

In addition, the IR Sensor 208 may be part of the IR Receiver which may be a form of photodiodes or phototransistors. The IR Sensor maybe a form of active or passive infrared sensor in this case.

The device also features as detailed an IR receiver 209 and also an IR demultiplexer 210 for receiving data via the IR Beam/IR Laser Beam, which may also serve as an input where the resulting detection of a hit via the IR Sensor based on the raw binary data in the IR signal may invoke a different action in the illuminating and activating of the IR LEDs 211 or the disabling of them. The same action may be invoked by the state information of the device which fired the IR Laser Beam retrieved from the game server 88 or host 89 via the network 97 as an alternative method.

As previously detailed the IR Receiver(s) 209 are a form of infrared receivers that may also be referred to an IR Sensor as they detect radiation from the form of an IR Transmitter.

Here it has been intentionally shown as a separate component of the devices circuit board in FIG. 10 although they could be part of the same component. This has been shown separately simply to distinguish between the IR Sensor 208 simply being responsible for detecting emissions from the IR Light in the determination of a hit as an on/off determination, whereas the IR Receiver 209 is able to detect difference in the radiation and particular frequencies from an IR Transmitter.

In addition, an IR Receiver can be used for receiving transmitted data over an IR signal/IR Beam where as an IR LED in its self doesn't not necessarily have this capability if it is a basic on/off type of IR Sensor that works with a basic IR LED hence why the IR Receiver 209 shown as separate to the IR Sensor 208. Again, though this could be combined if desired. The IR Receiver 209 may be a form of photodiodes or phototransistors.

The IR Receiver(s) 209 may also be modulated or configured to operate based on a specific wavelength and voltage where when used with a matching wavelength and voltage configuration of an IR Transmitter hits maybe detected.

Signal processing maybe done by amplifiers where the signal is very small. The set up of the IR Receivers 172 and IR Sensors 171 maybe configured as a direct Incidence.

The devices exterior mounted Camera(S) 223 allow the user to see the visual perspective from the device where in the case of the IR Proximity Mine Apparatus 91 this may be beneficial to support the targeting remotely of users where the output video of the camera(s) may be provided over the network 97 to the users augmented reality ("AR") display apparatus 1, in which through their Micro-display 3 they can see the camera view of the real-world device and game object.

In the case of an IR Proximity Mine this features multiple camera(s) 223 which is useful for manually triggering the IR Proximity Mine via hand gestures locally as well as remotely from their augmented reality ("AR") display Apparatus 1.

The audio speakers 214 provide 3D perspective audio for the projectile fire of IR Laser Beams, or other forms of virtual weapon fire, as well as incoming IR Laser Beams and virtual weapon fire from other real world users or AI Characters devices and game objects. The also output positional 3D audio effects of detected hits from the IR Proximity Mine Apparatus 91 on other objects, using the determined collision position or three-dimensional coordinate (x,y,z) of the hit on another user, object or AI Character.

This is supported by the audio manager module 226 of the device, which the previous detailed 3D spatial audio and 3D perceptual sound effects techniques such as ITD, IID, IPD, ILD, together with HRTF functions, where based on the input image coordinates in three-dimensional space of a real-world objects and its paired virtual game object in to a HRIR database, the sound waves may be processed and manipulated to achieve perceptual 3D audio localisation of objects in which a user perceives the audio coming from a specifiable location in three-dimensional space.

As shown in FIG. 10, the device also features a microphone 218, which may be used for providing direct voice commands in the activating of the device, where the devices speech recognition module 228 shall translate the spoken voice commands into recognisable text form inputs which are passed to the Client module 221 in which based on the received input this shall activate the illuminating of the IR LEDs 211.

Alternatively the IR Proximity Mine Apparatus 91 device may be activated by the use of the users augmented reality ("AR") display apparatus 1 microphones(s) 8L, 8R in which the augmented reality ("AR") display apparatus 1, speech recognition module 33 hall translate the spoken voice commands into recognisable text form inputs which are passed client module 221 of the augmented reality ("AR") display apparatus 1 that shall then invoke the device via an API call sent over the network 97 to activate its IR LEDs via its local client module 221 using a well defined API.

The IR Proximity Mine Apparatus 91 also features a Wifi Module 216 and bluetooth module 215, used for long range network connectivity and short range bluetooth network connectivity over IP between device and the users augmented reality ("AR") display apparatus 1, client module 221 as well as other real-world game objects/devices client modules, and the game server 88 or host 89 via the network 97 in the exchange of state information.

The IR Proximity Mine Apparatus 91 device also features a haptic module 220 in the form of vibration motor mechanism, which is recreates sensation movements in a circular motion to that of the circular projection of the IR laser beams when the device is picked up or is triggered whilst being held by a user's hand.

The devices sensors 207 include a motion and tilt Sensor(s) together with an alienator sensors that may be used to detect the devices location relative to the ground and movement resulting from the device being held by a user's hand when activated, in which based on the detected I/O inputs by the Client Module 221 resulting from the sensor readings this may invoke the haptic module 220 to be activated. This may then activate the haptic module 220 vibration motor which may be controllable to follow the same circular motion of the IR Laser beam fire projection from each of the IR LEDs and IR Transmitters along the surface of the IR Proximity Mine Apparatus 91, in which multiple IR Laser Beams may be projected at multiple angles.

In addition, based on the user physical wrist actions in the detection of special I/O input types, this could invoke a different action or behavior by the vibrations motor if the Haptic module to signify to the use whilst holding the IR Proximity Mine Apparatus 91 the users selected mode of fire.

Here based on varying physical feedback by adjusting the motion for example of the vibration motor of the haptic module 220, different device settings and modes may be detailed to the user by the physical motion feedback of the haptic module.

Here the IR Proximity Mine Apparatus 91 may for example feature a rotating vibration motor in which by adjusting the rate of rotation in a single rotation or partial rotation together with the level of vibrations patterns in the varying physical feedback may be recognisable by a user as to the mode and device configuration which may be adjustable through further wrist movements or voice command or via hand gestures.

As depicted in FIG. 10, the IR Proximity Apparatus 91 is powered by a lithium style battery 224 or other form suitable battery, in which the turning on or off of the device is operated via a power switch 225.

The IR Proximity Mine Apparatus 91 may be trigged in multiple ways including directly by throwing the device in which sensors 207 detect motion and free fall as well as impact for which either maybe used to activate the device; pressing trigger 222 or a button mechanism; Voice command via devices micro-phone(s) 218; Automatically based on vibrations, motions detected by the devices sensors 207; or remotely hand gestures via the devices external cameras 213 within short range; or by formulation using the proximity of another real-world user, game object, AI Character 94 or virtual game object 106, AI character 105 or remote user 107 to that of the device.

The device may also have a timer mechanism, in which upon the user pulling the trigger 222 or pressing the button 217, there maybe a time delay allowing the user to throw or place the IR Proximity Mine Apparatus 91 in a desired location.

In addition, live video from the IR Proximity Mine Apparatus 91 cameras may be transmitted over the network 97 and displayed on users augmented reality ("AR") display apparatus 1, via the micro-display 3, where a user can select to detonate via plurality of methods including the detailed voice command or hand gesture method. Here the video may include similar to the IR Laser Gun Apparatus 47, detailed targeting assistance system, augmented images highlighting the position of targets and their status in terms of friendly or enemy, in which the rendering module 27, uses state information from the game server 88 or host 89 on all other clients which includes real-world users, game objects, AI Characters 94 and virtual game objects 106, AI Characters 105 and remote users 107 to render and display augmented images over the video frames of the video feed from the users IR Proximity Mine Apparatus 91. This may include for example coordinate information, user name, number of hits, friendly or enemy highlighted by colour etc. together with a +/- value detailing if the user, object or AI Character is in or out range. A different outline shape over the target may be shown as augmented over the video frames indicating a target is in range.

Here the device may be activated remotely via hand gestures captured by the camera(s) 7L, 7R and gesture recognition module 30 of the users augmented reality display apparatus 1 or via voice command via the users augmented reality ("AR") display apparatus 1 speech recognition module 33 and microphones 8L, 8R in which a command is sent via the network 97 to the IR Proximity Mine Apparatus 91 device's client 221 which then activates the IR Transmitters 212 and IR LEDs 211 of the IR Proximity Mine Apparatus 91 and changes its state on the game server 88 or host 89 to active.

Alternatively, as detailed the IR Proximity Mine Apparatus 91 may be activated directly via hand gestures captured by devices camera(s) 219 and gesture recognition module 230 or via voice command via the devices speech recognition module 228 and microphones 218 where the user is in short range to the devices proximity.

Furthermore, the IR Proximity Mine Apparatus 90 may be activated directly via hand gestures captured by external camera(s) 95 and gesture tracking module 119 of the game server 88 or host 89 or via voice command via the game server 88 or host 89 speech recognition module 127 and microphones 100 where the user is near to the external cameras 95 and/or external microphones 100 in the Laser tag arena 98.

Alternatively, the proximity mine may be triggered by the physical action of throwing the device in which the tilt, motion, gyroscopes and accelerometer sensor(s) 207 detect motion at a high velocity and high acceleration associated with the object being thrown or free falling.

Alternatively, the IR Proximity Mine Apparatus 91 may be activated by proximity detection in which the collision manager 229 or proximity manager module 231 detect another real-world object, user, AI character 94 or virtual-game object 106, AI character 105, or remote user 107 being in proximity range of the device's activation, based on the state information retrieved from the game server 88 or host 89 of these other clients which includes their three dimensional Cartesian coordinates (x,y,z) in which relational to the Cartesian coordinates (x,y,z) of the device itself, the devices IR LEDs 211 and IR transmitter 212 may be activated in response by the client module 221 and collision manager 229.

As another alternative the device may be activated manually via a on/off button that results in the toggling on/off a boolean flag and the IR Transmitters 212 and IR LEDs 211 intermittently firing IR Beams/IR Laser Beams in the circular motion one at a time or all at once or in other formations depending on the number of times the button is pressed. Here the button 217 operates on a timer mechanism, in which the Client Module 221 of the device shall only activate the IR LEDs 211 and IR Transmitters 212 after a predetermined time.

The same as with the IR Laser Gun Apparatus 47 and other real-world game objects that are a form of IR Weapon hits from the device may be determinable based on reading of another real-world users, game object or AI Characters 94 IR Sensors.

Alternatively, a hit maybe determined a computationally where the IR Laser Beam is deemed by the collision manager 229 to have intersected with the world coordinates, hit box or model coordinates another real-world user, game object, AI Character 94 or virtual game object 106, AI Character 105 or remote user 107 based on a formulation of the projectile of the IR Laser Beam. This may use the same methods as previously detailed including but not limited to methods such as hitscan, raycast or frame by frame analysis.

Conversely a real-world user, game object or AI Character 94 or virtual game object 106, AI Character 105 or remote user 107 may have a virtual shield in which this may prevent a hit from being registered if the virtual shield is active.

Here a virtual shield is the reverse of a hit box essentially where any object detected intersecting with the coordinates of the shield such as IR Laser Beams virtual game object may be discounted as hit when a virtual shield is activated. A virtual shield has a set of points which each have 3D coordinates (x,y,z) that may be equal to the model coordinates or hit boxes of a real-world user, game object or AI Character 94 or virtual game object 106, AI Character 105 or remote user 107.

Alternatively, the virtual shield maybe a form of spherical shield in which its coordinates and mass is much greater than a single real-world user, game object or AI Character 94 or virtual game object 106, AI Character 105 or remote user 107, where upon being activated via voice command or hand gesture this may protect a greater number of objects.

These virtual shields can be seen as augmented images through the user's micro-display 3, or via external projectors 96 using 3D projection, projection mapping/video mapping or spatial augmented reality techniques in which every virtual shield has its own virtual game object and 3D model together with its physical attributes and other attributes such as lighting attributes.

Although virtual these virtual shields can have a physical effect on real-world users, game object or AI Character 94 or virtual game object 106, AI Character 105 or remote users 107 during the game where all IR Laser Beams that hit the IR Sensors for example will not be registered or when the shield is hit this may invoke the haptic modules of real-world game objects and wearables in which the weaker the shield becomes from repeated detected IR Laser Beam hits by the IR Sensors or the collision manager of the game server 88 or host 89 the greater the physical feedback is given to all users.

Eventually upon the virtual shield reaching a critical state when a sufficient number hit is detected the game server 88 or host 89 may invoke the haptic modules of all real-world game objects and wearables within its radius which may cause as a result on mass multiple real-world IR sensors to go off as well as multiple haptic modules a greater rate of vibrational feedback simulating that the virtual shield has been penetrated.

Here the client modules of each real-world game objects and wearables shall upon the virtual shied reaching this critical state and a subsequent hit being detected shall invoke the local IR Sensors and Haptic modules to be activated by passing an input to the CPU which shall via the device I/O interface invoke the IR Sensors and haptic module. Alternatively, the client modules may direct invoke the IR Sensors and haptic module via a defined API call. This provides another novel way of converging real-world and virtual world gaming.

Users that have an activated human shield, may use their body's to protect other users from the firing IR Laser Beams of an IR Proximity Mine Apparatus 91, by physically covering the IR Laser Beam with their body, preventing the IR Beam from hitting other users IR Sensor(s) where based on a boolean flag indicating that they have a human shield covering their body all IR Sensor readings and collision hit detections by the Collision Manager 229 will be registered as a negative hit.

Should a user cover the IR Proximity Mine Apparatus 91 to protect other users and not have a shield protecting their body hits will still be registered as a kill shot both on their body and on any other users in the proximity of when the IR Proximity Mine Apparatus 91 is triggered based on the computation of a hit detection.

Here hit detection may be commutated using triangulation based formulas, hitscan, raycasting and other mathematical collision detection formulas or frame by frame analysis techniques etc. to confirm if the IR Laser Beam virtual game objects or Line Rendering has intersected with that of the world coordinates and model coordinates or hit boxes of the user and other real-world users, objects and AI characters 94 or virtual game objects 106, virtual AI characters 105 or remote users 107 in the proximity of the range of the IR Proximity Mine Apparatus 91.

Hits therefore can be registered regardless of whether a user attempts to cover their IR Sensors or the IR Transmitters 212 and IR LEDs 211 of the IR Proximity Mine Apparatus 91.

This works similar to the determination of IR Laser beam hits with the use of the IR Laser Gun Apparatus 47 six dimensional matrixes, directional vector to formulate the IR Laser Beam's origin and projectile or directional vector together with the world coordinates or vector position of other real-world users, game objects and AI characters 94 based captured from their sensor(s) in which state information is retrieved from the game server 88 or host 89 in the determination of a hit.

The same applies to the use of the IR Laser Shield Apparatus 90 and/or IR Proximity Mine 91 to fire IR Laser beams, in which it is impossible in this way for users to cheat by covering simply their IR Sensor.

Like the IR Laser Gun Apparatus 47 and the IR Shield Apparatus 90 the state of the IR proximity mine may be affected by both real-world objects, users and AI Characters 94 as well as virtual world objects 106, AI Characters 105 and remote users 107 by means of collision detections in which their coordinates intersect.

For example, an AI Character 105 that is virtual could trigger based on the their world coordinates to that of the IR proximity mine's 91 coordinates (x,y,z), the client module 221 to activate the IR LEDs 211 resulting in the projectile of multiple IR Laser beams in which hits could consequently occur on any nearby real-world other users or other virtual game objects within the range of the IR Proximity Mines 91 IR beams/IR Laser beams.

In addition, virtual game objects such as another virtual-game weapon used could effect the state of this real world game object, where the bullets or fire of virtual-game weapon invoked say through a user's hand gestures captured through their wearable augmented reality ("AR") display apparatus 1, could be based on a computation of the projectile of the weapon fire be detected as hit on the real-world IR Laser Proximity causing it to be disabled, in which the collision response manager 229 shall invoke the IR Proximity mine Apparatus 91, IR LEDs 211 and IR Transmitters 212 to be disabled via the network 97 connection or locally by setting a flag to off as boolean value on the device.

Setting this flag to false as response to a collision detection shall also ensure that computationally no hits are registered subsequently by the collision manager where other real-world objects or virtual-game objects are in the normal hit range of the world coordinates of the device, which would invoke a potential hit to registered otherwise when the device is activated.

Similar to the IR Laser Gun Apparatus 47, the use of the IR Proximity Apparatus 91 device can also invoke the rendering and display of augmented reality projected virtual images, animations or video scenes of the IR Laser beam as an animation seen via the users augmented Reality ("AR") display apparatus 1 augmented over the users real-world view via their Micro-display 3, or seen via the external projectors 96 using projection mapping/video mapping or spatial augmented reality techniques where the augmented imagery may be seen without visual aid. This may use the previously detailed Line Rendering technique or may use the other methods detailed in the generating of virtual game objects and the formulating of the projectile of the IR Laser Beam based on the devices coordinates (x,y,z), orientation (p,r,y) and directional vector.

As stated in the case of the IR Proximity Mine Apparatus 91 since this has multiple IR LEDs each placed at different positions and orientation pointing in different directions, here offset values may be applied to x,y,z coordinates, orientation and directional vector for each IR LEDs which may map to specific virtual game objects and Line Renderings in the rendering process in which these each have a unique virtual game object and/or Line Rendering reference.

Where the system is capable of then rendering and augmenting over the user's real-world view the projectile IR Laser Beam fire from the IR Laser Proximity Mine Apparatus 91, with a high degree of accuracy in which directional lighting and visual lighting effects together with the virtual image of the IR Laser Beams may be seen directionally to moving in the same direction to that of the real IR Laser beam fire through the user's Micro-display 3, as augmented over their real-world view.

This may use the previously detailed Liner Render techniques and other disclosed rendering techniques used in the rendering and display of the IR Laser Beam as augmented image or animation of the moving IR Laser beam, in which the projectile or the displayed virtual image of the IR Laser Beam is based on devices coordinates, orientation and its directional heading capture from its sensors 207 by the device tracking module 232, in which its client module 221 then provides this state information data to the users augmented reality ("AR") display apparatus 1 via the network 97 for use by the rendering module 27, in the correct placement of the IR Laser Beam virtual-game objects and/or line rendering in which from these sensor readings the starting origin and projectile of the IR Laser Beam can be formulated.

Here for example the device coordinates (x,y,z) with an offset value +/− for x,y,z for the position of each of the IR LEDs, based on the positioning and orientation of each of IR LEDs on the physical IR Proximity Mine Apparatus 91 are used to formulate the origin (starting point) of the IR Laser Beam virtual game object or the origin game object in a Line Rendering method for example in which based on the velocity and distance of the IR Laser Beam, together with other variables such as the devices orientation (p,r,y) it is possible to accurately formulate the positions along the line or projectile path of the real-world IR Laser Beam.

This allows through identifying the vector positions along the projectile of IR Laser Beam virtual game object or the Line rendering for the rending module 27 of the users augmented reality ("AR") display apparatus 1 to then animate the virtual image showing the moving projectile of the IR Laser Beam in exact placement to the real-world IR Laser Beam and travelling at the same rate of velocity.

Prospective projection may be achieved through applying scaling transformations to the virtual game object of the IR Laser Beam or to the Line Rendering. In addition based on the users head position (x,y,z) and orientation (p,r,y) captured from the head tracking module of the users augmented reality ("AR") display apparatus 1, the rendering module 27 may perform transformations to the displayed virtual image and lighting effects of the projectile IR Laser beams, so that the IR Laser Beam virtual image remains true to its original origin the position for where the IR Laser beam was fired based on the devices coordinates and orientation etc., as well as the formulated projectile of the IR Beam/IR Laser Beam.

Alternatively using the same state information data supplied by the client module 221, renderings of the projected IR Laser Beam emanating from the IR Proximity Mine Apparatus 91 may be seen on real-world game objects such as users IR Mixed Reality Vests 92 and IR Mixed Reality Suits 93 where these devices are capable of rendering and displaying on their physical surfaces display panel faces virtual images together lighting and shading effects of the moving IR Laser Beam in the same projectile direction as the real-world IR Laser Beam, which this may be seen by the user's naked eye without any visual aid.

Alternatively using the same state information the game server 88 or host 89 may perform a 3D projection of the IR Laser Beam virtual game object or Line Rendering together with lighting and shading effects using the external projectors 96 and projection mapping/video mapping or spatial augmented reality techniques, where the resulting project augmented virtual images or animation and lighting effects of the moving IR Laser Beam over real-world objects, users or AI Characters 94 may be seen without visual aid.

Specular lighting effects may be applied to both other virtual-game objects and real-world game objects, AI characters 94 and users in which reflections of the light from the projected IR Laser Beam/IR Beam from the IR Proximity Mine Apparatus 91 from the origin (x,y,z) of the IR LEDs 211 that the originated and/or projectile of the IR Beam/IR Laser beam may be shown.

Where a hit is detected in which the projectile of one of the projecting IR Laser Beam from the IR Proximity Mine Apparatus 91 IR LEDs 211 based on each IR LEDs 211 coordinates (x,y,z), orientation (p,r,y) and directional vector intersects with that of another real-world game object, diffuse lighting effects together with decal visual effects may be displayed on the surface display panel faces by the rendering module and light display module of real-world game objects, wearable devices such as IR Mixed Reality Suit 93, real-world AI Character's 94 or maybe projected using the external projectors 96 and projection mapping/ video mapping or spatial augmented reality technique by the game server 88 of host 89 at the determined collision position (x,y,z).

Alternately diffuse lighting effects together with decal and lighting visual effect resulting from a hit maybe displayed as an augmented image overlaid over real-world objects, scenery, surfaces, game objects, users and/or AI Character 94 via the users real-world view via the users augmented reality ("AR") display apparatus 1, Micro-display 3 using the same known offsets.

In addition 3D Sound, based on the same x,y,z coordinates and orientation of the device together with the identifiable IR Transmitter ID and IR LED ID used as generate virtual game objects for the IR Laser beams and display the virtual maybe generated in which the user can also hear moving 3D sound effects of the projected IR Laser Beam.

Here like in the case of the IR Shield Apparatus 90 the IR Beam/IR Laser beam projectile is based on the devices own positional vector/world coordinates (x,y,z), orientation (p,r,y) and directional vector in which for each of the devices IR LEDs 211, offsets are applied to the coordinates (x,y,z), orientation (p,r,y) and directional vector based on the known position, orientation and directional vector of each IR LED 211 relational to the devices model coordinates This maybe used to formulate the origin (x,y,z) and projectile direction/directional vector of each IR Laser Beam from each of the devices IR LEDs 211. It should be noted that also that similar to the IR Shield Apparatus 90 upon the trigger mechanism 222 of the IR Proximity Mine Apparatus 91 being pulled 222 or the devices IR LEDs being activated by any of the other detailed methods herein, the ID of the devices IR LED 211 that is illuminated by the client module 221 is registered as part of the trigger event information stored locally and on the game sever 88 or host 89 by the devices client module 221, in which the known offsets for the IR LEDs coordinates (x,y,z), orientation (p,r,y) and directional vector are then applied by the respective rendering module of the display apparatus used to display the augmented virtual images of the IR Laser Beam when retrieving this event information locally from the device or via the game server 88 or host 89 via the network 97.

Figure 11:
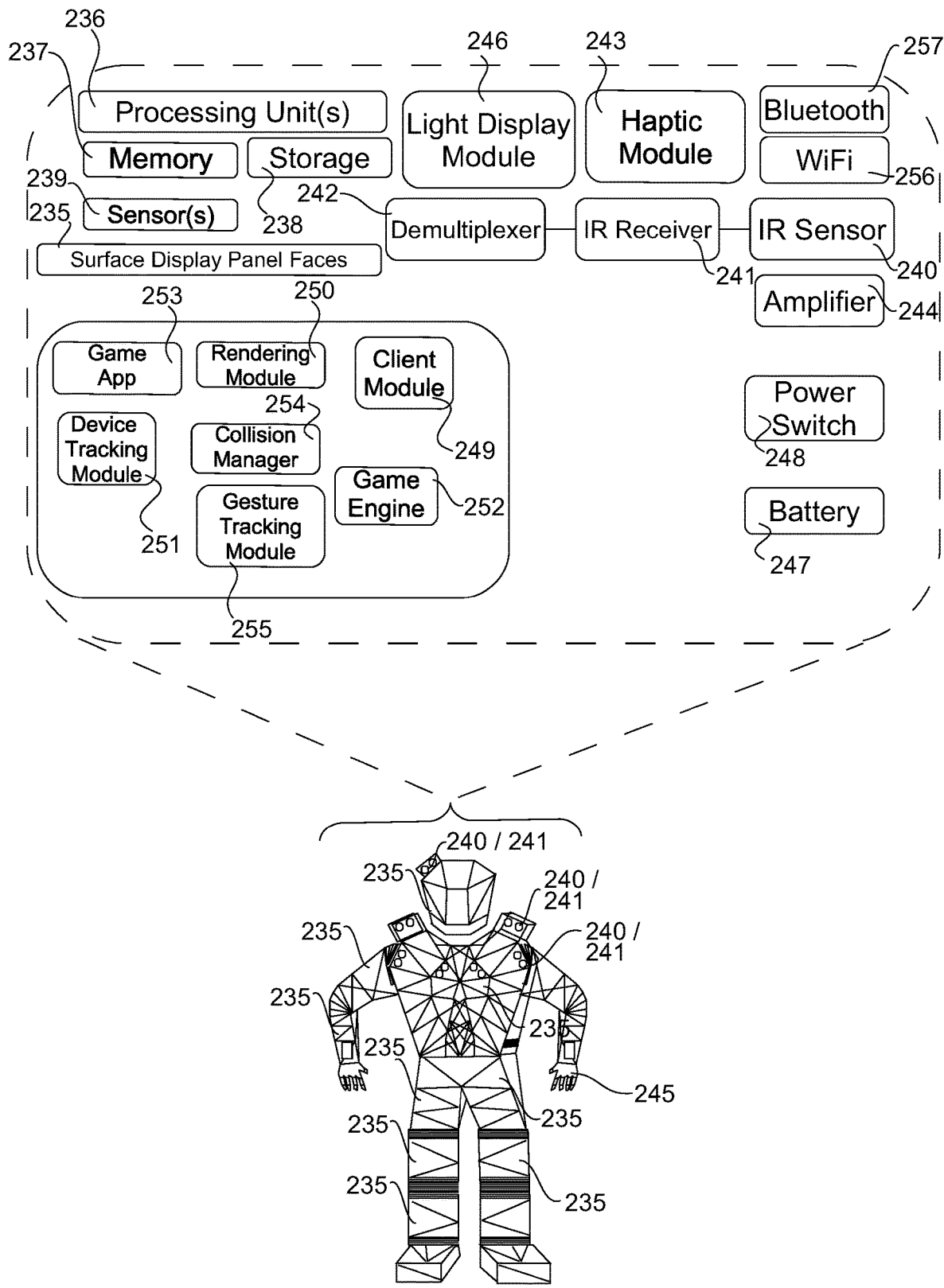
FIG. 11 shows a wearable IR Mixed Reality Suit 93 that features a number of IR Receivers 241/IR Sensors 240 for detecting hits from another users IR Beam/IR Laser Beam; a series of surface display panels faces 235 for displaying 3D virtual imagers over the users body, sensors 239 and a form of computer among other parts.
Figure 12:
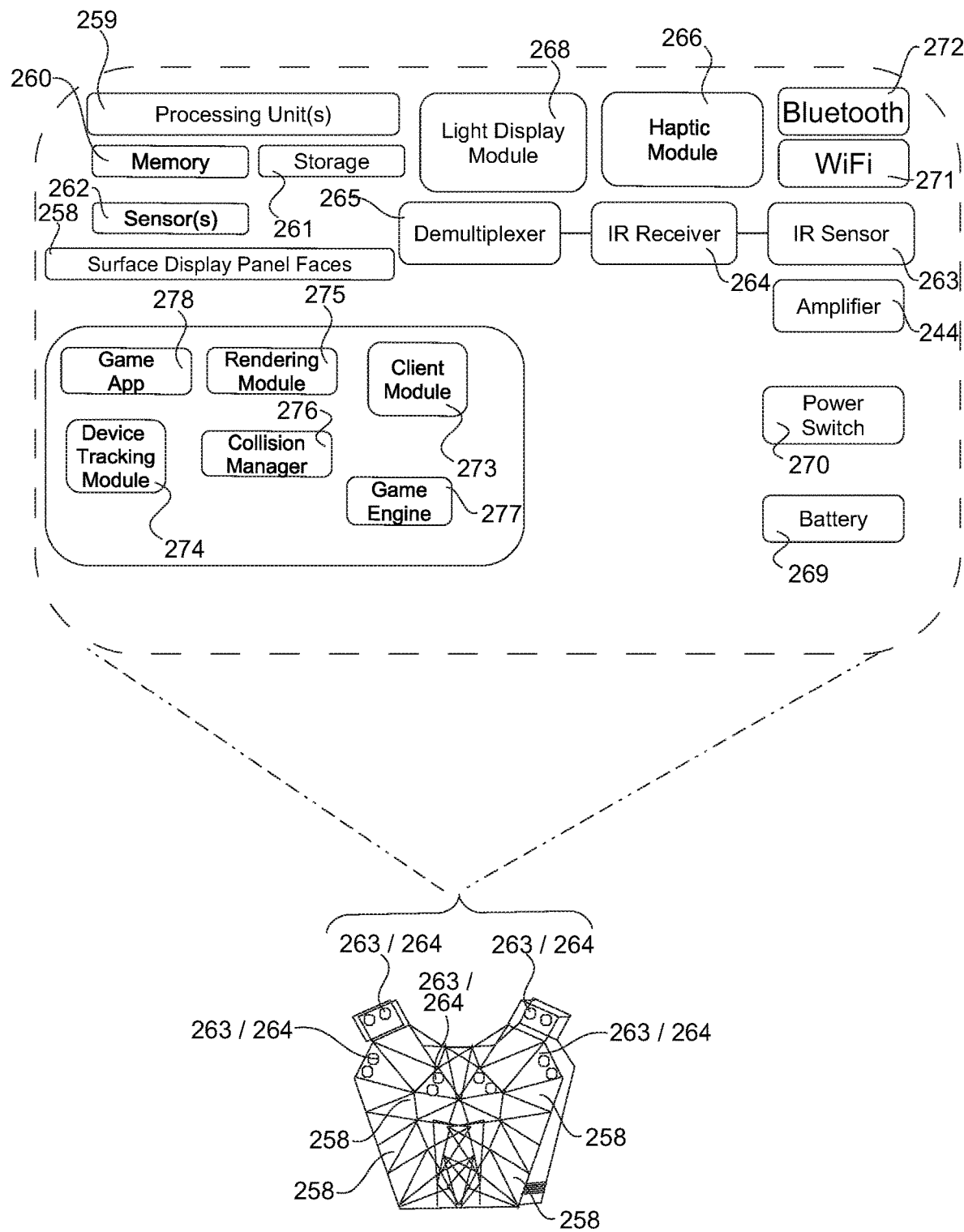
FIG. 12 shows a wearable IR Mixed Reality Vest 92 that features a number of IR Receivers 264/IR Sensors 263 for detecting hits from another users IR Beam/IR Laser Beam; a series of surface display panels faces 258 for displaying imagers over the user's torso and chest part of their body, sensors 262 and a form of computer among other parts.

Projection of lighting effects of the directional IR Laser Beams from the IR Proximity Mine Apparatus 91, on users may be displayed via external 3D projection, using the external projector(s) 96 of the laser tag arena 98 or maybe directly rendering where the user is wearing an IR Mixed Reality Vest 92 or IR Mixed Reality suit 93 which as illustrated in FIG. 11 and FIG. 12 feature surface display panel faces.

This includes specular and diffuse lighting effects in which based on a computation of the users world coordinates, model coordinates or hit boxes relative to the positional vector (x,y,z) and directional vector of the projected IR Laser Beam virtual game objects or Line Rendering the collision manager 125 and/or rendering module 117 on the game server 88 or host 89 shall invoke the rendering and display of specular and diffuse lighting effects on the users via the use of the external projectors 96 where the user does not have an augmented reality ("AR") display apparatus 1, IR Mixed Reality Suit 93 or IR Mixed Reality Vest 92 in which these visual effects can otherwise be displayed. These lighting effects can be seen by the naked eye.

Alternatively, the projection of lighting effects of the directional IR Laser Beams from the IR Proximity Mine Apparatus 91, may be rendered and displayed via a user's or multiple users micro-display 3 screens of their wearable augmented display apparatuses 1 as augmented virtual images over the user's real-world view, which is supported by the users augmented reality ("AR") display apparatus 1 rendering module 27 using the trigger event information retrieved from the either the device directly or the game server 88 or host 89 via the network 97 by its client module 28 or collision manager 26. In both cases spatial mapping techniques may be used together with geometric and volumetric data of the real-world objects, users, AI characters and surrounding surfaces to support the augmenting of virtual images and lighting effects of the IR Laser Beams over real-world objects, users and AI Characters 94.

In the case of the images being augmented over the user's real-world view via their micro-display 3, the same as the IR Shield Apparatus 90 transformations shall be applied also to the virtual game object or Line Rendering of the projected IR Laser Beam from the IR Proximity Mine apparatus 91, IR LEDs 211, based on the users head and eye tracking data by the rendering module 27 in which the object maybe rotated or scaled based on an individual users three dimensional cartesian coordinates, orientation and gaze direction into the virtual world relative to that of the world coordinates and projectile direction of the moving IR Laser Beam generated virtual game object. Here users head and eye tracking data shall be supplied to users augmented reality ("AR") display apparatus 1 the rendering module 27 by its local head and motion tracking module 29 and eye tracking module 32.

The direction of the IR Laser Beam of the IR Proximity Mine Apparatus 91 like the IR Laser Gun Apparatus 47 is provided in the form of six dimensional matrixes which is generated from the devices sensor(s) 207 upon the trigger mechanism 222 being pulled or the device being activated in which the original origin remains anchored at fixed point in the three dimensional space of the game, where transformations are applied to its virtual game objects resulting from the trigger mechanism 222 being pulled to ensure the correct perspective for individual users. Here where each IR LED 211 is positioned though at different positions and orientation on the IR Proximity Mine Apparatus 91, an individual six dimensional matrixes and directional vector maybe provided each IR LED in which offsets are applied to the devices coordinates (x,y,z) and orientation (p,r,y) based on the known position of each of the IR LEDs 211 in which this data may be provided as part of the event trigger information to the game server 88 or host 89 in addition to be stored locally by the devices client module 221.

It should be noted that multiple states of the virtual game objects or Line Renderings of the moving IR Laser Beam shall be maintained individually by the clients 28 and rendering modules 27 of each user's Augmented Display ("AR") display apparatus 1, in the case where the virtual game object and/or Line rendering of the IR Laser Beam is shown as augmented virtual image or animation via each user's micro display 3, in which different perspective states are maintained in terms of the objects orientation, scale to that of an individual user's head and eye's world coordinates, orientation and gaze direction using inputs from user's head tracking and eye tracking modules.

This ensures each user sees the IR Laser Beam relatively to its correct original point of origin and directional vector for the direction that the IR Laser beam was heading relative to that of the user's movements in the three dimensional space of the game.

In addition, multiple states of the virtual game objects or Line Renderings of the moving IR Laser Beam, representing each of IR LEDs may be maintained by the clients 28 and rendering modules 27 of each user's Augmented Display ("AR") display apparatus 1.

Similarly, the game server 88 or host 89 in the 3D projection via the external projectors 96 of the IR Laser Beam virtual images and animations, using projection mapping/video mapping or spatial augmented reality projection techniques shall maintain multiple states of the virtual game objects or Line Renderings of the moving IR Laser Beam for each of IR LEDs of the IR Proximity Mine Apparatus 91.

Furthermore, the clients and rendering modules of each real-world game object or wearable devices or AI Character shall maintain multiple states of the virtual game objects or Line Renderings of the moving IR Laser Beam for each of IR LEDs of the IR Proximity Mine Apparatus 91 for the display directly of the virtual images or animations or IR Laser Beam over their surface display panel faces.

As described previously in the example of IR Laser Gun Apparatus 47, augmented reality virtual images of the moving IR Laser Beam projection from the user of the trigger mechanism 53, multiple virtual game objects or Line Renderings of the IR Laser Beam may be generated also in this process of maintaining different states, where there are multiple users with multiple augmented reality ("AR") display apparatus 1, in which each one shall adapt the moving augmented projected image of the IR Laser Beam to different user's field of view and gaze based on the individual the head and eye tracking data of each user.

As described previously this shall invoke each of the users local rendering modules 27 to perform transformations to maintain the correct viewing perspective of the IR Laser Beam projectile along the x,y, z planes of the three dimensional cartesian coordinates relational to the original coordinates or origin (x,y,z) in which the trigger was pulled, to that the users moving head and eye coordinates as well as orientation in terms of their view into the real-world and virtual world of the game.

In addition for each IR Transmitters 212 and IR LEDs 211 six dimensional matrixes this is provided with the world coordinates x,y,z, pitch, roll and yaw together with a directional vector with time variable since the IR Laser beam maybe transmitted in a sequence of one IR Transmitter 212 and IR LEDs 211 at a time in a circular fashion.

This data is used to then formulate the virtual game objects each IR Laser Beam for each IR transmitter 212 and IR LED 211 relative to its direction and orientation into the real-world, where the result of which is that the system is then able to render and display the described visual lighting effects of the moving IR Laser Beam either as augmented within the desired animation sequence via each user's augmented reality micro display 3, by the users rendering module 27 or as 3D projected using an external projector 96 or directly on the on the surfaces display panel faces of real-world objects, AI characters 94, users IR Mixed Reality vests 92 or IR Mixed Reality Suits 93, in which these have display capabilities.

Here the user then sees multiple IR Laser Beam virtual images and lighting effects being played out in a sequence according to the activation sequence of the IR Transmitters 212 and IR LEDs 211, in which the IR Proximity Mine Apparatus 91 may be configured to project IR Beams/IR Laser beams in a specific sequence matching the animation sequence of the IR Laser Beam virtual game objects renderings or Line Renderings.

Like other real-world game objects such as IR Laser Gun Apparatus 47, the IR Proximity Mine Apparatus 91 maybe determined relational with a user in which during the game the IR Proximity Mine Apparatus 91 may be paired to a user in which this may have a unique identifier which is relational to that of the user's identifier, thus in the process of determining the origin of an IR Laser Beam, the users who activated or that had physically thrown the IR Proximity Mine Apparatus 91 who's resulting IR Laser beams shot hit another user can be determined and displayed as 2D virtual image on the AR Reality Display Apparatus 1, Micro-display 3 of the user who was hit.

This can also be displayed on the micro-displays 3, of all other users of their team where state information is used from the game server 88 or host 89. Hits from the IR Laser Beams of the IR Proximity Mine Apparatus 91 which are computed by the Collision Manager 26 of the users paired augmented reality "AR") display apparatus 1 may result in the creation of further virtual-game objects which maybe used to display an augmented virtual game image of a hit on real world objects, users, AI characters 94 seen through the user's micro display 3, augmented reality ("AR") display apparatus 1.

Alternatively, a transformation may be applied to a real-world objects surfaces in which rendered images are displayed directly or projected via external projector 96 to show a hit as a decal effect, using the collision position (x,y,z) determined by one or more instances of the collision manager on either the game server 88 or host 89 or the users augmented reality ("AR") display apparatus 1.

Alternatively, where a virtual game object transformation may be applied to their existing 3D model coordinates and rendered texture-maps to visually show a hit that maybe seen through the user's micro display 3 of their augmented reality ("AR") display apparatus 1 as augmented over their real-world view.

Returning briefly to FIG. 6, this Illustrates in UML form flow diagram illustrating some of the example variable actions and events resulting from the invoking the IR Laser Beam which may be invoked through multiple methods including by pulling the physically pulling of the trigger mechanism 189; or voice command via the microphone(s) 8L, 8R of the users augmented reality ("AR") display apparatus 1 or the devices microphones 179 directly; hand gestures via the users augmented reality ("AR") display apparatus 1 camera(s) 7L, 7R or the devices camera(s) 183 via either apparatus gesture tracking capabilities.

Alternatively, these same actions and events may be invoked by a user physical throwing of the device or automatically based on the proximity of the world coordinates of other real-world users, objects, AI Characters 94 or virtual-game objects 106, AI characters 105 and remote users 107 to that of the IR proximity Mine Apparatus 91 world coordinates, in the case of the device being a handheld IR Proximity mine Apparatus 91. Here the same events may be invoked as the physical use of the IR Laser Gun Apparatus 47 or IR Shield Apparatus 90 resulting in new virtual game objects of the projected IR Laser beam to be created and their visual effects to be displayed in relation to the direction of the weapon fire based on the directional vector, world coordinates, and orientation of the IR Proximity Mine Apparatus 91 device and each of its IR LEDs at the time the IR Laser beam was activated.

Where the resulting augmented virtual images of the IR Laser Beam and 3D audio effects may be seen and heard through a variety of methodologies as previously detailed including via the users augmented reality ("AR") display apparatus 1 micro-display 3 and speakers 6L, 6R, or via external projectors 96 and external speakers 101, or via the surface display panel faces and speakers of other real-world game objects, wearables such as other users IR Mixed Reality Suits 93 and IR Mixed Reality scenery 99.

FIG. 8 also provides an expanded block diagram of the core modules of the IR Proximity Mine Apparatus 91 in which the device also features a set of core software modules which in include a Client module 221, an Audio Manager 226 with HRIR database, an observer module 227, a speech recognition module 228, a collision manager 229, a gesture tracking module 230, a proximity manager 231, a device tracking module 232, a games engine 233 and a local copy of the Games Application 234.

In addition, the device features an operating system (O/S), kernel, bus, subsystem and a series of device drivers to support the functions of the devices hardware and software modules.

The client module 221 is responsible for maintaining the devices state during the game and providing state information to game server 88 or host 89 where there is a change in the state of the device resulting from a user input, the activation of the device, or a hit detected on the device via its IR Sensors 208 or computationally.

The client module 221 is also responsible for the handling of all user inputs including voice commands, hand gestures either via the device itself directly using its external microphones 218 and cameras 219 with the support of the devices speech recognition module and gesture tracking module or remotely provided via the client module 28 of the users augmented reality ("AR") display apparatus 1 or Game Server 88 or Host 89 via the network 97 as previously detailed.

The client module 221 is also responsible for the handling of sensor inputs which may invoke the activation of the device and its IR LEDs 211, such as in the prior example given of the devices sensors 207 detecting motion, vibrations, free falling or impact. The devices sensors 207 may also be used to detect hand gesture movements in which this may be interpreted by the client module of the device as a specific input type that could invoke for example a specific sequence in the activating and illuminating of the devices IR LEDs 211.

In addition, the client module 221 shall handle all physical inputs such the use of the physical trigger mechanism or button in the activating and illuminating of the devices IR LEDs 211.

The client module 221 shall also be responsible for the activating of the IR Transmitter and the providing of binary raw data for multiplexing and signalling in the IR Beam/IR Laser Beam. This may for example be used to signal the weapon classification, or a change in its classification resulting from a detected special hand gesture type. The client module is also responsible for retrieving state information via network 97 from the game server 88 and host 89 which is provided to the Collision Detection Manager 229 in the handling of responses.

The gesture recognition module 230 interfaces with the forward facing camera(s) 219 of the users IR Proximity Mine Apparatus 91 to support the capturing of users specific physical hand gestures and finger movements through processing and analysing the captured video and images of the users hand and finger movements. These hand gestures physical gestures such as hand signals maybe used to invoke an action by the IR Proximity Mine Apparatus 91.

Gesture hand movements are sensed by the use of gesture recognition algorithms by the gesture recognition module 230 in the process of detecting hand location and movement. This use many different forms of spatial gesture modelling such as 3D model based skeletal or volumetric algorithm based approaches, or appearance based deformable 2D templates or image sequences to capture simple to complex hand gestures. These gestures maybe passed to the client module 221 in the processing of user inputs as recognised hand gestures.

The speech recognition module 228 is responsible for handling of all spoken speech commands. This may use different forms of models, methods and techniques such as language modelling or Hidden Markov models or other forms of widely available models, methods and techniques to support speech recognition. This may use a form of speech to text system. The key responsibility of the speech recognition module 228 though shall be in the translation of spoken voice command inputs in to text formed inputs that are used by the Client Module 221 and/or Games Engine 233 to invoke an action on the IR Proximity Mine Apparatus 91 such as the activating of the devices IR LEDs 211.

Spoken voice command inputs from users maybe captured via the devices microphone(s) 218.

Alternatively, voice command inputs from users may be captured via the users paired augmented reality ("AR") display apparatus 1 microphone(s) 8L, 8R or via the external microphones 100 of the laser tag arena 98 in which the voice command inputs are retrieved via the Network 97 from the users augmented reality ("AR") display apparatus 1 client module 28 or directly from the external microphone(s) 100 by the devices client module 221 and passed to the speech recognition module 228 for processing and converting spoken voice commands in to text.

The Collision manager module 229 of the IR Proximity Mine Apparatus 91 is responsible for detecting collisions or intersections of two or more objects. It is also responsible for detecting if an object enters into the proximity radius of the devices range of fire. These objects may be real-world game objects, objects, users, AI Characters 94 or virtual world game objects 106, virtual AI Character's 105 and/or remote users 107.

The Collision manager module 229 is responsible for detecting collisions or intersections between real-world objects, users and AI Characters 194 and virtual game objects 106, AI characters 105 and remote users 107, in which it may use a plurality of methods to determine a collision or two objects intersecting each other including but not limited to posteriori collision detection methods, spatial partitioning methods, bounding boxes, n-body pruning, pairwise checks using bounding rectangles or circles hit boxes, in which after pruning exact pairwise collision detection is performed, or Triangle Centroid Segments may be applied for example.

Other methods such as hitscan, raycasting, time of impact (TOI) or frame by frame analysis, or polygon based triangulation may be used.

The Collision manager module 229 is also responsible for the collision response handling, which may be dependent on a number of variables including physics based attributes such as the mass, velocity or rate of acceleration of any an object vs. the other objects mass, velocity and rate of acceleration etc. among other variables and attributes.

The observer module 227, here is used to tracks any changes in the state of the real-world view of the devices camera(s) 223 resulting from changes in the state of a real-world object or surfaces, in which it notifies any changes to the devices local client module 221, as well as the client module 28 and rendering module 27 of the users augmented reality ("AR") display apparatus 1 via the network 97.

Changes may include the observation of a new space, surface or object in the real-world in which new mesh data together with a mesh filter, wireframe and a subsequent 3D model may be generated for the purpose of rendering and augmenting virtual-game images overlaid over these new identified spaces, surfaces or objects. In addition, changes may include the change in orientation of an observed real-world space, object or surface.

This data is used by the used in the display of augmented images over the video catapulted from the cameras 219 of the IR Proximity Mine Apparatus 91 which is displayed via the users augmented reality ("AR") display apparatus 1, micro-display 3, used to assist the user targeting and the remote manual triggering of the activation of the device.

The games engine 233 here serves to provide support for the processing of inputs, performing of mathematical operations such projectile formulation etc. or Line Rendering calculations in the determining of hits for example from a IR Beam/IR Laser Beam but is not used necessarily in the rendering of augmented images similar to the use of the GPU in this case.

The games application 234 provides the game logic and storylines, in which here the local instance of the game application based on the state of the device or the state of other objects may invoke an action to bring the game to conclusion such as the request via the client module 221 to activate the IR LEDs 211 on the users IR Proximity Mine Apparatus 91 device as the result of an external event in the game play or storylines.

As detailed the Audio Manager 226 supports the playback of 3D spatial sound and perceptual based 3D sound localisation effects. The Audio manager may use HRTF's to create 3D audio, or other techniques based on ambisonics and wave field synthesis principle to create 3D audio that is played back via the users IR Proximity Mine Apparatus 91 speakers 214.

In this process the system shall process and convert the 3D coordinates of users IR Proximity Mine Apparatus 91, as well as the coordinates of other real-world and virtual game objects together with events such as the pulling of the trigger mechanism 222 on the IR Proximity Mine Apparatus 91 and collision hits to generate image inputs into the HRIR database to generate 3D sound, where the sound shall be placed correctly on the three-dimensional plane relative to the IR Laser Beam projectile, the users position, the position of other real-world objects and virtual objects or that of the collision position or hit coordinate as x,y,z value.

The system shall factor in the computation of the 3D audio other variables such as the pitch, roll and yaw expressed as (p,r,y) of the users IR Proximity Mine Apparatus 91 devices IR LEDs 211 as well as the devices world coordinates (x,y,z) and the respective coordinate (x,y,z) of the IR LED 211 that was illuminated at the point of the trigger mechanism 222 being pulled and afterwards in which the 3D sound will be always be relation to the original origin of the IR Beam/IR Laser beams and its the moving projected 3D holographic image generated from the creation of a virtual game object representing IR Beam/IR Laser Beam or Line Rendering, together with the positional coordinates and orientation of other real-world objects and environment, other virtual game objects.

This uses a process of manipulating the user's perception of the interaural time difference ("ITD"), which is the difference in the arrival time of sound between two locations (through changing adjusting the time the sound arrives at either of the user's ears), interaural intensity difference ("IID") in which the sound intensity between two locations is varied, the filtering of sound by user's ear's pinnae part of the ear, interaural level differences ("ILD") which provide salient cues for localizing high-frequency sounds in space based on differences in the sound pressure level reaching the two ears, the precedence effect and head-related transfer functions ("HRTF").

In addition, like in the example of the display of rendered virtual images of the IR Beam/IR Laser Beams from each of the devices IR LEDs 211 in which differing offset values are applied to the devices own world coordinates/positional vector (x,y,z), orientation (p,r,y), directional vector for each IR LEDs 211 based on their known model coordinate position, orientation and directional vector on the IR Proximity Mine 91 devices exterior and 3D model, the same offsets e same offset values based on the known ID maybe applied in the accurate positioning of 3D sound effects. In this way the placement of 3D spatial audio or perceptual based 3D sound localisation effects together with the display of augmented virtual images in three-dimensional space always remains relational to the real-world IR Beam/IR Laser Beam projectile from each of the different directional and orientated IR LEDs 211 mounted on the devices exterior the same as with an IR Shield Apparatus 90.

Here the direction of the displayed augmented virtual image or animation of the IR Beam/IR Laser Beam and the 3D sound effects travel along the exact precise line of projectile as the real-world IR Beam/IR Laser Beam which may be seen and heard by the user in the exact same placement in three dimensional space by the variety of display apparatus and speakers supported by the system detailed herein including the user of the users augmented reality ("AR") display apparatus 1 micro-display 3 and speakers 6L, 6R; the use of external projectors 96 and external speakers 101; or the use of direct display surface panel faces and speakers of real-world game objects such as an IR Shield Apparatus 90, IR Laser Gun Apparatus 47 and IR Mixed Reality Scenery 99.

Equally the velocity at which the augmented rendered holographic virtual image or animation of the IR Beam/IR Laser Beam travels is equal to that of the changing position (x,y,z) of the real-world IR Beam/IR Laser Beam, its virtual game object/line rendering and its 3D audio sound effect.

In the example of IR Proximity Mine Apparatus 91 3D spatial audio or perceptual based 3D sound localisation effects may be generated by the games engine 233 and game application 234 may be invoked on the devices speaker(s) 214 by the devices the audio manager module 226 during game play for other objects based on their relative coordinates x,y,z to that of the IR Proximity Mine Apparatus 91 as well as for the IR Proximity Mine Apparatus 91 itself such as in the usage of the devices trigger mechanism 222 as detailed where 3D audio effects are created for the IR Beam/IR Laser beam projected from the device. Here the games engine 233 and game application 234 uses state information retrieved via the network 97 from the game server 88 or host 89 in the generating of 3D sound effects for other objects and their resulting virtual game objects in the projecting of IR Beams/IR Laser Beams as well as hit detections.

Alternatively, 3D spatial audio or perceptual based 3D sound localisation effects may be generated by the game server 88 or Host 89 may be invoked on the devices speaker(s) 214 by the devices the audio manager module 226 during game play for other game objects based on event triggers/IR Laser Beams being projected and the detection of hits for example.

Here like in the case of all other real-world game objects such as IR Shield Apparatus 90, IR Laser Gun Apparatus 47 and real-world AI Characters 94 etc. in which the game server 88 and host 89 maintains all state information, this information is used by the game server 88 and host 89 in the rendering and display of virtual images, animations, in game scenes by its rendering module 117 and display projection module 122 as well as in the producing of 3D audio effect by its audio manager 121.

The game server 88 and host 89 audio manager here shall using the same techniques as the audio manager of real-world game objects and devices produce 3D spatial audio or perceptual based 3D sound localisation effects.

Where this differs though is the game server 88 and host 89 audio manager 121 maintains the state of all 3D audio effects for all real-world game objects, users, AI characters 94, virtual game objects 106, virtual AI characters 105 and remote users 107, in which it provides 3D audio effects to every external speaker 101 in the laser tag arena 98 as well as real-world game objects, users augmented reality ("AR") display apparatus 1, AI characters 94 in which the 3D audio sound effects are dynamically generated based on the movements of all objects in which transformations are applied in real-time.

The result is a fully immersive and dynamic 3D sound effects based system in which as a user runs, jumps, turns or objects are thrown transformations are applied to the 3D audio effects relative to the movements of all objects throughout the laser tag arena 98 and 3D sound effects emanate from a planarity of devices.

In contrast real-world game objects such an IR Proximity Mine 91, IR Shield Apparatus 90 or IR Laser Gun Apparatus 47, only maintain 3D audio effects on a subset of objects that are within close proximity in the same 3D cell of the laser tag arena 98 as the device itself. Transformations are applied still to 3D audio effects relational to movements in objects but not at the same scale, based on the updated state information for example on the change in position (x,y,z) of another users IR Shield Apparatus 90 for example.

In addition, using the same state information retrieved from the game server 88 or host 89, 3D spatial audio or perceptual based 3D sound localisation effects may be generated as a result of the detection for example of the projection IR Laser beams from the users IR Proximity Mine 91 or the projectile of Laser IR Beam/IR Laser Beams from other users IR Laser Gun Apparatus 47, or in the detection of a collision position (x,y,z) of a hit of an IR Beam/IR Laser beam on a user's IR Sensor detectable by the IR Sensor or by the Collision Manager 229, where the audio maybe positionally placed in 3D space in the same projectile direction of the moving IR Laser beam or the three-dimensional cartesian coordinates of the detected hit of the IR Laser beam.

3D audio may be positionally placed on a three dimensional coordinate of the planes of the Cartesian coordinates x, y, z axes, relational to the devices orientation based on its pitch, roll and yaw. This allows the audio module to manipulate the sound outputs of the speakers and audio source files using the techniques as detailed ITD, IID, ILD and HRTF so as the audio sound effect of the projected IR Beam/IR Laser beam appears moving in 3D space, relational to that of the devices own positional vector and orientation provided as six dimensional matrixes by its device tracking module 232.

The projectile direction of the IR Bean/IR Laser beam is based on a six dimensional matrixes at the point of origin for when the IR Laser trigger mechanism was pulled used in the placement of the 3D audio effect of the Laser beam and in the calculation of its moving projection along the planes of the Cartesian coordinates in 3D dimensional space.

Alternatively, this may be based on the Line Rendering of an IR Beam/IR Laser Beam in terms of the start position of the line (the origin), and the formulated points along the line in terms of their x,y,z coordinates until the end of the line is reached where just as the animation of the IR Laser Beam moves along the points of the line in three dimensional space, so does the 3D spatial audio or perceptual based 3D sound localisation effect in which the user sees the animated visuals of the IR Beam/IR Laser Beam through their microdisplay 3, or via the external projectors 96 where the sound output from the respective devices speakers is positionally played back at the same coordinate in three dimensional space, in which the user perceives the sound to be in the same moving positions.

The processor units DSPs may be used to support this functionality. It should be noted that the game server 88 and host 89 views all external real-world game objects as a display apparatus for the objects own 3D renderings, decal effects, lighting effects and also as a speaker for outputting 3D audio effects in which like lighting effects transformations are applied to ensure the 3D audio remains in the correct position (x,y,z) regardless of whether the user moves further away or changes the direction of their real-world device.

Like perspective projection, the game server 88 and host 89 audio manager 121, shall change the sound volume for example to increase the volume of a 3D sound effect the closer a user moves towards its coordinates.

The device tracking module 232 is responsible for maintaining state information on the IR Proximity Mine Apparatus 91 world coordinates/position in three dimensional space expressed as three dimensional Cartesian Coordinates (x,y,z) and orientation expressed as pitch, roll and yaw (p,r,y) and together with its directional heading expressed as a direction vector together with other state information such as acceleration, velocity and elevation.

This uses the devices multiple sensors 207 to track the position of the device, its orientation and directional heading (directional vector). It also tracks the devices velocity, acceleration and other variables used by the gesture module 230 to detect special gesture inputs from specific wrist actions by the user or specific states such as free falling, vibrations etc. in which this sensor information is processed and passed to the Client Module 221 for handling that may invoke an action similar to those already detailed.

This state information is provided to the game server 88 or host 89 via the network 97 by the devices Client Module 221 in which the game server 88 or host 89 maintains state information on all real-world users, game objects and AI Characters 94 together with state information on all virtual game objects 106, AI Characters 105 and remote users 107 to support the detailed functions as disclosed within the embodiments of this invention.

It is also used by the local modules such the collision manager 229 in the determination of collisions with other real-world game objects, users, AI character's 94 or virtual game objects 106, AI character's 105 or remote users 107.

FIG. 11 shows an IR Mixed Reality ("MR") Suit 93, that comprises of surface display panel faces 235 covering the user's arms, legs and other body parts, multiple IR Sensors 240 for detecting hits from another users IR Laser Beam, a series of haptic modules 243 that provide physical feedback.

As shown in FIG. 11 the IR Mixed Reality suit 93 features a set of processing units 236, Memory 237, Storage 238, Sensors 239 (including a tilt sensor, accelerometer, gyroscope, GPS tracker etc.), two or more IR Sensors 240, an IR receiver 241, a demultiplexer 242, and a haptic module 243.

An inductive loop transmitter may be connected also to a plurality of IR Sensors 240 or an amplifier 244 for invoking multiple IR Sensors 240 to go off upon a hit being detected via a single IR Sensor 240 or computationally by the devices collision manager 254. The IR Mixed Reality ("MR") Suit 93 may also feature wired gloves 245 to provide accurate hand gesture input feedback for complex hand and finger gestures at a faster rate than other methodologies used in hand gesture inputs.

This device is mainly used as wearable device in detection of hits. It supports also though the display of 2D and 3D images over the entire body of the user which may or may not exclude their head in which the previously detailed augmented reality ("AR") display apparatus 1, may be used with this device or may be part of the device in which they are physically connected via circuitry and share hardware resources.

Alternatively, the IR Mixed Reality ("MR") Suit 93 may also be independently used without an augmented reality ("AR") display apparatus 1. In the example embodiment of the suit, the configuration is shown as separated.

The IR Mixed Reality ("MR") Suit 93 other main purpose is to provide physical feedback via the devices haptic module 243 to the user from the detection of collisions and hits during a laser tag game whether invoked by the IR Sensors 240 or computationally as result of the devices collision manager 254 determining a collision or hit.

As depicted in FIG. 11, the IR Mixed Reality Suit 93 features a set of processing units 236 (including a CPU, GPU), memory and storage. The processing units 236 support the functions of the IR Mixed Reality Suit 93, where the CPU or CPUs are responsible for executing all the programmed instructions and logic of the software modules of the IR mixed reality suit and the GPU's is used in the mathematical and rendering operations providing hardware acceleration in the rendering of texture maps for example for display on the surfaces of the device's surface display panel faces 235 of the users IR mixed reality suit 93.

The memory 237 may be a form volatile memory or random access memory (RAM) for performing high speed instructions by the CPU such as DRAM, fast CPU cache memory and SRAM or other forms of volatile memory or example used as the main memory of the system. Additional memory may be provided via the GPU as dedicated graphics memory or may be commonly used between the CPU and GPU. The memory 237 may also consist of non-volatile memory also for performing BIOS and firmware operations such as flash memory, ROM, EPROM, or EEPROM memory, where flash memory may be used as a secondary form of memory for example.

The flash memory may be a type of NOR Flash. Files and data may be stored also the storage memory 238 together with the IR Mixed Reality Suit 93, software binaries, executable files of the programs and all corresponding files that support the IR Mixed Reality Suit 93 functions. This may include Operation System (O/S) software and all device drivers for the devices surface display panel faces 235 for example.

The storage memory 238 may be in the form of a SSD flash based drive or a conventional hard disk such that is HDD based or another form of non-volatile memory.

As shown in FIG. 11 the IR Mixed Reality ("MR") Suit 93 also consists of multiple clusters of several sensor(s) 239 including a multi-axis accelerometer, gyroscope, tilt sensor, motion sensors placed in different positions on the IR mixed reality body suit support the tracking of the users body movements, in which precise positional coordinates (x,y,z) and orientation values (p,r,y) of the users physical movements in their arms, legs and torso may be tracked for maintaining detailed state information on the user's model coordinates used in the accurate computation of hits and collision detections by the collision manager 254 for example.

This may also be used by the rendering module 250 in applying lighting effects on the surface display panel faces 235 of the IR Mixed Reality ("MR") Suit 93 that cover the users body in which lighting and reflection type effects may be applied relative to the position and orientation of the user's body parts to that of the position and orientation of other objects.

To support this tracking capability in addition as illustrated by FIG. 11 the IR Mixed Reality ("MR") Suit 93 sensors 239 also features a GPS Tracker, a solid state compass, an electromagnetic compass/digital compass and a magnetic compass or magnetometer. Furthermore, the sensors 239 may include an inclinometer, pedometer, speedometer, altimeter, a MEMS Barometer and a dead reckoning module.

State information including coordinates (x,y,z) and orientation (p,r,y), directional vectors and elevation from the ground of the users different body parts from the sensory data is passed to the game server 88 or host 89 via the network 97 by the IR Mixed Reality ("MR") Suit 93 client module 249 for maintaining state information and is handled also by the client module 249 and other modules such as the rendering module 250 and collision manager 254 locally in the performing of their functions as detailed.

These sensors 239 placed around the users body on the IR Mixed Reality ("MR") Suit 93 as cluster formations of multiple sensors 239 are used to track the movements of each of the user body parts in terms of their world coordinates expressed as three dimensional Cartesian coordinates or points on the x,y,z; their orientation expressed as pitch, roll and yaw (p,r,y); their directional heading which may be expressed as directional vector and their elevation from ground level together with other physical attributes such as velocity, acceleration etc.

This may be used in the determination of collision responses and in the computational operations of the game as well as the invoking game scenes, animations, the display of augmented images and lighting effects via the variety of methods supported over the surface display panel faces of real-world game objects, or via the users augmented reality ("AR") display apparatus 1, or by the game server 88 or host 89 via the use of the external projectors 96 using projection mapping/video mapping and spatial augmented reality techniques.

The IR Mixed Reality ("MR") Suit 93 also features a series of IR Sensor(s) 240 and IR receivers 241 covering the users main body parts such as arms, legs, torso etc. as depicted in FIG. 11 used for detecting hits as a result of the IR Sensor(s) 240 detecting Infrared ("IR") light emissions and IR radiation from an IR Beam/IR Laser Beam projected by an IR LED or infrared laser diode of another users real-world game object such as an IR Laser Gun Apparatus 47 or IR Shield Apparatus 90 or IR Proximity Mine 91 onto the IR Sensor(s) 240.

These IR Sensors like those of other detailed devices in the embodiments of the disclosed invention herein, maybe a form of fiber optic or active IR Sensor and/or passive IR Sensor as a form of infrared detectors.

These IR Sensors maybe used in the determination of hits from other users IR Laser Gun Apparatus 47, or an IR Proximity Mine Apparatus 91 or an IR Shield Apparatus 90 for example which may invoke an action by the client module 249 or collision manager 254 module as a result of a hit where this could invoke a change in the state of the rendered texture maps or the display of decal and/or diffuse lighting effects on the IR Mixed Reality ("MR") Suit 93 surface display panel faces 235 by its rendering module 250 in response to the collision detection.

It should be noted that both of these actions resulting from a hit could be invoked by a computational detected collision by the collision manager 254 alternatively to the use of the IR Sensor 240 and IR Receiver 241.

The IR Mixed Reality ("MR") Suit 93 also features a number of IR receiver(s) 241 and an IR Demultiplexer 242 for receiving and demultiplexing data via the IR Beam/IR Laser Beam, which may also serve as an input where the resulting detection of a hit via the IR Sensor 240 based on the raw binary data in the IR signal may invoke a different action such as the display of different types of rendered texture maps or the display visual decal and/or diffuse lighting effects on the surface display panel faces 235 of the users IR Mixed Reality ("MR") Suit 93 indicating a different class of weapon.

Alternatively, this could invoke a different type of haptic feedback based on the classification of the weapon detailed in the raw binary data of the IR signal, in which the based on the processing of this data by each of the Haptic Modules 243 this may invoke a different physical feedback by adjusting the rate which for example its vibration motor vibrates.

IR Sensors 240 and/or IR Receivers 241 maybe paired here to specific Haptic Modules 243 or could connect to all Haptic modules 243 in which upon a hit being detected in the form of Infrared Light Emission/radiation by the IR Sensors 240 and IR Receivers 241 this could invoke a physical response on one or all Haptic modules 243 corresponding to the detection of a hit. Alternatively, this could be determinable by the classification of the weapon based on the raw data in the IR signal or based on the known state information of the device that fired the IR Laser Beam by the game server 88 or host 89.

As previously detailed the IR Receivers 241 are a form of infrared receivers that may also be referred to an IR Sensor 240 as they detect radiation from the form of an IR Transmitter. Here it has been intentionally shown as a separate component of the devices circuit board in FIG. 11, although they could be part of the same component. This has been shown separately simply to distinguish between the IR Sensor 240 simply being responsible for detecting emissions from the IR Light in the determination of a hit as an on/off determination, whereas the IR Receiver 241 is able to detect difference in the radiation and particular frequencies from an IR Transmitter.

In addition, an IR Receiver 241 can be used for receiving transmitted data over an IR signal/IR Beam where as an IR LED in its self doesn't not necessarily have this capability if it is a basic on/off type of IR Sensor that works with a basic IR LED hence why the IR Receiver 241 has been shown as separate to the IR Sensor 240. Again, though this could be combined if desired.

The users IR Mixed Reality ("MR") Suit 93 also features one or more Light Display Module (s) 246, controls the illumination of pixels and the display of the resulting light from virtual images that cover the faces and surface display panel faces 235 of the user IR Mixed Reality Suit 93 covering the users body. This module reads the pixel colours from the frame buffer for example together with their pixel coordinates for each of the surface display panel faces 235 that make up its 3D mesh and invokes the illuminating of the each of the surface display panel faces 235 LEDs in the case the display panels are form of organic display panels such as OLED.

The surface renderings are projected an by the light display module 246 on the display panels using Light Emitting Diodes (LEDs) where the surface display panel faces 235 are a form of organic light emitting displays (OLED). The display maybe back-light also with further LEDs. The display could alternatively be a form LCOS or LCD that is made of a glass or polymer material in which the light display module(s) 246 may activate the display of each of the surface display panel faces 235.

In the illuminating of the pixels on the light display module 246 may works with the display drivers of the surface display panel faces 235 to perform its functions or the display drivers may be part of the Light Display Module 246.

As depicted in FIG. 11 the users IR Mixed Reality ("MR") Suit 93 consist of multiple surface display panel faces 235 which as detailed may be a form of organic display such as an organic light emitting display (OLED) or Liquid Crystal on Silicon (LCOS) or another form of Liquid Crystal Display LCD. Multiple surface display panels faces 235 may be arranged in a tiled or 3D mesh configuration that form the real-world faces and 3D model of the IR Mixed Reality ("MR") Suit 93.

Each surface display panel faces 235 is driven by circuitry together with the display drivers and are powered by the main board circuitry via connectors. One or more Light Display Module(s) 246 control the display of imagery and pixels on each surface display panel faces 235 of the users IR Mixed Reality Suit 93.

The surface display panel faces 235 may be connected directly to the devices PCB through an internal display port ("iDP") where the display maybe soldered directly to the PCB or may be connected via another form of standard based DisplayPort and digital display interfaces such as an embedded display port ("eDP"), Slim port, HDMI, USB, MIPI DSI or a DVI link etc.

The surface display panel faces 235 are arranged to form a partial or full 3D mesh over the user's body which is physically represented as a 3D rendered avatar of the user's alternative character during the Laser tag game in the real-world, in which multiple triangular or quad shaped display screens cover the surfaces and faces of the users IR Mixed Reality Suit 93 to form a three dimensional avatar shape and geometric structure.

This forms a 3D mesh visible to users during a laser tag game in the real-world with no visual aid, in which the real-world 3D mesh is formed of display panels overlaid on the user's body as a wearable 3D mesh/IR Mixed Reality Suit 93 which is formed of real-world vertices/points, edges, faces, polygons and surfaces in three-dimensional space of the real-world. Here like the IR Laser Gun Apparatus 47 a virtual game object which has a polygon-based mesh maps directly to the real-world users IR Mixed Reality Suit 93 in terms of its edges, faces, polygons and surfaces of its real-world mesh and geometric shape and form.

Here individual real-world surface display panel faces are triangular or quad like in form in which the 3D structure and model of the users IR Mixed Reality ("MR") Suit 93 is made up of real-world triangles and/or quads that map to the triangles/quads or polygons, faces, vertices, and surfaces of the maintained virtual game object and virtual 3D model representing the user's avatar.

Here the IR Mixed Reality ("MR") Suit 93 real-world 3D mesh maybe a form of polygon-based mesh that derived from the multiple triangular or quad shaped surface display panel faces 235 which cover the main entire body of the users IR Mixed Reality Suit 93. Alternatively, they may be a representational wireframe polygon-based model or another suitable polygon-based mesh form which maps back to the maintained virtual game object and 3D model of the user's avatar.

This supports the ability for the rendering module 250 to render 3D images which are exact in representation geometrically to that of the users real-world IR Mixed Reality ("MR") Suit 93, in respect of their model coordinates, vertices, polygons, faces and surfaces.

In which the virtual 3D rendered image of the users Avatar may be formed in the real-world through the display of 2D images on to the multiple surface display panel faces 235 on the devices physical faces, in which the multiple 2D images and rendered texture-maps are displayed on the devices faces via their respective vertices coordinates for each of the devices faces, to form a 3D rendered image that is physical in presence in the real world.

Here the rendering module 250 is operable to apply each respective texture map on each of the user's virtual game object and avatars triangles/polygons, faces and surfaces to each of the real, face, surfaces of the users IR Mixed Reality Suit 93 through using techniques such as perspective correct texturing in which accounts for the vertices' positions in 3D space. In which based on vertices positions it is possible to map each respective texture maps to the surface display panel faces of the IR Mixed Reality Suit 93 where the vertices positions for every polygon or triangle on the user's representational virtual game object and 3D model avatar maps precisely in terms of its vertices positions to that of vertices positions of the real surface display panel faces 235 of the users IR Mixed Reality Suit 93.

This process may be used for other forms of texture mapping techniques that are based on 3D vertices.

Alternatively, where other forms of texture mapping is used which are not based on the use of 3D vertices, pixel coordinate based mapping may be used in which every surface display panel face has a unique set of pixel coordinates. Since though the virtual image may be random in its 2D coordinates it may not be enough to simple map the 2D coordinates to the surface display panel faces of the users IR Mixed Reality Suit 93 unless the virtual game object remains static and no rotations for example were performed but this may be limiting in terms of the subsequent lighting effects that can be displayed where lighting should be relational to the user's physical movements, orientation and position which requires rotations and other transformations to applied to the virtual game object and 3D model of the users virtual avatar.

Here the same as detailed for the IR Laser Gun Apparatus 47, this achieved through a process of mapping the paired virtual game objects 3D model points or vertices, polygons/triangles, faces and their corresponding texture maps representational pixel coordinates map to individual surface display screen faces 235 of the users IR Mixed Reality Suit 93, where based on pixel coordinates and a face ID/display ID attributed to each surface display panel face, this allows complex 3D shapes to be recreated in physical form in the real-world where two states of the real-world game object and that or virtual-game world coexist and are maintained computationally.

Here like also the IR Laser Gun Apparatus 47, the output 3D model of the IR Mixed Reality Suit 93 may be broken back down to individual rendered faces mapped back to each of the surface display panels faces 235 for which each image be rasterised, fragmented in which the outputted individual pixel RGB array or in-memory bitmaps get written to the frame buffer for each of the individual mapped surface display screen faces 235.

A depth map may be used in this process to devise the respective 3D coordinates and 3D vertices (x,y,z) of each 2D RGB pixel coordinate (x,y) where using a depth map it is possible to derive a depth value from which a respective 3D coordinate or 3D vertices (x,y,z) can be derived which may be used in the mapping of the rasterised 2D image generated from the users virtual avatar game object and 3D model to that of the users real-world IR Mixed Reality Suit 93.

In this process using a depth map first the 2D coordinate of the corresponding RGB pixel is first converted back to a 2D coordinate (x,y), then a depth value at the 2D coordinate is formulated using a depth map, from which a depth value can be generated, from which the converted 2D coordinate (x,y) may then be converted to a 3D point (x,y,z) from which this can be mapped to the vertices of the surface display panel faces 235 and real-world 3D mesh/3D model of the users IR Mixed Reality Suit 93.

Here the RGB pixel values are essentially mapped to their nearest depth 3D coordinate and then converted back to an x,y,z 3D coordinate through the use of a reference framework.

Note in this process alternatively the missing z value may be derived by formulation based on the centroid and triangle edges being of equal form. Other forms of equations and formulations may be used in this process to convert 2D screen coordinates (x,y) to 3D coordinates. It should be noted like a 3D model, the real-world IR Mixed Reality Suit 93 and real-world game object surface display panel faces 235 similar to previously detailed may also be arranged as quads where quads are used to form its paired virtual game object 3D Model structure. In this configuration it is the cumulation of all of the triangular or quad surface display screen faces 235 and each of their x,y, z points that forms the 3D model coordinates and points of the real-world IR Mixed Reality Suit 93 in the real-world.

Same as previously detailed also, here the rendering pipeline performs the same functions as described previously such as ray tracing or ray casting as well as rasterisation, fragmentation etc. except the resulting output maybe individual 2D texture map images for each face of the device's surface display screen faces 235 that are derived from its 3D model in the form of individual pixel RGB array or in-memory bitmaps which get written to the frame buffer for each of the individual mapped surface display screen faces 235 to that of the 3D model faces in the matrix and rendering operations of the device. This provides yet another methodology for mapping the virtual image of the virtual game objects 3D model to each of the corresponding surface display surface panels 235 in order to recreate a full 3D rendered image that is physical in form in the real-world.

It should be noted that the position each surface display panel face 235 represents a vector of the centroid of a triangle, where the physical position of the screen tiles which are formed of physical triangle displays represent each of the positions of vectors and the vertices in the three-dimensional space of the game which each vertices like a 3D model has a 3D Cartesian coordinate, and the shape of the users Avatar is represented by multiple vertices and faces referencing the vertices. In this way a real-world mesh and wireframe is essentially created out of multiple triangle OLED display panels, in which the joining of each triangle display surface is fully flexible.

Each triangle and surface display panel face 235 is referenced by a specific face and set of vertexes. Like 3D models the model coordinates are used to make up 3D model of the objects, in which the coordinates of multiple surface display panel face 235 of the users IR Mixed Reality Suit 93 in the form of shapes or triangles known as vertices form the overall shape of a complex 3D model.

Specifically, each surface display panel face 235 is a triangle which has a set of 3 vertices, each of which has a coordinate of (x,y,z) referred to as the point or vertex which represent the height, length and width of the shape. A surface display panel face 235 may be represented therefore as (x1,y1,z1), (x2,y2,z2), (x3,y3,z3) for example which represent its three vertices.

These vertices are referenced by the faces of the IR Mixed Reality Suit 93 which define the overall shape of the 3D model of the objects real-world shape and 3D model. This is similar to traditional video game systems and 3D graphics systems each object is made up of multiple triangles, vertices and faces that are built together to make complex 3D models, except these exist in the real-world of the user's environment.

This represents the model coordinates and the shape of the 3D model of an object.

As yet a further example since also the system knows the dropped "z" value in the transformation of the 3D image of the Avatar to 2D it is possible based on the returning of the values for x and y for the system to recreate the (x,y,z) coordinates from a pixel coordinate (x,y).

The system may support many methods therefore in the mapping of rendered virtual images to the physical surface display panel faces in the case of any real-world game object or Real world AI Character 94 or user where they have a wearable IR Mixed Reality Suit 93 or IR Mixed Reality Suit 93.

For example, this may be based on the vertices, the faces, the surfaces, the triangles or polygons or quads etc. In addition, each of these methodologies detailed for mapping the virtual 3D model images to real-world objects that feature a mesh of surface display panel faces apply to all real-world game objects such the IR Laser Gun Apparatus 47, IR Shield Apparatus 90, real-world AI Characters 94 or wearable devices such as the IR Mixed Reality Suit 93 or IR Mixed Reality Vest 92.

It should be noted here also that each surface display panel face 235, is independently addressable and controllable in the display of virtual images where individual images or portions of images (triangles/polygons/quads) may be mapped to individual surface display panel faces 235 in the reconstructing of 3D images. Alternatively, images may be mapped based on 2D coordinates, or vertices, or faces Ids, Surface Ids, Edges etc. from the outputted rendered images by the rendering engine to individual surface display panel faces, where each surface display panel face 235, has an addressable frame buffer.

Alternatively, a single frame buffer could be used in a tiled configuration in which the pixel coordinates span all of the different surface display panel faces 235, where every surface display panel faces 235 has a unique addressable pixel set of coordinates or RGB positions.

The Light Display Module 246 therefore may be used in this mapping process or the mapping process maybe abstract to the Light Display Module 246 where the output rendered images of rendering module 250 are rasterised and fragmented and then written for example to individual addressable frame buffers that each map one to one with a surface display panel face 235.

The rendered displayed imagery over the users IR Mixed Reality Suit 93 serves many purposes in the game play and laser tag game. For example the users name or codename during the game may be displayed as 2D or 3D image over the users IR Mixed Reality Suit 93, together with a status indicator of the user's health, number of hits and other state information.

The user may also be colour coded in their over appearance indicating their team, health status or whether they have an active human virtual shield activated. Powers or awards gifted to the user by the game server 88 or host 89 during the laser tag game that give special abilities to the user or that change their weapon classification may also be indicated by the colour of the users IR Mixed Reality Suit 93 rendered and displayed texture maps on their surface display panel faces 235.

These rendered and displayed virtual images and visuals over the users IR Mixed Reality Suit 93, surface display panel faces 235 shall be supported by the devices rendering module 250.

Other visuals generated by the devices rendering module 250 such virtual images of decal effects, diffuse lighting, specular lighting effects etc. may be displayed also over the users IR Mixed Reality Suit 93 and respectively as a result the users body where decal effects such scorch marks, blood etc. could be precisely positioned according to the determined collision position on the user's body detected via an IR Sensor and/or computationally by the devices collision manager 254.

The users IR Mixed Reality Suit 93 features a haptic module 243, which creates a physical sensation and feedback of a real-world IR Laser Beam or virtual weapon fire hitting a user where a collision is detected via the users IR Sensors 240 or computationally by the collision manager 254. Physical feedback is provided by applying vibrations, forces and motions, where a Vibramotor provides feedback through the users IR Mixed Reality Suit 93 onto the user's body.

These physical feedback motions and forces maybe directional based on the direction of the IR Laser Beam and the position of the collision or hit which invoked by an IR Sensor reading based on the position or ID of the IR sensor 240 in which every IR Sensor 240 and IR Receiver 241 may be mapped to a single Haptic module 243.

Alternatively, this may be based on a collision detection computed by the collision manager 254 where this uses the directional vector of the Virtual Game object or Line Rendering of the IR Laser Beam generated from the use of a real-world physical IR Laser weapon such as IR Laser Gun Apparatus 47, IR Shield Apparatus 90 or IR Laser Proximity Mine Apparatus 91 by another user or a real-world AI character 94.

In which based on the determination of the collision position (x,y,z) and projectile/angle for where the IR Laser Beam virtual game object or Line Rendering intersects with the user's model coordinates and world coordinates (x,y,z), this may trigger the corresponding haptic pads on the user's body which are addressable through the use of corresponding model coordinates for the IR Mixed Reality Suit 93 expressed as x,y,z.

This may be determined by the collision manager 254 that shall interface with the haptic modules 243 as well as the game server 88 and host 89 via the network 97 to gain state information on the IR Laser Beam projectile etc. in supporting this function as part of its programmed collision response handling.

In the case of the hit being a computation, this maybe from a real IR Laser beam or a virtual game object fire where the haptic pads could be triggered by other weapon fire that maybe a virtual weapon controlled by hand gestures as well as physical handheld weapons.

The collision manager 254 upon detecting a hit on the user's body via their IR Mixed Reality Suit 93 or IR Mixed Reality Vest 92 may also invoke the users paired IR Laser Gun Apparatus 47 and IR Shield Apparatus 90 to vibrate on detecting a hit dependent on their relational coordinates in which via the network 97 the collision manager 254 shall invoke this action through the client modules of these other devices in which this will cause the haptic module of the IR Laser Gun Apparatus 47 and/or IR Shield Apparatus 90 to also vibrate.

For any other users in close proximity to the user hit, their haptic modules may also be invoked by the collision manager 254 via their real-world game object or wearable devices client modules in the same way.

The rate of vibrations of the Haptic modules in both use cases may be adjusted according to the relative measurable distance in three dimensional space from the user who was hit.

The users IR Mixed Reality suit 93 maybe a form of haptic suit, used to simulate IR Laser beam hits on the user's physical body, which may be based on a computational formulation of a hit by the collision manager 254 using triangulation of polygons, hitscan or any of the other collision techniques detailed to determine if virtual game object of the IR Laser Beam or its line rendering has intersected with the user.

Alternatively, this could be triggered by a conventional IR Sensor detecting the IR light emission from the IR Beam/IR Laser Beam of another users IR Laser Gun Apparatus 47 for example.

Existing haptic suits such as NullSpace VR® or Axon VR® could be adapted or incorporated into the IR Mixed Reality Suit 93. It should be noted the mixed reality suit 93 presented herein is intended not for VR but mixed reality real-world and augmented reality gaming in which 3D game objects as previously described can be both physical in the real-world or virtual. In addition, renderings may be applied to the surface display panel faces 235 of the mixed reality suit 93 seen without any VR or AR wearable head mounted display apparatus.

The haptic suit function of the user's IR Mixed Reality Suit 93 maybe based on vibration motors, transducers, actuators and or haptic feedback pads, in which game sequences and animations of IR Laser Beams may be played out both in 3D animation, 3D spatial sound/perceptual based 3D locational sound effects and also haptic animations which are relational to add further realism to the mixed reality and augmented reality gaming experience of the laser tag game.

The suit may also feature wired gloves as described for direct feedback. As depicted in FIG. 11, the IR Mixed Reality Suit 93 is powered by a lithium style battery 247 or other form suitable battery, in which the turning on or off of the device is operated via a power switch 248.

As depicted in FIG. 11, the IR Mixed Reality Suit 93 also features a WiFi module 256 and Bluetooth module 257 that provide network connectivity over short range bluetooth networks and longer range WiFi networks. WiFi network connectivity is supported via the network 97 infrastructure.

As shown in FIG. 11, the IR Mixed Reality Suit 93 also features a series of software modules including a client module 249, rendering module 250, device tracking module 251, a games engine 252, a games application 253, a collision manager 254 and a gesture recognition module 255 which support the functions of the IR Mixed Reality Suit 93 as detailed herein.

The device also features an operating system (O/S), kernel, sub system, a bios, a bus and a series of drivers that support the software and hardware modules in their described functions herein.

The client module 249 is responsible for maintaining the IR Mixed Reality Suit 93 state during the game and providing state information to game server 88 or host 89 where there is a change in the state of the device resulting from a hit detected on the device via its IR Sensors 240 and IR Receivers 241 or computationally for example.

The client module 249 is also responsible for the handling of all user inputs including touch-screen inputs via the users IR Mixed Reality Suit 93 touch screen panels on the user's arms.

The client module 249 is also responsible for the handling of sensor inputs that form the state information of the users IR Mixed Reality suit.

The client module 249 is also responsible for retrieving state information via network 97 from the game server 88 and host 89 which maybe provided to the devices collision manager 254 in the handling of collision detection and responses, or to the devices rendering module 250 in the display of rendered virtual images, reflections, shadowing and lighting effects from other objects reflected onto the users IR Mixed Reality Suit 93 in which virtual images and texture maps together with these other mentioned visual effects are displayed over the physical surface display panel faces 235 of the users IR Mixed Reality Suit 93 during a game.

The rendering module 250 of the IR Mixed Reality Suit 93 is responsible for the rendering operations and performing of the rendering pipeline routines using its processing units 236 including GPU, CPU and memory 237 to perform these operations. All renderings in this context relate to the display of 2D or 3D virtual images and video on the surface display panel faces 235 of the IR Mixed Reality Suit 93.

This includes the rendering of texture maps for display on each of the individual surface display panel faces 235, as well as the display of lighting effects such as diffuse and specular lighting effects resulting from the hit of IR Laser Beams on the IR Mixed Reality Suit 93 physical surfaces detectable by the devices IR Sensor(s) 240 and IR Receiver(s) 241 or computationally via the collision manager 254.

In which the collision manager 254 may use a number techniques including but not limited to posteriori collision detection methods, spatial partitioning methods, bounding boxes, n-body pruning, pairwise checks using bounding rectangles or circles hit boxes, in which after pruning exact pairwise collision detection is performed, or Triangle Centroid Segments, hitscan or raycasting using vector and parametric equations of a line, or frame by frame analysis or time of impact (TOI) or on polygon based triangulation analysis etc. using the paired virtual-game object and virtual 3D model or real-world game objects, users and AI Character's 94 together with non-paired virtual-game objects 106, virtual AI Characters 105 and/or remote users 107 in the determination of collision between two objects whether virtual or real.

It should be noted here that as detailed previously for real-world game objects, users, AI characters 94, based on their movements captured from their sensor readings the changes to their real-world coordinates (x,y,z) and orientation (p,r,y) invoke transformations that are applied to their paired virtual game objects and 3D models that are used in this process of determining collisions. The collision manager 254 may also take directly their state information from the game server 88 or host 89 which contains their current coordinates/vector position (x,y,z), orientation (p,r,y) and directional vector to determine a collision based on another objects coordinates.

The rendering module 250 supports all forms of rendering methodologies including ray tracing, ray casting, scanline rending, radiosity etc. It also supports the display of all forms of visual and lighting effects on the surface display panel faces 235, including specular lighting, diffuse lighting, decal effects (scorch marks/blood etc.), subsurface scattering (SSS), shading, shadows etc. the same as all other instances of the rendering module on other real-world game objects, users augmented reality ("AR") display apparatus 1, and other wearables such as the IR Mixed Reality Vest 92 support.

The device tracking module 251 is responsible for maintaining state information on the IR Mixed Reality Suit 93 world coordinates/position in three dimensional space expressed as three dimensional Cartesian Coordinates (x,y,z) and orientation expressed as pitch, roll and yaw (p,r,y) and together with its directional heading expressed as a direction vector together with other state information such as acceleration, velocity and elevation.

This uses the multiple sensors 239 on the IR Mixed Reality Suit 93 over the users body to track the position of each of the body parts of the user including the orientation (p,r,y), vector position (x,y,z) and directional heading (directional vector) in terms of their arms, legs and body torso etc. It also user velocity, acceleration and other variables used by the gesture recognition module 255 to detect special gesture inputs from specific body movements which may invoke the creation of new virtual game objects as special types of weapon fire.

This state information is provided to the game server 88 or host 89 via the network 97 by the devices Client Module 249 in which the game server 88 or host 89 maintains state information on all real-world users, game objects and AI Characters together with state information on all virtual game objects 106, AI Characters 105 and remote users 107 to support the detailed functions as disclosed within the embodiments of this invention.

It is also used by the local modules such as the rendering module 250 and the collision manager 254 in the placement of lighting effects for example over the user's body via their IR Mixed Reality Suit 93 according to the relative vector position and orientation of other objects that may be emitting light and in the determination of collisions with other real-world game objects, users, AI character's 94 or virtual game objects 106, AI character's 105 or remote users 107.

The collision manager module 254 of the users IR Mixed Reality Suit 93 is responsible for detecting collisions or intersections of other objects or users with the users IR Mixed Reality Suit 93. These objects may be real-world game objects, objects and surroundings or virtual world game objects and surroundings that exist within the three-dimensional space of the game. The collision manager 254 as detailed may use a plurality of methods in the determining of a hit including posteriori collision detection methods, spatial partitioning methods, bounding boxes, n-body pruning, pairwise checks using bounding rectangles or circles hit boxes, in which after pruning exact pairwise collision detection is performed, or Triangle Centroid Segments may be applied for example.

Other methods such as hitscan, raycasting, time of impact (TOI) or frame by frame analysis, or polygonbased triangulation among the many other previously detailed methodologies maybe used to determine collisions and hits.

It is also responsible for the response handling, which may be dependent on a number of variables including physics based attributes such as the mass, velocity or rate of acceleration of any an object vs. the other objects mass, velocity and rate of acceleration etc. among other variables and attributes Hits registered via the IR Sensors 240 and IR Receivers 241 of the users IR Mixed Reality Suit 93 may also be handled by the collision manager module 254 in the determination of collision responses. Physics variables may be used in the determination of a collision response, such as the mass, rate of velocity, rate of acceleration of either object that are intersecting or colliding.

Other variables such as the material surface type reflective or refractive may determine the response, in which the IR Laser beam may be simulated to bounce or reflect backward at an opposing angle to its entry projectile where a hit may occur on another object.

The state of other objects can determine the collision response, such as whether an object has a shield. In the response handling the collision manager 254 may invoke varying physical feedbacks via one of the haptic modules 243 or all haptic modules based on the classification of the weapon, physics variables such as the relative mass, velocity and rate of acceleration etc. of the object such as an IR Laser Beam virtual game object intersecting with the users IR Mixed Reality Suit 93.

Dependent on these variables and the coordinates (x,y,z) of other nearby real-world game objects or users wearing an IR Mixed Reality Suit 93 or IR Mixed Reality Vest 92 the collision manager 254 may invoke physical feedback via their haptic modules by interfacing over the network 97 with the other devices client modules.

Here the collision manager 254 of the users IR Mixed Reality Suit 93 shall determine which clients to interface with based on their state information retrieved from the game server 88 or host 89. Based on their relational vector positions (x,y,z) and the distance to that of the users IR Mixed Reality Suit 93 vector position(x,y,z) the rate of vibrations invoked on these other real-world game objects and users IR Mixed Reality Suits 93 or IR Mixed Reality Vests 92 may be varied.

The Collision response determined by the Collision manager 254 may also affect the rendered state and displayed texture-maps, virtual images and lighting displayed on the devices surface display panel faces 235.

The games engine 252 of the users IR Mixed Reality Suit 93 serves to provide support for the processing of inputs, rendering operations by the rendering module 250, the performing of mathematical operations of the rendering pipeline together with the use of the GPU.

The games application 253 provides the game logic and storylines, in which here the local instance of the game application based on the state of the device or the state of other objects may invoke an action to bring the game to a conclusion. It should be noted that like all other real-world game objects, and wearable devices optionally the client module 249 may be local instance of the game application.

The device also features as depicted in FIG. 11, a gesture recognition module 255 which us used to detect special gesture inputs in terms of hands or arm movements by the user's body using the IR Mixed Reality Suit 93, sensors 239 and its gesture recognition algorithms that convert detectable inputs by the varying sensor readings of acceleration, orientation, rotation, pitch, roll and yaw of a user's arm and hand movements. Inputs may also be passed directly via the wired gloves 245 which consist of series of electrical sensors as a wearable form of a glove that attach to the user's hands, finger joints and fingertips.

This may be used to create a special types of virtual weapon fire from varying hand motions and movements such as the previously detailed sonic wave blast in which an animated virtual image is displayed over the users view of the real-world from their augmented reality ("AR") display apparatus 1, micro-display 3, together with 3D positional audio and perceptual based 3D sound locational effects.

Here the virtual weapon fire can upon a collision being detected by the game server 88, host 89 or a clients collision manager module result in other real-world users, game objects or real-world AI Characters 94 IR Sensors and IR Receivers as well as their Haptic Modules where they feature these being invoked which may result in the register of a hit even if the IR Sensors/IR Receivers detected no IR emissions or IR radiation from the IR Beam of invisible light.

This is supported by means of a computational formulating of the weapon fire projectile through triangulating the users position to that of other remote clients, real-world game objects, users, AI characters 94 and other virtual game objects 106, virtual AI Characters 105 and remote users 107 etc.

FIG. 12 shows an IR Mixed Reality Vest 92, that comprises of surface display panel faces 258 covering the user's torso body parts, multiple IR Sensors 261 for detecting hits from another users IR Laser Beam, a series of haptic modules 266 that provide physical feedback.

As shown in FIG. 10 the IR Mixed Reality Vest 92 also features the same hardware as the IR Mixed Reality Suit 93 that includes a set of processing units 259 (CPU, GPU), Memory 260, Storage 261 Sensors 262 (including a tilt sensor, accelerometer, gyroscope, GPS tracker etc.), two or more IR Sensors 263, an IR Receiver 264, a demultiplexer 265, and a haptic module 266.

In addition, the IR Mixed Reality Vest 92 device features a amplifier 267, one or more light display module(s) 268, a battery 269 and power switch 270 to turn on or off the device.

An inductive loop transmitter may be connected also to a plurality of IR Sensors 263 or an amplifier 267 for invoking multiple IR Sensors 263 to go off upon a hit being detected via a single IR Sensor 263 or computationally by the collision manager 276.

Here the IR Vests features the same hardware components and software modules as detailed for the IR Mixed Reality Suit 93 which serve the same purposes.

The processing units 259 support the functions of the IR Mixed reality vest 92, where the CPU or CPUs shall be responsible for executing all the programmed instructions and logic of the software modules of the IR mixed reality suit and the GPU's is used in the mathematical and rendering operations providing hardware acceleration in the rendering of texture maps for example for display on the surfaces of the device's surface display panel faces 258 of the users IR Mixed Reality Vest 92.

The memory 260 may be a form volatile memory or random access memory (RAM) for performing high speed instructions by the CPU such as DRAM, fast CPU cache memory and SRAM or other forms of volatile memory or example used as the main memory of the system. Additional memory may be provided via the GPU as dedicated graphics memory or may be commonly used between the CPU and GPU. The memory 260 may also consist of non-volatile memory also for performing BIOS and firmware operations such as flash memory, ROM, EPROM, or EEPROM memory, where flash memory may be used as a secondary form of memory for example.

The flash memory may be a type of NOR Flash. Files and data may be stored also the storage memory 261 together with the IR Mixed Reality Vest 92, software binaries, executable files of the programs and all corresponding files that support the IR Mixed Reality Vest 92 functions.

This may include Operation System (O/S) software and all device drivers for the device hardware appliances such as surface display panel faces 258 for example.

The storage memory 261 may be in the form of a SSD flash based drive or a conventional hard disk such that is HDD based or another form of non-volatile memory.

As depicted in FIG. 12 also like the IR Mixed Reality Suit 93, the IR Mixed Reality Vest 92 features a series of triangular or quad surface display panel faces 258, in a tiled configuration which form a 3D mesh over the user's torso and chest part of their body, in which a light display module 268 supports the display of virtual images such as texture maps and other visual effects over theses surface display panel faces 258 that cover the user's chest and torso to form a 3D image visible in the real-world.

The surface display panel faces 258 like the IR Mixed Reality Suit 93 may be a form of organic display such as OLED or may be an LCD or LCOS form of display.

The surface display panel faces 258 are driven by circuitry where the display may be connected directly to the devices PCB through an internal display port ("iDP") where the display maybe soldered directly to the PCB or may be connected via another form of standard based DisplayPort and digital display interfaces such as an embedded display port ("eDP"), Slim port, HDMI, USB, MIPI DSI or a DVI link etc.

The light display module 266 shall support the illuminating of the pixels on the display in the display of virtual images on the surface display panel faces 258.

The light display module 266 may interface with the display drivers to support this function or the display drivers maybe part of the light display module. As detailed each surface display panel face 256, is independently addressable and controllable in the display of virtual images where individual images or portions of images (triangles/polygons/quads) may be mapped to individual surface display panel faces 258 in the reconstructing of 3D images. Alternatively, images may be mapped based on 2D coordinates, or vertices, or faces Ids, Surface Ids, Edges etc. from the outputted rendered images by the rendering engine to individual surface display panel faces, where each surface display panel face 256, has an addressable frame buffer.

Alternatively, a single frame buffer could be used in a tiled configuration in which the pixel coordinates span all of the different surface display panel faces 258, where every surface display panel faces 258 has a unique addressable pixel set of coordinates or RGB positions.

The light display module 266 therefore may be used in this mapping process or the mapping process maybe abstract to the light display module 266 where the output rendered images of rendering module 275 are rasterised and fragmented and then written for example to individual addressable frame buffers that each map one to one with a surface display panel face 256.

The same methodologies as detailed for the display of virtual images, visual effects, animations and video over the surface display panel faces 258 of the IR Mixed Reality Suit 93 are used here in the display of virtual images, visual effects, animations and video over the surface display panel faces 258 of the IR Mixed Reality Vest 92.

In addition, the IR Mixed Reality Vest 92 features the same set of sensors 262 as the IR Mixed Reality Suit 93 which includes a multi-axis accelerometer, gyroscope, tilt sensor, motion sensors, GPS Tracker, a solid state compass, an electromagnetic compass/digital compass and a magnetic compass or magnetometer.

Furthermore, the devices sensors 262 may include an inclinometer, pedometer, speedometer, altimeter, a MEMS Barometer and a dead reckoning module.

These sensors 262 are used for maintaining detailed state information on the users world coordinates (x, y, z) and chest/torso model coordinates used in the accurate computation of hits and collision detections by the collision manager 276 for example.

The same as the IR Mixed Reality Suit 93 this may also be used by the rendering module 275 in applying lighting effects on the surface display panel faces 258 of the IR Mixed reality suit that cover the users body in which lighting and reflection type effects may be applied relative to the position and orientation of the user's body parts to that of the position and orientation of other objects.

State information including coordinates (x,y,z) and orientation (p,r,y), directional vectors and elevation of the users body chest and torso rom the ground captured from the sensory data is passed to the game server 88 or host 89 via the network 97 by the IR Mixed Reality Vest 92 client module 273 for maintaining state information and is handled also by the client module 273 and other modules such as the rendering module 275 and collision manager 276 locally in the performing of the same functions as detailed for the IR Mixed Reality Suit 93.

These sensors 262 placed around the user's upper torso, shoulders and lower neck of their body on the IR mixed reality vest 92 as clusters of sensors 262 are used to track the movements of each of the user body torso and head parts in terms of their world coordinates expressed as three dimensional Cartesian coordinates or points on the x,y,z; their orientation expressed as pitch, roll and yaw (p,r,y); their directional heading which may be expressed as directional vector and their elevation from ground level together with other physical attributes such as velocity, acceleration etc.

This may be used in the determination of collision responses and in the computational operations of the game as well as the invoking game scenes, animations, the display of augmented images and lighting effects via the variety of methods supported over the surface display panel faces of real-world game objects, or via the users augmented reality ("AR") display apparatus 1, or by the game server 88 or host 89 via the use of the external projectors 96 using projection mapping/video mapping and spatial augmented reality techniques.

It also features the same IR Sensor capabilities for detecting hits where like the IR Mixed Reality Suit 93, the IR Mixed Reality Vest 92 features a series of IR Sensor(s) 263 and IR Receivers 264 covering though just the user's chest, shoulders, lower neck part and torso etc. as depicted in FIG. 12 used for detecting hits as a result of the IR Sensor(s) 263 detecting IR light emissions from an IR Beam/IR Laser Beam projected onto the IR Sensor.

Same as the IR Mixed Reality Suit 93, these IR Sensors 263 maybe used in the determination of hits from other users IR Laser Gun Apparatus 47, or an IR Proximity Mine Apparatus 91 or an IR Shield Apparatus 90 for example, which may invoke an action by the client module 273 or collision manager 276 module as a result of a hit where this could invoke a change in the state of the rendered texture maps or the display of decal and/or diffuse lighting effects on the IR Mixed Reality Vest 92 surface display panel faces 256 by its rendering module 275 in response to the collision detection.

Also, both of these actions resulting from a hit could be invoked by a computational detected collision by the collision manager 276 alternatively to the use of the IR Sensor.

In addition, the device features the same demultiplexer 265 and IR Receiver 264 capabilities for receiving IR Data or raw binary data in the IR Beam that serve the same functional purpose as detailed for the IR Mixed Reality Suit 93.

Like the IR Mixed Reality Suit 93 it also features the same Wifi 271 and Bluetooth 272 module for network connectivity, the same haptic module 266 except less number of instances since these modules only cover the user's chest and torso body part.

The Wifi 271 and Bluetooth 272 module provide and establish IP network connectivity over short range bluetooth networks and longer range WiFi networks. WiFi network connectivity is supported via the network 97 infrastructure. This maybe used by the devices client module 249 in the transfer of state information to the game server 88 or host 89.

The haptic module 266 is the same as detailed for the IR Mixed Reality Suit 93 and supports the same functionality such as the providing of physical feedback upon a hit being detected by an IR Sensor or computationally by the Collision Manager 276.

Also depicted in FIG. 12, the IR Mixed Reality Vest 92 is powered by the same type of lithium style battery 269 or other form suitable battery, in which the turning on or off of the device is operated via a power switch 270.

In addition to the mentioned same hardware features as the IR Mixed Reality Suit 93, the IR Mixed Reality Vest 92 also includes the same software modules which includes the client module 273, device tracking module 274, rendering module 275, collision manager 276, games engine 277, game application 278 etc. which perform the exact same detailed functions and serve the exact same purpose as detailed for the IR Mixed Reality Suit 93.

The IR Mixed Reality Vest 92 is essentially the same as the IR Mixed Reality Suit 93, in which the same functionality as detailed for the IR Mixed Reality Suit 93 is supported by the IR Mixed Reality Vest 92 device.

The IR Mixed Reality Vest 92 device is identical in almost all respects and its usage to that of the IR Mixed Reality Suit 93, where this is provided essentially a smaller alternative wearable form of the IR Mixed Reality Suit 93. The only exception to this is the gesture recognition capabilities, where there are no wired gloves and the device does not extend beyond the user's chest to support these capabilities in terms of its positioning of its sensors 262.

Its main purpose like the IR Mixed Reality Suit 93 is in the detection of hits, display of virtual images, visual effects such as decal effects, diffuse lighting effects, specular lighting effects, animations etc. The IR Mixed Reality Vest 92 is in a sense a small version of the IR Mixed Reality Suit 93 that covers just to torso and chest part of the user's body, in which it features less numbers of the same sensors and surface display panel faces.

It should be noted that like all other real-world game objects, and wearable devices optionally the client module 273 may be local instance of the game application.

Figure 13:
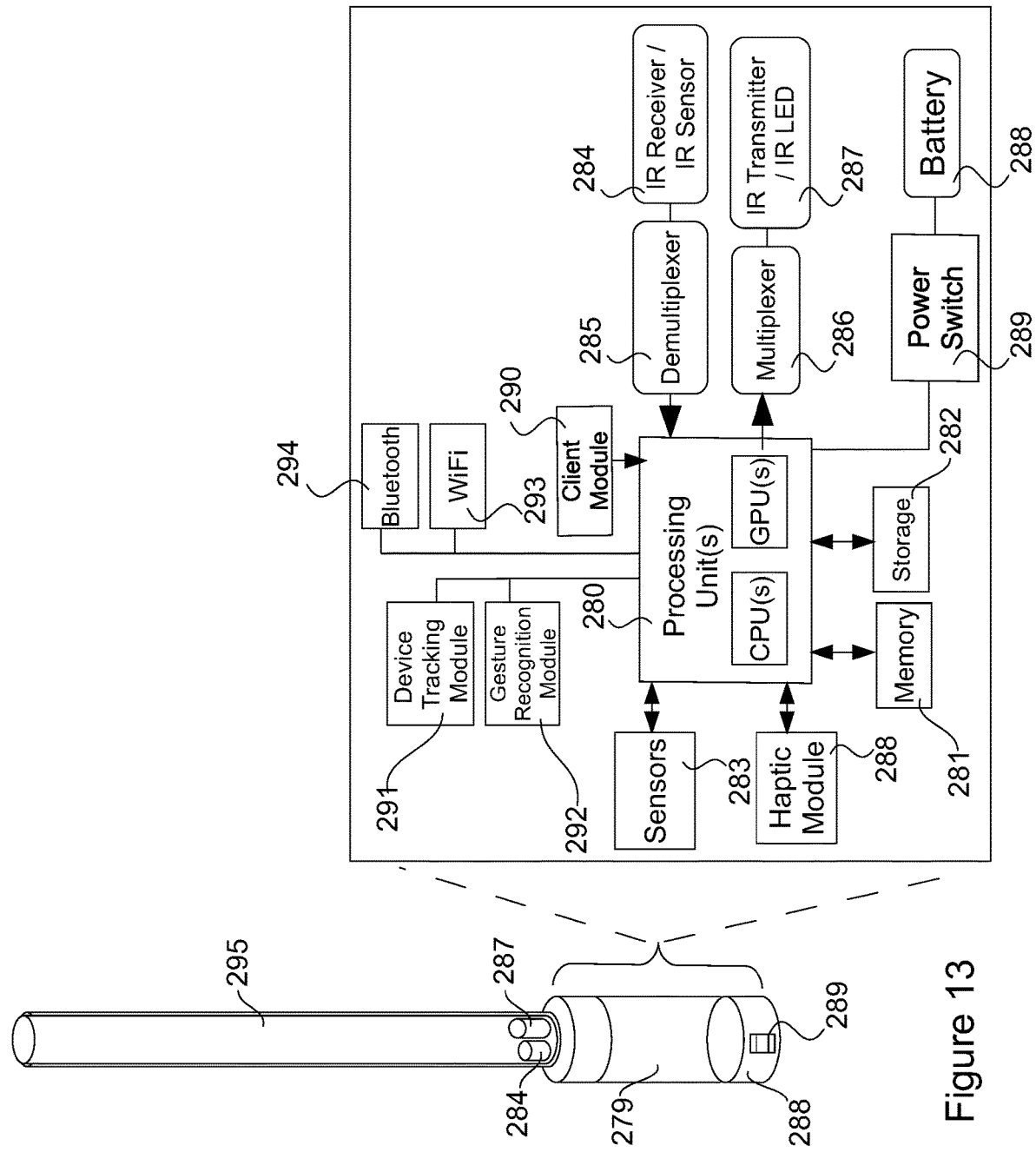
FIG. 13 shows IR Laser Sword Apparatus 279 which a part physical real-world game object and part virtual that features a number of sensors for detecting physical hand movements and gestures by a user's hand, a form of IR detector for detecting the reflection of an IR beam back from an object obstructing the IR Beam used in detecting hits and a form of computer among other parts.

FIG. 13 depicts an IR Light Sword Apparatus 279 which is another form of real-world game object supported by the system herein that maybe used during game play to score hits.

This device unlike other devices is different form of mixed reality device in which part of the device in terms of its handle is physical and tangible in the real-world and the other top part of the device is entirely virtual seen only via the users augmented reality ("AR") display apparatus 1, micro-display 3 in which the top portion 295 of the device is shown as an augmented virtual holographic, hologram or 3D image formed of two differing two 2D stereoscopic images over the user's real-world view in precise synchronisation with the three dimensional coordinate/vector position (x,y,z) and orientation (p,r,y) and directional vector of the physical bottom portion of the device to form the full device.

This real-world game object features as depicted by FIG. 13, comprises of a set of processing units 280 (CPU, GPU), Memory 281, Storage 282, Sensors 283 (including a tilt sensor, accelerometer, gyroscope, GPS tracker etc.), two or more IR Sensors/IR Receiver 284, an IR demultiplexer 285, IR Multiplexer 286, IR Transmitter/IR LED 287 and a haptic module 296.

The device also features a WiFi module 293 and bluetooth module 294 that provide network connectivity over short range bluetooth networks and longer range WiFi networks. WiFi network connectivity is supported via the network 97 infrastructure.

As depicted in FIG. 13, the IR Laser Sword 279 is powered by a lithium style battery 288 or other form suitable battery, in which the turning on or off of the device is operated via a power switch 289.

The processing units 280 comprise of a number of CPU's and GPU's used in the processing of user gesture inputs detectable via the devices sensors 283 which may invoke different forms of rendered augmented virtual images and visual lighting effects to be displayed based on the identified input from the user's wrist actions and hand movements such as the rotation of the IR Laser Sword 279 or specific jab type actions by a user in which the weapon damage classification is dynamic with the physical movements of the device.

The processing units 280 may also support the mathematical operations, matrix operations and transformation operations performed in the usage of the device in the perform to assist the display of the augmented images via the users augmented reality ("AR") display apparatus 1, micro-display 3.

The memory 281 may be a form volatile memory or random access memory (RAM) for performing high speed instructions by the CPU such as DRAM, fast CPU cache memory and SRAM or other forms of volatile memory or example used as the main memory of the system. Additional memory may be provided via the GPU as dedicated graphics memory or may be commonly used between the CPU and GPU.

The memory 281 may also consist of non-volatile memory also for performing BIOs and firmware operations such as flash memory, ROM, EPROM, or EEPROM memory, where flash memory may be used as a secondary form of memory for example. The flash memory may be a type of NOR Flash.

Files and data may be stored also the storage memory 282. This may include Operation System (O/S) software and all device drivers.

The storage memory 282 may be in the form of a SSD flash based drive or a conventional hard disk such that is HDD based or another form of non-volatile memory.

As shown in FIG. 13 the IR Laser Sword Apparatus 279 device also consists of several sensor(s) 283 including a multi-axis accelerometer, gyroscope, tilt sensor, motion sensors. In addition, as illustrated by FIG. 12 the device sensor(s) 283 features also an GPS tracker, a solid state compass, an electromagnetic compass/digital compass and a magnetic compass or magnetometer.

Furthermore, the IR Laser Sword Apparatus 279 may feature an inclinometer, pedometer, speedometer, altimeter, a MEMS Barometer and a dead reckoning module. The gyroscope may consist of a number of vibrating structure gyroscopes.

Here the generated state information from the sensory data is passed to the game server 88 or host 89 via the network 97 by the devices client module 290 for maintaining state information and to the users augmented reality ("AR") display apparatus 1 for the rendering and display of the virtual images of the IR Laser Sword 279 upper virtual structure and decal or diffuse lighting effects where a hit is detected.

Here the motion of a user's hand in terms of the wrist action when holding the device could be detected by the sensor(s) 283 such as the combined usage of the accelerometer, gyroscopes and tilt sensor which could invoke a special gesture input to detected by the gesture recognition module 292 in which a different virtual images of the IR Laser Sword 279 upper virtual structure and decal or diffuse lighting effects and/or 3D spatial audio effect or perceptual based 3D locational audio effect may be displayed and played out via the users augmented reality ("AR") display apparatus 1 micro-display 3 and speakers 6L, 6R respectively.

For example, specific spin actions invoked by the users wrist actions, may be detected based on the detection of devices sensors sensing rotation at high velocity and rapid changes in the orientation or changes in velocity resulting from being thrown by a user, where the client module 28 of the users augmented reality ("AR") display apparatus 1 may invoke a different virtual images of the IR Laser Sword 279 upper virtual structure and decal or diffuse lighting effects and/or 3D spatial audio effect or perceptual based 3D locational audio effect may be displayed and played out by its rendering module 27 and audio manager 34 with support from the games engine 35.

These sensors 283 play a key role in the usage of the device in the display of the upper portion of the device to the user through their augmented reality ("AR") display apparatus 1 in which based on real-time sensor 283 readings for the devices coordinates (x, y, z), orientation (p, r, y) and directional vector/projectile for the IR LED/IR Beam/IR Laser Beam, the users rendering module 27 of the users augmented reality ("AR") display apparatus 1 shall render the remaining hidden top portion 295 of the device shown in FIG. 13 as dotted lines, that is then displayed via the user's micro display 3 as 3D holographic image, hologram or two differing 2D stereoscopic images that the user then perceives the image to be a form of a 3D image in the processing of the two images.

Through its sensors 283, the system is able to accurately capture complex motions in the use of the apparatus to determine changes in the display of rendered augmented images and in the determination of hits. Rapid action movement may be calculated in terms of successful hits by the use of the sensors 283 including the accelerometer combined with other motion sensors such as the tilt sensor.

The system uses a tuning fork gyroscope as part of its sensors 283, which supplements the accelerometer and other sensor capabilities enabling complex hand motions resulting in movements of the top portion 295 to be rendered and displayed in real-time via the user's micro-display 3 where the user sees the top portion 295 as identically placed as augmented reality virtual image that is 3D over their real-world view in sync with the device orientation (p, r, y), vector position (x,y,z) and directional vector in which the IR Laser Sword is being pointed by the user in three dimensional space. Sensor readings passed by the devices Sensors 283 and device tracking module 291 to the gesture recognition module 292 and in parallel the rendering module 27 of the users augmented reality ("AR") display apparatus 1 enable the placement of the virtual imagery of the top part to be identically place with the orientation (p,r,y), vector position (x,y,z) and directional vector of the bottom part of the IR Laser Sword Apparatus 279.

In addition, based on different hand movements, wrist actions detectable via the sensors 283 this may invoke different renderings of the virtual images and animations of the IR Light Sword 279 displayed via the users augmented reality ("AR") display apparatus 1, micro-display 3 in which these forms of inputs detected by different forms of sensor readings and values by the devices gesture recognition module 292 are passed via the network 97 to the client module 28, collision manager 26 and rendering module 27 of the users augmented reality ("AR") display apparatus 1, by the IR Light Sword 279 client module 290 to support this functionality.

Here the device has an IR LED/IR Transmitter 287 that may project IR Beams/IR Laser beams onto another users IR Sensor in which a hit can be determinable based on the emitting of infrared light/radiations which are invisible to the human eye being detected by the other users IR Sensor.

In this process the IR Transmitter consumes the electrical current that is dispersed to power the IR LED in which the IR Beam/IR Laser Beam and IR signal containing optionally IR data is then transmitted via the IR LED 287 along the devices lens tube and outward from the optical lens piece 293 of the IR Laser Sword 279 onto a target IR Sensor and/or IR Receiver.

The IR Sensors/Receivers 284 are used to detect hits in the form of IR Light emissions and IR radiation.

The detecting hits may occur as a result of the IR Sensor(s)/IR Receivers 284 detecting Infrared ("IR") light emissions and IR radiation from an IR Beam/IR Laser Beam projected by an IR LED or infrared laser diode of another user's real-world game object such as another users IR Light Sword 279 or IR Laser Gun Apparatus 47 or IR Shield Apparatus 90 or IR Proximity Mine 91 onto the IR Sensor(s) 284.

These IR Sensors like those of other detailed devices in the embodiments of the disclosed invention herein, maybe a form of an active IR Sensor or passive IR Sensor in the form of fiber optic sensor, photo optic sensor, infrared detectors and/or photo-detector.

In addition, the IR Sensors/IR Receivers 284 may be a form of photodiodes or phototransistors. The IR Sensor maybe a form of active or passive infrared sensor in this case.

Alternatively, the devices IR Sensors/IR Receivers 284 maybe set up as a form of IR Detector similar to the previously detailed IR Motion detectors—where IR Light reflected. In this way real IR light representing the IR Light Swords 279 upper section if an object comes into obstructing the IR Beam where the IR Light then reflects back onto the IR Sensor then this may invoke the registering of a hit.

This would be based on a form of obstacle detection sensor circuit or IR Sensor circuit setup where the IR light emitted by the devices IR LED/IR Transmitter 287 if an object moves into its path shall cause the infrared light source to be reflected back onto the devices infrared IR Sensor/Detector 284 causing a hit to be registered.

Where the device is intended to be IR Light Sword 279 that is always on, hits are determinable by any portion of the IR Beam being broken essentially by another object that then causes the IR light source to reflect back. If you consider a real sword a person could hit an object at any point along the sword, similarly here with an IR Light Sword using this form of set up if an object falls between any point of the IR Beam causing it to be reflected back then this can invoke a hit to be registered, where based on the time the IR Light beam takes to come back the exact point of intersection and collision position (x,y,z) maybe determined in which using this augmented images showing say decal or lighting effects may be shown with accuracy via the users augmented reality ("AR") display apparatus 1 micro-display 3 at the precise point along the IR Light Swords 279 projectile that the intersection or collision occurred.

This maybe based on the sensor 283 and/or IR Sensor/IR Receiver 284 inputs in which upon the IR Light Sword 279 client module 290 shall transmit via the Network 97 the devices coordinates/orientation and directional vector taken from the devices sensor(s) 283 or an IR detected hit by the method of reflection by the devices IR Detector/IR Sensor/ IR Receiver 284 from the return of IR light from another object obstructing the IR Beam together with the determined point of intersection to the users augmented reality ("AR") display apparatus 1 collision manager 26.

In which the collision manager 26 shall determine if in the first instance a collision has indeed occurred based on the state information retrieved from the game server 88 or host 89 and shall then invoke an appropriate collision response. This response may include the invoking of the users augmented reality ("AR") display apparatus 1 games engine 35 and rendering module 27 to generate a virtual game object and to produce decal as well as diffuse lighting effects that are displayed via the augmented reality ("AR") display apparatus 1 micro-display 3.

In this process the projected pixel coordinates of the virtual image of the IR Laser Sword 279 rendered 3D model for the top portion of the device align with the IR Laser Sword's 279 position vector (x,y,z), orientation (p,r,y) and direction vector of its IR Beam/IR Laser beam at the top part if the physical part of the device, and the decal as well as diffuse lighting effects pixel coordinates align with the determined collision points (x,y,z) on the IR Laser Swords 279 virtual structure top portion and with that of the other real-world game object, user or AI character 94 or virtual game object 106, virtual AI character 105 or remote user 107.

The last part here in which the IR Laser Sword 279 has intersected on the model coordinates or hit boxes coordinates of these objects, users or AI Characters may be based on these objects respective coordinates (x,y,z), orientation (p,r,y) and directional heading at the time of the detected hit or collision with the IR Laser Sword 279.

Here based on the state information on the game server 88 or host 89 for these objects, users and AI Character's, in terms of their coordinates (x,y,z), orientation (p,r,y) and directional vector, together with the coordinates (x,y,z), orientation (p,r,y) and direction vector of the IR Laser Sword 279 from its sensors 289 provided by the devices tracking module 291 its possible for collision manager 26 through the many supported collision detection methodologies by the collision manager 26 to determine the collision position (x,y,z) of the hit on another real-world game object, user or AI character 94 or virtual game object 106, virtual AI character 105 or remote user 107.

Here the collision manager 26 may use one of the many mentioned previously collision detection methodologies such as hitscan, raycasting, polygon based triangulation, frame by frame analysis using the virtual game objects and 3D model of the IR Laser Sword 279 and the other real-world game objects, users and/or AI characters 94 or virtual-game objects 106, AI character's 105 and remote users 107 etc.

It should be noted like all other real-world game objects, users (via wearables such as IR Mixed Reality Suit 93 or augmented reality ("AR") display apparatus 1), AI characters 94 all have a virtual game object and 3D model associated with then used in the computational operations of collision detection and in the performing of the rendering of augmented virtual images via the plurality of display methodologies supported with the embodiments of these invention disclosed herein.

Here based on the updated state information supplied by all clients on their coordinates (x,y,z), orientation (p,r,y) and directional vector the game server 88 or host 89 shall perform transformations against the virtual game objects and 3D models of these real-world game objects, users and AI Character's 94 in which their 3D model is maintained by the rendering module 117 of the game server 88 or host 89 as well as locally on real-world game object devices including wearables such as IR Mixed Reality Suit 93 or augmented reality ("AR") display apparatus 1, in the same precise state in terms of the position (x,y,z), orientation (p,r,y) and directional vector of these real-world game objects, users and AI Character's 94 in the three dimensional space of the game.

This serves multiple purposes, it supports the rendering of augmented images and lighting effects via the surface display panel faces of real-world game objects, wearables and AI characters 94, external projectors 96 and/or the users augmented reality ("AR") display apparatus 1, micro-display 3; it also supports the ability for the collision manager 26 of the users augmented reality ("AR") display apparatus 1 or other instances on other devices for example to determine a collision using the detailed collision detection methodologies between a real-world game object, user or AI Character 94 and another real-world game object, user or AI Character 94 or virtual game object 106, virtual AI characters 105 or remote user 107.

Here just the same as other real-world game objects, based on the state of another objects, users and AI Character's or the reading of IR Sensor registered hit mapped to the model coordinates of the object, user or AI Character's, the collision manager 26 is able to determine if a hit occurred by the use of the users IR Laser Sword Apparatus 279 as well as the position of the collision (x,y,z) on another object, user or AI Characters model coordinates and/or hit boxes whether virtual or real.

As a further example upon a hit being detected by the IR Sensors/IR Receivers 284 or computationally by the collision manager 26 software module instances of the users augmented reality ("AR") display apparatus 1 or the game server 88 or host 89 based on the devices coordinates (x,y,z), orientation (p,r,y) and directional heading provided relational to the coordinates (x,y,z), orientation and directional heading of another real world game object, user, AI Character 94 or virtual-game object 106, virtual AI Character 105 or remote user 107 the devices haptic module 288 maybe invoked and a virtual augmented image displaying a decal and lighting effect maybe displayed via the user's micro display 3.

Here the collision manager 26 for example of the users augmented reality ("AR") display apparatus 1 could determine that the users IR Light Sword 279 has intersected with the world coordinates/vector position and projectile of another users IR Light Sword 279 in which the projectile is formulated based on the position (x,y,z), orientation (p,r,y) and directional vector determinable by each IR Light Swords sensors 283.

Based on a detected collision, lighting effects may be displayed from the light sword augmented virtual image part as diffuse or specular lighting effects, in which the great velocity and acceleration of the users motion of the sword in their hands the greater the lighting effects shown via the users augmented reality ("AR") display apparatus 1 as well the greater physical feedback from the devices haptic module 288 upon a collision being determined.

In addition to virtual augmented images being placed accurately to the position of the handle held by the user of the IR Light Sword 279 and lighting effects, 3D spatial audio effects and/or 3D perceptual locational based sound effects maybe generated by the users augmented reality ("AR") display apparatus 1 audio manager 34 and/or games engine 35 and played back via the external speakers 6L, 6R.

All state information on the device world coordinates, orientation, directional vector together with IR Sensor registered hits, the velocity and acceleration in the user's motional usage of the device is transmitted via the network 97 to the users augmented reality ("AR") display apparatus 1 client module 28, rendering module 27 and audio manager 34 to support the detailed functionality of the IR Light Sword 279 as detailed.

Where this device has no surface display panels and its functionality is very specific most of the software modules may reside on the users augmented reality ("AR") display apparatus 1 making use of its existing rendering module 27 and collision manager 26, in which the software modules on the device itself need only to pass the sensory data and state information to the users augmented reality ("AR") display apparatus 1 and the game server 88 or host 89.

As such as shown in FIG. 13 the software modules only need consist of a client module 290, device tracking module 291 and gesture recognition module 292 where the client module 290 is responsible for the providing detected gesture inputs, state information and IR sensor/IR Detector registered hits to the users augmented reality ("AR") display apparatus 1 and game server 88 or host 89 via the network 97 for supporting the functionality of the IR Laser Sword 279 as detailed herein.

State information includes the coordinates (x,y,z), orientation (p,r,y) and directional vector of the device provided by the devices tracking module 291 based on sensor readings from its sensor(s) 283. Gesture inputs include special hand gesture detected inputs based on sensor readings from its sensor(s) 283 in which the users hand motions and wrist actions in the use and motion of the IR Laser Sword 279 are detectable by the gesture tracking module 292.

The gesture tracking module 292 supports the same capabilities and algorithms as detailed herein by other instances of the gesture tracking module 292 in supporting the tracking and detection of the user hand movements and wrist actions as special handled gesture inputs. Detected special gesture inputs via the sensor readings 283, are passed to the rendering module 27 of the users augmented reality ("AR") display apparatus 1, via the network by devices client module 290 upon the gesture tracking module 292 passing these detected input types to the devices client module 290.

Many varying methodologies, techniques and systems have been presented embodiments of the disclosed invention herein for which the presented mixed reality and augmented reality gaming system is intended to work in many forms and to be adapted to different environments.

For example, the system could be adapted with relative ease to home configuration consisting of two or more IR Laser Guns Apparatus 47, two or more wearable augmented reality ("AR") head-mounted display devices 1, an optional external 3D mapping projector 96 with sensors; one or more external camera(s) 95 to support the game server 88 usage of spatial mapping/projection mapping/video mapping and spatial augmented reality techniques used in the projection of augmented images, and two or more wearable IR Sensor sensor clothing such as the IR Mixed Reality Vest 92.

Alternatively, the presented invention could be applied to an outdoor gaming arena configuration.

The disclosed invention herein can be combined in many ways to form different configurations to support the game play, for example the game may be played without wearable augmented reality ("AR") head mounted display devices 1, with the use of external 3D mapping projector 96, and an external cameras 95 as detailed or it could be played with just the real-world gaming objects in which the visual effects of the game in 3D are seen without the need of projection mapping techniques that require an external projector 96 or wearable augmented reality ("AR") head-mounted display devices 1.

In the spirt of the invention disclosed embodiments herein this is intended to free gaming from the constants of a screen and to free users in the playing of video games which restrict body movements such as using VR or other forms or AR technologies, where it is intended to bring the game environment and its existence into the user's reality and space in the real-world in which the user can freely explore the game, where they can run, jump perform physical feats not possible with today's restrictions in video gaming, VR and that of most AR systems.

The disclosed invention therefore is intended to bring a paradigm shift in video gaming in which the game exists in the real-world in all senses visual, physical and sound to the user's perception.

Many variations in the methodologies, process, techniques and use of technologies have been detailed in the disclosed embodiments for which those skilled in the art will recognize that this may be implemented in many ways and as such are not to be limited by the foregoing exemplary embodiments and presented example variations.

In addition, many of the disclosed devices include the same disclosed software modules and hardware components, in which different variations of techniques supported have been disclosed. For avoidance of miss understanding any named component that shares the same name has the same functionality as detailed on any other device therefore all capabilities detailed on all devices are common across the devices where they share the same components.

The respective claims relating to each device therefore should be considered in the broadest sense and in the understand of capabilities of the component detailed throughout the embodiments of this disclosure.

Furthermore, functional elements may be supported through various combinations of the disclosed software and hardware, that may be resident on a device or in which these may be distributed as described within the embodiments of this disclosure herein in which functions may be supported remotely or may distributed between client devices and the game server 88 or host 89, in which software modules as described may be run on either.

In this regard, any number of the different features and functions of the various different disclosed embodiments described herein may be adapted to suit single embodiments such as the smaller configuration example of in home usage, or multiple embodiments, which may have fewer or greater numbers of features and functions as described herein.

In addition, a myriad of different combinations of software, hardware and firmware are possible to support the stated features, functions, capabilities and interfaces disclosed herein, in which software functions could be performed by hardware or vice versa.

Furthermore, while the methodologies, techniques and technologies have been disclosed in terms of one or more embodiments it is should be understood that the disclosure is not limited to disclosed embodiments.

Interpretation therefore of the disclosed embodiments herein and the respective claims should be in the broadest sense in the spirt of the intended purpose of the disclosed invention and the respective detailed various embodiments described herein.

Additional Aspects

A method of managing the state of the game and its objects between clients in the form of real-world game objects, users wearable head mounted augmented reality ("AR") display apparatus and a server in the form a Game Server or Host comprising one or more of the following;

Delegating state management to both clients and servers in which either can spawn or create new virtual game objects, line renderings or rays and can transit or retrieve state via the network;

Capturing state information and changes in state including but not limited to;

Inputs in the form of key presses, touchscreen inputs, trigger events, gesture inputs, voice command inputs and other physical forms inputs that may be captured resulting from actions by a user or real-world AI character in the use of real-world game objects and other functions of the system;

The firing or projectile of real IR or Laser beams in the user's real-world environment through the use of boolean flags resulting from a user's inputs including but not limited to the detection of a trigger event from a user pulling a trigger mechanism of a real-world game object resulting in the projecting of light in the form of an IR or Laser Beam into the user's real-world space;

A real-world game objects state information containing sensor data at the time of an IR or Laser beam being fired or projected on the objects vector position/world coordinates in the form of x,y,z cartesian values, rotation, orientation in the form or pitch, roll and yawl (p,r,y) values and directional; heading/directional vector captured via the real-world game objects sensor(s);

Spawning and creation of new virtual game objects, Line renderings or rays by clients or servers based on determined input states and the captured real-world game objects state information and sensor data at the time of an IR or Laser beam being fired or projected, used in the formulating of the origin/starting position, projectile/trajectory, angle and directional vector of an IR or Laser Beams spawned virtual-game object, line rendering or ray which maybe displayed as an augmented images of the moving IR or Laser beam in exact precise positions in 3D space to that of the real moving IR or Laser beam in the users real-world space;

Changes in a real-world game objects classification, that maybe used in the determination of the range of an IR or Laser Beam, and the determination of damage caused by a hit or tag of an IR or Laser beam on another real-world game object, user, real-world AI character or a virtual-game object where a collision of an IR or Laser Beams virtual-game object, line rendering or ray with a real-world game object, user or real-world AI character has been determined;

Changes in the state of an a user, real-world game objects vector position/world coordinates in the form of x,y,z cartesian values, rotation, orientation in the form or pitch, roll and yawl (p,r,y) values and directional heading/directional vector among other state information based on retrieved sensor data, used in the game computation, rendering, transformation and collision detection operations;

Changes in the state of an a user, real-world game object or real-world AI characters health based on the determination of hits or tags from an IR or Laser beam whether computational determined based on the relative projectile and positions of generated virtual game objects, Line renderings or rays to that of the real-world game object or based on the presence of light emissions or radiation detected by a real-world game objects IR sensor(s) and IR Receivers, and the classification of the real-world game object that was used by another user or real-world AI character;

Changes to real-world space and objects within the users real-world environment, laser tag arena and/or that of the said grid, captured in the form of mesh data, 3D models and wireframes containing geometric, surface, volumetric and depth information on the real-world space where this maybe captured via a plurality of ways including the use of a users augmented reality ("AR")

display apparatus external camera(s) using spatial mapping, or via the game server or host use of external camera(s) and/or laser planer or structural light modulators using respectively spatial mapping or structure light techniques;

Changes in the state of an IR or Laser Beams virtual-game object, line rendering or ray including the creation of and/or destroying of game objects, line renderings and rays, based on the determination of hit or tag;

Changes in a user's head positions in the form of x,y,z cartesian values, together with their head rotation and/or orientation in the form or pitch, roll and yawl (p,r,y) values, directional heading/directional vector captured via a users augmented reality ("AR") display apparatus sensor(s) or via game server or host through the use of external camera(s) and/or laser planer or structural light modulators using respectively spatial mapping or structure light techniques;

Changes in a user's eye movements, position and directional gaze that maybe captured through recorded images and/or video via the inward facing camera(s) of a users augmented reality ("AR") display apparatus and the spatial mapping to reconstruct the eye by an eye tracking module or other means;

Transmitting state information and sensor data via the network;

Transmitting state information within an IR or Laser beam between clients in the form real world game objects as binary data;

Maintaining and storing of state and handling updates, in the transitions or changes to state of real-world game objects, users, real-world AI characters and spawned virtual-game objects, line renderings and rays by clients and servers;

Handling of state synchronisation between clients and the game server or host through the retrieving and sharing of state via the network where the game server or host is the central source of truth.

The method may use a purity of differing texture mapping techniques to map texture maps to that of the individual surface display screen faces of a real-world game object using a paired virtual game object one or more of the following:

The mapping of 2D coordinates, vertices, face Ids, Surface Ids, Edges from the outputted rendered images by a rendering module/games engine to individual surface display panel faces of a real-world game object, where each surface display panel face has an addressable frame buffer;

The mapping of individual images or portions of images (triangles/polygons/quads) to individual surface display panel faces of a real-world game object where each surface display panel face, is independently addressable;

The use of addressable rasterised images as an output of the rendering pipeline which represents the individual corresponding polygons or set of triangles/quads of a real-world game object and its paired virtual-game objects 3D model/mesh where each surface display panel face is independently addressable and controllable in the display of virtual images where individual images or portions of images (triangles/polygons/quads) may be mapped to individual surface display panel faces;

The mapping of a paired virtual game objects polygon-based mesh directly to the real-world game objects edges, faces, polygons and surfaces that form its mesh and geometric shape in the real-world, where a real-world game object is formed of real-world vertices/points, edges, faces, polygons and surfaces in which individual real-world surface display panel faces are triangular like or quad like in form;

The mapping of a paired virtual game objects 3D model and/or mesh formed triangles/quads or polygons, faces, vertices, and surfaces to a real-world game objects triangles/quads in the form of surface display panel faces;

The applying each respective texture map to a paired virtual game objects triangles/polygons, faces and surfaces to each of the real faces and surfaces of a real-world game object using techniques such as perspective correct texturing in which accounts for the vertices' positions in 3D space;

The use of vertices positions to map each respective texture maps to the surface display panel faces of a real-world game object where vertices positions for every polygon or triangle on paired virtual game object and 3D model maps precisely in terms of its vertices positions to that of vertices positions of the real surface display panel faces of the paired real-world game object;

The use of vertices, faces, surfaces, triangles or polygons or quads;

The use of a unique display ID/face ID in which each surface display panel face has a unique addressable display ID/face ID that map to specific face and/or polygon of the paired virtual game object and the rendered 3D model;

Mapping the paired virtual game objects 3D model points or vertices, polygons/triangles, faces and their corresponding generated texture maps/2D images representational pixel coordinates to individual surface display screen faces of a real-world game object, based on pixel coordinates and a face ID/display ID attributed to each surface display panel face;

Mapping the paired virtual game objects 3D model face ID, surface ID and the polygons of the its 3D mesh or wireframe and rendered 3D model to the corresponding correct real-world game objects surface display panel face based on its respective display ID, face or surface ID where in this process the generated and updated 3D rendered image may be broken down back into individual triangles, polygons and faces in which for every surface or face of the virtual 3D model a 2D image is generated containing the texture-map changes or other visual effect changes such as lighting, which is then mapped back to display ID or face/surface ID of a real-world game objects surface display panel faces, where corresponding fragmented 2D image is then loaded into the correct frame buffer for its corresponding real-world surface display panel face using a RGB array or an in-memory bitmap;

The breaking down of a real-world game objects 3D model back down to individual rendered faces and mapping these back to each of the surface display panels faces;

The breaking down of a 3D rendered image into individual triangles, polygons and faces in which for every surface or face of the virtual 3D model a 2D image is generated containing updated texture-maps or other visual effect changes such as lighting, which is then mapped back to a unique display ID or face/surface ID of a real-world game objects surface display panel faces, where corresponding fragmented 2D image is then loaded into the correct frame buffer for its corresponding real-world surface display panel face using a RGB array or an in-memory bitmap;

mapping of pixel coordinates and a face ID attributed to each surface display screen faces;

mapping of texture maps to that of the individual surface display panel/screen faces of the paired real-world game object based on their respective 2D coordinates and/or pixel coordinates;

mapping of texture maps by use of a reference to a specific face and set of vertexes;

mapping of texture maps based on the position each surface display panel face and its representative vector of the centroid of a triangle;

mapping of real-world game objects physical model coordinates, polygons/triangles or quads, surfaces, faces, vertices and/or model coordinates/points to that of its paired virtual-game object 3D model coordinates, polygons/triangles or quads, surfaces, faces, vertices and/or model coordinates/points;

Use of depth map to devise the respective 3D coordinates and 3D vertices (x,y,z) of each 2D RGB pixel coordinate (x,y) which may be used in the mapping of the rasterised 2D image and texture-map to a real-world game objects surface display panel faces and vertices;

Generating a virtual-game object for each surface display panel/screen face or a single virtual game object in which each physical surface display panel face represents a face of the paired virtual game objects 3D model where;

In the case of a single virtual game object in the final stage of the rendering pipeline the 3D image is broken down into individual addressable 2D virtual images that represent each of the real world game objects addressable polygons or quads which each map to individual surface display screen faces in which;

Individual pixel RGB array's or in-memory bitmap's are written into the frame buffer for each of the individually mapped surface display screen faces;

Each 2D image is displayed on each of its respective surface display screen faces for which the sum of all of the surface display screen faces forms a 3D image visible in the real-world where each physical display panel may have an addressable rasterised image as an output of the rendering pipeline which represents the corresponding polygons or set of triangles or quads;

In the case of each surface display screen faces having its own virtual game object a 2D image is generated by the rendering module for each of its respective surface display screen faces, where:

individual pixel RGB array's or in-memory bitmap's then get written to the frame buffer for each of the individually mapped surface display screen faces;

A supporting method of capturing, processing, producing and displaying various forms of holograms and holographic images, produced through multiple sources, as augmented images over the user's real-world view via their augmented-reality ("AR") display apparatus, micro display used in the display of game scenes and virtual game objects including the virtual game objects of moving IR or IR Laser beams, comprising of:

The use of different data sources to produce a hologram from real-world objects including the use of one or more of:

a real world object generated mesh and 3D models in which the hologram may consists of a high number of points referred to as a cloud of points or vertices from which a number of triangles form the shape of the 3D model;

Spatial mapping techniques to generate volumetric and geometric data, mesh data and 3D models that have a number of cloud points and triangles that for a 3D represented object of a real-world object which may be used to generate a 3D hologram image of the real-world object using the users augmented reality ("AR") display apparatus, outward facing camera(s) and sensors to capture and process images of real-world objects into 3D models which are then converted into hologram images using the 3D captured data;

Structural light scanning techniques to generate a cloud of points (CoP) hologram which may be constructed using the captured cloud points and 3D model data, through the use of algorithms such as Compensated Phase Added Stereogram (CPAS), Accurate Compensated Phase Added Stereogram (ACPAS) or Fast Phase Added Stereogram (FPAS) where a generated CoP hologram using ACPAS algorithm may be converted into a synthetic hologram before being reconstructed using light modulators to generate an opto-electronic reconstructed hologram or using numerical Fresnel algorithm to produce to a numerical reconstructed hologram;

The use of different data sources to produce and display holograms and holographic images includes multi-view point 3D or 4D captured images or 2D images, 3D or 4D generated computer virtual objects such as virtual game objects, structured light 3D or 4D images, and holography techniques for the capture of real-world images using a coherent (laser) to record images;

Processing and converting data sources using holographic single (HR) path amplitude phase techniques or surface based geometry path using surface representational data, in which new elements are added dynamically in the composition and assembly of the hologram or holographic image, where geometrical occlusions are applied and modifications are made to the geometry of a scene elements;

The alternative use of holographic film representing varying sequences of pixels in RGB form to reconstruct holograms in which:

Multiple layered holographic films are used with different sequences of pixels to form holograms in which the hologram may be recreated using a combination of layered holographic film that provide the ability to reconstruct each colour channel of a hologram (R, G & B) and in which different angles of diffraction of the different holograms may be reproduced by using a reference beam of light to diffract the light differently on each of the holographic films to produce the original holographic image as a combined reconstructed hologram that is RGB;

the angle of incidence maybe reproduced through guiding the light to a waveguide at varying specified points on each of the holographic film layers where these points may be defined as a pixel coordinate in which the holographic film layers are used as a construct of varying pixel pallets and on a defined display resolution allowing the reconstruction of a hologram to a photorealistic level of detail and to high number of triangles and vertices;

The producing of hybrid content holograms (HCH) where through a process of optical field propagation the real-world image of the background is merged with the mask of a virtual game object to produce a reconstructed synthetic hybrid hologram in which representational 3D points or world coordinates based on the geometrics and volumetric data of the real-world background and virtual game object is used to place correctly the virtual game object in front of the background image;

The construction of CoP holograms from virtual game objects where as an output of the graphic rendering 3D pipeline a cloud of points (CoP) hologram may be constructed using the captured cloud points and 3D model data, through the use of algorithms such as Compensated Phase Added Stereogram (CPAS), Accurate Compensated Phase Added Stereogram (ACPAS) or Fast Phase Added Stereogram (FPAS) where the vertices of the 3D model of the virtual game object and its triangles are used to produce the 3D model data for a CoP hologram;

The augmenting and merging of CoP generated holograms of real world objects and virtual game in which a combined image and synthetic hologram is produced;

The Illuminating and display of a produced hologram or holographic image via a user's augmented-reality ("AR") display apparatus, micro-display where:

The display of a hologram or holographic image may be dependent on:

The selection of the viewing direction and reconstructed 3D model of the object, where relative to the users eye position the displayed hologram image and 3D model may vary in which the system uses the inward facing camera(s) to track the users eye's and gaze where the 3D model is transformed through a process of transformation;

The angle of the users view based on their head tracking data in terms of the users head position expressed as 3D Cartesian Coordinate (X,Y,Z) and their head orientation expressed as pitch, roll and yaw (P, R, Y). During this process modifications by way of transformations to the source image may be made to the illumination to reproduce the accurately the holographic image or hologram;

The directing of the light beams onto the users micro display, maybe dependent also on the users head tracking data together with the users eye position also in which the light modules may guide the light accordingly via the waveguides to diffract the image light so as to intersect at a determined position of the user eye;

The system may be based on analyse of the user's eye shape, position, directional gaze and movements may make adjustments to the display through adjusting the Total Internal Reflections (TIR), refractive index and diffraction configuration used to direct the resulting light at the user's eyes;

The mode of the users augmented reality display apparatus where the this may be an eye tracking based display or a display that is based on a horizontal perspective or full perspective or conversions may be made to the holographic images and holograms to support other forms of augmented reality 3D displays such as stereoscopic 2D head mounted displays, auto stereoscopic;

In the case of the source being a CoP hologram, the hologram is displayed accordingly by directing the light beams and illuminating the image at its respective cloud points and model coordinates to reconstruct a Cloud Of Points (CoP) hologram in which:

The beam of light produced by the light display modules, to reproduce the CoP Hologram and the captured points of the original object in which the micro display is illuminated at specific points on its surface representation of the points on the relative to the 3D model points on x, z and y.

The resulting light from the respective source is directed onto corresponding left and right display panel portion of the display via a pair of lenses of micro display which then collimate the images into a plurality of beams where the light exits corresponding to the individual input beams from either portion of the transparent display screens via the waveguides onto the users left and right eye accordingly at a determined angle of intersection or incidence using process of diffraction and total internal reflections (TIR) and in accordance with original holographic or hologram image source so as the original image is correctly formed thus stimulating the human brain to convert the received light into a 3D virtual image, where through the transparent display of the user's micro display, the 3D holographic or hologram images of the game scene and moving IR or Laser beams appear substantially the same as the original source image, overlaid on the user's real world environment FOV of the user as an augmented virtual image;

A method further comprising at least one of:

The usage of a client module or script coded in Java or C#attached to an IR or Laser beam virtual game object, to retrieve periodically a real-world game objects state information and sensor data via the network captured at the time of the apparatus trigger being pulled or being activated via the apparatus sensor(s), in which state and sensor data includes the apparatus;

three dimensional Cartesian Coordinate/vector position (x,y,z), orientation (p,r,y) and directional vector (x,y,z) at the time the trigger was pulled from the apparatus tracking module in which this data shall form the event trigger information and the inputs for formulating the origin coordinates (Point A) together with the projectile/directional vector and destination (point B) of an IR or Laser beam;

Drawing a line rendering of an IR or Laser beam based on vector position/three dimensional coordinate (x,y,z) referred to as the transform origin or origin;

Determining a transform destination which is the end point for where line rending shall end;

Using a float to define the line rendering speed or draw speed in which this is based on the determined velocity of the IR or Laser beam which may be assumed;

Setting a line width at the starting origin and reducing or increasing the said line width as the line progresses to its end point to provide perspective projection of an object appearance as smaller the further away the line is to a user or as larger the closer the line is to a user;

Setting a colour, material and/or texture for the line, together with a vertex count;

Setting the distance as a calculation using the determined origin also referred to as a Vector3 to determine point A (the origin) and point B (distance) to return a float value where distance=Vector3.Distance(orgin.position, destination.position or alternatively distance is based on an assumed range of the IR or Laser beam;

The use of a formula float X=MathFloatLerp(0, distance, counter) where X=the returned float value for the distance between points A and B, 0 (the origin), distance (is the changing value), and a counter variable values are used in a Lerp to provide a value between A & B where based on linear interpretation frame by frame the system shall calculate the distance that the IR or Laser beam line has travelled between points A and B in which distance is dynamically calculated per frame based on the float values The use of a counter as an incremental value which supports the update function of a script or the code of the line rendering function where each frame when the function is called this shall move the length of line along a point closer to its destination based on the determined projectile, draw line speed/velocity expressed as a public variable and destination as a point in three dimensional space closer to the destination that supports the animation function of rendering and displaying a moving IR or Laser beam as augmented virtual image where;

the counter provides an incremental value between point A (origin) and point B (destination) in which in each frame the animation moves along a point closer to the destination;

"counter +=0.2f/lineDraw speed" maybe used where "2f" is the incremental amount it is changing each frame, which is divided by the line Draw speed which is the rate at which the image animation should be rendered which maybe expressed as public variable that can be increased or decreased to show the animation of the IR Laser beam drawn faster or slower;

The use of second float value where through a further algorithm or equation the next point or vector position along the line can be calculated and used to render the moving IR or IR Laser beam along a point from point of origin (point A) through the use of the formula:

"Vector3 positionAlongline=x multiplied by Vector3.Normalised(Point A-Point B)+point A;" where point A is the origin expressed as a Vector3 and point B is the destination position.

Where by determining the vector direction by performing a vector3 normalised (Point B-A) to provide a unit vector in the form of a directional vector, which is then multiplied by the desired length which is the changing value of "X" and finally the origin (point A) which gives the next point or vector position along the line.

Setting the next point and vector position along the line using the argument: "lineRender.SetPosition(X,positionAlongLine);";

Or alternatively formulating the line rendering may user a Lerp and transform to move the line to the next position using;

Float x=MathFloatLerp(0,distance,counter)
AND
Transform.position of game object=new Vector3(MathFloat.Lerp(min,max,x),0,1);
Where when x=0, this returns the point A x,y,z values (origin), when x=1 it equals the destination point b (x,y,z) values, when x=0.5 this equals a point in the middle of point A and B along the line in which this could have many points along the line with the overall length of the line being representational of the IR or Laser beam range i.e. 200 meters;

the distance and length of the line irrespective of the formula used is variable which may be affected by collisions or other objects intersecting with the IR or Laser Beam and line;

Other variables such "t" for time may be used with an incremental value where based on time variable the length of the line and IR Laser Beam increases which could be formulated based on the rate of velocity of the IR or Laser Beam;

A method of predetermining or detecting collisions of an IR or Laser beam intersecting with another real-world user, real-world game object, real-world AI character or remote users, and other virtual game objects comprising one or more of:

Detecting of IR or Laser beam being fired based on the retrieving of state information via the network from another real-world game object client module or via the game server or host, in which the state information includes:

a boolean flag generated locally by the real-world game object as a result of it's trigger mechanism being pulled or the device being activated by other means including touch screen inputs or voice that may result in the generating and detecting locally of an I/O input;

Determining the origin, projectile/trajectory, directional vector, velocity, distance and positions (x,y,z) of an IR or Laser beam formulated based on;

Retrieved state and sensor data captured at the time of a real-world game objects trigger mechanism being pulled or the device being activated, containing the apparatus world coordinates/position (x,y,z), orientation (p,r,y), rotation and directional vector among other sensor data in which this data maybe retrieved via the network directly from another real-world game object directly or via the game server or host;

And/or an assumed velocity and range/distance of a real-world game objects IR or Laser beam;

Determining if a hit and/or collision of a projected IR or Laser beam with another user, real-world game object, real-world AI character based on their relative world coordinates/position (x,y,z), model coordinates, orientation (p,r,y), rotation, directional vector/projectile together with their velocity among other data in which this data may be retrieved by one or more of:

via the network as state and sensor data from the game server or host where every client module including the users augmented reality ("AR") display apparatus client module, shall connect to the game server or host via the network for the passing and retrieving of state and event information that includes sensor generated data in which:

the game server or host maintains state information on all real-world users, real-world game objects and real-world AI Characters or remote users, and other virtual game objects in which this state includes the directional vector information, model and world coordinates/positional vectors (x,y,z) together with other relevant data on hit boxes or other state information retrieved by a clients collision manager;

or directly as state and sensor data via a real-world game object locally or via the network;

Where this may be used in conjunction to the retrieved state information on a moving IR or Laser beam to determine If a hit or collision has occurred;

Determining if along the points or positions (x,y,z) of an IR or Laser Beams a virtual game object and line rendering or ray if a another user or object based on their retrieved relative three dimensional world coordinates/positions (x,y,z), directional vector/projectile and velocity shall intersect with the IR or Laser beam or has intersected where hit has occurred;

Determining the point of collision where:
the point of collision may be formulated based on the relative three dimensional coordinates, vector positions, projectile/trajectory, distance and angle of the generated line, ray or virtual-game object representative of the IR or Laser beam, to that of the model coordinates, world coordinates/vector position, orientation directional vector and velocity of another user's body and/or a real-world game object in which the hit and point of collision maybe determined using the retrieved state information via the network;

Offsets maybe applied in to the origin, projectile, directional vector of the IR or IR Laser beams generated line, ray or virtual-game object where the real-world game object that fired the beam features multiple IR LEDs or IR Laser diodes each at varying positions/coordinates, orientation and angles/directional vectors on the model of a real-world game object such as IR Proximity Mine or IR Shield Apparatus;

Use of collision detection techniques including but not limited to; hitscan, raycasting, vector and parametric equations of a line, time of impact (TOI) analysis or frame by frame analysis, or polygon based triangulation, spatial partitioning methods, bounding boxes, n-body pruning, exact pairwise checks, pairwise pruning, pairwise checks using bounding rectangles or circles hit boxes, exact pairwise collision detection; Triangle Centroid Segments; the use of single or multiple hit boxes in the form of hitbox hierarchies that are bound to the paired virtual game object of a user, real-world game object and/or real-world AI character;

A method of detecting collisions between two or more objects and simulating a collision response in which these objects may be real-world game objects, objects and surroundings or virtual world game objects and surroundings that coexist in the game space, comprising one or more of:

Detecting of collisions or intersections of two or more objects by a collision detection module based on:
State information and sensor data of real-world game objects retrieved via the network;
And/Or
Geometric and volumetric data in the form of mesh data on real world objects and surroundings;
And/Or
Generated 3D models, virtual game objects and mesh data of virtual game objects and/or real world objects, users and surrounding surfaces in a user's real world space;
Where collisions may be detected by a collision detection module based on:
Generated virtual game objects, 3D models, mesh data together with state and sensor data captured on objects including real-world game objects, objects surrounding surface data as well as virtual game objects, remote users and AI Characters and their respective three dimensional positions orientation, directional vector/projectile and optionally model coordinates in which:
the three dimensional positions/cartesian coordinates, orientation and directional vector/projectile among other state information used in the computation of a hit which shall be captured depending on the object:
via an objects sensor(s) where the object is a real world game object and retrieved locally or via the network;
Or
through generated wireframes, mesh data, 3D models and virtual game objects of users, objects and surrounding surfaces in a user's real-world space by a rendering module or games engine through:
using recorded images or video of the real-world space and spatial mapping techniques in which spatial, depth, geometric and volumetric data is constructed with the use of an observer module using a user's augmented reality ("AR") display apparatus camera(s) or through external camera(s) by the game server or host;
Or using structural light scanning techniques including Laser interference using specialist laser apparatus/laser planers or projection using incoherent light and specialist spatial light modulators with the digital external projectors and one or more external camera(s);
computationally based on the respective position, projectile and model coordinates of a generated virtual game object or a generated paired virtual game object by a rendering module and/or games engine;

The use one or more of the collision detection techniques and physics simulations that may include but not limited to:
hitscan, raycasting, vector and parametric equations of a line, time of impact (TOI) analysis or frame by frame analysis, or polygon based triangulation, posteriori collision detection methods, spatial partitioning methods, bounding boxes, n-body pruning, exact pairwise checks, pairwise pruning, pairwise checks using bounding rectangles or circles hit boxes, exact pairwise collision detection; triangle Centroid Segments; polygon based triangulation;

Where a detected collision may result from the intersecting of one or more:
an IR or Laser beam with another user or another object which may be real world game object or a virtual game object, in which this is determinable based on the relative projectile and positions (x,y, z) of an IR or Laser beam formulated based on from state and sensor data, captured via a real-world game objects sensor(s) upon the trigger mechanism being pulled or the apparatus being activated, to that of another user or object;
Or
a user with a virtual game object or a real-world game object based on their relative projectile/ trajectory and positions (x,y,z);
Or
a virtual game objects and real-world objects or vice versa based on their relative trajectory, positions in which the intersecting of real-world game objects with virtual game objects can effect the state of virtual game objects and conversely a virtual game objects can effect the state of real-world world game objects as a result of detected collision and the determined collision response;

Where alternatively a collision detection module may also compute the time of impact (TOI) and report this to the Collision Response module in the predetermining of an outcome from the projected collision, providing a set of intersection points to be used in the computations by the collision response module in the simulation of the outcome resulting from the collision;

Simulating the resulting changes in two or more objects following a detected collision, in which a collision module shall apply physics models and algorithms in its computation of the resulting outcome and collision response to be applied from the detected collision in which this may comprise of one or more of:

Computations based on physics data, linear algebra, computational geometry together with volumetric and surface data;

Geometry, volumetric and surface data which may be provided on real-world users, objects and surface which may be used together with state information from the game server and host together with the associated virtual game objects model data and physics attributes in the resolving of the outcome of collision detections;

Physics data which may be used in the modelling and algorithms may consist of variables such as force, time, the assumed constant mass of an object, momentum and velocity, in which the opposing values of each of these variables for each object shall be used in the determination of the outcome;

The application of laws of physics which may be applied in this process through physics simulations to make the visual effects whether augmented virtual images or visual in the real-world to appear more realistic in which a Collision Manager and its modules may use Newtonian physics in its simulation, modelling and algorithms used in determining of an outcome resulting from a collision or intersection;

The use of rigid body or soft body simulations may be used in this process by a Collision Manager and its Collision Response module;

A method comprising one or more of:

On detection of a collision of an IR or IR Laser beam with another users or another object which may be real world game objects or virtual game objects, in which a collision maybe determined computationally based on the relative formulated projectile/trajectory and positions of an IR or IR Laser beam or its virtual game object, Line rendering or ray based on state and sensor data captured from a real-world game object upon the trigger mechanism being pulled all the device being activated via the real-world game objects sensor(s);

Destroy virtual game object for existing IR or Laser Beam;

Creating a new virtual game object by a rendering module and/or games engine of a client or Game Server or Host using CPU and/or GPU for the display of game scenes together with decal and diffuse lighting at the determined point of collision (contact points) for where an IR or Laser beam virtual game object and line rendering or ray intersected with another object that maybe another user, real-world game object or virtual game object;

Rendering of game scenes and applying of decal/diffuse lighting effects to the created virtual game object by rendering module and/or games engine in which decal effects may be displayed over existing texture-maps or materials of objects or new texture maps and materials may be created with decal effects and diffuse lighting effect;

Applying Rasterisation, Fragmentation and Shading to generate a rasterised 2D virtual image;

Outputting an RGB Array or In-memory bitmap;

Displaying decal/diffuse lighting effects at the determinable point of collision via a plurality of display methods dependent on the object hit comprising of the use of one or more of:

A client in the form of users Augmented Reality ("AR") head mounted display apparatus micro display where the decal and diffuse lighting may be displayed as a pair of two stereoscopic images or a holographic or hologram image according to the assigned pixel colour and coordinate values and the determined point of collision;

One or more external projectors by the Game Server or Host using 3D projection mapping/video mapping or spatial mapping techniques where the augmented virtual image of the rendered decal and diffuse lighting effects is displayed according to the assigned pixel colour, coordinate and the determined point of collision;

A client in the form of real-world game object where a hit is detected by an IR or Laser beam on the real-world game object or its paired virtual game object, in which the rendered decal and diffuse lighting effects is displayed over the real-world game objects corresponding surface display panel faces according to the assigned pixel colour and coordinate values and the determined point of collision;

Generate audio component and 3D audio perceptual sound effect using same input values for the point of collision into HRIR database and applying 3D positional audio and/or spatial audio techniques including but not limited to emulating the biological mechanisms of binaural hearing, using DSP algorithms and sound locational technologies, and techniques such as ITD, IID, ILD and HRTF functions;

Outputting the generated 3D positional audio effect via a plurality of methods of dependent on display method used including the use of one or more of:

Outputting of 3D positional audio effects via a client in the form of a user's Augmented Reality ("AR") head mounted display apparatus speakers;

OR outputting of 3D positional audio effects via the use of external speakers in the laser tag arena by the game server or host;

OR outputting of 3D positional audio effects via the speakers of a real-world game object where a hit is detected by an IR or Laser beam virtual game object and line rendering or ray on the real-world game object or its paired virtual game object;

Applying transformations to the created virtual game object used in the rendering/display of decal and diffuse lighting using a rendering module and/or games engine together with the associated audio component/3D positional audio effect using an audio manager component where:

In the case of users Augmented Reality ("AR") head mounted display apparatus apply transforms shall be applied to the virtual camera and/or created virtual game objects based on detected changes to a user's head position and orientation together with their eye position and directional gaze detectable via the head tracking module and eye tracking module using the apparatus sensor(s) and inward facing camera(s) together with spatial mapping according to the users eye positions and orientations and directional gaze, where transforms and new vector values shall be applied according to change the vector position, rotation, scale of the displayed decal/diffuse lighting effects based on detected changes;

In the case of external projectors transforms shall be applied based on the detection of changes in a object and/or users position through the use of two or more methods including:

Based on sensor data retrieved via the network from a client that may be a user's Augmented Reality ("AR") head mounted display or a real-world game object;

Or based on detected changes via the use of external camera(s) using spatial mapping or the use of structural light scanning techniques using specialist laser apparatus/laser planers or projection using incoherent light and specialist spatial light modulators with the digital external projectors and one or more external camera(s) where the game server or host rendering module and games engine shall construct wireframes or mesh and 3D models of the users real-world space in which changes in an object or users position is detectable;

In the case of real-world game object transforms shall be based on detection of changes via a real-world game objects sensor(s) in the position, rotation or orientation of a real-world game object;

Applying the same transformations to any generated audio components and 3D positional audio effects of a created virtual game object and rendered decal effects, using the same vector values as applied to created game object converted as image into a HRIR database;

Displaying updated decal and diffuse lighting effects via the applicable display apparatus/method;

Outputting the updated or new 3D positional audio effects resulting from the transform via the speakers of the applicable apparatus;

A method comprising one or more of:

The outputting of generated 3D positional audio effects via a pair of speakers in which sound waves may be processed and manipulated to achieve perceptual 3D audio localisation in which a user perceives the audio coming from the same specifiable location in three-dimensional space equal to that of a displayed moving IR or Laser beam augmented image or that of a displayed decal and diffuse lighting effect through the use of a plurality of 3D perceptual audio techniques comprising of one or more of:

Controlling and manipulating of the directional sound output of the speakers and the direction of how the sound waves enter the user's pinnae ear referred to also as the auricle or auricula, in which through manipulating the filtering process of the pinnae, the user perceives the sound location to be at a determined location and position in the three dimensional space of the real world;

Stimulating the user's ears using through the use of one or more techniques such as ITDs, ILD and HRTFs by:

manipulating the user's perception of the interaural time difference ("ITD"), which is the difference in the arrival time of sound between two locations (through changing adjusting the time the sound arrives at either of the user's ears);

manipulating interaural intensity difference ("IID") in which the sound intensity between two locations is varied;

the filtering of sound by user's ear's pinnae part of the ear, in which interaural level differences ("ILD") provide salient cues for localizing high-frequency sounds in space based on the differences in the sound pressure level reaching the two ears, the precedence effect and head-related transfer functions ("HRTF");

Combining of techniques such as ITDs with ILDs to achieve sound location at both lower frequency sounds and higher frequency sounds;

The reconstruction of spatialised signals, in which the spectrotemporal components are identified and isolated through Short-Time Fourier transform (STFT), in which the incoming audio signals and waves from two or more sources may be computed, in which the ITD of each of the spectrotemporal components maybe estimated through a comparison of the phases of the STFT where the use of techniques such as ITD's and ILDs can applied to achieve perceptual based 3D sound location;

The use of HRTFs to provide further dynamic cues to re-enforce the perception of the location of audio to user's brain in which the body of the human obstructs the sound waves, causing linear filtering to occur from interference of the user's body, head and ears, where every HRTF contain descriptions of locational cues that includes IID, ITD and monaural cue, which effect the users perceived position of the source of a sound;

The filtering and manipulating the HRTF audio source signals prior to being output on the user's speakers on their augmented reality ("AR") display apparatus 1, using techniques such as convolutive blind source separation may be applied in real-time, in which it is possible to manipulate the users perceived relative position of an audio source in 3D space in real-time;

The optimising of HRTF's for the use in the manipulating of the sound sources in real-time for the positioning of 3D positional audio effects in real-time relational to display projected IR or IR Laser beam shown as a moving augmented virtual image via the users augmented reality ("AR") display apparatus at the same 3D positions, directional vectors, acceleration;

The application of ITDs, and ILD by manipulating the lower frequency and upper frequencies through adjusting the relative level of the sound to create this audio illusion of the sound direction emanating from one side of the user's head with the use two integral speakers of the users augmented reality ("AR") display apparatus;

The use of head-related transfer functions (HRTF's) and reverberation and other techniques to manipulates the sound waves high and low frequencies to simulate:

reflections of sound as projected the IR or laser beam passes real-world objects, real-world game objects, virtual game objects and real-world the surfaces;

echo's as reflections of sound as the IR or laser beam passes identified surfaces that are suitable for reflecting sound waves such as hard or smooth surfaces;

The use of 3D audio spatial convolution techniques using HRTF functions or filters with cross talk cancellation techniques in the processing of the associated audio components/sources of the IR Laser Beam, where 3D audio sound effects and sound waves may be recreated to emanate from a specific point in three dimensional space;

Manipulating audio effects through a process of emulating the biological mechanisms of binaural hearing;

Where 3D positional or perceptual audio effects maybe generated based on input image coordinates via a HRIR database using the above techniques for the purpose of placing 3D audio effects at:
  the point of origin for when an IR or Laser beam is fired, derived from the real-world game objects position that fired the beam and sensor data;
  Or differing positions (x,y,z) of an moving IR or Laser beam's virtual-game object and line rendering of ray, derived from the determined origin, positions and projectile of the beam based on the real-world game objects sensor data that fired the beam;
  Or fixed positions in the three-dimensional space of the real-world space as ambient game scene sound effects;
  Or at the vector position (x,y,z) of a real-world game object where a real-world game object may have an attached audio component and audio effects which changes in position with the position of the real-world game objects position as the object is moved;
  Where transformations maybe applied in the correct placing of audio effects in which new image coordinates are input into a HRIR database;

A method to enabling a user to see the real-world space and laser tag arena and objects or other users in other real-world spaces through another users FOV and/or a real-world AI Characters eyes/camera(s) comprising one or more of;
  Transmitting recorded video captured from one or more of:
    A users augmented reality ("AR") display apparatus device forward facing cameras;
    Or from the real-world AI Character's forward facing cameras;
    Or from the external cameras 95 in the laser tag arena over the network to the users augmented reality ("AR") display apparatus device;
  The receiving, decoding and playback of video via a user's augmented reality ("AR") display, micro display;
    In which the user is given the ability to view the real-world from another user or real-world AI character whether friend or enemy allowing the use to see the other parts of the three dimensional space of the laser tag arena real-world environment and that of the virtual game in place they have not physically been.

A method to enabling a user to see through physical walls of the games real-world space and laser tag arena to see other real-world spaces together with other real-world game objects, users and real-world AI Characters comprising one or more of;
  Retrieving of state information and sensor data from the game server or host of other real-world game objects, users and real-world AI Characters which includes their world coordinates (x,y,z) and model coordinates together with mesh data for other three-dimensional real-world space/areas of the laser tag arena;
  Rendering and display of augmented virtual images of the 3D structures of other real-world spaces and the laser tag arena via a user's augmented-reality ("AR") display apparatus, micro-display, together with augmented virtual images of other moving real-world game objects, users and real-world AI Characters in real-time;
  In which the user is gifted the ability to see through walls and structures to other three dimensional spaces in the laser tag arena where:
    the users augmented-reality ("AR") display apparatus rendering module and/or games engine is configurable to support this process;
    the user can navigate through other three-dimensional world spaces through the use of hand gestures detectable via the users augmented-reality ("AR") display apparatus camera(s) and gesture tracking module or via voice command which is supported via the microphones and speech recognition module of the users augmented-reality ("AR") display apparatus;
    using mesh data, virtual game objects and state information together with sensor data the real-world space of other areas together with other moving real-world game objects, users and real-world AI Characters maybe displayed as augmented virtual images via the users augmented-reality ("AR") display apparatus in the form of two slightly differing 2D stereoscopic images or a holographic or hologram based image over the users real-world via by the illuminating, exciting or activating of their micro display based on the pixel coordinates and pixel colour values of the generated RGB Array or bitmap from this process;

A method comprising enabling a user to see computationally predetermined and predicted future events and the movements of potential targets including real-world game objects, users or real-world AI characters as well as changes to game scenes in advance, in either their presently occupied real-world space or other real-world spaces of the game that they do not physically occupy comprising one or more of:
  retrieving of state information via the network from the game server or host on other real-world users, real-world game objects and/or AI character's which may include their position (x,y,z), directional vector and other state information;
  the use of dead reckoning techniques combined with this mesh data and state information to predict, render and display future events, where using dead reckoning together with the retrieved state information the system may predict another real-world user, game object or real-world AI Characters future movements;
  the display of rendered augmented images via the users augmented reality ("AR") display, micro display, of predicted future events in which the user may pan around to see through other different parts of the laser tag arena by rotating their head and/or selectively choosing via voice command or hand gestures to see the predicted future events and moves of a real-world user, game objects or AI Character;

Where:
  a user may line up their IR Laser Gun Apparatus for example with a displayed augmented virtual image of a potential target and fire an IR beam or Laser beam in which should the displayed augmented image of the future predicted movements of the target be correct a hit maybe scored;
  the user shall be able to view the real-world spaces with six degrees or more of freedom of movement of their head in which the user may also navigate into other three-dimensional spaces in the non physical sense to see different parts of the laser tag arena by using voice command or hand gestures where during navigation around the other parts of the laser tag current displayed augmented game scenes and images seen by other users in these three dimensional spaces may be presented to the user via their augmented reality ("AR") display apparatus, micro display;
  the game application could if the user selects to see the predicative future events show a future animated game scene or change in the game storylines allowing the user to know what events in the game are about to occur which could be used tactically to score hits and tags;

A method of targeting using generated 3D locational sound effects and varying the frequency of pulses of sounds to assist human users in scoring hits or tags in the firing of an IR beam or IR Laser beam using a real-world game object, comprising one or more of;
  Retrieving of state information containing sensor data and the three-dimensional coordinates of other users, objects, real-world AI characters via the network from the game server or host by a client;
  Inputting three-dimensional coordinates and other variables into a HRIR databased;
  Generating of 3D sound effects and perceptual based 3D locational sound effects using techniques including ITD, IID, IPD and ILD together with HRTF functions;
  Playback of generated 3D sound effects and perceptual based 3D locational sound effects via a user's real world game object speakers or via a user's augmented reality ("AR") display apparatus speakers as varying pulses along a relative three-dimensional plane to the line of sight of a real-world game object such as an IR Laser Gun Apparatus, stimulating the users brain in identifying the target location of the other users or their position relative to the line of sight of the real-world game object;
  Increasing or decreasing the volume of the sound as a user or target comes into or goes out of range of their real-world game object line of sight in terms of its relative position in three dimensional space;
  Alternatively adjusting the frequency of which the pulses of the sound are played back in which this maybe increased or decreased as a target comes into or goes out of range of their real-world game line of sight where:
    The same capabilities may be provided on other forms of IR handheld devices and real world game objects which feature IR Transmitters and IR LEDs such as the use of an IR Shield Apparatus where the user can physically move the IR Shield Apparatus to target other users or AI Characters in which different pulses of sound are increased or decreased in frequency from the left or right side speaker to help guide the user in targeting where visibility may be obscured by the physical IR Shield Apparatus;

A method to enabling human users to see 3D objects without their eyes using sound to stimulate the brain to form three dimensional shapes to enable users to rapidly target and fire IR Beam or IR Laser beams at targets to score hits and/or to avoid hits from other users comprising one or more of:
  A method founded on the principle of echo location and sonar systems, in which the reflecting of sound waves is simulated using three dimensional coordinates by means of;
    Retrieving of state information and model coordinates on other real-world users, AI characters and objects as well as remote users, AI characters, objects and virtual game objects via the network from the game server or host by a user's augmented-reality display apparatus and/or real-world game client module;
    Artificially generating pulses of 3D positional sound effects at varying 3D positions where multiple 3D positional sound effects are generated based the retrieved world coordinate and model coordinates of other real-world users, AI characters and objects as well as remote users, AI characters, objects and virtual game objects in which:
  An audio manager component shall input each of the coordinates into a HRIR database to generate varying 3D positional sound effects; 3D perceptual sound technologies including but not limited to:
    ITD, IID, ILD together with HRTF functions are used in this process to emulate the direction and sound location, to create perceptual based 3D sound localisation;
  Playback/output of varying 3D positional sound effects via a user's augmented reality ("AR") display apparatus speaker(s) and/or a user's real-world game object speaker(s) such as IR Laser Gun Apparatus, in which:
    the user perceives the location of the sound to be in a specific location in the three dimensional space of their real-world;
    placement of the intermittent sounds are varied in three dimensional space and played back as series of sound pulses via the speakers(s) at different positional locations and directions where:
    the human brain is stimulated in which based on the sequence of the 3D positional sound effects in three dimensional space the user's brain is stimulated to form a 3D shape and determine an object type;
    a 3D shape formed in a user's brain maybe of another object or user or AI character or virtual game object which could be used to aid the user's targeting and firing of their real-world game object such as an IR Laser Gun Apparatus with their eyes closed or to avoid hits in which the 3D positional sound can be heard from the direction in three-dimensional space of the threat or the sound could be a directional sound to a safe location;
    each placed 3D positional sound effect 3D spatial sound effects may is placed and mapped to model and world coordinates of an object where:
      the model coordinates and world coordinates of other target users, game objects and AI characters may be retrieved via the network from the game server or host;
      Or alternatively maybe generated by the observer module of a real-world game object and/or the users augmented reality ("AR") display apparatus, through the use of spatial mapping and the devices external camera(s) in which in which based on the captured surface and object geometric and volumetric data, together with the generated mesh data, mesh filter and wireframes a 3D model of a target can be generated in which based on this 3D model, 3D positional audio effects can for example be generated and mapped to the points or vertices on the model;

A method of blocking hits from an IR or Laser beam on from being registered via the use of a virtual shield or a physical shield in the form of a real-world game object and IR Shield Apparatus comprising one or more of;

The usage by users of physical IR Laser Shields and virtual shields that have virtual game objects maintained computationally by a rendering module and games engine of a client and/or the game server in which this object comprising of vertices, model coordinates etc. can be used computationally if activated by a user to block an IR or Laser beam from registering a hit on a user or multiple users where:

In the case of a virtual shield this maybe be:
  a form of human shield that protects the user alone in which a boolean flag shall indicate the presence of a human shield covering a user's body where as a result all IR Sensor readings and/or collision hit detected computationally will be registered as a negative hit;
  Or maybe a spherical virtual game object which is created by a user's gesture inputs in which the radius of the shield and its model coordinates/vertices may cover multiple users and real-world game objects where as a result all IR Sensor readings and/or collision hit detected computationally with the coordinates of the virtual shield maybe registered as a negative hit;

Where:
a real-world user's, real-world game objects, real-world AI Characters and/or remote user may have a virtual shield in which this may prevent a hit from being registered if the virtual shield is active;
virtual shields can be seen as augmented images through the users micro display, or via external projectors 9 using 3D projection, projection mapping/video mapping or spatial augmented reality techniques in which every virtual shield has its own virtual game object and 3D model together with its physical attributes and other attributes such as lighting attributes;
Upon a virtual shield reaching a critical state or collapsing based on repeated hits from an IR or Laser beam determinable computationally based on the formulated projectile and positions of an IR or Laser beams virtual-game object and/or line rendering, the game server or host may invoke the registering of a hit via a users IR Sensor(s) and haptic module together with other users IR Sensor(s) and haptic module(s) in the vicinity of the shield in which this may invoke the haptic modules of all real-world game objects within its radius which may cause as a result on mass multiple real-world IR sensors to go off as well as multiple haptic modules a greater rate of vibrational feedback simulating that the virtual shield has been penetrated where this maybe activated by passing an input to the CPU of each client which shall via the device I/O interface invoke the IR Sensors and haptic module or alternatively this may be invoked via an API.

A virtual shield may also block the computational detection of a hit of a real-world IR or Laser beam on a virtual game object and/or virtual AI character also;
In the case of a IR Shield Apparatus which is a form of a real-world game object based on the IR Shield Apparatus position/world coordinates (x,y,z), orientation (p,r,y), elevation and directional vector retrievable via its sensor(s) together with its model coordinates to that of the relative positions and projectile of an IR or Laser beams and/or its virtual-game object and line rendering and that of a user holding the IR Shield Apparatus own position/world coordinates, elevation derived from the sensor(s) of a users augmented reality ("AR") display apparatus or the sensor(s) a users IR Mixed Reality Suit, where a hit whether detected via the emissions of light or radiation on an IR Sensor or computationally maybe registered as a negative hit in which;
  Posteriori or priori collision detection techniques maybe used in the process where a hit is determined computationally;
  in response to a negative hit the current virtual game object of an IR or Laser beam that intersected with the IR Shield Apparatus maybe destroyed and a second virtual game object and/or line rendering maybe created in which the angle or projectile of the second IR Laser Beam virtual game object or Line Rendering using multiple virtual game objects may be based on the determinable position, orientation and directional vector of the IR Shield Apparatus at the time and collision position (x,y,z) that the IR Laser Beam first hit the shield and in which a hit could be determinable on another object or user as a result based on the new projectile and positions of the deflected IR or Laser beam and its generated virtual game object and/or line rendering with virtual game objects;

A method of remote controlling via gestures a real-world AI character to target and hit other objects, users and real-world AI characters with an IR or Laser beam comprising one or more of;
  Capturing inputs in the form of:
    voice commands via the microphone and speech recognition module of a user's augmented reality ("AR") display apparatus;
    And/or gesture inputs, via the external facing camera(s) and gesture recognition module of a user's augmented reality ("AR") display apparatus using gesture recognition algorithms;
  Transmitting of captured inputs via the network to the client module of the real world AI character;
  Converting/translating and mapping of voice command or hand gesture inputs into three dimensional coordinates and/or vector headings where: in the case of gesture inputs 3D coordinates shall be determined relatively to the users hand positions, orientation and movements using the external facing camera(s) and gesture recognition module of a users ("AR") display apparatus in which the user inputs are then mapped to the physical joint coordinates of the AI Characters hand by the real-world AI character;
  Complex movements such as the rotation of the real-world AI Characters hand can be remotely controlled by a user through hand gesture movements captured by the users augmented reality ("AR") display external facing cameras and their gesture tracking module in which the users hand positions, orientation and movements in three-dimensional space shall be mapped to that of the real-world AI Characters hand movements where the users detected hand position, orientation and movements are mapped to model coordinates and joint positions which the real-world AI Characters hand follows;

invoking of movements by real-world AI character's based on the input converted 3D coordinates into joint movements via the movement module, programmable software and circuitry of the real-world AI Character, in which:

physical movement is supported and controllable through the use of the real-world AI characters actuators, manipulators and joints, where its joints are controllable via the manipulators and actuators where this shall change as a result the position, orientation and movement of the real-world AI Character's hand accordingly;

Where;

the movement as a result the user inputs can be seen in real-time in the corresponding physical movement of a real-world AI Character via a user's augmented reality ("AR") display apparatus;

a real-time video feed captured via the camera(s) of a real-world AI character representing its FOV shall be transmitted via the network and displayed via the users augmented reality ("AR") display apparatus microdisplay, in which the user can see in corresponding physical movements of a real-world AI Characters body corresponding to their hand gestures or voice commands in real-time via their own FOV and microdisplay;

this functionality of the system, maybe used to control the handling by a real-world AI Characters of an IR Laser Gun Apparatus, or other real-world game objects in which based on the user's hand gesture inputs or voice command this can invoke the real-world AI Characters 94 hands to pull the trigger mechanism of the IR Laser Gun Apparatus 47, which provides another form of gaming during a laser tag game in which a user can score hits.

Movement is not restricted to just hand movements but applies to movement of all body parts of a real-world AI character;

A method of displaying targets together with positional indicators and state information as an augmented virtual image over a user's real-world view via a digital targeting scope of a real-world game object in the form of an IR Laser Gun apparatus, used to assist the targeting of an IR beam or IR Laser beam, comprising one or more of:

Invoking of a targeting display of augmented images via a user's transparent IR Laser Gun Apparatus Digital Scope Targeting Lens based on detected touch screen inputs or voice commands by a client module, in which:

the Digital Scope Targeting Lens is form of a transparent display screen which maybe a form of TOLED, LCOS, or LCD display, in which rendered images augmented are configurable to be displayed over the optical lens or optical portion of the telescopic sight or scope which forms a digital scope targeting lens;

the user can see the real-world space through the transparent lens and target information is augmented over the transparent lens of the Digital Scope Targeting Lens;

Retrieving state information and sensor data including the world coordinates, and elevation among other information on all targets including real-world users, real-world game objects, real-world AI Characters or virtual game objects, virtual AI characters or remote users via the network from the game server or host by the apparatus client module;

Passing of state information by the client module to a rendering module/game engine of the apparatus used in display of the user's digital scope targeting lens;

Rendering and display of augmented/virtual images of targets over a user's Digital Scope Targeting Lens in which;

rendered virtual images are generated based on retrieved state information and augmented over the user's real-world space through the use of the from the IR Laser Gun Apparatus camera to record images of the real-world space and generated mesh data, mesh filters and wireframes, generated respectively by the observer module of the apparatus, from which 3D models of the real-world view are generated, in which the apparatus rendering module may then generate virtual images and apply/augment imagery over real-world objects, users, surroundings and AI Characters to assist in targeting;

Upon images being rasterised, fragmented and written in to the Digital Scope Targeting Lens displays frame buffer as RGB array or in memory bitmap a light display module shall then illuminate the corresponding pixels according to their depicted colour and coordinate, upon which the 2D or 3D virtual images shall be displayed or video maybe displayed in the form of augmented images and state information over the users view or the real-world via their IR Laser Gun apparatus digital targeting scope, showing:

the augmented images of targets in a range of three-dimensional coordinates on a triple axis (x, y, z) with a + or − indicating the positions of other real-world users, game objects and AI Characters or virtual world game objects, AI Characters and remote users relative to the users handheld IR Laser Gun Apparatus;

state of the health of targets based on retrieved state information, including the state of another real-world game object such as an IR Shield or virtual shield, the state of the health of the target, name of the user or AI character together with the targets own directional heading, speed, velocity and precise world coordinates;

the weapon which another real-world user, AI Character or virtual AI Character or remote user maybe holding based on the pairing information retrieved from the game server or host;

Display of visual targeting aids in the form of arrow indicators together with positional values for x,y,z as well as for the orientation of targets expressed p,r,y and elevation, expressed as a + or − value relative to the position and orientation of a user's IR Laser Gun Apparatus;

Ability via touch-screen screen inputs detected via the surface display panel faces of their IR Laser Gun Apparatus or voice commands detectable via the apparatus speech recognition module, for a user to: toggle on or off audio assisted targeting, where:

3D positional audio effects are generated based on the coordinates of a selected target and played back via the speakers of a user's IR Laser Gun Apparatus and/or augmented reality ("AR") display apparatus;

3D audio targeting system shall track the selected target and the targeting display will prioritise its directional indicators based on the selected target until a hit is achieved;

Rendering and display of selected targets as 2D or 3D images or video as augmented images over the apparatus Digital Scope Targeting Lens together with coordinate information and other state information on selected targets which maybe real-world users, real-world game objects, real-world AI Characters or virtual game objects, virtual AI characters or remote users;

Playback of 3D positional sound effects indicating the position of a target via a user's IR Laser Gun Apparatus speakers, where using the retrieved state information on another real-world users, real-world game objects, real-world AI Characters or virtual game objects, virtual AI characters or remote users including their positional information in the form of three dimensional world coordinates that are input into a HRIR databases, these 3D perceptual sound effects are then generated using ITL, IPD, ILD and HRFT functions;

A method of activating an IR Proximity Mine, providing feedback based on detected inputs and displaying varying virtual images of projecting IR or IR Laser beams virtual-game objects and line renderings or rays based the varying angles of the apparatus IR LEDs and based on a user's detected inputs for activating the apparatus comprising one or more of:

Activating of the apparatus IR LEDs and optionally the apparatus haptic module based on detected inputs including but not limited to the detection of:

Voice commands via:
the use of the apparatus microphones and speech recognition module directly;
Or remotely via the users augmented reality ("AR") display apparatus speech recognition module and microphones
In which:
a speech recognition module shall translate the spoken voice commands into recognisable text form inputs which are passed by client module of the augmented reality ("AR") display apparatus that shall then invoke the device via an API call sent over the network to activate its IR LEDs via its local client module using a well defined API;
Or remotely via the game server or host speech recognition module and microphones where as a result the game server or host shall invoke via an API and the apparatus client module its IR LEDs;

Physical inputs in the form of the use of the IR Proximity Mines trigger mechanism or a button in which the IR LEDs maybe immediately activated or through the use of a timer mechanism they maybe activated after a determinable period upon a user pulling the trigger or pressing a button;

Sensor inputs where the IR LEDs maybe invoked resulting from one or more of:
Detected motion, free fall and/or impact of the apparatus hitting the ground;
Detected motions/vibrations from other real-world game objects or user's movements where the device is laid on the ground,
Detected changes in rotation at high velocity and rapid changes in the orientation or changes in velocity or elevation or direction of the device resulting from it being thrown;

Where:
the apparatus client module may activate the devices IR LEDs in mid flight or mid air;
the activating of the IR LEDs resulting in the projection of the IR Beams/IR Laser Beams maybe activated differently based on varying determinable states from the reading measurements from its sensor(s), which maybe mapped to different inputs which may invoke different patterns in the activating/illuminating of the IR LEDs and projecting of the IR Beams or IR Laser beams from the apparatus;

Gesture inputs in which the apparatus IR LEDs maybe activated directly based on one or more:
Detected gesture inputs detected directly via the apparatus sensor(s) of a used hand and/or wrist actions in which the mode and sequence of activating the apparatus IR LEDs maybe be based on the detected type of gesture input in which in parallel based on the detected physical wrist actions a special input type maybe identified, in which this could invoke a different action or behaviour by the vibrations motor if the Haptic module to signify to the user whilst holding the IR Proximity Mine Apparatus the users selected mode of fire;
Detected gesture inputs detected directly via the IR Proximity Mine Apparatus Camera(s) and gesture recognition module;
Remotely detected gesture inputs captured via one or more:
via the camera(s) and gesture recognition module of the users augmented reality ("AR") display apparatus in which a commend is sent via the network to the IR Proximity Mine Apparatus client module which then activates the IR Transmitters and IR LEDs or Laser Diodes;
Or via the external camera(s) and gesture tracking module of the game server or host;

Detected proximity of another real-world game object and/or user to the apparatus which maybe:
based on retrieved state information and sensor data via the network from the game server or host on other real-world game objects and/or users positions (x,y,z) in the real-world space of the game relative to the proximity radius and position (x,y,z) of the IR Proximity Mine in which;
a user's position (x,y,z) maybe retrieved via their augmented-reality ("AR" display apparatus sensors and/or IR mixed reality suit for example;
Or this maybe detectable via the use of the IR Proximity mines IR detectors which is a form of IR Sensor, in which based on a user or object obstructing the light of an IR beam and the IR light reflecting back on to the IR Detector/17985 Sensor(s) of the IR Proximity Mine apparatus client module this may activate the apparatus IR LEDs, in which a series of IR beams or IR Laser beams maybe fired at varying angles outward onto potential targets;

Optional display of targeting information via a user's augmented reality ("AR") display where:
In this process video maybe captured via the IR Proximity mines camera(s) and transmitted via the network to a user's augmented reality ("AR") display in which the apparatus rendering module using retrieved state information via the network from the game server or host on other real-world users, game objects, AI Characters and virtual game objects, AI Characters and remote users shall be to render and display augmented images over the captured video to aid the users selecting of activating the IR LEDs highlighting the position of targets and their status in terms of friendly or enemy by colour etc. together with a +/− value detailing if the user, object or AI Character is in or out range and a different outline shape over the target may be shown as augmented over the video frames indicating if a target is in range;

Providing haptic feedback in the case of a gesture inputs to a user's hand and illuminating of each IR LED in a sequence in accordance with detected gesture inputs in the form of wrist and hand movements;

Adjusting the mode based on physical feedback via the haptic modules of the IR Proximity Mine Apparatus, where though the use of a rotating vibration motor and adjusting the rate of rotation in a single rotation or partial rotation together with the level of vibrations patterns, feedback shall be varied in which based on varying physical feedback a user may recognise the weapon mode and device configuration which may be adjustable through further wrist movements and/or voice commands and/or via hand gestures;

Generating of virtual game objects and line renderings or rays for each fired IR beam or IR Laser beam by a user's augmented reality ("AR") display apparatus based on retrieved state information on the position, orientation, directional vector and elevation of the IR Proximity mine at the time of the devices IR LED being activated and together with an offset value for the position of the IR LED and its orientation/angle;

Rendering of virtual-game object and line rendering or ray of each IR beam or IR Laser beam in accordance with its offset values via a user's augmented reality ("AR") display apparatus;

Applying Rasterisation, Fragmentation and Shading;

Invoking of the display of the multiple moving rendered IR Beams or IR Laser Beams virtual-game object and line rendering or rays via a user's augmented reality ("AR") display apparatus light display module based on output RGB array or in-memory bitmap corresponding pixel coordinates and colour values loaded into the displays frame buffer;

Illuminating, Activating or Exciting the display of a user's augmented reality ("AR") display apparatus in which each moving IR Beam or IR Laser beam is displayed as an augmented virtual image over the users real-world view via their micro-display which maybe in the form of two 2D stereoscopic images, a holographic image or hologram in which the displayed rendered augmented virtual image may vary according to the mode in which the apparatus was activated and the detected type of gesture input.

The invention claimed is:

1. An interactive mixed reality system for one or more users, comprising:
at least one real-world entity and at least one virtual world entity, and the real-world and virtual world entities are capable of being interacted with by at least one user, or by objects for use by users, and the at least one real-world entity comprises at least one real-world game object which is physical in its presence in the real-world and with which the one or more users can physically interact, and wherein the real world game-object comprises multiple display surfaces to display at least one of rendered images and texture maps by way of said display surfaces being configured to emit light at different angles to form three-dimensional rendered imagery visible in the real-world, wherein the display surfaces cover the real-world game object to form a physical three dimensional mesh, and wherein the real-world game object includes at least one of game weaponry, game scenery and an artificial intelligence character;

one or more data processors which are configured to maintain game state, and said one or more data processors configured to computationally maintain game state and the evolution of events in a real-world and in a virtual world, wherein each real-world game object is paired to a respective virtual world game-object in which the virtual world game object is geometrically matched to the real-world game object, and said one or more data processors also configured to control the display surfaces of the real-world game object in generating the three-dimensional rendered imagery;

an augmented reality display apparatus which is configured to display augmented reality imagery to a user;

wherein the system is further configured to generate a response which is experienced or perceived by the one or more users, wherein a real-world physical action in relation to use of a real-world physical game object by the at least one user is arranged to provide an input to the computationally maintained game state, and further wherein said three-dimensional rendered imagery formed by light emitted from the display surfaces of the real-world game object is viewable by a user in addition to the augmented reality imagery displayed by the augmented reality display apparatus, and whereby a mixed reality scene is generated in a field of view of the user which includes both the augmented reality imagery and the three-dimensional rendered imagery.

2. The interactive mixed reality system of claim 1, the system being an enhanced IR mixed reality and laser tag game system, further comprising:

real-world space which comprises physical real-world game objects, users, surfaces and artificial intelligence characters;

virtual-world space which comprises virtual game objects, scenery, artificial intelligence and remote users;

real-world game objects and users in which game scenes and 3D renderings of real-world game objects and user avatars are visible with and without the aid of a wearable head-mounted augmented reality display apparatus and touchable as physical objects that can be interacted with; and one or more displays of rendered virtual images of virtual game objects, game scenes, texture-maps, decal, lighting effects and remote users augmented over the real-word space of the game and objects or users in the real-world, which are visible in the real-world and visible when using an augmented reality display apparatus by at least one of being displayed via the use of externally projected light and a real-world game object's surface display faces or are visible as augmented reality virtual images displayed via a user's head-mounted augmented-reality, display apparatus as a form of at least one of two 2D stereoscopic images, a holographic image and a hologram image;

wherein,
a physical action by at least one of a user and a real-world artificial intelligence character in the real world, including the pulling of a real-world game object's trigger mechanism, is arranged to affect the state of the game in at least one of the real-world and virtual world, states of the users, game objects and game, and geometry in the real-world, is maintained computationally in which changes in real-world game objects, users, surfaces are tracked via at least one sensor or via generated mesh data through observations using at least one of an external camera and other type of tracking device, real-world game objects are physical objects in the user's real-world space for which their 3D renderings are visible in the real-world and visible when using an augmented reality display apparatus and these objects can be used, in which a real-world user or artificial intelligence physical actions using these objects serves as an input that can affect at least one of the state of game, other real game objects, virtual game objects, users, artificial intelligence characters and game scenes in at least one of the real-world and virtual world, real-world game objects, users and real-world artificial intelligence characters have paired virtual game objects, 3D models and mesh data which is maintained computationally used in rendering and mathematical operations of the game including collision detections, lighting effects and transformations, real-world game objects comprise a visible mesh, 3D model and texture-maps that are visible in the real-world and visible when using an augmented reality display apparatus, where said objects are at least one of wearable, handled and part of the game scenery, where in the case of a wearable object a 3D rendered avatar is capable of being displayed over a user's body visible in the real-world and visible when using an augmented reality display apparatus, virtual images, texture-maps, lighting effects and game renderings are capable of being displayed by at least one of: directly via a real-world game object surface display faces visible in the real-world and visible when using an augmented reality display apparatus, via the use of external projectors using 3D projection mapping which also is visible in the real-world and visible when using an augmented reality display apparatus, the system provides for real-world fired IR beam or IR laser beams which have at least one of respective generated and rendered virtual game objects and line renderings or rays together with lighting effects in which the beam normally invisible to the human eye is made visible via at least one of a real-world game object surface display face visible in the real-world and visible when using an augmented reality display apparatus, via the use of external projectors using 3D projection mapping which is capable of being visible in the real-world and visible when using an augmented reality display apparatus and displayed via a user's augmented-reality display apparatus, in which a user is able to see a beam travelling in the users real-world space as a virtual image, rendering operations of real-world game objects, users, surfaces and real-world objects are supported by generation of virtual game objects, 3D models, mesh data and the use of a rendering module, the state of real-world game objects, artificial intelligence characters and users in the game real-world space is tracked via at least one of sensors, the use of spatial mapping and structural light scanning techniques, in parallel, the state of the virtual world and virtual game objects, including paired virtual game objects, is maintained computationally, transformations are arranged to be applied to paired virtual game objects of real-world users, and real-world game objects based on detected changes in state based on retrieved sensor data or mesh data, collisions between at least one of users and objects including the collision of at least one of an IR beam and an IR laser beam with at least one of a user and real world game object are capable of being pre-determinable based on retrieved sensor data and state information in which hits are capable of occurring on at least one of a real-world game object, user, surface and artificial intelligence character from a physical use of a real-world game object resulting in the emitting of at least one of an IR beam and an IR laser beam via at least one of an IR LED and an IR laser diode, where a hit is capable of being computed-based on at least one of the relative projectile and positions of the beam with another object derived from sensor data of the real-world game object that fired the beam and on the detection of the light or radiation emissions via an IR sensor which is capable of invoking a physical response in at least one of the real-world and the display of decal and diffuse lighting effects which are visible in the real-world and visible when using an augmented reality display apparatus, hits from at least one of an IR beam, IR laser beam and a virtual weapon is capable of affecting the state of real-world objects and users, hits from at least one of an IR beam, IR laser beam and a virtual weapon are capable of being seen by at least one of: on a real-world game object surface display panel faces, via the use of external projectors and 3D projection mapping techniques on at least one of a user, real-world game object, and object or surfaces that are capable of being viewable with and without the aid of a wearable head-mounted augmented reality display apparatus, hits from an IR beam or IR Laser beam or a virtual weapon are capable of being seen via a user's augmented-reality display apparatus as at least one of a stereoscopic, hologram and holographic image, and decal and diffuse lighting effects are capable of being displayed at the determined point of collision.

3. The system of claim 2, further comprising:
(a) at least one of a game server and a host, which maintains state between that of the real-world game objects and the virtual game objects as well as the state of user physical interactions with real-world game objects and that of the game's real-world space used in computational and rendering operations of the game and real world game objects;
(b) at least one client in the form of at least one real-world game object which is a physical tangible game object comprising a computer, which comprises a number of processing units, at least one sensor, at least one IR receiver, at least one IR sensor, a network interface and at least one of multiple surface display faces in the form of at least one of OLED, LCoS, LCD and a Graphene or Graphite flexible display, and in the form of at least one of triangles, polygons or quads that form a mesh and a solid 3D object in the user's real-world environment in which each real-world game object is configured to generate rendered texture-maps and overlay the generated texture-maps on the surface display panel face which form a fully rendered 3D game object which can be seen viewable with and without the aid of a wearable head-mounted augmented reality display apparatus and physically interacted with in the users real-world environment;

(c) at least one client in the form of a wearable augmented reality head-mounted display apparatus configured to generate mesh data of a user's real-world space using external facing cameras and spatial mapping and to display augmented virtual images of rendered game scenes and virtual games objects including the virtual game objects and line renderings or rays of at least one moving IR beams and IR laser beam together with decal and diffuse lighting effects resulting from a hit detected by at least one of computationally, and via an IR sensor, over a user's real-world space and field of vision via a micro-display panel in the form of at least one of TOLED, LCoS or LCD, using generated mesh data where the displayed virtual image appears present in the user's real-world space and is a form of at least one of: two differing offset 2D stereoscopic images, a hologram and a holographic image;

(d) a network in which each client in the form of at least one of a head-mounted augmented reality display and a real-world game object is capable via their CPU, network interface and sensors of periodically every frame generating and transmitting state information and sensor data to the game server or host on their position, orientation, rotation and directional vector in the three dimensional space of the grid provided in the form of at least one of 3D cartesian coordinates values, pitch, roll and yaw values and a matrix together with other state information including at least one of I/O inputs resulting from a user actions invoking the emitting of an IR beam or IR laser beam in which the system is configured to use this state information in the computational and rendering operations of the game and the determination of a hit or collision of at least one an IR beam and IR laser beam;

(e) a grid that represents the physical 3D space and geometric structure of the game's real-world space and all objects and users within the three-dimensional space of the game, wherein the system is configured to generate surface data, mesh data, wireframes and 3D models of the users' real-world space containing geometric, volumetric, depth data together with the world coordinates and model coordinates of the real-world space and its objects through the use of at least one of spatial mapping techniques and structural light scanning techniques used to support the game computational and rendering operations;

(f) at least two human users equipped with at least one real-world game object in the form of at least one of a handheld IR laser gun apparatus, IR shield apparatus and a IR laser proximity mine apparatus configured:
  (i) to emit light in the form of at least one of an IR beam and IR laser beam via a least one of an IR LED diode and an IR laser diode and lens tube onto at least one of an IR Receiver and fibre optic sensors of another real-world game object to score hits or tags,
  (ii) to generate and transmit state information via the network to at least one of the game server and host or other clients on their three dimensional coordinates, elevation, heading, rotation and orientation in the real-world among other state and sensor data retrieved from the at least one apparatus sensors, together with I/O input events and the use of boolean flags indicating the emitting of light from at least one of an IR beam and an IR laser beam used retrieved at the time of the trigger mechanism being activated, from the real-world game objects sensors in the computation of collisions, and rendering operations of the at least one IR beam and IR laser beams, and
  (iii) to display rendered texture-maps in the form of 2D images together with decal and lighting effects resulting from a detection of a hit of at least one of an IR beam the IR laser beam either computationally based on at least one of state information and via the detection of light emissions via the apparatus IR sensors, where texture maps are displayed over the objects surface display panel faces to form an at least partially rendered 3D image of the real world game object visible in the real-world and visible when using an augmented reality display apparatus to users in the real-world environment and space; and (g) two or more human users each equipped with at least one of a wearable IR mixed reality vest and an IR mixed reality suit in the form of a real-world game object comprising multiple surface display panel faces in the form of at least one of OLED, LCoS, LCD and graphene/graphite and in the form of at least one of triangles, polygons or quads which form a 3D mesh in which through a process of overlaying texture maps and illuminating the individual pixels this forms a fully rendered 3D image of an avatar over at least part of the users' bodies together with at least one of the users name, codename, ammo, health, visual decal and lighting effects of detected hits/collisions from at least one of an IR beam and IR laser beam on their body through the illuminating of pixels on the surface display panel faces of the users at least one of IR mixed reality vest and IR mixed reality suit, wherein said suit or vest comprises a number of IR receivers and sensors for hit detection, a number of sensors used for generating state information on the user's body position, directional vector and orientation in the 3D space of the real-world environment and that of the grid, and a number of haptic modules in which each haptic module is configured to provide physical directionally feedback to a human user of a hit from an at least one of an IR and laser beam according to its relative to the computationally formulated projectile and point of intersection of at least one of a collision and a hit from at least one of an IR beam and an IR laser beam projectile by the system.

4. The system of claim 2, further comprising a number of clients in the form of real-world game object apparatus that exist in both physical form in the users' and the game's real world space, the or each client comprising:
  a computer that comprises a number of processing unit(s) in the form of at least one CPU, GPU, memory in the form of non-persistent RAM/DDRAM, SDRAM and persistent storage memory configured to support the local rendering and computational operations of the game and system together with the storing and processing of data such as sensor data, and handling of inputs and events used by the objects local software modules to perform their functions;

a number of surface display faces in the form of at least one of LCoS, OLED, LCDs and a flexible form of graphene/graphite display each representative of at least one triangle, polygon and quad, defined by a set of points in 3D space represented as cartesian coordinates in the form of x,y,z values which form a tangible and visible 3D mesh in the real-world over the object consisting of at least some of triangles, polygons, quads, edges, surfaces and faces;

one or more light display modules configured to illuminate pixels on the surface display faces to display texture maps and form a 3D image of the real-world game object over its surfaces based on the supplied pixel coordinates and colour values in the form of at least one of an RGB array and in-memory bitmap loaded into the frame buffer where the system is configurable to display texture-maps in the form of 2D images over each physical surface display faces, based on their respective generated RGB array or in-memory bitmap pixel coordinates and colour values which invokes at least one of the illuminating, exciting and activating of the display to form a 3D image of the real-world game object which is visible in the real-world and visible when using an augmented reality display apparatus;

a number of sensors comprising at least one of multi-axis accelerometer, gyroscope, tilt sensor, motion sensor, a GPS Tracker, a solid state compass, an electromagnetic compass/digital compass and a magnetic compass, magnetometer, inclinometer, pedometer, speedometer, altimeter, a MEMS barometer and a dead reckoning module configured to determine the real world game object apparatus world coordinates/position, rotation, directional vector, elevation and orientation in the real-world space, determine the velocity and acceleration of the real world game object apparatus, and generate sensor data and state information on changes in movements of the real-world game object, including state information in the form of three-dimensional world coordinates and/or a vector position expressed as values together with the elevation, rotation, directional vector and orientation expressed as a pitch, roll and yaw value of the apparatus, where these values are provided in the form of matrices via the network to the game server and/or host and stored locally on the apparatus used by the system in the computational and rendering operation of the game including but not limited to rendering, transformations and lighting operations as well as collision detections;

an optional trigger mechanism and IR transmitter, optical lens tube, optical lens piece and LED that is the form of at least one of an IR LED or IR laser diode configurable to emit light in the form of an IR beam or IR laser beam onto another user and/or real-world game objects IR sensor to score a hit or tag upon the trigger mechanism being pulled or the apparatus being activated by other means by a real-world user and/or artificial intelligence character;

one or more IR receivers, sensors in the form of photodiodes or phototransistors configured to detect hits and tags resulting from detection of light emitted in the form of at least one of an IR beam and an IR Laser beam from another real-world game object;

a number of speakers configured to output 3D positional audio effects capable of outputting 3D perceptual sound effects representative of an IR beam or IR laser beam passing or hitting the apparatus;

a microphone for activating the firing of an IR beam or IR laser beam via voice commands based on speech recognition;

a number of ASIC sensor(s) that maybe attached to surface of each surface display panel/screen face via a second screen portion as a thin overlay overlaid over each surface display panel/screen face, where multi-touch capability is supported through capacitive, resistive, optical or wave technologies where touch inputs maybe used to fire an IR beam or IR laser beam or change the rendering state of a real-world game object;

a battery to power the device and its physical surface display screen/panel faces;

a Bluetooth and/or Wifi module for receiving and transmitting data including state information, sensor data, images, video and other forms of data including mesh data on the grid and other objects used for example in the rendering of lighting effects over a real-world game objects surfaces and in the determination computationally of collisions resulting in the display of decal and diffuse lighting effects over the real-word game objects surfaces;

a number of software modules that includes at least one of a rendering module, games engine, collision manager, client module, touchscreen module, speech recognition module, observer module and audio manager that support the game rendering and computational operations as well as the handling, processing, transmitting and receiving of data which includes sensor data and mesh data used in the operation's and methods detailed in the embodiments of this invention; and a paired virtual game object which is maintained computationally by the rendering module and/or games engine in sync with a real-world game objects state and movements in which transformations are applied to the paired virtual game object resulting from physical changes to its paired real-world game objects position, orientation, rotation, elevation and directional vector in the three-dimensional space of the real-world detected via the apparatus sensor(s), where paired virtual game objects are used to support the rendering of texture-maps, decal and lighting effects over a real-world game objects surface display panel/screen faces as well in the computation of collisions of another object real or virtual with a real-world game object such as an IR beam or IR laser beams virtual-game object and/or line rendering, among other operations where the paired virtual game object itself is not displayed but is used to support these operations.

5. A method of using an interactive mixed reality system for one or more users, in which both real-world entities and virtual world entities are capable of being interacted with by at least one user, or by objects for use by users, and the system configured to computationally maintain game state and the evolution of events in the real-world and the virtual world, and the system further configured to generate a response which is experienced or perceived by the one or more users, wherein a real-world physical action in relation to use of a real-world physical game object by the at least one user is arranged to provide an input to the computationally maintained game state, further wherein the system comprises one or more data processors which are configured to maintain game state, the method comprising:

applying transformations to a paired virtual game object of a real-world game objects based on changes in the state of a real-world game object and displaying updates to displayed texture-maps, lighting, and shading effects visible in the real-world and visible when using an augmented reality display apparatus;

detecting and capturing changes in movements and state of a real-world game object, including changes to the position, orientation, rotation, directional heading, elevation, velocity and acceleration of a real-world game object in real-world space using the real-world three dimensional game object's sensor(s);

processing captured sensor measurements that is capable of being converted or translated computationally to relational x,y,z three dimensional cartesian coordinates representing the real-world game objects positional coordinates/world coordinates/vector position and directional heading/directional vector among other states, together with the pitch, roll and yaw values that represent the orientation and rotation of the real-world game object in the real world space;

transmitting and storing of state and sensor data of captured changes including the position, orientation, rotation, directional heading, elevation, velocity and acceleration of a real-world game object in real-world space where state is stored both stored locally by the real-world game object and transmitted via the network to the game server and/or host together with other real-world games objects, used in the computational and rendering operations of the game;

retrieving state and sensor data stored locally and/or via the network from the game server or host;

processing retrieved state and sensor data including a real-world game objects positional coordinates/world coordinates/vector position and directional heading/directional in the form of three dimensional Cartesian coordinates and set of vector values together with its pitch, roll and yaw values, together with other captured state information by a games engine and rendering module;

applying transformations to the paired virtual game object of the real world game object, based on detected changes in movement and/or state, via the games engine and rendering module of the real-world game object using the apparatus CPU and/or GPU, wherein changes in movements and the state of a real-world game object including changes to its position, rotation and other values are applied to its paired virtual game object through transformation operations by the games engine and rendering module relative to that of captured changes to, and in movements and state of the real-world game object based on the processed state and sensor data captured via the objects sensor(s) which includes new x,y,z and p,r,y values that represent changes to the real-world game objects vector positional coordinates, world coordinates, directional vector, orientation and rotation in real-world space;

generating updated rendered texture-maps, lighting and shading effects by the games engine and rendering module of the real-world game object;

applying rasterisation, fragmentation and shading techniques, wherein, in a lighting modelling process, reflection of light from the lighting components of other real-world game objects paired virtual game objects or other virtual game objects in a game scene and/or ambient lighting sources are capable of being applied, reflection of light, diffuse and specular lighting effects of an animated moving IR beam or IR laser beam virtual game object and/or ray or line rendering is capable of being applied, light sources from either of these real-world objects or virtual objects are capable of being applied, light sources comprise at least one of real mixed reality scenery and virtual augmented game scenery in which these are capable of being a defined as coordinate and having a form of ambient light, colour and an projection orientation into the three-dimensional space alike to a directional vector in which the light is cast in a determinable direction which may be applied, and lighting effects are capable of being applied dynamically based on movements or changes in position or orientation of real-world game objects, users, AI character's and virtual game objects, AI character's or remote users relational each other's light sources and that of other fixed scenery light sources or ambient light sources that are capable of change with time where these are capable of being virtual and part of a game scene;

generating texture maps or virtual images with applied updates for lighting and shading operations as an output of the rendering process in the form of 2D rasterised images and overlaying the texture-maps or virtual images over each physical surface display panel/screen faces, based on their respective vertices and model coordinates or texture map coordinates among other mapping methodologies;

loading into each surface display panel/screen faces frame buffer pixel coordinates and colour values provided in the form of a generated RGB array or in-memory bitmap and as an output of the rendering process; and illuminating, exciting or activating each of the surface display panel/screen faces based on the pixel coordinates and colour values to form a fully rendered 3D image over the surfaces of the real-world game object in which the updates displayed changes to the texture maps and lighting effects resulting from transformations are visible in the real-world and visible when using an augmented reality display apparatus.

6. A method of using an interactive mixed reality system for one or more users, in which both real-world entities and virtual world entities are capable of being interacted with by at least one user, or by objects for use by users, and the system configured to computationally maintain game state and the evolution of events in the real-world and the virtual world, and the system further configured to generate a response which is experienced or perceived by the one or more users, wherein a real-world physical action in relation to use of a real-world physical game object by the at least one user is configured to provide an input to the computationally maintained game state, further wherein the system comprises one or more data processors which are arranged to maintain game state, the method comprising:

generating and displaying augmented scenes of game scenes together with spawned or generated virtual-game objects and line renderings or rays of real-world moving IR beams or Laser beams overlaid over a user's real-world space and field of view;

capturing two sets of video and images of a user's real world environment using the two external front facing cameras of a user's head mounted wearable augmented reality display apparatus representing the users left and right eye field of view;

using the captured video and/or images together with spatial mapping techniques to generate geometric, surface, depth and volumetric data by an observer module on the user's real-world space environment, objects and surfaces, in the form of surface data, mesh data, mesh filters, wireframes and 3D models for the purpose of overlaying augmented images of game scenes and moving IR beams or IR Laser beams;

generating depth information using at least one of computer vision, time-of-flight and computer stereo vision techniques and capture video or images;

using the generated mesh data, mesh filters and wireframes containing the surface, volumetric, geometric structural, and depth data of a user's real-world space and environment by a games engine and/or rendering module to create a virtual game objects and 3D models of the real-world objects and surfaces observed from the users front facing cameras and respective field of view;

applying surface rendering materials and/or texture maps to generated virtual game objects and 3D models of the observed real-world objects and surfaces in the user's real-world space;

capturing and generating state information and sensor data on one or more real-world game object(s) world coordinates, vector position, directional vector, orientation and rotation in the 3D space of the grid in the form of x,y,z Cartesian coordinates and pitch, roll and yaw values based on sensor outputs captured from the real-world game objects sensor(s) at the time of the trigger being pulled or the apparatus being activated for each beam fired, which may be provided in the form of a matrix array together with a boolean value indicating the trigger was pulled;

receiving state information and sensor data via the network from the game server or host or another real-world game object, on any moving IR beams or IR Laser beams indicated by a boolean flag together with the relating real-world game objects state at the time that the beam was fired including sensor data on its vector position or three dimensional Cartesian coordinate or world coordinates together with its orientation, rotation, directional vector and elevation for each fired beam;

determining a starting position, projectile and trajectory of each fired IR beam or IR laser beam in real-world space based on the retrieved relating state and sensor data in the form of at least one of a matrix array containing a vector position, three-dimensional cartesian coordinate and world coordinates in the form of x,y,z values, together with the rotation and orientation in the form of pitch, roll, yaw values, a directional vector and values for the height elevation of real-world game object at the time the IR beam or IR laser beam was emitted, resulting from pulling the trigger mechanism or activating of the device;

formulating distance travelled from a determined point of origin based on an assumed velocity and range of the real-world game object or real-world game objects, where the beams originate from differing real-world game objects, for which the distance is formulated for each fired IR beam or IR laser beam;

generating one or more virtual game objects or line renderings with virtual game objects or a ray using a games engine and rendering module and rendering in 3D a virtual image depicting each moving beam based on a computation of its relative origin, directional vector, angle, and projectile/trajectory;

applying transformations to move the virtual game object or virtual game objects or line rendering or ray to progress it rendering along a number of vector points according to the assumed velocity and distance of the beam where the virtual game object or virtual game object(s) or line rendering or ray is moved at equal positions and rate of velocity along points in three-dimensional space to that of the respective real IR beam or IR laser beam light moving in the user's real world space relative to each fired beam;

rendering virtual images of game scenes, virtual game objects including one or more paired virtual game objects or line renderings or rays of one or more moving IR beam or IR laser beam together with lighting effects over a user's observed real world space and field of vision based on the generated mesh data, mesh filters, wireframes and 3D models using a games engine and rendering module together with the augmented reality display apparatus processing units that includes at least one CPU and GPU;

applying rasterisation, fragmentation and shading to the rendered virtual images; and invoking the display of rendered game scenes and virtual game objects including one or more paired virtual game objects or line renderings or rays of moving IR beams or Laser Beams together with lighting effects via the user's micro-display and light display module, as an augmented virtual image over the user's left and right field of view by illuminating, activating or exciting the display in accordance with supplied pixel coordinate and colour values that may be supplied in the form of an RGB Array or in-memory bitmap to the frame buffer of the users augmented reality display apparatus, where the users brain perceives the displayed augmented virtual image to be moving at specific locations in the three dimensional space of their real world in which the displayed augmented virtual image is capable of being realised in a form of at least one of two stereoscopic images and a hologram or holographic image, through a process of spatial mapping, mesh creation and rendering techniques such as ray casting the rendered game scenes and any virtual game objects or line rendering or ray of the moving IR beams or IR laser beams appear at specific locations in the real-world environment at a defined points in three dimensional space that intersect on the cartesian x,y,z planes, and for each real world fired IR beam or IR laser beam the moving augmented image of the IR beam or IR laser beam together with lighting effects are displayed based on the determined trajectory and projectile, and respective formulated vector positions and coordinates in equal positions to that of the three-dimensional cartesian coordinates/positions velocity and distance to that of the real-world IR beam or IR laser beam as this travels through the three dimensional space of the users real-world space.

7. The method of claim 6, further comprising:

rendering and displaying a real-world game object as a fully rendered 3D image that has physical presences in the real-world environment and is visible in the real-world and visible when using an augmented reality display apparatus, recreating complex 3D shapes and 3D meshes that are visible in the real-world in the form of a real-world game object through arranging a series of physical surface display screen faces in the form of at least one of triangles/polygons and quads that cover the surfaces and faces of a real-world game objects to provide a semi or full 3D mesh and 3D model or wireframe visible with and without the aid of a wearable head-mounted augmented reality display apparatus, in which the surface display screen faces are capable of being realised in the form of organic display of at least one of OLED, a form of LCOS, LCD made of a glass or polymer material and a form of Graphene/Graphite flexible display, where the surface display screen faces are arranged in a tiled configuration to form a mesh and 3D model made up of many triangles/polygons or quads that is visible with and without the aid of a wearable head-mounted augmented reality display apparatus;

generating a virtual game object, virtual mesh and 3D model via a games engine and/or rendering module, in which the generated virtual game object, mesh data and 3D model is geometrically exactly the same in terms of its representative corresponding mesh data, polygons, triangles or quads, 3D model coordinates, surfaces, faces, edges, and vertices to that of the real-world game objects own real-world model polygons/triangles or quads in the form of physical surface display screen faces, together with its model coordinates, and addressable surfaces, faces, edges, and vertices in which each surface display screen face comprises of one or more of triangles/polygons or quads that each has a set of vertices, each of which has a coordinate of referred to as a point or vertex, and the vertices which are referenced by the faces, define the overall shape of the 3D model of the objects real-world shape and 3D model;

pairing the generated virtual game object with a real-world game object that is geometrically identical;

mapping a real-world game objects mesh, vertices, points, edges, faces, triangles, polygons or quads and surfaces to the generated paired virtual-game objects mesh, vertices, points, edges, faces, triangles polygons or quads and surfaces;

arranging physical surface display screen faces triangles/polygons and quads in the order in which the faces references each of the vertices provided as a list of faces;

invoking the rendering texture-maps, lighting and shading effects over the surfaces and faces of the virtual game object via a games engine and or rendering module;

using materials, texture maps, 2D coordinates, vector arrays in the rendering process;

applying rasterisation, fragmentation and shading;

generating of rendered texture maps and virtual images as an output of the rendering process of the paired virtual-game object in the form of rasterised 2D virtual images;

applying or overlaying texture maps and 2D virtual images output from the rendering process over the paired real-world game objects physical surface display panel/screen faces, through a variety of mapping techniques including at least one of:
  use of pixel coordinate based mappings, in which every surface display panel/screen face has a unique set of pixel coordinates,
  use of texture mapping techniques and the use of 2D coordinates to map texture maps or 2D virtual images to the surface display panel faces of a real-world game object, and
  use of a centroid of a triangle where the position of each surface display panel/screen face represents a vector of the centroid of a triangle and each surface display panel/screen face represents a triangle/polygon or quad;

loading pixel coordinates and colour values provided in the form of a generated RGB array or in-memory bitmap into each surface display panel/screen faces frame buffers or a single frame buffer as an output of the rendering process;

where in the case of a single frame buffer the surface display panel/screen faces are capable of being configured in a tiled arrangement in which the pixel coordinates span all of the different surface display panel/screen faces, where every surface display panel/screen faces has a unique addressable pixel set of coordinates or RGB positions in which individual texture maps and/or 2D images are mapped based on their respective pixel coordinates or RGB positions to each surface display panel/screen faces;

reading and processing of the pixel colours and pixel coordinates from a single frame buffer or the frame buffer for each of the surface display panel/screen faces by one or more light display modules; and illuminating, activating or exciting each of the surface display panel/screen faces using a light display module based on the assigned pixel coordinates and colour values and displaying multiple 2D images or rendered texture-maps over the respective surface display panel/screen faces of the real-world game object to form a fully rendered 3D image and recreate complex 3D shapes that have physical in presence in the real world and which are visible in the real-world and visible when using an augmented reality display apparatus.

8. The method, as claimed in claim 6, of displaying 3D virtual augmented images via a user's head mounted wearable augmented reality display apparatus of one or more moving low light IR beam or IR laser beam normally invisible to the human eye, using a stereoscopy or stereoscopic techniques, further comprising:

(a) generating two slightly differing stereoscopic or stereogram 2D images from the generated 3D rendered augmented image each at different offsets and view angles of the game scene and moving IR beam or IR laser beams through a process of rasterization in which the 3D rendered image is converted into two differing offset 2D images representing the users left and right eye view by converting the 3D objects vector points into a 2D plane and dropping of the z-axis value, where the rasterisation algorithm in this process takes the game object string of vertices and faces and converts the three dimensional points x, y, z into two dimensional points resulting in two slightly offset stereoscopic images at different view angles;

(b) transforming the rendered image into pixel sized fragments, through process the fragmentation by the games engine fragment shader to generate pixels which are assigned final colour values;

(c) clipping the generated two left and right offset 2D stereoscopic images based on the user's perspective projection and the size of the micro display;

(d) writing the resulting pixel values that includes their coordinates and colour into a frame buffer and invoking the apparatus light display module to draw the respective left and right 2D stereoscopic images on the micro display 3 left and right display portions of the microdisplay;

(e) invoking the illuminating, activating or exciting of a user's head mounted augmented micro-display based on generated pixel coordinates and colour values;

(f) emitting light via each of the left and right display portions of the micro-display where dependent on the display type comprising at least one of an LCD, LCOS and TOLED type display, the left and right display portions are illuminated/activated/excited or the LEDs are activated by the light display modules according to the pixel coordinates and colour values of the two differing left and right 2D stereoscopic images where the left 2D stereoscopic image is displayed in the left portion of the display, and the right 2D stereoscopic image is illuminated in the right portion of the display;

(g) directing the light onto corresponding left and right display panel portion of the display via a pair of collimating lens of micro display which then collimate the images into a plurality of beams where the light exits corresponding to the individual input beams from either portion of the transparent display screens via the waveguides onto the users left and right eye;

(h) passing and directing light through the transparent display and optical lens pieces onto the human eyes, using waveguides wherein the image light is directed outward in the form of collimated light onto the users left and right eyes via the micro-display optical lens pieces by apparatus waveguides via the transparent micro display optical lens pieces;

(i) projecting the resulting light beams of the two differing 2D stereoscopic or stereogram images or video on to each eye retina through process of light reflected onto the human eye, where the light is reflected onto the human eye retinas at varying angles and then passed down the optical nerve to the user's brain;

(j) receiving the corresponding reflected light of the right image by the user's right eye and the left image by the left eye of the same 3D rendered image of a game scene and any moving low light IR beam or IR Laser beams but at a slightly different angles in the form of two differing 2D stereoscopic or stereogram images or video; and (k) stimulating the human brain to convert the light of varying angles from the differing 2D images and combine the images to form a single image that is reversed and appears as a single reconstructed 3D image of the original rendered 3D image to the users brain, where through the process of stereoscopy or stereoscopic's using two slightly different stereoscopic or stereogram images each showing a different angle the users brain is stimulated in which the resulting 3D image of the game scene and any moving IR beam or IR laser beam appears overlaid on the users real world environment view, visible through the through transparent display of the users augmented reality micro display and field of view giving the perception of the object having true presence and 3D depth in the user's real world space.

9. The method as claimed in claim 6, of displaying rendered holographic or hologram based augmented game scenes and virtual images of one or more moving low light IR beams or IR Laser beams normally invisible to the human eye, over the user's real-world space and field of view, further comprising:

(a) layering a suitable form of grating over the respective left eye and right eye lens pieces of the user's augmented reality display apparatus micro-display, using a form of diffraction grating or holographic grating or other suitable grating forms to form a suitable holographic lens which forms a transparent layer on top of optical lens components and display screen portions of the transparent micro display configurable to display holographic images;

(b) determining the diffracted waves from the holographic lens piece by adjusting the grating spacing and the wavelength of the light in which the ray of light behaves according to laws of reflection and refraction as with a mirror or curved lens;

(c) placing the augmented reality display apparatus microdisplay within centimetres of the user's eyes in which the apparatus sits on the users nose and head as a wearable device which provides the users field of view into the real-world and virtual world of the game;

(d) using optical couplings and waveguides to guide the image light of rendered game scenes and moving IR beam or IR Laser beam virtual images in the form of a holographic image or hologram onto the grating where the image light wavelengths resulting from the original holographic image or hologram is guided via the optical couplings and waveguides and projected onto the optical lens pieces of the micro display, the light is then collimated and projected onto the grating plates which may be a form of at least one of diffraction grating plates, holographic plates, a slanted diffraction grating, Fibre Bragg grating and other forms of grating suitable of supporting a holographic or hologram which has a three dimensional structure where the incident of light may then be diffracted by the grating at a specified angle, referred to as the Bragg angle in which in the case of a hologram this is capable of being illuminated with a light source incident at the original reference beam angle and is reconstructed at the same wavelength or the illuminated angle of incident and wavelength in order to vary or change the colour of a hologram;

(e) illuminating the optical display lens on the transparent plate and surface of the micro display at identical positions to that of the referenced original holographic image in which the beam and the images light wavelengths are guided via the optical couplings and waveguides of the micro display according to the reflection levels and the exact same position of light relative to originally generated holographic image or hologram, on to the grating plates, so as to enable the reconstructed hologram or holographic image to be formed substantially the same as the original source image:

(f) directing the light beams according to the spacing of the grating and wavelength of the light where the image light is diffracted before exiting towards the user's eyes via the display screen portions and respective waveguides in which the diffracted image light then intersects at determined position of the user eye lens and pupil;

(g) directing the light beams according to the user's eye tracking data provided by the eye tracking module, to ensure that the light beams enter correctly at the right predetermined angle of intersection or incidence to the user's eye lens so as the image is correctly formed;

(h) optionally applying adjustments based on the user's eye shape, position and movements to the display through adjusting the Total Internal reflections, refractive index and diffraction configuration used to direct the resulting light ray or rays at the user's eyes;

(i) propagating the light of the holographic or hologram image source of the game scene and moving IR beam or IR laser beam onto the user's eyes using a process of diffraction and total internal reflections in which the light exits the corresponding display portions of the micro display towards the user's eyes at a determined angle of intersection or incidence;

(j) wherein the light exited onto the user's eye lens and the diffracted light beams of the game scene images and the moving IR beam or IR laser beam image are reflected onto the human users left and right eye retina through the process of light reflected onto the human eye, where the light is then passed down the optical nerve of the user to their brain;

(k) stimulating the human brain to convert the received light into a 3D virtual image, where through the transparent display of the user's micro display, the 3D holographic or hologram images of the game scene and moving IR beam or IR laser beams that are substantially the same as the original source image then appear overlaid on real world environment view of the user as an augmented virtual image; and (l) optionally, reconstructing volume or thick hologram types which have has a three dimensional structure, where the hologram is illuminated with a light source incident at the original reference beam angle and is reconstructed at the same wavelength or if the illuminated angle of incident is a varied wavelength then the colour maybe varied.

10. The method as claimed in claim 6, of dynamically digitally displaying holograms and holographic images over the user's real-world view via a user's augmented reality display apparatus of game scenes and moving IR beams or IR laser beams normally invisible to the human eye, through passing light through a form of photo-refractive crystal display, based on a refractive index grating, the method further comprising:

(a) receiving state information and sensor data on any moving IR beam or IR Laser beam from the game server or host via the network resulting from the use of a trigger or activating a handheld real-world game object;

(b) generating for each moving IR beam or IR laser beam one or more virtual game object or line rendering or rays and rendering an augmented virtual image using a rendering module and/or games engine depicting the moving IR beam or IR laser beam based on a computation of the relative vector positions, direction, projectile, trajectory and velocity of the beam derived from the state information and sensor data of the real-world game objects vector position orientation, directional heading at the time the trigger was pulled provided in the form of a matrix array together with an assumed velocity, gravity and distance;

(c) generating and rendering game scenes and each moving IR beam or IR laser beams over a user's real-world using generated and captured mesh data together with generated virtual game objects including a virtual game object and/or line rendering or ray of any moving IR beam or IR laser beam by a rendering module and/or games engine;

(d) generating holographic images of game scenes and any moving IR beam or IR laser beams based on generated mesh, together with 3D models and/or virtual game objects including a virtual game object and/or line rendering of any moving IR beams or IR laser beams;

(e) passing light through the photorefractive crystal and defracting the beams based on a refractive index grating in the pattern of the original holographic image resulting in the storing of the image on the photorefractive crystal display portion of the micro-display in which upon the light passing through the photorefractive crystal based on the refractive index grating the beam shall be diffracted, resulting in the pattern of the image being stored on the crystal;

(f) at least one of activating, exciting and illuminating resulting in the image light exiting the Micro display back via the waveguides to the user's eye lenses in which the image light is projected and to directed towards the user's eyes at a determinable angle of incidence via the waveguides onto the user's eyes, and as light passes through the cornea it is bent and refracted on to the lens, and then passed through the user's eye lens for either eye, during which each eye lens further refracts the light onto the eye retina, following which the virtual image is reversed and turned upside down where the light emanating from the formed virtual image images then travels down the optic nerve to the occipital lobe from which a virtual image is then reformed by the user's brain of the 3D holographic image, where the virtual image then regains its original perspective and the user sees the virtual image of at least one of the game object or scene as a three dimensional holographic augmented over the user's real world view;

(g) wherein the use of a refractive index grating in the diffracting of the light beams, causes one beam to gain more energy than another, in which this becomes greater with intensity of light, whilst simultaneously reducing of the intensity of light in the other beam which is referred to as phenomenon called two-wave mixing; and (h) overwriting the holographic pattern and image of a holographic image through flooding the crystal with uniform light in order to excite the electrons causing them to be re-distributed uniformly and to erase the pattern allowing new holographic patterns to be stored and holographic images to be displayed dynamically in which the Bragg diffraction condition is satisfied enabling the support for dynamic digital holography.

\* \* \* \* \*